US012283084B2

(12) United States Patent
Saraee et al.

(10) Patent No.: US 12,283,084 B2
(45) Date of Patent: *Apr. 22, 2025

(54) SYSTEMS AND METHODS IMPLEMENTING A MACHINE LEARNING ARCHITECTURE FOR VIDEO PROCESSING

(71) Applicant: VIZIT LABS, INC., Boston, MA (US)

(72) Inventors: Elham Saraee, Medford, MA (US); Jehan Hamedi, Wellesley, MA (US); Zachary Halloran, Franklin, MA (US)

(73) Assignee: VIZIT LABS, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/948,428

(22) Filed: Nov. 14, 2024

(65) Prior Publication Data

US 2025/0104392 A1 Mar. 27, 2025

Related U.S. Application Data

(60) Continuation-in-part of application No. 18/943,693, filed on Nov. 11, 2024, which is a continuation of
(Continued)

(51) Int. Cl.
*G06F 16/438* (2019.01)
*G06N 3/045* (2023.01)
(Continued)

(52) U.S. Cl.
CPC .......... *G06V 10/761* (2022.01); *G06F 16/438* (2019.01); *G06N 3/045* (2023.01); *G06V 10/40* (2022.01); *G06V 10/82* (2022.01)

(58) Field of Classification Search
CPC ...... G06V 10/761; G06V 10/40; G06V 10/82; G06F 16/438; G06N 3/045
(Continued)

(56) References Cited

U.S. PATENT DOCUMENTS 7,813,822 B1 10/2010 Hoffberg
8,108,402 B2 1/2012 Carter
(Continued)

FOREIGN PATENT DOCUMENTS

JP 2007-114864 A 5/2007

OTHER PUBLICATIONS

Haccius et al., "Computer Vision Performance and Image Quality Metrics: A Reciprocal Relation," Telecommunications Lab, Saarland University, Saarbrucken, Germany, Dec. 29, 2016, pp. 27-37 (11 pages).

*Primary Examiner* — Charlotte M Baker
(74) *Attorney, Agent, or Firm* — FOLEY & LARDNER LLP

(57) ABSTRACT

The present disclosure describes a method comprising receiving a video; segmenting the video into a plurality of segments, each of the plurality of segments comprising a plurality of images; executing one or more machine learning models using the plurality of segments to generate a segment score for each of the plurality of segments, the segment score for a segment indicating a likelihood that a user will interact with the segment; generating a video performance score for the video as a function of the segment scores for the plurality of segments; and generating a record comprising the video performance score for the video and an identification of the video.

20 Claims, 50 Drawing Sheets

Related U.S. Application Data application No. 18/782,569, filed on Jul. 24, 2024, now Pat. No. 12,142,027, which is a continuation-in-part of application No. 18/414,148, filed on Jan. 16, 2024, now Pat. No. 12,080,046, which is a continuation-in-part of application No. 18/494,483, filed on Oct. 25, 2023, now Pat. No. 11,922,675, which is a continuation of application No. 17/833,671, filed on Jun. 6, 2022, now Pat. No. 11,804,028, which is a continuation of application No. 17/548,341, filed on Dec. 10, 2021, now Pat. No. 11,417,085, which is a continuation-in-part of application No. 16/537,426, filed on Aug. 9, 2019, now abandoned, which is a division of application No. 15/727,044, filed on Oct. 6, 2017, now Pat. No. 10,380,650.

(60) Provisional application No. 63/606,210, filed on Dec. 5, 2023, provisional application No. 63/529,588, filed on Jul. 28, 2023, provisional application No. 62/537,428, filed on Jul. 26, 2017.

(51) Int. Cl.

| | |
|---|---|
| ***G06V 10/40*** | (2022.01) |
| ***G06V 10/74*** | (2022.01) |
| ***G06V 10/82*** | (2022.01) |

(58) Field of Classification Search

USPC .......................................................... 382/157

See application file for complete search history.

(56) References Cited

U.S. PATENT DOCUMENTS

| | | | |
|---|---|---|---|
| 8,825,662 B1 | 9/2014 | Kingman et al. | |
| 10,162,865 B2 | 12/2018 | Yuen et al. | |
| 10,380,650 B2 | 8/2019 | Hamedi et al. | |
| 10,452,842 B2 | 10/2019 | Dhondse et al. | |
| 10,489,799 B2 | 11/2019 | Smith | |
| 10,592,074 B2 * | 3/2020 | Hamedi | G06F 16/48 |
| 10,650,073 B1 | 5/2020 | Manzi et al. | |
| 11,922,675 B1 | 3/2024 | Saraee et al. | |
| 11,922,683 B2 | 3/2024 | Kazmi et al. | |
| 2008/0195649 A1 | 8/2008 | Lefebvre | |
| 2010/0028846 A1 | 2/2010 | Cohen et al. | |
| 2012/0155778 A1 | 6/2012 | Buchmueller et al. | |
| 2012/0213452 A1 | 8/2012 | Matsuyama et al. | |
| 2014/0201707 A1 | 7/2014 | Schroeder | |
| 2014/0307958 A1 | 10/2014 | Wang et al. | |
| 2014/0344186 A1 | 11/2014 | Nadler | |
| 2015/0109337 A1 | 4/2015 | Hofmann et al. | |
| 2015/0379557 A1 | 12/2015 | Liu et al. | |
| 2016/0005175 A1 | 1/2016 | Fujita | |
| 2016/0124911 A1 | 5/2016 | Ying | |
| 2016/0125451 A1 | 5/2016 | Garg et al. | |
| 2016/0132935 A1 | 5/2016 | Shen et al. | |
| 2016/0140623 A1 | 5/2016 | Gupta et al. | |
| 2016/0299906 A1 | 10/2016 | Cartoon et al. | |
| 2017/0236407 A1 | 8/2017 | Rhoads et al. | |
| 2019/0066313 A1 | 2/2019 | Kim et al. | |
| 2019/0339824 A1 | 11/2019 | Hamedi et al. | |
| 2020/0379659 A1 | 12/2020 | Faibish et al. | |
| 2020/0401793 A1 | 12/2020 | Leung et al. | |
| 2021/0319398 A1 | 10/2021 | Streebin et al. | |
| 2021/0398265 A1 * | 12/2021 | Baijal | G06T 7/0002 |

* cited by examiner

700

1100

4500

SYSTEMS AND METHODS IMPLEMENTING A MACHINE LEARNING ARCHITECTURE FOR VIDEO PROCESSING

CROSS-REFERENCE TO RELATED APPLICATIONS

This application claims the benefit of priority to U.S. Provisional Application No. 63/606,210, filed Dec. 5, 2023 and claims the benefit of priority as a continuation-in-part to U.S. patent application Ser. No. 18/943,693, filed Nov. 11, 2024, which claims the benefit of priority to U.S. Provisional Application No. 63/606,210, Dec. 5, 2023, and claims the benefit of priority as a continuation to U.S. patent application Ser. No. 18/782,569, filed Jul. 24, 2024, which claims the benefit of priority to U.S. Provisional Patent Application No. 63/529,588, filed Jul. 28, 2023, and U.S. Provisional Patent Application No. 63/606,210, filed Dec. 5, 2023. U.S. patent application Ser. No. 18/782,569, also claims the benefit or priority as a continuation-in-part to U.S. patent application Ser. No. 18/414,148, filed Jan. 16, 2024, which claims the benefit of priority to U.S. Provisional Patent Application No. 63/529,588, filed Jul. 28, 2023, and U.S. Provisional Patent Application No. 63/606,210, filed Dec. 5, 2023, and also claims the benefit of priority as a continuation-in-part to Ser. No. 18/494,483, filed Oct. 25, 2023, which claims the benefit of priority as a Continuation to U.S. patent application Ser. No. 17/833,671, filed Jun. 6, 2022, which claims the benefit of priority as continuation to U.S. patent application Ser. No. 17/548,341, filed Dec. 10, 2021, which claims the benefit of priority as a Continuation-In-Part to U.S. patent application Ser. No. 16/537,426, filed Aug. 9, 2019, which claims the benefit of priority as a Divisional to U.S. patent application Ser. No. 15/727,044, filed on Oct. 6, 2017, which claims the benefit of priority to U.S. Provisional Patent Application No. 62/537,428, filed Jul. 26, 2017, each of which is incorporated by reference herein in its entirety.

BACKGROUND

Many people use the internet every day. Some use it to discover information such as news, recipes, phone numbers, etc. Some use the internet to communicate with others through mediums such as chat rooms, message boards, and e-mail. Traffic on the internet is large and many people use the internet for extended amounts of time.

Often times, websites may include different images and other visual or audiovisual content that are designed for a specific target audience. For example, websites may include content items that are designed to draw the target audience's attention or cause members of the target audience to select or interact with the content items in their browser. However, due to the size of the user interfaces on the browser, the bandwidth of the internet provider providing the website to the browser, and/or memory restrictions that are local to the computer executing the browser, only a small number of content items can be displayed at once. Accordingly, only a select number of content items may be displayed before the network or the computers involved in providing and/or displaying the content will start to experience significant latency or will not be able to provide the content items at all.

SUMMARY

To overcome the aforementioned technical deficiencies, in one example, a computer implementing the systems and methods described herein may use a neural network to automatically select a small number of content items to include on the webpage that are still likely to draw the target audience's attention. For example, the computer may extract images from a web page that is associated with a particular target audience and generate a target audience interaction benchmark with the images by applying the extracted images to a neural network. A user may then input further images into the neural network to determine how the images compare to the benchmark and identify the images with the highest positive difference in performance with the benchmark. Advantageously, only the identified images may then be uploaded to a website to generate target audience interactions without causing the technical problems that typically accompany including a large number of images on a single webpage. Thus, the computer may select a lower number of content items to include on the website to avoid the typical technical deficiencies involved in attempting to obtain a high interaction rate on a website while achieving the same result.

BRIEF DESCRIPTION OF THE DRAWINGS

Illustrative embodiments will hereafter be described with reference to the accompanying drawings.

DETAILED DESCRIPTION

Figure 1:
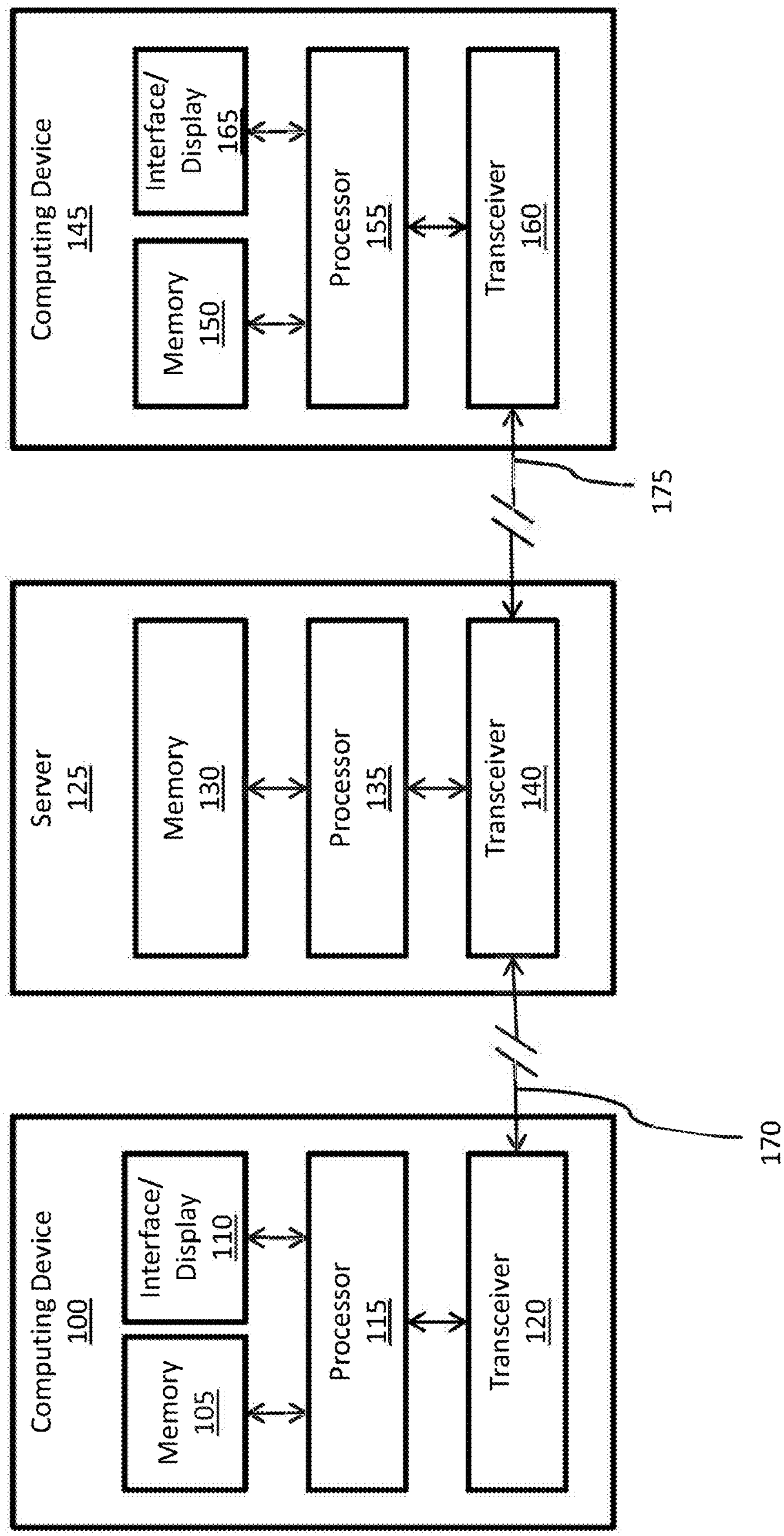
FIG. 1 is a block diagram illustrating computing devices and a server that may be used in accordance with an illustrative embodiment.

Described herein are illustrative embodiments for methods and systems that provide for quantifying social audience activation through search and comparison of custom author groupings. In an illustrative embodiment, a user of the system may enter a search criteria that specifies a custom author crowd. The search criteria may specify various demographic information related to authors, posts created by authors, preferences of authors, temporal considerations (when did an author do something), or other various search criteria as disclosed herein. The user may also be able to enter multiple search criteria to specify, define, and/or search for a custom author crowd.

As disclosed herein, a user is generally referred to as a user of the disclosed system and methods, while an author is generally referred to as any user of social media. Whether the author actually "authors" posts is irrelevant to their categorization as an author. For example, an author as defined here may never actually author a post, but may interact on social media in other ways. In short, a distinction is made in the present application between a user of the disclosed system (the "user") and a user of social media (an "author"). The terminology used throughout the present application is not meant to limit the activity of an author or user, or to prevent an author from also being a user or vice versa. Rather, the terminology is merely used to provide clarity and distinguish between users and authors. A user generally refers to a person using the systems and methods disclosed herein, while an author generally refers to a person using a website, social network, application software (apps), etc. (including applications for mobile phones, smart phones, tablets, personal data assistants (PDA's), laptops, desktop computers, etc. In other words, the system and methods disclosed herein may be used across one or more platforms and mediums including social networks, websites, mobile phone apps, and the like.

Once a crowd has been defined by a user, that crowd can be stored, analyzed, and/or tracked for various fluctuations within the crowd based on the authors in the crowd's behavior after the crowd has been defined. Many examples of fluctuations that may be determined by the system are disclosed herein, and are not meant to limit the possible fluctuations that may be tracked, analyzed, and/or determined. In one illustrative embodiment, a custom crowd may be initially defined by searching for authors who have authored a social media post within the past three months about any type of carbonated soft drink. Such a search may include search for different types and brands of carbonated soft drinks in social media posts. Whoever authored those posts would then be included in the custom author crowd.

A user of the system and methods disclosed herein may be different persons or entities. For example, a user may wish to search for and create custom author crowds to track effectiveness of their campaigns. In another example, the user may be a social network or agent/staffer of the social network who wishes to search for and create custom author crowds. A social network may wish to use custom author crowds for a variety of purposes. For example, the social network may wish to track their own campaigns or campaigns of those who use the social network to display the author's works. In the latter example, tracking others' campaigns on the social network may allow the social network to better promote the effectiveness of the campaigns on their social network, and thereby increase campaign spending on their social network. In another example, the social network (or an agent/staffer of the network) may perform searching for and tracking of custom author crowds on behalf of a separate entity (e.g., an entity). In this situation, the entity may or may not dictate how the searching and tracking should be done by the social network. When the searching and tracking is not dictated by the entity, the social network may be offering the searching and tracking services as part of services paid for by the entity. In another example, the searching and tracking may be provided by the social network to entities. In this example, the entity may be the user of the system. Furthermore, a social network in this example may exert some control over how the searching and tracking is accomplished. For example, the social network may limit the number or type of authors the entity can search for. In another example, the social network may limit the number of custom author crowds the entity can search for or save for tracking. The social network could also limit the total number of authors searched for and or tracked by an entity. The social network could also limit the number of authors allowed in each custom author group tracked by the entity.

In other examples, the system and methods disclosed herein may operate across multiple mediums and platforms such as websites, social media networks, and/or mobile apps. For example, an entity may want to define a custom author crowd by performing searches of Facebook™ authors. The entity may also wish to find the same authors they already found on Facebook™ on another medium. Examples of other mediums may include a Dictionary.com™ mobile app, a user of ESPN™ Fantasy Football services, or individuals with an account on an online shopping website such as Amazon™. The entity may have a particular rationale for discovering or finding users on other mediums as well. For example, the entity may operate the mobile app Uber™, which offers taxi-like services. Uber™ may wish to identify authors that use a mobile app that allows tracking of city buses or other transportation related apps. In a further example, Uber™ may wish to identify authors that use any sort of road navigation app such as Google™ Maps. One possible implementation may be to market to those who use such navigation or transportation apps whenever there is a surplus of Uber™ drivers in a certain town or area. The system may even be able to identify when a particular app is actively being used. In this scenario, an author may be using a navigation app such as a city bus tracker app during a time when there is a surplus of Uber™ drivers. The system may identify the authors actively using the bus tracker app and market Uber™ to those authors. The identification could happen automatically and marketing may happen automatically as predefined by a user. In another embodiment, the identification of surplus drivers and potential market for those drivers may occur automatically and the marketing may be executed manually. In a third embodiment, all steps may be performed manually by a user. In these examples, an app developer may be able to open up their author database to a broader cross-platform activation system that may be tapped into by entities. The entities may target users on apps or platforms they do business on or perform other relevant cross-platform marketing and targeting.

Next, a baseline magnitude may be determined using a fluctuation criteria. For example, within the custom author crowd, the fluctuation criteria may be set as root beer. In this embodiment, any author in the custom crowd that has authored a post about root beer in the past three months (that is, whoever has previously posted about root beer in the set amount of time before the custom crowd is created or specified) is a part of the baseline magnitude used to calculate a fluctuation. A group of users that are a part of the baseline magnitude may be considered to be a part of a community that enjoys root beer within the custom author crowd. Fluctuation criteria may also have the same parameters as the initial search criteria.

Once the custom author crowd has been specified and a baseline magnitude is determined using a fluctuation criteria, the system may monitor the custom author crowd in order to determine a fluctuation of the custom author crowd if authors in the custom author crowd author content or engage in a behavior that is related to the fluctuation criteria. For example, an author that previously had not posted about root beer or previously been considered part of a community that enjoys root beer may author an online social media posting regarding their experience trying root beer for the first time and enjoying it. The system may determine a fluctuation in the custom author crowd based on the online social media posting. That is, the community of those who enjoy root beer within the custom author crowd has fluctuated upward. In other embodiments, the system may determine a downward fluctuation. For example, an author may leave an affinity group for root beer hosted by a social media website, which may indicate a downward fluctuation and that the author has left the community of those who enjoy root beer. In another example, a system may determine that an author's failure to author content about root beer over a certain time period is a downward fluctuation and that the author has left the community of those that enjoy root beer.

In an illustrative embodiment, the system is monitoring a plurality of authors in a custom author crowd for overall fluctuations based on a fluctuation criteria. That is, the system can determine how many authors in the custom author crowd have joined and/or left a community defined by the fluctuation criteria.

In an illustrative embodiment, multiple fluctuation criteria may be used with the same custom author crowd. In this example, a custom author crowd may be watched for fluctuations in multiple types of things. For example, a custom author crowd may be watched in regards to root beer as in the preceding example, and the custom author crowd may also be watched in regards to orange juice. In this example, the additional fluctuation criteria may also be used to establish a baseline community of those authors in the custom author crowd who have authored content indicating a positive emotion toward orange juice. Multiple fluctuation criteria used for the same custom author crowd may or may not be related to each other. In this example, the two fluctuation criteria are related to each other, as both of them are beverages. Similarly, in other embodiments, whenever there are multiple fluctuation criteria used, the multiple fluctuation criteria may be part of a common fluctuation criteria type (e.g., beverages, as in the previous example).

In another illustrative embodiment, a user may specify more than one custom author crowd. Multiple custom author crowds may have at least one different author from each other. In some examples, different custom author crowds may have one or more authors in common. In other examples, different custom author crowds may be mutually exclusive and not have any authors in common. Each of the custom author crowds can be monitored for fluctuations based on fluctuation criteria, similar to the examples disclosed herein. Where different custom author crowds are monitored based on the same fluctuation criteria, the system can determine a fluctuation for multiple custom author crowds based on that same fluctuation criteria. In an illustrative embodiment, the baseline determined using the fluctuation criteria, and the fluctuations determined for the custom author crowds, can be compared to each other. In this way, a difference in fluctuations, called a fluctuation magnitude difference, may be determined as between the multiple custom author crowds. Returning to the root beer example, the multiple custom author crowds may all be the target of a content item for root beer or may receive a promotional coupon for root beer. The custom author crowds may then be monitored to determine how, and when, the fluctuations of the custom author crowds change based on the content item or coupon. In some embodiments, one custom author crowd may have a different fluctuation than another custom author crowd. The resulting fluctuation magnitude difference in the crowds may indicate to a user the relative effectiveness of the content item or coupon on a particular custom author crowd.

In addition to comparing multiple custom author crowds to each other to track performance and return on investment for marketing and other author engagement, a custom author crowd may also be compared to a pre-defined or curated social community, following, or fan base. In other words, a custom author crowd may be compared to another crowd that serves as a baseline or other reference point for the custom author crowd. A pre-defined or curated social community may be all the authors on a social media website or may be all the authors the system has access to. A pre-defined or curated social community may also consist of a list of current paying customers or former customers, followers or fan bases of the user's social media accounts at a given point in time, followers or fan bases of specific competitors' social media accounts or other stakeholders' social media accounts, pre-existing whitelists of authors who have or are thought to have certain characteristics, influencer lists, custom audiences that may have been generated, procured, targeted, or otherwise leveraged in other marketing or campaigns, or any other applicable user listing. Another pre-defined or curated social community may be determined similar to a custom crowd (by searching based on demographics, posts, etc.) but may be saved in the system perpetually and thus is characterized as a baseline pre-defined social community.

Advantageously, the system provides the ability to effectively interrelate paid audiences (the targets of marketing/paid/sponsored content) and owned audiences (those authors who already follow a company/product/brand account such as a Twitter™ account and are members of the company/product/brand's community). To this end, the system can show after a campaign that more of the authors in a targeted crowd have joined the following (by following the company/product/brand Twitter™ account, for example). This can be referred to as a crowd penetration metric. One by one the system can show authors in a custom author crowd being captured. Advantageously, when an author follows a brand's Twitter™ account, the author is more likely to see unsponsored content posted on the brand's account. This is helpful because the unsponsored content is essentially free to post. Thus, by keeping track of how many authors the brand has captured, it can also keep track of the relative effectiveness of their unsponsored content as well.

In other illustrative embodiments, multiple custom author crowds may be monitored for various and different fluctuation criteria as desired by a user. For example, a user may designate one fluctuation criteria as Brand A Root Beer and may designate a second fluctuation criteria as Brand B Root Beer. Both fluctuation criteria may be applied to the same custom author crowd. Accordingly, the custom author crowd may be monitored to determine not only how the custom author crowd is fluctuating in its sentiments toward Brand A Root Beer, but also how the custom author crowd's sentiment is fluctuating with regard to Brand B Root Beer. This may be useful if Brand A Root Beer and Brand B Root Beer are competitors for the same customers. Similarly, the multiple fluctuation criteria (Brand A and Brand B) may be applied to multiple custom author crowds. Multiple custom author crowds may be selected on the basis of demographics, behavioral tendencies, lifestyle indicators, or other specific market segmentation criteria, thus allowing a user to monitor and compare how fluctuations regarding Brand A and Brand B root beers are changing in particular demographic groups or target market segments.

In an illustrative embodiment, the search criteria that specifies a custom author crowd may include multiple criteria of varying types. For example, the search criteria may include authors in the custom author crowd who have authored a social media post about cheese and who live in the state of Wisconsin. In another example, the search criteria may include authors in the custom author crowd who have liked a particular celebrity (or joined an affinity group for a particular celebrity), such as Harry Houdini, and authored a social media post about magic within the last 6 months. In another example, the search criteria may include authors in the custom author crowd who have purchased tea online in the last year and live in or around Boston, Massachusetts. In another example, the search criteria may include authors in the custom author crowd who have authored a post on social media about their cell phone provider and who have authored a post on social media about their subscription to pay television within the last year.

In an illustrative embodiment, multiple custom author crowds may be specified and stored utilizing systems and methods disclosed herein. In this embodiment, two different custom author crowds may include common authors. In one embodiment, no action is taken by the system with regards to the common authors. That is, the common authors are left in both custom author crowds. In an alternative embodiment, the system automatically identifies that the two custom author crowds both include at least one common author. In one embodiment, the system may present a user with a choice to remove the common author from one of the custom author crowds. In another embodiment, the system may automatically remove the common author from one of the custom author crowds. For example, the system may automatically remove the common author from the larger of the two custom author crowds. In another example, the system may automatically remove the common author from the custom author crowd that was specified later in time as opposed to the first custom author crowd. In another example, the system may automatically detect when an author in one custom crowd joins another custom author crowd specified by the user. This may include custom author crowds defined by the parameters described herein, a specific social fan base, etc. It should also be noted that the ability of the system to detect the presence or absence of an author or authors in one or more crowds may not be limited to one social networking site. In one example, the system may automatically detect when an author joins or leaves a crowd on social networking site A and social networking site B. This may help aid the user in making a determination that it may be more effective to target this author or group of authors with different messages on different social platforms.

When determining a fluctuation within a custom author crowd, various methods and systems may be used. In an illustrative embodiment, content generated by the authors that causes the system to measure a fluctuation may include a status update. For example, an author may post a status update on a social networking site. The status update may include text, image, audio file, video, symbols, and/or universal resource identifiers (URIs) that comprise a fluctuation criteria. That is, the author's status update may include text or a URI the system is looking for to measure a fluctuation. In another embodiment, the fluctuation criteria monitored for and measured may be an online purchase of a good or service. Another fluctuation criteria may be signing up for an account with a website or web service. Another fluctuation criteria may be selecting a URI, or selecting a URI sent to an author through a messaging service or e-mail. Another fluctuation criteria may be viewing a particular webpage, or viewing a particular webpage for a certain amount of time. Another fluctuation criteria may be authoring a social media post or posts including a particular text, image, video, audio file, symbol, or URI more than once, or any other predetermined number of times. Another fluctuation criteria may be authoring multiple social media posts that contain a particular text or URI that are related. For example, the fluctuation criteria may cause the system to monitor for and measure a number of authors who post about peanut butter and jelly. Another fluctuation criteria may be joining a particular affinity group or liking a particular fan page for an item, brand, celebrity, sports team, interest, etc. Other potential fluctuation criteria may include following another author, retweeting and/or sharing a post from another author, liking an author, commenting on the posts of other authors, or interacting with another author who is also a member of the same custom author crowd. Fluctuation criteria could also be an interaction with a posted or promoted post authored by the user of the system. In other words, if an entity posts sponsored content, the fluctuation criteria may be designed to measure how a custom author crowd interacts with and based on that sponsored content. This can help inform or alert the user to authors' subsequent activity to a user action or interaction. Another fluctuation criteria may involve images or characteristics of images (including image sequences such as videos) such as a certain image, style of an image, item or product in the image, text or signs in an image or appended to an image, person in the image, number of people in the image, age of people in the image, geographic locations of where the image was captured, lighting levels of the image, whether the image was indoor or outdoor, time an image was originally captured, food in an image, resolution of an image, style of an image (i.e., selfie, landscape, panoramic, portrait, square, filter type, video or still, etc.), duration of an image sequence or video, duration of a particular individual or object's presence in an image sequence or video, text or hyperlinks that appear in a video or are appended to a video, or any other characteristic of an image, image sequence, or content of an image. In using such fluctuation criteria for an image, the system May utilize photo analysis software such as facial recognition, image recognition, metadata reading or other analysis on images that are searched. These and other related fluctuation criteria may also be applied to video content and/or other rich media. Other fluctuation criteria could also take into account the user's activity over a certain time period with respect to desired fluctuation criteria in the custom author crowd. In other words, the system may enable the user to determine the total behaviors, postings or promoted messages that were directed to each custom author crowd as a proportion of the user's total outreach efforts, and the resulting viewership and interactions made by authors with that user's content as a proportion of the total interactions made by the custom author crowd during a specific time period. These fluctuation criteria may provide signals related to the efficiency of the user's messages and strategy to reach and engage each custom author crowd, as well as signals related the "mindshare" or brand awareness the user possesses within a custom author crowd.

In an illustrative embodiment, the system may be configured to send out alerts based on the tracked fluctuations of custom author groups. For example, if a fluctuation meets a certain magnitude, an alert may be sent to a user. In just one example, 10% of a custom author group may meet the fluctuation criteria and an alert may be sent. The 10% that meet the fluctuation criteria may be a total of the custom author group, or may be an additional 10% beyond those in the custom author group that had already met the fluctuation criteria (in other words were already a part of the community) when the custom author group was created. Additional alerts may be subsequently sent out when other predetermined thresholds are met. Thresholds may be other varying numbers than the example 10%. Additionally, discrete numbers may be used instead of percentages. For example, alerts may be sent out for every 1,000 authors who meet the fluctuation criteria. Aggregations of these alerts and other real-time performance measures may be viewable to the user in the system.

In another illustrative embodiment, alerts may also be sent out based on fluctuation magnitude differences between multiple custom author groups. For example, the system may encourage a race between multiple custom author groups to meet fluctuation criteria. For example, a user may define two custom author groups that have different authors. The two custom author groups may be assigned to different marketing teams to target. The same fluctuation criteria May be measured for each of the custom author groups. In this way, the marketing teams could compete at getting their respective custom author groups to meet the fluctuation criteria. Alerts may be sent when custom author groups hit certain predetermined thresholds of meeting fluctuation criteria similar to the embodiments described above. In another embodiment, alerts may be sent out when one custom author group surpasses another custom author group in number of authors that meet the fluctuation criteria. In this way, the marketing teams or other users would know who is in the lead for marketing success and would know in real time when they had surpassed another group. Advantageously, this may incentivize marketers or other users to do a better job when reaching out to, engaging, and marketing to the various authors in the custom author groups.

In another illustrative embodiment, alerts may be sent out regarding negative fluctuations. For example, if, in a custom author crowd, a predetermined number of authors disassociate themselves with an affinity group, an alert may be sent to a user to indicate a negative fluctuation. Similarly, in another example, the system may sense negative language toward a product, person, etc. in a post authored by someone in the custom author crowd. These alerts may be triggered by activities of a custom author crowd that take place on multiple social networking sites, websites, or apps.

In another illustrative embodiment, alerts may be sent out based on temporal factors. For example, an alert on the progress of fluctuation criteria for a custom author crowd may be sent out every two weeks, regardless of whether any predetermined threshold is met. In another embodiment, an alert may be sent out if a predetermined threshold for fluctuation is met within a certain time period. For example, if the fluctuation of a custom author crowd based on a particular fluctuation criteria reaches 3% in one month, an alert may be sent out.

In another illustrative embodiment, the system may be configured to alert the user when certain thresholds are met in relation to his or her own outreach efforts that may or may not be directed at specific custom author crowds. For example, the user may want to know when he has attained 10% mindshare within a specific custom author crowd or when he has achieved 95% awareness in a custom author crowd. In other example, the user may want to know when his organic marketing program is at peak efficiency whereby the timing and frequency of his postings elicits the best response rate or desired fluctuation criteria within a custom author crowd.

In another illustrative embodiment, the system may be configured to alert the user when an author of particular importance engages in certain online activities or authors a post with certain words, images, videos, audio files, symbols, and/or URIs. For example, a user may want to know if a famous celebrity authors a post about a user's product. In one specific example, an under the weather President of the United States may tweet positively about the efficacy of a particular brand of facial tissue. The brand manager of that particular brand of facial tissue may wish to be alerted that such a high profile individual is evacuating his or her nasal cavities upon their particular brand of paper handkerchiefs. The system can alert the brand manager thusly. The brand manager may then choose to promote such a post using the system or take other action based on the alert stemming from the President's now famous nasal mucus.

Alerts and other monitoring of fluctuation criteria may also be done in real-time or near real-time. This would allow users to immediately know when thresholds for fluctuation criteria are met. In other terminology, a user may immediately be notified when a certain number of authors from social media sites have been activated or join a community based on their authored posts or other online actions. Advantageously, alerts and other real time notifications may trigger increased content item spending overall, as entities are able to better capitalize on trends and current states of engagement from authors. It may even be the case that entire marketing programs are based off of notification to these fluctuation criteria.

In another illustrative embodiment, the fluctuation criteria may be used to track performance or success of a rival. For example, if someone sells a particular type of electric car, they may wish to know how many of their targeted custom author grouping is interested in other brands of electric cars or even gasoline cars. Accordingly, a user may set fluctuation criteria related to a competitor product as well as their own. In another embodiment, the seller of electric cars may set a fluctuation criteria to monitor and track authors in the custom author group who author or engage with content relating to all cars. In this way, the seller may be able to determine a proportion of those authoring content about cars generally that are interested in electric cars, or are interested particularly in the seller's type of electric cars. In this way, users may determine subsets of custom author crowds. Advantageously, the subsets can be dynamic, as they can be set to track the fluctuations of the custom author crowd in any of the ways disclosed herein. In another illustrative embodiment, this subset can be treated as a separate custom author crowd. In other words, the definition of a custom author crowd may be analogous to a fluctuation criteria. In this way, a custom author crowd may only include, for example, any author that has posted something about a car within the last year. If an author originally is considered part of the custom author crowd, but a year goes by without that author having again posted something about a car, that author may be removed from the custom author crowd.

In another illustrative embodiment, the fluctuation criteria and activation of users in a custom author crowd can be used to trigger the publication or use of content such as marketing. For example, the system may automatically post a content item that is viewable to the custom author crowd when that custom author crowd reaches a particular fluctuation criteria. In just one specific example, when at least 15% percent of authors in a custom author crowd have authored a post on social media about football, the system may automatically publish an online content item to that custom author crowd for a paid television subscription service that offers football programming. In another embodiment, the 15% threshold being met in the custom author crowd may also trigger content items for other custom author crowds about football programming, or may trigger content items for all authors about football programming. In another illustrative embodiment, the automatically published content item may only be published for the authors who have authored a post about football. The automatically published content items may come in many various forms. The content items may be through sponsored content on a news or pseudo-news website, may be native ads or editorial content on a social networking site or other web property, may be a standard banner content item, may be recommended and sponsored content on a shopping website, may be an e-mail, may be a paper mail content item, may be a sponsored video, may be a video featuring a product (product placement or subliminal marketing), or any other type of marketing. In another embodiment, the promoted content may be a post of one of the authors. For example, if an author posts a favorable comment about the aforementioned paid television subscription service that offers football programming, that post may be promoted. Promoting such a post may involve prioritizing the post for other social media users and authors so that it is seen more often than another post.

In another embodiment, the system may not execute the paid content item or unsponsored posting on the user's behalf. Instead, when the fluctuation criteria are met the system may signal an opportunity or recommend that the user engage in a certain behavior or publish content to capitalize on the favorable conditions within the custom author crowd. In such an example, execution of these actions may be facilitated by sending the fluctuation criteria and other data from the disclosed system into another software application or set of software applications via a customizable application program interface (API). Examples of integrated software applications may include but are not intended to be limited to a social media management system, a social media publishing or engagement platform, a programmatic marketing platform, a real-time bidding (RTB) platform, a demand side platform (DSP), a supply side platform (SSP), a marketing exchange, a content management system, a community platform, a marketing automation system, or any other data management, analysis and optimization, web, Internet, or marketing technology platform. In other words, the system disclosed herein may be an enabler of other functions. For example, the execution of campaigns may not be done directly via the present system. That is, it may be the case that this system leverages an API that plugs into well-established social media management systems like HootSuite™ that offer post scheduling and publishing functionality. The system may also send data into programmatic ad platforms. In another example, the user could be presented with an example post or a pre-written post to publish based on the opportunity. In yet another example, the user could author their own post or content item based on the opportunity. In another embodiment, the user may be able to start a process to publish a post or content item, but the post or content item may have to be approved by another party before it is posted. For example, if the user is a marketing agency, the agency's client may approve the post or content item. In another example, the post or content item may be approved by the social networking website where the post or content item will be published.

In another embodiment, the system may be utilized by users to support forecasting activities. That is, the activation history of one or more crowds with the system may be leveraged in conjunction with planning exercises of the user and/or to help predict when certain crowds or crowd members will engage in certain behaviors or post certain types of content on a particular medium. Such trend data and other variability measures may be helpful when planning campaigns that may span multiple online platforms, or even promote offline sales. In an illustrative embodiment, the user may want to know how many authors have been activated about root beer in Milwaukee, and the rate at which this fluctuation criteria was met over the last year. The user may then leverage this data and other measurements to predict how many authors may be activated at a later time to plan his or her content item or engagement campaigns accordingly. In another example, if the fluctuation criteria deals with new product availability in-store, the user may leverage this data to inform demand planning and the stocking of merchandise at retail stores within the most activated geographic regions. In that way, crowd activity may help optimize inventory levels and allow the user to better react to shifts in product or service demand.

Advantageously, the systems and methods disclosed herein allow social networks, websites, owners and operators of application software (apps), and other content publishers to monetize their user bases and monetize their user bases more effectively. In other words, the system and method disclosed herein allows a social network to easily track how content item and other targeted content or actions are affecting their user base. Armed with the quantifiable and objective information of how well targeted content and marketing is received and reacted to by a social network user base, a social network can charge higher prices to entities that utilize the social network for marketing or promoting content. A social network may also be able to charge higher prices to marketing customers based on the set of crowd attributes specified by the user or by the number of concurrent custom author crowds that are searched, targeted and tracked by the user. The customization of the systems and methods disclosed herein also offers a significant advantage. The system creates the opportunity for the social network to create a new economy around their inventory, i.e., their authors, where the network may define new ways in which to bid up the most sought-after or niche prospective crowds. It can be an exchange where the economy is based on expression and action, and it may cost entities more to reach the best authors or crowd segments in the highest demand.

Advantageously, the system functionality described herein may help social networks and other content publishers surface important new paid and organic marketing opportunities for their entities, as well as valuable remarketing opportunities for entities to target the same crowd again with a new message at a certain time. Furthermore, another advantage of this system may be the improvement of the social networks' own user experience through better native marketing and more relevant ads. The provision of these and other benefits may help attract new entities or retain existing entities. The system may also increase the size and frequency of ad buys, and incentivize the perpetuation of spend among current marketing customers. Performance metrics that may be generated by the system related to the activities of a custom author crowd and the user may provide deeper context around campaign engagement. Such insights, that may be both qualitative and quantitative in nature, may enrich the return on investment that a social network is capable of demonstrating to a prospective entity and thusly differentiate that social network's ad products from those of other social networks. That is, a social network using the system and methods described herein may be at an advantage in securing greater marketing spend or "share of wallet" due to the richness and effectiveness of the marketing experience provided.

Advantageously, the system may also interrelate success within the curated social communities and target custom author crowds of the user. In other words, the system may be able to drive and illustrate valuable social media community growth for the entities showing that he or she is capturing the attention and hearts of more of the users he cares about through various programs and initiatives. This advantage also applies to other user lists described elsewhere in the present application that may include current customers, competitors' fan bases, influencers, etc.

Another advantage of the system and method disclosed herein can be exploited by brands and brand managers, as well as by their marketing agencies. Similar to how social networks may exploit the systems and methods disclosed herein, brand managers and other marketers may be able to cause maintained or increased spending in content items with the objective and quantifiable information that can be provided by the system and methods disclosed herein. This advantage is important because other forms of tracking the effectiveness of marketing (such as counting the number of clicks a banner content item on a web page gets) may not as accurately reflect the effectiveness of marketing. For example, robots may represent some of the clicks on a banner content item or other promoted content and may not accurately reflect the number of human users that select a content item. Furthermore, a human user may accidentally click a banner content item and may never be truly interested in the content item. The present system and method adds more contextual information and gives quantifiable gains and returns for social media marketing.

Another advantage of the systems and methods disclosed herein is that the systems and methods may be applied across multiple social networks and platforms. That is, authors may be linked across multiple social networking websites and platforms, so that any post they author or association they make can be attached or linked to that particular author. The system may compile data and authors from multiple websites or other data sources. The system may automatically associate accounts or authors from different social media sites with each other by matching characteristics of the authors or accounts, such as an e-mail or phone number. Other information may also be acquired that can be used by the system to link multiple accounts from different social networking sites together as one author in the presently disclosed system. In another embodiment, some accounts on some social networking websites may not be easily linked to accounts on another social networking site, and those accounts may be treated as different authors. It may even be the case that a particular custom author crowd consists of entirely different authors or is simply treated as a separate population of unique authors on two or more social networks. That is, an inquiry into multi-platform crowd membership may or may not be executed by the user. Such a system may also help entities and brand managers make informed decisions about social networks that are more effective and cost effective as compared to other social networks. For example, an entity may focus a campaign on social network A and social network B. The results of the system and methods disclosed herein may identify that social network B showed a greater return by measuring the fluctuation criteria for the custom author crowds in social network A and social network B. Further, entities may be able to learn that marketing on one social network may be measured and effected through a second social network. For example, an entity may sponsor an article on a social news website, and authors may tweet about the article separately. The present system allows an entity to capture both how many people read the article on the social news website and how many authors tweeted about the article on a separate social news website.

Advantageously, the system and methods disclosed herein allow a user to ensure that the audiences they are reaching are the audiences actually targeted by the marketing. This is important because some metrics for achieving engagement and marketing success may not accurately reflect whether a target market is being reached. For example, a web page may get 1,000 new likes in a month, but if 200 of those likes are from authors who do not reside in a country where the user does business, those 200 likes are not particularly useful or helpful to the user.

The present system and methods may also allow a user to more effectively benchmark and determine the total number of their target authors for a given promotion that exist on a marketing medium relative to a defined control group or the total population of authors. That is, an entity may more easily gauge their position relative to a denominator, or average score, and whether they are indeed capturing greater shares of the total available pie. The entity may also determine a relevant range, and scale, on which to assess their performance. Entities have increased visibility into how effective their efforts are in each segment of authors they are targeting over time on social media. Marketing effectiveness is achievable in a context-sensitive, quantifiable way that provides market share-like performance indicators on social media.

The system and methods disclosed herein also advantageously exploit people's natural desires for competition, achievement, and closure. By allowing users to see real-time or near real-time results and return on ad spending and quantifying those results, users may feel a better sense of accomplishment, and the feedback of return on investment may encourage even more aggressive marketing and ad spending.

In an illustrative embodiment, the system and methods disclosed herein may include a software platform that provides flexible and continuous search, refinement, and tracking of target user segments for the purpose of improving marketing effectiveness and providing a gamified marketing experience on a given digital or social medium. The system and methods may provide utility regardless of the entity's firm size or familiarity with social media, digital and social media marketing, best practices in ad targeting, and other web or social media-related technologies.

In an illustrative embodiment, a user can custom-define target segments or crowds of Internet authors on any given digital or social medium. That is, the user may perform digital or social market segmentation by identifying customized groupings of authors that represent a desired target market segment. Search result groupings and sizes are returned according to the user's custom search and targeting criteria made via a search interface.

In another illustrative embodiment, a user can store and refine conceptualizations of these custom-defined and generated author groupings on a dashboard. These crowds can be managed, edited, and constantly updated according to data from the ongoing, or past, activities of the authors contained within these specifically-defined segments (profile information, follower characteristics, text expressions, other web and social behaviors, etc.), as well as from other manual actions executed by the software user.

In another illustrative embodiment, a user can engage in a gamified setting when monitoring and benchmarking all activities concerning a targeted crowd of social media authors. Entities will gain more contextually relevant information about author engagements with their ads and other content, and be alerted of any other desired actions made by authors within their custom-defined crowds. As such, the entity will be able to gauge how he or she is performing in a crowd relative to others (given his or her current level of investment and activity) and have continuous visibility into the degree of success in capturing greater shares of the entire available pie within the frame of specific marketing goals or key performance indicators.

In an illustrative embodiment, the system and methods provide a search tool and interface for returning groupings of similar authors on electronic media based on user-defined criteria in a custom search query. These custom-defined and retrieved groupings of authors constitute a unique target market segment or crowd, which is specified by the user of the system. A user may make a custom search query—through either free-form text in a search bar or by selecting from available check boxes—and look for unique objects and characteristics contained within author records on any participating marketing medium, e.g., a social networking platform. Upon entering a custom search query, the system can return results of groupings of similar authors. In other words, the system may not return a list of every single author that meets the custom search query criteria. Instead, the system may return groups of authors that are similar. For example, a user may search for authors that have authored posts about baseball in the last two months. The system may return groupings of similar authors. In another example, the system may display and return groupings of authors based on a particular baseball team mentioned by the authors. The system may display that 300 authors mentioned Team A, 400 authors mentioned Team B, 200 authors mentioned Team C, etc. In other words, the user may specify a certain market or industry, and have the search results be grouped according to different brands within that industry. How the authors are grouped may be specified by the user. That is, the groupings may be custom defined. In another example, the groupings may be based on what social network the author is a part of. Using the previous example, the system would therefore return results showing, for example, that 700 authors on Facebook™ have posted about baseball in the last two months, 900 authors on Twitter™ posted about baseball in the last two months, 300 authors posted on Instagram™ about baseball in the last two months, etc. Other ways the authors may be grouped is how recently they posted about the selected custom search query. For example, in the baseball example, authors may be grouped together as those who have posted about baseball within the last day, the last week, the last month, and the last two months. In another example, the authors may be grouped by the frequency with which they meet the selected custom search query. For example, authors may be grouped together who have posted about baseball in the last two months once, 2-3 times, 4-5 times, and 6 or more times.

The system can then match all of the authors in the database of that particular medium (or collection of media) who possess the specified criteria and return these results to the user. The retrieved list of authors from search will be "tagged" as members of a population of interest, which collectively represents a crowd the user wants to target. Targeting criteria may include keywords selection, image and video shares, demographic and psychographic attributes such as age, gender, geography and interests, or other behaviors and actions, historical activity, mobile device, and other metadata indexed during a specific time period that will allow for the grouping of similar authors. The system can also work within the constraints of pre-defined targeting criteria offered and controlled by a marketing medium whereby the process of searching and grouping authors to be served a content item is executed solely by the marketing medium. That is, the system may be used in more of a customizable, self-service fashion by the entity or be implemented by the owner of the marketing medium. As an example, the system may be provided to an entity who can perform searching and analysis of custom author groups, or the system can be used by a social network to demonstrate the effectiveness of the content items on their network. In other words, the system can be used by entities, on behalf of entities, or as marketing to entities.

For example, a digital marketer for a department store may want to find all authors on Twitter™ who have mentioned Beyonce Knowles and that department store in the past year, like music, and used shopping-related keywords after December 1st. The entity may call this segment, "Beyonce Holiday Shoppers." The logic in performing this search is that this population might be interested in an offer for Beyonce's new gift set that month. The user enters this search query just like in any other engine, for fast results on segment size and the collection of anonymized or non-anonymized authors who match the search criteria. For the purpose of this user's query, the retrieved author grouping represents the total possible market for the campaign. It provides a quantifiable denominator for determining baselines and benchmarks, and for calculating percentage changes and other measurements over time. This is especially useful if the entity wishes to send another promoted or unsponsored offer at a later time to this exact same population of authors, or to see if they organically take some specified action of interest absent any stimulus from the user. In this way, the system allows the entity to group authors in similar contexts and view them in custom categories or crowds that are meaningful to any given marketing program. This new crowd can then represent the target audience to which the entity may direct a promoted ad or even unsponsored content via e.g., a social networking site. Although this crowd was produced by specific search criteria at a fixed point in time, the social activities of authors contained within this crowd will change, and new data on their activities will accumulate as time goes on.

The system also provides for visualizing search results in discrete groupings based on similarities of contained records. In addition, these author groupings will be visualized and labeled with characteristics, as opposed to returning a list of individual line item results like a traditional search engine would produce. In this way, a user will not be overwhelmed by the results of numerous individual author records. Furthermore, a third party action may not affect the ranking or relevance of search results presented to the user. Existence in a grouping is determined solely by the presence or absence of searched attributes in author records, which is determined by author activity and characteristics, and available metadata in the author database.

The aforementioned search and segmentation process can take place on a purely anonymous or personally identifiable basis, or any combination thereof, in accordance with accepted privacy regulations and standards, privacy measures taken by individual users, and the policies of websites, social networking platforms, and other marketing media who possess the user data.

Query results from a search for authors can be saved for reference and subsequent analysis. Author lists produced from a custom search query can be transferred onto what will be referred to as a whitelist for the purpose of ongoing measurement and later action. In essence, storing and monitoring of custom search results (which happen to be social media authors) can be directly paired with the search functionality.

In searching and archiving the author search results, the system effectively can return a digitized representation of a total crowd. It allows the user to perform accurate segment sizing and to define and better understand a crowd that he or she is uniquely interested in at a given time. Author records contained within the author database that match the user's search parameters can each have unique identifiers, which enable the demarcation and aggregation processes to work easily when subsequently using the whitelist and/or custom author grouping. Furthermore, this may allow an author to be part of a custom author grouping by merely associating or storing the unique identifier in a custom author grouping. This allows a custom author grouping to contain unique identifiers instead of all information relating to an author. When searching for authors, the system may have no results or database or populated list of authors at all stored before the search. Once search parameters are entered, the system searches the internet or various databases (such as a social media database) for the authors and populates the search results.

Since an entity's targeted crowds are dynamic in nature, the user of the system disclosed herein may want to have searches and groupings for crowds—these author search results—archived and available to reference at a later time. The system allows the user to create his or her own personal query-specific "index" of author groupings that can be extracted from the results of the search. That is, the system provides the user with the option to populate one or more custom crowds with the results of a search query. The capability allows a user to store, archive, refine and manually adjust results returned by his or her custom search query. This conceptualization of a crowd of target authors can be viewed and edited in its original form at any time.

For example, a corporate communications professional at a large retail store may want to search for and identify the crowd on Twitter™ who is currently talking about the retailer's recent credit card breach. These authors may be a high priority for the retailer to reach with an apologetic message immediately following the incident. However, six months later, the user may want to follow up and send these exact same authors a different message: perhaps an exclusive, early-bird offer to a brand new clothing line for the purpose of re-engaging these potentially unhappy consumers. That is, the system may be utilized for remarketing campaigns to specific user groupings.

In this way, the ability to tag and store crowds will allow the entity to gain greater context into the behavior of the crowd he or she wishes to curate and nurture over time—whether it is tracking responsiveness to a promotion or any other author behavior. These crowds, in turn, can be constantly refreshed and updated as new authors join Twitter™ or any other social networking site, talk about a topic of interest, are served content items, etc. What's more, the entity can make comparisons and gauge performance measures exclusive to his or her specifically selected crowds—rather than on the marketing channel spend holistically. With this system, the entity can view performance measures on specific crowds, specific campaigns, and the channels they are on.

A user of the systems and methods disclosed herein can also append an aforementioned crowd with proprietary data or third-party audience data related to the target author base that is not produced by the system. For example, a user could upload customer relationship management (CRM) data on individual authors, which may consist of e.g., Twitter™ IDs or other unique author identifiers accumulated from other marketing programs. This capability provides the user with flexibility to add, change, or supplement author records that share similar characteristics with the crowd produced by system and methods disclosed herein.

A crowd may not be subject to any change to a search engine-indexing algorithm, availability of metadata, or by third party activity, which would consequently affect the organic ranking and presence or absence of individual search result listings. Systems and methods disclosed herein may also not be limited by the type of item or items returned on a search engine results page: these may include pages, documents, descriptions, links, usernames, and any other unique records matching the user's search query, which may be useful to archive and reference in original form at a later time.

Such a system and method as disclosed herein may be used for activating or activated crowd members. Returning to the "Beyonce Holiday Shoppers" example from above, some of the crowd members may view an article about a bizarre scandal with the pop star and take to Twitter™ with their commentary. The author postings are not responding to content from the user, but are nonetheless activated to the topic of Beyonce Knowles. So, in this way, any data on reach (impressions), behavioral engagement (likes, retweets, shares, follows and unfollows, photo uploads etc.), text expressions, image or video content shares, and even sentiment data on those mentions (positive, negative or neutrality of posts) can all fuel for social activation metrics. In various embodiments, authors may be activated by either online or offline stimuli. These metrics can indicate a good time to market certain products, services, content, etc.

Metrics actually measured by the system with regards to its crowds can be varied and may be calculated in different ways. Although not a comprehensive list of possible metrics, some example measurements include: (1) crowd to community ratio: size of the crowd vs. size of current follower base; (2) crowd penetration: percentage of crowd members contained in a specific social community or following (this can also be similarly tracked as a "crowd to community conversion rate" or a "crowd acquisition rate"); (3) crowd conversion rate: % of crowd members that opt into a marketing offer/total number of crowd members who saw the offer; (4) crowd activation rate: # of crowd members that take action of interest/total crowd size (this can also be tracked as the "activated" community for something within a crowd); (5) crowd engagement: # of crowd members engaging with paid or organic content/total overall engagement (this can also be tracked in raw numbers); (6) crowd impressions: # of crowd members to whom paid or organic content was displayed/total overall impressions (this can also be tracked in raw numbers); (7) percentage change in crowd size: (# of crowd members at time 1−# of crowd members at time 0)/# of crowd members at time 0; (8) multi-crowd membership: method for finding duplicate records by matching unique author identifiers contained within multiple custom author crowds; (9) crowd awareness: percentage of crowd members who are likely to be aware of a brand, product, or service based on the activities and postings of these authors during a certain time period. Measurements and metrics specific to one crowd may be compared to total measures that may include actions taken by authors who are not represented in the crowd; (10) crowd fatigue: calculated by determining the number and frequency of content items delivered to a singular crowd during a specific time period relative to other crowds (this measurement may also be expressed in percentage or proportional terms); (11) crowd attraction: percentage of total online activity and interactions of the authors within a custom author crowd that concerns or is directed to other members of the custom author crowd or related to the defined characteristics of the crowd—this may be considered a measurement of the degree of attraction within a custom author crowd on a social platform relative to other crowds (this may also be expressed as an evaluation of inter-crowd communicativeness); (12) crowd focus: percentage of behaviors, postings, or promoted messages by the user that were directed to each custom author crowd based on the user's total online activity (this may also be expressed in relation to the user's other custom author crowds).

A user may also use the crowd as a basis for gaining other statistics specific to his target audience, including: other embodiments of awareness measurement, marketing fatigue or other embodiments of reach and frequency capping within a crowd, content relevance, affinity strength and comparisons, word-of-mouth marketing gauges, advocacy and loyalty indicators, or any range of behaviors and expressions—even sharing activity of different media files by these authors. The system may also facilitate event-based alerting and quantifiable aggregations of activities in a custom crowd. For example, when an author uses a specific keyword or hashtag in a tweet, the user of the system may be alerted. He may also be alerted to and may be capable of viewing the total number of such instances that occurred with respect to his crowd over a certain time period. The user of the system could specify these specific events of interest when setting up a custom search monitor.

Advantageously, the system allows for ongoing measurement of a specified crowd as expressed in terms of the share of total authors that exist in that crowd. The user experience with the system may create the feeling of a challenge for the user: it is theoretically feasible to capture one's entire target segment and to verify those successes through various data points, quantitatively. That is, there are a total quantifiable number of target authors, which can be compared against benchmarks and current activity levels. Each step closer to the total may be treated as a minor victory in itself. To accomplish this, the system may include a user interface or dashboard-like visualization to display the various crowds, calculations, comparisons, current user performance, benchmarks, comparison to benchmarks, past user performance, competitor performance, user activity levels, user investment or content item spending, and/or comparison to other investment levels by competitors or industry averages.

An illustrative embodiment may also include notification of action or actions taken by an author contained within a custom-curated crowd that signals fluctuations of interest in the overall performance of that crowd. The addition of gamification techniques to this software platform allows for the creation of thresholds through performance metrics that can provide an entity with a sense of achievement and closure—even addiction—with respect to his or her current level of author activity relative to known baselines, benchmarks, and short and long-term goals.

After creating one or more crowds, a user may choose to proactively target authors by engaging in any variety of direct marketing activities or by leveraging specific ad products offered by the marketing medium. The user may also choose to passively view the organic activity of authors in those segments. In either approach, the system allows the user to monitor subsequent author activity within his or her crowd after the crowd was created.

The system also provides a customizable keyword and behavior-based alerting and aggregate measuring mechanism to the user when any of the authors included in a custom-defined crowd executes an action or behavior of interest on any range of digital or social media. That is, only the activity of the authors specifically contained within a user's crowd will trigger an alert and impact overall performance measurement. The system provides a huge range of possibilities regarding the behaviors that an entity may be interested to track and aggregate within a crowd and/or to receive a direct notification. For example, an author could mention a specific news event or brand name, engage with a piece of unsponsored content such as a Facebook™ message, visit a website, click on a paid content item, follow a corporate Twitter™ handle, or engage in any other behavior on a digital or social medium specified as an action of interest by the user. Recall a previous example: a user may want to know when his or her custom-defined crowd of "Beyonce Holiday Shoppers" takes an action. In an example apart from engagement with paid content items, the user may want to know when a crowd member elects to follow a certain Twitter™ account. That is, the user is interested in each instance an author contained within this particular crowd takes this singular action. In this case, the system will determine the baseline number of users within the custom-defined crowd who follow the Twitter™ handle identified by the user. Every subsequent follower the user receives to that account will be similarly searched against the index to see if the author is a tagged user contained within the user's custom crowd. Say, for example, @jehanhamedi just followed the user's desired Twitter™ handle. If this name exists in the custom crowd, the user will be alerted that he has captured a new member of his target market.

The system may also display performance metrics on a custom-curated crowd. The number of alerts accrued for a particular event or action taken by authors in a custom segment may also be tracked and quantified into perpetuity. In doing so, the aggregation of these events or alerts will serve as a quantifiable representation of performance in that custom-curated segment of Internet authors. These alerts can continue into perpetuity until the crowd containing all tagged authors of interest is deleted from the software platform.

Consider, again, that the act of following a Twitter™ handle is the user's behavior of interest. Let's say that the user's custom-curated crowd consists of 100 target authors and, at the present time, 10 of them follow him on Twitter™. Therefore, the user's current crowd penetration (which may also be described as a variant of a "follower rate") with this crowd is 10%. Fast-forward one week: The user posts several new messages through his Twitter™ account, including a sponsored one, and sees that he has gained new followers. In this example, the user received 10 new followers in the week. The system searches for these authors within the user's crowd and identifies that 5 of the new followers are indeed contained within the crowd. As a result, crowd penetration has now grown to 15% (15/100) in that segment. The user can view this percentage change in performance in that crowd and even compare it to other crowds he may have defined with the system. This figure may also be compared to the total number of that account's followers to determine, for example, the proportion of crowd members to general followers at a given time.

In this way, the system allows for the creation of benchmarks and other comparative measures to gauge, on a continuous basis, the user's performance in a target crowd at the present time relative to the total performance that is achievable in that crowd, i.e., the denominator, at that time. By calculating percentage changes and other raw measurements over time with respect to each of these actions, the user is able to create and monitor his or her own custom, market share-like performance indicators for each author crowd he or she wishes to target.

The system may also include capabilities for benchmarking and ongoing monitoring. The system can provide a display that acts as a dashboard monitoring the activity of the entity's crowds on each marketing medium. This display may show any type of market share-like key performance indicators (KPIs), such as percentages of awareness, purchase intent, content relevance, crowd membership growth and crowd penetration, marketing fatigue, priming indicators, degree of topic or brand affinity, loyalty rates, crowd acquisition rates, etc. With each of these metrics there may also be a display of an average score and an anonymous industry leader to help instill a sense of competition and encourage continued activity. The conceptualization of a leaderboard may also use identifiable information of top achievers. Relative rankings in achievement may be determined with respect to performance in the same custom author crowd, a specific category of interest, within some competitor set, or along any other dimension that is capable of being tracked via fluctuation criteria. One or more of the user's crowds may also be included in these achievement calculations. As described, the system can also quantify overall success rates in each custom crowd. In this way, the user can view success measures at a current activity level in relation to the total possible pie at a given time. By having visibility into total possible achievement or relative achievement to other crowds or other entities, the entity may be incentivized to increase spend levels until reaching 100% or whatever his or her goal may be.

The present system and methods may advantageously help an entity think—"Okay, if I am only at 40%, where do my competitors stand?" I don't want to be out-performed; I want to own the greatest consumer mindshare of the people I care about and keep moving the needle towards 100%, before they do." In that way, the system creates and fosters an arcade-like experience that gamifies marketing expenditures and the user experience for the software user. This model can create value for all parties involved. An entity may use the present system instead of something like sponsoring a TV show or a golf event where the entity has less information on who actually sees and engages with his or her campaign.

In an illustrative embodiment, multiple custom author groupings are compiled and available for selection or display. In this embodiment, statistical summaries of each of a user's custom author groupings can be displayed on one web page or a set of web pages, or within the interface of a software product. Such a collection of one user's custom author groupings may be referred to as a whitelist. The user may use that whitelist as the sole and primary content source for analysis, allowing the user to track and perform measurements on the behaviors, expressions, and other fluctuations of that specific group of authors (i.e., the search results) in isolation. By performing measurements on the activities of a specifically-defined crowd, the user is able to determine, for example, the size of a certain crowd of users or discussion group, as well as determine applicable audience activation and user acquisition metrics for that crowd. These measurements will help the user learn if his or her recent initiatives on any one or set of social media channels are positively impacting these metrics. These metrics can be referenced on an ongoing basis into the future.

The user may also decide to set up new programs around a crowd that may include executing targeted marketing via a social network's marketing platform or any other marketing optimization, analysis, engagement, or technology platform described elsewhere in the present application that may specifically be directed to reach this author set. The user may set up activity-based alerts to notify him of certain actions taken by these crowd members or changes within the size and makeup of the crowd overall. For example, did people in the custom crowd, Pepsi™ Lovers, just follow @Coca-Cola™ on Twitter™ after they saw a promoted ad for Diet Coke™? The user can also compare and contrast other custom author groupings he or she created along any of the same measures.

The system allows for comparison and tracking of two or more customized crowds against each other for the purpose of determining relative achievement and performance. This comparative measure may be a quantification of a desired action taken by certain authors in a crowd against the total crowd or comparisons along any of the metrics aforementioned. For example, the user may decide to compare two custom defined crowds versus viewing one in isolation to determine relative activation (or author acquisition) levels with respect to the total number of social media authors in a crowd or against any other control group. The user may also wish to determine whether he or she was more effective in activating crowd A or crowd B after executing campaigns during a certain time period. In another embodiment, the user may not even define these comparison crowds himself with the system; there may be potential to compare a user-defined crowd to a crowd defined by other users of the system or to a sample crowd or any collection of sample crowds already provided by the system.

In an illustrative embodiment, a marketing campaign executed directly through or in conjunction with the system by a user may be used to capture more customer data. For example, a promotion on a social network may allow authors to participate in the promotion upon giving the user an e-mail address or mobile phone number to receive the offer. This may be an effective way to acquire new information about authors in the crowd which can be stored in customer relationship management (CRM) databases maintained either in the present system or separately by the user.

Advantageously, the present system and methods allows a user to target and analyze the activities of authors across multiple social networks such as Facebook™, Twitter™, Tumblr™, LinkedIn™, Pinterest™, etc. As a result, the system also has the capability of facilitating both the targeting and retargeting of social media users across multiple social networking sites. That is, finding and serving promotional content to the same person when he or she is on each platform. The system can thus function as a neutral third party platform between social networks where neither party needs to worry about divulging valuable information to the other, yet both parties benefit from increased marketing interest. The user of the system can create custom, storable audience segments on a third party platform.

FIG. 1 is a block diagram illustrating computing devices 100 and 145 and a server 125 that may be used in accordance with an illustrative embodiment. In alternative embodiments, fewer, additional, and/or different components may be included in the system. In FIG. 1, there is a computing device 100, a server 125, and a computing device 145. The computing device 100 includes a processor 115 that is coupled to a memory 105. The processor 115 can store and recall data and applications in the memory 105. The processor 115 may also display objects, applications, data, etc. on the interface/display 110. The processor 115 may also receive inputs through the interface/display 110. The processor 115 is also coupled to a transceiver 120. With this configuration, the processor 115, and subsequently the computing device 100, can communicate with other devices, such as the server 125 through a connection 170.

The server 125 includes a processor 135 that is coupled to a memory 130. The processor 135 can store and recall data and applications in the memory 130. The processor 135 is also coupled to a transceiver 140. With this configuration, the processor 135, and subsequently the server 125, can communicate with other devices, such as the computing device 100 through a connection 170.

The computing device 145 includes a processor 155 that is coupled to a memory 150. The processor 155 can store and recall data and applications in the memory 150. The processor 155 is also coupled to a transceiver 160. The processor 155 may also display objects, applications, data, etc. on the interface/display 165. The processor 155 may also receive inputs through the interface/display 165. With this configuration, the processor 155, and subsequently the computing device 145, can communicate with other devices, such as the server 125 through a connection 175.

The devices shown in the illustrative embodiment may be utilized in various ways. For example, any of the connections 170 and 175 may be varied. Any of the connections 170 and 175 may be a hard wired connection. A hard wired connection may involve connecting the devices through a USB (universal serial bus) port, serial port, parallel port, or other type of wired connection that can facilitate the transfer of data and information between a processor of a device and a second processor of a second device, such as between the server 125 and the computing device 145. In another embodiment, any of the connections 170 and 175 may be a dock where one device may plug into another device. While plugged into a dock, the client-device may also have its batteries charged or otherwise be serviced. In other embodiments, any of the connections 170 and 175 may be a wireless connection. These connections may take the form of any sort of wireless connection, including but not limited to Bluetooth connectivity, Wi-Fi connectivity, or another wireless protocol. Other possible modes of wireless communication may include near-field communications, such as passive radio-frequency identification (RFID) and active (RFID) technologies. RFID and similar near-field communications may allow the various devices to communicate in short range when they are placed proximate to one another. In an embodiment using near field communication, two devices may have to physically (or very nearly) come into contact, and one or both of the devices may sense various data such as acceleration, position, orientation, velocity, change in velocity, IP address, and other sensor data. The system can then use the various sensor data to confirm a transmission of data over the internet between the two devices. In yet another embodiment, the devices may connect through an internet (or other network) connection. That is, any of the connections 170 and 175 may represent several different computing devices and network components that allow the various devices to communicate through the internet, either through a hard-wired or wireless connection. Any of the connections 170 and 175 may also be a combination of several modes of connection.

To operate different embodiments of the system or programs disclosed herein, the various devices may communicate in different ways. For example, the computing device 100 and computing device 145 may download various software applications from the server 125 through the internet. Such software applications may allow the various devices in FIG. 1 to perform some or all of the processes and functions described herein. In another embodiment, the computing devices 100 and 145 may operate using internet browsers that can access websites that perform the functionality of any of the systems and methods disclosed herein. For example, a user of the system and methods disclosed herein may be able to use a computer, laptop, smartphone, etc. to access web pages provided by the system. The user could perform searches for custom author groups, save custom author groups, view analysis of those custom author groups, etc. as disclosed herein using only a website with various interfaces and web pages. Additionally, the embodiments disclosed herein are not limited to being performed only on the disclosed devices in FIG. 1. It will be appreciated that many various combinations of computing devices may execute the methods and systems disclosed herein. Examples of such computing devices may include smart phones, personal computers, servers, laptop computers, tablets, blackberries, RFID enabled devices, or any combinations of such devices.

In one embodiment, a download of a program to the computing device 100 involves the processor 115 receiving data through the transceiver 120 from the transceiver 140 of the server 125. The processor 115 may store the data (like the program) in the memory 105. The processor 115 can execute the program at any time. In other embodiments, the computing device 145 may download programs in a similar manner to the client-device. In another embodiment, some aspects of a program may not be downloaded to the computing device 100 and computing device 145. For example, the program may be an application that accesses additional data or resources located in the server 125. In another example, the program may be an internet-based application, where the program is executed by a web browser and stored almost exclusively in the server 125. In the latter example, only temporary files and/or a web browser may be used on the computing device 100 or computing device 145 in order to execute the program, system, application, etc.

In yet another embodiment, once downloaded to the computing device 100, the program may operate in whole or in part without communication with the server 125. In this embodiment, the computing device 100 may access or communicate with the server 125 only when acquiring the program, system, application, etc. through the connection 170. In other embodiments, a constant or intermittent connection 170 may exist between the server 125 and the computing device 100. Where an intermittent connection exists, the computing device 100 may only need to communicate data to or receive data from the server 125 occasionally.

The configuration of the server 125, the computing device 100, and the computing device 145 is merely one physical system on which the disclosed embodiments may be executed. Other configurations of the devices shown may exist to practice the disclosed embodiments. Further, configurations of additional or fewer devices than the ones shown in FIG. 1 may exist to practice the disclosed embodiments. Additionally, the devices shown in FIG. 1 may be combined to allow for fewer devices or separated where more than the four devices shown exist in a system.

In some embodiments, the devices shown in FIG. 1 may be existing devices that are owned or possessed by a user, author in a crowd, other author, system administrator, etc. using the embodiments disclosed herein. In such an embodiment, the author or user may only need to download software (e.g., an application or 'app') to the existing device to execute the various embodiments disclosed herein. In other embodiments, specialized hardware may be used by the author or user that is specifically designed to perform or execute the various embodiments disclosed herein. As such, hardware may be specifically designed to provide such capabilities.

In an illustrative embodiment, the computing device 100 is used by a user of the system and methods disclosed herein. The computing device 100 may be used to search for authors, create/specify custom author groups, and review the results of the monitoring of those custom author groups. A user may further utilize the computing device 100 to implement marketing campaigns, or interact with and otherwise create content for the internet that may not explicitly be marketing, or perform any other functions as disclosed herein. The computing device 145 is used by an author. The author can join social networks, follow Twitter™ handles, like pages, send messages and chats, receive e-mail, author online content, navigate the internet, make purchases, trigger events, etc. or perform any other functions as disclosed herein. The server 125 facilitates and hosts the system and methods that are disclosed herein. It may store for the custom author groupings, calculate and monitor those groupings, and provides the computing device 100 access to the features that are disclosed throughout the present application.

Figure 2:
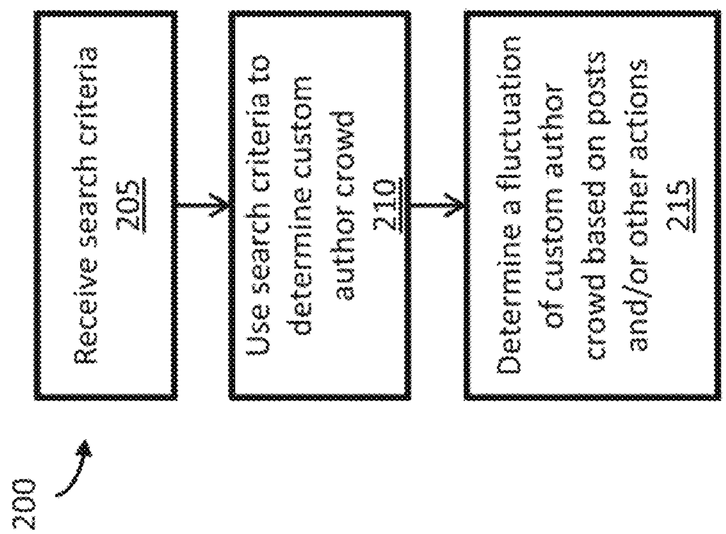
FIG. 2 is a flow diagram illustrating a method of determining fluctuations in a social media custom author group in accordance with an illustrative embodiment.

FIG. 2 is a flow diagram illustrating a method 200 of determining fluctuations in a social media custom author group in accordance with an illustrative embodiment. In alternative embodiments, fewer, additional, and/or different operations may be performed. Also, the use of a flow diagram is not meant to be limiting with respect to the order of operations performed. In an operation 205, the system receives search criteria for authors. The search criteria may be a demographic or user profile trait of an author, a subject matter of a social media post authored by an author, a related subject matter of a predetermined number of social media posts authored by an author, a group association of an author, an affirmative activity executed through the online social network of author, or any other search criteria as discussed elsewhere in the present application. The search may be performed by a user entering text on their own through an input such as a keyboard. The search may also be performed by selecting parameters from a menu such as a drop down menu. For example, a user may be able to select a desired gender, age, home state, time zone, etc. of an author from a drop down menu. Additionally, the search could be automatically populated based on past searches. In other words, a user may be able to save past searches so that he or she does not have to remember the exact parameters he or she has previously entered. This may allow the user to run the same search again or use the populated information to ensure that they do not run the same search again. The user may want to tweak the search only slightly. In one embodiment, the search fields may be automatically populated with the most recent search parameters. In another embodiment, the interface for searching may also include a button that the user can select to clear or set to a default of the fields that are used for searching. In yet another embodiment, the user may be able to view a news feed-like thread of recent custom author crowd searches performed by other users of the system. The user may also apply filters with certain criteria to limit the amount of content that is played.

In an operation 210, the search criteria is used to determine a custom author crowd. In this embodiment, the search criteria can be used to perform a search after receiving an input from the user. If the search results are to the user's liking, another input can be received from the user to indicate that the user would like a custom author crowd created. The custom author crowd is created. The user may be presented with an opportunity to name the custom author crowd, making it easier to identify who is in the crowd, why the crowd was searched or created, or some other identification that the user specifies. The custom author crowd specified at 210 is saved and monitored based on fluctuation criteria.

In an operation 215, the system determines a fluctuation of the custom author crowd based on author posts and/or other actions. The other actions may be a variety of author actions such as retweeting, liking, commenting, purchasing, or any other author action or interaction as disclosed and discussed throughout the present application. These posts and actions signal when an author or number of authors has been activated within the crowd. Thus, fluctuation criteria specified by the user may also be referred to as activation criteria.

Figure 3:
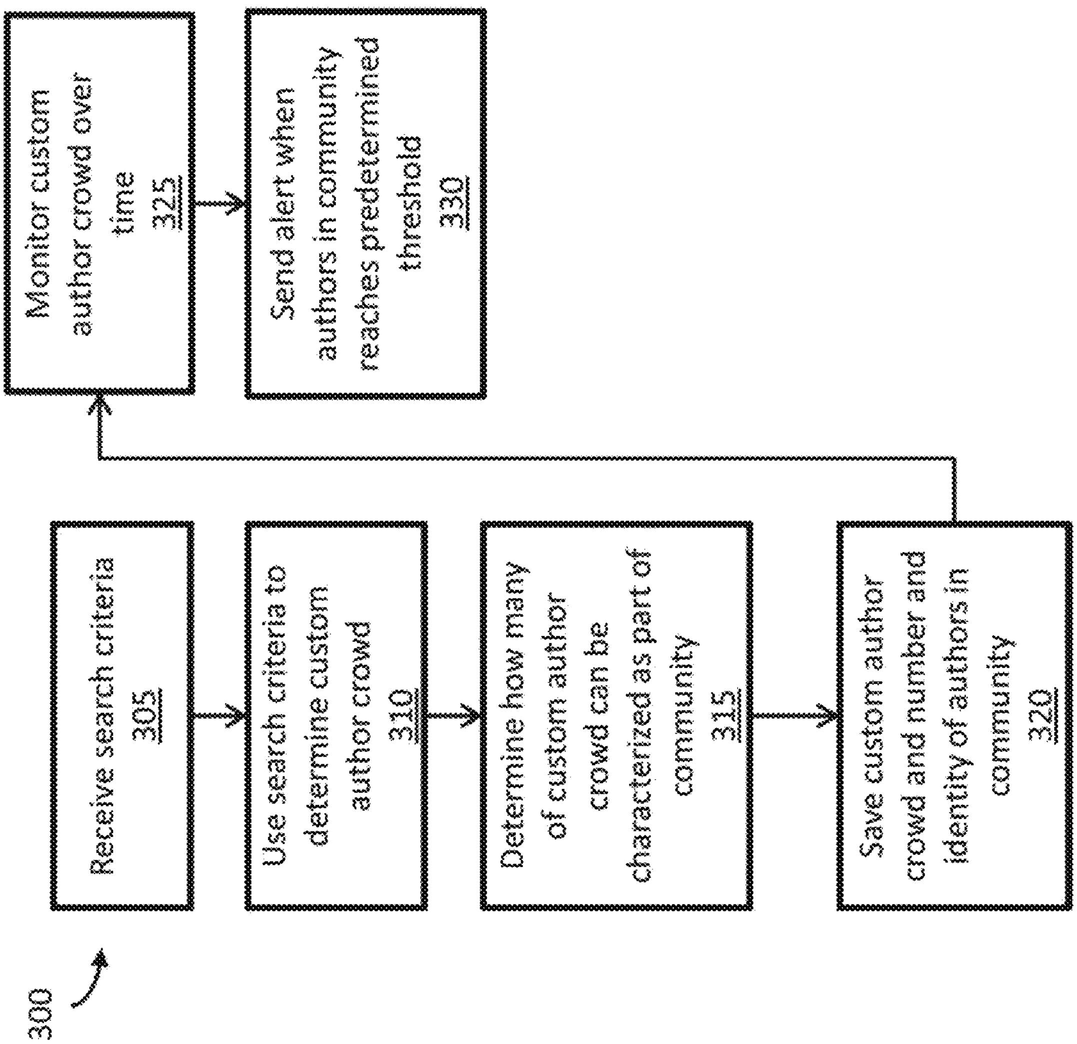
FIG. 3 is a flow diagram illustrating a method of monitoring a social media custom author group and sending an alert when fluctuations of author postings reach a predetermined threshold in accordance with an illustrative embodiment.

FIG. 3 is a flow diagram illustrating a method 300 of monitoring a social media custom author group and sending an alert when fluctuations of author postings reach a predetermined threshold in accordance with an illustrative embodiment. In alternative embodiments, fewer, additional, and/or different operations may be performed. Also, the use of a flow diagram is not meant to be limiting with respect to the order of operations performed. In an operation 305, the system receives search criteria from the user. This search criteria is used to search for authors or groups of authors. The search criteria may be a variety of demographic factors or online actions or interactions performed by the author, as discussed at length elsewhere in the present application. Similarly, in an operation 310, the search criteria is used to determine a custom author crowd as discussed throughout the present application.

In an operation 315, the system determines how many authors in the custom author crowd can be characterized as being a part of a community, where the parameters of the community is specified by the user of the system. In other words, the system is determining a magnitude or number of authors in the custom author crowd that have met a fluctuation criteria. For example, the fluctuation criteria may be whether an author has liked a sponsored page for pizza. In the operation 315, the system determines how many authors in the custom author crowd already have liked the sponsored page for pizza. In this embodiment, the search criteria and the fluctuation criteria are different. In an alternative embodiment, the search criteria and the fluctuation criteria may be the same.

In an operation 320, the system saves the custom author crowd and the number and identity of authors that were determined to be part of the community in the operation 315. In this embodiment, all authors in the custom author crowd and their associated profiles are saved as the custom author crowd. In an alternative embodiment, identifiers of each account are stored in a list that serves as the custom author crowd. Any other information relating to the authors may be stored separately but can be referred to using the author identifiers. Similarly, an identification or identifier may be stored with the author account or identifier that indicates whether a particular author is part of the community or another social following. In this embodiment, the system determines if the authors in the custom author crowd are part of one community. In an alternative embodiment, the system may determine if the authors in the custom author crowd are a part of multiple communities. For example, the system may determine whether the authors in a custom author crowd have been activated, that is, if the authors have posted something indicating their interest or activation in a subject. For example, authors may like, follow, author, etc. a post about fashion. The system may then determine how many authors in the custom author group have been activated to be interested in fashion (part of the fashion community). The system may, in addition to the more general fashion community, determine how many of the authors in the custom author group are part of a particular fan base. For example, the system may determine how many of the authors in the custom author group have liked, followed, etc. the clothier J. Crew™. In this way, a user may be able to determine how many authors in the custom author group are activated, and how many authors are in an owned community such as a particular brand. The system may utilize this functionality to compare the owned community to the broader community. In other words, the system could determine what proportion of the activated community is part of a particular owned community. In this way, the user may be able to more accurately track their own brand (or owned community) or that of a competitor.

In an operation 325, the custom author crowd is monitored over time to determine whether authors in the custom author crowd meet the fluctuation criteria and are subsequently characterized as being part of the community. In an operation 330, an alert is sent to the user when the number of authors in the community has reached a predetermined threshold. In an alternative embodiment, the user is alerted whenever an author in the custom author crowd is characterized as joining the community. In another alternative embodiment, the user is alerted based on a schedule. For example, the alert may be sent once a week and update the user on how many authors have left, joined, or stayed in the community. Other various information or statistics may be included with the alert.

Figure 4:
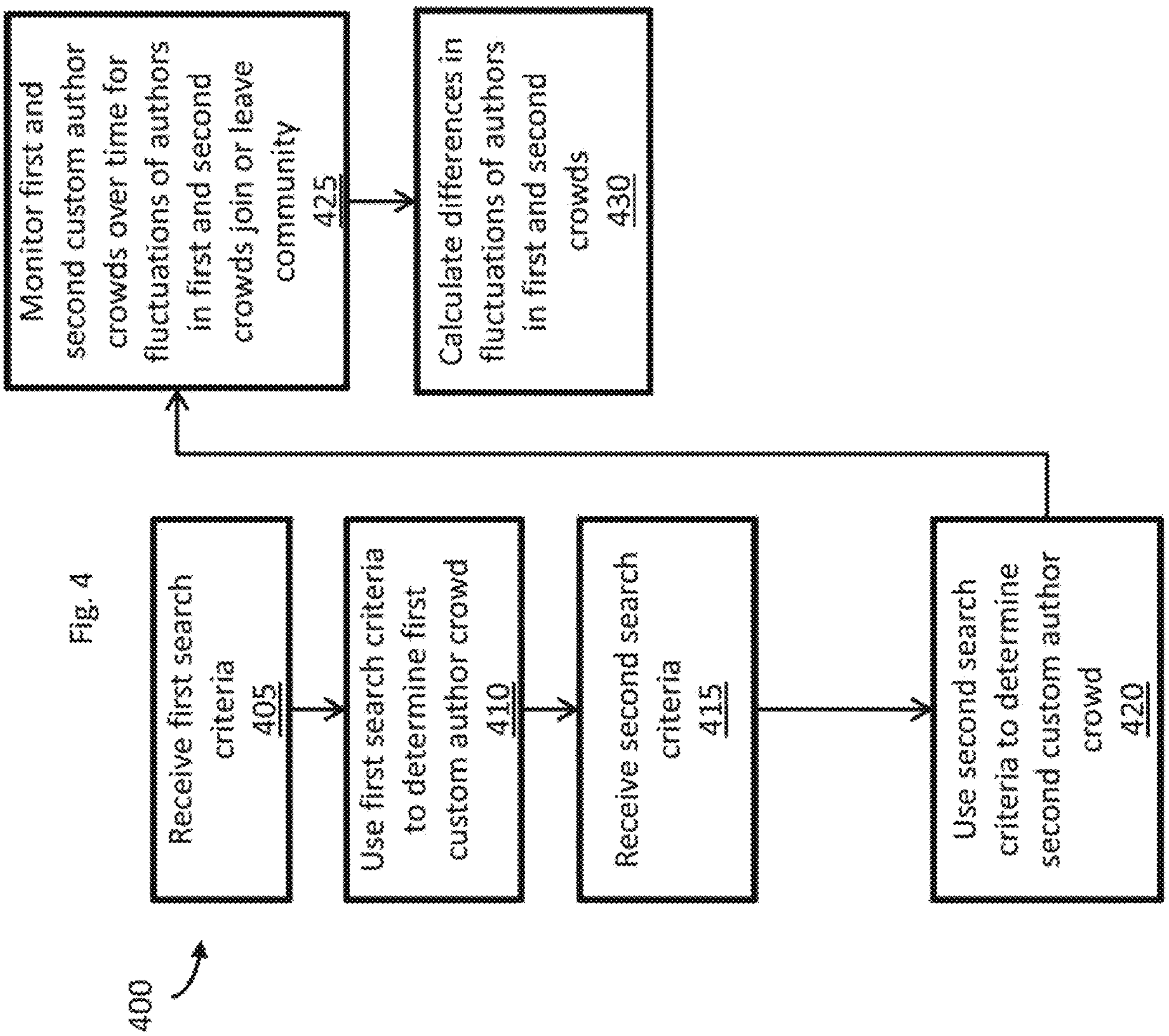
FIG. 4 is a flow diagram illustrating a method of comparing fluctuations in multiple social media custom author groupings in accordance with an illustrative embodiment.

FIG. 4 is a flow diagram illustrating a method 400 of comparing fluctuations in multiple social media custom author groupings in accordance with an illustrative embodiment. In alternative embodiments, fewer, additional, and/or different operations may be performed. Also, the use of a flow diagram is not meant to be limiting with respect to the order of operations performed. In an operation 405, a first search criteria is received from a user. The first search criteria may be received similar to the search criteria discussed above with respect to operation 205 of FIG. 2.

In an operation 410, the first search criteria is used to determine a first custom author crowd. The determining of the first custom author crowd may be performed similar to the determining a custom author crowd 210 discussed above with respect to operation 210 of FIG. 2.

In an operation 415, a second search criteria is received from a user. The first search criteria may be received similar to the search criteria discussed above with respect to operation 205 of FIG. 2. In an operation 420, the second search criteria is used to determine a second custom crowd. The determining of the second custom author crowd may be performed similar to the determining a custom author crowd 210 discussed above with respect to operation 210 of FIG. 2.

In an operation 425, the system monitors the first and second custom author crowds over time for fluctuations of authors in the first and second custom author crowds who over time leave or join a community, i.e., become activated. The monitoring may be similar to operation 215 of FIG. 2 and/or operation 325 of FIG. 3. In this embodiment, the fluctuation criteria monitored for is the same for both the monitoring of the first custom author crowd and the second custom author crowd. In an alternative embodiment, a different fluctuation criteria may be used or specified for the first custom author crowd and the second custom author crowd. The monitoring determines how many authors in each crowd have joined or left the community, and at what time these events occur.

In an operation 430, the system calculates differences in fluctuations of authors in the first and second custom author crowds joining or leaving the community. In other words, the fluctuations within the first and second custom author crowds are compared. The differences in fluctuations of the first and second custom author crowds may indicate that certain strategies or content proved more effective at getting one crowd over the other to join the community (i.e., to become activated within some specific context), to opt into a marketing offer, to join the fan base of specific social account, etc. In an alternative embodiment, many other statistics, comparisons, and ratios may be calculated as disclosed herein. In another embodiment, the system may compare and monitor more than two custom author crowds.

Figure 5:
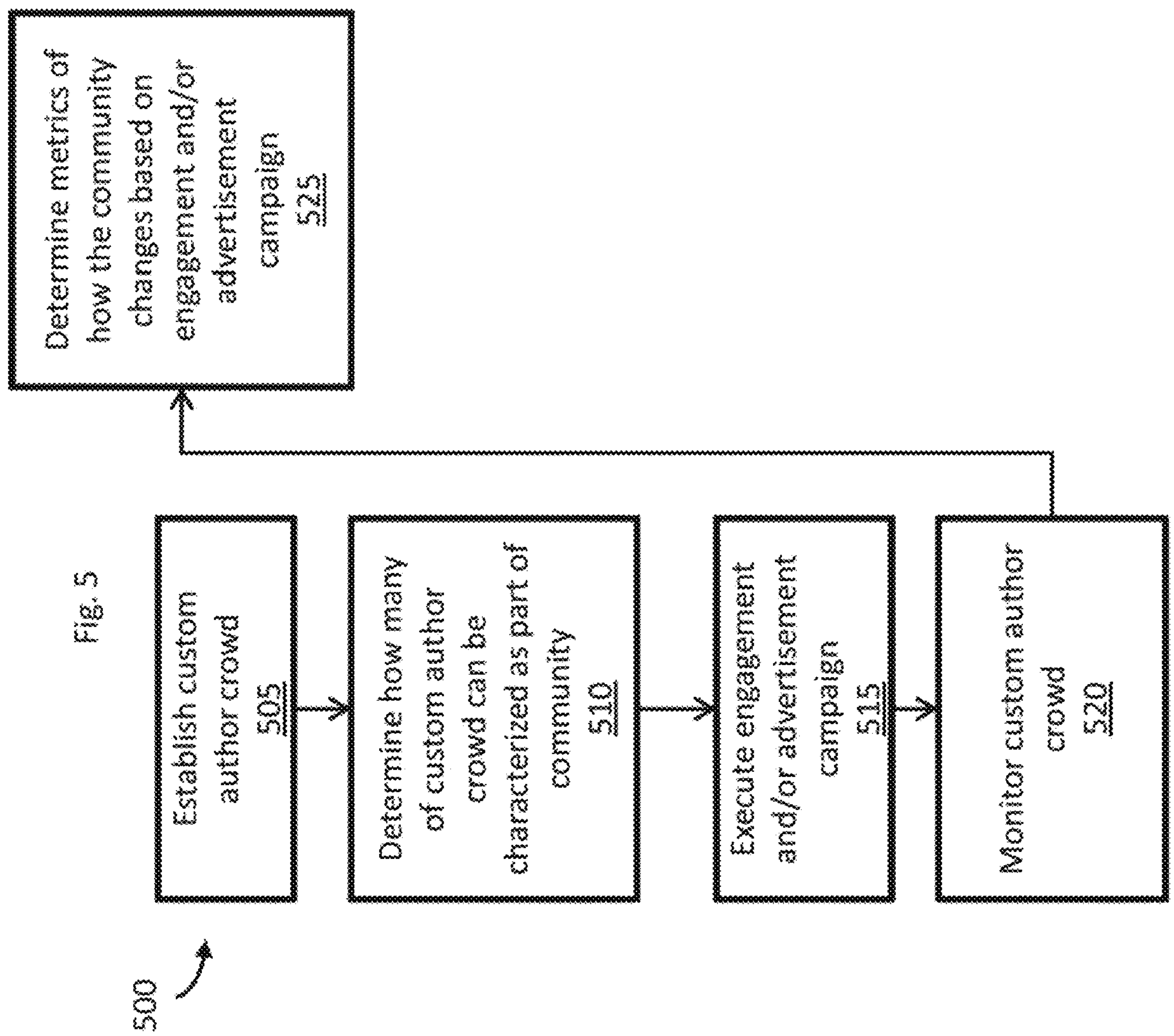
FIG. 5 is a flow diagram illustrating a method of measuring effectiveness of an engagement and/or a campaign based on the monitoring of a social media custom author grouping in accordance with an illustrative embodiment.

FIG. 5 is a flow diagram illustrating a method 500 of measuring effectiveness of an engagement and/or content item campaign based on the monitoring of a social media custom author grouping in accordance with an illustrative embodiment. In alternative embodiments, fewer, additional, and/or different operations may be performed. Also, the use of a flow diagram is not meant to be limiting with respect to the order of operations performed. In an operation 505, a custom author crowd is established. The establishment of a custom author crowd may be performed using steps similar to operations 205 and 210 of FIG. 2. In an operation 510, the system determines how many of the authors in the custom author crowd may be characterized as part of the community. This determining may be similar to operation 315 as discussed above with respect to FIG. 3.

In an operation 515, an engagement and/or content item campaign is executed by or in conjunction with the system disclosed herein. This may be running a content item, posting sponsored content online, sending out print media, running a commercial, tweeting something from an official account, prioritizing particular content on a social networking website, retweeting a post, or any other sort of engagement or content item campaign that can be executed online or offline. In this embodiment, the user executes the engagement and/or content item campaign using the present system. That is, the user may be able to post and or schedule to be posted content items, sponsored content, unsponsored content, etc. utilizing the system. In an alternative embodiment, the engagement and/or campaign may be executed outside the framework of the presently disclosed system and methods. That is, the user or party related to the user may execute an engagement and/or content item campaign utilizing a different electronic system, or the campaign may not be online at all. For example, the user may execute an engagement and/or content item campaign on a different website, may send out paper mailers, e-mails, run a promotion in stores for or related to a product or products, etc.

In an operation 520, the custom author crowd is monitored for one or more fluctuation criteria. The fluctuation criteria may be interacting with sponsored content such as commenting on, reading, or retweeting the content. The fluctuation criteria may also be joining an online affinity group or following a particular individual or brand page or account. Another monitored fluctuation criteria may be whether the author actually authors a post regarding sponsored content, the campaign, or the subject of the campaign. Other fluctuation criteria that may be monitored are disclosed throughout the present application.

In an operation 525, the system determines metrics of how the community and/or the custom author group changed based on the monitored fluctuation criteria. This can inform the user how effective the engagement, marketing and/or marketing program was. The metrics may be many various calculations as described herein. For example, the metrics may include number of authors who joined the community during the content item campaign or a set amount of time after the campaign, percentage change of authors in the custom author crowd who joined the community, number of authors who joined a corporate fan base or a celebrity brand endorser's following, etc.

Figure 6:
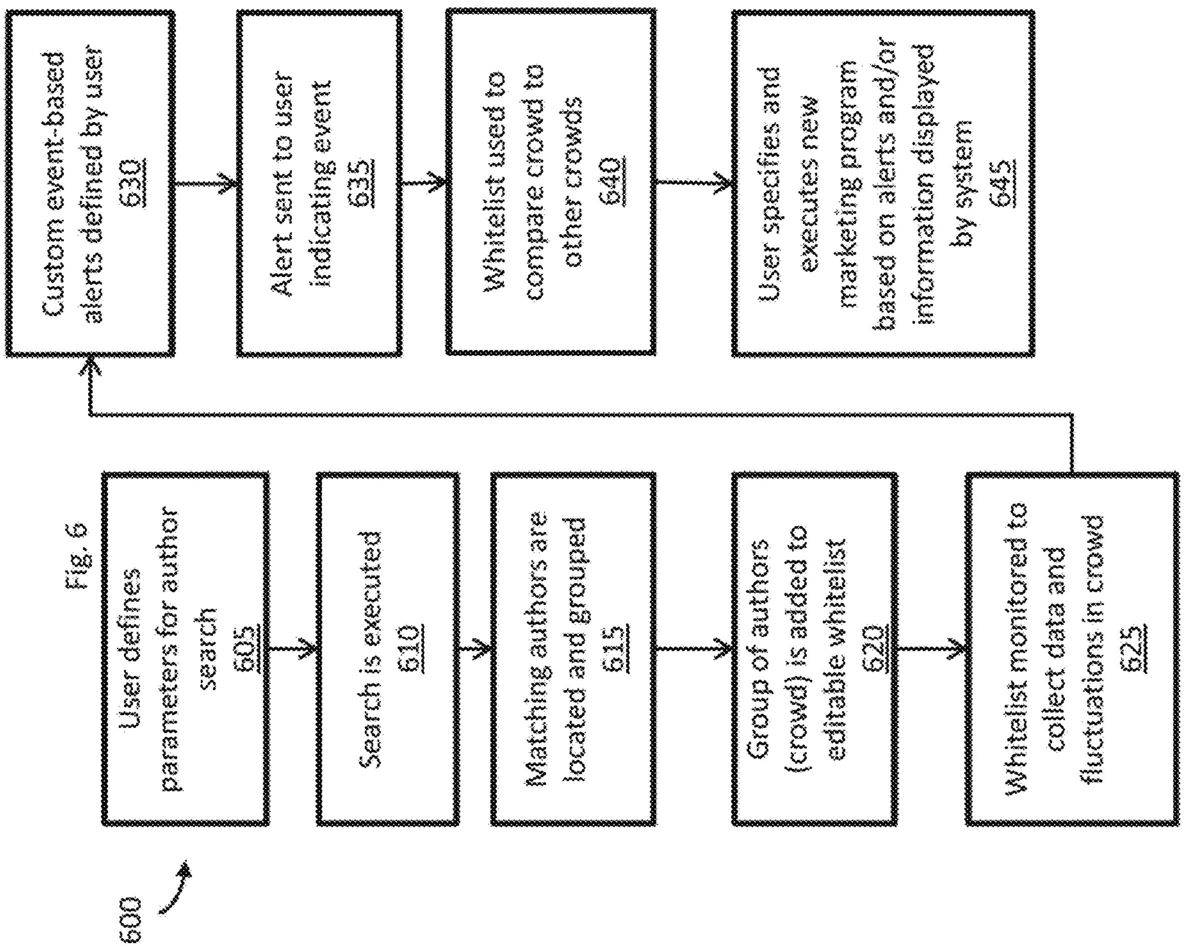
FIG. 6 is a flow diagram illustrating a method of defining, monitoring, and using a custom author grouping to run a marketing campaign in accordance with an illustrative embodiment.

FIG. 6 is a flow diagram illustrating a method 600 of defining, monitoring, and using a custom author grouping to run a marketing campaign in accordance with an illustrative embodiment. In alternative embodiments, fewer, additional, and/or different operations may be performed. Also, the use of a flow diagram is not meant to be limiting with respect to the order of operations performed. In an operation 605, the user defines the parameters for an author search. In an operation 610, the search for authors is executed based on the parameters defined by the user.

In an operation 615, the authors that match the search parameters are located and grouped together in a custom author crowd. In an operation 620, the group of authors, or crowd, are added to an editable whitelist. The whitelist, as described elsewhere in the present application, is a list (including an interface) where different custom author crowds can be viewed, sorted, configured, deleted, etc.

In an operation 625, the whitelist (and subsequently the custom author crowds stored therein) is monitored to collect data and fluctuations in the crowds based on fluctuation criteria determined by the user and/or preset in the system. In an operation 630, custom, event-based alerts are defined by the user. For example, the user may wish to receive an alert whenever an author leaves his or her community. In another example, the user may wish to receive an alert whenever a particular fluctuation criteria changes such that when a predetermined threshold (which can be set by the user) is reached the alert is sent. In another example, the user may wish to get an alert if the fluctuation criteria for one custom author crowd is a higher value than the fluctuation criteria for a second custom author crowd. Other alerts may be set and defined, such as other alerts as defined elsewhere in the present disclosure.

In an operation 635, an alert is sent to the user indicating that an event has occurred. Stated another way, the system has determined that a particular fluctuation criteria is met as defined by the user, so an alert is automatically generated and sent to the user by the system. The alert may be sent in varying ways. For example, the alert may be sent by instant message, short message service (SMS) text, e-mail, tweet, fax, message system viewable in the presently disclosed system interface, etc.

In an operation 640, custom author crowds are compared to other custom author crowds in the whitelist. These comparisons may be done using varying methods as disclosed throughout the present disclosure. Additionally, the comparison may include calculations of particular metrics or indicators based on the comparisons.

In an operation 645, the user can specify and execute a new marketing program based on alerts received and/or additional information displayed by the system. In other words, the user can start a campaign based on an alert received. The user may also wish to access the features of the full system and may view additional information that informs their decision of whether to initiate a content item campaign and what type of campaign that might be. Additionally, the user may have pre-programmed one or more campaigns into the system or another adjoining system or systems that could be accessed by the system disclosed herein. In this embodiment the user can then just select that campaign to commence as soon as the user receives an alert. In an alternative embodiment, a content item campaign may be initiated by the system automatically when a certain alert condition exists. In this embodiment, the alert sent to the user may include the alert information as well as a notification that the content item campaign was initiated automatically. In another embodiment, the execution of a content item campaign may be facilitated via an application programming interface (API) that may allow the user to integrate intelligence generated and provided by this system into other cross-channel marketing strategies and initiatives that may leverage other software applications. Thusly, the presently disclosed system may also aid the user in optimizing other programs that are not entirely managed via this system. In other words, the user may be able to access other programs through interactions between the presently disclosed system and another program. In this example, the user may wish to execute a marketing program. A link to marketing program software may be inserted into an interface for a software, application, or web page. Although the marketing plan in this example is not executed by the present system, capabilities to execute marketing plans can be incorporated into the present system.

The methodology and components described herein may be used for broader applications that combine search functionality, whitelist creation, and custom measurements and alerts to form a custom search monitor beyond social media. Custom search monitors can be applied to help users research any topic and compare custom results to another dataset (similar to comparing a target crowd to an existing social community) where item records are capable of being queried in a database. Further, a custom search monitor may operate with direct database access or it may leverage a web crawler to extract data and populate an index, which is then searchable by the user. In another embodiment, a separate database is created where new data is added by executing frequent API calls of another database or by manual input.

In an alternative embodiment, a custom search monitor may be applied to a store inventory database to alert a user when a new product he wants is in stock at his local retailer or when the product goes on sale, adds a new feature/color, etc. The product types and fluctuation criteria may be specified by the user after a search of all records and then tracked to capture fluctuations in specific attributes of interest. Users may even use this method to compare one retailer or distributor against another along the same dimensions. That is, the user may have an open search monitor running for the products he is interested in spanning multiple stores' databases. A custom search monitor may also be applied in the context of product user reviews as well. In that way, a user may be alerted when the products or services he is interested in cross a certain threshold in terms of the volume or sentiment of ratings, or overall rating score.

In an alternative embodiment, a custom search monitor may be applied to a database of job listings where the user can search and tag target companies he or she is interested in applying to for a job at the present time or at some time in the future. The system may then alert the user to changes to that company's job listings, when new roles are posted, when specific skills and competencies are mentioned in the job requirements, or according to any other fluctuation criteria. The system may also provide new metrics to the user; for example, the system may calculate the frequency and percentage of hires in certain functional areas versus others, and may even provide benchmarking criteria on similar candidates as the user. Another embodiment may compare these job listings to the data contained in a digital version of the user's resume and alert the user when keywords or other criteria match new listings. That is, a job opportunity may not solely be surfaced based on matching company or job title; it could be surfaced through the presence of certain keywords or any other criteria located in the job description or company profile. In another embodiment, fluctuation criteria may include online mentions of the prospective company or specific online activity of its employees and stakeholders that match the parameters provided by the user.

In an alternative embodiment, a custom search monitor may be applied in the context of financial securities and investment decision-making. The system may allow the user to search a database containing various data on available debt, equity, or derivative securities that meet certain parameters. The system may then allow the user to create a whitelist of the securities that he is interested in tracking in either the short-term or long-term. Fluctuation criteria may vary widely depending on the user's investment and trading strategy. Examples of fluctuation criteria include but are not intended to be limited to monitoring securities for changes in interest rates, dividend yield, risk metrics, stock price, strike price, share price volatility, moving averages, weighted averages, 52-week averages, price to earnings (P/E) ratio, debt/equity ratio, revenue figures, reported net income, profitability indicators such as ROA, recent news announcements and public postings containing specific information, etc. Such metrics and measurements may be leveraged in conjunction with other technical analysis. Advantageously, the system may alert the user when certain fluctuation criteria may signal a favorable investment condition. The user could then use this intelligence provided by the system to optimize his or her trading and investment strategies, and inform the timing and execution of new trades or other subsequent actions.

In an alternative embodiment, a custom search monitor may be applied to a setting in which a user wants to improve the frequency, timing and relevance of communications to important contacts. By accessing a database of information from different media accounts, such as social media friends/followers/connections, discussion forums, target author crowds, a mobile phonebook, email and text messaging accounts, etc., the user could search for and tag contact records he wants to prioritize for networking, relationship-building purposes, or other outreach purposes. Search parameters may include things such as company affiliation, university alumni, professional groups, geographic region, age, keyword or topic mention, interest, image or video share, etc. These and other custom fluctuation criteria when met may trigger an alert to the user. The system may also deliver an alert after a pre-defined amount of time has elapsed or when a certain number of contacts in a specific grouping have messaged him. In another embodiment, the system may display an activity summary for a certain time period, which would give the user a digest about past conversations with this target contact list and relevant outreach and success metrics. Furthermore, this group of contacts can be tracked independently of all outbound communications made by the user via the accounts he has connected to the system. Thusly, the system may inform the user when he is not regularly communicating with the people who he deemed are important in proportion to his total outbound communications over a certain time period. In another embodiment, the system may create the feeling of a challenge for the user to accomplish pre-defined short and long-term goals and provide incentives for doing so. In yet another embodiment, the system may help inspire the type, substance, and timing of the next message sent by the user to one or more contacts based on historical context and the unique activation criteria for that contact grouping. For example, say the user had sent a text message to a specific crowd of target contacts on Day 0 about fantasy football prospects. This text message "campaign" had a 100% response rate, effectively initiating a dialogue with all of his targets. Further, these target contacts were in turn 50× more likely to start a new conversation with the user, absent any prompt, within the next 14 days. This was a significant improvement from his past work-related conversation attempts. As a result, the user may decide to specify fantasy football as new fluctuation criteria. That is, the next time this particular crowd becomes activated on the topic of fantasy football, the user may then be alerted to initiate a subsequent dialogue. Context-specific relationship-building may be nurtured in a systematic fashion thusly.

In an alternative embodiment, a custom search monitor may be applied to service offerings as well. In a travel use case, a user may search a database of hotels rooms or flights to locate and track preferred seating arrangements, room accommodations, and travel dates to a specific destination as part of his travel plan. The system may then alert the user when there are fluctuations in variables that may explicitly influence his plans e.g., the ticket price drops or new seats with extra leg room become available, or perhaps there is a new amenity offered to him as a traveler. In the event that the user has already made the booking, the system may compare the data on his booked trip to other options occurring at the same time and notify him of any potentially preferable alternatives that may influence a booking change.

In an alternative embodiment, a custom search monitor may also apply to users making doctor appointments. The system may allow a user to search a database of doctors by specifying parameters, such as area of specialty, geographic region of practice, # of years in practice, required co-pay, accepted insurance plans, having a degree from a particular school, etc., and then save groups of their preferred doctors for treatment. The system may then alert users when this grouping meets desired fluctuation criteria, such as appointment openings with doctors, when preferred doctors are added to the user's insurance provider's coverage, or even when these doctors open up another practice in the user's area. A custom search monitor may also be applied in the context of patient reviews of doctors, facilities, treatments, procedures, and prescription drug usage. In that way, a user may be alerted when the specific services he may be considering cross a certain threshold in terms of the volume or sentiment of ratings, or overall rating score. This information may be useful to different users for benchmarking, evaluation, and research purposes.

In an alternative embodiment, a custom search monitor may be used to track the publishing behavior of target groups of webpages and then alert users when these entities cross a certain threshold in content production or search ranking, viewership rate, preference or relevance metrics, etc. That is, the user may assess competing websites based on content goals, content topics, quantity and frequency of content types (blog, whitepaper, ebook, video, podcast, etc.) keyword use, or along any other attribute or action of interest. The system may also be applied to alert users when webpages located by a search query adjust in content or ranking. The system may use a crawler to create a searchable index of data retrieved from specific website URIs. The system may then categorize content type based on factors such as URI architecture, which it may then use to identify and track when new content in those defined categories are published and then compare it to the entire set of web properties. The system may also leverage direct database access for applications with social media accounts: By creating two crowds each containing one social account and then comparing the two (e.g., @Microsoft™ vs. @Samsung™) the system may use the data to extract the Internet media types and content asset types that were posted and shared by the account most often and track these into perpetuity; this may be a number of jpg files uploaded, a number of gifs, blog mentions in URIs, promoted content, or any other media type or content asset type.

In an alternative embodiment, the system and methods disclosed herein may also be applied to monitoring media libraries that stream entertainment content. Some of the media libraries are available online or through a set top box and television. In this embodiment, the media library may be monitored for specific content such as movies or television shows. If a certain television show becomes available, for example, the user may be alerted to its availability. In another embodiment, the user may be alerted when the status of a certain media changes. For example, the user may be alerted when a television show is transitioned from being available for a fee to being available for free. Further, the systems and methods disclosed herein may also be used to track available content from various media libraries generally. For example, the system may be able to inform a user which media library has the most new material, the most recently added show or movie, or which media library is the largest. If a user is looking for a particular item of media, the user may be able to use the system to search for that media to determine its availability and the conditions of that availability. The user may also determine parameters for a type, length, or genre of media they are looking for. Searching for types, lengths, genres, etc. of media may yield a resulting group of media items. The user may also be able to configure and set custom alerts for that media or group of media. In other illustrative embodiments, the system and methods disclosed herein may also be applied to websites that list real estate sales, rentals, leases, etc. Another illustrative embodiment may be configured to monitor and set up alerts for available parking spots in an area.

Determining Agility Ratings and Recommended Aspects for Future Content, Actions or Behaviors Disclosed herein are systems and methods for determining agility ratings and recommending aspects for future content to be posted by an author, actions to be taken, or behaviors to engage in. As disclosed herein, an author generally refers to a person using a social network, website, application software, or mobile application software (app), etc. Whether the author actually "authors" posts is irrelevant to their categorization as an author. A user is described herein as one who uses the systems and methods disclosed herein. A user may be an author, and vice versa, but a user is not necessarily an author. For example, a user of the systems and methods disclosed herein may merely track the behavior of authors utilizing the systems and methods without actually being an author themselves. Similarly, authors may exist that do not utilize the systems and methods disclosed herein, but such authors may post content, generate data, or take other actions that may be tracked and analyzed by the systems and methods disclosed herein. The system can recommend aspects for future content, actions, and/or behaviors. For example, actions and behaviors, as well as aspects of those aspects and behaviors may be recommended. For example, actions and/or behaviors that may be recommended may include examples such as liking a page, creating a page, editing a webpage, adjusting a page URL or page title, adding alternate text to images, starting a content item campaign, conducting A/B testing of a webpage or other marketing message, starting a remarketing campaign, sending an email, purchase decisions, or whether a particular ad service will address a problem or goal of a user.

A user may wish to determine certain aspects of future content that would make the content more beneficial to post or more attractive to a particular audience. For example, a user may wish to post content on behalf of an author that is more likely to be engaged with by the user and/or author's target audience. The audience may be a custom author crowd as discussed above in the present disclosure. Accordingly, a user may designate a unique author and a target custom author crowd for future content, action, and/or behavior recommendations. The system can then provide potential requests that each include an indication or type of a recommended aspect for a future content, actions, and/or behaviors. For example, a system may provide to a user potential requests with a specific recommended aspect type such as: "How many times should I post content today?" "How long should my next content post be?" "What should the subject matter of my next content post be?" "Should I include a graphic in my next post?" "Who and what should I retweet or share?" In other examples, the recommended aspect types provided with the potential requests may be more general. For example, the potential requests may be grouped by type (e.g., color related, length related, type of content related, etc.), goals, difficulty-level, industry or company type, job title or role within a company, persona, use case, etc. Upon providing such potential requests to the user, the user can select one or more of the potential requests. In one example a potential request is selected with a single user interface interaction, such as a single mouse click or a single touch on a touch screen. In response to the single interaction, the system then automatically determines a recommended aspect of the future content, action, and/or behavior for the selection of the potential request. For example, if the selected potential request was "How many times should I post content today?", the system may provide a numerical recommended aspect response instruction to the user to post content as the unique author, for example, four (4) times today. The system's determination of the recommended aspect can be based on activity data that indicates aspects of other content authored by or interacted with by other authors. For example, the system may use activity data to determine that four is an optimal number of times to post content in a day in order to receive the most interactions with the content without alienating authors or causing fatigue with posts by the unique author. Activity data does not necessarily refer to old data. Rather, activity data used for determining recommended aspects is referred to herein as any data that exists prior to the exact moment in time when a recommended aspect is actually determined. Accordingly, activity data may include data about topics currently trending on social networks, including news from news sources, television, radio, websites, etc. Accordingly, activity data may be updated regularly to provide up to date and real time data for determining recommended aspects. For example, the system may determine that a particular hashtag is currently trending on Twitter™, and can make a recommendation accordingly. In another example, author content may be used to infer potential future events, even though activity data is used. For example, the system may identify certain authors as having spending power based on live tweets or other social media posts such as "I want to buy X," or "Headed out shopping."

After providing a user with a recommended aspect for posts for a unique author, the system can also determine whether a post with the recommended aspect is actually posted. The system can then use this information to determine an agility rating that indicates a responsiveness of the unique author to the recommended aspect. In other words, the system generates an agility rating that indicates how good a unique author account is at posting content according to the system's determined recommendation aspects for that account. An agility rating is the measure of a user's responsiveness to new marketing opportunities. When customer moods shift, or your rival's campaign misses a beat, a user can find out from an agility rating. For example, if the system recommends posting four times in one day, the system can measure at the end of the day, or in certain time increments during the day, how many times content was actually posted by the unique author the recommended aspect was generated for. If the unique author has posted four times, a favorable or positive agility rating is determined. If the unique author already has an agility rating stored by the system, the four postings in one day as recommended can increase the existing agility rating. In contrast, if the unique author has posted more or less times than four, the system may determine an unfavorable or negative agility rating (or decrease an existing stored agility rating for the unique author). In another embodiment, a single agility rating may be related to multiple unique author accounts. Such a functionality is valuable, for example, if a user is in charge of multiple unique author accounts. In such an example, all of those unique author accounts can be used to generate a single agility rating for the user. In another example, a user may wish to track an agility rating of several competitors or other authors. Accordingly, the user may designate a group of authors for which the system can determine a single agility rating. In this way, groupings of authors (e.g., by industry, region, etc.) can be used to determine an average agility rating of those groupings of authors.

Such systems and methods as disclosed herein are advantageous because social media can be a very variable landscape. Because of its changing complexion, marketers need to learn how to strike when it is most favorable. Dynamic and adaptive social media campaigns are now achievable through the systems and methods disclosed herein that can provide instant answers and recommendations for posting content and quantify a user's ability to leverage these instant answers. Additionally, these methods and systems are valuable because the instant answers and other functionalities can be customized to fit the user's needs. Accordingly, users of the systems and methods herein can adapt to changing marketplace conditions and produce more frequent, more relevant, and highly measurable marketing programs that will allow businesses to successfully take advantage of the most advantageous marketing conditions online. Such systems and methods allow sensitivity to current market conditions that are needed to provide meaningful information, and timely and consistent business advice. These systems can help marketers understand exactly what to do next, and what tactics to adjust for optimal results based upon what is going on in that user's promotional climate. That is, the system provides business responses to marketplace change. These responses can be determined and delivered to the user in a personalized or generalized fashion. Advantageously, these responses are not necessarily limited to the marketing function of a business. In turn, users of the system will be able to achieve an incredibly fast time-to-value or time to insight. In other words, a user can achieve high results without dedicating inordinate amounts of time to online marketing activities, saving time and money. The system can also provide individuals who are new to marketing, or who are uneducated in a particular marketing domain such as social media marketing on Twitter™, tools to learn and implement best practices quickly.

Figure 7:
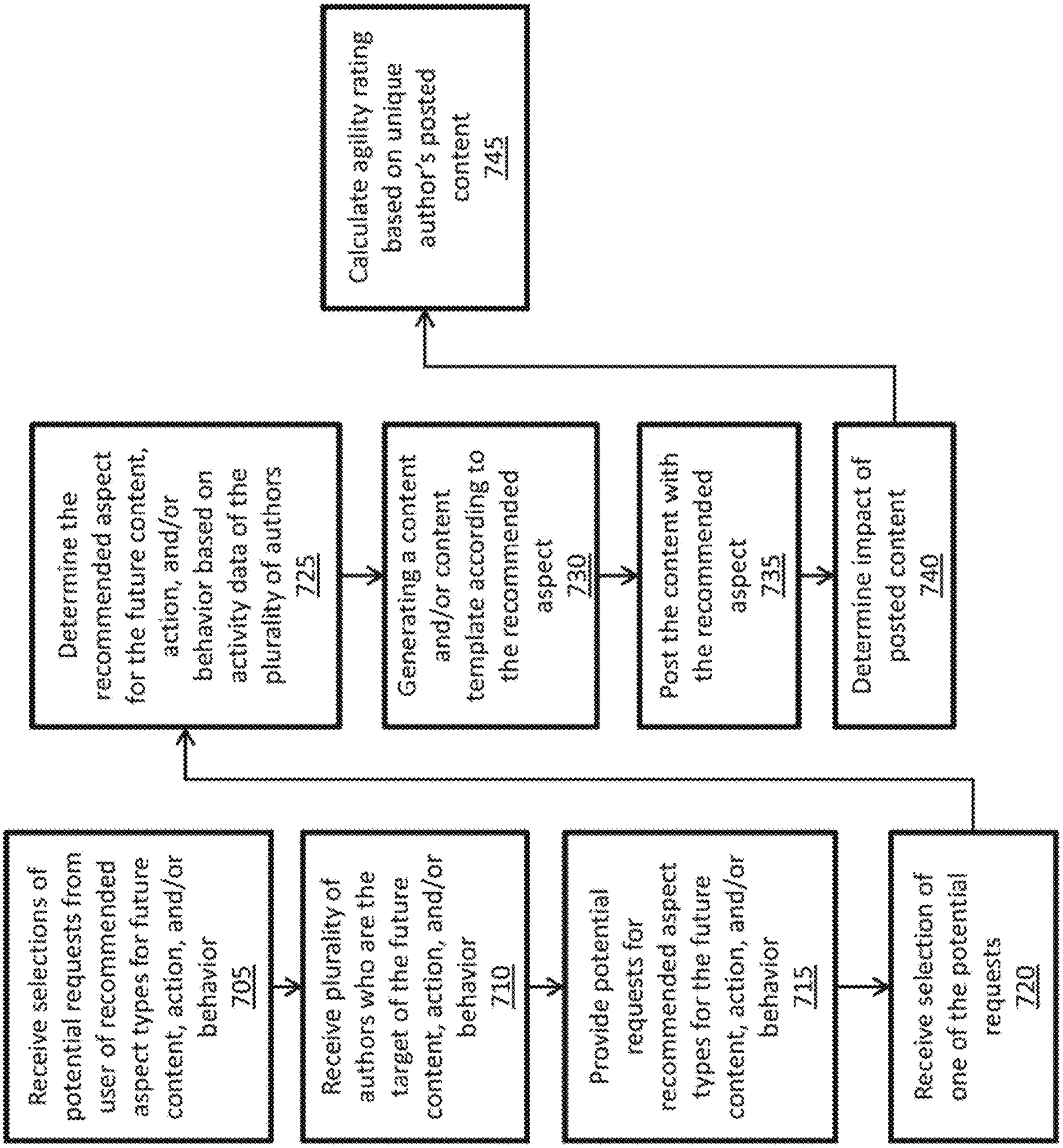
FIG. 7 is a flow diagram illustrating a method of determining a recommended aspect for future content based on historical response data of a plurality of authors in accordance with an illustrative embodiment.

FIG. 7 is a flow diagram illustrating a method 700 of determining a recommended aspect for future content, action, and/or behavior based on historical response data of a plurality of authors in accordance with an illustrative embodiment. In alternative embodiments, fewer, additional, and/or different operations may be performed. Also, the use of a flow diagram is not meant to be limiting with respect to the order of operations performed.

In an operation 705, selections of potential requests from a user for recommended aspect types for future content, action, and/or behavior are received. For example, the user can designate which types of aspects he or she may want to request. For example, requests such as what color should be used in a post or how many images to include in a post may be designated by the user. In an alternative embodiment, the potential requests may be predetermined or default such that the operation 705 may be omitted and the user does not select the potential requests.

In an operation 710, a plurality of authors who are the target of the future content, action, and/or behavior are received. The system may receive a custom author crowd as disclosed herein or plurality of authors who are the target of the future content, action, and/or behavior. In other words, a user may specify particular authors or groups of authors to assemble activity data on. This activity data, as discussed below, can be used to determine recommended aspects that will optimize author response and/or interaction. For example a custom author crowd may be determined by a search criteria such as a demographic trait or user profile trait of the plurality of authors; a subject matter of a social media post authored by the plurality of authors; a related subject matter of a predetermined number of social media posts authored by the plurality of authors; a group association of the plurality of authors such as the following of the unique author or the following of another author; an interaction by the plurality of authors with the unique author, an engagement with a content by the plurality of authors; an amount of time spent viewing a webpage or screen by the plurality of authors; accessing a webpage or screen by the plurality of authors; the selection of a universal resource identifier (URI) by the plurality of authors; an affirmative or negative activity executed through the at least one social network, website, application software, or mobile application software (app); or any other type of search criteria. The custom author crowd may also be the author's immediate following on a social networking site such as Twitter™. In another embodiment, the custom author crowd may be a user's customers. For example, the user can import or upload a list of Twitter™ handles from a customer database maintained by the user. In another example, the user may import an e-mail or mailing list, or any other information that identifies a user's customers. Such identifying information can be used to define a customer author crowd. In such an embodiment, the system may utilize non-social networking site specific data (e.g., name, address, e-mail address) to search social networking sites and identify authors on the social networking sites that likely correspond to the user's customers. This operation may be performed through various hashing methods of data wherein matches are discovered between the social networking site's user base and the user's customer list without either party having to directly expose sensitive customer information to the other party. Accordingly, those customers located on the social networking sites can be included in the customer author crowd.

In an operation 715, potential requests for a recommended aspect type for the future content, action, and/or behavior are provided. The recommended aspect type may indicate what kind of recommendation the user is seeking. For example, if a potential request is "What time should I post today?", that potential request indicates a recommended aspect type: timing. Numerous recommended aspect types are contemplated, and each of the potential requests or groups of potential requests disclosed herein are for at least one recommended aspect type. The potential requests may be displayed on a single display such that the user can see all of the potential requests available for selection before selecting one. The available potential requests here are ones that were selected by the user in the operation 705. However, in some embodiments, the displayed available potential requests may be predetermined or default such that they are not selected by the user. In another embodiment, the displayed potential requests may include some user selected potential requests and some predetermined or default requests. For example, if the user only selects one potential request they would like to see displayed, the system may display additional potential requests in order to still display at least a predetermined number of potential requests on the display. The system can be structured in a personalized question and answer format allowing a user to select their top marketing questions from a list of available options (e.g., check all that apply), and then click one button (a single user interaction or input) to receive fresh and instant answers each time a user needs them. These requests can also be grouped into categories according to the purpose, use case, or practical area they serve, such as "Timing" for informing when certain types of content should be published, or "Images" for informing how a user can better utilize image media in his content postings. Other categories may also be used, such as "Hashtags", "Strategy", "Community Management", "Customer Service", "Website Conversions", "SEO", etc. Such recommendations can be organized in a guide or "wizard" view that walks a user through, step by step, how to create, optimize, publish, and/or distribute certain content or engage in certain behaviors, actions, or marketing activities. In this way, the system can feature additional views and interfaces or display supplemental information to provide better instructions and more intuitive experiences to users. Such resources can provide a template and/or tutorial experience for using and executing the recommended activities described herein. For example, the system may organize potential requests and their associated recommended aspect types in a question and answer format on a display. Other views are contemplated, and may include but are not intended to be limited to a list view, a search view, and a guide view. With the search view, a user can explicitly search for a given potential request or recommended aspect type offered by the system. Search may be done by keyword, for example. The system may also suggest new recommendations for the user based upon their goals, performance, and recent system usage. The guide view may show a more tutorial-based display to provide sequential steps to a user. Such a display can help a user learn how to do modern marketing with templates and the various systems and methods disclosed herein. Answers or recommended aspects may be unlocked at different stages in learning process. As the user grows in familiarity and skill (skill may be indicated, for example, by agility rating) with the system, new sets of potential requests and/or recommended aspect types may appear. Such a process can refine a user's content marketing development and publication or distribution strategies. For example, the system can include modules for learning how to use images in Twitter™ content marketing, how to do video marketing, how to create original content based upon audience trends, etc.

The system can also ask users supplemental questions based on the selected potential requests. The answers can be used as a factor for determining recommended aspects of future content, actions, and/or behaviors. For example, if the user wants to know "Which Twitter Ads Product Is Best For Me?" the system can return a simple answer such as: Promoted Tweets. However, in an alternative embodiment, the system may also ask a follow up question such as: "Do you do email marketing?" The user's response to such a supplemental question can inform the system that there is some value to this user in capturing new email addresses for some other programs the user is running. In such a case, the system can make different or additional recommendations (e.g., a Lead Generation Card) as a primary or secondary ads consideration for that user. The answers provided by users to supplemental questions may also be used to configure and display for the user additional recommended aspects of future content, actions, or behavior. In the case of the example above, the system may introduce the user to a new set of potential requests or recommended aspects that are related to email marketing if the user responded in the affirmative to a supplemental question such as: "Do you do email marketing?"

In an operation 720, a selection of one of the potential requests for the recommended aspect type for the future content, action, and/or behavior is received. In one embodiment, the selection of the potential request of the recommended aspect type is a single input into a user interface of a computing device. For example, several electronic buttons may appear on the screen of a computing device. Each of the electronic buttons can be associated with one of the potential request for recommended aspect types for a future content, action, and/or behavior. By selecting one of the electronic buttons with the single input through the user interface, the system can respond by automatically determining the recommended aspect for the future content, action, and/or behavior. The single input may be various types of input, such as a mouse click, a touch to the location where a button or link appears on a touch screen, a voice command indicating the potential selection, a keyboard or other button selection, or any other type of single input that may be incorporated into the user interface of a computing device. In an alternative embodiment, inputs may include voice inputs, such that a user may simply ask his or her device (e.g., smartphone) a question that corresponds to a potential request, and the system can determine the recommended aspect based on the verbal question asked by the user. In other embodiments, more than a single input may be received before the recommended aspect is determined. For example, multiple inputs may be entered by a user to designate additional criteria for the potential request. For example, a crowd of authors the user would like to focus the request on may be designated, a custom potential request may be designated, a unique author that the recommended aspect is to be determined for may be designated, etc. In one illustrative embodiment, the user may also specify certain goals, such as wanting to increase a following, drive traffic to a website, get a certain number of retweets/shares, drive new product sales, app downloads, etc. Such goals can then be utilized by the system when determining recommended aspects for future content, actions, and/or behaviors as discussed below. In an alternative embodiment, the system may automatically select a potential request to determine a recommended aspect for a future content, action, and/or behavior. In other words, a system may monitor or otherwise check for marketing opportunities, chances to post about a trending topic, etc. Such monitoring can determine answers to potential requests (i.e., a recommended aspect) without an explicit input or selection from a user. For example, a user may make an adjustment or optimization to his or her marketing mix modeling software, business intelligence software, enterprise resource planning, or other business and operations software that may re-appropriate funds, refine goals, or adjust emphasis on certain business activities, and business channels, during some period of time. In such cases, the system may use these events or other inputs made by one or more users or affiliates of the user to external business software applications as signals for determining recommended aspects and/or the degree to which a type, volume, location or context for certain activity data may now be more or less relevant or significant to the user.

In an operation 725, the recommended aspect for the future content, action, and/or behavior is determined based on activity data of the plurality of authors who are a target of the future content, action, and/or behavior. The recommended aspect is determined at least in part based on activity data that indicates aspects of other content authored by or interacted with by a plurality of authors in a social network, website, application software, mobile application software (app), etc. prior to receipt of the selection of a potential request. In other words, the system uses activity data based on posts by authors and/or activity data about how authors interact with posts in a time before the request for a recommended aspect is received. In some embodiments, the activity data may be related to a predetermined amount of time preceding the selection of the potential request. For example, the activity data may represent only the last day, week, month, year, two years, etc. of author interaction and/or posts. In another embodiment, the activity data may include data since the unique author account was formed. In another example, the time baseline for the activity data may be related to the time since an author account other than the unique author has posted content or behaved in a certain way. For example, if the unique account is new and does not have much activity data associated with it, the user may select a different author on which to collect activity data and use to determine recommended aspects for posts. For example, the user may select a competitor author account, or an author account the user or system views as effective that could be used to determine the recommended aspects. In another example, the unique account may have little or no activity data associated with it and no other account specified to base activity data off of. In this example, the system may automatically determine authors to use the activity data from. The automatic determination can, for example, attempt to identify an author or authors the system deems similar to the unique author. Those similar author or authors, as well as their followers, can be analyzed to determine the activity data used. That is, in cases when there is no available data for a user the system would provide a generalized recommendation for what has worked well for other users of the system or users which may share common or similar characteristics with the user. In another example the system may use random authors for the activity data which would generate general recommended aspects as opposed to audience or crowd specific recommended aspects. In another embodiment, the system may generate a general recommended aspect and an audience or crowd specific recommended aspect so that a user may compare how recommended aspects differ based on the activity data used and the authors associated with that activity data. The activity data may be other content authored by the unique author, content authored by the user with different author accounts, content authored by related other authors such as competitors for a similar good or service, content authored by authors who are targeting the same audience and customers as the user, an internal competitor's authored content (internal competitors may be, for example, marketing professionals or users that work for the same entity and using separate accounts can foster performance tracking and internal competition), any unrelated authors, the author accounts owned or operated by the user's clients, partners or affiliates, or some combination of any of the preceding options. The recommended aspects are determined to optimize a response of the plurality of authors to the future content, action, and/or behavior. In other words, an aspect is recommended based on activity data such that a response or other interaction with a subsequently posted content is maximized for the goals of the user. The response to the posted content can be optimized for different factors. Such factors may be determined by the user prior to submitting the potential request, after submitting the potential request, or the factors may be predetermined by the system or default. For example, some factors may be optimizing for responses or interactions by new authors (authors that have never interacted with the unique author before), optimizing for greatest total number of responses or interactions with the posted future content, optimizing for a particular type of response or interaction with the posted future content (e.g., likes, comments, shares, new unique author page likes or follows, shares with a comment appended), or other types of response or interaction. The activity data can be analyzed in different ways to optimize response to posts according to a recommended aspect. For example, the activity data may indicate a fluctuation as disclosed herein that is related to the other content that meets a predetermined threshold. That is, activity data may be analyzed to determine shifts in how authors are behaving. Such shifts may be monitored to see if they reach a particular magnitude or predetermined threshold to determine whether to recommend a particular aspect based on that shift. For example, if a plurality of authors has a subset of authors larger than the predetermined threshold that starts posting content related to a particular live television program, the system may use that information to recommend an aspect relating to the live television program. Furthermore, a fluctuation criteria may also be used to analyze this activity data. That is, the system (as default programmed or selected by a user) may designate a particular type of fluctuation based on the fluctuation criteria to monitor. For example, a bottler of soda in a particular region may wish to monitor posts of those in his or her geographical region for social media posts regarding soda, sports drinks, sparking water, etc. and the shifts or fluctuations that are taking place in such an author crowd. Accordingly, the user may designate both a custom author crowd for monitoring for activity data as well as fluctuation criteria for monitoring for activity data. In another embodiment, a system may recognize automatically an author crowd and/or a fluctuation that may be meaningful to an author. For example, a fluctuation may be meaningful to the user if it is based on a historical context, system usage and user performance, other current activities happening on the system or are being currently performed by the user, or feedback of other users of the system. The fluctuation could also be considered meaningful based on past searches, tracked fluctuations, criteria for custom author crowds, and/or user goals. In this way, a system may determine fluctuations that are relevant to a user without the user explicitly setting a tolerance threshold for receiving helpful or meaningful information about fluctuations in authors or author content. For example, relevance of fluctuations may be determined based on a determined type or size of fluctuations. That is, the system may, for example, inform or alert a user their crowd or target audience is using more positive sentiment even if the user did not input positive sentiment as a desired fluctuation criteria or specify the threshold for what constitutes a meaningful spike in positive sentiment. A similar analysis may be used on other fluctuations such as behavioral changes, topics, discussions and comments by users, or other actions or behaviors. Such information may also be used as disclosed herein to generate recommended aspects for future content, actions, and/or behaviors as well as generating, posting, and/or taking action on such future content, actions, and/or behaviors.

In alternative embodiments, activity data used to determine a recommended aspect for a future content, action, and/or behavior may be activity data related to only one of the unique author's followers. The activity data may also be a unique author's friends; likes; individuals one or more levels removed from the unique author's followers, friends, likes, etc.; or other groups of authors related to a particular author account (even an author that is not the unique author). Activity data for determining the recommended aspects and for determining whether posted content meets the recommended aspects may be culled from internet platforms in various ways. For example, data from web pages may be retrieved with a web crawler or API, or any other data scraping or data transfer techniques. The systems and methods disclosed herein may be accessible via software-as-a-service or as an application such as a mobile app. Information that may be collected to be used as activity data may include, but are not limited to, various types of data such as author timelines, home timelines, recent posts, followers, friendships, follower ids, friends ids, friends lists, followers lists, suggested users, list members, list subscribers, list owners, retweets, statuses, comments, shares, updates, photos, videos, animated GIFs, pages, places and locations, tags, URLs, hashtags, contact information, events, locations other geographic information, device information and other metadata, trends and trending topics, collections, projects, streams, uploaded media, direct messages, user objects, user account settings, relevant tweets or users matching a specific query, user profile and banner information, friend graphs, follower graphs, transaction history and recent purchase activity, other website, marketing information, mobile information, pins, related pins, most clicked pins, most repinned pins, relevant pins from a domain that match a specific query, recent snaps, and other important objects and content that may be relevant to a user of the system. The data the system obtains through an API can be stored in a database, such as a Mongo™ database. Various types of other databases may also be used, such as a distributed database like Hadoop™. The system can run algorithms on selected slices of the data either automatically or when requested by the user to calculate certain recommended aspects. That is, the system is capable of pre-computing recommended aspects to questions even before a user explicitly requests those recommended aspects. These recommended aspects can then pass through the back-end web application and are rendered on the front-end interface for viewing by users—and can also be accessible via a browser extension as discussed in greater length below. In another embodiment, recommended aspects and other functionalities are made available through a mobile app. In some embodiments, multiple algorithms may be combined to deliver a single recommendation. Sometimes, recommended aspects based on the algorithms can fluctuate. Accordingly, the system can synthesize results from multiple analyses performed at different times with the same or similar algorithms into one recommendation that can be more reliable and can help users maximize their marketing effectiveness or impact.

Various types of recommended aspects are contemplated herein for the future content, actions, or behaviors. For example, a recommended aspect could be a social network, website, application software, or mobile application software (app) in which the future content is recommended to be authored; a time of day in which the future content is recommended to be authored; a length that the future content is recommended to be; a subject matter that the future content is recommended to be related to; a type of content that the future content is recommended to be; a tag that the future content is recommended to include; an indication that the future content is recommended to be lifestyle content or product content; an indication whether to use paid marketing services on a social network, website, application software, or mobile application software (app) in which the future content is recommended to be authored; a public figure author to engage with the future content; or a universal resource indicator (URI) that the future content is recommended to include. Other recommended aspects of future content may include any other additional aspects or recommendations, for example, media to attach to or include with the future content; style, tone, or word choice of the future content; an explanation or justification of why a certain action should be taken; a volume of future content; an amount of time that should be spent creating future content; an amount of time that should be spent distributing and promoting future content; other purchase decisions or investments that should be made by the user; etc. Other recommended aspects and/or potential requests that may be selected may include (but are not limited to): How many times should I post today? How many of my posts should contain images? How can I be more relevant to my audience today? What are some trending topics I should know about? How can I insert my brand or voice into an existing conversation that is relevant to my target audience and/or my brand? What is the promotional climate for a paid vs. organic campaign right now? How favorable are the marketing conditions? What's the best mix of paid and organic content to publish today (may be expressed, for example as a percentage or proportion: 1 out of 8 posts should be paid, etc.)? What type of content would resonate most with my audience today (that is, what type of content should I post)? (Different types of content may include types such as base line tweets, hashtag content, behind the scenes/exclusives, quotes/inspirational messages, blog shares, list-based content ("listicals"), how-to guides, podcasts, ebooks, retweets with comments, media mentions, research & case studies, animated GIFs, webinars, original media, infographics, memes, selfies, PowerPoint™/slideware, photo collage, illustrations, cartoons, animations, branded product content, YouTube™ and Vimeo™ videos, or shorter looping videos such as Vines™ or Instagram™ Video. Types of contents that posts can be about may apply to company content (that is, the specific pieces of content that are produced or curated by the company) or user-generated content (that is, content that may be solicited from members of the user's audience via promotions, contests/sweepstakes, etc.). What should I write a blog about today (such a recommendation may apply to a platform, website, app, social network etc. outside of where the recommendation is derived from (e.g., use Twitter™ data to determine what to write blog post about on Tumblr™)? What percentage of my content should be lifestyle vs. product oriented (e.g., Red Bull™ may promote images of red bull cans (product) or may promote images of extreme sports/adventure (lifestyle; relevant activities/behaviors/questions of their target audience)? Which Twitter™ Ads (or ad products for other platforms) products should I use (e.g., Promoted Accounts, Promoted Trends, Promoted Tweets, App Cards, Website Cards, Lead Generation Cards, etc.)? Where should I post more today? Which of your boards/pages/collections/accounts/handles should you focus on more today (can be valuable cross-platform insights based upon the user's performance: should a user spend more time on Tumblr™, Twitter™, Facebook™, Pinterest™, Instagram™, etc. than they do; or should more time be spent on a particular account on a particular platform)? On which platforms should I increase my media investment and paid marketing and is my current budget sufficient? Proportionally, which social accounts should I post the most text, images, video, audio, etc. to today? When should I publish my fresh marketing content today (timing can be optimized for the type of content in a post)? When should I publish image-rich content today? Or user-generated content, like memes? When should I publish video content today? What tweet length is ideal for getting my audience's attention today? What content should I consider repurposing for other media? Who just gained more influence that I should be talking to? Who in my audience likely has disposable income to spend? Who is most likely to sway multiple interest groups? Who are some of the most impressionable members of my audience? What color choices will help maximize engagement/response rate? What colors should I use in the background and foreground of the images I am posting today? What color variations of my products should I promote today? What settings and environments are most appealing to my audience? Should I use images of people in my product content? If so, how many models should I include in these images? What hair color of models will drive more clicks and other desired behaviors (should the person in your image have gray hair or a specific shade of brown hair? What eye color? How can I improve the reach of my tweets? How can I grow my following? How can I improve sentiment about my brand? How can I become more influential? Where will location targeting have the greatest impact on my online audience? Who am I not talking to that I should be (e.g., superfans/VIPs/top advocates of a brand, people who have complained, people posting about similar topics but are not competitors)? Should I focus ads on mobile or desktop and laptop users? If mobile, should I target Android or iOS devices? How are my competitors capturing people's attention? What types of marketing images/graphics and videos are getting the most traction in my audience? What is the current mood and energy level of my audience (mood can indicate receptiveness to certain types of content)? Should I incorporate more indoor or outdoor settings into my lifestyle content? What emotions is my audience expressing right now? Which other brands/musicians/celebrities/sports teams/movies/TV shows/etc. is my audience interested in? What photo filters are most commonly used by members of my audience? Which members of my audience will likely drive the highest engagement rate? How long should my promotional videos be? What hair colors will drive the most clicks and engagements today? How many different products should I include in one image? How many text characters should I embed in my images? Who is the most influential person in my audience? Who is the most influential person at my company? Who at my company should I ask to share my content? Who is the most influential person working for my competitor? Who could cause the most harm to me if his/her preferences shifted? Who should I send my marketing messages to first? How many hashtags should I include in one tweet or content posting? How long should my hashtags be (e.g., less than 15 characters)? What specific hashtags should I consider integrating into my posts today? What other words and phrases should I use? What is the demographic and psychographic composition of my audience? Which of my website pages should I promote/link people to today via social media? What products on my website should I promote on Pinterest™ today? Twitter™ ? Other social networks? What keywords or topics should I include in my profile description? How long should my profile description be? What emoticons should I use in my posts? Where is my audience most active today? Should I do influencer marketing today? To whom? What should I say? Should I do advocate marketing today? To whom? What should I say? Where else can I go for help (e.g., provide links to outside services)? How can I improve my top-of-mind awareness? How can I get a certain person or author to join my community/attract him? Should I explicitly ask people to retweet or share my posts? Should I run a contest or sweepstakes today? If so, how and where should I promote it? What images should I share today? What videos should I share today? Whose content should I re-pin, re-post or retweet? Who should I thank on social media? What should I do to change a particular author's perception of me? How can I improve the global perception of my brand? In a particular geographic region? What product category should I promote today? If I am a mass-market retailer, should I post shirts, sneakers, furniture, appliances, etc.? What are people who are pinning my pins doing/liking right now? What size photos should I use? What's the character "archetype" of my target audience or ideal prospect? Where do they shop? Where do they eat? What entertainment do they enjoy? How far apart should I space out content I publish during the day (e.g., my tweets? How long should I wait in between sending each post? If I'm running a campaign, when should I promote it throughout the day with different posts? How should I space out my posts that are specifically for a hashtag campaign? When should I follow people during the day? What day of the week? How much of my budget should I reserve for "floating" campaigns that are opportunity-driven? Which locations should I geotarget? Should I target a new whitelist of authors, or a specific whitelist I'm not using right now? Where do I get one? What character length is best for one hashtag? What hashtags is my competitor using that I should know about? What angle should I position my photo to look the best on each marketing platform? Should it be a landscape or a portrait style image? How closely zoomed into the product should we be? Should I include a hashtag within my image? If so, how many? What types of charts and graphics should I use to visualize my data? Bar charts? Pie charts? What type of infographic should I create? How many different colors should I include in my infographic? How many statistics, facts, or data points should I include in one graphic? How much text should I use within a marketing image? How many objects should I include in one image? Where should the main text or data be placed within the image? What's the best ratio of negative space to have in a marketing image? Where in the image should my largest or main object be? What size text should I use in my content? What size text should I use in my image content? What font should I use in my content? What font should I use in my image content? Are there any special characters I should include in my content? How should I comment on a blog share to get the most exposure? Who should I follow back? Who should I thank for following me? Who should I thank for retweeting or sharing my post? What should I say to someone who favorites my content? Should I thank people over private messages or is public acknowledgement better? Should I favorite or retweet someone's content if I want them to follow me or engage with my content in return? How often should I do that? Whose posts should I retweet? Does this change every day? Multiple times per day? How many times should I retweet the same person? When should I @mention people in my content? Who should I @mention in my content? Should I get in the habit of answering questions on certain topics? How often should I answer customers' questions sent via social media channels? What, if any, questions should I pose to engage my audience today? How often should I favorite or retweet posts made by my followers? How many times in a row should I post my own content without interacting with members of my audience? How can I news-jack popular discussions going on right now? What news content should I share with my followers or my audience? What product category should I emphasize in my marketing promotions today? Should I share stories with my audience that I discovered via Google Alerts? When? What should the subject of my next video be? What's the best balance of user-generated vs. branded content to promote or solicit via a marketing platform, like Twitter? What size/dimensions should my images be? What aperture setting should I use on my camera? Should I use flash when taking certain images, like product photos? What light exposure should I use? What focal length is best? What type or model of camera should I use? Which photo filters should I use to engage my audience? What other edits or enhancements should I consider making to my photos? Should I post the exact same content across multiple social networks or accounts I manage? How much time should I invest on each social network today? If I want to launch a particular campaign, which social networks should I use to promote this campaign? Which campaign idea of this set will have a higher success rate with my target audience? How do I know when to stop a content campaign? What are the signs I should look for? What's the ideal follower/following ratio for me to have? Is there a point when it hurts me if I am following many more people than follow me? When follower growth stalls, or I lose followers, how can I jumpstart it again? Should I post the same tweet twice in one day? The same image? If so, how long should I wait until posting it again? What should I post to get account X to favorite it? Retweet or share it? If I mis-spell or make an error in my content should I attempt to delete the original post and then re-post my content or just post my content twice? What is the maximum time period I should go without posting new or original content? What is the maximum time period I should go without interacting with members of my audience? How much lifestyle content should I post in one day? In what order or sequence should I post lifestyle and product content during the day? How do I get my first followers? What should my first post be? What words or topics should I include in my profile description? What cover graphic, banner or primary imagery should I feature on my profile? Which hashtags should I include in my profile description? How often should I update my profile page? Do I need to? How do I find a list of some people I should follow or interact with on a social network? How many people should I follow per day? How frequently should I retweet in one day? What audience segments is my competitor most interested in? When do I run the risk of being "muted" by my audience or followers? How do I know if I've been muted? How long should my tweets be if I attach media to them, such as images? Does my target audience exist on this social network? If so, how large is it? What should I not post about on a social network, e.g., on Twitter? Are there certain topics I should avoid or save for other marketing channels? Are there certain words or phrases that my audience has an aversion to? Account X represents an ideal customer of mine, how do I get more people like him/her to follow me, interact with my content, or purchase my products? Who is my top advocate? Who are the most influential people in my audience? Who are the most influential people working at my company? Who at my company should I ask to share my content? Who are the most influential people working for my competitor? Who could be potential ally or marketing partner of mine? What landing pages should I link to in the content I publish today? Why are my competitors doing better than I am? How can I improve? How can I create content that is most amenable to media placement? Graphics? How do I know if a news story is really 'news' within my audience? Will I be the one to break it, or am I late to the game? Should I increase (or decrease) the price of my product or service? Should I emphasize products in price range X or price range Y today? Will my audience likely be compelled by more discounted offerings today or premium offerings?

In various embodiments, recommended aspects may be constrained or determined based on factors other than activity data. For example, other factors may include a user or unique author's marketing budget, a predetermined number of target future contents, available time to spend on marketing activities, a size or location of a target market, the availability of other tools and resources, etc. For example, if a user has a limited budget, the system may restrain from recommending numerous paid content posts. If an author has a stated goal to post content four times a day, the system will not recommend posting more or significantly more than four times. This may be useful if, for example, a user has limited manpower or time to post content. Recommendations may also be based on a size of a target market or any other factors of a target market. For example, a user may produce large wind turbines. In this business, the user may sell a significant amount of its product to a very small number of consumers. Accordingly, page likes from non-wind turbine consumers would not be very valuable to the user. Instead, the user may wish to focus posted content efforts on a particular subset of authors that is more likely to actually purchase wind turbines. Accordingly, the recommendations may be constrained by the size of the target market and the types of engagements or interactions sought through the posted content.

In an operation 730, a content and/or a content template is generated according to the recommended aspect. In other words, when a recommended aspect is determined, the system May use that aspect to generate a content for posting or a content template for posting that is generated according to the recommended aspect. For example, if the system recommends posting about a baseball pitcher that is eight innings into a perfect game that is being broadcast on television, the system may generate a post for the user to post, such as "WOW! Sandy Koufax is on tonight! #lightsout #perfectgamebid." In other words, the system can provide automatic content generation. The system may do so based on various factors or inputs, such as the posts of other authors about the same content. For example, the hashtag #lightsout may have been used by authors the last time a pitcher was having a great game. In another example, the hashtag #perfectgamebid may be in use in posts during the current game for which the automatically generated content is about. Other ways to automatically generate content may also be used.

For example, a user may use the system to monitor discussion of professional athletes, such as NBA stars and their teams. The system may monitor fluctuations such as when discussion peaks during game (e.g., when a player hits a game-winner), which can trigger automatic content item generation and/or posting for apparel and other branded promotional products that are relevant to that player and franchise. This may happen on a social network where the discussion is taking place or through other marketing channels such as websites, email, text, etc. In another example, sports apparel brands sponsor many professional athletes in order to build relationships with the fan bases of those athletes. When a star athlete has a strong performance during a game, discussion of that player may spike on social media. When this happens, consumers may have been activated on the topic of the sport, and the game, the teams, and that star athlete (among other things). Fans may even decide to follow a certain account or engage with certain social media posts during or after the game. Activity fluctuations such as these represent prime opportunities to promote branded apparel products and services to those audiences. Accordingly, the systems and methods disclosed herein can be utilized to both automatically generate content when such an opportunity arises and automatically post the content, recommend or execute a campaign, etc.

In an operation 735, the content with the recommended aspect is posted. Here, the user may actually post the recommended content in the unique author's account. Where an action or behavior is subject of a recommended aspect, the system can facilitate performing the action or behavior or scheduling the action or behavior. In some embodiments, the unique author may not be an account controlled by the user. For example, the user may be tracking a competitor's author account. In this case, the content would not be posted to the competitor author account.

In an operation 740, the impact of the posted content is determined. The impact is determined by how the plurality of authors responded to or interacted with the content posted according to the recommended aspect. In this way, a user or unique author can determine whether a recommended aspect and subsequent content post was effective. For example, the system may determine how many likes, comments, shares, retweets, mentions, etc. a content post has received. The system may display this impact to the user or author and may also send an alert to the user or author to let them know how effective their action was or group of their recent actions were. In another example, the system may measure the impact of the content more indirectly. For example, instead of determining authors direct interactions with the content posted, the system may evaluate other subsequent behaviors, activities, or communications made by the plurality of authors on one or more social network to determine the effectiveness of the posted content. In an embodiment where a recommended aspect is related to an action or behavior, the impact of the action or behavior is also determined. The system or user may also evaluate the impact of the content, behaviors, or actions through certain business software and performance measurement dashboards that capture, aggregate, and display data from other areas of a user's business such as sales numbers and website performance.

In an operation 745, an agility rating is determined or calculated based on the unique author's posted content as it compares to the recommended aspect. The agility rating may be determined based on the discussion below with respect to FIG. 8.

In an alternative embodiment, the system may use activity data to predict the impact of a recommended aspect of a future content to be posted, action to be taken, or behavior to engage in. In other words, the system can, based on all the retrieved activity data, determine the expected outcome of the future content if it is posted, action if it is taken, or behavior if it is engaged in according to the recommended aspect. For example, the system may determine a recommendation that a user should post about a presidential debate thirty (30) minutes after the debate begins. Based on activity data of author actions during live television events, the system may determine thirty minutes into the program is the best time to post. For example, the activity data may indicate that an estimated 20% more total authors will view or interact with a content posted about 15-45 minutes after the beginning of a nationally televised live event as opposed to the rest of the debate. Accordingly, the system has output the recommended aspect of posting 30 minutes into the debate. Accordingly, the user may also be informed that following this recommended aspect when posting results in 20% more interactions with the post. This can help a user engage with the system and motivates the user to use the system and actually post content based on the recommended aspect because they get an indication of what the post will do before it even happens. The system may further estimate an absolute impact of the posted content if it is posted according to the recommended aspect. For example, as above, the system may have determined that 20% more users interact with a content that is posted about 30 minutes into a live television event. To determine a baseline, different factors may be used. For example, the type of television event, the unique author's current follower base, time of day, and other factors may impact what a baseline of estimated interaction would be. As an example, the system may determine that a baseline estimate number of authors who will likely interact with a post from the unique author during the presidential debate would be about 15,000. Accordingly, this baseline number can be displayed to the user, alongside an indication that, if the recommended aspect is followed, the system estimates an increase of 20%, or 3,000 increased interactions up to 18,000 if the user posts content at the right time during the debate. Again, this estimate and display may encourage further use of and engagement with the system.

Figure 8:
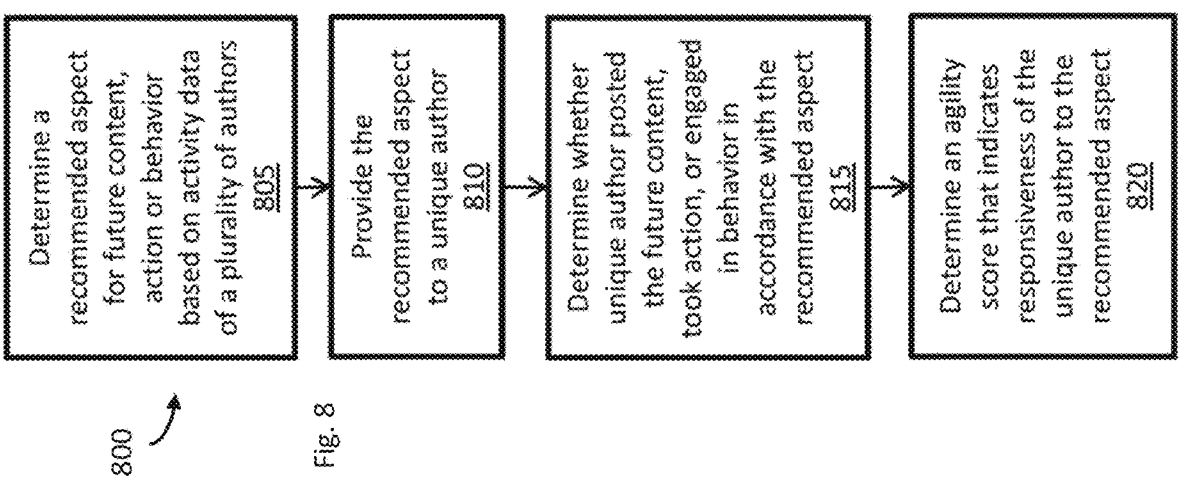
FIG. 8 is a flow diagram illustrating a method of determining an agility rating indicating a responsiveness of an author to recommended aspects for future content in accordance with an illustrative embodiment.

FIG. 8 is a flow diagram illustrating a method 800 of determining an agility rating indicating a responsiveness of an author to recommended aspects for future content, actions, and/or behaviors in accordance with an illustrative embodiment. In alternative embodiments, fewer, additional, and/or different operations may be performed. Also, the use of a flow diagram is not meant to be limiting with respect to the order of operations performed.

In an operation 805, a recommended aspect for future content, action, and/or behavior based on activity data of a plurality of authors is determined. The recommended aspect may be determined similar to the recommended aspects discussed above at length with respect to FIG. 7. In an operation 810, the recommended aspect is provided to the unique author. In another example, the recommended aspect may be provided to the user. In yet another example, the unique author and the user may be the same person or entity, so the recommended aspect may be provided to the unique author and the user. Similarly, if a unique author has multiple users associated with the unique author, the recommendations may be sent to the multiple users associated with unique author.

In an operation 815, the system determines whether the unique author posted the future content or with the recommended aspect, action, and/or behavior. In other words, the system determines whether the user or unique author has actually taken the recommended aspect and posted content or engaged in an action or behavior accordingly. For example, if the system recommended a time of day to post content, did the user or author post content on or around that time of day?

In an operation 820, the system determines an agility rating that indicates responsiveness of the unique author to the recommended aspect. The agility rating measures a user or unique author's aptitude at responding to and posting content that is in accordance with recommended aspects. In order to determine the agility rating, the system may first determine if content with the recommended aspect has actually been posted by the user or the unique author that is being agility rated. The agility rating is ultimately designed to measure how well a user or author reacts to recommendations provided to it by the system or in other ways (i.e., the agility rating may still be utilized to measure effectiveness even if another platform is used to generate recommended aspects for content, behaviors, etc.). In an alternative embodiment, a user may publish content, run an ad, execute an e-mail campaign, or take any other action or behavior that may not be detectable by the system. For example, this may occur when the content, action, or behavior is out of the platform of the user's author accounts. Accordingly, the inputs used to calculate an agility rating may be received in different ways. For example, the system may allow a user to manually input data that indicates a response, success, feedback, etc. of the user's out of platform content, action, or behavior. For example, if the user runs an e-mail campaign that is sent to the user's 2,000 Twitter™ followers, the system may prompt the user to manually enter how many of those 2,000 followers followed a link in the e-mail to the user's webpage. Such a metric can be used to determine agility ratings even if the response itself cannot be detected by the system. In another embodiment, a manual input of a response may be input by a user with voice recognition: the user may tell the system what the response was like. Such ratings can be derived for a user's product or accounts or can be derived for a competitor author account that is not controlled by the user. In this way, an agility rating can also indicate how well a competitor is reacting to opportunities in the market. The agility rating may further be determined based on whether the user or author has posted a plurality of future contents, taken a plurality of actions, and/or engaged in a plurality of behaviors that have or are associated with a plurality of recommended aspects. In other words, the agility rating may reflect a user or author's aptitude over time at responding to various recommended aspects and actually posting content with those recommended aspects. When determining the agility rating, it may be based on a plurality of recommendations and posted contents over a predetermined amount of time. For example, the predetermined amount of time may be related to a period of time that occurred most recently relative to the determining of the agility rating. For example, the agility rating may capture recommendations and subsequent posts within the last three (3) months. In another embodiment, the agility rating may be calculated for different discrete periods of time. For example, a user may calculate two of the author's agility ratings for the first six months of last year to compare how the author is doing in the first six months of this year. In another embodiment, the agility rating may relate to an entire amount of time than a user or author account has been active, which would yield a sort of all-time score for the user or author.

Other various factors may also be used to determine an agility rating. For example, the agility rating may be a relative score. For example, the system may also track how internal (other professionals within the same company or organization) or external (outside) competitors are responding or reacting to recommended aspects for content posts (whether or not those competitors are actually receiving or being notified of the recommended aspects). The system can use this information to determine who is reacting to the recommended aspects better or worse as compared to each other. Thus, a relative agility rating can be determined, rather than just a concrete agility rating that goes up or down based merely on whether a recommendation is being followed. In this way, an indication of how well a user or author is doing as compared to his competitors, peers, or other users attempting to reach the same or similar target audiences can be determined. Another way an agility rating may be modified or customized is by selecting a custom author crowd for the activity data. In this way, the recommended aspects are determined based only on activity data relating to a particular group of authors. In this embodiment, different users may have specified different crowds or groups of authors, which can lead to different recommendations. For example, User A may be advised to post eight times a day, while User B may be advised to post twice a day. If User A misses one post (for seven out of eight), they may receive a relatively higher score than if User B misses one post (for one out of two) because User B missed a much higher percentage of their opportunities than User A. That is, an agility rating determination may be adjusted based on the recommendations that a user or users have received. In other embodiments, the agility rating may be determined based on a number of recommendations the user accesses per time period, the number of webpages or screens the user visits, the number of goals the user has set, the number of goals the user has actually attained in a certain time period (or all time) using the system, whether or not he is outperforming industry or pre-established benchmarks, etc. The system could also take into account whether the user followed recommendations for what are deemed to be more advanced tactical recommendations by the system that may require additional time, effort, experience or know-how, and budget to execute on. In another embodiment, the system may take into account effectiveness of future content posts, actions taken, and/or behaviors engaged in to determine agility ratings. For example, if a post is effective at generating positive interaction, that may positively impact the agility rating. In other words, if a fluctuation of content generated by a plurality of authors is significant or meets a particular threshold, it can be used to determine the agility rating. The fluctuation may be a change in authored content, author action, or author behavior by the plurality of authors occurring over a period of time and with respect to the future content, action, and/or behavior. An agility rating may be a percentile as described herein, a letter grade, a 1-100 rating, or any other type of scale or rating. The system can also display agility ratings in tiers as compared to other users. This display can be anonymous with un-named participants or could actually show the names of other users. The system could also show high performing and/or low performing users.

Some users, for example those who pay more, may also have the ability find out more about and have access to more features relating to the computation of the agility rating. The system can provide these users with precise actions and recommendations on how to improve his/her agility rating. Such a functionality may even interrelate a list of marketing recommendations that were delivered to the user, and then display how each one had impacted the user's agility rating. For example, such a report may show to the user that he/she was very good at following X category of recommendations, but not Y category of recommendations. As a result of this performance, the system would then demonstrate the impact the user's tactics had on his/her agility rating. If a user had neglected to follow all recommendations about the timing of new marketing content, or had followed only 3 out of 10, then it may be a very simple concept to convey to the user that if he/she posts each type of content at the suggested times, then he or she will see an increase in their agility rating. Similarly, it may be important for the user to learn precisely which set of recommended tactics he/she had overlooked or perhaps misinterpreted or what specifically contributed to the decline or growth in the user's agility rating.

Figure 9:
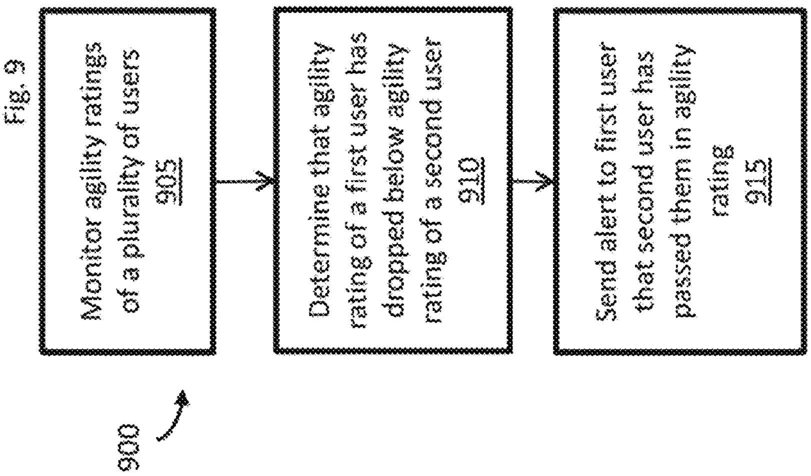
FIG. 9 is a flow diagram illustrating a method for alerting a user that the user's agility rating has dropped below that of a second user in accordance with an illustrative embodiment.

FIG. 9 is a flow diagram illustrating a method 900 for alerting a user that the user's agility rating has dropped below that of a second user in accordance with an illustrative embodiment. In alternative embodiments, fewer, additional, and/or different operations may be performed. Also, the use of a flow diagram is not meant to be limiting with respect to the order of operations performed.

In an operation 905, the system monitors agility ratings of a plurality of users. In an operation 910, the system determines that an agility rating of a first user has dropped below the agility rating of the second user. In an operation 915, the system sends an alert to the first user indicating that the second user has passed the first user in agility rating. Multiple other types of alerts and/or differences in agility rating between a first and second user may be determined in other embodiments. In alternative embodiments, the system may also monitor for different thresholds or comparisons between the agility ratings of different users or authors. For example, the system may also determine that the first user's rating has risen above the agility rating of the second user. In another example, a user's agility rating may be monitored in comparison to an average of other user's agility rating, such as a group of competitor author accounts. In other embodiments, the system may monitor for predetermined metrics as opposed to or in addition to comparisons with other authors. For example, if a user or author reaches an all-time high agility rating, the user may be alerted of that. In another example, if a user or author's agility rating goes significantly down or up by a particular threshold or percentage, the user or author may be warned. In another embodiment, the system may monitor for any movement up or down (increase or decrease) in the agility rating. In another embodiment, the system may send the alerts to someone other than the author or user that the alerts are about. For example, if a user is tracking competitors, the user may receive alerts on author accounts that they do not control. In another embodiment, a company may have a large staff of marketing professionals. Each marketing professional may have his or her own user account to use the system disclosed herein on behalf of one or more of the company's author accounts. Supervisors of the company's marketing department can therefore receive alerts, agility ratings, and additional information based on the individual marketing user accounts to monitor performance of their employees. Further, the marketing professionals may be organized into teams based on multiple author accounts owned by the company. In this way, by receiving alerts, agility ratings, etc. about the multiple author accounts, teams of marketing professionals can also be monitored on their performance. Furthermore, a plurality of authors or users may also be ranked by agility rating in this way. For example, a leaderboard showing a top 10 in an industry or at a company (or team of a company) may be maintained. In another ranking methodology, the system may calculate a percentile rank to indicate how the user or author is doing. For example, if a user's agility rating is higher than 90% of his peers at a marketing firm, he is ranked at the 90th percentile. In order to select a group of authors for ranking, comparing, tracking, alerting, etc. a user or author may use a search criteria to define a custom author crowd as disclosed herein for such functions. Using a search criteria to specify a custom author crowd can be affected in different ways. For example, a user may interact with a user interface and display to specify a custom author crowd. A user may specify authors they would like to include in a crowd or may specify authors whose followers should be included in the user's custom author crowd. For example, a user may type in a brand name or brand names, a user may specify Twitter™ handles, upload a list of usernames/actual names/brands/etc., the user may choose predetermined crowds from a drop down list or checklist, etc. In another embodiment, a potential request may be selected to yield a determined recommendation for authors to add to a custom author crowd. Output reports of agility ratings, history, etc. can be downloaded, emailed, etc. to their team of users, a boss, etc. showing how each of the tactics of each user has individually contributed to their goal and increased the overall engagement, agility rating, etc. of the brand. The systems and methods disclosed in this application to determine and provide recommended aspects and personalized recommendations may also be applied to a variety of educational and higher education contexts and settings to facilitate the teaching, learning, understanding, and application of certain materials. Student performance, teaching methods and standards vary; thus, more customized approaches may be beneficial. Variations of the systems and methods of the presently disclosed system may also be used to help instruct, measure, enhance, and benchmark student knowledge in a set of business-related or non-business related subjects. Further, the generation of an agility rating may also be applied to incentivize or otherwise encourage certain behaviors, actions, goals, and outcomes of participants which may include both instructors and students and other parties directly involved in or influencing the education process.

Alerts may be utilized in other embodiments. For example, a user can specify a recommendation and specific threshold or customized criteria which must first be met before the system sends alerts to the user with new marketing opportunities or calculates fresh marketing recommendations (these may be in-product alerts, via email, text, push notification, mobile alerts etc.). The alerts could be based on fluctuations, agility rating, size of custom author crowds, etc. Alerts can also be generally sent whenever new information is available for viewing. Such alerts may also be used to signal as to when the user has reached a certain recommendation limit or quota with their account—or when a user is underutilizing his or her allotted quota, or some other indicator of system usage and the user's current position relative to some threshold or benchmark. This may help the user preserve their budget or offer opportunities for the system to offer the user paid content and/or access to certain features. Some content available to paid users can be the ability to refresh results, recommendations, etc. frequently in an on-demand fashion. Other users, for example, may only get to update their results, recommendations, etc. infrequently, such as on a schedule (e.g., once a day, hourly, set number of refreshes in a time period). Another way features may be divided between paid and free (or discounted) users is, for example, a free (or discounted) user may only have one author account in which they can determine recommended aspects for future content posts, actions, and/or behaviors, while a paid account may have 2, 5, 10, unlimited, etc. author accounts based on their paid status or may have different number of author accounts depending on how much is paid. This may be valuable for those managing multiple brands or wanting to track competitors or targeting discrete or multiple audiences.

In some embodiments, a target audience or market is not contained, or is only partially contained, within an author's current following. In such an embodiment, customer author crowds are useful. For example, a user may want to know when it is best to post new Vine™ videos to reach Audience A vs. Audience B; similarly, the user may want to know whether promoting an infographic or podcast will be more effective at engaging their target audience at 3 pm on a Friday, or for meeting some specific marketing/business goal they have with respect to that target audience. In another example, a user wonders when they should tweet if they want to engage video gamers vs. fans of Manchester United™. If they work in marketing at EA Sports™ and are trying to promote the next FIFA™ game, they may want to know about both crowds.

When first accessing the system, users may be able to view pre-selected/pre-computed recommendation aspects based upon their prior usage of the system. That is, users may not want to go through the exercise of re-checking or re-selecting each desired recommendation aspect every time they use the system. Instead, the system can pre-populate these results for the users to view quickly without extra effort. In this way, the user will have the option to either select a new set of recommendations in his current session or have a shortcut to acquire fresh insights from the same set of recommendations as his prior session. In a similar fashion, a user may receive a suggested set of recommendations that the system determines may be of interest to the user. This will serve the dual use case of experimentation and consistency. In other words, the system can save past potential request selections as well as the recommended aspects determined in response to the potential request selections in order to allow for easier use. A history for a user may include information such as the recommended aspects delivered, when they were delivered to the user, how long the recommended aspects are fresh or the time/date at which they expire and may no longer be valid, when the recommendation was acted on by the user, whether or not the user actually followed the advice of the system, other information that was input by the user and used by the system to provide a certain recommendation, and/or the impact each of these marketing tactics had on a particular goal or goals of the user. In another example, a user may receive a suggested set of recommendations that the system determines may be of interest to the user, which the user may or may not have previously accessed. Benchmarks or industry averages may also be shown for comparison. A user can also submit, through the interface, new potential requests that they want added to the system.

In an illustrative embodiment, the system may receive requests of recommended aspects to monitor over time. For example, a user may input a potential request such as, "When should I post product related content today?" In the previously described embodiments, selecting this request may generate a time, such as 3 PM (post meridian). After receiving this selection, the system may send an alert to the user at 3 PM or at a predetermined time before 3 PM to remind the user to post content according to the recommended aspect. In another embodiment, the system may receive a selection of a custom author crowd and, the system may alert user if that custom author crowd grows or shrinks based on the criteria that specifies the custom author crowd. For example, a user may indicate a criteria that designates a custom author crowd of everyone on Facebook™ who likes a page relating to Fig Newtons™. In one example, the system may determine that this custom author crowd grows to reach one million authors. In accordance with this determination that the crowd has reached a predetermined threshold, the system may generate an alert that includes a recommended aspect for a content post. For example, the alert may recommend that the author post a celebratory message relating to gaining a one millionth user of fanatical Fig Newtons™ followers. In this embodiment, the alert may be determined automatically, or may be determined based on preset characteristics determined by the user. In other words, the user may have preset that they would like to be alerted when one million users is reached, or the system may automatically determine or have default criteria for generating alerts in this way. The system may also automatically determine that such events represent new marketing opportunities for a user.

In another illustrative embodiment, the system may determine an agility rating or a change in agility rating in advance of a user or author actually posting a future content, taking an action, or engaging in a behavior with the recommended aspect. In this way, a user or author may be able to know how their agility rating will change if they post content according to a recommended aspect. In another example, the system may determine a different metric in advance of an actual post of future content, action taken, or behavior engaged in. For example, the system may predict how a draft post should be best optimized to achieve a different user goal, such as sales from a website or new registrations to a mailing list, subscription service, clicks and engagement, impressions/reach, etc. This can help foster further engagement of authors and users with the system because they can see the benefits of following the recommendations. In another embodiment, the user and/or author may also get to see the change in their agility rating immediately after posting a content that follows a recommendation. In other words, a user and/or author's agility rating may be updated in real time to further improve engagement with the system. For example, the system may scan the contents of a post currently being drafted as well as any uploaded media, metadata, the current time, etc. to see if the user is following the recommended aspects. In another embodiment, the system may send an alert or message regarding a change in agility rating or potential change in agility rating (if the user has not posted the content yet) to a competitor in order to spur on the competitor to use the system as well. In another embodiment, a real time indication of how an agility rating may change can be calculated and displayed while an author is in the process of authoring a post. For example, if a recommendation is to make a post between 80-120 characters, an author may be writing a post and see his or her agility rating go up when the post goes higher than 80 characters and goes back down if the post goes over 120 characters. In another example, the recommended aspect may be to author a post with three hashtags. While three hashtags will result in the best increase in agility rating, the system can also show incremental increases in agility rating as one and two hashtags are put into the post. Once a content is actually posted/published, the agility rating can go up permanently based on the content. In another example, the user's draft tweet could be 50 characters in length and have an info-graphic attached to it with the "#funfacts" hashtag. The system may then tell the user that, in fact, 60 characters are ideal (so their text length may be shown in red coloring) and reaffirm that indeed an infographic is the best content choice to engage their audience (shown in e.g., green text). It may also approve of the "#funfacts" hashtag because it meets a suggested character length and hashtag-per-post quantity. However, the timing may not be right so the system may display in red—"wait to post until 12 pm." This same technique could be applied across any recommendation on any platform. Such a tool is a powerful on-demand marketing helper to help deal with many questions a marketing professional may have in real time. This tool may also be connected directly to the medium on which the user posts the content. For example, the system may facilitate a user working in the compose tweet window of Twitter™. In another embodiment, the system may calculate in real time a prediction of how a particular action, behavior, or content will impact other business goals. For example, if a business goal, either predetermined by the system or input by the user, is to increase a followers for a Twitter™ account, the system can also predict/calculate how a post will increase followers to the account. In another embodiment, the system may calculate an impact and/or agility score change while actions and/or behaviors are being scheduled. For example, in a social media management system, such as HootSuite™, a user can schedule posts or other actions/behaviors (e.g., selecting day/time content should be posted). A user may also specify a location to tag a post (e.g., Boston MA), or select different targeting options for a post, action, or behavior (e.g., country, mobile device, specific crowd). A user may also engage in behaviors like creating certain meta tags on their website to describe certain content, page title tags, or use alternate keywords as part of a strategy. For example, the strategy may be to drive a higher ranking in organic search results. In another example, a user who is using Photoshop™ to edit or create images/design/graphic for a post the system can determine in real-time that if the user, for example, cropped an image in a particular way or made certain filter adjustments to it, the image may be more likely to drive favorable results for a business goal and/or agility rating. Other actions or behaviors can also be monitored in real time to determine how business goals and/or an agility rating will be impacted. For example, templating decisions for a website or website optimizations may be monitored. In another example, page speed/page load changes or other performance optimizations for web visitors, fixing broken links or dead pages in a website navigation may be actions that are monitored by the system in real time to determine how would that action impact business goals and/or an agility rating. Another business goal that impact may be determined for is search result optimization. For example, if the user is updating a website, the system may automatically determine how likely a web search for a particular term will result in finding the user's website.

The systems and methods disclosed herein may also include a registration process. First a user may login to the system or create an account. In some embodiments, login names such as a Twitter™ handle may be used to login to the present system as well. This may be useful if, for example, the system operates utilizing Twitter™. In this way, the system can use the login information to access data from Twitter™ to retrieve activity data and post content. Authorization protocols such as OAuth may be used to obtain tokens from users that allow the system to request data from networks, such as Twitter™'s API. In other embodiments, the system may directly access a social network's user database or achieve access through a third party API or data provider such as Datasift™ for Facebook™. Accordingly, the system can collect data like an author's timeline, profile information, follower graph, friend information, lifetime tweets, last tweet, etc. A user may optionally add in additional login information or account specifications so that the system can retrieve data on multiple accounts.

A user may enter various information to set up an account. Some of the information provided may be used to determine recommended aspects for posting content, taking actions, or engaging in behavior. Such information may be changed by the user to adjust how the recommended aspects are determined in the future. For example, inputs to register for an account may include contact information (your name and email address). A further input may be time zone allowing the system to appropriately deliver recommendations related to content publication timing. A user may also specify the author accounts (e.g., Twitter™ handle(s)) they want recommendations for (i.e., the recommendee). A user does not need to be the owner of an author account to receive recommendations for it. Activity data can be collected from public or private information sources on the internet. A user may also specify all or just significant competitors. Such a specification may be by specifying a brand name, product name, Twitter™ handle, Facebook™ name, etc. In one example, the potential request "How much should I post today" may be informed by combining the results of multiple algorithms. One input can be related to competitors' activities. For example, the system finds that a competitor named by the user is posting much more often than the user, and that competitor is receiving a high post engagement rate, and so the system may recommend that the user should increase the volume of content he/she posts on a given day by some factor or multiple. Users may also specify one or more goals for their business or marketing initiatives. These goals may either be long-term or short-term goals, which may impact how the system determines certain recommended aspects for the user on a given day.

A user may also input products/brands/services, campaign indicators such as hashtags, etc. that they will be promoting through their user account or through one or more author accounts. This can be used as an input to determine recommend aspects for users regarding, for example, the frequency and proportion of lifestyle vs. product-oriented content they should post on a given day. Accordingly, the systems and methods disclosed herein recommend that a user balance publishing lifestyle and product or explicitly branded content. A loyal following may be better gained by not talking about yourself and how beneficial your product is all day long. Rather, it can be beneficial to talk about the topics that are of particular interest to your audience.

A user may also specify the size of their target market. Such data may be used as an algorithm input for certain recommended aspects or types of aspects. A user may also specify to what extent they feel their current following contains their ideal targets. This input may be used to determine an approximate target market. That is, if a user thinks they have only captured 40% (e.g., 400,000 people) of their target market, their total target market is the 40% (e.g., 400,000 people) of captured authors plus an additional 60% (e.g., 600,000 people) equaling the total target market 100% (e.g., 1,000,000 people). A user may also specify their primary goals, which can be used to determine, for example, how much and which kinds of marketing the system should recommend that the user do or use. A user could also specify their marketing budget, specify the amount of time they spend online marketing, or any other information related to use of or goals in social media. Information such as this can help adjust certain recommendations according to the user's preferences, daily routine, specific business and team needs, operational/financial feasibility, etc. on certain tasks and recommendations.

After logging in and/or creating an account, the user is shown the available potential requests for recommended aspect types and can select the ones they want. In some embodiments, certain potential requests may be available for paying customers. After selecting the potential requests desired, the user can make a single click or interaction to generate all of the recommended aspects. The recommended aspects could be displayed on the same page with the potential requests, or could be displayed on a separate page or on some other medium leveraged by the user. In an alternative embodiment, separate account creation may not be needed by the system. For example, if the system disclosed herein is integrated into a social network such as Twitter™, a user may log in and access the various functions of the system using their Twitter™ handle and password. Advantageously, the presently disclosed system may also be integrated into different types of marketing and social media management dashboards, such as HootSuite™, or other business software. Recommended aspects may be used in conjunction with or to inform tactical decisions or other tasks that may be executed through or performed while using other marketing, business, or consumer software applications. The pairing of the presently disclosed system with other systems may give rise to one or more new or complementary recommendations. Embodiments in which the system functionality is interrelated or enhanced by other systems, or vice versa, are contemplated.

The systems and methods may be executed on computing devices in various ways, such as those discussed above with respect to FIG. 1. Another way in which the disclosed embodiments may be executed is through a browser extension that will allow users to access their recommended aspects outside of a web application. A browser extension can allow users to access their personalized insights on the fly. These can be valuable for users who are busy using other web-based software platforms to create content and engage with customers (e.g., HootSuite™ or Sprinklr™), sending emails, or when they are on Twitter.com. That way, system does not force users to be on an additional webpage or inside an application when they want to harvest new insights using the systems and methods disclosed herein. Instead, the system can deliver these answers to the specific context in which they are desired by the user. Through a browser extension, users are given the opportunity to view updated analysis results from the set of recommended aspects just as would be available to them in the web application. The users may be able to choose from a fresh set of questions via the browser extension. In yet another embodiment, users may be limited to the set of potential requests and recommended aspect types, which they had accessed during their last session not using the browser extension or mobile app.

In one embodiment, the system may, without specific selections of potential requests from a user, still determine recommended aspects for future content, actions, and/or behaviors. For example, the system can measure fluctuations in data (user, author, crowd, entire network, etc.). Such fluctuations can be measured manually (directed by a user), but may also be scheduled by a user or automatically scheduled on the back end (a default schedule). For example, data processing system may occur for all users in one-hour increments so the system may provide hourly answers. The system can then identify new marketing opportunities based upon fluctuations in data and/or the user's current climate, position, and goals (i.e., identify favorable marketing conditions for the user). The system can also convert these opportunities into practical insights and one or more suggested marketing tactics. The system can also learn from the user's performance or fulfillment of certain recommended aspects. Based upon the user's subsequent activities (and successes and failures) and those of other users' of the system, the system may provide additional recommendations or suggested tactics for the user. The system may also adjust a user's recommendations to make the performance of certain tactics more manageable. Such adjustments may be made based on time availability, financial resources, access to certain types of content and media (for example, if the user has no way of producing an infographic, the system should learn from that—either by user input or via the user's activity—and instead recommend the next-best type of content the user should post instead), or general performance/fulfillment of recommendations. In one example, if the system recommends the user should post 10 times each day, but he/she only posts 4 times, it may be a function of the available time that user has in the day to devote to social media marketing. Therefore, the system should learn from this user's activity and adjust the future recommendations like this that are delivered to the user until he/she attains more steady fulfillment of each recommendation. That is, the optimal recommendation may be unrealistic for the user to fulfill right away; but he/she may learn to do it over time.

Other features can also be included in various embodiments. For example, users can export recommendation aspect results into a spreadsheet such as Microsoft Excel™ to save for later viewing and/or analysis. A user may also be able to download other document types, such as PDF or PowerPoint™ files. The system may provide a "Refer A Friend" link, where the user will have the opportunity to choose between sending a pre-populated tweet or an email message to a specified recipient and invite them to use the system. Users may also have the ability to access additional content through the system that provide enhanced tutorials, guides, and extra helpful information that will help them execute and improve upon their marketing. There may also be a leaderboard that is viewable to users containing performance measures of other users of the system, or a forum in which users of the system can interact with each other to share advice and best practices, or ask for help. The system may also provide a workspace where the user can experiment with, design, store, or test different variations of his or her content. The system may also provide a series of pre-loaded samples of recommended aspects for popular authors to illustrate how users of the system, who may work for companies of different sizes and industries or foreign countries, may be able gain meaningful insights from the system.

The systems and methods disclosed herein can be integrated with any social network. Other social networks the system could integrate with may include but are not limited to: Pinterest™, Yelp™, Flickr™, Meetup™, Tagged™, YouTube™, Vine™, Facebook™ Instagram™, QQ™, WhatsApp™, QZone™, LinkedIn™, Skype™, Google+™, Viber™, Tumblr™, Snapchat™, LINE™, Sina Weibo™, VK™, Reddit™, StumbleUpon™, Foursquare™, etc.

The concept of generating recommended aspects based on potential requests can be used in other sectors of the marketing industry. For example, recommended aspects can be determined as disclosed herein for areas including but not limited to: display ad spending, mobile ad spending, radio ad spending, SMS and text message marketing, SMS and text message ad spending, search engine marketing, search ad spending, TV ad spending, email marketing, email ad spending, b2b marketing, lead generation, content marketing, public relations, market segmentation, mobile content, market research, digital marketing and website marketing, display marketing, programmatic marketing, real-time marketing, marketing automation, loyalty programs, couponing, social commerce and social selling, mobile and tablet commerce, e-commerce, omni-channel retailing, cost-per-click, local search, mobile search, paid search, search engine optimization (SEO), mobile social media, native marketing, ratings and reviews, social media marketing, social media ad spending, digital video, digital video ad spending, mobile video, mobile video ad spending, video marketing, print media marketing, direct mail, in-store displays, outdoor marketing, event marketing, non-traditional and guerilla marketing, telemarketing, cross-media marketing, daily deals, graphic design and illustration, other art forms, etc. Accordingly, the systems and methods disclosed herein are not meant to be limited to a certain medium or type of marketing.

The systems and methods disclosed herein can also be used to manage and systematize marketing experiments. For example, users as disclosed herein can consume their tactical and best practice recommendations from the system whenever they want, wherever they want. The system may also include a campaign tactic or a group of campaign tactics that the user could select to move forward with. Tactics can be directed towards one marketing channel or involve conducting activities on multiple marketing channels. Such a system could provide an integrated or multi-channel programmatic ad spending mechanism or some other structure where the system may recommend a suite of marketing channels, platforms, or devices for the user to try out that day and then allow the user to execute certain promotional tactics and new marketing activities. Such an embodiment could convert answers, trends, and other data-driven insights into an array of pre-populated tactics, methods and campaigns that the user may choose to trigger, test, modify, or ignore. Such tactics could include a group of recommendations across multiple social networks, for example. Social networks or sellers of marketing services may offer users of the system promotional access to marketing services to increase their business. Similarly, social networks or sellers marketing services may also offer the systems disclosed herein as a promotional tool to their existing customers in order to help increase per customer ad spend. The systems and methods disclosed herein may also convince users who have floating or ongoing marketing campaigns and flexible budgets to allow companies to react to these new, on-the-fly marketing opportunities determined by the system. This could also increase overall ad spend.

For example, the system may partner with multiple marketing platforms, such as Google Adwords™, Twitter™ Ads, and Facebook™ Marketing. The various marketing products offered by these platforms can be displayed in the user's campaign menu. The system can automatically create a customized marketing tactical response or suggested activity set for the user based upon that user's freshly available recommended aspects for content posts and what is going on in his or her audience or the marketing medium generally that day.

The system may have already learned from user-submitted information that a user's primary marketing goal is to drive installs of a new mobile application. The system can determine based on previous results with a marketing product or a stated purpose of a marketing product what might work best to accomplish those goals. For example, an App Card product by Twitter™ Ads may be recommended for this goal. The user may have also specified a secondary goal of growing his follower base. The Twitter™ Ads product that may be recommended for quickly gaining relevant followers can be a Promoted Account. The goals of a user may be captured by the system with explicit reference to a single marketing medium (e.g., what is your top goal on Twitter™) or they could be the user's overall goals for social media, marketing, or his business. There may even be some required interpretation by the system of which marketing product is a preferred solution for meeting a certain goal of the user-if this information is not readily available or open to interpretation.

However, at certain times online marketing climate conditions can be used to direct a shift in marketing strategy as determined by the system disclosed herein. Accordingly, a user may experiment with an additional or alternative marketing products, mediums, suppliers, services, etc. based on a current climate at a particular time or on a particular day. Recommendations to experiment in this way can be determined through analysis of variables in activity data as disclosed herein. For example, when a user has identified a set of competitors, the competitor accounts may experience a spike in follower growth rates and have an order of magnitude larger number of followers than the user. In such a case, it may be justified for the user to shift priorities for the day to use, for example, a Promoted Account product instead of an App Card because the current climate indicates that there are many authors out there following new pages or accounts that are similar to the user's. Therefore, switching to a strategy designed to get more followers would be well timed in this scenario. Additionally, users discussing or engaging regarding similar content may be tightly connected and actively engaged in retweeting messages that day, so there may be opportunity for the user to receive more exposure for the user's Twitter™ handle as well—an additional incentive to try to reach those targets right now. In this case, the system can present Promoted Account on a screen as a proposed tactic that the user may choose to execute a) along with a promoted App Card, b) ahead of or in place of an App Card, or c) in combination with some other set of suggested marketing tactics or campaigns. That is, marketing tactics considered to be advantageous may be calculated for and suggested to a user irrespective of that user's explicit goals or established marketing plan. This new suggested ad can include a performance estimate indicating the expected impact that the ad may have and pre-populated creative elements, such as text, images, designs, tags, and other inputs. Additionally, the template of this new ad could be based off an existing message or a previous ad campaign developed by the user.

Suggested targets or goals could also be generated by the system and can be customized and edited by the user at various points in time. Targets can include but are not limited to factors such as location, gender, language, devices, platforms/operating systems and carriers, keywords, followers, interests, tailored audiences, TV targeting (shows, networks, genres etc.), other behaviors and characteristics, the placement of where this ad will appear on Twitter™ (e.g., in users' timelines), etc. In one simple example, the system could detect that a certain percentage of the user's target audience is active in New York right now (a potential request regarding geographic locations of active users may have been selected or the system may have determined this on its own). The system may then automatically input and recommend "New York" as a specific criterion for geographic targeting for a suggested content item on Twitter™ at that time. The user could also add targets or exclusions to any of the recommended targets; certain exclusions may also be suggested by the system. For example, the user may target the entire United States except California for a product content item. The user may also specify a total budget, daily budget, a custom bid, or max duration or time frame for a selected campaign.

In another embodiment, the system may suggest and provide the capability for a user to execute a new Facebook™ ad. A suggested Facebook™ ad could be shown in the display of a user's computing device as part of a marketing menu alongside the tactical marketing suggestions for Twitter™. The display of all of these suggested items may also reflect a ranking or sorting of the recommended tactics by order of importance or in terms of suggested priority to the user, shelf life (how long until the opportunity expires, or will need to be recalculated), or by the relevance and predicted impact of each tactic the goals of the user, or by the time and effort it will take for the user to execute the recommended tactic.

In another embodiment, the user's goals may be different for different mediums. For example, a user's top goal on Facebook™ may be to use marketing to increase online traffic and conversions on the user's website, while the user's goal on Twitter™ is to increase the number of followers the user has. The system may, sometime after the goals were set, detect that the user's target audience for Facebook™ website conversions activated in the geographic area of the user's headquarters that day may be perceptive to liking the company's Facebook™ page. For example, a high proportion of these authors' online posts contain words and phrases, which are deemed to reflect positive sentiment. Given this environment, the system may recommend that the user leverage a supplementary marketing tactic on Facebook™ that day to capitalize on this new change. Because of the opportunity to drive local awareness of his company, the user can be alerted to and given the opportunity to execute a Facebook™ ad to promote his business-specifically to people who are nearby that area. This newly surfaced promotional opportunity may not have been something the user planned for. Instead, the opportunity or potential request was triggered by current conditions that may have a small time window of opportunity. Similarly, this secondary recommended aspect may be shown next to, or proceeding, a primary recommended aspect for the Facebook™ content item that the user may leverage to attain his goals with respect to new website conversions.

As disclosed herein, the system may be integrated with other marketing platforms outside of social networks. For example, the system may be integrated with Google Adwords™ In such a case, the system may be integrated with one or more of Google's APIs or the user's personal Google Adwords™ account in order to gain access to important information like the user's keyword planner, display planner, current search marketing campaigns, the user's organic search rankings, the user's goals and preferences, transactions, performance history, current trends on Google™ search volumes and other industry data, the user's available budget, and other settings and information. The system may use this data to determine goals for the user and as factors for determining recommended aspects of content. For example, the system may detect a fluctuation in search volume, bidding, or some other indicator around a particular keyword that may indicate a new opportunity. Such opportunities, like those described on Twitter™, may warrant a new marketing campaign or tactical combination of campaigns to be conducted by the user.

The system may also suggest recommendations of an explicit pairing of a paid search content item with other marketing tactics in a user's menu of possible future content posts, such as a Twitter™ Promoted Accounts campaign. These tactics may use targeting criteria that allow the user to reach authors with similar characteristics on different platforms. However, in some cases it may be preferable to use different tactics on different platforms to appeal to different audiences. For example, the demographics of authors on the social network Pinterest™ may be very different from the demographics of authors on the social network Spotify™. Accordingly, the user may direct different tactics or campaigns to those respective networks. Each suggested tactical combination may contain recommendations for using certain words, phrases, or design elements to help ensure a consistent brand identity or to more effectively appeal to each audience in each setting. Similarly, the content such as postings or content items in this suggested tactical combination may leverage the same features or system outputs that were actually derived from activity data or fluctuations in the user's target audience or social network. For example, the system may recommend to the user that they should use a new trending hashtag #fantasyfootball, and participate in that hashtag conversation, to become more relevant to the user's target custom author crowd. In one embodiment, the system may automatically insert, or suggest inserting, #fantasyfootball into the message text for each content item that is posted. The system may even recommend variations of these ads, or prompt to the user to include other insights from system that the user could test by operating multiple campaigns or tactics at one time. These fields could be automatically pre-populated by the system or otherwise input by the user.

Furthermore, the system can automatically tag each tactic or collection of tactics in a way that facilitates tracking and measurement of a multi-channel (or platform) opportunity campaign. For example, if a user's product is a mobile app that includes a music streaming service, the system may recommend to the user that there is opportunity to do a paid search ad on Google™ using the keyword "live internet radio" based upon other activity around that keyword and the recent search habits of consumers. Similarly, the system may recommend using a related keyword to the user's current keyword set. The system may also recommend that the user take this insight and apply it to another marketing channel—for example, to publish a promoted tweet on Twitter™ that contains the exact keyword "live internet radio" in the text of the tweet or some variation of that keyword or concept. Alternatively, the system may recommend a new keyword or set of keywords to promote on Google™ based upon the expressions, activity, and/or behavioral fluctuations of that user's target audience on Twitter™ or some other preferred marketing medium/platform.

The system can identify new opportunities, generate recommendations to tailor one or more suggested tactics to the user, and can present such recommendations or tactical sets on a display in a menu format where the user could decide whether they want to initiate, postpone, ignore, deactivate, or abort a particular tactic or campaign recommendation. Put another way, the user is given the flexibility to choose from a set of system-generated recommendations or instead do something that is not explicitly listed. That is, the user may propose an alteration to a baseline tactical suggestion, make an explicit modification to a tactical suggestion, or choose a new marketing tactic autonomously. The system can structure experiments to only be run within certain timeframes, which can provide the user with greater transparency into when, where, why, and how the marketing tactic is applicable and appropriate for the user's current situation. The user can therefore a gain deeper understanding of how a campaign fits within the bigger picture of his or her collection of online and offline marketing programs.

The system can also adapt to current marketing conditions the user is facing at the present moment, as well as take into account constant fluctuations in data and changes in competitor and other participant activities. The system can also automatically adjust campaign experiments and the delivery of new tactical marketing opportunities to users according to the explicit goals, information, and other criteria submitted and set by the user.

The system allows the user to ramp up his or her activity and media investment on the integrated marketing mediums in order to expand the scope of their marketing activities seamlessly. For example, if a user has available budget, a smaller experiment can be expanded or scaled up into large-scale campaigns very quickly with the systems and methods disclosed herein. The system can achieve this by recommending additional tactics, duplicate tactics, alternative timing of marketing content, follow-up recommendations, or proposing investment in a new marketing tool or marketing medium that is currently not being used by the user. As previously discussed, some of these experiments may be free trials offered by a marketing platform as an incentive to capture new users and expand the engagement and ad expenditure of existing customers. As such, the system provides an incentive or process for the user to subscribe to a more premium level of access and additional functionality with the ad provider. The system may thus become a lead generation tool for a social network or ad provider.

The combination of intelligently determining recommended aspects for posted (paid and unpaid) content and a dynamic opportunity classifier allows the system to appeal to the needs of a wide range of companies and provide mechanisms with which the system can onboard, educate, and ramp up the online marketing activities of the user. Accordingly, the systems and methods herein are worthwhile for a small business that has little to no knowledge about social media best practices or a large business that wants more advanced monitoring, recommendations, tactical campaigns, and timely and practical advice. The system also allows the user to manage and customize many of their own settings, which are useful for more precise progress measurement and efficient goal attainment of the user. All of these systems and methods incorporate and/or work in conjunction with the determination and usage of recommended aspects for future content to be posted, actions to be taken, and/or behaviors to engage in that are based on activity data that indicates aspects of other content authored by or interacted with a plurality of other authors. These recommended aspects can be embedded in and/or help inform, alter, revise, compel, or otherwise adjust a particular tactic or marketing strategy/campaign.

Various algorithms may be used for text, behavior, and other analysis to analyze data, content, authors, etc. and generate recommended aspects. For example, algorithms utilizing machine learning, network analysis, predictive analytics, descriptive statistics, natural language processing, graph algorithms, sequencing algorithms, numerical algorithms, optimization algorithms, database algorithms, signal processing, deep learning, artificial intelligence, etc. may all be used in various embodiments disclosed herein. The system can also include computer vision specific algorithms that allow the system to do sophisticated image processing. Such techniques are used to examine image (e.g., stills, videos, GIFs) based content to analyze activity data and determine recommended aspects for potential requests directly or tangentially regarding image based content. For example, an image based potential request may include a request such as: What color choices will help to increase my engagement rate today? The recommended aspect (or answer to the question) depends on activity data indicating current color preferences of the authors on which the potential request is centered as well as images they are engaging with most frequently or most recently. In one illustrative embodiment, the system can determine, based on the activity data, a recommended aspect that indicates the optimal color pallet each user should use for their posted image content that day, and for example the RGB, CMYK or hexadecimal values of these colors. These RGB values, and other information extracted from the image, may be used by the user to inform new marketing design choices in PowerPoint™, Illustrator™, Photoshop™, Microsoft™ Word, other text, word processing, graphic, image or video editing tools, campaign manager and ads management/editing tools etc. for example. There may also be a conversion mechanism to Pantone™ color values to facilitate certain marketing use cases. Advantageously, the system provides a connection between recommended aspects to target an audience and the tools, platforms, and other software products or services that may be leveraged by the user to create, edit, store, or distribute certain marketing content. In some embodiments, certain data analysis (e.g., video content) may utilize additional integrated APIs (e.g., a YouTube™ API). For example, YouTube™ videos posted or linked on Twitter™ may not be able to be pulled and analyzed using a Twitter™ API as with text or images. Instead, the system can layer in another data source to understand what is actually in a video and analyze it with various computer vision techniques. Integrating additional APIs may be used any time data from one provider or social network is distributed on another provider or social network. It may also be beneficial in certain cases to correlate, interrelate, or perform other analysis exercises on multiple data sets in conjunction to enhance understanding and value for the user.

Results from Google's custom search API, or Yahoo BOSS Search™, or for example the Bing™ search API can be used to get more information about images shared by users on a given social network or other marketing channel. That is, the system can, in addition to or instead of relying on computer vision techniques to understand the characteristics and attributes of a set of images, Google's API can be used to get additional information about images. For example, the system may be able to capture certain metadata about the images from a reverse image search via Google's search API. Such a process may make determining recommended aspects faster and easier, because metadata indicating the color palate of an image or sequence of images (e.g., GIF, video) is generally smaller in size than an actual image, and no image analysis has to be performed. In other words, the system can use metadata of historical image data to generate the color preferences of authors instead of analyzing and using the images themselves to determine the activity data. This can save on processing speeds and potentially increase accuracy of the recommendations and activity data processing depending on the quality of image metadata.

In such an implementation, the system can integrate with a search engine API, such as Google's API, to gain more information about the image, such as the websites where that searched image or set of images is currently hosted. For example, if the potential request is to provide a recommended aspect to a user about the usefulness and timing of product photos (e.g., what percentage of your posts today should contain product images?), the system can determine what exactly constitutes a "product photo." Such a determination may be accomplished by looking at the host site of that image. Product photos, for example, would likely come from retailer websites or corporate sites. In this case, the system could use available metadata to identify which images in the set were product photos without having to do complex object detection. However, where context based recognition is not used or cannot be used, complex object detection may still be used. In another embodiment, the system may use both context based and complex object detection. In another embodiment, the user may upload or otherwise provide a means with which the system can access a repository of product or non-product images to inform certain recommendations. In another example, the system can identify which photos shared by Twitter™ authors are stock photos. Stock photography may be leveraged in many different areas of marketing that are not limited to posting content via social networking sites. A corresponding potential request may be, "Should I use stock photo imagery? If so, where should I use it, and how often?" The system can then compile (or have pre-loaded on it) its own catalogue, website list, taxonomy or grouping of websites which are likely to contain or offer access to stock photography and then look for matches within those sources. If an image is hosted on a stock photo website, it is likely to be a stock photo and can therefore be treated as such by the system. Such a technique can be applied across a range of other content types, such as videos, or any other searchable items where a user may be interested in understanding the origin site, hosted websites, geographic locations, and other relevant metadata associated with that particular object.

Web analytics platforms can also be integrated to inform the systems and methods disclosed herein. For example, the system can use data obtained from web analytics platforms, such as Google™ Analytics, through product integration. Such an integration can allow an interrelation between the system and the activity and performance of the user's website (traffic, conversions, sales, etc.) to allow the system to use this data to inform the system's recommended aspects, tactics, and best practices for social media marketing, or other marketing and business purposes. For example, a user may wish to receive a recommended aspect telling them which products on his website he should promote today on social media sites. In one illustrative embodiment using Google™ Analytics' API, the API allows a user to request certain information, or even real time data, for an authenticated user. The API allows users to query for dimensions and metrics that display active viewers of a page, the most popular content and pages on a users' website, etc. Such data can be used to inform recommended aspects of future content, actions, and/or behaviors.

In one embodiment, the system may determine through an API that visitors to the user's website are currently interested in peacoats. Webpages featuring product images of various peacoat styles may be receiving a proportionally higher share of page views, clicks, sales, or a longer average session length. As a result, the system may use this data to generate a recommended aspect telling the user that they should publish marketing content about peacoats on platform (e.g., Twitter™, Facebook™, Pinterest™) or even recommend explicitly that the user share those exact same images of peacoats on various social media at that time. The viewing behavior of this user's website visitors may be indicative of a preference held by others in the user's target market or digital audiences who may not know about the particular product offering on the user's website(s) yet. Accordingly, such a recommended aspect, if acted upon, could be very helpful in driving additional traffic to the user's website, and potentially more sales of the peacoats. It is advantageous for the user to capitalize on such current trends by publishing more relevant content about peacoats via one or more preferred marketing channels. The same technique may be applied to old products or product pages and marketing offers as well as new ones; the user may be alerted by the system to a positive fluctuation in page views for a product listed on his website e.g., six months ago. This may, in turn, generate a separate recommendation that the user could consider posting about this page content (e.g., product/service) via social media as well.

A specific promotional climate on a particular social network can also be used to inform the substance, timing, and design elements of recommended aspects and subsequent posted content or activities or behaviors of the user. For example, the hair color of the models used in a suggested image, or the optimal number of products to feature in one image that can help the user to maximize the engagement rate with their post on a particular medium or help achieve some other goal specified by the user. Therefore, activity on the user's website, or set of websites, may inspire both new website optimization tactics as well as tactics that are unrelated to the user's website. For example, website statistics as market signals and inputs can be used to inform recommended aspects of subsequent marketing activities on social media that can be executed by the user, and vice versa.

In another embodiment, a user can upload multiple potential images, designs, videos or other media for a future post, and the system can recommend one based on activity data in a way that indicates a likelihood that the user's audience will like the image or contribute to meeting a goal of the user. Similarly, a user may also upload multiple future content posts or other text and keyword selections. The system can determine the contents' character length, word choice, universal resource indicators (URIs) and other website links, grammar, etc., and the system can recommend one based on activity data, or other market data, and determine the likelihood the user's audience will like it or contribute to meeting a goal of the user or increasing his or her agility rating.

Numerous (hundreds or thousands) private and public APIs and user databases exist that the systems and methods disclosed herein may using according the various embodiments to provide recommend aspects for future content, actions, and/or behaviors to businesses and individuals. Some of these APIs may include but are not limited to: Amazon™ Product Marketing, Shopzilla™, Ebay™, weather APIs, event aggregator APIs, news service APIs, etc. New APIs may even be created or offered by certain companies specifically for integration with the disclosed system. Such integrations may use the API as an input (e.g., historical or real-time streaming data) to the system or may serve as output destinations where the recommendations generated by the system may be consumed by or within other software technologies.

Data used for any of the embodiments disclosed herein, including custom search criteria, fluctuation criteria, comparison of groups of authors, recommended aspect determination, activity data, agility rating calculation, marketing campaign recommendations, etc. can be gathered from any type of various electronic devices, software, and sensors. For example, devices where data can be collected may include (although this list is not meant to be limiting) smart thermostats, automobiles, biometric devices such as a FitBit™, smart product labeling, in-store shopper tracking and geo-tagging, wearable electronic devices, bicycle computers, etc. where data is transmitted via connections to the Internet in various ways such as WiFi, Bluetooth™, etc. Data captured through such devices can be used as historical or real-time data for determining certain tactical marketing campaigns and/or recommended aspects of content for the user.

For example, in-store tracking may be accomplished through Bluetooth™, video capture and analysis of in-store shoppers, WiFi fingerprinting where a system tracks the signal strength of a WiFi signal in a store, data from a MEMS chip in smartphones to track a heatmap of customer activity, LED lighting in a store where frequency emissions are used to determine customer location, as well as via loyalty programs that may leverage NFC-enabled cards to track purchase activities at checkout. Such in store activities may be used to determine marketing opportunities to authors and ways to further engage with them in store and on social media. Tracking authors using electronic devices may be done in other settings than a store. For example, authors at a sports stadium may be tracked to determine opportunities to market to them. For example, a fan in close proximity to a merchandise booth may be texted a special coupon for use at the merchandise booth. Such a campaign may come to the user in the form of a recommended aspect of a content post as disclosed herein.

The systems and methods disclosed herein may be utilized for a variety of different purposes by a variety of different users. For example, a consumer, instead of a marketer, may want to use systems and methods herein to learn how to improve his or her popularity or credibility on a given social network. In another example, a user may want to use answers generated by the system to help inform a purchase decision. What product or service should they choose? Which store should they purchase it from? Which location? Should they ask for discounts? Where can they find out if there is a coupon for the product? The systems and methods herein could also inform lifestyle choices: What clothes or shoes should they wear today? What's the current style or trend? What TV shows should they watch? What places should they visit? Who should they talk to? Where should they go to get advice? When should they do different tasks during the day? Numerous applications are contemplated where a user of the system may apply audience-driven insights in making decisions in his or her own life. Other data rich scenarios that could utilize the systems and methods herein for decision making include but are not limited to sales, marketing, enterprise resource planning, accounting and finance, project management and collaboration, healthcare, manufacturing, public relations, human resources and recruitment, research and development, operations and supply chain management, distribution and logistics, customer service and customer relationship management, IT and service management, purchasing and procurement, inventory, merchandising, quality assurance, market research, insurance, management consultancy and strategy, consumers, etc.

Various embodiments utilizing the agility rating as disclosed herein are also contemplated. For example, agility rating weights may be adjusted based upon criteria such as more consistent performance, fulfillment of what are deemed more advanced recommendations provided by the system, timely fulfillment of recommendations based on how pressing the opportunity is, etc. An agility rating may also give preference to someone who consistently capitalized on marketing opportunities generated by the system, that have a shorter time to execute the opportunity or who actually posted in a shorter amount of time. Adjustments to the agility rating may also be directly linked to real-time or near real time changes in the results output of the system. That is, if there is a change in the output of the system (e.g., a fluctuation detected), then that change can represent an opportunity for a user to adjust his or her strategy. Whether the user adjusts his or her strategy can be a factor in the computation of the agility rating. For example, the system may take into account how many new opportunities a user received in a given time window and then the percentage of those opportunities that were fulfilled by the user.

The following details how the systems and methods disclosed herein may be used by an example user. For example, the user is a custom t-shirt manufacturer. The user wants to know what to do on Twitter™ today to promote their business. Initially, the user can set goals and plan generally how the day will look with regards to marketing. The user may use the system to determine recommended aspects for 1) how many times the user should post today (e.g., 10); 2) what time of day should be a focus (i.e., should the user concentrate more posts during a specific type of day or post their longer posts at a specific time of day?) (e.g., 11 AM); 3) how many of the user's tweets should contain image content? Additionally, a user may also discover through the system what marketing products and opportunities may be used to achieve particular goals. This may be accomplished through supplemental questions answered by the user.

The system can also be used to help the user identify new opportunities that arise spontaneously. For example, the system can help the user determine what type of content the user's audience is really interested in right now or may pique their interest. For example, the user may discover that hashtag content is receiving the most engagement. A user may also use the system to determine what is trending in the user's custom crowd/target audience. For example, the user may discover that "#FreeBrady" is a trending topic, which presents an opportunity to relate the user's brand and offerings to a trending conversation that is popular within the user's target audience. In order to react to this opportunity, the user may utilize previous content posted and/or new original content. For example, if the user tweeted last week that people should share the funniest t-shirt designs they have seen, the user and the system can learn about clever designs and even get content from the t-shirts designs that people shared that can be incorporated in a post. This type of data can be very relevant to the user's audience (because the content originated with the user's audience in the first place) and help elicit more user-generated content or any other favorable outcome. The user can also determine what kind of original content they want to create. In this case, the user may decide to create a t-shirt design and integrate #FreeBrady directly into the concept art. To promote this content on Twitter™ the user can compose a series of tweets using this hashtag, and then attach an image of the shirt design to at least one tweet. In another tweet, a link to where an author may purchase the t-shirt may also be included.

Other factors for content generation can also be determined using the systems and methods disclosed herein. For example, colors of the post, generated graphics, text, and t-shirt itself may be determined using the system. For example, the system can determine that the color scheme of the New England Patriots football team is inherently associated with the #FreeBrady concept and therefore could/should be included in the content generation. The system can also help determine what other colors the user's target audience prefers and/or is interested in. This recommendation could help the user to decide what colors to use in other promotional materials for the product, such as the background for product images shared on Twitter™, or the best color scheme for a promotional infographic. The system may help determine other factors for a content post, such as how many models to use in an image, how many of the models should be wearing the shirt, time of day to post the image content, what the optimal tweet character length is for the content, etc. The user may therefore compose a promotional tweet based on the recommended aspects and publish the content.

In another recommended aspect, the system may recommend now publishing lifestyle content after the product (t-shirt) posting. Since the latest shirt was football related and a football season may be approaching, the system may recommend posting about things like sports news, the Patriots football team, fantasy football, etc. In addition, since the context surrounding the #FreeBrady hashtag has to do with football (as Tom Brady is the quarterback for the New England Patriots football team) it may also be preferable for the user to engage in sports or football-related discussion topics. In this way, the user may build awareness and likability with their target audiences over time. For other subsequent content, the user may use the system to determine a type of video that resonates with his or her audiences. For example, the user may discover through the recommendations of the system that Vines™ are very popular right now, driving high engagement rates. Accordingly, the user can extend the concept of #FreeBrady into another content format and do testing to see what drives the most engagement. Accordingly, the user can decide to make a 6-second vine about the production of his #FreeBrady shirt coming off the press. The system may recommend, for example, to share the video at 3 PM that day. These various postings can be developed and scheduled within a service for social media postings, such as HootSuite™, or managed through other marketing software platforms.

The user may then try to leverage the system to discover opportunities for more direct engagement with his or her target audience. For example, the system may analyze authored content to determine who is likely to have disposable income right now (have users recently tweeted about going shopping or new things they bought?). The system can identify such authors and facilitate sending those users a special offer for goods or services. In some instances, the user may reach out to these authors on Twitter™ or a different marketing channel. For example, although the author tweeted about shopping on Twitter™, the system may recommend sending the promotional offer to the author via e-mail if an e-mail address is available. The system may also help identify which members of a target audience are more impressionable (e.g., which authors are more likely to share content from a company). The system may recommend tweeting at this authors using their handle and including a special offer to alert them to a deal. These authors may subsequently share the tweet and further propagate the marketing of the user's products and brand.

The user may also use the system to determine who is most likely to sway an interest group (e.g., football fans, fashion crowds, Boston crowds, sports crowds, or news/media crowds, etc.) that is part of a user's target audience. For example, the system may recommend interacting with an author who is influential with a particular interest group. For example, the user could offer an influential author something that may incentivize them to share the user's branded content with those valuable audiences he/she has influence in. The system may also help the user determine who has gained more influence. For example, the user may recognize someone that tweets about the product to their followers and give them a free t-shirt or other recognition. Such authors may be worth befriending and fostering a relationship with. The system can help the user determine how to do this through personal tweets, whether to send tweets publicly or privately, through other communication channels (e.g., phone, e-mail, paper mail) or social networking platforms, etc.

In this way the t-shirt designer user receives timely answers from the system about how to promote his company on Twitter™ today. The user even received an idea for a new product variation, which evolved into its own multi-faceted marketing campaign. Accordingly, a user may use the system and methods disclosed herein to learn, for example, promotional guides and frameworks to focus on for the day; how to construct original content that day; how to make choices about things like product styles and other merchandising considerations; how to build stronger ties with the lifestyle needs of the user's audience; how to conduct effective community engagement on and offline; how to conduct other important marketing tasks and behaviors; and/or how to launch a grassroots paid campaign on top of his/her other activity.

Automating Content Design Transformations Based on User Preference and Activity Data The world is becoming more and more visually driven. Images and video content are among the most important feature of a content item. Such content is often referred to as "creative." Under-performing ads result from sub-par creative, but marketers may not know when their creative is sub-par and even if they do know it's sub-par, they may not know what to do about it. There is no easy way to intelligently tune content, such as an image, before, or while, a campaign is running. In some instances, marketers may not even be aware of the aspects of their content that could be improved. Generally, the best thing marketers can do is to test an alternative image (which takes time and resources to develop).

Some ad serving platform technologies, such as those used by social networks, also penalize the distribution of an ad if click rate slows. Therefore, operators of social networks typically recommend that entities "refresh" their content regularly. Currently, this is a manual process for the entities, and doesn't happen very often because the design resources on content have already been spent—and there aren't suggested optimizations that are personalized to each business and user. The systems and methods described herein can be used to provide recommendations to modify images, videos or other content automatically, with each modification or adjustment configured to improve an attribute or performance metric of the content, such as a marketing performance metric.

Selecting the right content (e.g., images), and the right attributes of content, can drive more awareness, customer engagement, conversions, and sales. The systems and methods described below can implement a creation, selection, scoring, evaluation, and transformation mechanism which can either collectively or in part be used as a "perpetual improvement machine" for business and marketing content and for marketing creative and in many other areas of design and creative works.

As described above, content (e.g., for use in a marketing campaign) includes "creative," which may be marketing content and including an image or video, as well as copy (e.g., text). A creative strategy provides the guiding principles for copywriters, graphic designers, and art directors who are assigned to develop contents, including designs, photos, and content items. Creating content can be a subjective exercise and tends to not be very data-driven. Further, any insights obtained via data-driven means or via consumer research lose value rapidly and often never make it back to those who are actually designing content and planning and executing campaigns through marketing platforms (e.g., Google, Facebook, etc.) in a timely manner. The insights have a very short shelf life and may be closely related to changes in audience behavior. "Guess and check" techniques are common practice. As a result, a tremendous amount of capital is wasted on "A/B testing" in marketing.

In many instances, personalized recommendations on how to improve content are not available. Automated audience-based evaluation systems or improvement mechanisms for creative assets used in a marketing campaign or other types of content publishing campaigns are also generally not available. As a result, it is difficult to know specifically how to change and adjust content or campaigns to achieve a particular business goal. For example, it is not easy for a business or operator to know how to maximize the impact of digital or traditional marketing programs during planning, creative production, and execution, or how to recalibrate such a program to achieve a specific result.

Thus, marketing and other forms of content generation and/or content publishing today typically begin with an image, a video, audio, or text (or a combination of these) that becomes an ad, and then finds an audience. This process can be expensive and error-prone. The systems and methods described herein can use artificial intelligence and other techniques to first find an audience, and then evaluate, rank, score, give recommendations, and generate new content items that are optimized for the target audience. The audience's actual behavior becomes a standard against which new and proposed content, designs, or creatives are evaluated.

The systems and methods described below can adjust and refine content, such as marketing content, in real-time based on the target audience's activities. As a result, content can be continuously or periodically updated based on a target audience and the response data to the content and campaigns (from that audience and other audiences). The systems and methods described below represent new technology that advances this concept even further with images, videos, text, audio, and other forms of content. They also have applications in other industries, business functions, and consumer applications.

The solutions of this disclosure also can take attributes from a harvest of content items and analysis of audience data associated with the harvest content items to inform the creation of a target audience. For example, the systems and methods of this disclosure may determine popular keywords relevant to a target audience of consumers of a particular brand. These high-performing keywords, and related words and phrases, that are important or unique to the audience may then be used in a subsequent analysis of the more general audience of potential consumers of that brand to more accurately find, define and otherwise segment a better set of the brand's consumers on the basis of their textual information and conversations. That is, signals derived from within an audience are used to better understand and define that audience for the purpose of analysis. Through this process, a user of the system is able to more accurately find and classify people that belong in that audience or may otherwise be considered members of the audience's extended network for the purpose of conducting a more comprehensive analysis of the target audience.

As described below, various computer-implemented techniques, including artificial intelligence and machine learning algorithms, can change marketing content, such as by performing content transformations on text entries, and on image and video pixels, based on predictions determined to improve the impact of that content. In general, a transformation can be any alteration of any portion of a content item. For example, a transformation may be an image manipulation or generative visual manipulation for content items that include visual content. Various types of content transformations are described in detail below. In some implementations, the technology can be applied to one or more types of content at a time, e.g., to optimize three images or a set of text entries. This can be particularly important in the field of marketing optimization and customer experience.

This is in contrast to traditional methods for content production, which may rely strictly (or heavily) on A/B testing, or no testing at all. For example, in an A/B test, image A can be determined to be generating ten clicks per 1000 impressions, while image B is determined to be generating 15 clicks per 1000 impressions. Based on these determinations, traditional methods would recommend that the content publisher devote more spending to image B. Some content platforms (e.g., social networking platforms such as Facebook) may perform this type of spending optimization as an option, either automatically or based on a particular key performance indicator, such as reducing cost per lead or reducing cost per acquisition.

However, the A/B testing process assumes that the creative which was used in the content is the best it possibly could be. The traditional techniques only work with the best content it has at a given time, and those contents are typically made with very little data optimizations, or none at all. Therefore, the content used in these traditional systems is already sub-optimal to begin with because it does not include the optimal characteristics and attributes that the new and improved systems and methods described below can recommend in the pre-production or during the production of the content. In addition, the failed A/B tests performed using traditional techniques can contribute to even more wasted money and time. Further, A/B tests do not provide clear insight about why one asset fared better than another in a live field test. This information gap makes it even harder for marketers, entities, designers, campaign planners, and brand managers to consistently improve performance.

Using the systems and methods described further below, optimizations can be made to content before it is developed at the idea/concept stage, while it is in-development (e.g., in image or video editing software), and via post-production enhancements to the content by leveraging user preference data. In some implementations, the user preference data can include audience data. So, instead of mounting costs, wasted time and energy, high uncertainty with A/B testing, and overall sub-optimal content, the systems and methods described below can help content producers to move towards only having to do "A Testing" and being confident that the image, text, video, audio, or other creative assets they are publishing are maximizing the likelihood that their message will resonate with the target audience and drive the best possible business outcome or goal. Thus, the systems and methods described below represent a significant improvement in the field of design, content development, and business and marketing performance optimization.

Figure 10:
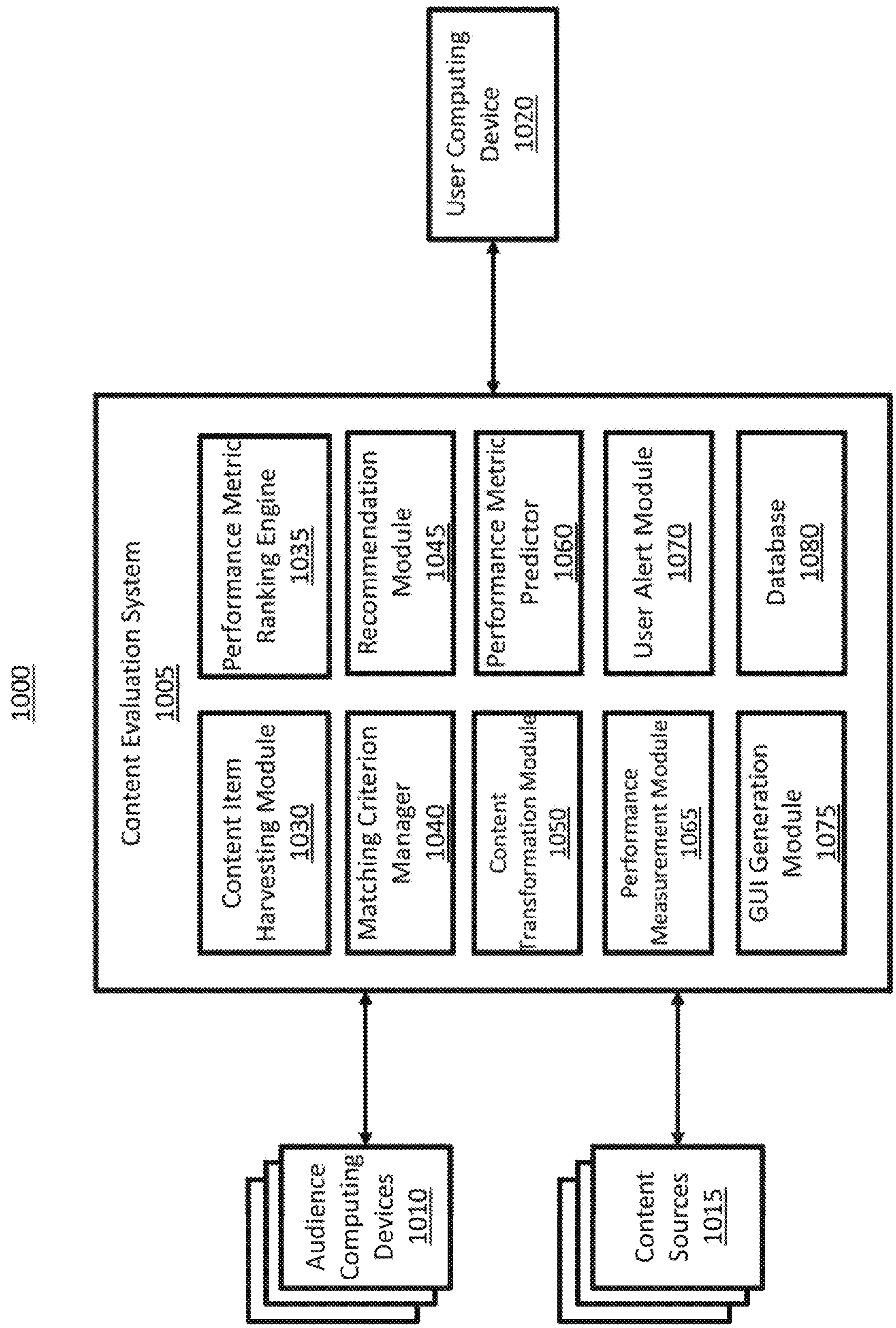
FIG. 10 is a block diagram illustrating a system for transforming one or more content items in accordance with an illustrative embodiment.

FIG. 10 is a block diagram illustrating a system 1000 for transforming one or more content items in accordance with an illustrative embodiment. The system 1000 includes a content evaluation system 1005 in communication with a plurality of audience computing devices 1010, a plurality of content sources 1015, and a user computing device 1020. The content evaluation system 1005 includes a content item harvesting module 1030, a performance metric ranking engine 1035, a matching criterion manager 1040, a recommendation module 1045, a content transformation module 1050, a performance metric predictor 1060, audience performance measurement module 1065, a user alert module 1070, a graphical user interface (GUI) generation module 1075, and a database 1080. In general, the system 1000 can be configured to evaluate one or more content items, determine scoring criteria select an optimal subset of content items from among a group of candidate content items, and/or apply one or more transformations to content items in order to improve a performance metric associated with the content items, as described further below.

In some implementations, the system 1000 can receive original content, such as an original image A, and can then create new optimized versions of it, such as transformed image 1, transformed image 2, transformed image 3, etc. which can each be a predicted optimal permutation of the original image A. This functionality can effectively scale up the inventory of creative assets for a content publisher without the need for additional manual work of a graphic designer, whose design iterations are inherently subjective. Stated another way, the system 1000 can receive a first content item, such as a first image, and can produce, for example, five optimal versions, 500 optimal versions, 5000 optimal versions, etc. according to user preference data that has been analyzed by the system 1000. The system 1000 may also do so in conjunction with user preferences, which may include, for example, creative restrictions, brand guidelines, or marketing requirements.

In some implementations, the system 1000 can determine that a target audience likes content item A more than content item B. As a result, the system 1000 can transform content item B to look more like content item A, or to look more like other content items that are similar to content item A. The system 1000 is also sophisticated enough to extract features from a large corpus of content items, such as images, to figure out the aspects of the content that matter the most to that audience. That is, the system 1000 scales and becomes more intelligent as more content items are added to a model implemented by the system, which may include artificial intelligence and machine learning algorithms.

In one example, before a content publisher conducts a campaign based on at least one content item, the system 1000 can be configured to make the content item resonate more with an audience including people who like hiking. The system 1000 can take the original content item and transform it to look, sound, or feel more like the content items that people interested in hiking are engaging with, or have engaged with previously on one or more media or websites, etc.

Using the system 1000, real-time adjustments can be made to the content items, based on real time feedback. This real-time feedback can be based on response data to the content items themselves (e.g., as measured by the performance metric ranking engine 1035) or based on activity data within the target audience, which may include the audience computing devices 1010, or a combination of both of these datasets. The system 1000 also may use other information to inform the content transformation process, including television commercials, weather forecasts, sports scores, entertainment events such as local concerts, award ceremonies and festivals, news, holidays, location data, new business, marketing, communications or public relations initiatives, etc. The transformation made to the content items by the system 1000 can be an automated improvement on a candidate content item, or can be an incremental improvement to a content item that has already been optimized by the system 1000 at least once. Thus, one or more transformations may be applied at any given time to a particular content item or content items.

In some implementations, the system 1000 can trigger image transformations based on new events within a target audience while a campaign is live in action. When consumers start talking about a topic, mention a keyword, express a certain emotion or behave in such a way that indicates a particular mood state or desire, or share or engage with a certain type of content item (e.g., image or video content), it can trigger the system 1000 to perform a new transformation on a content item. For example, if the system 1000 determines that an audience of sports fans begins talking about the NBA and the Cleveland Cavaliers, the system 1000 may adjust a content item used in a campaign to reflect the characteristics of content that is of interest to that audience. For example, the system 1000 can transform the content item to look, sound, or feel more like basketball-related content by transforming the content item to share similar features and attributes, scenes, objects, word choice, etc. of content items determined to be of interest to that audience. Alternatively, the system 1000 may specifically transform the content to look more like content that an audience of Cleveland Cavaliers fans is likely to engage with.

In some implementations, the system 1000 can transform a content item if members of the target audience are speaking positively or negatively. In some implementations, the system 1000 can perform a different type of transformation when members of the target audience express some other kind of emotion, such that the content item can evolve over time. For example, if one or more members of the target audience are expressing sentiments of anger and frustration, the system 1000 may transform the content item to have a look, sound, or feel that is more calming and approachable. If a user is depressed, for example, the system 1000 may transform the content to include aspects that would be humorous or uplifting.

In some implementations, an audience may be an individual person or entity. Thus, if an individual expresses a negative opinion regarding a user (e.g., a content publisher), the system 1000 may can avoid presenting content items that don't have identifying information regarding the content publisher, such as a logo, inside them, or content items that contain a special offer from the content publisher. In another example, the system 1000 can determine that an audience member recently visited several websites about baby care products. As a result, the system 1000 may transform a content item to be displayed to that audience member to emphasize themes relating to family, parenting, fatherhood, etc. In some implementations, the system 1000 can derive such transformations based on other successful content items that were targeted towards an audience of new fathers, or based on the recent content that was viewed and or engaged with by this particular audience member. Thus, the system 1000 can use many types of factors regarding an individual's behavior or engagement (or engagement of a larger audience), and can transform the content items delivered to the individual to look, sound, or feel like the content items the individual engages with most and may have a preference to see and react to or spend time on. Additionally, the system may transform the content to look, sound, or feel like content that the individual may not have seen or engaged with before, thus providing "freshness" and novelty.

The system may also be used to refresh content items and creatives that have been previously published or are currently out in the field, e.g., as part of an ongoing digital campaign. In one embodiment, these contents may be fed into the system either via API or via manual user input, or via a cloud storage or content management system, or other means, with certain performance data and metadata. The system will then take this information into account when producing a new transformation for the content item. In that way, it may be referred to as a "second-generation transformation." For example, if the audience has been shown an ad of a red apple four times per day, the system 1000 may determine that the audience has been fatigued by red apples due to the high frequency with which red apples appeared in other content items displayed to the audience. As a result, the system 1000 may determine that the next transformation of this content item should de-emphasize or eliminate the prominent red attribute. Thus, the transformation may produce, for example, an image of a green apple rather than a red apple. Alternatively, the system 1000 may remove or replace the apple within the content item for this audience. The purpose of such a transformation would be to "refresh" the content item for the users with the intent of increasing the performance of the content in the audience.

The system 1000 can perform transformations based on any type of performance metric associated with a content item. For example, the system 1000 can be configured to make a content item "stand out" from other content items, which may not necessarily produce an optimal click-through-rate or marketing outcome. In this example, the system 1000 receive information corresponding to various activities of audience members, or in a particular individual's browsing or viewing history, and can transform the content item so it looks unlike other content items the target user has seen before. For example, if the individual has never been shown as having a lime green theme or engaged with a lime green post on a social networking site, then the system 1000 may recommend that transforming a content item by adding a lime-green treatment to the content item is likely to get the individual's attention. The system 1000 also can perform a transformation of the content item to generate a transformed content item having the lime green treatment. There are several of these types of transformations that may vary based on a content publisher's expressed or inferred goal, or based on the current market and business conditions or consumer state. A list of example marketing use cases in which the system 1000 may provide beneficial content transformations is described briefly below. One of skill in the art will understand that the examples provided below are intended to be illustrative only, and should not be interpreted as limiting the scope of this disclosure.

The system 1000 may also recommend that a particular element, feature, style, or category of image is unpopular in an audience and/or unlikely to lead to the user's intended marketing outcome. For example, if the system 1000 determines that a user-provided image contains an image of a baby but the audience has not responded favorably to baby images, or if the system 1000 determines that this particular baby image is unlikely to produce greater brand recall, memorability, or sales performance for the brand product, the system 1000 may recommend to the user to instead use an alternative image, e.g., a family photo. The alternative image feature or category can be predicted to perform better in the target audience. In another embodiment, the recommendation of an image, photo, design, or creative execution may be informed by previous campaigns and creative choices of the user or by other external factors that may impact the performance of the user's creative executions. Such external factors may include the creative executions of competitive brands.

In another embodiment, a user of the system 1000 may define a "creative target" based upon a set of images provided to the system 1000 by the user. In such an embodiment, the user may select or provide images, instructing the system 1000 to transform a candidate content item (e.g., image) to be more like the examples the user has provided. That is, the system 1000 can determine optimal characteristics in the provided image set and apply transformations to the new content items based on what the system 1000 has learned about that input set of images. In such an embodiment, performance criteria of images in the target audience may be absent or ignored, as the user of the system 1000 has articulated the desired design parameters or other preferences for his/her candidate content item by inputting them into the system 1000. In that way, the system 1000 can be "overridden" by the preferences of the user for how the user would like the design creation to appear.

In another embodiment, the user may specify that the candidate content item is a Christmas or holiday-related promotion of a product. In such an embodiment, it may be the user's intention to make the content item look more appealing among the target audience than other Christmas content items in circulation (i.e., content in the same or similar category to the user's content). The system can then recommend unique enhancements to the content to achieve this result, as it may be a goal to drive more sales relative to competitors. In such an embodiment, the system 1000 may also take special consideration, or apply special weight and emphasis, to the characteristics of Christmas-related content items in order to make the candidate content item better stand out among all other Christmas-related content items the system 1000 has analyzed. In this embodiment, the system 1000 may leverage audience data to achieve this result, or it may look at audience-agnostic signals that are pertinent to the Christmas/holiday category of content.

In another embodiment, the user may upload past images used in an e-commerce store, such as a storefront on Amazon.com or the brand's own e-commerce web domain. In some implementations, the user may provide performance data with these images (e.g., product photos) indicating the relative success of each image used. Performance metrics may include elements such as the click-through-rate. In this example, the user may want the system 1000 to learn from the product photos used on the storefront in order to recommend a better product photo to use in place of one or more currently used photos for the purpose of improving the sales performance of the product, or products, listed on the e-commerce store. In another embodiment, labeled datasets on past marketing performance using certain image or video contents may be uploaded by the user.

In another example, the user may provide performance data on an email campaign along with the images used in those campaigns. A common email marketing performance measure is the click rate or click-through rate. In such an embodiment, the user may desire to learn how to use better images in email messages in order to get more clicks from email subscribers. The user may also wish to reduce the unsubscribe rate of these emails. In such implementations, the system 1000 can use this data in order to recommend image selection and transformation to improve the effectiveness of subsequent email programs to this subscriber base.

Sample Marketing Use Cases:

- Improve the aesthetics and visual appeal of a particular product, packaging, label, image, video, video frame, or content item. These enhancements may make the content item more effective for business purposes.
- Adjust creative to better appeal to a particular user or audience, or to achieve a particular business goal.
  - For example, a content item may transform differently if the goal is 1) to generate more positive comments vs. 2) to produce website conversions. The content item transformation may also differ based on the target audience selected for the content item, which may include an individual or a larger group of individuals.
- Rank and select which image from one or more images is the best image to use for a particular purpose.
- Rank and select which video or video clip or frame from one or more videos, video clips, or frames is the best to use for a particular purpose.
- Score individual video frames.
- Identify the most relevant frames in a video or the most resonant frames
- If a content publisher uploads a content item and the system 1000 applies multiple transformations to the content item, the system 1000 can show the content publisher which transformations are predicted to have more positive outcomes. Thus, the system 1000 can return a plurality of transformed content items, along with a ranking and scoring of the transformed content items.
- Apply a recommended "filter" to a photograph. That is, the system 1000 can automatically apply a "smart filter" to the image.
- Adjust the design elements of a graphic or man-made design.
- Adjust one or more layers in a design file, e.g., Adobe Photoshop's psd files or Illustrator files.
- Apply a recommended treatment to a video or live video broadcast.
  - For example, the system 1000 can determine that the NBA audience would be more engaged by a video if it was broadcast with a slight red hue. As a result, the system 1000 may dynamically apply such a filter to all incoming video data as part of a video stream directed to the NBA audience. The system 1000 may also apply the transformation to an existing video file. This transformation may apply to all footage or only a given segment, time frame, video frame, or image of the video.
- Automatically increase the number of marketing content assets with more than one example that is highly (more) relevant to the target audience, and likely to create a preferred business outcome.
- Automatically transform the content item based on real-time data.
- Create a set of computer-generated, pre-optimized content items to use in A/B testing.
- Create an optimal GIF.
- Select a product photo for use on an e-commerce storefront.
- Transform a product photo in order to improve product sales performance on an e-commerce storefront.
- Select an optimal video thumbnail for the purpose of increasing video views or engagement.
- Create an optimal video thumbnail for a video platform, website, webpage, app, app screen, or social media feed.
- Create a better image for a particular email message or blog post.
- Create a better image for use on a company's website or a particular webpage or panel on a website.
- Move a website panel or image(s) to another area on a website in order to increase performance
- Automatically re-write a social media post, subject line, headline, body copy, or any text content used for marketing purposes to be more effective with the target audience.
- Move, re-locate, replace or refresh imagery on a webpage or website.
- The system 1000 may transform text, for example by changing the phrase "These apples are delicious" to instead read "These apples are mouth-watering" Or "This fruit is delicious."
- Create a superior content item to use as a social media post or within a particular campaign. That is, for single-purpose use OR ongoing use.
  - For example, many social networking posts are made, and then published one time.
    - That is, most businesses and other content publishers will not delete a post, and then re-post a new version of it, or do duplicate posts, via their organic social media channels.
  - A paid social networking campaign can involve multiple simultaneously running creatives, which can each be swapped in and out over time.
- Targeting the message of a content item to apply to the group or individual person. For example, transformed content items can be used to reach a particular target audience more effectively as part of marketing, customer experience, or customer service initiative in an aggregated manner.
- Transformed content items can be used to target at least one user—in a personalized manner.
  - For example, the system 1000 can receive information corresponding to the viewing habits of an individual over the last 6 months on one or more platforms. The system 1000 can then take the content items the individual has engaged with the most, and can learn from those content items features and other aspects of the content items that appear to be appealing to the individual. The system 1000 can then apply machine learning to dynamically transform a new content item to be more performant for the individual.
  - These content transformations can occur automatically in real-time, or they may require the manual approval of an end user. For example, some compliance-focused marketing departments will not allow marketing creative to change without proper approval.

The system 1000 can source a content item from an external website or content repository (e.g., the content sources 1015) or directly from users (e.g., the audience computing devices 1010 or the user computing device 1020), and can then perform content optimizations on these content items dynamically, depending on the goal of the content publisher.

Then, the system 1000 may recommend each of those content items to be used at a particular time. These content items may then be plotted into a content calendar or "flight schedule" for content items. For example, the system 1000 can receive a raw image from a content publisher, can transform the raw image to produce a transformed content item, and can then recommended a particular time for placement of the transformed content item. In some implementations, the system 1000 may automatically transmit or publish the transformed content item or served to the intended user or target audience The system 1000 may also generate one or more optimizations and then recommend that each new version is better for a respective audience. For example, given a first content item, the system 1000 can produce first, second, and third transformed content items (or any number of transformed content items corresponding to respective transformations), and may also suggest that the first transformed content item is a good fit for an audience of beer drinkers, that the second transformed content item is a good fit for Patriots fans, and that the third transformed content item is a good fit for both beer drinkers and Patriots fans audiences.

In another embodiment, a user input may be captured which will inform the substance of the content item transformation. This user input may be facilitated by the system 1000. It may also be a derivative of another recommendation that is generated by the system 1000. For example, the user may select an option for adding more of a particular component color (e.g., RGB color components) to their candidate content item. The system 1000 can then perform a transformation on the content item that may include a re-styling procedure that adds more of the selected component color to the content item. The system 1000 may also modify proximate colors within the content item such that the proximate colors are converted to the selected component color. The user may also desire to insert a scenery background or an object into an image included in the content item, as a result of a recommendation that may be produced by the system 1000. The system 1000 may then be configured to transform the content item in order to adapt the content to the user's input preferences. In some implementations, a content item can be an image that may include a plurality of layers which are overlaid on one another to produce the complete image. In some such implementations, the system 1000 may apply a transformation by altering any subset of one or more layers of the image. Another subset of the layers may remain unaltered. Similarly, in some implementations, a content item can be a video including a plurality of frames, and the system 1000 can apply a transformation by altering a subset of one or more of the plurality of frames, while another subset remains unaltered.

In some implementations, the system 1000 may automatically suggest new transformations for the user to consider and opt into based on other data and learnings the system has made. For example, in some implementations, the system 1000 can be configured to provide a user interface allowing the user to see recommended transformation and to determine whether one or more recommended transformations should be applied to a candidate content item. In some implementations, the user interface can be a graphical user interface (GUI). For example, the user may be able to select a menu item corresponding to each recommended transformation using a pointing device, and may further use the pointing device to select whether or not a selected recommended transformation should be applied to the candidate content item. The user may also indicate whether a system-provided transformation is acceptable or preferable with his or her creative vision or business goal. In such an embodiment, the system 1000 may capture feedback data from the user, or from other systems utilized by the user, such as "thumbs up" or "thumbs down" preference feedback. The system 1000 may also capture feedback related to a number of business performance metrics. Further, the system 1000 may incorporate this feedback data or a feedback loop based on the postings of the user and the actual performance of the creative execution, content, or media placement. In one example, if a candidate image that had been modified with a particular transformation not perform as well as expected once published, that transformation may be "blacklisted" from the user's account maintained by the system. Alternatively, the system 1000 may learn that that transformation is less effective in that particular context for the user. Thus, future candidate content items that are similar to the candidate content item may not receive that transformation. The system 1000 may also apply that transformation in a dulled, weakened, or incremental, so as to test alternate variations of the transformation and its viability for the user in other content items. In another example, the user may input actual business performance data of a transformed content item. The system 1000 may then use this data to inform subsequent recommendations. There are myriad ways in which the system 1000 may retrieve feedback data after making one or more recommendations. These means may be manual or programmatic, or learning-based such as via reinforcement learning, and the examples in this disclosure are not meant to limit the scope of possible implementations of the learning mechanisms. In general, the system 1000 may use any means for receiving feedback related to the performance of a published content item, including receiving such feedback from a user or collecting such feedback in an automated fashion.

In another embodiment, the system 1000 may be used for influencer and micro-influencer marketing use cases. For example, a brand, company, or marketing or software vendor may use the system 1000 to optimally transform a content item such as an image, text, or video content that was provided from the brand or the brand's marketing agency to an influencer for promotional purposes. In this example, the branded content to be shared by the influencer may benefit the brand and may be optimized by the system 1000 to appeal to an audience that includes that particular influencer's followers or another target audience in which the influencer may have reach and authority. In another example, the system 1000 may transform user-generated content that may have been originally produced by the influencer or micro-influencer or another user. In this example, the system 1000 could automatically apply a transformation to the content that could be shared or promoted by the influencer, which may or may not be on behalf of a brand or company. The content need not have been marketing content in nature. An influencer need not be an actual celebrity figure. The influencer, or individual consumer, may use the product on their own behalf in order to increase the impact of their own messages and content and thereby increase their influence, authority, and followership. The system 1000 may also be utilized by an ordinary person who is interested in self-promotion of his or her content, public persona, or social media accounts. There are millions of individuals who want to build a larger online following and cultivate more engagement per content posting.

In another embodiment, transformations produced by the system 1000 may be used in the creation of a new file type, which may provide a unique marketing experience to a user. For example, a new file type may correspond to any video, audio, or text based content (or combinations thereof) that can be presented to an audience through any type of medium. This file type may automatically update its contents according to the layer-based transformations as described in this application or based on other contextual information.

In another embodiment, the system 1000 can implement custom transformations or "filters". That is, in the future it is conceivable that new visual design treatments, methods, enhancements and transformations may be computerized such that the transformation of a candidate content item may be unique to any candidate content item currently on the Internet or on the World Wide Web.

The system 1000 may also be utilized in the context of Adobe Creative Cloud design projects. For example, Adobe Photoshop is a software program used by creative professionals to design graphics and visuals, edit photos, and work on various forms of marketing content, digital art and graphics. A design file for a given image can be converted into an image format such as PNG or JPG. Photoshop also allows for files to be saved as Photoshop Document Files (PSDs). PSDs can be used to preserve editing capabilities within Photoshop such that an image can be manually edited at a later time by a designer). As a result, it is common practice for PSDs to be shared among design professionals so that designs can be edited, re-worked or otherwise changed by an individual with knowledge of Photoshop. In some implementations, the system 1000 can receive a candidate content item formatted as a PSD file, and can select and apply transformations for the candidate content item that are compatible with the PSD file.

In the system 1000, the transformations disclosed can be performed automatically, rather than manually by a human. Therefore, using the system 1000, it is not necessary to rely on designer to make changes to content items, which may be inherently subjective according to the designer's preferences. Within some content editing tools such as Photoshop, designers can utilize "layers" for graphics work and design projects. Layers separate different elements of an image or video. In digital image editing, designers use layers to work on individual parts of an image, while not affecting the other parts of the image. For example, consider an image of a girl standing outside in a garden looking down at a group of bright red strawberries. In this example, the image may have four layers so that each of the components of the image can be treated as separate entities in the overall image file, which can be formatted as a PSD file. In some implementations, each layer may be formatted as a PNG file. For example, the image of red strawberries may be in one layer of the design, the plants in the garden may be contained in a second layer, the image of the girl may be in a third layer, and the background image of a sky may be contained in a fourth layer. Other elements, such as headline text (copy), a brand logo, a call-to-action, etc. may be contained in separate layers.

It is possible that even more layers are added to separate subtle design elements that were added. In theory, a design file could have hundreds or thousands of layers, depending on the desired complexity of the design. In some implementations, the system 1000 may perform "PSD parsing," by automatically separating a PSD file by layer into individual image files (e.g., PNG or JPG). In doing so, the system 1000 can generate a unique transformation for each layer independent of the other image layers in the overall file. The system 1000 can also apply transformations to the overall PSD file. In one example, if the entire PSD is converted into one PNG file, the system 1000 can apply a transformation to that PNG file as a whole. Continuing the example above, a transformation may affect the visual appearance of the girl, the strawberries, the sky background, the garden, or any combination thereof. In another example, if the PSD file is separated into four separate PNG image files, each for one of the four image layers of the design, then the system 1000 can select a unique transformation for each layer. In some implementations, one or more layers may receive no transformation at all. In some implementations multiple elements of an image may exist in a single layer. In some implementations, if a user is an employee of a consumer brand that sells orange juice, the user of the brand marketing team may not want to make any alterations to the visual presentation of the bottle of orange juice. The color, the appearance of the label, the brand font, etc. may be protected under a style guide or brand guidelines. Therefore, the system 1000 can allow users to apply transformations only to the layers, or individual elements, of the image that the user desires to be modified. The system 1000 can thus allow the user to tag individual layers for transformation. For example, a user may tag a layer containing a product image of orange juice as a layer that should not be modified by the system. In this case, the system would treat this layer as a separate image and not perform any transformations to it according to the user's preferences.

In another embodiment, the user may select the type of transformation that can be performed to the layer containing the image of a bottle of orange juice. For example, the user may not want the visual composition of the bottle to be altered in any way, but he/she may want the system to replace the bottle with another image of a bottle that is more likely to resonate with the target audience. Therefore, the system 1000 may perform a "refresh" operation for that particular layer, in which the new image of the orange juice bottle would be more likely to resonate with the audience and also improve the score (and potential success) of the overall image. Alternatively, the user may allow for a transformation to the layer containing the bottle that moves the bottle into a different location, or adjusts the size of the bottle, within the image. In another example, the transformation that moves the bottle to a more optimized location in the image, or resizes the bottle, may be automatically deployed by the system 1000. In another example, a transformation may be applied to the layer containing the sky background, which has the effect of brightening the color blue. In yet another example, transformed images from a design file or video may be turned into a GIF format for use.

Many variations of layer-based transformations are possible in the presently disclosed system and the descriptions above are not meant to be limiting in scope in any way to the potential applications of the system 1000. In some implementations, the system 1000 may automatically detect and categorize layers of an image based on the contents it identifies while processing the image layer(s). For example, the system 1000 may apply computer vision and object and pattern detection techniques. These techniques may distinguish between a background, a cohesive object, sets of objects, etc. The system 1000 may also detect and categorize brand elements, such as a product packaging or a brand logo, and make a determination about which transformations should be applied to each layer or feature of a content item. In some implementations, the system 1000 may make a determination to apply zero transformations to one or more layers. The system 1000 may also, based upon its analysis of the layer's contents, adjust the intensity of a transformation or otherwise create and apply a new transformation to one or more elements of the layer's contents (e.g., add a special treatment to an object contained in a layer) in order to improve the contents of the layer. Transformations may also be "chained" together, such that the system 1000 can link multiple transformations together to be applied to a given content item or to a given layer within a content item.

The system 1000 may also be utilized in a similar manner with other design software, photo editing, or video production software not limited to Photoshop. In an example, similar operations to those disclosed above for graphics and design files may be applied in the context of video files (e.g., MOV, MPG, AVI, MP4, etc.) The system 1000 can parse a video into images, calculate scores (for example, scores per frame) and apply a transformation effect(s) during a time period, or number of frames, or to an individual frame in a video. The system 1000 may also determine the most relevant or engaging frames in the video. The system 1000 may also layer an effect on top of a video as a transformation. For example, if a user of the system 1000 determines that the first 3 seconds of a video represents the most critical time frame to capture a viewer, or audience's, attention, then the user may desire to only transform those first three seconds. In such an embodiment, the system 1000 may apply a set of transformations to the contents of the first three seconds of video and apply zero transformations to the video after the first three seconds. In other embodiments, the system 1000 may apply transformations to the entire video file, or to distinct segments, time periods, or individual frames of the video file. The system 1000 may also identify collections of frames with similar contents and apply the same transformation(s) to those frames. For example, if the candidate content item is a video of a man shooting a basketball, each frame of that shot may be transformed with the same transformation, e.g., applying a slight change to the hue or saturation of each successive frame. In an alternate embodiment, the transformations of related content may vary depending on the determination of the system 1000 or by user preference. For example, if the user determines that the current set of transformations applied to a particular time frame of the video do not look aesthetically pleasing, then he or she may perform an alternate transformation or instruct the system 1000 to adjust the way it is applying transformations to that video clip. The user may also want a singular video frame to be transformed. In such an example, the system 1000 may convert the video frame to an image file, such as a JPG file, and perform transformations similar to imagery. Like transformation for images described above, transformations for videos also can be informed by the user's preferences and business needs, and may have a wide range of potential applications. In yet another embodiment, the system can be utilized with Adobe Illustrator (AI and EPS files) to perform transformations. For example, the system may move, align, distribute, and transform objects in Illustrator. The system may be utilized to edit text or other elements within the graphic or perform transformations to these any of these elements.

In another implementation, the system 1000 can be utilized to automatically evaluate imagery on a webpage, webpages, or website. In this example, a user may provide a URI to a public website and the system 1000 can crawl the user-provided URI, save any images or other content items found on the site, and evaluate each content item. In such an embodiment, the system 1000 can return to the user a variety of information. For example, the system 1000 may determine the average score for each image, determine the top images, and determine how many images (and which specific images) are underperforming among a target audience. This information can then be shown to the user. Thus, the user can be able to quickly evaluate content items and take corrective action. In another example, the system 1000 can recommend transformations to the underperforming images. Similarly, the system 1000 may determine transformations that may make the website's high-performing image assets even stronger. In another example, the system 1000 may recommend a transformation which involves moving an image from one area, or page, on the site to another area, or page on the site. Another transformation may involve moving one website panel to another area or page on the site, or involve moving a particular image on a panel on a website to another panel on a website. In some implementations, the system 1000 can evaluate imagery or other within a mobile application or desktop application. The above-mentioned embodiment may be applied in a variety of contexts where contents may be evaluated and "refreshed" in order to improve performance.

As described above, the system 1000 can be used to transform various types of content items, which may include images, audio, video, text, and other features. Various examples of types of content items that the system 1000 can be used to transform or optimize are described below. It should be understood that the following examples are provided by way of illustration only, and not by way of limitation. One of skill in the art will appreciate that the types of content described below are merely exemplary, and that other types of content items also may be transformed by the system 1000 without departing from the scope of this disclosure.

Example Content Item Types that can be Transformed:

The following list includes social, digital, print, broadcast, traditional media, etc. For digital media, content items can be implemented, for example, as static creative, flash creative, rich media creative, or in other forms:

- Photographs
- Stock photos
- Landing page, webpage(s) and website images
- Social media posts
- Email message and email newsletter images
- Television and broadcast marketing
- Video, video clips, or video feeds
- Live video broadcast
- Video thumbnail image
- Display ads
- Print media
- Magazines
- Books and ebooks
- App screens
- Leaflets
- GIFs and video files
- MP3s and music files
- Newspaper
- Banners
- Billboards
- Posters
- Brochures
- Cards Flyers
Booth and trade show displays
Online marketing
Sponsored content
Organic content
Cell phone and mobile marketing
Website graphics
Mobile content
Mobile ads
Mobile coupons
Downloadable coupons
Notifications
Freestanding inserts
Look books
Print circulars
Point of sale marketing
Direct mail marketing
Product placement
Event and sports sponsorships
Menus
Guerilla marketing
PPC search ads
Display ads: static, video, cinematographic, flash, pop-up and mobile
Social ads: Facebook, Twitter, YouTube, Instagram, Pinterest, Snapchat, LinkedIn, etc.
Interactive video content items and clickable content item customizations
Augmented reality contents and experiences
Virtual reality contents and experiences
Interior design-related visuals
Architectural/building visuals
Merchandise designs
Product and material designs
Fashion designs/clothing and apparel designs
Fine art and commercial artwork
Design files (PSDs, AI, EPS)
Trade promotions
Coupons
Cartoons/Comics
Digital Art
Product ad design
Blog
Search ads
E-commerce product images, product pages/galleries, and displays
Store design
Virtual store design/Online store
Mobile store design/Mobile storefront
Carousel content items and other multi-dimensional content types
Infographic
Graph/Chart/Diagrams
Illustration
Silhouette
A "creative refresh" for a campaign
A "campaign refresh" for an entity
Video end card
Bumper
Animation
Dailies
On-figure images
Still life images
Holiday creative
On-location shoots
Studio shoots
3D art
Product labels
Sports merchandise
CSS
HTML, XHTML, HTML5
XML As disclosed herein, the system 1000 may store a huge corpus of content items from sources such as the Internet and a variety of both online and off-line content sources from which "audiences" are defined for the purpose of analysis and transformation. In the below example, content items can be harvested from any of the audience computing devices 1010, the content sources 1015, and the user computing device 1020. For example, some of these components may represent public social media accounts that are part of a defined audience. Generally, content items can be harvested by the content item harvesting module 1030.

In some implementations, the system 1000 can implement advanced artificial intelligence and machine learning techniques, such as convolutional neural networks and generative adversarial networks, to acquire and analyze content items. However, it is feasible that the system 1000 could use other collections of algorithms to accomplish a similar result. In an example, the content item harvesting module 1030 collects content items from a harvest of social media accounts of members of a defined target audience. These content items can be referred to as harvest content items.

In some implementations, the content item harvesting module 1030 can be configured to collect harvest content items that match one or more criteria. The criteria can be selected, for example, based on the target audience. For example, the content item harvesting module 1030 can collect content items having textual content (e.g., metadata, captions, hashtags, etc.) relevant to the target audience. In some implementations, the content item harvesting module 1030 can acquire such content items through an API of a website or social network. For example, if the target audience is sports fans, the content item harvesting module 1030 can search for content items (e.g., images or videos) that include the hashtags "basketball," "football," or "baseball" on one or more social networks.

The system 1000 can analyze the harvest content items, and can evaluate and rank them based on a number of characteristics including user preference data (e.g., volume of engagement on social media). In some implementations, the performance metric ranking engine 1035 can carry out the steps of ranking the harvest content items relative to one another, for example by generating a numerical score for each harvest content item that represents the performance of that content item among the target audience for a given performance metric. The higher performing content items (e.g., the content items with higher scores) with regards to the user preference data and/or audience data can be harvested by the content item harvesting module 1030 from one or more data sources. For example, if a user wanted to design the best image of a cup of coffee, the content item harvesting module 1030 could gather images from social media accounts, public search engine results, a content library, a stock photo site, a content repository associated with a marketing platform, websites and news feeds, etc., all of which may correspond to the content sources 1015.

The system 1000 can process the harvest content items to determine which transformations, or categories of transformations, the visual features of each harvest content items represent or are reminiscent of. In some implementations, the system 1000 can implement a neural network to process the harvest content items. The matching criterion manager 1040 can then process the harvest content items to produce a matching criterion for each harvest content item that can be used for comparison with other content items at a later time. In some implementations, the matching criterion manager 1040 may implement a neural network to process or classify the harvest content items in this manner. A candidate content item can be provided by a user of the computing device 1020 for transformation by the system 1000. The system 1000 can process the candidate content item, for example using the second neural network referred to above, to identify one or more harvest content items, visual attributes, or categories that match most closely with the candidate content item. In some implementations, the system 1000 can achieve this by comparing the harvest content items themselves to the candidate content item, for example via the matching criterion manager 1040. In some other implementations, the system 1000 can compare characteristics of features of the harvest content items, such as the matching criterion aspects, with those of the candidate content item or to the candidate content item itself.

In some implementations, the system 1000 may evaluate more than one candidate content item at a time. For example, the user of the user computing device 1020 may provide two or more candidate content items to the content evaluation system 1005, and the content evaluation system 1005 can evaluate the two or more candidate content items simultaneously. In some implementations, the performance metric predictor 1060 can be configured to predict performance metrics for each of the candidate content items for a given target audience, which may also be selected by a user of the user computing device 1020. The recommendation module 1045 can then generate a recommendation for the user indicating that the candidate content item most likely to be perform well with the target audience should be published. In some other implementations, the recommendation module can provide a recommendation of a transformation to be applied to one or more of the candidate content items. The transformation can be selected to increase a likelihood that the candidate content item will perform well with the target audience. In some implementations, more than one transformation can be applied to one candidate item at a time. For example, candidate content item A may receive transformation X and transformation Y, or transformation X and transformation Z, or transformation W and transformation X, etc. There can be hundreds, thousands, or millions of possible combinations for evaluating the transformation matrix and determining the best content assets. In another embodiment, candidate content item A may be transformed by transformation X (producing content item A-X), and then be separately transformed by transformation Y (producing content item A-Y). Thus, a user is capable of evaluating each transformed image against the other transformed images (or against other available images in the content library, which may or may not have been transformed by the system). This process too can create thousands and thousands of iterations.

Thus, the recommendation module 1045 can provide a best-fit transformation recommendation for the purpose of improving a selected performance metric of the candidate content item. In some implementations, the selected performance metric may be related to a target audience, as described above. The performance metric may also be a numerical score that is provided by the system 1000 (e.g., by the performance metric predictor 1060) as an objective evaluation of the quality of the content item for the particular audience. For example, the system 1000 may generate a score for a transformed content item indicating its likelihood of achieving a desired outcome (e.g., succeeding as defined by one or more performance metric) with respect to a target audience. In some implementations, the system 1000 can generate a scaled score for content items based on a predetermined scale. Thus, the system 1000 can generate a score for a content item on a scale of zero to one, one to ten, one to 100, or any other scale. In some other implementations, the system 1000 can generate a score for a content item as an absolute number based on any of a variety of factors impacting its likelihood of performing well according to a performance metric. The system 1000 can generate a percentile or percentage-based ranking in a similar manner. In still other implementations, the system 1000 can generate a non-numerical score for a content item. For example, the system 1000 may generate letter scores of A-F for a content item, with a score of "A" corresponding to the highest probability of the content item performing well. Thus, the transformation recommendations provided by the system 1000 can vary based on the candidate content item. In some implementations, the system 1000 can provide more than one transformation recommendation for the candidate content item.

Content scores provided by the system 1000 can also be compared against other known benchmarks. For example, the user may compare the score of an image against other images the user has previously used. This benchmark may be helpful to the user in comparing current or past campaigns. If a new content item scores a 55.4, but the average content item of the user's past campaigns (or existing content library) is a 32.6, then relatively speaking the content item scored 55.4 may be expected to a better content item (e.g., a higher-performing content item according to one or more performance metrics). In another example, the system 1000 can evaluate an audience benchmark. For example, if a content item scores a 55.4 out of 100, that may be perceived as a low scoring content item on its face. However, if that score is in the top 99th percentile of all content that the target audience consumed that week, then that may be determined to be a strong content item among other creatives that audience had been shown. This superior content quality may lead to greater awareness, memorability, and recall among a target audience. Similar types of score comparisons can be derived and displayed for image categories, content categories, content repository or libraries, marketing channels, competitor, competitor sets, industry, file type, etc. a user of the system 1000 who performs competitor benchmarking can use the scoring mechanism provided by the system 1000 as an objective measure with which to evaluate a campaign and/or a content item against the campaign and/or content items of competitors. The user could also apply these scores in determining comparisons of website imagery, social media imagery, etc.

In another embodiment, an individual content item can receive multiple numerical scores, e.g., one for each of the user's target audiences. That is, a content item can be scored for more than one target audience at a time. For example, if a user uploads an image of a bicycle to the system, that image may score a 45 among Men, a 56 among Men in Boston, a 45 among sports fans, a 60 among bikers, a 97 among female sports fans, etc. Thus, content items can be scored within demographic target audiences, brand audiences, competitor audiences, interest and psychographic audiences, behavioral audiences, conversation groups (i.e., people who are talking about a topic or keywords), or any combination thereof, or any type of target audience that is of interest to the user. For any given content item, a user can evaluate how the asset is likely to fare with different groups of people, customers, or prospective customers. Multi-audience scoring evaluations such as these can be performed while the content is being designed, after the content is created, before it is published, or after the content is published.

In some implementations, the user can select a transformation to apply to the candidate content item, for example, via a user interface provided by the system 1000. However, in some other implementations, the system 1000 can be configured to apply the transformation automatically to the candidate content item without a user input. By applying the transformation, the system 1000 generates a transformed content item. The system 1000 can return the transformed content item to the user as a new visual or media asset, along with one or more projected performance metrics or scores generated by the performance metric predictor 1060 or the performance metric ranking engine 1035. In some implementations, multiple versions of the candidate content item can be returned to the user, each with a different candidate transformation, and each candidate transformation may be associated with a respective predicted performance metric.

It should be understood that, in some implementations, the candidate content item can be uploaded directly into the system 1000 by the user computing device 1020. In some implementations, the system 1000 can cause the candidate content item to be uploaded. In some other implementations, the system 1000 can retrieve the candidate content item from a database, via browser extension, or via API connection to another application, website, or content repository, or via desktop client, mobile app, or chatbot, which may be represented in FIG. 10 by the content sources 1015 or the audience computing devices 1010.

In another embodiment, the system 1000 can allow a user to evaluate images outside of the platform while they are on the Internet. This may be particularly useful when the user is on other web-based business and marketing application software, or while the user is on a social network, a website, or on stock photography and other image-rich domains or competitor properties. In one particular example, which is not meant to be limiting, the system 1000 may provide the user with access to a browser plugin (e.g., for Google Chrome), which is linked to an account of the user maintained by the system 1000. In some implementations, such a browser plugin can be provided to the user by the GUI generation module 1075. This could also be achieved with an application integration on certain websites or with certain web-based software providers. In the case of a browser plugin, for example, the user would have the option to right-click-analyze an image (similar to how users on the web can right-click "save as" for an image or link). This function can allow the user to quickly assess the quality and viability of a particular image that the user found on the Internet. For example, if the user is trying to choose between ten images of sunsets to purchase from a stock photography website, the user can select each one and evaluate the images with respect to a target audience using the system 1000, in order to determine a likelihood that the target audience will find it engaging. The evaluation or score provided can thus allow the user to make a more informed decision.

Additionally, the plugin can be configured to detect, grab, and display a series of images or other content items found on a webpage that a user is currently visiting. These images may be shown to the user in an overlaid screen and displayed as a "gallery" of various images. In this example, the user can utilize the system functionality to evaluate, rank, and score all of the images simultaneously (or in sequential fashion by selecting the individual images the user wants to be evaluated) on a page against a particular target audience, or selection of target audiences. This can allow the user to quickly compare many images and make a more rapid determination of the best image for his/her particular purpose. The scores may also be displayed to the user upon an image hover as the user's cursor "hovers" on top of the image in question on a webpage, for example. The user may also use this tool and similar tools made possible by the system 1000 disclosed herein when evaluating images on their websites, social properties, or other competitor's properties in order to determine when certain optimizations are available. There are many such use cases and the examples above are not meant to limit the scope of potential ways that users may employ this technology.

In another example, the GUI generation module 1075 may provide a user with access to a user interface via an application, such as an application executing on a mobile device (e.g., the user computing device 1020). The application may be linked to an account of the user maintained by the system 1000, similar to the browser plugin described above. The application may provide a user interface that allows the user to analyze an image or other content item stored on the device that executes the application. For example, the user could make use of the application to quickly evaluate a photo stored in a photo library on the user's computing device or content management system or cloud storage system. In some implementations, the application can transmit selected content items from the user computing device 1020 (or from another location) to the system 1000 for evaluation, and can return the results of the evaluation to the users computing device 1020. In some implementations, the system 1000 can evaluate more than one item at a time, thereby allowing the user to evaluate any number of photos or other content items stored on the user's computing device to determine which content items are likely to be most effective with a target audience. For example, the user can upload a batch of content items to the content evaluation system 1005 for simultaneous evaluation. Such an implementation may be particularly valuable for users who frequently publish content (e.g., photos or videos) stored on a mobile computing device, such as a smartphone, as it would enable these users to more easily determine which content items are likely to be most popular among their followers or among any other target audience.

In some implementations, the system 1000 can provide the user with a voice-activated interface. Such functionality can be provided along with, or separate from, any of the GUIs discussed above, such as a web browser extension of a standalone application. Generally, a voice-activated interface can allow a user to provide voice commands (e.g., via a microphone of a user computing device) allowing the user to perform any of the functions discussed above in connection with the various GUIs described above. For example, the system 1000 can allow a user to select or publish a content item, such as a transformed content item, via a voice command. In addition, the system 1000 can be configured to support other voice-activated commands. In some implementations, the system 1000 may be configured to process voice data corresponding to natural language. Thus, a user may be able to interact with the system 1000 by issuing voice commands such as "show me alternate examples," "transform this image," "show me an image example with a different X," "what are my top colors," "show me images that are engaging my audience," "rank these images," "resize my logo," "remove my logo," change color X to color Y," "change the background," "transform layer X," "what is the score of this image," "how does this image score with audience X", "how does this image score against a competitor," "optimize this image," "build me a mood board," "find me the best image of X," etc.

As discussed briefly above, the harvest content items are not limited to being harvested from social media accounts. For example, in some implementations, the system 1000 can harvest images from anywhere on the World Wide Web or from any accessible database or data store. The system 1000 could also harvest content items from a marketing platform that maintains a stored record of past creatives, along with the relevant performance data, that were used in campaigns, which may have been used to target a particular audience in a campaign at a particular time with a certain set of characteristics, budget, copy etc. The harvest content items may also be part of a dataset that is not owned or maintained by the user.

As described above, the system 1000 can be used to transform content items to achieve a variety of performance metrics. Various examples of performance metrics that the system 1000 can be used to optimize for are described below. It should be understood that the following examples are provided by way of illustration only, and not by way of limitation. One of skill in the art will appreciate that the types of performance metrics below are merely exemplary, and that the system 1000 can be configured to achieve other types of performance metrics than those described below without departing from the scope of this disclosure.

Sample Content Performance Metrics:

Impressions
Clicks
Engagement (e.g., social media engagement)
Number of followers
Follower growth rate
Shares
Comments
Time on site
Time viewing content item
Sales
Sales lift
Revenue growth
Repeat sales
Conversions
Cost per lead
Cost per click
Cost of customer acquisition
Churn rate
Customer retention rate
Content Downloads
Inbound links
Lead quality score
Relevance score
Cost per thousand (CPM)
Lead volume
Subscribers (blog, newsletter, email, etc.)
Website traffic (e.g., monthly)
Unique website visitors
Customer lifetime value
Lead to sale conversion rate
Cost per order
Net promoter score
Profitability
Referrals
Frequency
Fatigue
Click through rate
Number of view views
Cart size
Order size
Average purchase value
Response time
Market share
Brand recall
Ad recall lift
Market penetration
Household penetration
Memorability
Brand association
Qualified leads (e.g., per month)
Net profit margin
Gross margin
Monthly recurring revenue (MRR)
Employee happiness
Social media sentiment
SEO keyword ranking
SEO traffic
Social media mentions
Call abandonment
Resolution rate
Customer satisfaction score
Dwell
Churn prevention
Unit share
Relative market share
Brand penetration
Unit share
Awareness
Top of mind
Purchase intent
Likeability
Loyalty
Willingness to refer/provide referral
Share of voice
Net reach
Gross ratings points
Page views
Frequency response
An attraction metric
Unsubscribe rate
Uniqueness
Resonance
Relevance The system 1000 may optimize content items against any criteria or metadata that is related to the content being processed by the system 1000. For example, the system 1000 can examine a set of webpages visited by one or more users, and can apply a weight to the "value" of each content item on those pages based on the amount of time the user stayed on the page. In another example, the system 1000 can weight each content item by whether or not that content item led to the user completing some action of interest (e.g., filling out a form or adding a product to a shopping cart). The system 1000 can also be configured to place a higher value on content items that have received more viewer activity, comments, social media engagement or have been "Pinned" by users most often with a Pinterest-like plug in.

In some implementations, to make a content item more engaging, the system 1000 can be configured to determine how unique the content item is relative to other content items viewed by the target audience, or to transform the content item to increase its uniqueness. For example, the system 1000 can extract various features from the candidate content item as well as from a set of harvest content items. In some implementations, the system 1000 can examine the frequency of the features of the candidate content item within the sample of harvest content items, and can determine a score of the candidate content item's uniqueness. For example, if the features of the candidate content item appear infrequently in the harvest content items, the system 1000 can determine a relatively higher score relating to the uniqueness of the candidate content item. In some other implementations, the system 1000 can be configured to generate a vector representing a plurality of features of the candidate content items, as well as vectors representing the features of each of the candidate content items. The system 1000 can then determine the uniqueness of the candidate content item based on distance between the vector for the candidate content item and the vectors for the harvest content items. It should be understood that, in some implementations, the system 1000 can use digital representations other than vectors to calculate the uniqueness of a candidate content item in a similar manner to that described above. In some implementations, some of the features examined by the system 1000 to determine the uniqueness of a candidate content item may be features that are not readily apparent to a human consumer of the candidate content item.

In some embodiments, to transform the candidate content item to increase or decrease the candidate content item's uniqueness, the system 1000 may replace less unique features within the sample of harvest content item with more unique features. For example, the system 1000 may determine a frequency of a first feature (e.g., the color red on a hat or a horn sound) within the sample of harvest content items. The system 1000 may also determine a frequency of a second feature (e.g., the color blue on a hat or a whistling sound) within the sample of harvest content items. The system 1000 may compare the two frequencies. If the system 1000 determines the first feature is more common than the second feature (e.g., the first feature is present in more harvest content items than the second feature), the system 1000 may transform the candidate content item by replacing the first feature with the second feature. Similarly, to decrease the candidate content item's uniqueness, if the system 1000 determines the first feature is less common than the second feature, the system 1000 may replace the first feature with the second feature. Thus, the system 1000 may automatically transform the candidate content to be more or less unique to the sample of harvest content items.

In some implementations, the system 1000 can evaluate a content item based on a variety of performance metrics as described above, including one or more performance metrics relating to engagement. Generally, engagement can refer to any type or form of interaction with a content item by an audience member. For example, engagement can relate to a number of views, a number of shares, a number of likes, a number of comments, or any other number of user interaction events experienced by the content item among the target audience. Thus, engagement can be a measure of a level of interest that the target audience has in a content item relative to other content items. In some implementations, engagement may relate to resonance or relevance of a content item among the target audience.

In some implementations, the system 1000 may use audience activity data on a social network to inform the transformation of candidate content items for use in a campaign. Alternatively, the system 1000 may use historical response data to one or more campaigns. For example, the performance measurement module 1065 can be configured to track one or more metrics relating to a response of members of a target audience to various harvest content items. Metrics relating to audience response can include, for example, clicks, views, sales, etc. These campaigns may have targeted the same or a similar audience as the one that is currently being targeted now. The system 1000 may examine one company's past campaigns, e.g., the performance of a coffee seller's marketing creative towards an audience made up of coffee drinkers. In some implementations, the system 1000 may examine a competitor or competitor set of marketing creative performance (e.g., the response rates to a competing coffee seller's last two campaigns on a particular platform). The system 1000 may also combine multiple audience or marketing measurement datasets in order to inform the transformations. The system 1000 may also learn from the performance data of other companies who are not competitors, but who are trying to market and sell to the same audience.

After performing these transformations, the system 1000 can return new transformed versions of the candidate content items. The user may then choose to download, share, edit, or publish the transformed content items, for example in a campaigns. Once a campaign is live (e.g., currently in progress), the system 1000 can be configured to suggest and/or enact new transformations to the content items of the campaign based on new data as it becomes available. The data used to inform the new transformation may be audience activity data from one or more digital sources, such as a social network or website or mobile or web or desktop application software, or it may be based on the response rates to the present creative assets, or to any other external datasets that can be used as "signals" as to inform the selection of one or more transformations. For example, the system may integrate with a website analytics software and may recommend an image transformation in order to increase new visitors to a company's website. The amount of traffic to the company's website can be tracked in real-time and thus the system 1000 can use the traffic information to determine changes to the creative in order to optimize the company's performance against the goal of maximizing new website traffic. Any number of business, marketing, or sales goals may be calibrated to the system 1000 in such a manner. The system 1000 may enact new transformations based on a user's desire to reach a new target audience, or desire to refresh content previously published to a current target audience, the process of which may involve producing one or more variations of previously transformed content.

As described above, the system 1000 can be used to transform content items in a variety of ways. Various examples of transformations that the system 1000 can perform on candidate content items are provided below. It should be understood that the following examples are provided by way of illustration only, and not by way of limitation. One of skill in the art will appreciate that the types of transformations below are merely exemplary, and that the system 1000 can be configured to perform other types of transformations than those described below without departing from the scope of this disclosure.

Sample Types of Content Item Transformations:

Word choice, such as synonyms.
Sentence structure, punctuation, syntax
Language
Adding keyword, phrase, or hashtag
Adjust word order or sentence order
Adding, changing or removing an emoji or symbol
Adjusting the tone or sentiment of the content
Move the location of an image on a webpage
Replace the image on a webpage
Adjust the text on a webpage
Move the location of text on a webpage
Edit, move or replace a panel on a webpage Edit, move or replace the contents of a panel on a webpage (e.g., an image on a panel)
Adjusting color histogram of the image, RGB and HEX value modifications
Manipulate HSV color space. Adjust the image along the color spectrum, e.g., slightly increase HSV values
Adjusting the saturation of the image
Adjusting the composition of the image
Adjusting the layout or balance of the image
Manipulating the edges of the image
Adjusting the symmetry of the image
Changing, moving or altering the focal point of the image
Pixelate a certain area or feature of the image (pixelization effect)
Emboss the image
Apply Photoshop photo effects
Apply a negative effect
Apply an infrared effect to an image
Apply an X-Ray effect
Apply a bokeh effect
Apply a blooming effect
Apply a vignetting effect
Adjust the framing of the photo
Add a border to the image or a feature/element of the image
Enhance the edges in the image
Invert the image
Invert the colors of the image
Adjust shading/shadow or lighting
Adjusting the amount and location of white space in the image
Adjusting the resolution of the contents
Adjusting the hue, tint, or tone of the contents
Adding a specific image feature, such as an object
Restyling of 1 or more image features, such as objects, products, scenes, visual elements
Replacing of 1 or more image features, such as objects, products, scenes, visual elements
Applying an overall stylistic filter to the entire image
Applying a gradient, accent, or overlay to the image or to a specific area of the image.
Add a logo or watermark
Add a call-to-action
Resize the call to action
Move the location of logo or branding features
Adjust the color, font or style of the headline, text or call-to-action
Move the location or position of an image feature, such an object, product, call-to-action, button, etc.
Adjust the lighting or brightness
Adjust the scene (e.g., beach, living room, kitchen, restaurant, football stadium, etc.)
Change the background color or scenery
Adjust the time of day (daytime/nighttime)
Adjust contrast of the image
Adjust the shade and shadow
Apply a transformation that makes the image to look like a cartoon
Apply a transformation to make the image look like an illustration or artwork
Add infographic-like elements to the image
Insert new text into the image
Turn an image featuring a single product into an image of a product collage
Adjust the size and location of the headline text, or main text, etc.
Adjust the texture of the image
Adjust the font of text in an image
Add a pattern to the contents
Add a shape to the image
Adjust the shape of certain contents
Manipulate the edges, contours, and boundaries of the image features
Turn the image to be gray scale
Applying a transformation to one layer in the image design file
Applying a transformation to a collection of layers in the image's design file
Adjust the forms, lines and angles of elements of the image
Adjust the spatial context or spatial relation of items in the image
Remove one or more layers in the image
Move or replace contents in one or more layers in the image
Adjust the size of objects in an image
Adjust the sharpness or blurriness of a photo
Apply a blur effect to a layer in an image
Applying a negative effect or inverting certain colors in the visual content
Crop/re-crop an image (for example, to fit the optimal dimensions for a certain platform, such as a Google banner ad, Facebook ad, etc.)
Increase the size of the text
Shrinking the size of the text in an image
Adjust the highlights in the image
Apply a "zoom" transformation to either zoom-in or zoom-out on the particular image
Crop the image in one or more areas
Rotate the placement of certain objects in the image.
Adjust the photo temperature
Adjust the opacity of the image
Add a person in the image
Adjust certain features of the people in the image, such as hair color, or hairstyle, facial hair, etc.
Adjust the clothing colors, variations, styles or items they are wearing in the image
Adjust age features of the people in the images
Adjust facial look (feature enhancement, makeup, distortion, gender, e.g., Snapchat filters).
Add a person of a certain ethnicity into the contents
Adjust the action or scenario of the image
Combine multiple elements of two or more images
Warp the image
Adjust the time of day of the image
Apply a gradient or pattern to the image
Adjust the perspective of the photo (or image layer)
Adjust the emotion or sentiment of a person in the image or photo
Adjust the positioning or posture of a person in the image
Adjust the facial prominence
Adjust playback speed of a video or GIF
Change the size of a video or GIF
Splice a section out of a video or splice two videos together
Generate a highlight reel of one or more video clips or video files
Make a video montage from images and/or videos
Choose the optimal thumbnail for a video
Transform the thumbnail image for a video using any of the transforms described here
Transform a GIF using any of the transforms described here

- Chang the image into a video or GIF by animating a feature
- Changing the file format of a video or image
- Changing a video into a GIF or vice versa
- Make a video or GIF loop in a different way. E.g., going forward through all frames and then reversing rather than starting back at the beginning.
- Adjustments to the audio content and audio files
- Adjustments to acoustic features of a voice recording
- Adjustments to a musical score
- Adjustments to the tone, pitch, prosody, etc. of someone speaking live
- Pitch correction.
- Edit the start time and stop time of the video.
- Edit the start time and stop on the audio file
- Edit the duration of any sound on the audio file
- Add or adjust fades into or out of a clip, or between clips
- Add a cross-fading effect
- Change the audio by means of compression
- Change the audio by means of equalization
- Add other effects to the video, image, and/or audio files.
- Identify the optimal take(s) from a video or audio recording session
- Add a flanging effect to the audio
- Add a reverb effect to the audio
- Adjust noise reduction effect
- Transform a video frame, still image, or collection of frames in a video
- Layer an effect on top of a video
- Apply a transformation to a specific time period in a video
- Splice video frames into a GIF
- Convert longer-form video contents into shorter-form contents (e.g., truncating a video from 30 seconds to 3 seconds)

In general, the system 1000 may create a huge amount of new data related to the types of creative and content attributes and specific optimizations that are effective with a target audience, or that are effective for a particular program or campaign goal. In some implementations, this information can be leveraged to generate data products and tools in addition to the outputs of the system 1000. For example, if ten companies use the system 1000 to optimize their respective content items for campaigns and programs for sports fans, the system 1000 can produce a rich dataset on what works well (or does not work well) with sports fans, according to at least one performance metric. It should be understood that, in this example, each company may be selling very different types of products in their programs. For example, a first company may sell athletic shoes, a second company may sell event tickets, a third company may sell airline and travel tickets, a fourth company may sell sporting goods, etc. Thus, the dataset produced by the system 1000 in this example can be a highly valuable dataset based on which new transformations or combined transformations may be derived and offered to other users at a later time. The same dataset and analysis insights can be applied to produce a tool that generates designs for new retail or sports merchandise. It can additionally be utilized to inform marketing and customer service initiatives tailored for that audience.

In addition, datasets such as those described in the example above may have applications that are useful in areas outside of marketing. For example, transformations can be applied directly to any kind of content item including text (including characters and symbols), images, and video that are viewed on a screen or computing device. Also, such transformations could be applied to applications that are involved in the planning, production, or refinement of physical goods or services, or in many different areas of design. That is, the systems and methods described herein have applications in industries and business processes that involve physical and real-life design choices.

In some implementations, the system 1000 may be used to generate an audio transformation. That is, the system 1000 could transform a candidate audio content item in an audible manner along many different dimensions. For example, if an audio content item is targeting users who are elderly or hard of hearing, the system 1000 may transform the audio content item to adjust the vocals to be higher in tone, pitch, prosody, etc. In general, any aspect of the acoustic features of the voice may be subject to transformation by the system 1000. In another example, the system 1000 may make adjustments to the music playing in the content, or swap in new musical elements. The system 1000 may also increase the volume of such sonic content. This could be particularly useful in for audio included in content items, training and instruction videos, entertainment, and in other video broadcasts.

For example, if the system 1000 determined that a target audience for a content item including audio is more receptive to a narrator or voice actor who has a female British accent, the system 1000 may be able to transform the original voice recording to reflect the desired vocal and/or musical attributes that would be optimized for maximum business performance. This may be achieved by swapping out the current narration of the audio content item with pre-recorded narration or by applying one or more transformations to an audio file corresponding to the audio content item and/or editing the audio file automatically.

In some implementations, the system 1000 may be used to select a particular person (e.g., an actor, a model, etc.) to be featured in a particular image or other content item, from among a group of people. For example, images containing one or more people may be uploaded and received by the system 1000. The system 1000 can then determine which images are optimal based upon an analysis of various attributes of the people in the images. These attributes may include facial or body attributes. Based on this analysis, the system 1000 can select a subset of one or more of the people depicted in the images for inclusion in a candidate content item directed towards a target audience, based on a likelihood that content items including the selected subset of people are likely to perform well according to at least one performance metric. In an example, a user may upload a candidate content item and may select a target audience, and the system 1000 can determine and provide recommendations for ideal characteristics of people to be depicted in the content item. The system 1000 may recommend that a person having particular attributes, such as age, gender, race, ethnicity, etc., should be included in the content item to make the content item more appealing among the target audience. For example, the system 1000 may determine that including an image of a middle-aged person in the content item could result in better performance than including an image of a young person in the content item. Similarly, the system 1000 can be further configured to select a particular middle-aged person from among a group of middle-aged people whose photos are available, based on an analysis of the photos indicating that a content item including an image of the selected person is likely to perform better among the target audience than a content item including an image of a different person. It should be understood that the system 1000 could determine any combination of attributes or numbers of such people to include in a content item.

One of skill in the art will appreciate that the examples described above are illustrative only, and are not intended to be exhaustive of the types of applications that may be relevant to the system 1000. By way of example, the following list provides a variety of other types of applications and technology areas that may benefit from the systems and methods described herein.

Other Applications for the Systems and Methods Described Herein:

- Virtual reality and augmented reality applications
  - Transform the contents of AR and VR applications, digital experiences, and visual environments.
- Gaming
  - Transform the contents of mobile, console, PC gaming, etc.
  - Transform a still image in a gaming environment.
- Entertainment
  - Transform the contents of television programs, motion pictures, sports games, live video broadcasts etc.
- Ecommerce/Retail
  - Transform the presentation of products or selection of products in an ecommerce store, or in-store display/aisle.
  - If a user's preference for the color purple is known, content items shown to the user (e.g., via a website or a touchscreen interface inside a store) may be displayed with a purple treatment. Alternatively, items that are close to the preferred purple color can be emphasized.
- Fashion
  - Inform and transform new styles of apparel, clothing, accessory designs, etc.
  - Transformations can be used for the purpose of informing fabric selections and purchases, and even in textile generation
- Architecture and construction
  - Transform the structural design, layout, and materials composition.
  - Transform computer-aided designs (CAD) developed by architects and architecture professionals.
  - Transform the presentation of the building in photography and collateral.
- Interior design, graphic design, industrial design, app design, web design, art direction, logo design, etc.
  - Transform visual design assets, photos, and new digital creations to be more on-audience.
- Product Design & product variations
  - For example, a can of beer may be transformed. In another example, the structural design of a home appliance may be transformed. In another example, the design of a pair of women's tennis shoes may be transformed to inherit the qualities of footwear that appeal to that audience.
- Merchandising & Product packaging
  - Inform and transform the product display and packaging, and labeling of a wide variety of consumer products from cereals to chewing gum.
- Travel and transportation
  - Transform the content that is being displayed on screens in the airplane
  - Transform the locations and scenes that are displayed to prospective travelers on a digital screen or website Transform the images of travel destinations that are displayed to users in search results, on websites, and on other digital media.
- Search Results (e.g., from a search engine)
  - Transform the way that webpage contents are displayed to a particular site user. For example, the order and priority of the URIs may change. The site descriptions themselves may change (text optimization) depending on who the search user is. The image content on the site or on an individual webpage may transform as well, such as the landing page of a website.
  - Promoted offers in search listings (e.g., Google Ads) may transform as well.
- Paper, plastic, boxes, etc.
  - Transformations can be applied to physical products and printed products, e.g., patterns on cardboard boxes, containers, posters, displays, etc.
- Inventory management
  - Design transformations for certain products may also integrate and inform inventory purchase decisions and inventory management. For example, if the system 1000 determines that red sandals will appeal most to the audience of users, then the system may recommend and/or trigger that more red sandals should be ordered, produced, and delivered to a particular location or website for consumption by the target audience.
  - Similarly, the system may determine that in order to induce more sales of red sandals, digital marketing content items should be transformed to include color-based transformations that emphasize shades of red. The system may also perform a transformation to include or emphasize sandals in the visual assets.
- Retail and Sports merchandise
  - Transform branded merchandise materials, e.g., the look and feel of jerseys and novelty items and the display of such items in promotional materials.
- Customer service
  - Transform the communications and content that are being sent to one or more customers, either in digital or non-digital formats.
  - Transform the experiences that customers receive in call-centers or via online chat mechanisms.
- Programming and computing
  - Automatically adjust or re-write code in an application based on the audience activity, user preference or response data. This could also inform the adjustment of a configuration setting or inform an engineering priority and/or task to be accomplished to optimize user experience or application performance.
- Printing and 3D printing
  - Transform the printing settings and design choices to emphasize the design attributes that are preferred by a user or target audience.
- Automotive
  - Transform the design, manufacture and promotion of new automobile models and the presentation of such vehicles and accessories in promotional materials.
- Digital billboards
  - Transform the content that is displayed to passersby in a personalized manner according to the visual preferences of the passersby.
- Store displays
  - Transformations to the digital display technologies in a retail store, e.g., text-based content items may be displayed in a larger font when an older individual views them. Preferred items, fonts, designs, etc. may be emphasized as well.

Figure 11:
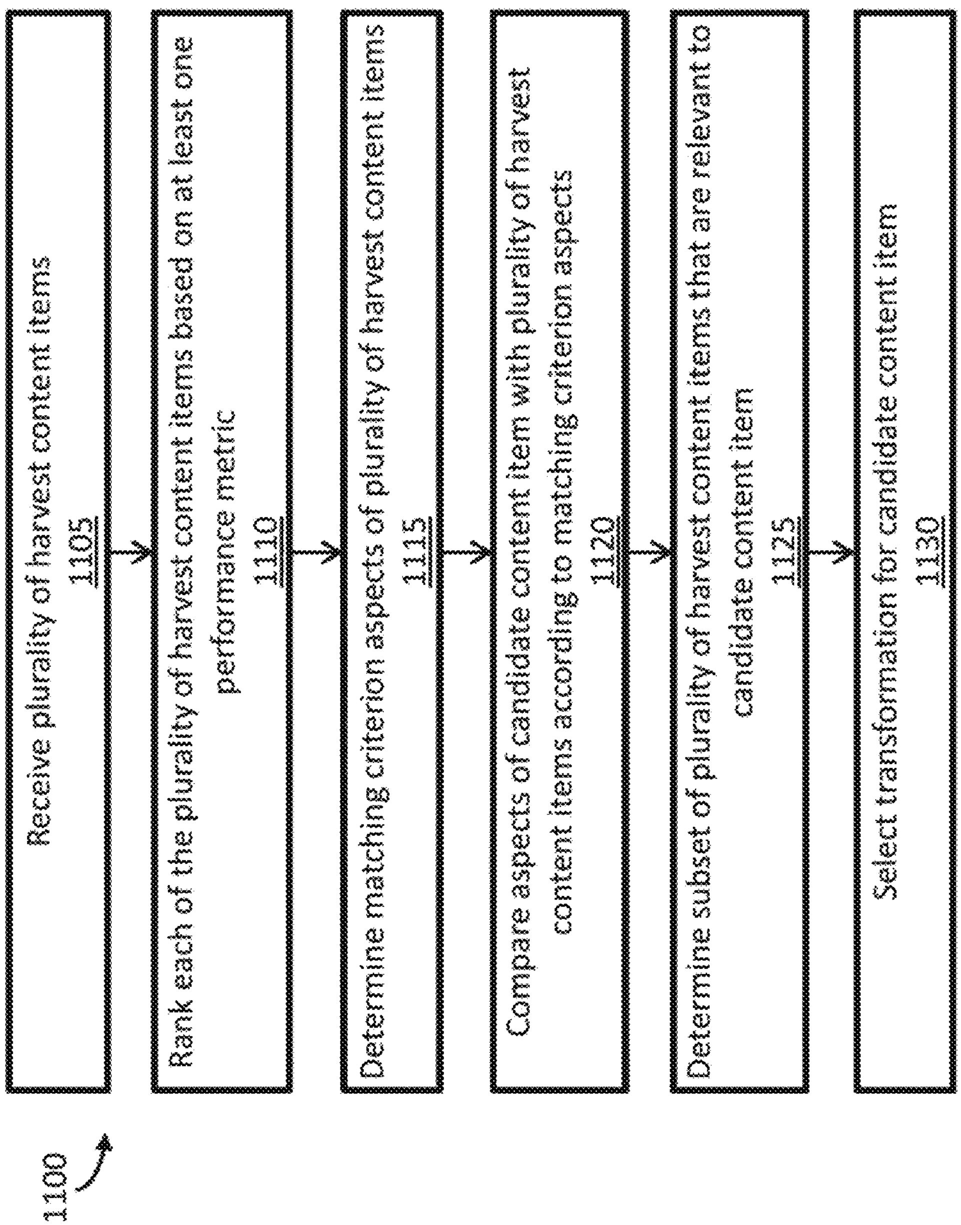
FIG. 11 is a flow diagram illustrating a method for transforming one or more content items in accordance with an illustrative embodiment.

Photography
Video production and motion graphics
Video design
Art direction
Graphic design
Web design
Interior design
Fashion design
Product design
Merchandising
Animation
User experience design
Industrial design
Interactive design
Instructional design
Music videos
Computer fine art and commercial art
Illustration
Parametric design
Store design and showroom design
Virtual store design (e.g., e-commerce store)
Creative writing
Copywriting/content writing
Screenwriting
Expository writing
Persuasive writing
Descriptive writing
Narrative writing
Dramatic writing
Academic writing
Writing literature (fiction and non-fiction)
Poetry
Comics
Journalistic Writing
Biography and autobiographical writing
Technical writing
Corporate videos
Webinars
Culture videos
Event videos
Presentation videos
PowerPoint videos
Online video marketing
Promotional videos
Testimonial videos
Product videos
Sizzle reels/Highlight reels
Marketing videos
Real estate videos
Training videos
Tip series videos
Explainer videos
Educational videos
Infomercials
Travel videos
Wedding videos
Documentary videos
Ceremonial videos
Video public service announcements (PSAs)
Interview videos
Digital journalism/news videos
Music videos
Television commercials
Digital art
Streaming online content experiences
Subscription contents
Sales contents and materials FIG. 11 is a flow diagram illustrating a method 1100 for transforming one or more content items in accordance with an illustrative embodiment. In some implementations, the method 1100 can be performed by a system such as the system 1000 shown in FIG. 10. In brief overview, the method 1100 includes receiving a plurality of harvest content items (operation 1105), ranking each of the plurality of harvest content items based on at least one performance metric (operation 1110), determining matching criterion aspects of the plurality of harvest content items (operation 1115), comparing aspects of a candidate content item with the plurality of harvest content items according to the determined matching criterion aspects (operation 1120), determining a subset of the plurality of harvest content items that are relevant to the candidate content item based on the comparison of the aspects of the candidate content item with the plurality of harvest content items (operation 1125), and selecting a first transformation for the candidate content item (operation 1130).

Referring again to FIG. 11, the method 1100 includes receiving a plurality of harvest content items (operation 1105). In some implementations, this operation can be performed by a content item harvesting module such as the content item harvesting module 1030 shown in FIG. 10. The content item harvesting module can receive the content items from any content source, such as the content sources 1015, the audience computing devices 1010, or the user computing device 1020 shown in FIG. 10. The content items can include text entries, images, GIFs, videos, audio data, or any other type or form of content. In some implementations, the content item harvesting module can be configured to harvest the content items based on a particular target audience. The target audience can be selected based on a preference of a user. For example, a user may provide one or more candidate content items to the content evaluation system 1005, along with an indication of a target audience. Thus, if the user works at a business selling sporting goods, the content item can be content item for sporting goods and the target audience can be people who are interested in one or more sports. In this example, the content item harvesting module can be configured to harvest content items that are relevant to the selected audience of people interested in sports. For example, the content item harvesting module may harvest content items from social media accounts associated with professional sports teams or other businesses that market to sports fans. The content item harvesting module also may harvest content items from social media accounts of individuals who appear to have an interest in sports.

The method 1100 also includes ranking each of the plurality of harvest content items based on at least one performance metric (operation 1110). In some implementations, this operation can be performed by a performance metric ranking engine such as the performance metric ranking engine 1035 shown in FIG. 10. The ranking can be based, for example, on audience measurement data that may be collected by a performance measurement module such as the performance measurement module 1065 shown in FIG. 10. In some implementations, the performance metric ranking engine can be configured to generate a numerical score for each harvest content item that represents the performance of that content item among the target audience for a given performance metric. Examples of such performance metrics are provided above.

The method 1100 also includes determining matching criterion aspects of the plurality of harvest content items (operation 1115). In some implementations, this operation can be performed by a matching criterion manager such as the matching criterion manager 1040 shown in FIG. 10. In general, the matching criterion aspects can be any aspect, characteristic, or category of the content items, such as those described above. For example, for image-based content items, matching criterion aspects may include colors included within the images, objects or people included within the images, filters applied to the images, or any other visual aspects of the images. In some implementations, a matching criterion aspect may include a category of one or more content items. For example, category information can be stored in electronic content items as metadata, or may instead be inferred based on other characteristics of the content item. There is no limit to the number of matching criterion aspects that can be selected by the matching criterion manager. The matching criterion manager can also be configured to compare aspects of a candidate content item with the plurality of harvest content items according to the determined matching criterion aspects (operation 1120). As described above, the candidate content item can be received from a user (e.g., from the user computing device 1020 shown in FIG. 10), and may generally correspond to any content item that the user is considering publishing and would like to have evaluated or transformed prior to publishing. The matching criterion manager can compare any or all of the identified matching criterion aspects of each of the harvest content items with corresponding aspects of the candidate content item in order to determine harvest content items that are similar to the candidate content item. The matching criterion manager can similarly determine harvest content items that are relevant for a particular candidate transformation, or for a performance evaluation of a new content item or campaign.

The method 1100 includes determining a subset of the plurality of harvest content items that are relevant to the candidate content item based on the comparison of the aspects of the candidate content item with the plurality of harvest content items (operation 1125). In some implementations, this operation also can be performed by the matching criterion manager. In some implementations, the subset of the plurality of harvest content items can include those harvest content items having the highest number of matching criterion aspects that are similar to corresponding aspects of the candidate content item. It should be understood that there is no limit on the number of harvest content items that can be included in the identified subset of harvest content items. In some implementations, each pair of content items including the candidate content item and one of the harvest content items can be assigned a numerical score representing a degree of similarity between the two content items, and the identified subset of harvest content items can include all of the harvest content items whose corresponding pair has a score exceeding a predetermined threshold. In other implementations, the subset of harvest content items can be determined in a different manner. For example, the subset of harvest content items may include content items that are not necessarily most similar or relevant to the candidate content item, but are most relevant to the candidate content item according to a different metric. In other implementations, the candidate content item may be determined to be relevant to all harvest content items, rather than to a subset of content items.

The method 1100 also includes selecting a first transformation for the candidate content item (operation 1130). In some implementations, this operation can be performed by a recommendation module such as the recommendation module 1045 shown in FIG. 10. The first transformation can be any of the transformations described above. In some implementations, the first transformation is selected to make at least one characteristic of the candidate content item more like the at least one characteristic of a first harvest content item of the subset of the plurality of harvest content items that is ranked more highly than a second harvest content item of the subset of the plurality of harvest content items. Thus, the transformation can be expected to result in a transformed content item that also is likely to be ranked more highly than the original candidate content item. The characteristic can relate to any quality of the content item that can be perceived by an audience. For example, the characteristic can be any visual characteristic (e.g., if the content item includes image or video data) or any auditory characteristic (e.g., if the content item includes audio). The transformation can be any alteration of any portion of the content item that results in a change in the identified characteristic.

In some implementations, the method 1100 also can include applying the selected transformation to the candidate content item to generate the transformed content item. For example, the transformation can be applied by a content transformation module such as the content transformation module 1050 shown in FIG. 10. In some implementations, the content transformation module can be further configured to select an intensity of the transformation to be applied. For example, if the transformation to be applied is determined to be a red treatment applied to an image-based candidate content item, the content transformation module can be configured to select a degree to which the red treatment should be applied. This can include determining color parameters such as hue and saturation level to be applied across the candidate content item, or to particular locations, or layers, within the candidate content item. It should be understood that the term "intensity" can refer to different characteristics depending on the selected transformation. Generally, the term intensity can relate to a degree to which the content item is altered from its original state by application of the selected transformation. Thus, a higher intensity can result in a content item that has been altered more heavily relative to the alteration applied to a content item whose transformation intensity is relatively lower.

In some implementations, the method 1100 also can include calculating a score for the candidate content item. For example, such a score can be calculated by a performance metric predictor such as the performance metric predictor 1060 shown in FIG. 10. The score can be calculated based on a performance metric and a target audience. In some implementations, the user that provides the candidate content item for analysis and transformation also can provide an indication of the performance metric and target audience to be used in the calculation of this score. Generally, the score may relate to a likelihood that the candidate content item will perform well with the target audience in relation to the selected performance metric. In some implementations, the recommendation module can be configured to select the first transformation (i.e., operation 1130 of the method 1100) such that, upon application of the first transformation to the candidate content item to generate a first transformed content item, a score of the first transformed content item is improved, or is likely to improve, relative to the score of the candidate content item.

In some implementations, the performance metric predictor can be configured to calculate the score based on a variety of factors or attributes of the content item or of features in the content item. For example, the performance metric predictor can calculate the score based on any combination of the following attributes: layout and composition, position, symmetry, balance, arrangement (e.g., golden mean, rule of thirds), object location, depth of field, angle of view, focal point, view point, vantage point, foreground/background content, white space/negative space, cropping, framing, color scheme, hue, tint, temperature, tone, contrast, saturation, brightness, shade, mood, line, angles, noise, contours, gradients, texture, repetition, patterns, blowout, blooming, concentricity, cubic attributes, geometric attributes, shadow, blocked shadow, vignetting, objects, scale, number of objects, position of objects, spatial context, proportion, shapes, shape of objects, number of shapes, attributes of objects, form, perspective, representation, path, scenery, time of day, exposure, time lapse, typography, position of headline, size of headline, length of text, location of call-to-action, typeface, font, location of faces, posture/pose of people, location of figures, gestures, action/activities of people, number of people, hair color of people, ethnicity of people, gender of people, age of people, expressions and emotions of people, facial attributes, clothing and appearance, accessories, resolution, orientation, icons, emojis, logos, watermarks, etc. It should be understood that this list of attributes is exemplary only, and should be not read as limiting the scope of this disclosure.

It should be understood that, in some implementations, the recommendation module may not be limited to recommending transformations for a candidate content item. For example, in some other implementations, the recommendation module can be configured to recommend an alternate candidate content item, if the user provides more than one content item for evaluation, or if the system has access to a plurality of other content items. The user may not have provided these other content items. Thus, in some implementations the method 1100 can include calculating a score each of two or more candidate content items, and the recommendation module can recommend choosing, selecting, prioritizing, improving, or publishing the candidate content item having the highest score, without applying any transformation to the candidate content items.

Furthermore, it should be noted that the recommendation module may recommend more than one type of transformation for a single candidate content item. For example, in some implementations the method 1100 can include determining two or more different transformations, either or both of which may be applied to a single candidate content item to improve the score of the candidate content item. In some implementations, the recommendation module can provide an indication of the two or more different transformations to the user who provided the candidate content item. In some other implementations, the indication can be provided to the user by a user alert module such as the user alert module 1070 shown in FIG. 10. As discussed above, such an indication can be provided via a GUI that may be implemented as a browser extension, a standalone application, or through other means. Such a GUI may be generated, for example, by a GUI generation module such as the GUI generation module 1075 shown in FIG. 10. The GUI also can allow the user to provide feedback to the content evaluation system. Thus, in some implementations, the method 1100 can further include receiving a user input corresponding to a selection of at least one of the two or more transformations recommended to the user. The content transformation module can then apply the selected one or more transformations to the candidate content item, and can return the transformed content item to the user. The user feedback may also be captured after a transformation has been applied to one or more candidate content items. User feedback may also be captured after a particular campaign has launched or concluded.

In some implementations, after a content item (which may be an original candidate content item or a transformed content item) has been published, the method 1100 can further include determining a response of the target audience to the content item. In some implementations, this operation can be performed by audience performance measurement module such as the performance measurement module 1065 shown in FIG. 10. The response can include any type and form or interaction or response from the target audience, such as a number of clicks, a total or average duration of time during which members of the target audience viewed or otherwise interacted with the content item, sales that result from audience interaction with the content item, sales performance during the time period of the campaign, week-to-week sales performance from channel partners and retailers, household penetration figures, etc. In some implementations, the recommendation module also can be configured to recommend at least a second target audience for the published content item. For example, the content evaluation system can be configured to determine a second audience among which the content item is likely to perform well according to at least one performance metric, and the recommendation module can generate a recommendation corresponding to this second target audience. The recommendation can then be provided to the user. In this way, the system can inform the user of new target audiences who that the user may not have considered, and which are likely to respond well to the user's content items.

In some implementations, the method 1100 can further include determining an updated score for a published content item (e.g., either an original candidate content item or a transformed content item) based on the response of the target audience to the published content item. Thus, the updated score may indicate that the audience has become either more or less receptive to the content item over time. This operation can be performed, for example, by the performance metric predictor. In some implementations, the performance metric predictor also can be configured to select an additional transformation for the content item based on the updated score. For example, the additional transformation can be selected such that, upon application of the additional transformation to the content item by the content transformation module, a score of the content item is improved relative to the updated score of the content item in its previous state. The user alert module or the recommendation module can be configured to provide a message to the user including a recommendation to apply the additional transformation to the content item.

Figure 12:
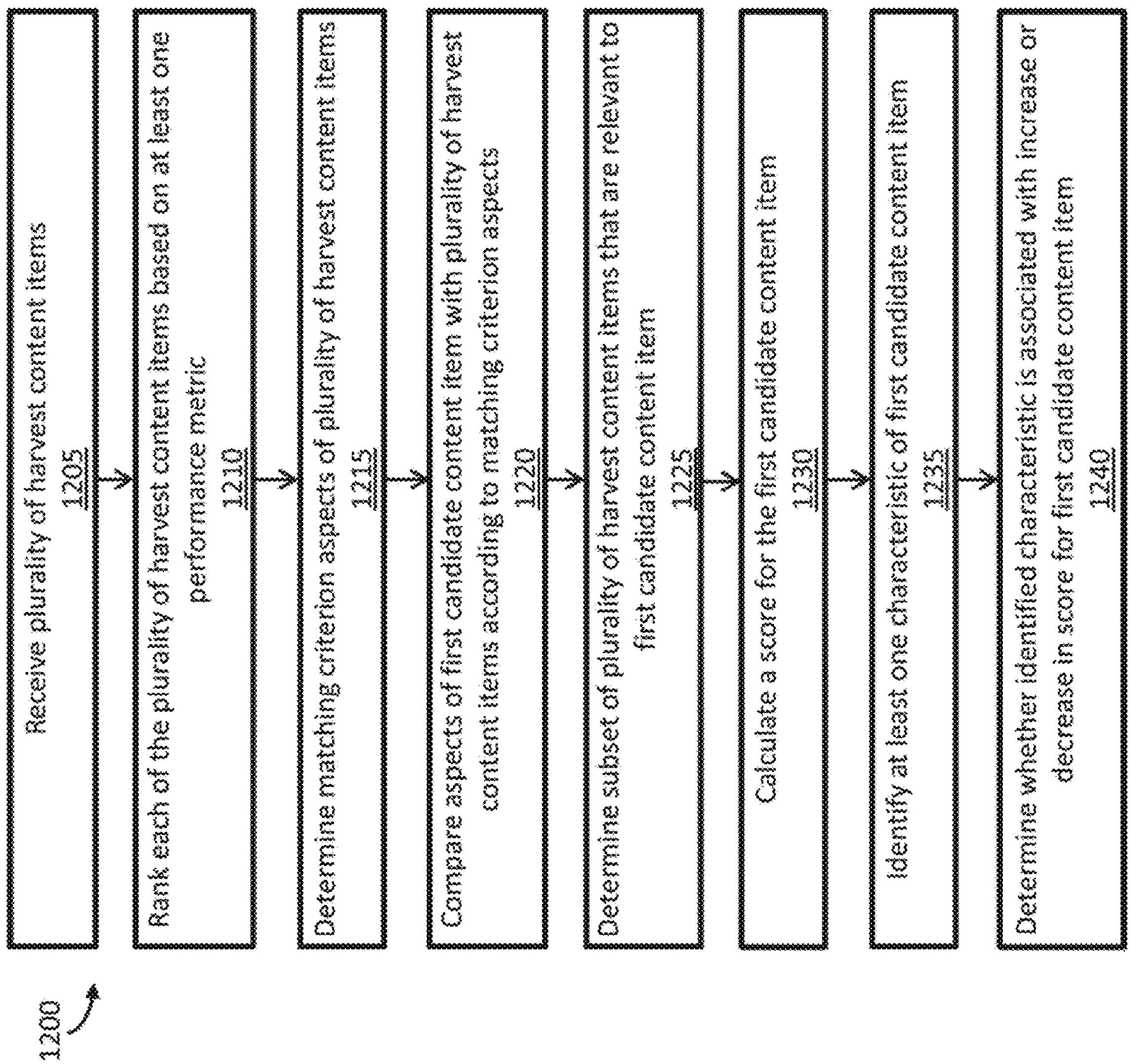
FIG. 12 is a flow diagram illustrating a method for evaluating one or more content items in accordance with an illustrative embodiment.

FIG. 12 is a flow diagram illustrating a method 1200 for evaluating one or more content items in accordance with an illustrative embodiment. In some implementations, the method 1200 can be performed by a system such as the system 1000 shown in FIG. 10. In brief overview, the method 1200 includes receiving a plurality of harvest content items (operation 1205), ranking each of the plurality of harvest content items based on at least one performance metric (operation 1210), determining matching criterion aspects of the plurality of harvest content items (operation 1215), comparing aspects of a first candidate content item with the plurality of harvest content items according to the determined matching criterion aspects (operation 1220), determining a subset of the plurality of harvest content items that are relevant to the first candidate content item based on the comparison of the aspects of the candidate content item with the plurality of harvest content items (operation 1225), calculating a score for the first candidate content item (operation 1130), identifying at least one characteristic of the first candidate content item (operation 1235), and determining whether the identified characteristic of the first candidate content item is associated with a likely increase or a decrease in the score for the first candidate content item (operation 1240).

Referring again to FIG. 12, the operations 1205, 1210, 1215, 1220, and 1225 are similar to operations 1105, 1110, 1115, 1120, and 1125, respectively, of the method 1100 described above, and can be performed in a similar manner. The method 1200 also includes calculating a score for the first candidate content item (operation 1130). In some implementations, this step is carried out by a performance metric predictor such as the performance metric predictor 1060 shown in FIG. 10. The score can be calculated based on at the least one performance metric and at least one target audience. As described above, the user that provides the first candidate content item for analysis also can provide an indication of the performance metric and the target audience to be used in the calculation of this score. Generally, the score may relate to a likelihood that the candidate content item will perform well with the target audience in relation to the selected performance metric. It may also be inferred that more highly scored content items increase the likelihood of higher performing campaigns.

The method 1200 also includes identifying at least one characteristic of the first candidate content item (operation 1235) and determining whether the identified characteristic of the first candidate content item is associated with an increase or a decrease in the score for the first candidate content item (operation 1240). In some implementations, these operations can be performed by a recommendation module such as the recommendation module 1045 shown in FIG. 10. The characteristic can be any type or form of characteristic of the first candidate content item, including any visual, text, or auditory characteristic. In some implementations, the method 1200 can further include providing a message to the user including information corresponding to the determination of whether the identified characteristic of the first candidate content item is associated with an increase of a decrease in the score for the first candidate content item. Thus, the user can be alerted to the fact that the characteristic is predicted to be beneficial or harmful to the performance of the first candidate content item among the target audience. Low performing or low-value characteristics may also be omitted from the set of transformed contents that are presented to the user.

In some implementations, the method 1200 can further include receiving at least a second candidate content item from the user, calculating a score for the second candidate content item, and ranking the first candidate content item and the second candidate content item according to their respective scores. The scoring and ranking of the second candidate content items can be performed, for example, by the performance metric predictor in a manner similar to that used for scoring the first candidate content item. The ranking can indicate which of the first candidate content item and the second candidate content item is likely to perform better with the target audience based on the performance metric. In some implementations, the alert module can also be configured to provide a second message to the user including information corresponding to the ranking of the first candidate content item and the second candidate content item.

Figure 13:
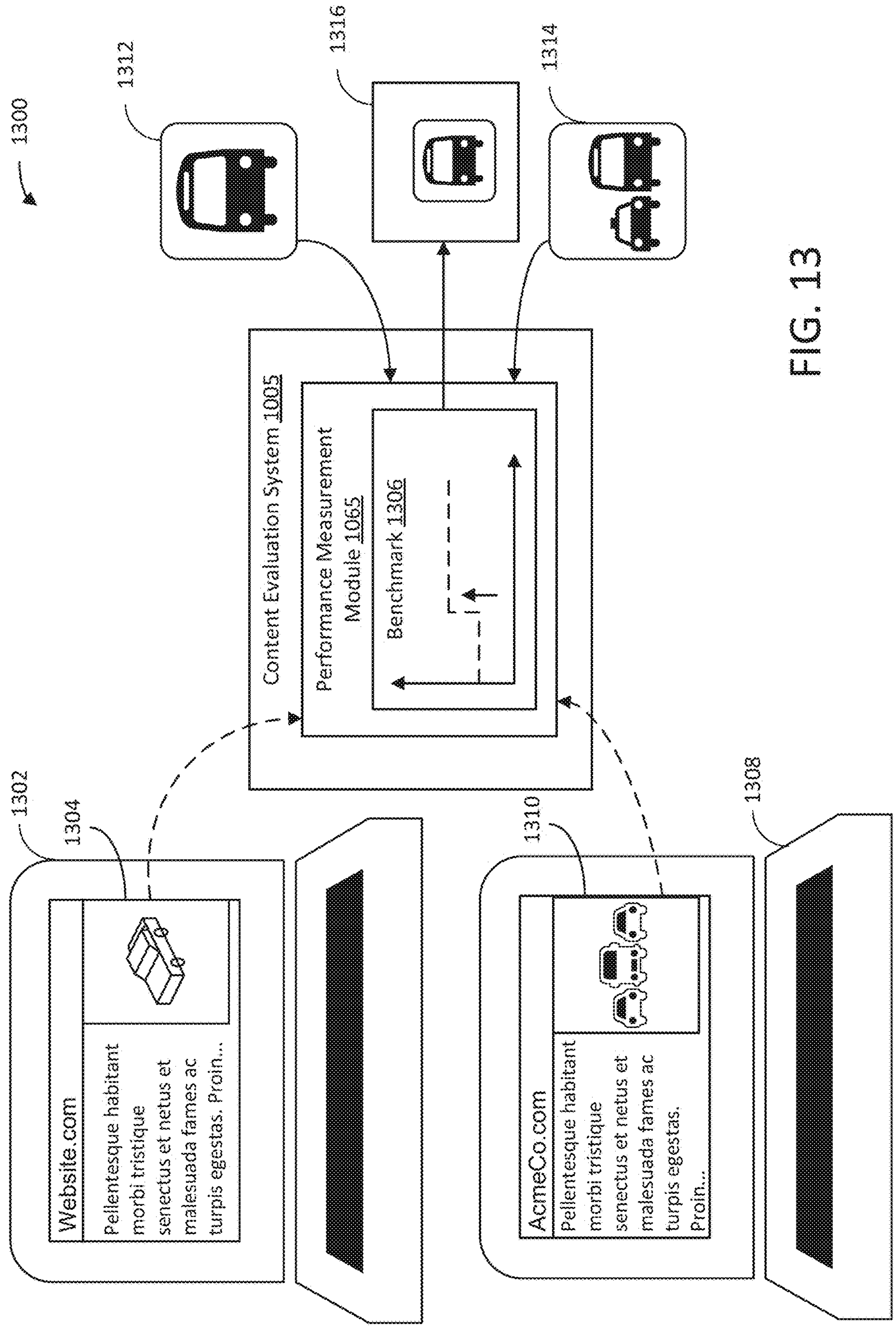
FIG. 13 is a sequence diagram illustrating automatically generating and adjusting a target audience benchmark in accordance with an illustrative embodiment.

FIG. 13 is a sequence diagram illustrating automatically generating and adjusting a target audience benchmark in accordance with an illustrative embodiment. In brief overview, FIG. 13 illustrates a sequence 1300 in which, via the performance measurement module 1065 the content evaluation system 1005 accesses multiple web-based properties (e.g., websites) and extracts content items (e.g., images) from the web-based properties. The measurement module 1065 uses the extracted content items to generate a benchmark for a particular target audience (e.g., subset of people with a common characteristic or a common interest) that indicates the likelihood that a target audience would interact with any particular content item if they were to see it on a website. After generating the target audience benchmark, the content evaluation system 1005 continues to extract images from further web-based properties or monitors (e.g., via webhooks or APIs) the web-based properties for new content items and extracts the new content items from the web-based properties and updates the target audience benchmark to maintain an accurate and up-to-date benchmark. The content evaluation system 1005 then compares new images to the benchmark to determine whether to generate a recommendation to use the new images on websites that have been designated as pertaining to the target audience. As described herein, solely for succinctness, each reference to an image may be a reference to a video.

The content evaluation system 1005 accesses a first web-based property. As described herein, a web-based property may be or include any number of web pages, image files, websites, or other electronic content that can be accessed by the content evaluation system 1005. In some examples, the target audience itself can be defined in terms of one or more web-based properties. For example, the target audience can include users who view, or follow, a particular web-based property, or otherwise engage with its published contents. In some implementations, the target audience may be a group of users that share a common interest (e.g., sports) or characteristic (e.g., age). The first web-based property may be stored on or maintained by a first computing device 1302. The content evaluation system 1005 may access the first web-based property from the first computing device 1302 and extract the images (e.g., image 1304) that are on or that are otherwise associated with the web-based property.

The content evaluation system 1005 may use different techniques to extract images from web-based properties depending on the type of the web-based properties. For example, to extract images from a website, the content evaluation system 1005 uses web scraping techniques. To do so, the content evaluation system 1005 loads the URLs of the different pages of the website and renders each of the pages using their URLs. The content evaluation system 1005 then identifies the images on the pages, selects the images, and creates one or more files that contain the images. In another example, the content evaluation system 1005 extracts images from a web-based database. The database may be a cloud storage database that is accessible to the content evaluation system 1005 and may contain one or more images. The content evaluation system 1005 may transmit a request for images to the computer that hosts or maintains the database and the computer may transmit the images to the content evaluation system 1005.

The content evaluation system 1005 stores the extracted plurality of images in a database (e.g., the database 1008). The content evaluation system 1005 may store the plurality of images in the database with a stored relationship with the same target audience identifier (e.g., a string that is unique to the target audience within the database, such as a sports target audience having a "sports" string identifier) as the target audience identifier of the first web-based property. For instance, the content evaluation system 1005 may store an identifier (e.g., a URL) of the web-based property in a database with an identifier of a particular target audience. The content evaluation system 1005 may determine the extracted images originated at the web-based property based on the content evaluation system 1005 extracting the images from the web-based property. The content evaluation system 1005 identifies the stored association (e.g., a relationship in a relational database) of the web-based property with the target audience and store an association between the extracted images from the web-based property and the target audience identifier accordingly. Thus, if the content evaluation system 1005 ever receives a request to retrieve images that correspond to the target audience, the content evaluation system 1005 may retrieve the images that have stored associations with the target audience identifier in the database to respond to the request.

The content evaluation system 1005 retrieves images from the database that have a stored association with the target audience. The content evaluation system 1005 may retrieve the images in response to a request to generate a target audience benchmark for the target audience. For example, the content evaluation system 1005 may receive a request to generate a target audience benchmark for a target audience that likes sports. In response, the content evaluation system 1005 queries the database using sports as a keyword to identify the images in the database that have a stored relationship with the string sports. In doing so, the content evaluation system 1005 may retrieve the images from the first web-based property and/or images from any other web-based property that has a stored association with the string sports in the database.

The content evaluation system 1005 executes a neural network (or any other machine learning model) to generate a performance score (e.g., a score indicating a likelihood that a particular user would interact with an image) for each of the retrieved images. The content evaluation system 1005 may execute the neural network using the retrieved images as input to generate performance scores for each of the images.

In some implementations, the content evaluation system 1005 inputs the images into the neural network one image at a time by creating feature vectors from the images. To do so, for each image, the content evaluation system 1005 may extract pixel data (e.g., values indicating different characteristics about the pixels of the image such as color, hue, brightness, etc.) and create a vector with the extracted values. In some implementations, the content evaluation system extracts features from the image using a feature extraction neural network and creates a vector with the extracted features. The content evaluation system 1005 applies the feature vector into the neural network and the neural network may output a performance score for the image. The content evaluation system 1005 may iteratively create feature vectors for each of the images that were stored in the database with associations with the target audience identifier to generate performance scores for each of the images.

In some implementations, the content evaluation system 1005 may create feature vectors from images by extracting individual features from the images. For example, the content evaluation system 1005 may input an image into a feature extraction neural network. The feature extraction neural network may be configured to automatically extract features from the image. Such features are or include descriptors of the image such as identifications of objects within the image, colors within the image, scenery within the image, shades of colors within the image, etc. In this example, the content evaluation system 1005 executes the feature extraction neural network with the image and outputs values for the different features, thus extracting features from the image. The content evaluation system 1005 formats the extracted features into a feature vector for the image by setting the values for the extracted features at different index values of the vector. The content evaluation system 1005 then stores the feature vector in the database with associations with the target audience identifier. The content evaluation system 1005 may similarly generate feature vectors for any number of images. Further detail about how the content evaluation system 1005 can extract features from an image to create a feature vector using a neural network can be found in U.S. patent application Ser. No. 16/236,298, the entirety of which is incorporated by reference herein.

In some implementations, the content evaluation system 1005 retrieves the neural network responsive to the neural network being trained to simulate the target audience when generating performance scores for images. The content evaluation system 1005 may retrieve the neural network that corresponds to the target audience by selecting the neural network from a plurality of neural networks based on the neural network having a stored relationship with the target audience identifier of the target audience for which the target audience is generating a benchmark. Advantageously, by using a neural network that has been trained to generate performance scores for a particular target audience, the content evaluation system 1005 is able to more accurately predict performance scores for images that correspond to the specific target audience.

In some implementations, the content evaluation system 1005 has previously trained the neural network to simulate the target audience. For example, the content evaluation system 1005 may train the neural network using images from web-based properties that correspond to the target audience. The content evaluation system 1005 may train the neural network using image metadata such as interaction data (e.g., amount of time viewed, number of comments, number of likes, ratings, etc.) indicating an amount of interaction users had with the images. For instance, the content evaluation system 1005 may input training images from web-based properties that correspond to the target audience into the neural network. The content evaluation system 1005 executes the neural network using the training images as inputs to generate performance scores. The content evaluation system 1005 then uses the interaction data for the individual images as labels for the correct performance scores. The content evaluation system 1005 may use back-propagation techniques based on differences between the predicted performance scores and the interaction data to tune weights of the neural network to more accurately predict performance scores for images in the future. Advantageously, by generating a neural network in this manner, the content evaluation system 1005 may be able to accurately simulate individual target audiences to determine how images will perform for the respective target audiences. Further detail about how the content evaluation system 1005 can train a neural network to simulate a particular target audience can be found in U.S. patent application Ser. No. 16/236,298.

The content evaluation system 1005 calculates a target audience benchmark 1306. The content evaluation system 1005 may calculate the target audience benchmark 1306 by calculating an average, median, or mode of the performance scores that were generated by the neural network. For example, if executing the neural network for five images caused the neural network to generate performance scores of 20, 25, 50, 75, and 90, the content evaluation system 1005 may calculate the median of the performance scores to be 50. The content evaluation system 1005 will then set the benchmark 1306 for the target audience by storing the value of 50 in a database as the benchmark for the target audience (e.g., store an association between a benchmark identifier and the calculated value). The content evaluation system 1005 may use any function on the performance score for the images to calculate the benchmark 1306 for the target audience.

In some implementations, the content evaluation system 1005 calculates a distribution of performance scores when calculating the target audience benchmark for a target audience. The distribution is or includes counts of the number of images of the target audience with performance scores at set performance score values or within different performance score ranges. For example, the content evaluation system 1005 may maintain a counter for each of performance score ranges 1-25, 26-50, 51-75, and 76-100. In this example, the content evaluation system 1005 applies the images of the target audience to the neural network to determine a performance score for each image and increments the counters that correspond to each range when the neural network outputs a performance score for the respective range. In implementations in which the content evaluation system 1005 determines distributions for set performance score values, the content evaluation system 1005 similarly maintains and increments counters for each value (e.g., each value between 1 and 100). The content evaluation system 1005 may continue to update the distribution (e.g., increment the counters of the distribution) as the content evaluation system 1005 ingests further images. In response to any requests to evaluate an image's performance score with the target audience, the content evaluation system 1005 generates and presents a user interface that includes the distribution with the performance score for the image at the requesting device. Thus, the content evaluation system 1005 provides a graphical representation of how the evaluated image compares with other images that are associated with the same target audience.

In some implementations, the content evaluation system 1005 accesses a second web-based property from a second computing device 1308. The content evaluation system 1005 may access the second web-based property responsive to determining the second web-based property has a stored association with the same target audience identifier as the first web-based property. For example, the first web-based property may have a stored association with a "sports" string in the database. The content evaluation system 1005 may query the database using the sports string as a keyword to identify another web-based property (e.g., a URL of another web-based property) that has a stored association with a sports string. In this example, the content evaluation system 1005 identifies the second web-based property based on the query and accesses and extracts images from the second web-based property. The content evaluation system 1005 may do so similar to how the content evaluation system 1005 accesses and extracts images from the first web-based property. The content evaluation system 1005 then stores the extracted images in the database with stored associations with the target audience identifier similar to how the data processing stored the images from the first web-based property.

The content evaluation system 1005 adjusts the benchmark 1306 for the target audience based on the images from the second web-based property. The content evaluation system 1005 may do so by generating performance scores for the images from the second web-based property (e.g., image 1310) using the neural network and recalculating the benchmark 1306 based on the new performance scores. For example, the content evaluation system 1005 may input the images from the second web-based property into the neural network to generate a performance score for each image. The content evaluation system 1005 may then aggregate the performance scores into a data set with the performance scores for the images from the first web-based property. The content evaluation system 1005 determines the average (or any other metric as described above) of the performance scores of the data set and set the new average of the performance scores to be the new benchmark 1306, thus increasing or decreasing the benchmark 1306 for the target audience to a more refined value.

After generating and/or adjusting the benchmark 1306, the data processing system uses the benchmark 1306 to determine whether to recommend uploading an image. For instance, the data processing system may receive two uploaded images, image 1312 and image 1314. The data processing system receives the images 1312 and 1314 after a user uploads the images 1312 and 1314 via a user interface on a computing device. The data processing system receives a request to score the uploaded images 1312 and 1314 for a target audience (e.g., the same target audience for which the content evaluation system 1005 generated the benchmark 1306). The content evaluation system 1005 may receive the request after a user selects the target audience at a user interface (e.g., the same interface that the user used to upload the images). The user may have selected the target audience from a drop-down list on the user interface or otherwise provided an indication to score the images from the user interface.

The content evaluation system 1005 selects the neural network. The content evaluation system 1005 may select the neural network from the database based on the target audience for which the user requested performance scores. For example, the content evaluation system 1005 may select the neural network by using an identifier for the target audience as a lookup in the database and retrieve the neural network that has a stored association with a matching identifier.

The content evaluation system 1005 executes the neural network to determine performance scores for the two uploaded images 1312 and 1314. To do so, the content evaluation system 1005 may generate a feature vector for each of the images 1312 and 1314 as described above. The content evaluation system 1005 may then separately input or apply the feature vectors to the neural network to generate a first performance score for the image 1312 and a second performance score for the image 1314.

The content evaluation system 1005 compares the performance scores to the benchmark 1306. The content evaluation system 1005 may compare the first performance score to the benchmark 1306 to determine a first difference between the first performance score and the benchmark 1306. The content evaluation system 1005 may compare the second performance score to the benchmark 1306 to determine a second difference between the second performance score and the benchmark 1306. Such differences may be positive or negative depending on whether the performance scores are higher or lower than the benchmark 1306.

Accordingly, because the benchmark 1306 represents an average or is otherwise representative of how other images typically score with the target audience, the data processing system may determine how the images would perform with the target audience compared to the average image. Such may be advantageous, for example, if a particular target audience is not prone to interacting with images on web-based properties, thus causing performance scores of images for the target audience to be lower than typical scores for other target audiences. A user seeking to evaluate images against a metric that is specific to the target audience to avoid audience bias (e.g., if a target audience typically has average performance scores of 20 out of 100, a performance score for an image of 30 would be considered high even though the average performance score for all target audiences together may be 50) may use the benchmark 1306 to avoid such bias when selecting images.

The content evaluation system 1005 compares the first difference to the second difference. The content evaluation system 1005 may do so by determining if the first difference is higher than the second difference. Responsive to determining the first difference is higher than the second difference, the content evaluation system 1005 generates a record 1316 (e.g., a file, document, table, listing, message, notification, etc.) comprising an identification of the image 1312. Responsive to determining the second difference is higher than the first difference, the content evaluation system 1005 generates a record (not shown) comprising an identification for the image 1314.

In some implementations, the content evaluation system 1005 generates the records for the image 1312 or the image 1314 by generating a recommendation to upload the image 1312 or the image 1314 to a web-based property. The recommendation may include a string of text that includes identifications of the images (e.g., "Image A" or "Image B"). The content evaluation system 1005 generates the record and transmits the record to the computing device that submitted the request to score the images. Thus, the content evaluation system 1005 automatically determines which images to recommend uploading to a web-based property to optimize the performance of the images. The content evaluation system 1005 may do so while minimizing the number of images (and therefore the computer resource requirements) that are required to obtain a target interaction rate for a particular web-based property.

Figure 14:
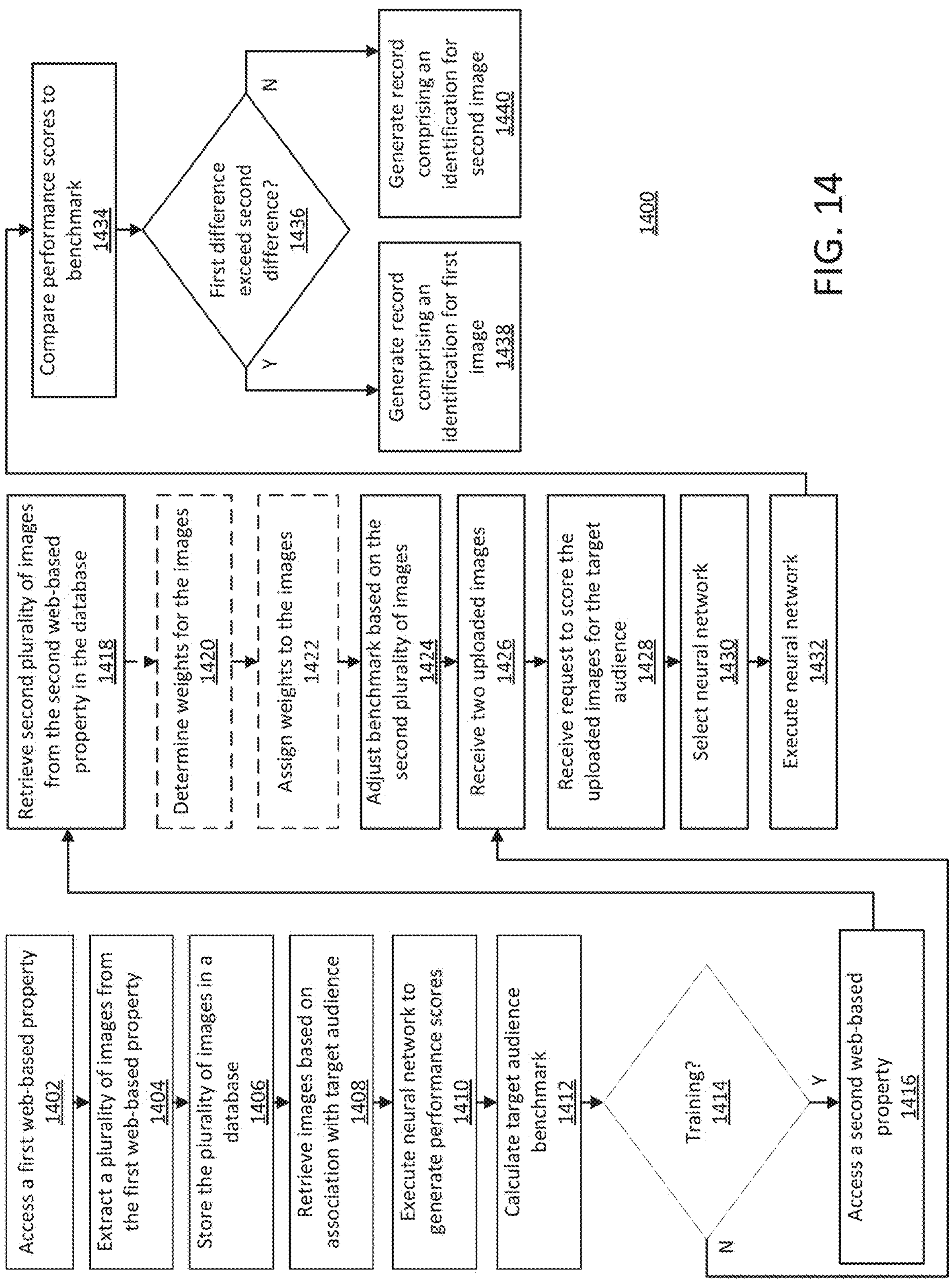
FIG. 14 is a flow diagram illustrating a method for automatic benchmark generation in accordance with an illustrative embodiment.

FIG. 14 is a flow diagram illustrating a method for automatic benchmark generation in accordance with an illustrative embodiment. In some implementations, the method 1400 can be performed by a data processing system such as any of the components of the system 1000 shown in FIG. 10. The method 1400 may include more or fewer operations and the operations may be performed in any order. Performance of method 1400 may enable the data processing system to generate performance score benchmarks for different target audiences using a machine learning model. The performance scores may indicate how the images will likely perform with a target audience (e.g., how likely members of the target audience are to interact with the image). For example, using one or more neural networks, the data processing system generates a benchmark for a target audience based on images or other content items from various web-based properties that have stored associations with the target audience. The data processing system then compares new images to the benchmark to determine whether to recommend for the new images to be uploaded to a website that is typically visited by members of the target audience. As described herein, solely for succinctness, each reference to an image may be a reference to a video.

At operation 1402, the data processing system accesses a first web-based property. As described herein, a web-based property may be or include any number of web pages, image files, websites, or other electronic content that can be accessed by the data processing system. In some examples, the target audience itself can be defined in terms of one or more web-based properties. For example, the target audience can include users who view, or follow, a particular web-based property, or otherwise engage with its published contents. In some implementations, the target audience may be a group of users that share a common interest (e.g., sports) or characteristic (e.g., age). The data processing system may access the first web-based property and, at operation 1404, extract the images that are on or that are otherwise associated with the web-based property.

The data processing system may use different techniques to extract images from web-based properties depending on the type of the web-based properties. For example, to extract images from a website, the data processing system may use web scraping techniques. To do so, the data processing system loads the URLs of the different pages of the website and render each of the pages using their URLs. The data processing system then identifies the images on the pages, select the images, and create one or more files that contain the images. In another example, the data processing system extracts images from a web-based database. The database may be a cloud storage database that is accessible to the data processing system and may contain one or more images. The data processing system may transmit a request for images to the computer that hosts or maintains the database and the computer may transmit the images to the data processing system.

At operation 1406, the data processing system stores the extracted plurality of images in a database. The data processing system may store the plurality of images in the database with a stored relationship with the same target audience identifier (e.g., a string that is unique to the target audience within the database, such as a sports target audience having a "sports" string identifier) as the target audience identifier of the first web-based property. For instance, the data processing system may store an identifier (e.g., a URL) of the web-based property in a database with an identifier of a particular target audience. The data processing system may determine the extracted images originated at the web-based property based on the data processing system extracting the images from the web-based property. The data processing system may identify the stored association (e.g., a relationship in a relational database) of the web-based property with the target audience and store an association between the extracted images from the web-based property and the target audience identifier accordingly. Thus, if the data processing system ever receives a request to retrieve images that correspond to the target audience, the data processing system may retrieve the images that have stored associations with the target audience identifier in the database to respond to the request.

At operation 1408, the data processing system retrieves images from the database that have a stored association with the target audience. The data processing system may retrieve the images in response to a request to generate a target audience benchmark for the target audience. For example, the data processing system may receive a request to generate a target audience benchmark for a target audience that likes sports. In this example, the data processing system queries the database using sports as a keyword to identify the images in the database that have a stored relationship with the string sports. In doing so, the data processing system may retrieve the images from the first web-based property and/or images from any other web-based property that has a stored association with the string sports in the database.

At operation 1410, the data processing system executes a neural network (or any other machine learning model) to generate a performance score (e.g., a score indicating a likelihood that a particular user would interact with an image) for each of the retrieved images. The data processing system may execute the neural network using the retrieved images as input to generate performance scores for each of the images.

In some implementations, the data processing system inputs the images into the neural network one image at a time by creating feature vectors from the images. To do so, for each image, the data processing system may extract pixel data (e.g., values indicating different characteristics about the pixels of the image such as color, hue, brightness, etc.) and create a vector with the extracted values. In some implementations, the content evaluation system 1005 extracts features from the image using a feature extraction neural network and creates a vector with the extracted features. The data processing system applies the vector into the neural network and the neural network outputs a score for the image. The data processing system may iteratively create feature vectors for each of the images that were stored in the database with associations with the target audience identifier to generate performance scores for each of the images.

In some implementations, the content evaluation system 1005 creates feature vectors from images by extracting individual features from the images. For example, the content evaluation system 1005 may input an image into a feature extraction neural network. The feature extraction neural network automatically extracts features from the image. Such features are or include descriptors of the image such as identifications of objects within the image, colors within the image, scenery within the image, shades of colors within the image, etc. The content evaluation system 1005 executes the feature extraction neural network with the image and outputs values for the different features, thus extracting features from the image. The content evaluation system 1005 may format the extracted features into a feature vector for the image by setting the values for the extracted features at different index values of the vector. The content evaluation system 1005 may then store the feature vector in the database with associations with the target audience identifier. The content evaluation system 1005 may similarly generate feature vectors for any number of images.

In some implementations, the data processing system retrieves the neural network, responsive to the neural network being trained to simulate the target audience when generating performance scores for images. The data processing system may retrieve the neural network that corresponds to the target audience by selecting the neural network from a plurality of neural networks based on the neural network having a stored relationship with the target audience identifier of the target audience for which the target audience is generating a benchmark. Advantageously, by using a neural network that has been trained to generate performance scores for a particular target audience, the data processing system may be able to more accurately predict performance scores for images that correspond to the specific target audience.

In some implementations, the data processing system has previously trained the neural network to simulate the target audience. For example, the data processing system may train the neural network using images from web-based properties that correspond to the target audience. The data processing system may train the neural network using image meta data such as interaction data (e.g., amount of time viewed, number of comments, number of likes, ratings, etc.) indicating an amount of interaction users had with the images. For instance, the data processing system may input training images from web-based properties that correspond to the target audience into the neural network. The data processing system executes the neural network using the training images as inputs to generate performance scores. The data processing system then uses the interaction data for the individual images as labels for the correct performance scores. The data processing system uses back-propagation techniques based on differences between the predicted performance scores and the interaction data to tune weights of the neural network to more accurately predict performance scores for images in the future. Advantageously, by generating a neural network in this manner, the data processing system may be able to accurately simulate individual target audiences to determine how images will perform for the respective target audiences.

At operation 1412, the data processing system calculates a target audience benchmark. The data processing system may calculate the target audience benchmark by calculating an average, median, or mode of the performance scores that were generated by the neural network. For example, if executing the neural network for five images caused the neural network to generate performance scores of 20, 25, 50, 75, and 90, the data processing system may calculate the median of the performance scores to be 50. The data processing system may set the benchmark for the target audience by storing the value of 50 in a database as the benchmark for the target audience (e.g., store an association between a benchmark identifier and the calculated value). The data processing system may use any function on the performance score for the images to calculate the benchmark for the target audience.

In some implementations, the data processing system calculates a distribution of performance scores when calculating the target audience benchmark for a target audience. The distribution is or includes counts of the number of images of the target audience with performance scores at set performance score values or within different performance score ranges. For example, the data processing system may maintain a counter for each of performance score ranges 1-25, 26-50, 51-75, and 76-100. In this example, the data processing system applies the images of the target audience to the neural network to determine a performance score for each image and increments the counters that correspond to each range when the neural network outputs a performance score for the respective range. In implementations in which the data processing system determines distributions for set performance score values, the data processing system similarly maintains and increments counters for each value (e.g., each value between 1 and 100). The data processing system may continue to update the distribution (e.g., increment the counters of the distribution) as the data processing system ingests further images. In response to any requests to evaluate an image's performance score with the target audience, the data processing system generates and presents a user interface that includes the distribution with the performance score for the image at the requesting device. Thus, the data processing system may provide a graphical representation of how the evaluated image compares with other images that are associated with the same target audience.

In some implementations, at operation 1414, the data processing system determines whether to train or adjust the target audience benchmark. The data processing system may do so by determining if an internal configuration or setting of the data processing system indicates for the data processing system to extract images from another web-based property. Such a setting may be configured by a user seeking to improve the accuracy of the target audience benchmark. If the data processing system identifies a setting or configuration to train or adjust the target audience benchmark, at operation 1416, the data processing system may access another web-based property. Otherwise, the method proceeds to operation 1426, as described below.

If the data processing system identifies a setting or configuration to train or adjust the target audience benchmark, at operation 1416, the data processing system accesses a second web-based property. The data processing system may access the second web-based property responsive to determining the second web-based property has a stored association with the same target audience identifier as the first web-based property. For example, the first web-based property may have a stored association with a "sports" string in the database. The data processing system may query the database using the sports string as a keyword to identify another web-based property (e.g., a URL of another web-based property) that has a stored association with a sports string. The data processing system may identify the second web-based property based on the query and access and extract images from the second web-based property. The data processing system may do so similar to how the data processing system accesses and extracts images from the first web-based property in operations 1402 and 1404. The data processing system then stores the extracted images in the database with stored associations with the target audience identifier similar to how the data processing stored the images from the first web-based property in operation 1406.

In some implementations, at operation 1420, the data processing system determines weights for the extracted images. The data processing system may determine weights for the extracted images based on the web-based properties from which the images originated (e.g., the web-based properties from which the images were extracted). For example, the data processing system may store weights for the web-based properties in the database. Each web-based property may have a stored association with a different weight. The data processing system may determine the weights for the extracted images from the first and second web-based properties by identifying images that originated at the first web-based property, identifying the images that originated at the second web-based property, and determining the weights for each image based on the web-based property from which the images originated. At operation 1422, the data processing system assigns the determined weights to the corresponding images (e.g., tag the weights to identifiers of the images or generate vectors that include the weights at and identifiers at set index values).

In some implementations, the data processing system determines the weights for the web-based properties. The data processing system may determine the weights based on a variety of criteria, such as the number of images that are stored in the respective web-based property, the amount of image interaction that typically occurs on the web-based property, the number of visitors the web-based properties typically receive, etc. For instance, the data processing system may determine weights for web-based properties to be higher the higher the number of visitors that visit the web-based properties, the higher the number of images the web-based properties contain, the higher the amount of image interaction that typically occurs on the web-based property, etc. The data processing system may determine the weights for the web-based properties to be lower if any of such values are lower. In some implementations, the data processing system may determine the weights based on a combination of such criteria such that the data processing system increases or decreases a weight for a web-based property based on the values of each of the aforementioned criteria (e.g., the data processing system may increase a weight for a large traffic volume and decrease the same weight for a low number of images). In some implementations, users may input the weights at a user interface into the data processing system.

In some implementations, the weights dynamically change over time. For example, the data processing system may monitor the web-based properties (e.g., use webhooks on the web-based properties or poll the web-based properties at set intervals) or receive new data about the web-based properties that change the values of the criteria that the data processing system uses to determine the weights. For instance, the data processing system may receive data indicating that more images have been added to a web-based property. Accordingly, the data processing system may increase a stored value of the number of images that are stored on the web-based property and increase or otherwise recalculate the weight for the web-based property based on the new value and any other criteria that the data processing system used to calculate the previous weight. The data processing system may use similar processes to calculate weights based on new data or values from any number of different types of criteria (e.g., increase or decrease the weights as more or fewer visitors visit the web-based properties, people interact with the web-based properties more or less often, etc.). Thus, the data processing system may continuously refine the weights for the different web-based properties over time.

At operation 1424, the data processing system adjusts the benchmark for the target audience based on the images from the second web-based property. The data processing system may do so by generating performance scores for the images from the second web-based property using the neural network and recalculating the benchmark based on the new performance scores. For example, the data processing system may input the images from the second web-based property into the neural network to generate a performance score for each image. The data processing system may then aggregate the performance scores into a data set with the performance scores for the images from the first web-based property. The data processing system may determine the average (or any other metric as described above) of the performance scores of the data set and set the new average of the performance scores to be the new benchmark, thus increasing or decreasing the benchmark for the target audience to a more refined value.

In implementations in which the data processing system applies weights to the different images, the data processing system adjusts or generates the benchmark for the target audience based on the weights. For example, the data processing system may determine a weighted average of the performance scores based on the weights that the data processing system applied to the images. The data processing system may set the weighted average to be the benchmark, thus enabling the data processing system to have more control over the data that the data processing system uses to generate the benchmark and to avoid using data from irrelevant or inaccurate web-based properties.

In some implementations, the data processing system updates the benchmark over time based on changes to the weights for the different web-based properties, as described above. For example, the data processing system may update a weight for a web-based property that corresponds to the target audience. The update may trigger the data processing system to reapply the weights to the images (e.g., replace the previous weight values with the new weight values) that originated at the web-based property. The data processing system may then recalculate the benchmark for the target audience using the new weight for the web-based property and the weights for any other images that correspond to the target audience. Accordingly, the data processing system may continually tune the benchmark over time as the data processing system gains access to more data.

In some implementations, the data processing system is configured to train or adjust the target audience benchmark by monitoring the web-based properties at set time intervals or for any changes in images that are uploaded to the web-based properties. The data processing system may do so using webhooks that are set to provide identifiers of any new images that are uploaded to the web-based property and/or APIs that communicate with the web-based properties. Through the APIs, the data processing system may request (e.g., poll) the web-based properties at set time intervals for information about the images that are uploaded to the web-based properties. In some implementations, the data processing system may be configured to web scrape the web-based properties at set time intervals to identify any new images (e.g., images with identifiers that do not match any identifiers in the database in which images are stored). If the data processing system identifies any new images that have been uploaded to a web-based property, the data processing system may use the new images to generate a new benchmark for the target audience by recalculating the benchmark with performance scores for the new images.

After generating and/or adjusting the benchmark, the data processing system uses the benchmark to determine whether to recommend uploading an image. For instance, at operation 1426, the data processing system receives two uploaded images. The data processing system may receive the images after a user uploads the images via a user interface on a computing device. At operation 1428, the data processing system receives a request to score the uploaded images for a target audience (e.g., the same target audience for which the data processing system generated the benchmark). The data processing system may receive the request after a user selects the target audience at a user interface (e.g., the same interface that the user used to upload the images). The user may have selected the target audience from a drop-down list on the user interface or otherwise provided an indication to score the images from the user interface.

At operation 1430, the data processing system selects the neural network. The data processing system may select the neural network from the database based on the target audience for which the user requested performance scores. For example, the data processing system may select the neural network by using an identifier for the target audience as a lookup in the database and retrieve the neural network that has a stored association with a matching identifier.

At operation 1432, the data processing system executes the neural network to determine performance scores for the two uploaded images. To do so, the data processing system may generate a feature vector for each of the images as described above. The data processing system may then separately input or apply the feature vectors to the neural network to generate a first performance score for the first image and a second performance score for the second image.

At operation 1434, the data processing system compares the performance scores to the benchmark. The data processing system compares the first performance score to the benchmark to determine a first difference between the first performance score and the benchmark. The data processing system may compare the second performance score to the benchmark to determine a second difference between the second performance score and the benchmark. Such differences may be positive or negative depending on whether the performance scores are higher or lower than the benchmark. Accordingly, because the benchmark represents an average or is otherwise representative of how other images typically score with the target audience, the data processing system may determine how the images would perform with the target audience compared to the average image. Such may be advantageous, for example, if a particular target audience is not prone to interacting with images on web-based properties, thus causing performance scores of images for the target audience to be lower than typical scores for other target audiences. A user seeking to evaluate images against a metric that is specific to the target audience to avoid audience bias (e.g., if a target audience typically has average performance scores of 20 out of 100, a performance score for an image of 30 would be considered high even though the average performance score for all target audiences together may be 50) may use the benchmark to avoid such bias.

At operation 1436, the data processing system compares the first difference to the second difference. The data processing system may do so by determining if the first difference is higher than the second difference. Responsive to determining the first difference is higher than the second difference, at operation 1438, the data processing system generates a record (e.g., a file, document, table, listing, message, notification, etc.) comprising an identification of the first image. Responsive to determining the second difference is higher than the first difference, at operation 1440, the data processing system generates a record comprising an identification for the second image. In some implementations, the data processing system compares the performance scores for images and recommend the image with the higher performance score.

In some implementations, the data processing system generates the records for the first image or the second image by generating a recommendation to upload the first image or the second image to a web-based property. The recommendation may include a string of text that includes identifications of the images (e.g., "Image A" or "Image B"). The data processing system may generate the record and transmit the record to the computing device that submitted the request to score the images. Thus, the data processing system automatically determines which images to recommend uploading to a web-based property to optimize the performance of the images. The data processing system may do so while minimizing the number of images (and therefore the computer resource requirements) that are required to obtain a target interaction rate for a particular web-based property.

In some implementations, the record includes other recommendations for actions to take with an identified image (e.g., an image selected based on its performance score in comparison to a benchmark). Examples of such recommendations include, but are not limited to, a recommendation to include the image or video in a market test or research study, a recommendation to view an image that's determined to be a likely higher performer than the image (e.g., a stored image that has a higher performance score with the target audience), a recommendation to share a link to the image, a recommendation to upload an alternate image or video to a website because the image has a low score compared to the benchmark (e.g., a score lower than the benchmark by a defined amount), a recommendation to include specific subject matter in the image or make a stylistic or compositional alternation to the image as described herein, a recommendation to view image insights and heat maps (as described in U.S. application Ser. Nos. 17/316,503 and 16/537,426, the entirety of each of which is incorporated by reference herein) and see how the image can be tweaked to improve the performance score, a recommendation to view image trends (e.g., a selection of images that score well or better than the image), a recommendation to download the image, and/or a recommendation to view the image that is associated with the target audience with the highest performance score.

In some implementations, instead of comparing differences of two images with the benchmark between each other, the data processing system determines whether to recommend individual images. For instance, the data processing system may determine the difference between a performance score of an image and the benchmark. The data processing system may then compare the difference to a threshold (e.g., a predetermined threshold). If the performance score exceeds the threshold, the data processing system generates a record recommending to upload the image to a web-based property. Otherwise, the data processing generates an alert or notification indicating that the image should not be uploaded to the web-based property. Thus, the data processing system automatically determines whether to upload individual images to a web-based property.

In some implementations, the data processing system uses a combination of the comparison between the images and the threshold to determine whether to recommend to upload an image. For example, the data processing system may compare the differences between two images, image A and image B, and the benchmark and determine the difference for image A is higher than image B. The data processing system may then compare the difference for image A to a threshold. If the data processing system determines the difference for image A does not exceed the threshold, the data processing system generates an alert or notification indicating image A should not be uploaded to the web-based property. Otherwise, the data processing system determines to recommend uploading image A to the web-based property. The data processing system may use any such uploading criteria to determine whether to recommend uploading images to web-based properties.

In some implementations, the data processing system stores and dynamically updates differences between the benchmark and performance scores for images as the data processing system updates the benchmark. For example, the data processing system may determine a performance score and a difference for an image based on a benchmark for a particular target audience. The data processing system may store the performance score and difference for the image in a database with associations between the performance score and difference and an identifier for the target audience and/or an identifier for the image. The data processing system may then extract or otherwise exhume further images and update the benchmark for the target audience based on the new images. Upon updating the benchmark, the data processing system may identify the performance score for the image based on the performance score having a stored association with the target audience identifier and recalculate the difference for the image based on the updated benchmark. The data processing system may then replace the previous difference with the new difference or add the new difference to the data structure that includes the previous difference to indicate the new difference. The data processing system may similarly update any number of differences for images and/or target audiences as the data processing system updates the benchmarks.

In some implementations, upon updating the stored differences for the images, the data processing system notifies a user if the new difference satisfies an upload criteria. For example, if the data processing system had previously determined the difference for an image did not satisfy a threshold to recommend uploading the image to a web-based property, the data processing system may compare the new difference to the threshold again. If the data processing system determines the new difference satisfies the threshold, the data processing system may generate and transmit a record with a recommendation to upload the image to a web-based property to a computing device. The data processing system may similarly determine whether other uploading criteria are met to determine whether to recommend to upload an image to a web-based property (e.g., compare new differences between images and recommend uploading a new image and/or removing an old image if the new image now has a difference that exceeds the old image).

In some implementations, the data processing system determines whether an image is the highest scoring image of the images that are available to the user that requested that the image be evaluated. For example, a user may be associated with an entity (e.g., a company or organization) that owns a set of images. The data processing system may have scored each of the images of the set as described herein and stored the images with their scores in a database with stored relationships with an identifier for the entity. In this example, the data processing system identifies the performance score for the image and compares the performance score with the performance scores of the images in the database that correspond to the entity. If the image has the highest performance score, the data processing system generates a record indicating the image has the highest performance score. If the image does not have the highest performance score, the data processing system retrieves the image with the highest performance score (or an identifier of such an image) and transmits a recommendation identifying the higher scoring image. Thus, the data processing system may provide recommendations for images to upload to a website or to otherwise use and to which a user has access and ensure the user uses the highest scoring image.

One technical problem that arises when a computer generates image performance scores (e.g., performance scores or image scores) for images of different web pages is that often times the performance scores of a single image in isolation do not accurately represent how different audiences will interact with a web page that includes the image. Such may be the case, for example, because the web page may include multiple images and/or the images on the web page may be of varying sizes and/or at different locations on the web page. Additionally, audience preferences may change, which may cause the initially generated scores for images to grow stale and not accurately represent how the images will perform with users that access the web page over time.

To overcome the aforementioned technical deficiencies, a computer implementing the systems and methods described herein may store a database that stores pointers to images of (e.g., that are displayed on or are configured to be displayed on) different web pages. The domains and web pages themselves may be stored and processed by the third-party servers that host the domains or web pages to receive web traffic (e.g., company A may have a server that hosts a website to provide a specific category of information to individuals that access the website). The third-party servers can be, for example, a content management system (CMS) or a product information management system (PIM), in some embodiments. The computer can automatically retrieve the images for a web page using a pointer to the images. The computer can store a machine learning model that has been trained to generate image performance scores for images based at least on interaction data corresponding to images of a training set of images. The computer can execute the machine learning model using the retrieved images as input to generate at least one image performance score for each image of the retrieved images. The computer can use the image performance scores to rearrange the images on the web page (e.g., make the images associated with the higher scores larger images and the images associated with the lower scores smaller images or place the images in image containers or image placeholders according to such sizing configurations). The computer can rearrange the images by transmitting the new arrangement to executable code the computer had provisioned to the computing device hosting the web page. In doing so, the computer can command the executable code to automatically adjust the arrangement of the images on the web page according to the new arrangement. In some embodiments, the computer can transmit a message comprising the new arrangement or a ranked list of the images to the computing device hosting the web page and the computing device can adjust the arrangement on the web page accordingly.

A technical problem that a system may face when using machine learning models to arrange and/or rearrange images on web pages is that such systems often fail to accommodate for dynamic adjustments to the arrangement of images based on ongoing user interaction data or to account for different types of users or users with different interests. Furthermore, these systems can fall short in providing comprehensive solutions for multiple platforms or servers, or across web pages that display products of various product lines or have product lines with varying target customer segments.

To overcome the aforementioned technical deficiencies, a computer implementing the systems and methods described herein may collect interaction data (e.g., amount of time spent on the web page, number of items purchased from the web page, number of comments, number of likes, ratings, etc.) indicating an amount of interaction users had with the web page. In some cases, the interaction data can indicate whether a user went to a product landing page (e.g., a second web page) by selecting an option to do so from the web page. The computer can determine when the interaction data satisfies a condition (e.g., is below a threshold). Responsive to determining the interaction data satisfies the condition, the computer can generate new scores for the images on the web page (e.g., generate new scores using the machine learning model that generated the initial scores but that has been trained in the interim). In some embodiments, the computer can generate new scores for the images by using a different machine learning model that corresponds to a target audience (e.g., a different target audience from the target audience of the initially trained machine learning model), such as a target audience that is more likely to visit the web page. In this way, the computer can automatically adjust for changes in preferences of individuals in both the images themselves and of the individuals that visit the webpage.

Additionally, in some embodiments, the computer can arrange images by product on web pages across domains. For example, the computer can store records of images that correspond to (e.g., depict) different products. Different domains may host a web page dedicated to displaying the images of the product. The domains may each correspond to a target audience and/or a rule indicating a number of images to display for a product on a web page. The computer can generate scores for the different images of the product from the record. The computer can rank the images of the product according to the scores. In some cases, the computer can do so for different target audiences. The computer can transmit identifications of the highest ranked images to servers associated with the different domains according to the rules and/or target audiences for the respective servers.

The computer can dynamically update the scores for the images of the products over time. The computer can update the scores by continually training the machine learning model or machine learning models that generate the scores and using the trained machine learning models to generate new scores for the images. The computer can generate new scores for the images at set intervals or upon receipt of a request to do so. The computer can generate new ranked lists for the products and transmit identifications of the highest ranked images of the new ranked lists to the servers associated with the different domains according to the rules and/or target audiences for the respective servers.

Figure 15:
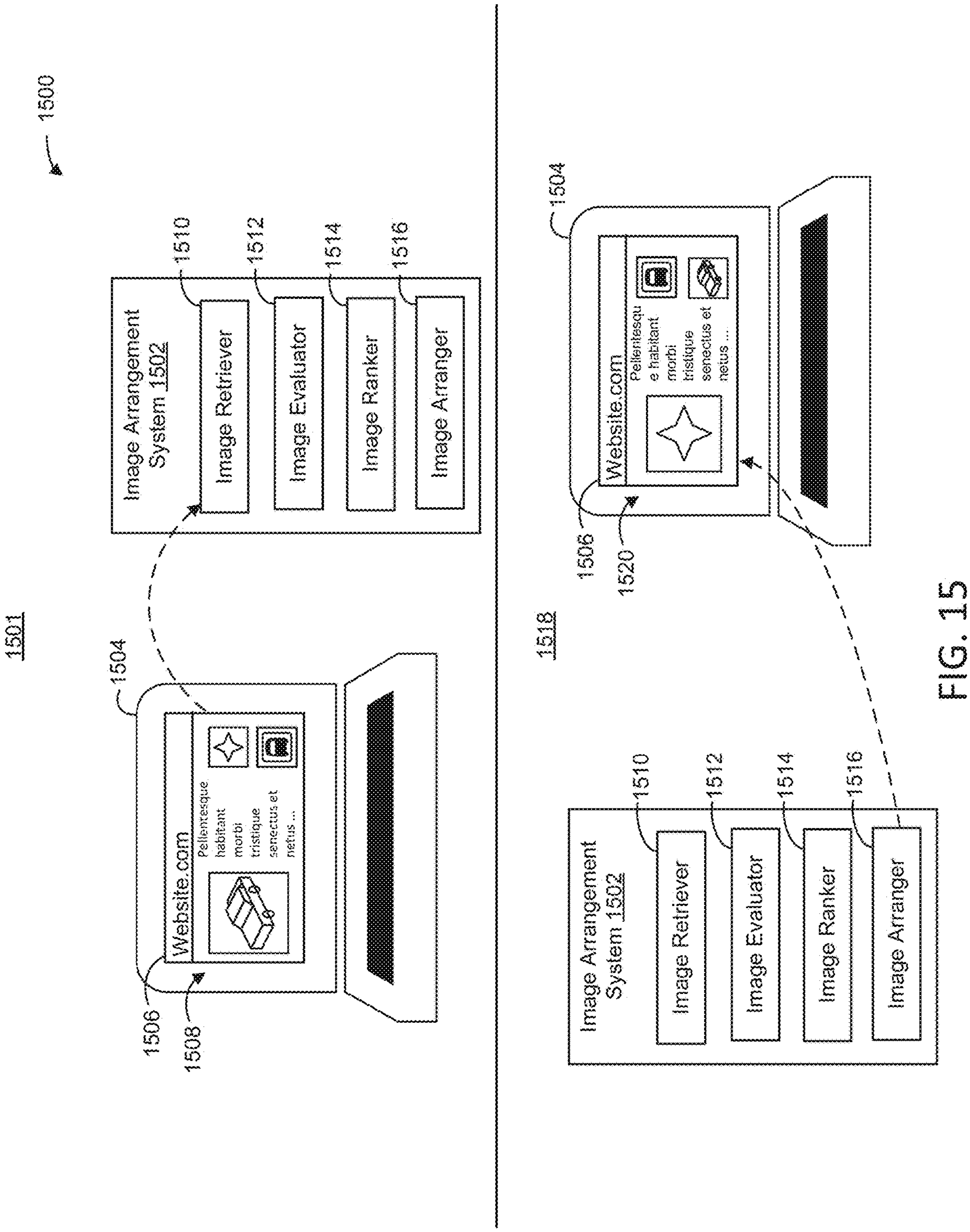
FIG. 15 is a sequence diagram illustrating automatic web page image arrangement in accordance with an illustrative embodiment.

FIG. 15 is a sequence diagram illustrating automatic web page image arrangement in accordance with an illustrative embodiment. In brief overview, FIG. 15 illustrates a sequence 1500 in which, via an image arrangement system 1502, the content evaluation system 1005 can automatically rearrange images on a web page to increase the interaction performance (e.g., sales performance, viewing time, number of clicks, etc.) of the web page. To do so, the image arrangement system 1502 can retrieve images of a web page. The image arrangement system 1502 can automatically generate image performance scores for the retrieved images using a machine learning model. The image arrangement system 1502 can determine a new arrangement (e.g., a second arrangement) for the images on the web page according to the generated image performance scores. The image arrangement system 1502 can rearrange the images on the web page according to the new arrangement. The image arrangement system 1502 can rearrange images on a web page over time to account for changes in preferences of the users that visit the web page and/or the users themselves. Accordingly, the image arrangement system 1502 may use machine learning techniques as described herein to automatically and dynamically change the configuration of a web page to make the web page more accessible to users and to account for changes in how users interact with the web page. The image arrangement system 1502 can do so for any number of web pages.

As described herein, solely for succinctness, each reference to an image may additionally or instead be a reference to a video, an audio segment, or a multimedia file. For example, the image arrangement system 1502 can determine content performance scores for videos on a web page and rearrange on the videos on the web according to the content performance scores as described herein. The image arrangement system 1502 can use the systems and methods described herein to rearrange any type of content on a web page.

The sequence 1500 may involve the image arrangement system 1502 communicating with a computing device 1504. The computing device 1504 can be a server or other type of computing device. The computing device 1504 can host and/or otherwise be associated with a website (e.g., accessed or owned by an entity that owns or hosts a website) that includes different web pages. The web pages of the website can each include one or more images. In a first stage 1501 of the sequence 1500, the computing device 1504 can transmit a message to the image arrangement system 1502. The message can be or include a request to evaluate and/or rearrange images on one web page 1506 of the website and/or multiple web pages of the website. The message can include a pointer or pointers to the web page 1506 or web pages of the website that include images to evaluate and/or rearrange. The image arrangement system 1502 can receive the message and use the pointers to evaluate and/or rearrange the images of the web pages.

The pointers may be uniform resource locators (e.g., URLs) that the image arrangement system 1502 can use to access web pages that are associated with the respective URLs. The image arrangement system 1502 may use the pointers to establish connections with servers or third-party software that host various websites (or any other computing devices that store or host websites) to retrieve the images that are stored on the websites.

In some embodiments, the pointers may be or include page identifications of specific pages and/or product identifications of specific products. For instance, the image arrangement system 1502 and/or a third-party server or computer may store a database that includes images files of images on separate web pages and/or that depict different products. The image files can be stored in records in the database that are specific to different web pages and/or products. For example, a record may only include images (e.g., image files) that depict a specific product. Such a record may include an identification of the product, such as a name or a stock keeping unit (SKU) of the product, that can be used to identify the images in a query through the database. In another example, a record may only include images that are currently displayed on a specific web page. Such a record may include an identification (e.g., a URL) of the web page that can be used to identify the images in a query through the database.

The image arrangement system 1502 may comprise one or more processors that are configured to automatically evaluate and/or rearrange images on a web page. In some embodiments, the image arrangement system 1502 can be or include executable code of the content evaluation system 1005. The image arrangement system 1502 may comprise a network interface, a processor, and/or memory (or the content evaluation system 1005 can include such components). The image arrangement system 1502 may communicate with the computing device 1504 via the network interface, which may be or include an antenna or other network device that enables communication across a network and/or with other devices. The processor may be or include an ASIC, one or more FPGAs, a DSP, circuits containing one or more processing components, circuitry for supporting a microprocessor, a group of processing components, or other suitable electronic processing components. In some embodiments, the processor may execute computer code or modules (e.g., executable code, object code, source code, script code, machine code, etc.) stored in memory to facilitate the activities described herein. The memory may be any volatile or non-volatile computer-readable storage medium capable of storing data or computer code.

The image arrangement system 1502 can include an image retriever 1510, an image evaluator 1512, an image ranker 1514, and/or an image arranger 1516. The components 1510-1516 can be stored in the memory of the image arrangement system 1502. The image retriever 1510 may comprise programmable instructions that, upon execution, cause the processor of the image arrangement system 1502 to communicate with the computing device 1504 and/or any other computing device. The image retriever 1510 may be or include an application programming interface (API) that facilitates communication between the computing device 1504 (e.g., via the network interface of the image arrangement system 1502) and other computing devices. The image retriever 1510 may communicate with the computing devices 1504 and/or any other computing device across a network.

The image retriever 1510 can establish a connection with the computing device 1504. The image retriever 1510 can establish the connection with the computing device 1504 over a network. To do so, the image retriever 1510 can communicate with the computing device 1504 across the network. In one example, the image retriever 1510 can transmit a syn packet to the computing device 1504 (or vice versa) and establish the connection using a TLS handshaking protocol. The image retriever 1510 can use any handshaking protocol to establish a connection with the computing device 1504.

The image retriever 1510 can receive the message from the computing device 1504 requesting to evaluate and/or rearrange images on the web page 1506. The image retriever 1510 can identify the pointer in the message. The pointer can be a URL to the web page 1506 itself or a pointer to a record (e.g., a file, document, table, listing, message, notification, etc.) in a database (e.g., a database of the image arrangement system 1502 or a third-party database) that contains image files of images displayed on the web page 1506. In cases in which the pointer is a URL to the web page 1506, the image retriever 1510 can access the web page 1506 using the URL. The image retriever 1510 can scrape the images that are currently being displayed on the web page 1506 from the web page 1506 to retrieve the images from the web page 1506. In cases in which the pointer is an identification of a location (e.g., a product page identification) of a record in a database, the image retriever 1510 can query the database (e.g., using a local query or by transmitting a message to the computer storing the database) to identify the record containing a matching value to the identification of the location in the message. The image retriever 1510 can retrieve the image files from the record or request the image files from the computer storing the database containing the record.

The image retriever 1510 can receive the pointer from the computing device 1504 in one or more formats. For example, the message from the computing device 1504 can be or include a data file containing one or more URLs. Such may be the case, for instance, when the computing device 1504 is owned or being accessed by an entity (e.g., a company) that hosts a website or web page for which the entity wants to change the image arrangement. The pointer can be a URL of the URLs in the data file or multiple URLs of the URLs in the data file. In another example, the message can include a page identification of a web page. Such may be the case, for instance, when the computing device 1504 and the image arrangement system 1502 are a part of the same internal network (that communicate over a local area network connection instead of a wide are connection) and/or the image arrangement system 1502 stores a record of specific page identifications of the website hosting the web page 1506.

In another example, the message from the computing device 1504 can include a product identification of a product. The product identification can correspond to a record in a database (e.g., a database stored locally in the image arrangement system 1502 or a third-party database). The record can contain one or more images that depict or that are otherwise associated with the product. The computing device 1504 can include the product identification in the message when a user accessing the computing device 1504 is seeking to rank images of the product, such as across different web pages and/or all of the images that are stored for the product.

In another example, the message from the computing device 1504 can be or include a data file containing one or more image files (e.g., image files that are depicted on the web page 1506). Such may be the case, for instance, when the computing device 1504 is owned or being accessed by an entity (e.g., a company) that hosts a website or web page for which the entity wants to change the image arrangement. The image retriever 1510 can access the image files from the message to retrieve the images.

The image evaluator 1512 may comprise programmable instructions that, upon execution, cause the processor of the image arrangement system 1502 to evaluate the images retrieved by the image retriever 1510. The image evaluator 1512 can be the same as or similar to the performance measurement module 1065 of the content evaluation system 1005. The image evaluator 1512 may include one or more machine learning models (e.g., neural networks) that are respectively configured to extract features from images and generate image performance scores (e.g., performance scores or image performance scores) for the images based on the extracted features.

The image evaluator 1512 can execute a first machine learning model to extract a set of features from each of the images of the web page 1506 that the image retriever 1510 retrieved. To do so, for each image, the image evaluator 1512 may extract pixel data (e.g., values indicating different characteristics about the pixels of the image such as color, hue, brightness, etc.) and create a vector with the extracted values. In some implementations, the image evaluator 1512 can extract features from the image using a feature extraction neural network and create a vector with the extracted features. The image evaluator 1512 may iteratively create feature vectors for each of the images of the web page 1506 retrieved by the image retriever 1510.

In some implementations, the image evaluator 1512 may create feature vectors from images by extracting individual features from the images. For example, the image evaluator 1512 may input an image into a feature extraction neural network. The feature extraction neural network may be configured to automatically extract features from the image. Such features are or include descriptors of the image such as identifications of objects within the image, colors within the image, scenery within the image, shades of colors within the image, etc. In this example, the image evaluator 1512 can execute the feature extraction neural network with the image and output values for the different features, thus extracting features from the image. The image evaluator 1512 can format the extracted features into a feature vector for the image by setting the values for the extracted features at different index values of the vector or by otherwise concatenating the values of the extracted features together. The image evaluator 1512 can otherwise extract features from images to create feature vectors for the images as described herein.

The image evaluator 1512 can include and/or execute a second machine learning model to generate image performance scores for each of the images of the web page 1506 retrieved by the image retriever 1510. The second machine learning model can be a machine learning model that has been trained or configured to generate image performance scores (e.g., performance scores) for individual images. Image performance scores can be or include a likelihood that a user would interact with the images if they were viewing the images on a web page. The second machine learning model can be a neural network, a support vector machine, a random forest, etc. The second machine learning model can be configured to receive feature vectors that include features (e.g., extracted features) of an image and automatically generate an image performance score for the image. The second machine learning model can be configured to generate an image performance score for an image by applying internal trained or learned weights and/or parameters to the features of the image. The image performance score can be a number within a defined range (e.g., 1-100, 1-10, 0-1, etc.).

The image evaluator 1512 can use the second machine learning model to generate image performance scores for each of the images of the web page 1506 retrieved by the image retriever 1510. For example, the image evaluator 1512 can execute the first machine learning model of the image evaluator 1512 using each of the images of the web page 1506 retrieved by the image retriever 1510 as input to generate a feature vector of extracted features for each of the images. The image evaluator 1512 can separately feed the feature vectors into the second machine learning model and execute the second machine learning model to generate an image performance score for each of the images of the web page 1506. Accordingly, the image evaluator 1512 can automatically generate image performance scores of the images on the web page 1506.

In some embodiments, the image evaluator 1512 can include multiple machine learning models that are configured to generate image performance scores for images. Each machine learning model may be trained to generate image performance scores for a different target audience. For example, each machine learning model may be trained based on training data generated from interaction data generated from users of a specific target audience (e.g., users who have a specific characteristic (e.g., age, age within a range, gender, etc.) and/or who otherwise have specific interests (e.g., sports, movies, books, genres of books, types of sports, jobs, etc.)). The machine learning models may be trained (e.g., by the content evaluation system 1005, the image arrangement system 1502, or another data processing system) by labeling images with interaction data from the specific target audiences and training the machine learning models for the same target audiences with the labeled training data to generate scores for the images. The machine learning models can be trained using back-propagation techniques and a loss function based on the interaction data. By training the machine learning models in this way, each machine learning model may be trained to simulate a target audience and how members of the target audience will interact with specific images.

In some embodiments, the machine learning models may be trained to simulate different target audiences by images based on the websites on which the images are posted. For example, the content evaluation system 1005 may store target audience identifications or identifiers in a database. Target audience identifications or identifiers can be string identifications of target audiences. The content evaluation system 1005 may store the target audience identifications with stored associations with the respective web pages or websites in the database. As described in more detail above, target audiences may be associated with web pages or websites if users that fall within the target audience typically view, purchase, follow, or are otherwise interested in the particular subject matter of the respective web pages or websites (e.g., a website may appeal to individuals are interested in camping or sports). The content evaluation system 1005 may label images that are posted on such websites with interaction data that is generated on the websites. The content evaluation system 1005 may train machine learning models that are configured to simulate different target audiences based on images that are displayed on web pages that correspond with the specific target audiences (e.g., correspond in memory of the content evaluation system 1005).

For example, the content evaluation system 1005 can identify images that are posted on Website A and interaction data of users interacting with such images posted on Website A or on the web pages of Website A that include the images (e.g., did the user scroll on the web page, how long did the user spend on the web page, did the user click to access review, did the user select an "Add to Cart" option, did the user purchase an item of the web page, etc.). The content evaluation system 1005 can identify one or more target audience identifiers (e.g., websites can correspond with multiple target audiences, in some cases). The content evaluation system 1005 can train machine learning models that correspond with the same one or more target audience identifiers as Website A using the images and the interaction data for the images on Website A as training data. The content evaluation system 1005 can similarly train machine learning models based on images and interaction data from any number of websites to generate or train machine learning models to be "target audience simulators" that can simulate how individuals of different target audiences will interact with individual images. In some cases, at least one of the machine learning models can include training data that is agnostic to a specific target audience and be trained with training data from different target audiences such that the machine learning model (e.g., a general public machine learning model) can simulate how the general public or the average audience will interact with different images. Each of such machine learning models can be a second machine learning model.

The image evaluator 1512 can generate image performance scores (e.g., target audience scores) that correspond with different target audiences for each of the images of the web page 1506 retrieved by the image retriever 1510. For example, subsequent to the image retriever 1510 retrieving images from the web page 1506, the image evaluator 1512 can feed the feature vectors of features of the retrieved images into the machine learning models that correspond to the different target audiences and/or the general public. The image evaluator 1512 can execute the machine learning models to generate different target audience scores for each of the images.

In some embodiments, the image evaluator 1512 may only generate target audience scores for the images retrieved from the web page 1506 for target audiences that correspond with the website of the web page 1506 and/or the web page 1506 itself. Doing so can reduce the processing requirements of evaluating the images. For example, the website (e.g., Website A) of the web page 1506 and/or the web page 1506 may have a stored association with one or more target audience identifiers in the database stored by the content evaluation system 1005. The image evaluator 1512 can identify the one or more target audience identifiers in the database. The image evaluator 1512 can identify and/or retrieve the machine learning models that correspond with the same target audience identifiers in memory indicating that the machine learning models have been trained to simulate the target audiences of the target audience identifier or identifiers of the web page 1506. The image evaluator 1512 may only retrieve such machine learning models and/or retrieve the machine learning models in addition to a machine learning model that has been trained to be agnostic to any target audiences (e.g., a general public machine learning model). The image evaluator 1512 can feed the retrieved images from the web page 1506 into the retrieved machine learning models to generate target audience scores or image performance scores for the retrieved images. In doing so, the image evaluator 1512 can use selective processing techniques to generate image performance scores, which can significantly reduce the processing requirements of generating image performance scores because executing different machine learning models can require a large amount of processing resources and/or memory.

The image ranker 1514 may comprise programmable instructions that, upon execution, cause the processor of the image arrangement system 1502 to rank images against each other and/or generate one or more ranked lists of images. The image ranker 1514 can be configured to rank images according to image performance scores generated for the images. For example, the image ranker 1514 can compare the image performance scores generated by the image evaluator 1512 for the images retrieved from the web page 1506. Based on the comparison, the image ranker 1514 can assign rankings to the images such that images with higher image performance scores are ranked higher than images with lower image performance scores. The image ranker 1514 can store the assignments in memory (e.g., in a cache such that the rankings can be used later for rearranging the images on the web page 1506 and then removed from memory).

In some embodiments, the image ranker 1514 can generate multiple rankings for retrieved images. Each ranking can correspond to a specific target audience or, in some embodiments, a website (e.g., the website of the webpage for which the images are being rearranged). For example, the image evaluator 1512 can generate target audience scores for the retrieved images from the web page 1506 (e.g., target audience scores for each target audience for which the image evaluator 1512 stores a machine learning model and/or each target audience that corresponds to the web page 1506 or website of the web page 1506). The image ranker 1514 can identify the target audience scores of the retrieved images for each of the target audiences and compare target audience scores that correspond with the same target audiences. The image ranker 1514 can determine target audience rankings of the retrieved images for each of the target audiences based on the comparison. In some cases, the image ranker 1514 may determine such target audience rankings in addition to rankings of image performance scores generated by the general public machine learning model (which can also be referred to as target audience scores and/or target audience rankings as described herein). The image ranker 1514 may generate the rankings for any target audience for which the image evaluator 1512 generates target audience scores.

In some embodiments, the image ranker 1514 can generate rankings for retrieved images based on a combination of target audience scores of the images. For example, the image evaluator 1512 can generate target audience scores for the retrieved images from the web page 1506 (e.g., target audience scores for each target audience for which the image evaluator 1512 stores a machine learning model and/or each target audience that corresponds to the web page 1506 or website of the web page 1506). The image ranker 1514 can determine composite image performance scores (e.g., aggregate image performance scores) for each of the retrieved images of the web page 1506 based on or as a function of the target audience scores for the respective retrieved images.

For example, the image ranker 1514 can average, multiply, aggregate, or perform any other function on the target audience scores for an image to determine a composite score for the image. In some cases, the image ranker 1514 can apply weights (e.g., predetermined weights, which may be input by a user) to the scores to determine a weighted sum or weighted average of the target audience scores as a composite score for the image. In some embodiments, the image ranker 1514 can apply machine learning techniques on the target audience scores to determine a composite score for the image. The image ranker 1514 can similarly determine such a composite score for each image of the web page 1506 and assign rankings to the retrieved images based on the composite scores.

The image arranger 1516 may comprise programmable instructions that, upon execution, cause the processor of the image arrangement system 1502 to rearrange images displayed on web pages. The image arranger 1516 can be configured to arrange images on web pages according to ranked lists of the images generated by the image ranker 1514. For example, in a second stage 1518, the image arranger 1516 can identify the ranked list generated by the image ranker 1514 for images retrieved from the web page 1506. The image arranger 1516 can determine a second arrangement 1520 of the images retrieved from the web page 1506 based on the ranked list.

The image arranger 1516 can determine the second arrangement 1520 of the images retrieved from the web page 1506, for example, by identifying the different sizes (e.g., dimensions) or types of the placeholders for images on the web page 1506 or otherwise the locations on the web page 1506 from which the images were retrieved. In some embodiments, the image arranger 1516 can assign the images to the different locations of the web page 1506 such that the highest ranked image will be located in the largest location (e.g., will be the largest image on the web page 1506), the highest ranked image will be in the location closest to the top of the web page (e.g., the highest ranked image will be in the number one slot in an image carousel, the next highest ranked image will be in the number two slot in the image carousel, etc.) the lowest ranked image will be located in the smallest location (e.g., will be the smallest image on the web page 1506), and/or the other images will similarly be located in different locations on the web page 1506 according to the rankings of the images.

In some embodiments, the image arranger 1516 can determine the second arrangement 1520 for the web page 1506 by inspecting the web page 1506. For example, the image arranger 1516 can identify the different locations (e.g., placeholders or containers) for the images on the web page 1506 by inspecting web page 1506. From the inspection, the image arranger 1516 can identify the sizes of the different locations. The image arranger 1516 can identify the sizes of the locations of the web page 1506 and assign the images to the different locations of the web page 1506 in the second arrangement 1520 according to the identified sizes.

In some embodiments, the image arranger 1516 can determine the second arrangement 1520 for the web page 1506 based on attributes of images retrieved from the web page 1506. For example, the images may be stored with attributes that indicate the sizes in which the images are displayed on the web page 1506. The image arranger 1516 can retrieve such attributes from the database in which the images are stored and/or from web page 1506 itself. The image arranger 1516 can identify the sizes of the locations of the web page 1506 and assign the images to the different locations of the web page 1506 in the second arrangement 1520 according to the identified sizes.

In some embodiments, the image arranger 1516 can assign the images to the different locations of the web page 1506 or positions in a product image carousel based on a type of the location. For example, image containers on the web page 1506 can correspond to different types of images (e.g., hero image, banner image, a thumbnail, icon, background, infographic, product shots, illustrations, logos, social media share images, testimonial images, call-to-action images, and/or slider/carousel images). The different types of containers may correspond to different rankings (e.g., a hero image may correspond to a highest ranking and a background image may correspond with a lowest ranking, earlier images in an image carousel can correspond to higher rankings than later images in the same carousel). The different types of placeholders can correspond to any image ranking. The image arranger 1516 can determine the second arrangement 1520 based on the types of containers of the web page 1506.

The image arranger 1516 can determine the types of images or containers by inspecting the web page 1506. For example, the image arranger 1516 can inspect the web page 1506 and identify different attributes of the images or containers of images displayed on the web page 1506. In doing so, for example, the image arranger 1516 can identify tags such as '<img>' and identify different attributes that are associated with the tags. Examples of such attributes can be the width, height, size, and/or location of the images. The image arranger 1516 can apply a set of rules to the attributes of the images to determine types of the images. For example, images placed at the top and spanning the full width of the page are more likely to be hero images, while smaller images within content sections could be banner images or illustrations. The image arranger 1516 can use any such rule to determine the types of images or containers on the web page 1506. The image arranger 1516 can determine the types of the images or containers containing the images on the web page 1506 and use the rankings for the retrieved images of the web page 1506 to assign the images to the different containers of the web page 1506 accordingly.

In some embodiments, the image arranger 1516 can rearrange the images of the web page 1506 from the first arrangement 1508 to the second arrangement 1520. To do so, in some embodiments, the image arranger 1516 can transmit a message to the computing device 1504 that contains the second arrangement 1520. The computing device 1504 can receive the message, identify the second arrangement 1520, and rearrange the images according to the second arrangement 1520.

In one example, the image arranger 1516 can transmit a message to the computing device 1504 that indicates the locations or types of the retrieved images in the second arrangement 1520. For instance, the image arranger 1516 can assign the locations to the images retrieved from the web page 1506. The image arranger 1516 can include identifications of the images retrieved from the web page 1506 and indications of the location assignments of the images according to the second arrangement 1520 in the message to the computing device 1504. The computing device 1504 can receive the message and automatically change the arrangement of the images on the web page 1506 to the second arrangement 1520 (e.g., receipt of the message can cause the computing device 1504 to automatically change the arrangement of the images on the web page 1506).

The computing device 1504 can move the images on the web page 1506 to the second arrangement 1520. To do so, for example, the computing device 1504 can adjust the HTML code of the web page 1506 to move the images as the images are embedded in the web page 1506 to the second arrangement 1520 or the computing device 1504 can change the images that are called or loaded into the containers for the images on the web page 1506 to the second arrangement 1520 (e.g., rearrange the pointers to the images in the HTML code for the web page 1506). In one example, the computing device 1504 can move an image that was previously the banner image of the web page 1506 to be the hero image of the web page 1506, the hero image to be a background image, and the previous background image to be an illustration. The computing device 1504 can move the images retrieved from the web page 1506 to be in any container or to be in any location. The computing device 1504 can be triggered to automatically do so responsive to receiving the message containing the second arrangement from the image arranger 1516.

In some embodiments, the computing device 1504 or another computer hosting or storing the web page 1506 can rearrange the images of the web page 1506 by executing provisioned code from the image arrangement system 1502. For example, the image arrangement system 1502 can provision executable code to the computing device 1504 or otherwise the computer that hosts or stores the web page 1506. The computing device 1504 or otherwise the computer that receives the provisioned code can store the provisioned code in memory or in an application (e.g., a browser) that can access the code (e.g., HTML code) of the web page 1506. The provisioned code can be, include, or communicate with an API of the computing device 1504 that can communicate with the image arrangement system 1502. The image arranger 1516 can transmit the second arrangement to the provisioned code through the API with instructions to rearrange the images on the web page according to the second arrangement. In this way, the image arranger 1516 can automatically control the arrangement of the images on the web page 1506, which can enable the image arrangement system 1502 to monitor and/or dynamically change the arrangement of the images over time. In some embodiments, the image arranger 1516 can transmit the ranked list of the images to the computing device 1504 or other computer associated with the web page 1506, and the computing device 1504 or other computer can use the rankings to rearrange the images on the web page 1506.

The image arranger 1516 can monitor the interactions performed on the web page 1506 over time. A pixel can be installed (e.g., by the image arrangement system 1502 or the content evaluation system 1005) onto the web page 1506 or a second web page corresponding to or associated with the web page 1506. The pixel can collect and/or generate interaction data of the web page 1506. In one example, the web page 1506 can be a product page for a product being sold on a website and the second web page can be a cart page that indicates the product was selected for purchasing from the web page 1506 or a thank you page indicating the product was purchased from the web page 1506. The pixel can collect interaction data such as upload data of the cart page or the thank you page that indicates the product was purchased through the web page 1506, actions taken such as "Add to Cart" from the product detail page or number of sessions on the thank you page that indicate the product was purchased, or otherwise any other interactions that users perform on the web page 1506, the cart page, and/or the thank you page. In one example, the image arranger 1516 can collect upload counter data of the second web page that indicates each instance that a user selects an option on the web page 1506 to purchase the product of the web page 1506. The image arranger 1516 can increment an upload counter for each instance. The image arranger 1516 can generate a record and store the record in memory. The image arranger 1516 can transmit the record to the computing device 1504 or another computer associated with the web page 1506 indicating the upload counter data. The computing device 1504 or other computer can display the upload counter data from the record to a user to illustrate how the second arrangement 1520 is performing on the web page 1506.

The image arranger 1516 can collect and/or store any type of interaction data regarding the web page 1506. For example, the image arranger 1516 can collect data such as number of clicks, time on page, add to cart, conversions, upload counter data, etc. The image arranger 1516 can collect such data from a pixel placed on the web page 1506 or a second web page associated with the web page 1506 as described above, for example, through a performance analytics dashboard that captures daily, weekly, or monthly sales and interaction data on the site, through an API, etc., or through any other method.

The image arranger 1516 can use the collected data to compare how the rearrangement of the images on the web page 1506 from the first arrangement 1508 to the second arrangement 1520 affects user interactions with the web page 1506 and/or product transactions. For example, the image arranger 1516 can receive, collect, and/or determine first interaction data of the web page 1506 with the plurality of images in the first arrangement 1508 prior to rearranging the images on the web page 1506 to the second arrangement 1520. The first interaction data can be any type of interaction data such as described above. The image arranger 1516 can rearrange the images on the web page 1506 to the second arrangement 1520. The image arranger 1516 can receive, collect, and/or determine second interaction data of the web page 1506 with the plurality of images in the second arrangement 1520. The image arranger 1516 can compare the first interaction data with the second interaction data to determine a difference or change between the first interaction data and the second interaction data. In one example, in doing so, the image arranger 1516 can determine a change in upload counter data of a thank you page, a change in time on page, a change in number of uploads, etc., based on the comparison. The image arranger 1516 can generate a record indicating the difference between the first interaction data and the second interaction data. The image arranger 1516 can transmit the record to the computing device 1504 or another computer associated with the web page 1506 indicating the difference. The computing device 1504 or other computer can display the difference from the record to a user to illustrate how the second arrangement 1520 is performing on the web page 1506 compared with the first arrangement 1508.

In some embodiments, the image arranger 1516 can rearrange (e.g., automatically rearrange) the images on the web page 1506 based on interaction data the image arranger 1516 collects (e.g., collects through a pixel placed on the web page 1506 or a second web page associated with the web page 1506). For example, subsequent to rearranging the plurality of images on the web page 1506 to the second arrangement 1520, the image arranger 1516 can receive interaction data of the web page 1506 with the plurality of images in the second arrangement 1520. The image arranger 1516 can compare the interaction data (e.g., any type of the interaction data) of the web page 1506 in the second arrangement 1520 to a threshold (e.g., a defined threshold)

or any other condition (e.g., is within a specific range, is less than a threshold for a defined time period, etc.). Responsive to determining the interaction data of the web page 1506 in the second arrangement 1520 is less than the threshold or otherwise satisfies or does not satisfy a condition, the image arranger 1516 can rearrange the images of the web page 1506 according to a third arrangement.

The image arranger 1516 can determine the third arrangement for the images of the web page 1506. To do so, for example, the image arranger 1516 can use image performance scores generated by a different machine learning model or otherwise different image performance scores. For example, the image performance scores used to rearrange the images to the second arrangement 1520 may have corresponded to a first target audience or a composite image performance score (e.g., the rankings used to generate the second arrangement 1520 may have been determined based on the image performance score of the first target audience or composite image performance scores). The image arranger 1516 can determine the interaction data of the web page 1506 while the images of the web page 1506 are in the second arrangement 1520 is below a threshold or otherwise satisfies a condition. Responsive to doing so, the image arranger 1516 can identify image performance scores that correspond to a second target audience (e.g., a second target audience that corresponds to the web page 1506 and/or the website hosting the web page 1506) for the images of the web page 1506 or composite image performance scores of the web page 1506 (e.g., if composite image performance scores were not used to determine or generate the second arrangement 1520). The image ranker 1514 or the image arranger 1516 can determine rankings for the images based on or according to the identified image performance scores. The image arranger 1516 can generate or determine the third arrangement for the images of the web page 1506 based on the rankings. The image arranger 1516 can rearrange the images of the web page 1506 from the second arrangement 1520 to the third arrangement as described herein.

In some embodiments, the image arranger 1516 can determine the third arrangement for the images of the web page 1506 using recalculated scores for the images using the same machine learning model that originally generated the image performance scores to rearrange the images to the second arrangement 1520. For example, subsequent to generating the image performance scores that the image arrangement system 1502 used to rearrange the images of the web page 1506 to the second arrangement 1520, the image arrangement system 1502 can further train the machine learning model or machine learning models that were used to generate the image performance scores. The image arrangement system 1502 can train the machine learning models as described herein (e.g., train machine learning models for specific target audiences as described herein) based on interaction data with images of the website of the web page 1506 and/or interaction data of any other websites. By doing so, the image arrangement system 1502 can capture changes in preference of users when they browse different websites in how the machine learning models simulate the users (e.g., simulate users of different target audiences). The image evaluator 1512 can generate new image performance scores for the images of the web page 1506 (e.g., generate new image performance scores responsive to determining the interaction data of the web page 1506 satisfies a condition or is below a threshold) and the image ranker 1514 and the image arranger 1516 can rearrange the images of the web page 1506 according to the new image performance scores as described herein. In this way, the image arrangement system 1502 can monitor and/or adjust the arrangement of the images on the web page 1506 as users change preferences over time.

In some embodiments, the image arranger 1516 can determine web page scores for individual web pages. For example, the image arranger 1516 can identify the image performance scores of images of the web page 1506. In doing so, the image arranger 1516 can identify the image performance scores that were used to rearrange the images to the second arrangement 1520 and/or composite scores for the images. The image arranger 1516 can use any combination or permutation of the image performance scores of the web page 1506 to determine the web page scores. The image arranger 1516 can multiply, aggregate, calculate an average of, or apply any other function to the image performance scores of the web page 1506 to determine the web page score for the web page 1506. The image arranger 1516 can determine web page scores for any number of web pages.

The image arranger 1516 can generate and/or transmit a record of the web page score to the computing device 1504 and/or a computing device associated with the entity hosting the web page 1506. For example, the image arranger 1516 can insert the web page score the image arranger 1516 determined for the web page 1506 and insert the web page score in a record. The image arranger 1516 can transmit the web page score to the computing device 1504 and/or a computing device associated with the entity hosting the web page 1506.

In some embodiments, the image arranger 1516 can rank web pages based on the web page scores the image arranger 1516 determines for the web pages. For example, the image evaluator 1512 can generate image performance scores for different sets of images that are on different web pages. The image arranger 1516 can generate web page scores for each of the web pages based on the generated image performance scores. The image evaluator 1512 and the image arranger 1516 can do so using the systems and methods described herein. The image arranger 1516 can rank the web pages in order into a ranked list based on the web page scores of the web pages. The image arranger 1516 can generate and/or transmit a record of the ranked list of web pages and web page scores to the computing device 1504 and/or a computing device associated with the entity hosting the web page 1506.

In some embodiments, the image arrangement system 1502 can generate recommendations for specific products to different websites. For example, the image arrangement system 1502 can receive a request to generate recommendations for images that depict a product (e.g., a first product). The image arrangement system 1502 can receive the request from a computing device, such as the computing device 1504 or any other computing device. The request can include an identification of the product. Responsive to receiving the request, the image retriever 1510 can query a database in memory or hosted by a third party for a record containing a matching identification to the identification of the product in the request.

The image retriever 1510 can identify a record that contains a matching identification to the identification in the request. The record can contain one or more images that depict the product identified in the request that is otherwise associated with the identification. In some embodiments, the record contains a stock keeping unit (SKU) that individually identifies the product. The identification of the product can be the SKU for the product, in some cases. Responsive to identifying the record, the image retriever 1510 can retrieve the images from the record.

Responsive to the image retriever 1510 retrieving the images that depict the product from the record, the image evaluator 1512 can determine one or more image performance scores for each of the images. The image evaluator 1512 can determine the one or more image performance scores, for example, by using machine learning techniques as described herein. For instance, the image evaluator 1512 can execute at least one machine learning model using the images retrieved from the record as input. The at least one machine learning model can be trained to generate image performance scores for images that indicate a likelihood of interaction with the images by users who view the images. In some embodiments, the at least one machine learning model can correspond to different target audiences and/or the general public (e.g., each of the at least one machine learning model can be configured to simulate a different target audience. In some cases, one of the machine learning models can simulate the general public, which can correspond to users of a mix of any number of target audience or be agnostic to target audiences). In executing the at least one machine learning model, the image evaluator 1512 can generate one or more image performance scores for each image that the image retriever 1510 retrieved from the record.

In some embodiments, the image evaluator 1512 may only determine image performance scores for the images from the record for target audiences or product categories that correspond with the record. For example, the record may contain one or more identifications of target audiences. Such identifications may be input by a user, in some cases. The identifications may indicate target audiences that may correspond with the product. For example, the product may be a tent for camping. In such cases, the record may contain an identification of a target audience of people who like to go camping and an identification of a target audience of people who enjoy shopping for tents. The record can include any identifications of target audiences. The image evaluator 1512 can identify the identifications in the record and only determine image performance scores (or target audience scores) for the images from the record for the target audience of people who like to go camping and for people who enjoy shopping for tents. Accordingly, the image evaluator 1512 can reduce the processing resources of determining image performance scores for images of specific products compared to systems that may determine image performance scores using every machine learning model that is available.

The image ranker 1514 can rank the images for which the image evaluator 1512 generated image performance scores. For example, the image ranker 1514 can compare the image performance scores that the image evaluator 1512 generated for the images that the image retriever 1510 retrieved from the record. The image ranker 1514 can assign rankings to the images according to the image performance scores (e.g., rank images in ascending or descending order based on the image performance scores of the images). In embodiments in which the image evaluator 1512 generates multiple image performance scores for the images, the image ranker 1514 can rank the images separately for each target audience and/or based on a composite image performance score that the image ranker 1514 determines based on the image performance scores of each image. In this way, the image ranker 1514 can generate one or more ranked lists based on the image performance scores of the images depicting or otherwise associated with the product.

The image arranger 1516 can determine subsets of the images retrieved from the record for a plurality of servers. The plurality of servers can each correspond to a different website (e.g., host or otherwise be owned by an entity that owns a different website). The image arranger 1516 can determine the subsets of images based on image display policies of the different servers. The image display policies may be or include rules that the image arranger 1516 stores in memory of the image arrangement system 1502 that indicate how to recommend or determine lists of images to recommend for different products. The image display policies can correspond to different numbers of images to include in ranked lists (e.g., number of images to display on a web page for a particular product) and/or target audiences. Each server can correspond to a different image display policy.

To determine a subset of images for each server, the image arranger 1516 can identify the image display policy of the server (e.g., a server of a group entity such as a retailer or a host of a platform in which goods can be exchanged). For example, the image arranger 1516 can identify an image display policy for a server that indicates to include five images of a product in a recommendation. The image display policy of the server may also indicate to only include a ranked list for a first target audience (e.g., target audience A). The image arranger 1516 can identify the image display policy and identify a ranked list of the product that the image ranker 1514 generated for the product and the first target audience and identify the five highest ranked images from the ranked list. The image arranger 1516 can generate a record containing the identified five highest ranked images from the ranked list and transmit the record to the server. In some cases, an image display policy may include identifications of multiple target audiences. In such cases, the image arranger 1516 can identify a number of images as identified in the image display policy for each of the target audiences and generate and transmit a record containing the subsets of images for each of the target audiences to the server that corresponds to the image display policy. The image arranger 1516 can determine any number of subsets of images for the product and transmit the subsets to any number of servers. The image arranger 1516 can generate and/or transmit records of lists identifying the images in the ranked lists, pointers to the images in the ranked lists, and/or the images themselves.

The servers can receive the ranked lists and display the images of the ranked lists on web pages hosted by or otherwise associated with the servers. In some embodiments, the servers can do so based on the order of the images in the ranked lists. For example, a server can receive a ranked list of images for a first product. The server can place the highest ranked image as the hero image of a web page for the first product, the second highest ranked image as the banner image of the web page for the first product, etc. The server can use any procedure or rule to place images in locations on the web page. Each server can arrange the images of the ranked list that the server receives using different or similar rules.

In some embodiments, one or more servers can select an arrangement of the images of the product on the web page for the product based on a target audience of a user visiting the web page. For example, a server may determine different arrangements for images of a ranked list for different target audiences. The server can determine a target audience for a user visiting the web page using cookie data and/or otherwise the techniques described in U.S. application Ser. No. 17/673,635, filed Feb. 16, 2022. For example, the server can determine a target audience for a user visiting the web page using data of actions (e.g., searches, clicks, purchases, product views, web page views, etc.) the user has performed while accessing the website hosted by the server. The server can identify the target audience of the user that is viewing the web page, select the arrangement of the images that corresponds with the target audience, and display the images of the subset of images recommended for the product according to the arrangement the server determined for the target audience.

In some embodiments, one or more servers can select which images to present on a web page to a user based on a target audience of a user visiting the web page. For example, a server can receive ranked lists for a web page of a product for different target audiences. The server can determine a target audience of a user for which the server is serving a web page using the systems and methods described herein. Upon doing so, the server can identify the subset of images of the ranked list for the target audience and place the images on the web page according to the order of the ranked list as described above or using any other method.

In some embodiments, subsequent to transmitting the ranked lists of the product to the different servers to use to display the images of the ranked lists on web pages for the product, the image arrangement system 1502 can use systems and methods described herein to monitor and/or rearrange the images on the web pages of the product on the different web pages.

In some embodiments, the image arranger 1516 can use an arrangement scoring machine learning model to rearrange images on a web page. For example, the image arranger 1516 can store a machine learning model that has been trained to generate arrangement scores for web pages based on the arrangement of the images on the web pages. The image arrangement system 1502 or another computing device can train such a machine learning model in a similar manner to how the image scoring machine learning model was trained to generate image performance scores for individual images. For example, the image arranger 1516 can receive interaction data of interactions performed on different web pages with the web pages. The interaction data can be the same as or similar to the interaction data that can be used to train the machine learning model for image scoring but indicate interactions with the web page as a whole, rather than individual images. The machine learning model can be trained using supervised learning techniques based on different web pages using the interaction data of the respective web pages as labels (e.g., using back-propagation techniques with a loss function). During the training, depending on the embodiment, the machine learning model may receive the web pages themselves or extracted content (e.g., the images) from the web pages as input or location data (e.g., pixel locations, image sizes, container sizes, image types, etc.) of the images on the web pages as input.

The image arrangement system 1502 can receive a pointer to a web page. The pointer can be a URL of the web page or a hyperlink through which the web page can be accessed. In some embodiments, the pointer can be an identification of a record in a database (e.g., a local database stored in memory of the data processing system or a database stored at a remote computing device). The image arranger 1516 can receive the pointer and use the pointer to access the web page.

The image arranger 1516 can use the pointer to access the web page. For example, when the pointer is a pointer to the webpage itself, the image arranger 1516 can access the web page over a network using the pointer. When the pointer is to a record in a database, the data processing system can access the record in the database, the image arranger 1516 can use the pointer to identify a record in the database responsive to determining the record has an identification that matches the pointer. The record can include the web page as a document, including any images and/or text that is on the web page in the same arrangement as the web page.

The image arranger 1516 can extract images from the web page. When the image arranger 1516 accesses the web page over a network, the image arranger 1516 can extract the images from the web page using web scraping techniques. The image arranger 1516 can copy the images and store the images locally in memory, such as in a cache for fast retrieval when processing. When the image arranger 1516 accesses the web page from a database, the image arranger 1516 can identify the images from the record on which the web is stored. The image arranger 1516 can use object recognition techniques to identify the images on the web page from the record. In some embodiments, the image arranger 1516 can query a product record of the product of the web page to identify the image files (e.g., .jpg files) of the web page.

In some embodiments, the image arranger 1516 can identify location information of the images of the web page. The location information can indicate the locations of the pixels of the images, the sizes (e.g., dimensions) of the images on the web page, the types of the images (e.g., carousel image, hero image, banner image, background image, location in the carousel, etc.), etc. When the image arranger 1516 extracts the images from the web page over a network, the image arranger 1516 can determine the location information of the images by inspecting the web page and identifying any metadata or data about the image. The image arranger 1516 can determine types of the image using one or more rules as described herein. When the image arranger 1516 extracts the images from the web page as the web page is stored in a database, the image arranger 1516 can use object recognition techniques (e.g., using a machine learning model) on the record to determine the location information of the images on the web page. In some cases, the location information can be stored in the record of the image as metadata. The location information that the image arranger 1516 identifies for images stored on the web page can be an arrangement of images on the web page.

The image arranger 1516 can generate an arrangement score for the web page. The image arranger 1516 can generate the arrangement score for the web page by executing the machine learning model configured to generate arrangement scores for web pages. For example, the image arranger 1516 can input the location information of the images and the images themselves into the machine learning model. The image arranger 1516 can execute the machine learning model and generate an arrangement score for the web page based on the images and the information of the images. In some embodiments, the image arranger 1516 can insert the web page itself into the machine learning model and the machine learning model can automatically generate an arrangement score for the web page.

In some embodiments, the image arranger 1516 can include image performance scores for the image in the input with the images, the location data of the images, and/or the web page itself. For example, the image evaluator 1512 can execute a machine learning model to generate an image performance score for each image of the web page. In some embodiments, the image evaluator 1512 can generate image performance scores using a machine learning model that corresponds to a specific target audience (e.g., a target audience that corresponds with the web page in the database by a target audience identifier or a target audience that is identified in the request to rearrange the web page). The image evaluator 1512 can generate image performance scores for the specific target audience for the images of the web page. The image arranger 1516 can include the image performance score in the input to the machine learning model to generate an arrangement score for the web page, in some cases with the identifier of the target audience for which the image performance scores were generated. The image performance scores can improve the image arranger 1516 ability to generate arrangement scores for images including when the arrangements are generated for specific target audiences compared to inputs that only include images.

The image arranger 1516 can compare the arrangement score to a threshold. The threshold can be a value that the image arrangement system 1502 has stored in memory or a value that the image arrangement system 1502 receives in the request to rearrange the images of the web page. Responsive to determining the arrangement score exceeds the threshold, the image arranger 1516 can transmit a message to the computing device that transmitted the request indicating the current arrangement is adequate and does not need to be rearranged.

However, responsive to determining the arrangement score is less than the threshold, the image arranger 1516 can generate a new arrangement of the images. The image arranger 1516 can generate the new arrangement by adjusting the location information of the images on the web page in one or more ways. For example, the image arranger 1516 can move different images up or down on the web page, swap types of the images, change the order of carousel images of an image carousel on the web page, increase or decrease the size of different images, etc. The image arranger 1516 can make such adjustments according to a defined template. In some embodiments, the image arranger 1516 can apply machine learning techniques to automatically adjust the location information of the different images. The image arranger 1516 can adjust the images on the web page in any way.

The image arranger 1516 can generate an arrangement score based on the new arrangement of the images on the web page. The image arranger 1516 can generate the arrangement score using the images of the web page, the location data of the images, and/or image performance scores of the images of the web page as input, as described herein. The machine learning model can output an arrangement score based on the input. The image arranger 1516 can compare the arrangement score for the new arrangement to the threshold. Responsive to determining the arrangement score is less than the threshold, the image arranger 1516 can repeat the process of generating a new arrangement, generating an arrangement score for the new arrangement, and comparing the arrangement score to the threshold. The image arranger 1516 can do so until identifying a new arrangement with an arrangement score that exceeds the threshold.

In some embodiments, instead of iteratively generating new arrangements until identifying an arrangement that corresponds to an arrangement score exceeding the threshold, the image arranger 1516 can generate multiple arrangements at once and select a defined number (e.g., one) of the highest scoring image arrangements. The image arranger 1516 can separately adjust the arrangements of the images on the web page using multiple templates, for example. In doing so, the image arranger 1516 can generate multiple arrangements of the images on the web page. The image arranger 1516 can generate arrangement scores for each of the multiple arrangements. The image arranger 1516 can compare the arrangement scores with each other and identify a defined number of arrangements with the highest arrangement scores based on the comparison. The image arranger 1516 can transmit the defined number of arrangements to the computing device that transmitted the request.

In some embodiments, the image arranger 1516 can rearrange the images on the web page according to the new arrangement. The image arranger 1516 can do so in the same manner as described with respect to the process of generating arrangements based on image performance scores and rearranging images on the web page based on the generated arrangements. For example, the image arranger 1516 can transmit the generated arrangement to the computer hosting the web page. The computer can receive the generated arrangement and update the arrangement of the images on the web page. In another example, the image arrangement system 1502 can provision code to the computer hosting the web page. The computer can store the code in an application configured to update the web page. The image arranger 1516 can transmit the new arrangement to the code and the code can automatically rearrange the web page according to the new arrangement. In cases in which the images of the web page are stored in a database, the image arranger 1516 can update the metadata of the images to have the new arrangement such that when the web page is later loaded by a computing device, the web page will have the new arrangement. The image arranger 1516 can rearrange the images in any manner.

In some embodiments, the image arranger 1516 can generate arrangements for different target audiences. For example, the image arranger 1516 can perform the process of selecting an arrangement of the images on the web page that corresponds with an arrangement score that exceeds a threshold using image performance scores of different target audiences. In doing so, the image arranger 1516 may generate arrangements that are configured to perform well for specific target audiences. The image arranger 1516 can transmit such arrangements to a computer hosting the web page with identifiers of the target audiences of the respective arrangements. The computer hosting the web page can determine the target audience of a computer that is requesting the web page (e.g., using cookies or the systems and methods described herein) and arrange the images on the web page with the arrangement for the determined target audience.

Changing the arrangements of images for different web pages as described herein can alter the desktop and the mobile viewing experiences of the images on the web pages. For example, the image arrangement system 1502 can change the code of a web page to rearrange the images that are displayed on the web page. The same web page may be configured to have a responsive web design (e.g., using a CSS language). Accordingly, when the rearranged web page is displayed on a mobile screen, the images can be configured correctly as applied by the same settings the web page had before the rearrangement. The images can similarly be displayed on a non-mobile screen, such as a desktop screen, or any other type of screen, such as a tablet.

Figure 16:
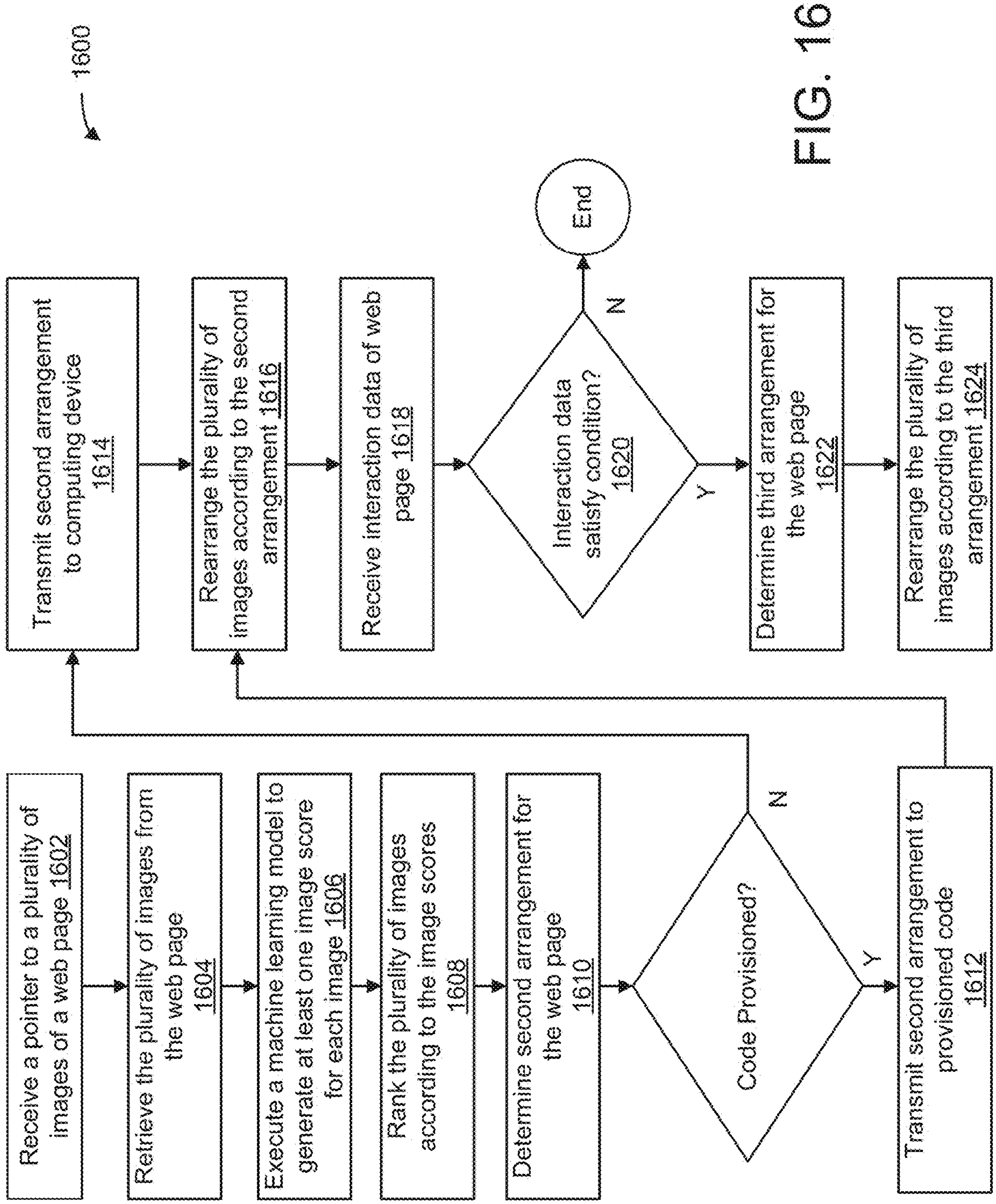
FIG. 16 is a flow diagram illustrating a method for automatic web page image arrangement in accordance with an illustrative embodiment.

FIG. 16 is a flow diagram illustrating a method 1600 for automatic web page image arrangement in accordance with an illustrative embodiment. In some implementations, the method 1600 can be performed by a data processing system such as any of the components of the system 1000 shown in FIG. 10 or the image arrangement system 1502. The method 1600 may include more or fewer operations and the operations may be performed in any order. Performance of the method 1600 may enable the data processing system to automatically and dynamically rearrange images on a web page in real time to improve the accessibility of the web page with different users or different types of users.

At operations 1602 and 1604, the data processing system receives a pointer to a plurality of images of a web page (e.g., that are depicted on or included in the web page) and retrieves the plurality of images. The data processing system can receive the pointer in a message from a computing device. The pointer can be a URL to a web page of a website, a page identification of a page on a website, or a product identification (e.g., an SKU) of a product. The web page can be a web page for a product (e.g., a web page that includes the product in different images). In cases in which the pointer is a URL, the data processing can access the web page using the URL and extract or web scrape images from the web page. In cases in which the pointer is a page identification, the data processing system can access the web page that corresponds to the page identification and extract or web scrape images from the web page. In cases in which the pointer is a product identification, the data processing system can identify a location or a record in memory or a database that corresponds to the product identification and retrieve images from the location or record. In some embodiments, the data processing system can receive one or more image files of images (e.g., in a data file) on the web page. In such embodiments, the data processing system can identify or extract the images of the web page from the image files. The data processing system can identify and/or retrieve the images of the web page in any manner.

At operation 1606, the data processing system executes a machine learning model to generate at least one image performance score for each image. The machine learning model can be trained to generate image performance scores that indicate likelihoods that users will interact with different images. The data processing system can input the retrieved images from the web page into the machine learning model and execute the machine learning model. As a result, the machine learning model can output an image performance score for each image. The image performance score can indicate the likelihood that different users will interact with the image for which the image performance score was generated. In some embodiments, the data processing system can generate multiple image performance scores for each image. Each image performance score can correspond to a different target audience or the general public (e.g., a likelihood that members of the target audience or the general public would interact with the image). The data processing system can generate the image performance scores using different machine learning models that are each trained to generate image performance scores for a different target audience. Accordingly, the data processing system can use different machine learning models to simulate how different target audiences would interact with the images of the web page.

At operation 1608, the data processing system ranks the plurality of images. The data processing system can rank the plurality of images according to the image performance scores the data processing system generated for the images. For example, the data processing system can rank (e.g., assign numerical rankings to) the images in ascending or descending order based on the image performance scores the data processing system generated for the images. The data processing system can generate a ranked list of the images based on the rankings. In embodiments or cases in which the data processing system determines image performance scores for the images for different target audiences, the data processing system may separately rank and generate a ranked list for each target audience based on the image performance scores for the images for each target audience. In some embodiments, the data processing system can determine composite scores for images as a function of the different image performance scores that the data processing system determines for each of the images. The data processing system can determine a ranked list of the images based on the composite scores of the images.

At operation 1610, the data processing system determines a second arrangement for the images of the web page. The data processing system can determine the second arrangement according to one or more rules and/or based on the ranked list of the images. The data processing system can determine the second arrangement of the web page by determining new locations on the web page for one or more of the images on the web page. The data processing system can determine new locations for the images based on the types of the locations (e.g., hero, banner, illustration, etc.) or size (e.g., height, width, height×width, etc.) of the locations. The locations can be containers in which images can be placed and/or locations in which images are currently embedded. In one example, the rules may indicate to place higher ranked images in larger or more prominent locations of a web page, such as in the location for the hero image and/or the banner image and lower ranked images in less prominent locations of a web page, such as on the side of the web page or as a later image in an image carousel of the web page. In another example, the data processing system can determine the locations based on the sizes of the locations. The data processing system can determine the types and/or sizes of the locations by inspecting the web pages and applying rules or machine learning to the source code (e.g., HTML code) of the web page to determine the types, sizes, and/or any other characteristics of the locations of the web page.

If code that corresponds with the data processing system (e.g., that can communicate with the data processing system) has been provisioned to (e.g., by the data processing system or another computer) the computer that hosts the web page, at operation 1612, the data processing system transmits the second arrangement to the computer that hosts the web page. The data processing system can do so by transmitting the second arrangement to the code, which the computer may have stored in a browser or other application that can configure the web page. The code may receive the second arrangement and, at operation 1616, arrange (e.g., automatically arrange) the images on the web page according to the second arrangement.

In some cases, instead of transmitting the second arrangement to provisioned code (e.g., in cases in which code has not been provisioned to the computer hosting the website) at operation 1614, the data processing system transmits the second arrangement to the computer that hosts the web page through another communication protocol, such as in a message that the computing device can receive through other means than code that is dedicated to configuring the web page. The computer can receive the second arrangement and, at operation 1616, arrange (e.g., automatically arrange or responsive to a user input) the images on the web page according to the second arrangement. In this way, the data processing system can automatically and dynamically arrange images on a web page using target audience simulations and without any user input.

At operation 1618, the data processing system receives interaction data of the web page. The interaction data can be any type of interaction that users have while accessing the web page. The interaction data can be or include, for example, number of clicks, time on page, add to cart, conversions, upload counter data, etc. In some cases, the interaction data can be or include number of uploads of a thank you page that the computer presents after a user purchases the product of the web page. The data processing system can receive the interaction data through a pixel that the data processing system places on the web page. The data processing system can receive the interaction data of the web page over time to monitor how the second arrangement of images is performing on the web page.

At operation 1620, the data processing system determines whether the collected interaction data satisfies a condition. An example of such a condition may be, for example, whether any specific type of interaction data exceeds a threshold (e.g., a defined threshold corresponding to the type of interaction data). For example, the data processing system can determine whether the web page receives a minimum number of clicks, a minimum number of page views, a minimum number of uploads of a thank you page, a minimum number of selections of an add to cart on the page, etc. The data processing system can determine whether the interaction data collected for defined intervals satisfies such a condition. The data processing system can do so for each of the defined intervals. The data processing system can determine a condition is satisfied responsive to determining the interaction data does not exceed the threshold, or vice versa. The data processing system can use any condition or threshold when making the determination.

Responsive to determining the interaction data satisfies the condition (or does not satisfy the condition, depending on the embodiment), at operation 1622, the data processing system determines a third arrangement of the images of the web page. The data processing system may determine the third arrangement of the images of the web pages based on image performance scores of a different target audience and/or by determining new image performance scores for the images. The data processing system may determine the third arrangement using similar methods to the methods used to determine the second arrangement but with the image performance scores of a different target audience or the newly determined image performance scores.

At operation 1624, the data processing system rearranges the images of the web page according to the third arrangement. The data processing system can rearrange the images of the web page using similar methods to those used to rearrange the images to the second arrangement.

Figure 17:
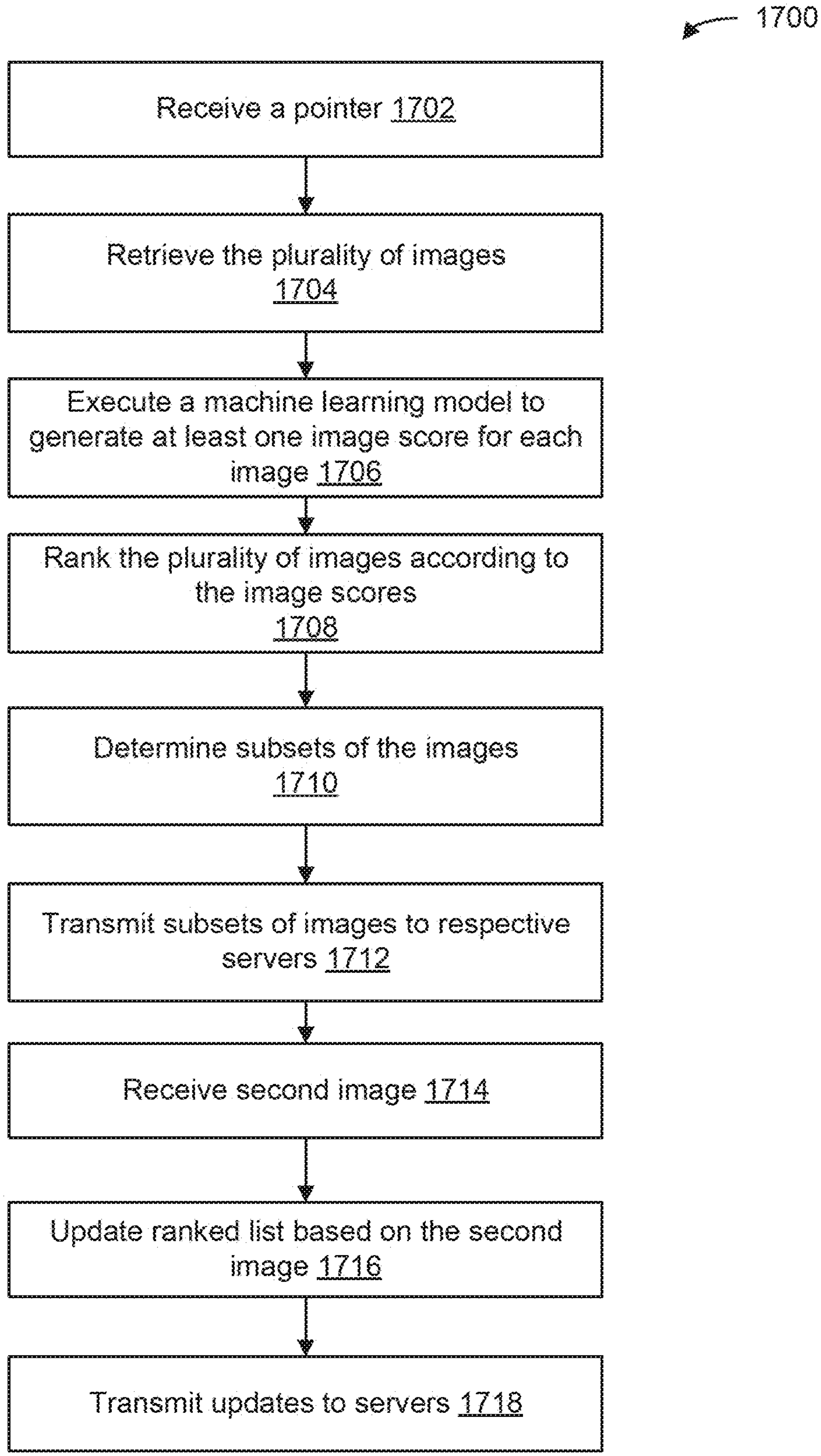
FIG. 17 is a flow diagram illustrating a method for automatic web page image arrangement in accordance with an illustrative embodiment.

FIG. 17 is a flow diagram illustrating a method 1700 for automatic web page image arrangement in accordance with an illustrative embodiment. In some implementations, the method 1700 can be performed by a data processing system such as any of the components of the system 1000 shown in FIG. 10 or the image arrangement system 1502. The method 1700 may include more or fewer operations and the operations may be performed in any order. Performance of the method 1700 may enable the data processing system to automatically and dynamically rearrange images on web pages for a product in real time to improve the accessibility of the web pages for the product with different users or different types of users.

At operation 1702, the data processing system receives a pointer to a record in a database. The record can correspond to a product (e.g., a first product) and contain one or more images that depict the product. The record can contain an SKU of the product. The pointer can be the same SKU or another identification of the product. The database can be a database that is locally stored in memory of the data processing system or in memory of a remote computing device. The data processing system can use the pointer to query the database for the record, such as by searching for a record with a value that matches the pointer. The data processing system can identify a record with a matching value and, at operation 1704, the data processing system can retrieve the images depicting the product from the record.

At operation 1706, the data processing system executes a machine learning model to generate at least one image performance score for each image. The machine learning model can be trained to generate image performance scores that indicate likelihoods that users will interact with different images. The data processing system can input the retrieved images from the record into the machine learning model and execute the machine learning model. As a result, the machine learning model can output an image performance score for each image. The image performance score can indicate the likelihood that different users will interact with the image for which the image performance score was generated. In some embodiments, the data processing system can generate multiple image performance scores for each image. Each image performance score can correspond to a different target audience or the general public (e.g., a likelihood that members of the target audience or the general public would interact with the image). The data processing system can generate the image performance scores using different machine learning models that are each trained to generate image performance scores for a different target audience. Accordingly, the data processing system can use different machine learning models to simulate how different target audiences would interact with the images of the record that depict the product.

At operation 1708, the data processing system ranks the plurality of images. The data processing system can rank the plurality of images according to the image performance scores the data processing system generated for the images. For example, the data processing system can rank (e.g., assign numerical rankings to) the images in ascending or descending order based on the image performance scores the data processing system generated for the images. The data processing system can generate a ranked list of the images based on the rankings. In embodiments or cases in which the data processing system determines image performance scores for the images for different target audiences, the data processing system may separately rank and generate a ranked list for each target audience based on the image performance scores for the images for each target audience. In some embodiments, the data processing system can determine composite scores for images as a function of the different image performance scores that the data processing system determines for each of the images. The data processing system can determine a ranked list of the images based on the composite scores of the images.

At operation 1710, the data processing system determines subsets of the images of the product. The data processing system can determine the subsets of the images for different servers that have web pages for the product (e.g., web pages that are dedicated to the product). The data processing system can determine the subsets of the images based on image display policies of the servers (e.g., websites hosted by or otherwise associated with the servers) and/or the rankings of the images of the product. For example, different servers may have different image display policies that indicate a number of images to display on a web page for a product and/or one or more target audiences to use when recommending the images. The data processing system can store the image display policies for the different servers. For each server for which the data processing system stores an image display policy, the data processing system can identify a number of the highest ranked images, in some cases, as identified in the image display policy for the server. In cases in which an image display policy indicates a target audience, the data processing system may select the highest ranked images from a ranked list that was generated based on image performance scores that were generated for the target audience. The data processing system can similarly identify subsets of images for any number of servers.

At operation 1712, the data processing system transmits the subsets of images to the servers for which the subsets were determined. The data processing system can generate a record for each subset that includes identifications of the images of the subset and/or the images of the subset themselves. The data processing system can transmit the records to the servers for which the subsets were determined. The servers can receive the records and display the records on web pages for the product.

In some cases, the data processing system can update the recommendations for different servers over time. For example, subsequent to performing the operation 1712, at operation 1714 the data processing system receives a second image (e.g., a new image). The second image can be an image that depicts the product. The data processing system can determine the second image depicts the product (e.g., by using a machine learning model configured to use object recognition techniques on images or based on an indication in the message that includes the second image) and update the record of the product to include the second image.

At operation 1716, the data processing system updates the ranked lists for the product based on the second image. For example, the data processing system can determine one or more image performance scores for the second image using the systems and methods described herein. Responsive to doing so, the data processing system can compare the image performance scores for the second image to the image performance scores of the other images in the record for the product. The data processing system can re-rank the ranked lists of images for the product by inserting the second image in the ranked lists according to the image performance scores for the images.

The data processing system can identify any servers that received recommendations that would be affected by the updated rankings. The data processing system can do so, for example, when reranking the images causes the second image to be ranked within a defined number of the highest ranked images for a server or website. For instance, the data processing system may have recommended Image A and Image B to a server because the image display policy for the server indicated to recommend the two highest ranked images. Upon updating the rankings based on the addition of the second image, the data processing system may determine the second image has replaced Image B as the second highest ranked image for the product. Responsive to determining a change in the recommendation for the server, at operation 1718, the data processing system generates and transmits a record with an updated recommendation that includes the second image, in some cases without any images that the second image is replacing in the recommendation. The data processing system may only transmit such recommendations to servers for which the addition of the second image causes a change to the initial recommendation for the servers.

Figure 18:
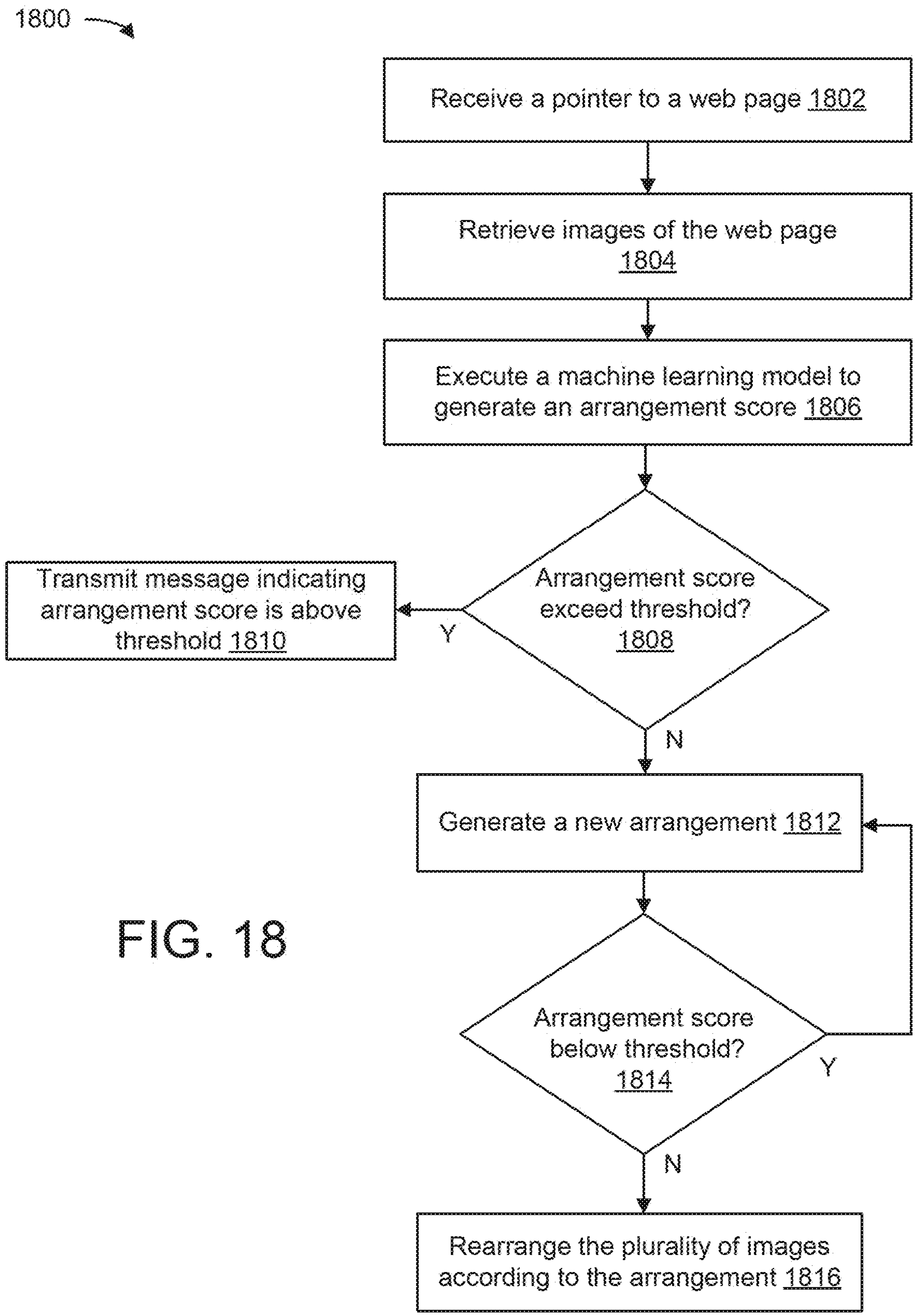
FIG. 18 is a flow diagram illustrating a method for automatic web page image arrangement in accordance with an illustrative embodiment.

FIG. 18 is a flow diagram illustrating a method 1800 for automatic web page image arrangement in accordance with an illustrative embodiment. In some implementations, the method 1800 can be performed by a data processing system such as any of the components of the system 1000 shown in FIG. 10. The method 1800 may include more or fewer operations and the operations may be performed in any order. Performance of the method 1800 may enable the data processing system to automatically and dynamically rearrange images on web pages in real time to improve the accessibility of the web page for different users or different types of users.

At operation 1802, the data processing system receives a pointer to a web page. The pointer can be a URL or a hyperlink to access the web page or an identification of a record in a database (e.g., a local database stored in memory of the data processing system or a remote database stored at a remote computing device) that corresponds to the web page. The data processing system can receive the pointer from a computing device, such as a computing device hosting the web page or that corresponds to or is owned by a common owner of the web page. The web page can display one or more images (e.g., images of or depicting a product).

At operation 1804, the data processing system retrieves images of the web page. The data processing system can retrieve the images from the web page by using web scraping techniques on the web page or by retrieving the images from a database that contains a record of images on the web page (e.g., a record including the web page itself). The data processing system can use the pointer to retrieve the images of the web page by accessing the web page through the URL or hyperlink of the pointer or by accessing the record for the web page in the database based on the identification of the record in the pointer.

When retrieving the images, the data processing system can identify and record (e.g., write in memory) the locations of the image on the web page. The locations can be or correspond to pixel placement and/or size of the images on the web page, the types of the images (e.g., hero image, banner image, background image, carousel image, first carousel image, last carousel image, etc.), etc. The data processing system can identify the locations as metadata of the images in the database or by inspecting the web page during web scraping. Together, the location data of the images on the web page can be an arrangement (e.g., a first arrangement) of the images on the web page.

At operation 1806, the data processing system executes a machine learning model (e.g., an arrangement score machine learning model) to generate at least one arrangement score for the images. The machine learning model can be or include a neural network or any other type of machine learning model. The machine learning model can be trained to generate arrangement scores for different arrangements of images on web pages. The data processing system can be trained to do so based on web pages that include images themselves or based on a set of location data of images that are on a web page. The data processing system can execute the machine learning model using the location data of the images of the web page as input. Based on the execution, the machine learning model can output an arrangement score for the web page.

At operation 1808, the data processing system determines whether the arrangement score for the web page exceeds a threshold. The data processing system can do so by comparing the arrangement score to a threshold. Responsive to determining the arrangement score exceeds the threshold, at operation 1810, the data processing system can transmit a message to the computing device that initially transmitted the pointer to the data processing system or a computing device that is otherwise associated with the web page (e.g., that hosts the web page or that is owned by a common owner to the web page) indicating the arrangement score for the web page exceeds the threshold. In doing so, the data processing system can indicate to the computing device that the arrangement does not need to be changed.

Responsive to determining the arrangement score is less than the threshold, at operation 1812, the data processing system generates a new arrangement. The data processing system can generate the arrangement by adjusting the pixel locations of the image on the web page, changing the order of the images in an image carousel of the web page, switching the images between different types (e.g., making the previous banner image a hero image and vice versa), etc. In some embodiments, the data processing system can generate new higher scoring images based on the features of the images of the web page, as described herein, and replace the images with the higher scoring images. The data processing system can adjust the arrangement using machine learning techniques, in some embodiments. The data processing system can adjust the arrangement of the images in any way.

At operation 1812, the data processing system determines whether an arrangement score of the new arrangement exceeds the threshold (e.g., the same threshold as was used in the operation 1808). The data processing can execute the machine learning model using the new arrangement as input, as described herein, to generate an arrangement score for the new arrangement. The machine learning model can output an arrangement score for the new arrangement. The data processing system can determine whether the arrangement score for the new arrangement exceeds the threshold. Responsive to determining the new arrangement score does not exceed the threshold, the data processing system can return to the operation 1812. The data processing system can iteratively repeat the operations 1812 and 1814 until the data processing system identifies an arrangement with an arrangement score that exceeds the threshold.

Responsive to determining a new arrangement exceeds the threshold, at operation 1816, the data processing system rearranges the images of the web page according to the new arrangement. The data processing system can rearrange the images according to the new arrangement in a similar manner to the manner described with reference to the operation 1624. For example, the data processing system can transmit a message containing the new arrangement to the computing device that transmitted the request and the computing device can update the arrangement of the web page according to the message or the data processing system can provision code to the computing hosting the web page. The data processing system can transmit the new arrangement to the code and the code can automatically rearrange the images on the web page according to the new arrangement.

The data processing system can input the retrieved images from the record into the machine learning model and execute the machine learning model. As a result, the machine learning model can output an image performance score for each image. The image performance score can indicate the likelihood that different users will interact with the image for which the image performance score was generated. In some embodiments, the data processing system can generate multiple image performance scores for each image. Each image performance score can correspond to a different target audience or the general public (e.g., a likelihood that members of the target audience or the general public would interact with the image). The data processing system can generate the image performance scores using different machine learning models that are each trained to generate image performance scores for a different target audience. Accordingly, the data processing system can use different machine learning models to simulate how different target audiences or users would interact with the images of the record that depict the product.

In some embodiments, the data processing system can replace (e.g., automatically replace) one or more images on a web page instead of or in addition to rearranging the images on the web page. For example, the contents of one image may be a bag of cat food with a mom and kids. The contents of a second image may be a bag of cat food with a fluffy white cat. The data processing system may implement the systems and methods described herein to move image with the fluffy cat to another slot (e.g., slot two) of the web page and move the image of the cat with mom and kids to a different slot (e.g., slot four) of the web page. Alternatively, the data processing system may determine the image of the fluffy white cat may have a performance score (e.g., a performance score for a particular target audience, such as a target audience with a stored association with the web page) below a threshold. Responsive to doing so, the data processing system may identify an image with a higher performance score (e.g., a performance score, such as a performance score for the same target audience, above the threshold) from memory. An example of such a higher scoring image may be a black cat instead of a white cat. Responsive to identifying the image with the higher performance score, the data processing system can replace the image of the fluffy white cat with the fluffy black cat in the slot of the web page in which the image of the fluffy white cat was previously located. The data processing system can similarly replace any number of images on a web page. In some embodiments, subsequent to replacing the image or images with the new image or new images, the data processing system can use the systems and methods described herein to rearrange the images on the web page.

Internet search engines may perform searches by crawling different web pages and/or websites containing the web pages. The Internet may include a vast number of web pages that contain information in various formats including text, images, and other multimedia. Search engines index these web pages and retrieve relevant web pages in response to user queries. However, the relevance of a web page to a query is typically determined by analyzing the text content of the web page and the query.

While search engines may consider image content when determining relevance to a search query, a technical problem that arises when considering such image content is that the consideration may be limited to analyzing metadata associated with the images. There is not currently a method for search engines to consider the visual content of the images themselves or the role of the images on the web pages. Thus, search engines may not be able to provide accurate search results when determining which search results to present to a user, particularly when taking images and the quality of those images, emotional engagement, and relevance of those images, etc., into account in the search.

A computer implementing the systems and methods described herein may overcome these technical deficiencies. The computer can do so by using a search engine machine learning model that is trained to use web page scores for web pages that have been generated based on images on that are on the web pages. Web page scores can indicate an aggregate attractiveness of the images on respective web pages. The computer can determine a web page score for a web page based on or as a function of the score of the contents of the page in its entirety, a combined or aggregated score of all the visual contents on the page, a score of a single main "hero" image on the page, etc. For example, the computer can store an image performance score for each image within a set of images. The set of images can include one or more subsets where each subset of images corresponds to a different web page (e.g., the web pages are configured to display the image either in a container or as an embedded image). Such subsets of images can be stored in separate records and/or be labeled with the web pages on which the subsets are displayed. The computer can determine web page scores for the web pages based on or as a function of the image performance scores (e.g., the stored image performance scores) of the images that are on the respective web pages. Upon receiving a query containing one or more key words from a computing device, the computer can execute a search engine machine learning model based on the keywords and the web page scores for web pages as input. The search engine machine learning model can output a set of web pages based on the keywords and web page scores. The computer can present the output set of web pages at the computing device. In doing so, the computer can improve the search results of the search engine to account for the content of the images on web pages in addition to the text on the web pages compared to conventional search engines, thereby improving user experience and satisfaction of the search results and making the search results more relevant to the user.

In some embodiments, the image performance scores that the computer uses to perform search results may be or include scores that indicate likelihoods that users will interact with the respective images or how attracting/engaging those images are to users. For instance, the computer can store one or more machine learning models. The one or more machine learning models can be configured or trained to generate image performance scores that simulate how users will interact with different images. In some embodiments, the different machine learning models may be trained to simulate how users of different target audiences will interact images on web pages. The computer can aggregate or otherwise use image performance scores of different images for individual web pages to determine web page scores for the different web pages. The computer can do so, for example, by aggregating or calculating an average or median of the image performance scores of the images of each web page. The computer can use the web page scores as input into the search engine machine learning model. In doing so, the computer can improve the search results of any query performed through the search engine machine learning model such that the search results include images that are more interactive and/or that are more likely to improve the experience of the user using the search engine.

Figure 19:
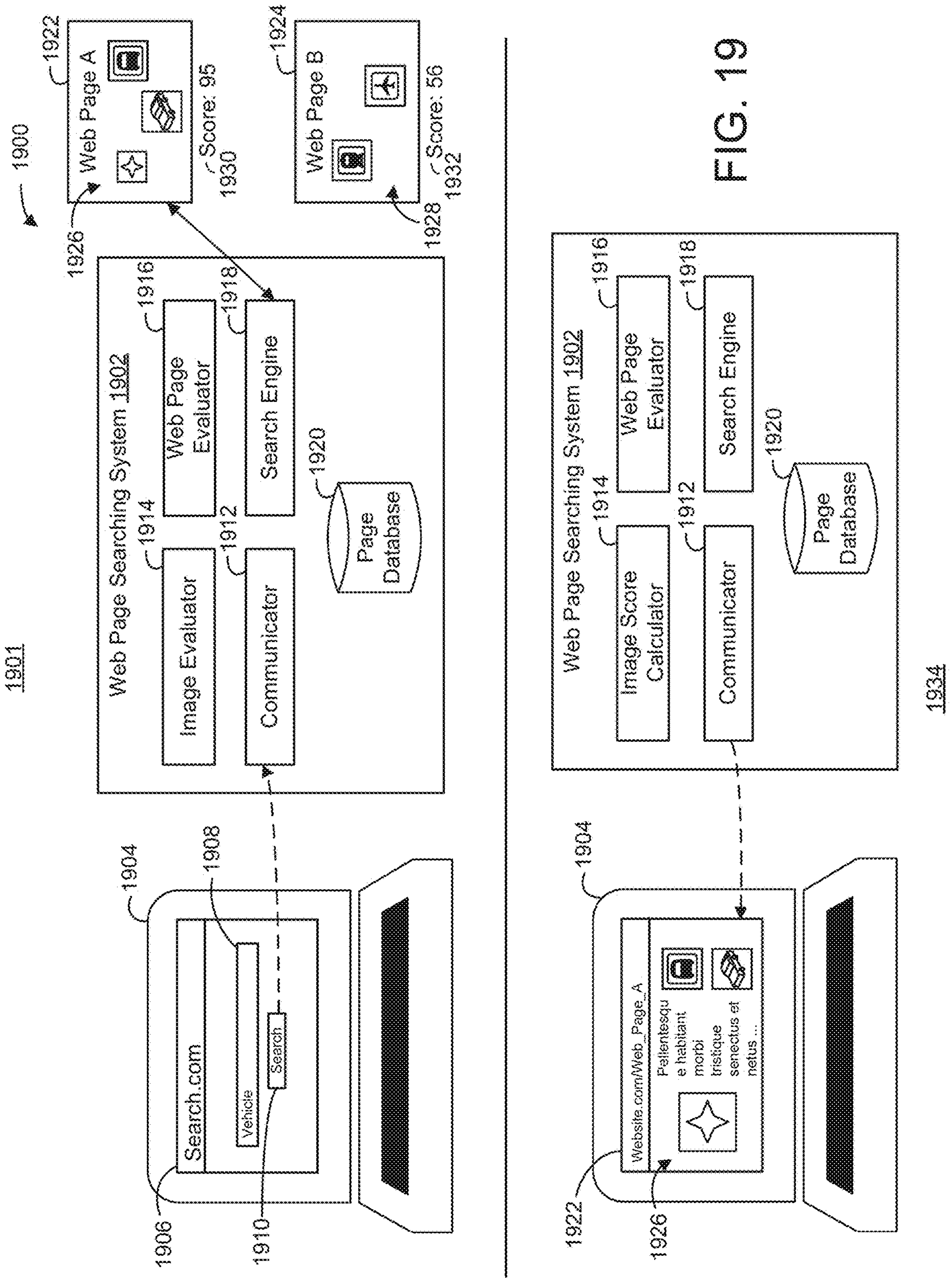
FIG. 19 is a sequence diagram illustrating a search engine selecting websites based on image scoring in accordance with an illustrative embodiment.

FIG. 19 is a sequence diagram illustrating a search engine selecting websites based on image scoring in accordance with an illustrative embodiment. In brief overview, FIG. 19 illustrates a sequence 1900 in which a web page searching system 1902 can search for web pages based on a query using image performance scores of images of the web pages to perform the search. To do so, the web page searching system 1902 can store image performance scores for different subsets of images that each correspond to a different web page (e.g., subsets of images may each be displayed on a different web page). The web page searching system 1902 can determine web page scores for the web pages based on or as a function of the image performance scores of the images on the respective web pages. The web page searching system 1902 can receive a query for a web page or a list of web pages that correspond to one or more keywords. The web page searching system 1902 can receive the query from a client device. In response to receiving the query, the web page searching system 1902 can execute a search engine machine learning model to identify a set of web pages using the image performance scores and/or the keywords as input. The web page searching system 1902 can transmit the set of web pages to the client device. Thus, the web page searching system 1902 can automatically identify web pages to present to users based on images that are displayed on the web pages.

As described herein, solely for succinctness, each reference to an image may additionally or instead be a reference to a video, an audio segment, or a multimedia file. For example, the web page searching system 1902 can determine content performance scores for videos, images, audio segments, multimedia files, or some combination of one or more of such types of content on a web page and use the content performance scores as input into a search engine machine learning model to identify a set of web pages to transmit to a client device using the systems and methods described herein.

The sequence 1900 may involve the web page searching system 1902 communicating with a computing device 1904. The computing device 1904 can be a server or other type of computing device. The computing device 1904 can be a computing device accessed by a user. The computing device 1904 can store and/or execute an application (e.g., a browser) to access the Internet or another communications network. Through the Internet or another communications network, the computing device 1904 can communicate with the web page searching system 1902.

For example, in a first stage 1901 of the sequence 1900, the computing device 1904 can execute an application to access a web page 1906. The web page 1906 can include a form 1908 configured to receive text, images, or other input. A user may access the web page 1906, for instance, to search for web pages regarding specific products. In some embodiments, web page 1906 can be a web page of a website that includes web pages for different products. The user can access the web page 1906 to search the website for any web pages that correspond to specific keywords and/or images. The user can input text and/or an image of a product that the user would like to search into the form 1908. In one example, as illustrated in FIG. 19, the user can input text that includes the word "vehicle." The user can select a search button 1910 on the web page 1906. The computing device 1904 can receive the selection and, responsive to receiving the selection, transmit a message containing the input text to the web page searching system 1902.

The web page searching system 1902 may comprise one or more processors that are configured to store and/or search for web pages based on messages from different computing devices. In some embodiments, the web page searching system 1902 can be or include executable code of the content evaluation system 1005. The web page searching system 1902 may comprise a network interface, a processor, and/or memory (or the content evaluation system 1005 can include such components). The web page searching system 1902 may communicate with the computing device 1904 via the network interface, which may be or include an antenna or other network device that enables communication across a network and/or with other devices. The processor may be or include an ASIC, one or more FPGAs, a DSP, circuits containing one or more processing components, circuitry for supporting a microprocessor, a group of processing components, or other suitable electronic processing components. In some embodiments, the processor may execute computer code or modules (e.g., executable code, object code, source code, script code, machine code, etc.) stored in memory to facilitate the activities described herein. The memory may be any volatile or non-volatile computer-readable storage medium capable of storing data or computer code.

The web page searching system 1902 can include a communicator 1912, an image evaluator 1914, a web page evaluator 1916, a search engine 1918, and/or a page database 1920. The components 1912-1920 can be stored in the memory of the web page searching system 1902. The communicator 1912 may comprise programmable instructions that, upon execution, cause the processor of the web page searching system 1902 to communicate with the computing device 1904 and/or any other computing device. The communicator 1912 may be or include an application programming interface (API) that facilitates communication between the computing device 1904 (e.g., via the network interface of the web page searching system 1902) and other computing devices. The communicator 1912 may communicate with the computing devices 1904 and/or any other computing device across a network.

The communicator 1912 can establish a connection with the computing device 1904. The communicator 1912 can establish the connection with the computing device 1904 over a network. To do so, the communicator 1912 can communicate with the computing device 1904 across the network. In one example, the communicator 1912 can transmit a syn packet to the computing device 1904 (or vice versa) and establish the connection using a TLS handshaking protocol. The communicator 1912 can use any handshaking protocol to establish a connection with the computing device 1904.

The page database 1920 can be or include a database (e.g., a relational database) that is configured to store web pages and/or data of web pages of a website. For example, the page database 1920 can store web pages for different products that users can purchase from a specific website. The web pages can respectively include images of the products that correspond with the web pages and/or any other data regarding the products. The page database 1920 can store any number of web pages for a website and/or store such web pages for any number of websites.

The page database 1920 can store data or metadata regarding the different web pages stored in the page database 1920. For example, the page database 1920 can store separate image files that are displayed on the respective web pages, interaction data of the different web pages, identifications of the products that correspond with the different web pages, etc. In some embodiments, the page database 1920 can include one or more target audience identifiers for each of the web pages. The target audience identifiers can indicate the target audiences of users that typically visit the web pages and/or purchase the products of the different web pages. The data of the different web pages can be input by a user or can be automatically generated and uploaded to the page database 1920.

The image evaluator 1914 may comprise programmable instructions that, upon execution, cause the processor of the web page searching system 1902 to calculate or generate image performance scores for different images of (e.g., displayed on) web pages (e.g., web pages of a website, such as web pages stored in the page database 1920). The image evaluator 1914 may use one or more machine learning models to do so. For example, the image evaluator 1914 can be the same as or similar to the performance measurement module 1065 of the content evaluation system 1005. The image evaluator 1914 may include one or more machine learning models (e.g., neural networks) that are respectively configured to extract features from images and generate image performance scores (e.g., performance scores or image performance scores) for the images based on the extracted features.

The image evaluator 1914 can execute a first machine learning model to extract a set of features from each of the images stored in the page database 1920. To do so, for each image, the image evaluator 1914 may extract pixel data (e.g., values indicating different characteristics about the pixels of the image such as color, hue, brightness, etc.) and create a vector with the extracted values. In some implementations, the image evaluator 1914 can extract features from the image using a feature extraction neural network and create a vector with the extracted features. The image evaluator 1914 may iteratively create feature vectors for each of the images of the page database 1920.

In some implementations, the image evaluator 1914 may create feature vectors from images by extracting individual features from the images. For example, the image evaluator 1914 may input an image into a feature extraction neural network. The feature extraction neural network may be configured to automatically extract features from the image. Such features are or include descriptors of the image such as identifications of objects within the image, colors within the image, scenery within the image, shades of colors within the image, etc. In this example, the image evaluator 1914 can execute the feature extraction neural network with the image and output values for the different features, thus extracting features from the image. The image evaluator 1914 can format the extracted features into a feature vector for the image by setting the values for the extracted features at different index values of the vector or by otherwise concatenating the values of the extracted features together. The image evaluator 1914 can otherwise extract features from images to create feature vectors for the images as described herein.

The image evaluator 1914 can include and/or execute a second machine learning model to generate image performance scores for each of the images of the page database 1920. The second machine learning model can be a machine learning model that has been trained or configured to generate image performance scores for individual images. Image performance scores can be or include a likelihood that a user would interact with the images (e.g., purchase the products of the web pages on which the images are displayed or depicted in the images) if they were viewing the images on a web page. The second machine learning model can be a neural network, a support vector machine, a random forest, etc. The second machine learning model can be configured to receive feature vectors that include features (e.g., extracted features) of an image and automatically generate an image performance score for the image. In some embodiments, the second machine learning model may be configured or trained to receive and generate image performance scores for images themselves instead of based on feature vectors containing extracted features from the images. The second machine learning model can be configured to generate an image performance score for an image by applying internal trained or learned weights and/or parameters to the features of the image. The image performance score can be a number within a defined range (e.g., 1-100, 1-10, 0-1, etc.).

The image evaluator 1914 can use the second machine learning model to generate image performance scores for each of the images of the page database 1920. For example, the image evaluator 1914 can retrieve the images of the page database 1920. The image evaluator 1914 can do so by identifying the image files of the web pages stored in the page database 1920 and/or by scraping the web pages stored in the page database 1920. The image evaluator 1914 can execute the first machine learning model of the image evaluator 1914 using each of the images of a web page stored in the page database 1920 as input to generate a feature vector of extracted features for the images. The image evaluator 1914 can similarly generate such feature vectors for each image in the page database 1920. The image evaluator 1914 can separately feed the feature vectors into the second machine learning model and execute the second machine learning model to generate an image performance score for each of the images of the web pages. Accordingly, the image evaluator 1914 can automatically generate image performance scores for the images of web pages stored in the page database 1920.

In some embodiments, the image evaluator 1914 can include multiple machine learning models that are configured to generate image performance scores for images. Each machine learning model may be trained to generate image performance scores for a different target audience. For example, each machine learning model may be trained based on training data generated from interaction data generated from users of a specific target audience (e.g., users who have a specific characteristic (e.g., age, age within a range, gender, etc.) and/or who otherwise have specific interests (e.g., sports, movies, books, genres of books, types of sports, jobs, etc.)). The machine learning models may be trained (e.g., by the content evaluation system 1005 or another data processing system) by labeling images with interaction data from the specific target audiences and training the machine learning models for the same target audiences with the labeled training data to generate scores for the images. In training the machine learning models in this way, each machine learning model may be trained to simulate a target audience and how a member of the target audience will interact with specific images. The machine learning models may otherwise be trained as described herein.

The image evaluator 1914 can generate image performance scores (e.g., target audience scores) that correspond to different target audiences for each of the images of the web page 1506 retrieved by the image retriever 1510. For example, the image evaluator 1914 can feed feature vectors of features of images of web pages stored in the page database 1920 into the machine learning models that correspond to the different target audiences and/or the general public. The image evaluator 1914 can execute the machine learning models to generate different target audience scores for each of the images.

In some embodiments, the image evaluator 1914 may only generate target audience scores for the images retrieved from the web page 1506 for target audiences that correspond with the web pages on which the images are respectively displayed. Doing so can reduce the processing requirements of evaluating the images. For example, a web page for a product may have a stored association with one or more target audience identifiers in the page database 1920. The image evaluator 1914 can identify the one or more target audience identifiers for the web page from the page database 1920. The image evaluator 1914 can identify and/or retrieve the machine learning models that correspond with the same target audience identifiers in memory indicating that the machine learning models have been trained to simulate the specific target audiences. The image evaluator 1914 may only retrieve such machine learning models and/or retrieve the machine learning models in addition to a machine learning model that has been trained to be agnostic to any target audience. The image evaluator 1914 can feed the retrieved images from the web page into the retrieved machine learning models to generate target audience scores or image performance scores for the retrieved images. In doing so, the image evaluator 1914 can use selective processing techniques to generate image performance scores, which can significantly reduce the processing requirements of generating scores as executing different machine learning models can require a large amount of processing resources and/or memory.

In some embodiments, the image evaluator 1914 can store any image performance scores that the image evaluator 1914 generates for images in the page database 1920. The image evaluator 1914 can store such scores with stored associations with the images for which the image performance scores were generated. In some cases, the image evaluator 1914 can also store associations between the image performance scores and the target audiences for which the image performance scores were generated.

In some embodiments, the image evaluator 1914 can determine the image performance scores for the images of the web pages stored in the page database 1920 using one or more machine learning models stored at a remote computer. For example, the image evaluator 1914 can retrieve the images of the web pages stored in the page database 1920 as a set of images. The image evaluator 1914 can transmit the set of images to a remote computing device. The remote computing device can be, for example, the content evaluation system 1005. The remote computing device can execute one or more machine learning models to generate one or image performance scores for each of the images of the set of images, as described herein. The remote computing device can transmit the image performance scores for the set of images to the image evaluator 1914. The image evaluator 1914 can receive and store the images and the image performance scores in the page database 1920.

The web page evaluator 1916 may comprise programmable instructions that, upon execution, cause the processor of the web page searching system 1902 to generate web page scores for web pages. The web page evaluator 1916 can generate the web page scores for web pages stored in the page database 1920. The web page evaluator 1916 can generate the web page scores based on or as a function of the images of (e.g., displayed on) the respective web pages. For example, for each web page stored in the page database 1920, the web page evaluator 1916 can identify (e.g., from the data of the web pages or the images of the web pages) the image performance scores for the images of the web page. The web page evaluator 1916 can perform a function on the identified image performance scores, such as calculating an average, a sum, a median, or any other function. In some embodiments, the web page evaluator 1916 can perform a weighted average or weighted sum on the images in which the image performance scores are weighted based on the types of the images (e.g., hero image, carousel image, background image, banner image, etc.) on the web page. In one example, image performance scores for hero images can be weighted higher than image performance scores of background images and/or image performance scores of images that are earlier in an image carousel of a web page are weighted higher than image performance scores of images that are later in the image carousel. The weights can be determined using any method. The web page evaluator 1916 can identify the image performance scores of the images of the web page and determine a web page score for the web page using such functions. In some embodiments, the web page evaluator 1916 can determine web page scores to be the image performance score of a specific type of image (e.g., a hero image). For example, the web page evaluator 1916 can determine the web page score for images to be the image performance score of the hero image of each of the web pages. The web page evaluator 1916 can determine the web page scores based on or as a function of any type and/or number of images. The web page evaluator 1916 can similarly determine web page scores for any number of web pages of the page database 1920. The web page evaluator 1916 can store the web page scores in the page database 1920 with stored associations with the web pages and/or the target audiences for which the web page scores were generated.

In some embodiments, the web page evaluator 1916 can determine multiple web page scores for a single web page or individual web pages. For example, the web page evaluator 1916 can determine web page scores for a web page for different target audiences. To do so, for a web page, the web page evaluator 1916 can identify the image performance scores for each target audience that the image evaluator 1914 generated for each image of the web page. The web page evaluator 1916 can determine a web page score for the web page for each of the target audiences of the web page based on or as a function of the image performance scores of the images of the web page for the respective target audiences. The web page evaluator 1916 can determine the web page scores for each target audience using any function on the image performance scores for the target audience as described above. The web page evaluator 1916 can similarly determine multiple image performance scores for different target audiences of any number of web pages. The web page evaluator 1916 can store the web page scores in the page database 1920 with stored associations with the web pages for which the web page scores were generated.

In one example, as illustrated in FIG. 19, the web page evaluator 1916 can determine web page scores for a web page 1922 and a web page 1924. The web pages 1922 and 1924 may be stored in the page database 1920, in some embodiments with any other data regarding the web pages 1922 and 1924. The image evaluator 1914 can determine one or more image performance scores for images 1926 of the web page 1922 and/or images 1928 of the web page 1924. The web page evaluator 1916 can determine one or more web page scores for each of the web pages 1922 and 1924. For example, the web page evaluator 1916 can determine a web page score 1930 for the web page 1922 and a web page score 1932 for the web page 1924. The web page evaluator 1916 can store the web page scores 1930 and 1932 with the respective web pages 1922 and 1924 in the page database 1920.

In some embodiments, the web page evaluator 1916 can determine web page scores for web pages based on the multiple image performance scores that the image evaluator 1914 determines for each image of a web page. In one example, the web page evaluator 1916 can determine multiple web page scores for each web page that each correspond to image performance scores of a different target audience. The web page evaluator 1916 can use any function (e.g., a sum, an average, a median, a weighted average, etc.) on the web page scores for a web page to determine the web page score (e.g., a composite web page score) for the web page. In some cases, the web page evaluator 1916 can determine such composite web page scores without determining web page scores for individual target audiences first and instead perform a function on all of the image performance scores generated by the image evaluator 1914 for the individual web pages. The web page evaluator 1916 can determine web page scores for web pages using any method.

The web page evaluator 1916 can dynamically adjust the web page scores of web pages over time. For example, an image (e.g., a second image) can be added to a web page that is stored in the page database 1920. The image evaluator 1914 can detect the addition of the image. The image evaluator 1914 can generate one or more image performance scores for the image. Responsive to doing so, the web page evaluator 1916 can generate one or more web page scores for the web page based on the one or more image performance scores of the image in combination with the previously generated image performance scores of the images of the web page. The web page evaluator 1916 can do so using the systems and methods described herein. In another example, an image can be removed from a web page. When this occurs, the web page evaluator 1916 can generate one or more new web page scores for the web page based on the image performance scores of the images that are remaining on the web page. The web page evaluator 1916 can similarly adjust web page scores for any number of web pages over time, thus enabling the web page searching system 1902 to avoid performing searches for web pages based on stale data.

The web page searching system 1902 can generate the image performance scores and/or web page scores prior to receiving a query. Accordingly, the image performance scores and/or web page scores may be generated without regard or relevance to any keywords or images received in a query.

The search engine 1918 may comprise programmable instructions that, upon execution, cause the processor of the web page searching system 1902 to search for and identify a web page to transmit to a computing device requesting such a web page. For instance, the search engine 1918 can perform a query or search after receiving a request from the computing device 1904. The request can include one or more keywords and/or images. The search engine 1918 can execute a machine learning model of the search engine 1918 to query the page database 1920 based on the one or more keywords and/or images. To generate a search based on images, the search engine 1918 can execute a machine learning model to extract or identify features of the images as text and use the features in the search. In performing the search, the search engine 1918 can use the web page scores for the web pages in the page database 1920 as input and/or as parameters of the search, in some cases in addition to the one or more keywords and/or images. The machine learning model of the search engine 1918 can output a ranked list of a set of web pages as search results to the web page scores of the page database 1920 and the one or more keywords and/or images. At stage 1934, the communicator 1912 can transmit the ranked list of web pages to the computing device 1904. The computing device 1904 can receive the ranked list of web pages and, in response to a user input selection of a web page of the ranked list, present the selected web page from the ranked list on a user interface of the computing device 1904.

The machine learning model of the search engine 1918 can be or include a search engine machine learning model. The machine learning model can be configured to analyze the one or more keywords and/or images received in a search from a computing device to determine an intent of the search. In doing so, the machine learning model can tokenize the one or more keywords and/or images, stem the words or tokenize, and/or perform other linguistic techniques. The machine learning model can convert the web pages (e.g., the documents of the web pages) stored in the page database 1929 as well as the keywords and/or images or words or tokens (e.g., stemmed words or tokens) generated from the keywords and/or images into numerical feature vectors. The machine learning model can do so using methods such as Term Frequency-Inverse Document Frequency and word embeddings (e.g., Word2Vec or GloVe), which can represent the words or phrases as vectors in a vector space (e.g., a high-dimensional vector space). The machine learning model can include the web page scores (or generated representations of the web page scores) for the different web pages in the feature vectors for the respective web pages. The machine learning model can apply a ranking algorithm to determine search result scores for the web pages for the specific queries. The machine learning model can rank (e.g., assign rankings to) the web pages of the page database 1920 based on the search result scores the machine learning model generated for the respective web pages. By applying the web page scores for the web pages in the feature vectors of the web pages, the machine learning model can generate more accurate, more relevant, and/or higher performing search results for users that are searching for web pages through the search engine 1918.

The machine learning model can be configured to apply different ranking algorithms for training to rank search results for queries. For example, the machine learning model can use learning to rank algorithms such as RankNet, LambdaMART, RankBoost, and RankSVM to be trained to rank web page search results for queries. The machine learning model can be trained (e.g., by the web page searching system 1902) over time using supervised machine learning techniques and real-time user feedback, such as based on web pages users select from ranked lists that the machine learning model provides. The machine learning model can be continuously trained over time to adapt to changes in user behavior, language trends, and/or the content of the web pages.

In one example, the web page searching system 1902 can receive the message from the computing device 1904 containing the query containing the word vehicle. In response to receiving the message, the search engine 1918 can automatically generate, for each web page in the page database 1920, a feature vector that contains a numerical value for the word vehicle (or a token for the word vehicle), the web page itself, and the web page score (or a numerical representation of the web page score) for the web page as determined by the web page evaluator 1916, using the systems and methods described herein. The search engine 1918 can determine a confidence score for each of the web pages by applying the machine learning model of the search engine 1918 to the different feature vectors (e.g., execute the machine learning model using the different feature vectors as input). The search engine 1918 can rank (e.g., assign rankings to) the web pages in ascending or descending order based on the confidence scores. The search engine can select a set of a defined number of the web pages that correspond to the highest confidence scores (e.g., a defined number of the highest ranked web pages). The search engine 1918 can transmit a ranked list of the selected set of web pages to the computing device 1904.

The computing device 1904 can present or display the ranked list on a user interface (e.g., a user interface generated by the application (e.g., browser) executing on the computing device 1904). The ranked list can include one or more hyperlinks to the different web pages in a priority order that indicates the order in which the web pages are ranked. The user can select a web page (e.g., the web page 1922) from the ranked list. Responsive to the selection, the computing device 1904 can transmit an indication of the selection to the web page searching system 1902. The web page searching system 1902 can retrieve the selected web page (e.g., the web page 1922) from the page database 1920 and transmit the web page to the computing device 1904. The computing device 1904 can present the web page at the user interface in place of the ranked list. Thus, the user can select a web page to view based at least in part on the quality and performance of images that appear on different web pages that are stored in the page database 1920 (e.g., web pages of the same website). In some cases, the web page searching system 1902 can train or update the machine learning model of the search engine 1918 based on the selection to improve the ranking accuracy of the machine learning model.

One method of improving the search results or maintaining the accuracy of the search results over time is to continually adjust or update the web page scores for the web pages stored in the page database 1920 to adjust for changes in user behavior and/or population trends. For example, subsequent to generating the image performance scores that the web page evaluator 1916 used to generate the web page scores of the web pages stored in the page database 1920, the image evaluator 1914 can train the one or more machine learning models that the image evaluator 1914 used to generate the image performance scores. The image evaluator 1914 can train the machine learning models using the techniques described herein, such as by using a supervised learning technique based on interaction data by members of different target audiences on images displayed on different websites or web pages. After training the machine learning models for a time period, the image evaluator 1914 can execute the machine learning models to generate new image performance scores for the images of the web pages stored in the page database 1920. In some embodiments, the remote computing device may similarly store and train the machine learning models and generate and transmit updated image performance scores to the web page searching system 1902. The web page evaluator 1916 can generate new web page scores for the web pages in the page database 1920 based on the updated image performance scores. The search engine 1918 can use the updated web page scores to generate ranked lists of web pages based on queries from computing devices.

Another method of improving the search results of searches into the search engine 1918 is to take into account the target audience of the computing device or user performing the search. For example, the web page searching system 1902 can determine or identify the target audience or target audiences of the computing device performing the search. The search engine 1918 can use an identification or identifications of the target audience or target audiences in the feature vectors for the different web pages that the search engine 1918 uses to determine confidence scores for the web pages of the page database 1920. In some cases, in addition to or instead of including the identifications of the target audience in the feature vector, the search engine 1918 can select web page scores to use in the search based on the target audience of the search. For example, the web page searching system 1902 can determine the target audience for a search is someone who enjoys camping. The search engine 1918 can identify the web page scores for a camping target audience from the page database 1920. The search engine 1918 can include the web page scores in the feature vectors for the web pages corresponding to the web page scores and insert the feature vectors into the machine learning model of the search engine 1918 to generate confidence scores for the web pages for the search. The search engine 1918 may not generate feature vectors for web pages that do not correspond to camping web page scores. In some cases, the search engine 1918 may still generate feature vectors for such web pages but without any web page scores for such web pages. The machine learning model of the search engine 1918 may generate higher confidence scores for web pages that correspond with higher web page scores that correspond with camping and lower confidence scores for web pages that correspond with lower web page scores that correspond with camping or web pages that are not associated with such scores. The search engine 1918 can generate a ranked list of web pages based on the confidence scores and the web page searching system 1902 can transmit the ranked list to the computing device that performed the search.

In cases in which the web page searching system 1902 determines multiple target audiences for a search, the web page searching system 1902 can use a combination of the web page scores for the target audience to improve the search results for the search. For example, responsive to the web page searching system 1902 determining multiple target audiences for a search, the search engine 1918 can retrieve web page scores of web pages of the page database 1920 that correspond to the target audiences. The search engine 1918 can include the web page scores for the different target audiences in the respective feature vectors for the web pages of the page database 1920. In some embodiments, the search engine 1918 can perform a function on the web page scores (e.g., a sum, weighted sum, average, weighted average, median, etc.) to generate a composite web page score and input the composite web page into the feature vectors for the respective web pages. In some embodiments, the search engine 1918 can select the web pages to use as input into the machine learning model of the search engine 1918 responsive to the selected web pages having a web page score for at least one of the determined target audiences or responsive to the selected web pages having a web page score for each of the determined target audiences. The machine learning model can output confidence scores for the different web pages based on the feature vectors including (or not including, in some cases) the web page scores for the target audiences. The search engine 1918 can generate a ranked list of web pages based on the confidence scores and the web page searching system 1902 can transmit the ranked list to the computing device that performed the search.

The web page searching system 1902 can determine the target audience for a search using a variety of techniques. For example, the web page searching system 1902 can determine the target audience for a search based on information or settings in an account through which the computing device is performing the search and/or based on web pages that the computing device has visited while connected with the web page searching device 1902 (e.g., web pages that the computing device has visited while accessing the website provided by the web page searching system 1902). For instance, the web page searching system 1902 can perform the techniques described in U.S. application Ser. No. 17/673,635, filed Feb. 16, 2022, to determine a target audience for the connection the web page searching system has with the computing device performing the search. In some embodiments, a user can select the target audience for a search, such as by selecting various demographic information and/or interests for an account that the user creates to access the website hosted by the web page searching system 1902. In some embodiments, the web page searching system 1902 can determine the target audiences for the accounts based on actions performed through the account, such as products the account purchases through the website hosted y the web page searching system 1902. The web page searching system 1902 can use any method to determine the target audience for the search.

Figure 20:
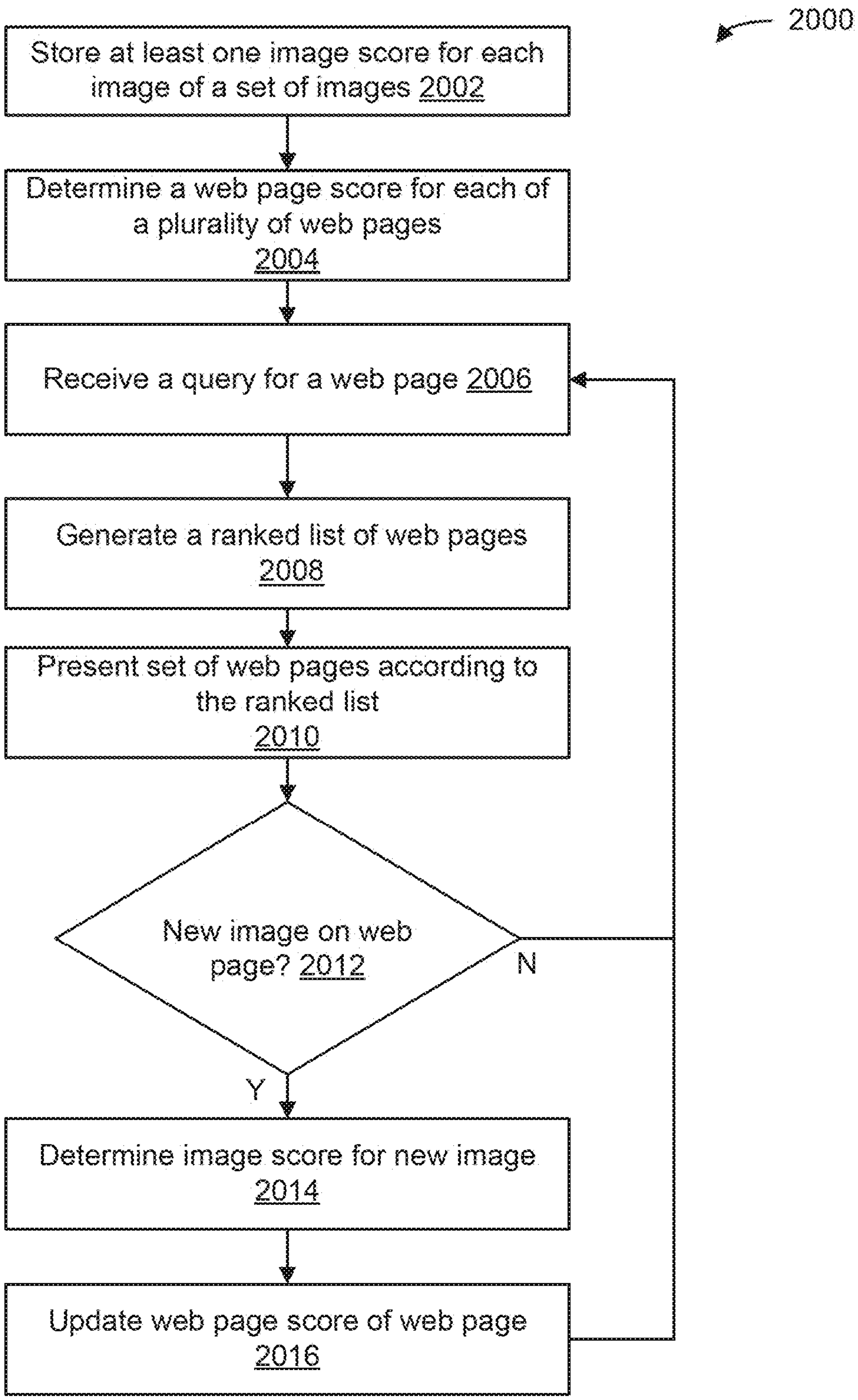
FIG. 20 is a flow diagram illustrating a method for a search engine selecting websites based on image scoring in accordance with an illustrative embodiment.

FIG. 20 is a flow diagram illustrating a method 2000 for a search engine selecting websites based on image scoring in accordance with an illustrative embodiment. In some implementations, the method 2000 can be performed by a data processing system such as any of the components of the system 1000 shown in FIG. 10 or the web page searching system 1902. The method 2000 may include more or fewer operations and the operations may be performed in any order. Performance of the method 2000 may enable the data processing system to generate more accurate and relevant search results using a search engine that is trained to take image quality into account when generating the search results, thus improving the search engine itself.

At operation 2002, the data processing system stores at least one image performance score for each image of a set of images. The data processing system may be a computing device configured to host a website with multiple web pages. The web pages may correspond to different products (e.g., the web pages may be web pages through which users may purchase specific products). The set of images can be the images that are displayed on the different web pages of the website. The data processing system can store images and/or the web pages in a database. The data processing system can store image performance scores for the images of the set of images that indicate likelihoods that users will interact with the images and/or likelihoods that users of specific target audiences will interact with the images.

The data processing system can generate the image performance scores for the images of the set of images. The data processing system can do so using one or more machine learning models. For example, the data processing system can store one or more machine learning models that are each trained (e.g., using supervised learning based on interaction data of different images) or configured to generate image performance scores for images. The machine learning models may be respectively trained to "simulate" different target audiences such that the machine learning models can generate image performance scores for images that represent how users of different target audiences will interact with the images (e.g., be likely to purchase a product displayed in the images or a product of the web page on which the images are displayed). The data processing system can receive the different images of the set of images and execute the one or more machine learning models to generate one or more image performance scores for each of the images. The data processing system can store image performance scores with the images in the database.

In some embodiments, the data processing system can transmit the set of images to a remote computer. The remote computer may store similarly trained machine learning models that are configured to generate image performance scores for images. The remote computer can execute the machine learning models to generate image performance scores for the images of the set of images and transmit the image performance scores back to the data processing system. The data processing system can store the image performance scores and/or images in a database.

At operation 2004, the data processing system determines web page scores for the web pages of the website. The data processing system can determine the web page scores for each web page of the website or that is stored in the database stored by the data processing system. The data processing system can determine the web page scores for the individual web pages based on or as a function of the image performance scores of the images of the web pages. For example, the data processing system can determine a web page score for a web page as a function (e.g., average, sum, weighted average, weighted sum, median, etc.) of the image performance score of each image of the web page. The data processing system can similarly determine a web page score for each web page stored in the database.

The data processing system can determine multiple web page scores for individual web pages. For example, the data processing system can determine a web page score for individual target audiences (e.g., target audience web page scores) based on web page scores generated specifically for the target audiences. The data processing system can determine any number of web page scores for any number of web pages. In some embodiments, the data processing system can generate a composite web page score for the different web pages based on or as a function (e.g., average, sum, average, weighted sum, weighted average, median, etc.) of the web page scores for the different web pages.

At operation 2006, the data processing system receives a query for a web page. The data processing system may receive the query from a computing device, such as a computing device accessing a search page of the website hosted by the data processing system. The query can include one or more keywords and/or one or more images. In one example, the query can be for products that match a description provided by the keywords and/or that have visual similarities with objects depicted in the one or more images.

At operation 2008, the data processing system generates a ranked list of web pages. The data processing system can rank a set of web pages based on the relevancy of the web pages to the query. The data processing system can select the set of web pages as a set of a defined number of web pages that may be the most relevant to the query. The data processing system can determine the rankings for the set of web pages based on the keywords and/or images of the query and the web page scores of the web pages of the website hosted by the data processing system. The data processing system can do so using a search engine machine learning model.

For example, the data processing system can store a search engine machine learning model that is configured to search the database of web pages stored by the data processing system for the most relevant web pages to queries from different computing devices. The data processing system can receive the query containing the one or more keywords and/or images from the computing device. The data processing system can generate feature vectors for the different web pages in the database. The data processing system can include embeddings generated from words and/or image metadata of the web pages and web page scores of the web pages in the feature vectors of the respective web pages. The data processing system can also include the terms of the query (e.g., numerical values indicating the words and/or images of the query or tokenized versions of the words and/or images) in each of the feature vectors. In some embodiments, the data processing system can include (e.g., only include) web page scores of the same target audience as a target audience the data processing system determined (e.g., based on account data or using any other technique) for the computing device or connection performing the query. The data processing system can execute the search engine machine learning model using the feature vectors separately as input to generate confidence scores for the web pages stored in the database.

The data processing system can select a set of web pages. The data processing system can select the set of web pages based on the confidence scores the search engine machine learning model generated for the set of web pages. For example, the data processing system (e.g., by executing the search engine machine learning model) can compare the confidence scores generated by the search engine machine learning model for the different web pages stored in the database. Based on the comparison, the data processing system can identify or select a defined number of web pages that correspond with the highest confidence scores. The defined number can be included in the query or can be stored and retrieved from memory. The identified or selected web pages can be a set of web pages to indicate in a response to the query.

The data processing system can rank the set of web pages. For example, the data processing system can identify the confidence scores generated by the search engine machine learning model for the set of web pages. The data processing system can compare the confidence scores with each other. The data processing system can rank the web pages in descending or ascending order based on the confidence scores. The data processing system can generate a ranked list of the set of web pages by placing identifications (e.g., pointers or hyperlinks to the respective web pages) of the web pages in order (e.g., descending or ascending order).

At operation 2010, the data processing system presents the set of web pages. The data processing system can present the set of web pages according to the ranked list. The data processing system can present the set of web pages by transmitting the ranked list as a web page to the computing device that submitted the query. The computing device can receive the web page containing the ranked list and present the web page at a user interface.

At operation 2012, the data processing system monitors the database of web pages to determine whether any of the web pages have been updated to include new images or have had any images removed. The data processing system can repeat operation 2006-2012 over time to provide search results to different queries and/or to different computing devices based on the web page scores the data processing system determined based on individual images on the respective web pages.

Responsive to detecting a new image on a web page, at operation 2014, the data processing system determines an image performance score for the new image. The data processing system can determine one or more image performance scores for the new image, such as by determining image performance scores for different target audiences. The data processing system can determine the image performance scores for the new image by executing the machine learning models stored locally or by transmitting the new image to the remote computing device and the remote computing device generates the image performance scores for the image and transmits the image performance scores back to the data processing system.

At operation 2016, the data processing system updates the web page score of the web page containing the new image. The data processing system can update the web page score of the web page containing the new image based on or as a function of the one or more image performance scores generated for the new image. The data processing system can generate the web page score based on or as a function of the one or more image performance scores of the new image and the one or more image performance scores of each of the images that were previously on the web page. The data processing system can generate the updated web page score (or web page scores) using the same functions or techniques the data processing system used to generate the original web page score (or web page scores) but including the one or more image performance scores of the new image.

In some embodiments, the data processing system can update the web page score of a web page responsive to determining an image was removed from the web page. The data processing system can detect the removal of the web page and use the system and methods described herein to generate an updated web page score or web page scores for the web page without any image performance scores of the removed image.

The data processing system can monitor and update the web pages of the database over time. The data processing system can do so while using the current or active web page scores to generate search results for queries. Thus, the data processing system can generate search results that account for changes in user behavior and preferences in images over time.

Modern digital technologies and the internet have brought about an exponential increase in the amount of visual content that is created and shared every day. This content can come in various forms such as photos, graphics, videos, animations, etc. To ensure this vast amount of visual content is optimally utilized for purposes such as marketing, advertising, user engagement, ecommerce, etc., it is critical to have methods and systems in place that can automatically analyze, understand, and manipulate these images effectively.

Manual analysis and manipulation of such large volumes of images is not feasible or efficient. Therefore, automated methods and systems are being employed increasingly for these purposes, with machine learning playing a pivotal role. Despite the advances in the field, there are ongoing challenges. For instance, some image analysis and processing systems might help identify features of an image and generate a score for the image based on these features. However, they do not necessarily provide resource-efficient ways of altering the image based on this analysis to improve the score or meet certain predefined criteria.

To overcome the aforementioned technical deficiencies, a computer implementing the systems and methods described herein may implement a sequence of machine learning models to evaluate and manipulate images. For example, the computer can receive an image from another computing device in a request. The computer can extract features from the image and use the extracted features as input into an image scoring machine learning model to generate an image performance score (e.g., a score indicating a likelihood that users will interact with the image) for the image. The computer can determine the image performance score satisfies a condition (e.g., is below a threshold). In response to doing so, the computer can insert the extracted features (e.g., insert as text) into a generative machine learning model that is configured to generate images based on text or other images. Based on the extracted features, the generative machine learning model can automatically generate one or more generated images that have the extracted features or some variation of the extracted features. The computer can extract features from each of the generated images and input the extracted features into the image scoring machine learning model. The image scoring machine learning model can generate an image performance score for each of the generated images based on the extracted features from the generated images (or videos, audio, or other types of media). The computer can select a defined number of the highest scoring generated images and transmit the selected generated images back to the computing device that initially transmitted a request. In this way, the computer can implement a sequence of different types of machine learning models to automatically adjust and improve an image for better performance.

In some embodiments, the computer can use a variety of techniques to generate the generated images. For example, in some cases, the computer may only adjust a portion of the features of an image that is responsible for the image being a low performing image or may emphasize different high scoring portions of the original image. To do so, the computer may identify portions of the initial image that correspond with high positive impact values and portions of the initial image that correspond with high negative impact values. The computer can include identifications of the higher performing and low performing features of the image with the set of features of the initial image as a prompt input into a generative machine learning model. Based on the prompt, the generative machine learning model can automatically generate one or more images adjusting the higher performing and/or lower performing features. For instance, the computer can generate the generated images to emphasize the higher performing features (e.g., if a cookie in the initial image is a high performing feature, the generative machine learning model may generate one or more images in which the cookie is larger) and de-emphasize the lower performing features (e.g., if a cookie in the initial image is a low performing feature, the generative machine learning model can replace the cookie with another product or make the cookie smaller in the generated images). The computer can similarly adjust the features from the initial image in any way.

In another example, the computer can cause an initial image to be similar to a higher performing image. For example, the computer can identify a high performing image (e.g., an image that corresponds with a high performance score) from memory. The computer can input the high performing image (e.g., an image that corresponds with a high image performance score, as determined by an image scoring machine learning model) with an initial image as a prompt into a generative machine learning model. The generative machine learning model can automatically generate one or more generated images based on the input. The generated images can include the features of the initial image adjusted to be similar to the high performing image. In some embodiments, the computer can include a numerical value indicating a change level that indicates a magnitude to change the initial image to be more similar to the high performing image. In this way, the computer can use generative machine learning to automatically improve images.

Figure 21:
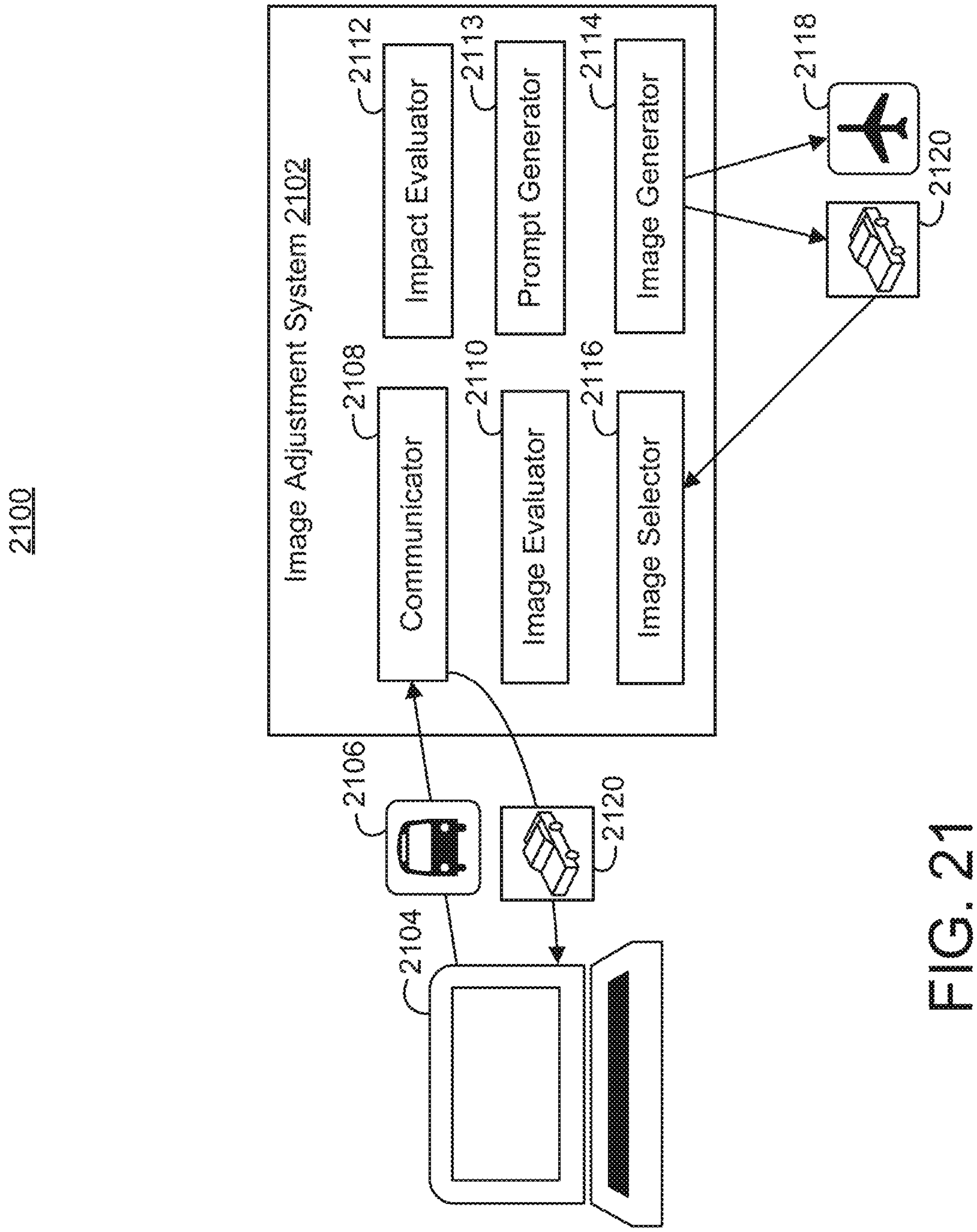
FIG. 21 is a sequence diagram illustrating automatic image generation based on image scoring in accordance with an illustrative embodiment.

FIG. 21 is a sequence diagram illustrating automatic image generation based on image scoring in accordance with an illustrative embodiment. In brief overview, FIG. 21 illustrates a sequence 2100 in which an image adjustment system 2102 can adjust images received in a request or otherwise retrieved from a web page or database. To do so, the image adjustment system 2102 can store a series of machine learning models. Using the machine learning models, the image adjustment system 2102 can extract features from an image received in a request, generate an image performance score for the image, determine the image performance score for the image satisfies a condition (e.g., is below a threshold), and use the extracted features of the image to generate one or more generated images. The image adjustment system 2102 can generate image performance scores for the generated images and identify a defined number of the generated images that correspond with the highest generated image performance scores. The image adjustment system 2102 can transmit the selected images to a computing device that transmitted the request. In this way, the image adjustment system 2102 can automatically adjust an image to improve how the image would perform with users that view the image through a digital medium while maintaining many of the same features of the image.

As described herein, solely for succinctness, each reference to an image may additionally or instead be a reference to a video, an audio segment, or a multimedia file. For example, the image adjustment system 2102 can determine content performance scores for videos, images, audio segments, multimedia files, or some combination of one or more of such types of content and generate and select new and/or improved versions of low performing content to transmit to a client device using the systems and methods described herein.

The sequence 2100 may involve the image adjustment system 2102 communicating with a computing device 2104. The computing device 2104 can be a server or other type of computing device. The computing device 2104 can be a computing device accessed by a user. The computing device 2104 can store and/or execute an application (e.g., a browser) to access the Internet or another communications network. Through the Internet or another communications network, the computing device 2104 can communicate with the image adjustment system 2102.

For example, in the sequence 2100, the computing device 2104 can execute an application to communicate with the image adjustment system 2102. In doing so, the computing device 2104 can transmit an image 2106 to the image adjustment system 2102. The image can be the image a vehicle, such as a bus, or depict any other object. The computing device 2104 can transmit the image 2106 to the image adjustment system 2102 in a request, such as a request for an improved version of the image 2106.

The image adjustment system 2102 may comprise one or more processors that are configured to use a series of machine learning models to automatically manipulate and/or improve images. In some embodiments, the image adjustment system 2102 can be or include executable code of the content evaluation system 1005. The image adjustment system 2102 may comprise a network interface, a processor, and/or memory (or the content evaluation system 1005 can include such components). The image adjustment system 2102 may communicate with the computing device 2104 via the network interface, which may be or include an antenna or other network device that enables communication across a network and/or with other devices. The processor may be or include an ASIC, one or more FPGAs, a DSP, circuits containing one or more processing components, circuitry for supporting a microprocessor, a group of processing components, or other suitable electronic processing components. In some embodiments, the processor may execute computer code or modules (e.g., executable code, object code, source code, script code, machine code, etc.) stored in memory to facilitate the activities described herein. The memory may be any volatile or non-volatile computer-readable storage medium capable of storing data or computer code.

The image adjustment system 2102 can include a communicator 2108, an image evaluator 2110, an impact evaluator 2112, a prompt generator 2113, an image generator 2114, and/or an image selector 2116. The components 2108-2116 can be stored in the memory of the image adjustment system 2102. The communicator 2108 may comprise programmable instructions that, upon execution, cause the processor of the image adjustment system 2102 to communicate with the computing device 2104 and/or any other computing device. The communicator 2108 may be or include an application programming interface (API) that facilitates communication between the computing device 2104 (e.g., via the network interface of the image adjustment system 2102) and other computing devices. The communicator 2108 may communicate with the computing devices 2104 and/or any other computing device across a network.

The image adjustment system 2102 can establish a connection with the computing device 2104. The communicator 2108 can establish the connection with the computing device 2104 over a network. To do so, the communicator 2108 can communicate with the computing device 2104 across the network. In one example, the communicator 2108 can transmit a syn packet to the computing device 2104 (or vice versa) and establish the connection using a TLS handshaking protocol. The communicator 2108 can use any handshaking protocol to establish a connection with the computing device 2104.

The image evaluator 2110 may comprise programmable instructions that, upon execution, cause the processor of the image adjustment system 2102 to calculate or generate image performance scores for different images. The image evaluator 2110 may use one or more machine learning models to do so. For example, the image evaluator 2110 can be the same as or similar to the performance measurement module 1065 of the content evaluation system 1005. The image evaluator 2110 may include one or more machine learning models (e.g., neural networks) that are respectively configured to extract features from images and generate image performance scores (e.g., performance scores or image performance scores) for the images based on the extracted features.

The image evaluator 2110 can execute a first machine learning model to extract a set of features from images. To do so, for individual images, the image evaluator 2110 may extract pixel data (e.g., values indicating different characteristics about the pixels of the image such as color, hue, brightness, etc.) and create a vector with the extracted values. In some implementations, the image evaluator 2110 can extract features from the image using a feature extraction neural network and create a vector with the extracted features. The image evaluator 2110 can obtain sets of features in any manner (e.g., receive the sets of features in a request, which can be text in a request).

In some implementations, the image evaluator 2110 may create feature vectors from images by extracting individual features from the images. For example, the image evaluator 2110 may input an image into a feature extraction neural network. The feature extraction neural network may be configured to automatically extract features from the image. Such features can be or can include descriptors of the image such as identifications of objects within the image, colors within the image, scenery within the image, shades of colors within the image, etc. In this example, the image evaluator 2110 can execute the feature extraction neural network with the image and output values for the different features, thus extracting features from the image. The image evaluator 2110 can format the extracted features into a feature vector for the image by setting the values for the extracted features at different index values of the vector or by otherwise concatenating the values of the extracted features together. The image evaluator 2110 can otherwise extract features from images to create feature vectors for the images as described herein.

The image evaluator 2110 can include and/or execute a second machine learning model to generate image performance scores for different images. The second machine learning model can be a machine learning model that has been trained or configured to generate image performance scores for individual images. Image performance scores can be or include a likelihood that a user would interact with the images if they were viewing the images on a web page. The second machine learning model can be a neural network, a support vector machine, a random forest, etc. The second machine learning model can be configured to receive feature vectors that include features (e.g., extracted features) of an image and automatically generate an image performance score for the image. In some embodiments, the second machine learning model may be configured or trained to receive and generate image performance scores for images themselves instead of based on feature vectors containing extracted features from the images. The second machine learning model can be configured to generate an image performance score for an image by applying internal trained or learned weights and/or parameters to the features of the image. The image performance score can be a number within a defined range (e.g., 1-100, 1-10, 0-1, etc.).

The image evaluator 2110 can use the second machine learning model to generate image performance scores for images. For example, the image evaluator 2110 can receive the image 2160 from the computing device 2104 through the communicator 2108. The image evaluator 2110 can execute the first machine learning model of the image evaluator 2110 using the image 2106 as input to generate a feature vector of extracted features for the image 2106. The image evaluator 2110 can feed the feature vector into the second machine learning model and execute the second machine learning model to generate an image performance score for the image. Accordingly, the image evaluator 2110 can automatically generate an image performance score for the image 2106.

In some embodiments, the image evaluator 2110 can include multiple machine learning models that are configured to generate image performance scores for images. Each machine learning model may be trained to generate image performance scores for a different target audience. For example, each machine learning model may be trained based on training data generated from interaction data generated from users of a specific target audience (e.g., users who have a specific characteristic (e.g., age, age within a range, gender, etc.) and/or who otherwise have specific interests (e.g., sports, movies, books, genres of books, types of sports, jobs, etc.)). The machine learning models may be trained (e.g., by the content evaluation system 1005 or another data processing system) by labeling images with interaction data from the specific target audiences and training the machine learning models for the same target audiences with the labeled training data to generate scores for the images. In training the machine learning models in this way, each machine learning model may be trained to simulate a target audience and how a member of the target audience will interact with specific images.

The image evaluator 2110 can generate image performance scores (e.g., target audience scores) that correspond to different target audiences for the image 2106. For example, the image evaluator 2110 can feed the feature vector of features extracted from the image 2106 into the machine learning models that correspond to the different target audiences. The image evaluator 2110 can execute the machine learning models to generate different target audience scores for the image 2106.

The image evaluator 2110 can be configured to determine whether to adjust images. The image evaluator 2110 can be configured to do so based on image performance scores that the image evaluator 2110 generates for images. For example, the image evaluator 2110 can generate an image performance score for the image 2106. The image evaluator 2110 can compare the image performance score to a threshold or some other condition. Responsive to determining the image performance score is below the threshold or the condition is satisfied, the image evaluator 2110 can determine to adjust the image 2106.

The image generator 2114 may comprise programmable instructions that, upon execution, cause the processor of the image adjustment system 2102 to generate new images. The image generator 2114 can generate the new images using a generative machine learning model. The image generator 2114 can generate the new images to be adjusted versions of images evaluated by the image evaluator 2110. For example, the image generator 2114 can be or include a generative machine learning model. The generative machine learning model can be a transformer, a neural network, a generative adversarial network, a variational autoencoder, an autoregressive model, a flow-based model, a StyleGAN, or any other type of machine learning model that can automatically generate images. The generative machine learning model can be configured to automatically generate images according to text and/or images that the generative machine learning model receives as input in a prompt.

The generative machine learning model can be generated or trained to generate varied image outputs based on the same inputs. For example, the generative machine learning model can be configured with a temperature variable. The value of the temperature variable can indicate a "randomness" with which to generate outputs. The temperature variable can be defined within a range (e.g., a range between 0 and 1.0) with higher values indicating a higher degree of randomness and lower values indicating a lower degree of randomness. The value of the temperature variable can be selected by an administrator. The generative machine learning model may have a higher value (e.g., between 0.5 and 1.0 on a scale of 0 to 1.0) in the temperature variable such that the generative machine learning model may be configured to generate different images based on the same image features being used as input. In some cases, the output images may not have features that exactly match the input image features (e.g., the output images can vary in between the number of features that match the input features; the variance may be based on the temperature variable of the generative machine learning model).

The generative machine learning model can be trained to generate images with high scores for a given target audience. The image generator 2114 can do the training or the generative machine learning model can be trained at another computing device and deployed or transmitted to the image generator 2114 for use. The inputs to initiate the training and/or finetuning of the generative machine learning model may include relevant images to a given target audience, a list of relevant text prompts, or both. For example, to train the generative machine learning model to generate images with high performance scores for a given target audience, the image generator 2114 can finetune a generic generative model, such as by 1) keeping the generic loss functions that enforce the generated images to be realistic and relevant to a prompt (if a prompt exists), and/or 2) adding an additional loss function which penalizes the model for generating low-scores images. The image generator 2114 can iteratively execute the generative machine learning model to generate images and the image evaluator 2110 can generate performance scores the images, such as for one or more target audiences or for a generic target audience. The image generator 2114 can use one or more both of the loss functions based on the performance scores of the images to train the generated images to generate high scoring images, in some cases for particular target audiences. In one example, the generative machine learning model can generate a new image. The image evaluator 2110 can generate a performance score for a given target audience for the image. The image generator 2114 can use one or more both of the loss functions to adjust the internal weights and/or parameters of the generative machine learning model based on the difference to cause the generative machine learning model to generate higher scoring images. In some embodiments, the image generator 2114 can train different generative machine learning models in this way to generate high scoring images for specific target audiences, such as by only training the individual generative machine learning models with scores generated for specific target audiences. Accordingly, the generative machine learning model may generate images that are realistic, correspond to prompts, and score high with selected audiences.

The image generator 2114 can be configured to generate images based on images the image evaluator 2110 evaluates. The image generator 2114 can generate images based on images that the image evaluator 2110 determines correspond to image performance scores below a threshold or otherwise satisfy a condition. For example, responsive to the image evaluator 2110 determining the image performance score for the image 2106 is below the threshold or satisfies a condition, the image generator 2114 can receive the set of features that the image evaluator 2110 extracted from the image 2106 and provide the set of features into the generative machine learning model as input. The image generator 2114 can iteratively execute the generative machine learning model using the set of features of the image 2106 as input for each execution. The image generator 2114 can execute the generative machine learning model using the set of features of the image 2106 as input any number of times (e.g., a defined number of times). In doing so, the image generator 2114 can generate a different image (e.g., generate images 2118 and 2120) having the set of features or a variation of the set of features for each execution (e.g., the image generator 2114 can generate a defined number of images based on the executions). In some embodiments, the image generator 2114 generates the generated images without comparing the image 2106 to a threshold or condition, such as when requested in the message from the computing device 2104.

In some embodiments, the generative machine learning model may be hosted (e.g., stored virtually or in memory), and/or executed by a remote computing device (not shown). In such embodiments, the image generator 2114 can transmit the set of features of the image 2106 and/or the image 2106 itself to the remote computing device. The image generator 2114 can transmit a message including a number of images to generate to the remote computing device, which the image generator 2114 can receive in the initial request or can be stored value in the image adjustment system 2102. The remote computing device can iteratively execute the generative machine learning model to generate a defined number of generated images. The remote computing device can transmit the generated images to the image adjustment system 2102.

The image evaluator 2110 can evaluate generated images generated by the image generator 2114. For example, subsequent to the image generator 2114 generating the generated images 2118 and 2120, the image evaluator 2110 can generate image performance scores for the generated images 2118 and 2120. The image evaluator 2110 can do so, for example, by extracting a set of features (e.g., a second set of features) from each of the generated images 2118 and 2120. The image evaluator 2110 can input the extracted set of features of the generated images 2118 and 2120 into one or more of the machine learning models configured to generate image performance scores (e.g., generated image performance scores) for images. In some embodiments, the image evaluator 2110 inserts the generated images 2118 and 2120 themselves into the one or more machine learning models. The image evaluator 2110 can execute the one or more machine learning models and the one or more machine learning models can generate image performance scores for the generated images 2118 and 2120. The image evaluator 2110 can similarly evaluate any number of generated images generated by the image generator 2114.

The image selector 2116 may comprise programmable instructions that, upon execution, cause the processor of the image adjustment system 2102 to select or identify images that were generated by the image generator 2114. The image selector 2116 can select or identify images based on image performance scores generated by the image evaluator 2110. For example, the image selector 2116 can identify and compare the image performance scores for the generated images 2118 and 2120 that the image evaluator 2110. In doing so, the image selector 2116 can determine the image performance score of the generated image 2120 is higher than the image performance score of the generated image 2118. Responsive to the determination, the image selector 2116 can select the generated image 2120 to transmit back to the computing device 2104.

The image selector 2116 can transmit the generated image 2120 to the computing device 2104 in a record. For example, the image selector 2116 can generate a record that includes the generated image 2120. In some cases, the image selector 2116 can include the image performance score for the generated image 2120 in the record. The image selector 2116 can transmit the record to the computing device 2104 via the communicator 2108, in some cases through the same communication session through which the computing device 2104 transmitted the image 2106.

In some embodiments, the image selector 2116 can select multiple images to transmit back to the computing device 2104. For example, the computing device 2104 can include a number of generated images in the request for improved images to the image adjustment system. The image generator 2114 can identify the number and generate at least the requested number of generated images. The image evaluator 2110 can generate an image performance score for each generated image. The image selector 2116 can compare the image performance scores and identify or select a number of generated images equal to the number in the request that have the highest image performance scores of the generated images that the image generator 2114 generated based on the request. The image selector 2116 can include each of the selected generated images, in some cases with the image performance scores for the selected generated images, in a record. The image selector 2116 can transmit the record containing the images back to the computing device 2104. The image selector 2116 can include any number of generated images in the record for the response to the request.

In some embodiments, the computing device 2104 can specify a number of images to generate as well as a number of images to include in a response to a request. Such values can be selected by a user from a user interface, for example. For instance, the computing device 2104 can transmit a message to the image adjustment system 2102 with an image that includes a number of images to generate based on the image and a number of generated images to transmit back to the computing device 2104 if the initial image is a lower performing image. In response to receiving the image, the image evaluator 2110 can generate an image performance score for the image and determine the image performance score is below a threshold or otherwise satisfies a condition. In response to the determination by the image evaluator 2110, the image generator 2114 can execute, using the initial image or extracted features from the initial image as input, a number of times equal to the number indicated in the message from the computing device 2104. The image evaluator 2110 can generate image performance scores for each of the generated images. The image selector 2116 can compare the image performance scores and select the number of generated images indicated in the request that have the highest image performance scores based on the comparison. The image selector 2116 can transmit the selected images, in some cases with the image performance scores of the images, back to the computing device 2104 in a record. In this way, the computing device 2104 can vary the number of generated images and/or received images. Thus, the image adjustment system 2102 can allow a user at the computing device 2104 to control the processing of the image adjustment system 2102 to generate improved images.

The image adjustment system 2102 may limit the number of images that may be generated and/or selected for individual requests. For instance, generating more images may result in the final selected generated images corresponding to higher performance scores, but may also cause the image adjustment system 2102 to use more processing resources in performing the overall process. To account for this risk and minimize the processing resources that are required to adjust any initial low performing images, the image adjustment system 2102 may store a maximum number of images that can be selected for any single request and/or a maximum number of generated images that can be selected. In some embodiments, the image adjustment system 2102 can set a maximum ratio of generated images to selected generated images to reduce the processing that is required to perform the process. The image adjustment system 2102 may indicate the limits at a user interface the image adjustment system 2102 provides the computing device 2104 and/or may enforce the limits internally upon receiving any requests that violate the limits. In some embodiments, the image adjustment system 2102 may generate the same defined number of images and select the same defined number of images regardless of the request. Accordingly, the image adjustment system 2102 can reduce the number of images the image generator 2114 generates and/or for which the image evaluator 2110 generates image performance scores, which can significantly reduce the processing requirements of improving images for requests received over time.

In some embodiments, the computing device 2104 can request for an improved image for a specific target audience. For example, the computing device 2104 can include a target audience identifier for a target audience in a request to improve an image. Upon receiving the request, the image evaluator 2110 can generate an image performance score for the image that corresponds to the target audience of the target audience identifier. The image evaluator 2110 can do so using a machine learning model that has been trained to simulate the target audience. For instance, the image evaluator 2110 can retrieve a machine learning model responsive to the machine learning model having a stored association in memory with a target audience identifier that matches the target audience identifier in the request. The image evaluator 2110 can execute the retrieved machine learning model using the image in the same request as input to generate an image performance score for the target audience and the image. The image generator 2114 can generate one or more generated images based on features of the image and/or the image itself, in some cases in response to determining the image performance score for the target audience and the image is below a threshold or satisfies a condition. The image evaluator 2110 can use the same machine learning model configured to simulate the target audience to generate image performance scores for each of the generated images. The image selector 2116 can compare the image performance scores of the generated images and select a defined number of the generated images that correspond to the highest image performance scores. The image selector 2116 can generate and transmit a record to the computing device 2104 that includes the generated images, the image performance scores for the generated images, and/or the target audience identifier that correspond to the image performance scores. Such can be useful, for example, for a host of a website that primarily receives visitors of a specific target audience or for generating images for a product that is primarily purchased by members of a specific target audience.

In some embodiments, the computing device 2104 can request for an improved image for a specific platform (e.g., website or software-as-a-service platform) or content format (e.g., image size or other characteristic of the image). For example, the computing device 2104 can include a platform identifier for a specific platform or a content format identifier for a specific format of content in a request to improve an image that the computing device 2104 transmits to the image adjustment system 2102. Upon receiving the request, the image evaluator 2110 can generate an image performance score for the image that corresponds to the identifier using a machine learning model that is associated with a matching platform identifier or content format identifier in memory. Such a machine learning model may be respectively trained as described herein based on interaction data of images posted on the platform of the platform identifier and/or that have the content format of the content format identifier. The image evaluator 2110 can execute the retrieved machine learning model using the image as input to generate an image performance score for the platform or content format and the image. The image generator 2114 can generate one or more generated images based on features of the image and/or the image itself, in some cases in response to determining the image performance score for the platform or content format and the image is below a threshold or satisfies a condition. The image evaluator 2110 can use the same machine learning model configured to generate image performance scores for each of the generated images. The image selector 2116 can compare the image performance scores of the generated images and select a defined number of the generated images that correspond to the highest image performance scores. The image selector 2116 can generate and transmit a record to the computing device 2104 that includes the generated images, the image performance scores for the generated images, and/or the platform identifier or the content format identifier that correspond to the image performance scores. Such can be useful, for example, to improve images for audiences that visit a specific platform or to improve images that have a specific format.

In some embodiments, the image evaluator 2110 can select the threshold to use to determine whether to generate new images for an initial image based on a target audience identifier included in a request. For example, the image evaluator 2110 can store thresholds with different values for different target audiences in memory. The image evaluator 2110 can receive a request that includes an image and a target audience identifier. Responsive to receiving the request, the image evaluator 2110 can generate an image performance score for the target audience of the target audience identifier for the image. The image evaluator 2110 can select or retrieve a threshold (e.g., a target audience threshold) from memory that corresponds to the target audience (e.g., that has a stored identification with a matching target audience identifier in memory). The image evaluator 2110 can compare the image performance score generated for the target audience for the image to the retrieved threshold to determine whether to generate images to adjust the image. Such may be advantageous, for example, to account for preferences of different target audiences when determining whether to recommend adjusting an image.

In some embodiments, a request may include an image and a value of a threshold. The image evaluator 2110 can compare an image performance score generated for the image to the value of the threshold to determine whether to adjust the image. Thus, the user of the computing device that generated the request can control how the image evaluator 2110 determines to generate and/or recommend adjustments to the image.

In some embodiments, the image generator 2114 can vary the images that the image generator 2114 generates by inputting different subsets of features of an image into the generative machine learning model. The image generator 2114 can vary the subsets of features based on one or more rules. For example, the image generator 2114 can store or receive rules that indicate different types of features (e.g., scenes, colors, objects, specific objects (if they are included in a set of features for an image), size, etc.) to include in different subsets of features, increase the size or impact of specific features, completely remove specific features, etc., based on the instructions of the image generator 2114. In some cases, the types of features for the subsets can vary depending on the target audience for which the image adjustment system 2102 is performing the process (e.g., the target audience of a target audience identifier in a request). In another example, the image generator 2114 can pseudorandomly select subsets of features from sets of features. The rules can cause the image generator 2114 to generate subsets of features of a defined size (e.g., a defined number of features) that the generative machine learning model is configured to receive and/or generate generated images. The image generator 2114 can separately input the subsets of features into the generative machine learning model for each execution to generate different generated images based on the same image.

In some embodiments, the image generator 2114 only generates images responsive to the image evaluator 2110 determining an image performance score for an initial image is less than a threshold or otherwise satisfies a condition. For example, the image adjustment system 2102 may receive a message containing a second image from a computing device (e.g., the computing device 2104). The image evaluator 2110 can extract a set of features from the second image. The image evaluator 2110 can execute a machine learning model using the extracted set of features of the second image, or the second image itself, as input to generate an image performance score (e.g., a second image performance score) for the second image. The image evaluator 2110 can compare the image performance score for the second image to a threshold or a condition. Responsive to determining the image performance score for the second image exceeds the threshold, the image evaluator 2110 can transmit an indication that the image performance score for the second image exceeds the threshold (e.g., a message indicating that the image is high scoring).

In some embodiments, the image generator 2114 can generate generated images based on additional instructions to the features or the image that the image adjustment system 2102 receives in a request. For example, the image adjustment system 2102 can receive instructions (e.g., text that includes specific changes to make to an image in any generated images) in a request with an image. The instructions can indicate a change to make to an image, such as a feature to include or not include in any generated images. In one example, the instructions may be "make the sky green." The image generator 2114 can input the image of the request or features of the image into the generative machine learning model of the image generator 2114 with the instructions in a prompt. In some embodiments, the image generator 2114 can include restrictions in the prompt that indicate what not to change with the generated images. The restrictions can be an additional control parameter that the generative machine learning model can use to identify what the generative machine learning model is allowed to change and not allowed to change. The image generator 2114 can generate generated images based on the received image and instructions of the request.

In some embodiments, the image adjustment system 2102 can adjust images that are displayed on different web pages. For example, the image adjustment system 2102 can crawl different web pages over time. In doing so, the image adjustment system 2102 can access the web pages and scrape or retrieve images that are displayed on the web pages. The image evaluator 2110 can evaluate the images to generate image performance scores for the images. The image evaluator 2110 can compare the image performance scores to a threshold or a condition. For any image with an image performance score that is less than the threshold or that otherwise satisfies the condition, the image generator 2114 can generate a number (e.g., a defined number) of images using such images or features extracted from the images as input into the generative machine learning model of the image generator 2114. The image evaluator 2110 can generate image performance scores for the generated images and the image selector 2116 can, for each of the images that the image evaluator 2110 determined correspond to an image performance score below the threshold or that otherwise satisfies a condition, select or identify a number (e.g., a defined number, such as one) of the generated images based on the image performance scores for the generated images.

The image selector 2116 can replace images that are displayed on different web pages that are determined to correspond to image performance scores below the threshold or that otherwise satisfies a condition. The image selector 2116 can replace such images with generated images that the image selector 2116 selected for such images. For example, the image selector 2116 may identify a generated image with a highest image performance score of generated images that the image generator 2114 based on an image that the image evaluator 2110 identified from a web page. Responsive to doing so, the image selector 2116 can transmit a message to the server or computing device hosting the web page with the generated image indicating to replace the image on the web page with the identified generated image. Such a server or computing device can receive the image and replace (e.g., automatically replace) the image on the web page with the generated image. In some embodiments, the image selector 2116 transmits a message containing the generated image to code provisioned on such a computing device. The provisioned code may replace (e.g., automatically replace) the image on the web page with the generated image. In some cases, the image selector 2116 can access (e.g., based on allocated permissions to the image adjustment system 2102) the web page and replace the image of the web page with the identified generated image. In some cases, the image selector 2116 can identify the image of the web page from a database based on the image corresponding to an identifier (e.g., a URL) of the web page. The image selector 2116 can replace the image in the database with the identified generated image such that the generated image will be called when the web page is loaded instead of the image that was previously on the web page. The image selector 2116 can replace images on web pages in any manner.

In some embodiments, the image adjustment system 2102 can selectively adjust portions of images received from different computing devices. The image adjustment system 2102 can do so using the impact evaluator 2112. For example, the impact evaluator 2112 may comprise programmable instructions that, upon execution, cause the processor of the image adjustment system 2102 to calculate or generate impact scores indicating the impacts that different features of images have on any image performance scores generated for the images. The impact evaluator 2112 can do so, for example, by analyzing data that was generated by the machine learning model or machine learning models of the image evaluator 2110 when the machine learning models generated image performance scores for the images.

For example, the image evaluator 2110 can execute a machine learning model to generate an image performance score for the image 2106 received from the computing device 2104. The image evaluator 2110 can execute the machine learning model using a set of images extracted from the image 2106 or the image 2106 itself. The machine learning model may be or include a neural network. The neural network can include an input layer, a plurality of intermediate layers subsequent to the input layer, and a regression layer, for example. The impact evaluator 2112 can extract one or more values from one or more signals between an intermediate layer of the plurality of intermediate layers and the regression layer of the neural network. The one or more values may have been generated responsive to the image evaluator 2110 executing the neural network using the extracted first set of features as input. For each of the set of features of the image 2106, the impact evaluator 2112 may calculate, based on at least one of the one or more values, an impact score indicating an impact the feature had on the image performance score of the image 2106. An impact score can indicate an amount (e.g., a magnitude) of a positive or negative impact a feature had on the image performance score for an image as generated by the neural network of the machine learning model of the image evaluator 2110.

The impact evaluator 2112 can calculate the impact scores using back-propagation techniques. For example, the impact evaluator 2112 can back-propagate the values from the signals through the neural network. The impact evaluator 2112 may back-propagate the values back through the neural network starting from the final prediction layer of the neural network (e.g., from the regression layer). Such back-propagation techniques may cause the neural network to output, at the input layer of the neural network, an impact score for each of the features of the image. The impact evaluator 2112 can use any techniques to generate impact scores for features of an image. In some embodiments, such as to reduce processing resources, the impact evaluator 2112 may only generate impact scores for an image responsive to the image evaluator 2110 determining the image performance score for the image is below a threshold or otherwise satisfies a condition. More details regarding how to calculate impact scores for images can be found in U.S. patent application Ser. No. 17/264,161, filed May 10, 2021.

In some embodiments, the impact evaluator 2112 can generate recommendations for features for the generative machine learning model to include in images. For example, the impact evaluator 2112 can identify neurons in the embedding space of the image scoring machine learning model (e.g., an image scoring machine learning model that corresponds to a specific target audience) that correspond to a high or maximum performance score for images (e.g., neurons that correspond to specific features of images that, if present, correspond to the images having higher scores). The impact evaluator 2112 can do so using feature visualization in which the weights of the image scoring machine learning model is fixed (e.g., the image scoring machine learning model is trained and in inference mode). The impact evaluator 2112 can identify one or more inputs that maximizes the activation of a given unit where the input is the neurons of the image embedding and the given unit is the image performance score output. Accordingly, the impact evaluator 2112 can identify neurons that, if they exist in an embedding vector for an image, may correlate with a higher image performance score.

In another example, the impact evaluator 2112 can identify recommendations for features to include in images using another machine learning model. For instance, the impact evaluator 2112 can use a Gaussian Mixture Model (GMM) to evaluate or identify uniquely positive features or negative features to recommend including in generated images. The impact evaluator 2112 can do so, for example, using the systems and methods described in U.S. patent application Ser. No. 18/416,371, filed Jan. 18, 2024, the entirety of which is incorporated by reference herein. The impact evaluator 2112 can identify high scoring features and/or low scoring features to include or not include in the prompt based on the trained GMM.

The impact evaluator 2112 can use any method to identify features to recommend including in images. For instance, the impact evaluator 2112 can use a counting system and identify features that have a high rate (e.g., a rate above a threshold) of being included in high scoring images (e.g., images with image performance scores above a threshold) and/or a high rate of being included in low scoring images (e.g., image with image performance score below the threshold or a different threshold). In another example, the impact evaluator 2112 can identify features that are identified in a user input. The impact evaluator 2112 can use any method to identify features to recommend including in images.

The impact evaluator 2112 can pass the identified neurons to the generative machine learning model (e.g., the generative machine learning model that corresponds to the same target audience as the image scoring machine learning model). The impact evaluator 2112 can do so by providing instructions to the generative machine learning model that include the identified neurons (e.g., identifications of the image features of the identified neurons), such as through a prompt input. The generative machine learning model may receive the neurons as input for training the generative machine learning model such that the generative machine learning model includes or is more likely to include the features of the neurons in images that the generative machine learning model generates. The impact evaluator 2112 can similarly train generative machine learning models for any number of target audiences in this way. In one example, in the case of a stable diffusion model, the identified neurons can be added to the noise predictor of the denoiser.

The image generator 2114 can use impact scores generated by the impact evaluator 2112 to generate generated images. For example, the image generator 2114 can identify the impact scores generated for features of the image 2106 by the impact evaluator 2112. The image generator 2114 can apply one or more rules to the impact scores, such as comparing the impact scores to a positive or negative threshold (e.g., compare positive impact scores to a positive threshold and compare negative impact scores to a negative threshold). In doing so, the image generator 2114 can identify features of the image 2106 that correspond to impact scores that exceed the respective thresholds. The image generator 2114 can group the features into different subsets, a subset of features of the image 2106 that correspond with positive impact scores that exceed a positive threshold, a subset of features of the image 2106 that correspond with negative impact scores that exceed a negative threshold (e.g., an absolute value of the negative impacts exceed an absolute value of the negative threshold), and a subset of features of the image 2106 that correspond with impact scores in which neither of these criteria is met.

The image generator 2114 can input the different subsets of features into the generative machine learning model with instructions to increase the importance of or otherwise emphasize the features of the subset of features associated with positive impact scores exceeding a threshold (e.g., the subset of positive features) and/or instructions to decrease the importance of or otherwise de-emphasize the features of the subset of features associated with negative impact scores exceeding a threshold (e.g., the subset of negative features). The instructions can also indicate not to change any features in the remaining subset of features. In some cases, the instructions may be to only change the subset of positive features or to only change the subset of negative features. The instructions can be received in a request to generate a new image based on an image in the request or can otherwise be stored instructions that the image generator 2114 has stored in memory.

In some embodiments, the instructions may indicate to change the features of the image 2106 in the generated images proportional to the impact scores for the features. The instructions can be to do so for each feature of the image 2106 or only for the subset of positive features and/or the subset of negative features. For example, if a positive feature is the color blue and the impact score for the color blue is high, the generative machine learning model may increase the prominence of (e.g., the amount of) the color blue in the generated images for the image 2106 by a large amount. The generative machine learning model may similarly reduce the prominence of the negative features proportional to the magnitude of the negative impact scores for the negative features. In this way, the generative machine learning model can selectively improve different aspects of images using generative machine learning techniques without regenerating entirely new images.

In some embodiments, the image evaluator 2110 can generate a heat map from the impact scores of the features of the image 2106. A heat map can be an overlay of an image with visual indicators that indicate different portions (e.g., features) of the image 2106 that increase and decrease the image performance score for the image 2106. The image evaluator 2110 can identify different portions of the image 2106 that correspond to features that correspond with impact scores. The image evaluator 2110 can identify the impact scores for the features and include visual indicators indicating the impact scores at the portions of the image 2106 corresponding to the impact scores. In one example, the image evaluator 2110 can indicate positive impact scores in a first color (e.g., blue) and negative impact scores in a second color (e.g., red). The colors can have an intensity or saturation that is proportional to the impact scores to which the colors correspond (e.g., higher positive impact scores can be a darker red and higher negative impact scores can be a darker blue). The image evaluator 2110 can generate a heat map overlay for the image 2106 that includes the colors at the portions of the image 2106 based on whether the portions correspond to positive or negative impact scores and the magnitude of such impact scores.

The image generator 2114 can generate a generated image based on the image 2106 and the heat map for the image 2106. For example, the image generator 2114 can include the heat map generated from the image 2106 in the input to the generative machine learning model with the image 2106. In some cases, the image generator 2114 can include instructions to generate a generated image based on the colors of the heat map, such as by increasing the prominence of features that correspond with the color blue on the heat map and decreasing the prominence of features that correspond with the color red on the heat map. In some embodiments, the image generator 2114 can include instructions to increase or decrease the prominence of such features based on the intensity or prominence of the colors (e.g., higher intensity indicates a higher increase in prominence and a lower intensity indicates a higher decrease in prominence). The image generator 2114 can execute the generative machine learning model based on the heat map and the image 2106, in some cases with such instructions, as input. In doing so, the generative machine learning model may output an image generated based on the heat map and the image 2106, in some cases according to the instructions.

In some embodiments, the image generator 2114 can adjust images to be similar to high scoring images. For example, the image generator 2114 can select an image (e.g., a second image) to pair with the image 2106. The image generator 2114 can execute a machine learning model to extract a set of features from the selected image. The image generator 2114 can provide the set of features from the selected image with the image 2106 as input into the generative machine learning model of the image generator 2114 and execute (e.g., iteratively execute) the generative machine learning model to cause the generative machine learning model can generate one or more images that include initial features of the image 2106 with one or more of the initial features of the image 2106 adjusted to be similar to the selected image.

The image generator 2114 can select the image to pair with the image 2106 responsive to determining an image performance score of the image satisfies a condition. For example, the image evaluator 2110 can generate an image performance score for the image and multiple other images that are stored in memory. The image evaluator 2110 can store the image performance scores and the respective images in memory. The image generator 2114 can retrieve the image performance scores for the images and compare the image performance scores with each other. The image generator 2114 can determine the image performance score for the image (e.g., the second image) is the highest image performance score based on the comparison. Responsive to determining the image performance score is the highest image performance score, the image generator 2114 can select the image corresponding to the image performance score to use as input into the generative machine learning model with the image 2106 (e.g., features of the image 2106). Accordingly, when the generative machine learning model generates new generated images based on the features of the image 2106, the generative machine learning model may cause the images to be higher scoring versions (e.g., improved versions) of the image 2106.

In some embodiments, the image generator 2114 can select the image to use as input with the image 2106 according to a specific target audience. For example, the message that the image adjustment system 2102 receives from the computing device 2104 may include the image 2106 and a target audience identifier. The image generator 2114 can identify the target audience identifier from the message and compare image performance scores for the target audience that the image adjustment system 2102 has stored in memory. The image generator 2114 can select the image corresponding to the image performance score for the target audience to use as input into the generative machine learning model with the image 2106 (e.g., features of the image 2106). Accordingly, when the generative machine learning model generates new generated images based on the features of the image 2106, the generative machine learning model may cause the images to be higher scoring versions (e.g., improved versions) of the image 2106 for the requested target audience.

In some embodiments, the image generator 2114 can generate the generated images to each have a defined magnitude of change from an initial image toward a selected image (e.g., a high scoring image). For example, the message that the image adjustment system 2102 receives from the computing device 2104 may include the image 2106 and a change value. The change value can indicate a magnitude to change the image 2106. The image adjustment system 2102 can otherwise store the change value or store the change value and retrieve the change value from memory. The image generator 2114 can include the change value with the features of the image 2106 and the selected image in the input to the generative machine learning model. The generative machine learning model can receive the input and automatically generate a defined number of generated of images in which the image 2106 is changed to be more like the selected image according to the change value. In this way, the image adjustment system 2102 can enable a user to control how to adjust an image to improve how the image performs.

In some embodiments, the image adjustment system 2102 can include the prompt generator 2113. The prompt generator 2113 may comprise programmable instructions that, upon execution, cause the processor of the image adjustment system 2102 to automatically generate prompts to use as input into the image generator 2114 to generate images. The prompt generator 2113 can generate the prompts to include identifications of features of images. The prompt generator 2113 can determine which features of the images to include in the prompts based on the features that are in images that are determined to correspond with high image performance scores by the image evaluator 2110. Accordingly, the prompt generator 2113 can generate prompts that cause the image generator 2114 to generate high scoring images with features that correspond with high scoring images.

For example, the image adjustment system 2102 or the prompt generator 2113 can feed a set of images or other types of content into the image evaluator 2110. The image adjustment system 2102 can execute the image evaluator 2110 based on the images to cause the image evaluator 2110 to generate image performance scores for the individual images. The prompt generator 2113 can identify the image performance scores and filter out images with low image performance scores or otherwise divide the images into groups based on the image performance scores, such as by identifying images with image performance scores above or below a threshold and/or by ranking up to a defined number of images with the highest performance scores. The prompt generator 2113 can use the filtered or divided images to identify image features that correspond with high performance scores as high scoring images (e.g., high scoring images May be images with performance scores above the threshold and/or that are in the defined number of images with the highest performance scores).

The prompt generator 2113 can use the filtered or divided groups of images to identify features that correspond with high performance scores. The prompt generator 2113 may do so based on the frequencies of the features within the high scoring images. For example, the prompt generator 2113 can identify the features of the images determined to correspond with high performance scores (e.g., based on the rankings of the images and/or the images corresponding to high performance scores, as described above). The prompt generator 2113 can identify the features from the feature vectors of features of the images that were input into the image evaluator 2110 for evaluation or by extracting the features from the images (e.g., using a feature extraction machine learning model (e.g., a neural network) configured to extract features from images). The prompt generator 2113 can identify the unique features from the images and instantiate counters for the unique features. The prompt generator 2113 can increment the counters for each instance of the respective features in the set of images that the prompt generator 2113 identifies such that each counter represents a total count or frequency of a different feature that is included in at least one of the images that the image evaluator 2110 evaluated to have a high image performance score (e.g., a score above a threshold).

The prompt generator 2113 can use frequencies to identify or determine features to include in prompts for the image generator 2114. The prompt generator 2113 can do so using a set of criteria. For example, the prompt generator 2113 can compare the counts with each other and identify features with counts with a frequency above a threshold to determine features to include in the prompts. In another example, the prompt generator 2113 can compare the counts and identify a defined number of the highest counts to determine features to include in prompts. In another example, the prompt generator 2113 can determine image features with the highest frequencies up to a defined number of image features and that correspond with frequencies that exceed a threshold. The prompt generator 2113 can use any criteria to identify features to include in prompts for the image generator 2114.

In some embodiments, the prompt generator 2113 may filter out high scoring features from being included in prompts to insert into the machine learning model of the image generator 2114. The prompt generator 2113 can do so based on the features of images determined to have low image performance scores (e.g., images that were not selected as having high image performance scores). For example, the prompt generator 2113 can identify features of the high scoring images that are "uniquely high scoring." To do so, the prompt generator 2113 can identify features in the low scoring images in a similar manner to the high scoring images. The prompt generator 2113 can compare the features from the high scoring images with the features from the low scoring images and identify features that are only included the high scoring images as being "uniquely high scoring." In some embodiments, the prompt generator 2113 may identify such uniquely high scoring features before instantiating counters for the features and only instantiate counters for the features that the prompt generator 2113 determined to be uniquely high scoring. Doing so can reduce the processing and/or memory resources of maintaining and incrementing the counters by reducing the number of counters to store in memory and process. In some embodiments, the prompt generator 2113 can identify or determine the uniquely high scoring features after instantiating and incrementing the counters for the different features. The prompt generator 2113 may only include the features determined to be uniquely high scoring in the prompts that the prompt generator 2113 generates to further improve the quality of the prompts and the images that the image generator 2114 generates based on the prompts.

In some embodiments, the image adjustment system 2102 can train and use a Gaussian mixture model (GMM) to evaluate or identify uniquely positive and/or negative features. The image adjustment system 2102 can do so, for example, using the systems and methods described in U.S. patent application Ser. No. 18/416,371, filed Jan. 18, 2024. The prompt generator 2113 can identify high scoring images and/or low scoring features to include or not include in the prompt based on the trained GMM.

In some embodiments, the prompt generator 2113 can determine or identify high scoring features for specific target audiences. For example, the image evaluator 2110 may use different machine learning models that are specific to different target audiences to generate target audience scores for individual images. The prompt generator 2113 can use the systems and methods described herein to identify image features that correspond with high image performance scores for the different target audiences by determining frequencies of the features within the high scoring images for the respective target audiences. The prompt generator 2113 can store the list of high scoring features in memory with stored associations with identifications of the target audiences for which the high scoring features were identified. The prompt generator 2113 can use the different lists of identifications of features in prompts for the image generator 2114 depending on the target audience for which the image generator 2114 is generating one or more images.

In some embodiments, the prompt generator 2113 can generate prompts using methods similar to retrieval-augmented generation. For example, the prompt generator 2113 can receive one or more images from external sources, such as images provided by a user. The prompt generator 2113 can receive an input (e.g., a request to improve an image or a high scoring image, such as with one or more defined features) and use search-based techniques, such as a semantic search, on the images from external sources to identify relevant images from the external sources that are relevant to the input. For instance, the user can provide a benchmark of images with image performance scores of the images. The prompt generator 2113 can identify images of the benchmark of images and score the individual images based on the relevancy of the images to generating an output based on the input. The prompt generator 2113 can identify the features of the relevant images (e.g., images with the predefined number of images with the highest relevancy to the input). In some cases, the prompt generator 2113 can rank the images based on a function of the image performance scores and/or the relevancy scores for the individual images. The prompt generator 2113 can identify features of the images (e.g., features that are present in or that common across all or at least a predefined portion of the images) that correspond to the highest ranking or a predefined number of the highest ranked images. The prompt generator 2113 can use the identified features in a prompt to generate a new image based on the input or otherwise include in one or more prompt recommendations for the user.

The prompt generator 2113 may similarly identify features of different modalities (e.g., types) instead of or in addition to images for the prompt. For example, the prompt generator 2113 can add or identify derivatives of images, such as features or labels, to include in the prompt. The prompt generator 2113 can similarly identify other types of content items, such as audio, video, etc., to include in the prompt. The prompt generator 2113 can similarly use the systems and methods described herein to generate prompts containing features of any type of content item.

The prompt generator 2113 can generate prompts to use as input into the image generator 2114 using a template or generative machine learning model (e.g., a large language machine learning model). For example, the prompt generator 2113 can store a template in memory of the image adjustment system 2102. The template can include a text string such as "Generate an image with the following features:". Subsequent to identifying high scoring image features, upon activation or execution, the prompt generator 2113 can insert one or more of the identified high scoring image features into the template. Continuing with the example above, the prompt generator 2113 can fill out the template to state "Generate an image with the following features: blue sky, bubbles, and puppies." In doing so, the prompt generator 2113 can generate a prompt to use as input into the image generator 2114 that will cause the machine learning model of the image generator 2114 to generate one or more images that include each or one or more of a blue sky, bubbles, and/or puppies.

In another example, the prompt generator 2113 can store a generative machine learning model in memory. The generative machine learning model may be trained or configured to generate prompts including one or more image features to use as input into the image generator 2114. The prompt generator 2113 may input one or more of the features that the prompt generator 2113 identified as being high scoring into the machine learning model and execute the machine learning model. In some embodiments, the prompt generator 2113 can be trained or finetuned to generate prompts that include high scoring features or that correspond to generating high scoring images. In some embodiments, the prompt generator 2113 can generate prompts by identifying high scoring features, such as by using a machine learning model (e.g., a GMM) as described herein. Responsive to the execution, the machine learning model can output a text string including identifications of the features similar to the filled out template described above. The image adjustment system 2102 can use the text string from the filled out template or the machine learning model as an input into the image generator 2114 to generate one or more images that contain the identified features.

In some embodiments, the prompt generator 2113 can generate prompts to modify a low scoring image based on the features identified as corresponding to high image performance scores. For example, subsequent to the image evaluator 2110 determining an image is a low performing image (e.g., has an image performance score below a threshold), the prompt generator 2113 can generate a prompt that includes the features of the low performing image. The prompt generator 2113 can generate a prompt that includes identifications of the features of the low scoring image, in some cases with instructions to generate a new image. The prompt generator 2113 can insert the generated prompt into the image generator 2114 and execute (e.g., iteratively execute) the image generator 2114 to generate one or more images. The prompt generator 2113 can include one or more identifications of the high scoring features in the prompt to cause the image generator 2114 to include the identifications in the generated images that image generator 2114 generates. In this way, the prompt generator 2113 can improve the quality of the images that the image generator 2114 generates. The prompt generator 2113 can generate the prompt using the identifications of the high scoring features in addition to or instead of the features of the recommendations as described above.

In some embodiments, the prompt generator 2113 can include identifications of high scoring features in prompts based on the target audiences for which the prompt generator 2113 is generating the prompts. For example, the prompt generator 2113 can generate a prompt for a target audience that includes the features of a low scoring image for the target audience and high scoring image features for the target audience. The prompt generator 2113 may retrieve such high scoring image features from memory based on the stored associations between the features and an identification of the target audience. The prompt generator 2113 can retrieve the features and include the retrieved features in the prompt to use as input into the image generator 2114 to generate images that include the high scoring features for the target audience. Thus, the prompt generator 2113 can generate prompts that are tailored to improving or generating images for specific target audiences.

In some embodiments, the prompt generator 2113 can use a generative machine learning model to answer questions input by a user regarding whether features are high scoring or low scoring. The prompt generator 2113 can do so in one of a few manners. For example, similar to a retrieval-augmented generation (RAG) system, the prompt generator 2113 can identify positive and/or negative features or descriptions of images (e.g., images of a user provided benchmark). The prompt generator 2113 can receive a request or a question regarding features that are positive or negative. The prompt generator 2113 can identify the positive and/or negative feature based on the request and present identified positive and/or negative features to the user on a user interface. In another example, the prompt generator 2113 can finetune the generative machine learning model based on features that have been identified as positive and/or negative. The prompt generator 2113 can generate an answer to questions based on the finetuning.

The prompt generator 2113 can generate prompts to use as input into generative machine learning models that are configured to generate any type of content item. For example, the prompt generator 2113 can input the features with requests to generate videos with specific features, songs with specific features, or images with specific features. The prompt generator 2113 can generate such prompts and use the prompts as input into generative machine learning models that are specifically configured to generate the requested type of content item or for a generative machine learning model that is configured to generate multiple types of content item.

The prompt generator 2113 can generate prompts to use as input into a generative machine learning model that have a different modality (e.g., type) of content item compared with the output of the generative machine learning model. For example, the prompt generator 2113 can input audio, text, and/or images into the generative machine learning model as a prompt and execute the generative machine learning model to cause the generative machine learning model to output any of audio, text, and/or images.

Figure 22:
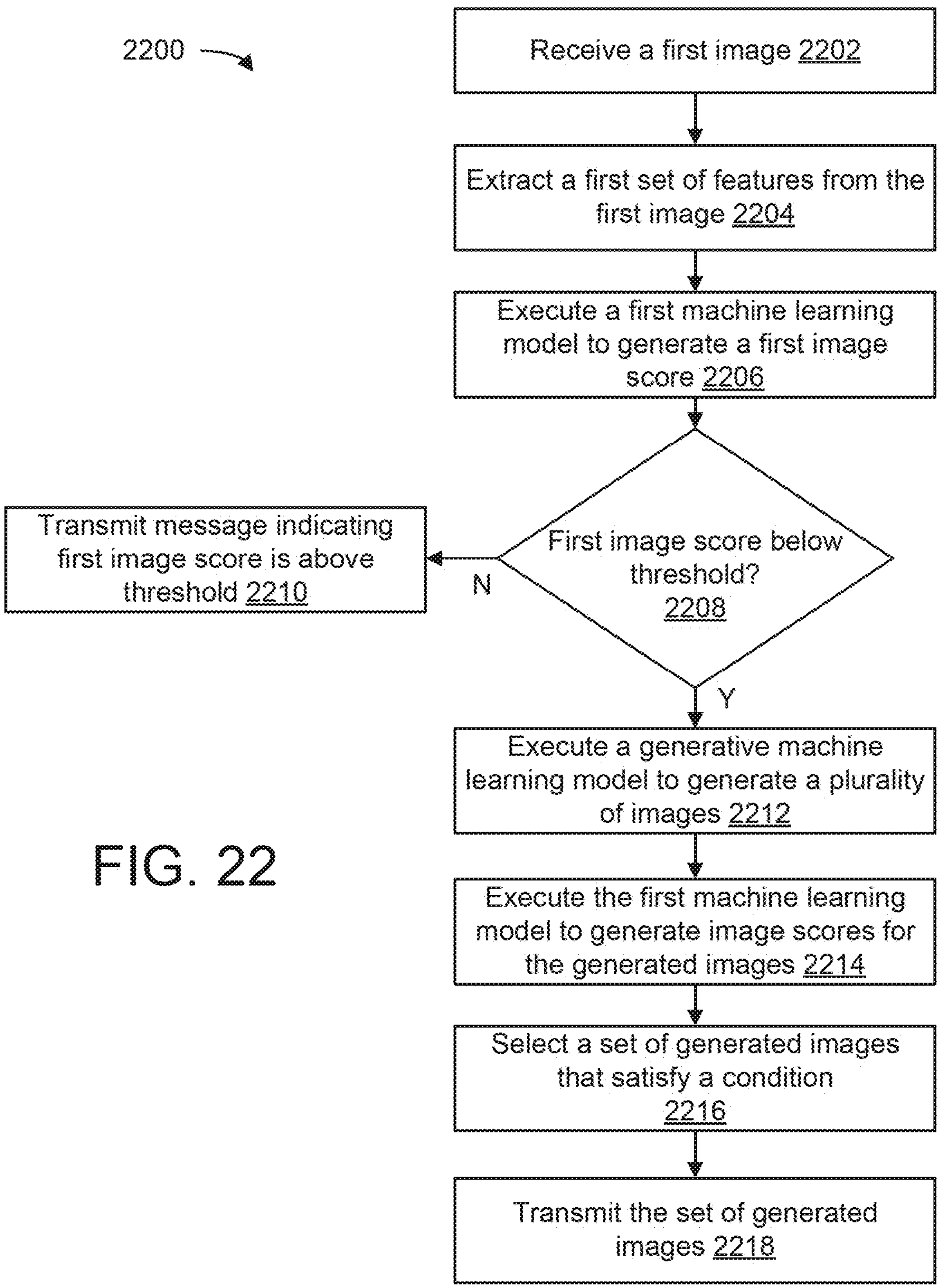
FIG. 22 is a flow diagram illustrating a method for automatic image generation based on image scoring in accordance with an illustrative embodiment.

FIG. 22 is a flow diagram illustrating a method 2200 for automatic image generation based on image scoring in accordance with an illustrative embodiment. In some implementations, the method 2200 can be performed by a data processing system such as any of the components of the system 1000 shown in FIG. 10 or the image adjustment system 2102. The method 2200 may include more or fewer operations and the operations may be performed in any order. Performance of the method 2200 may enable the data processing system to use a sequence of machine learning models and rules to adjust images that the data processing system receives to improve the performance of the images with users that may view the images on an online medium.

At operation 2202, the data processing system receives a first image. In some embodiments, the data processing system can receive the first image in a request from a remote computing device. The request may indicate to improve the image. In some embodiments, the data processing system can receive the first image by retrieving the first image from a web page that the data processing system accesses over a network. In some embodiments, the data processing system can receive the first image by retrieving the first image from a database (e.g., a database stored locally in memory or a database of a remote computing device). In one example, the first image can be an image of a product that is being sold on a website. The data processing system can retrieve the first image of the product by web scraping the product or by receiving the first image from a computing device associated with the host of the website.

At operation 2204, the data processing system extracts a first set of features from the first image. The data processing system can extract the first set of features from the first image using a feature extraction machine learning model, such as a neural network. For example, the data processing system can input the first image into the feature extraction machine learning model and execute the feature extraction machine learning model. The feature extraction machine learning model can use object recognition techniques, for example, to identify different objects or other features (e.g., colors, scenes, or other attributes as described herein) from the first image. The feature extraction machine learning model can output the identified features as a first set of features of the first image. The first set of features may be numerical values representing the features of the first image or a text describing the features of the first image. The data processing system can generate a feature vector from the numerical values or convert the text description describing the features to numerical values (e.g., based on a table or a set of rules) and generate a feature vector from the converted numerical values.

At operation 2206, the data processing system executes a first machine learning model. The first machine learning model can be configured or trained to generate image performance scores for images indicating likelihoods that users will interact with the respective images. The data processing system can execute the first machine learning model using the first set of features of the first image as input (e.g., using the feature vector of the first set of features as input). In some embodiments, the data processing system executes the first machine learning model using the first image as input without performing the operation 2204.

Based on the execution, the first machine learning model can automatically output a first image performance score for the first image.

In some embodiments, the data processing system can execute multiple machine learning models to generate multiple image performance scores for the first image. Each machine learning model may be configured or trained to generate image performance scores for a different target audience. For example, the data processing system can input the feature vector of features of the first image or the first image itself into each of the machine learning models. The data processing system can execute each of the machine learning models to generate image performance scores for the first image that indicate how the first image would perform with different target audiences. In some embodiments, the data processing system may only determine an image performance score for a target audience that is identified in the request with the first image. By doing so, the data processing system can reduce the processing resources required for improving the image by reducing the number of executions of machine learning models to generate scores for different target audiences.

At operation 2208, the data processing system can determine whether the first image performance score for the first image is below a threshold. For example, the data processing system can compare the first image performance score with a threshold. The threshold can be a stored value that the data processing system retrieves from memory or a value that is included in the request with the first image. In some embodiments, the threshold may correspond to a specific target audience. For example, the request that the data processing system receives may include the first image and a target audience identifier. Based on the request, the data processing system can identify the first image performance score (e.g., the first target audience score) for the target audience for the first image and identify a threshold from memory that corresponds with the target audience. The data processing system can compare the first image performance score for the first image with any threshold or with any condition.

Responsive to determining the first image performance score exceeds the threshold, at operation 2210, the data processing system transmits a message indicating the first score is above the threshold. The data processing system can transmit the message to the computing device that transmitted the request containing the image to the data processing system. The data processing system can generate a message indicating the image performance score is above the threshold, in some cases including the image performance score and the threshold in the message. The data processing system can transmit the message to the computing device, in some cases over the same connection that the computing device transmitted the request with the first image.

However, responsive to determining the first image performance score is lower than the threshold, at operation 2212, the data processing system executes a generative machine learning model. The generative machine learning model can be a generative machine learning model that is configured to automatically generate images (e.g., generated images) based on text or image inputs. The generative machine learning model can be configured with a high temperature value (e.g., above 0.5) such that the generative machine learning model may generate varied images based on the same inputs. The data processing system can configure the temperature value, such as based on a temperature value the data processing system receives in the request with the first image or based on a user input. The data processing system can input the first set of features of the first image into the generative machine learning model. In some cases, the data processing system can input the first image into the generative machine learning model. The data processing system can execute the generative machine learning model using the first of features or the first image as input to generate a generated image. The data processing system can iteratively execute (e.g., execute multiple times) the generative machine learning model using the first set of features or the first image as input to generate a plurality of generated images.

In iteratively executing the generative machine learning model, the generative machine learning model may generate different generated images based on the first set of features or the first image. In one example, the generative machine learning model can do so using the same input, such as because of the high temperature value of the generative machine learning model. In another example, the data processing system can divide the features of the extracted features of the first image into different subsets of features. The data processing system can pseudo-randomly divide the features into subsets or divide the features into subsets based on the types of the features. The data processing system can input different subsets of features of the first set of features into the generative machine learning model, causing the generative machine learning model to "fill in the blanks" for the missing features of the first set of features when generating the generated images. The data processing system can execute the generative machine learning model separately for each subset of features, causing the data processing system to generate different generated images based on the first image or the first set of features of the first image. In this way, the data processing system can vary the generated images with lower temperature values in a more controlled and/or deterministic manner.

In some embodiments, the generative machine learning model can generate the generated images based on instructions that the generative machine learning model receives. The instructions can come from a user or the data processing system can retrieve the instructions from memory. The instructions can indicate what to change to improve an image, in some cases. For example, the message that the data processing system receives with the first image can include instructions to include with the first image or the first set of features of the first image in the input into the generative machine learning model. The instructions can be, for example, instructions for features to include in each or a portion (e.g., as a percentage probability of including the features) of the generated images or features to change in each or a portion (e.g., as a percentage probability of changing the features) of the generated images. The instructions can be in a text format. The generative machine learning model can input the instructions with the first set of features or first image for each execution and the generative machine learning model can generate the generated images based on the instructions.

In some embodiments, the generative machine learning model may use retrieval-augmented generation to generate the images. For example, the data processing system can store previously received images in memory, in some cases with image performance scores generated for the respective images. The generative machine learning model may identify high scoring features from the stored images. When a user inputs a prompt such as "generate a high scoring image of a t-shirt for people who like sports" or uploads an image to change or improve, the generative machine learning model can identify the relevancy of the high performing features to the request and generate or create one or more new images using identified features.

At operation 2214, the data processing system executes the first machine learning model to generate image performance scores for the generated images. The data processing system can extract a set of features from each of the generated images. The data processing system can extract the sets of features using the feature extraction machine learning model, for example. The data processing system can input the sets of features of the generated images or the generated images themselves into the first machine learning model and execute the first machine learning model. The first machine learning model can output image performance scores (e.g., generated image performance scores) for the generated images based on the sets of features and/or the first images. In some embodiments, in generating the image performance scores, the data processing system can generate image performance scores for the same target audience or target audiences using the same machine learning model or machine learning models as the data processing system used to generate the image performance score or image performance scores for the first image.

At operation 2216, the data processing system selects a set of the generated images. The data processing system can select the set of generated images responsive to determining the set of generated images satisfy a condition. For example, a condition may be to select a defined number of generated images with the highest image performance scores (e.g., image performance scores of a specific target audience). The defined number can be included in the request with the first image and/or an identifier of a target audience or may be otherwise stored in memory. The defined number may be any value. The data processing system can compare the image performance scores of the generated images with each other and identify the defined number of generated images with the highest image performance scores based on the comparison. The data processing system can use any criteria to select sets of generated images.

At operation 2218, the data processing system can transmit the set of generated images (e.g., a set of generated images having a size of 1-N). The data processing system can transmit the set of generated images (to the computing device that transmitted the request with the first image). In cases in which the data processing system retrieves the first image from a web page, the data processing system can transmit the set of images to a computing device hosting the web page (e.g., using the domain name of the web page or the internet protocol (IP) address of the web page), in some cases with instructions to replace the image with the set of images. In some embodiments, the data processing system can provision code to the server hosting the web page that the server can store in an application (e.g., a browser) that is configured to change the web page. The data processing system can transmit the set of images to the code and the code can automatically replace the image on the web page with the set of images. In some embodiments, the data processing system can replace the first image in a database (e.g., a remote database or a local database) with the set of images.

Figure 23:
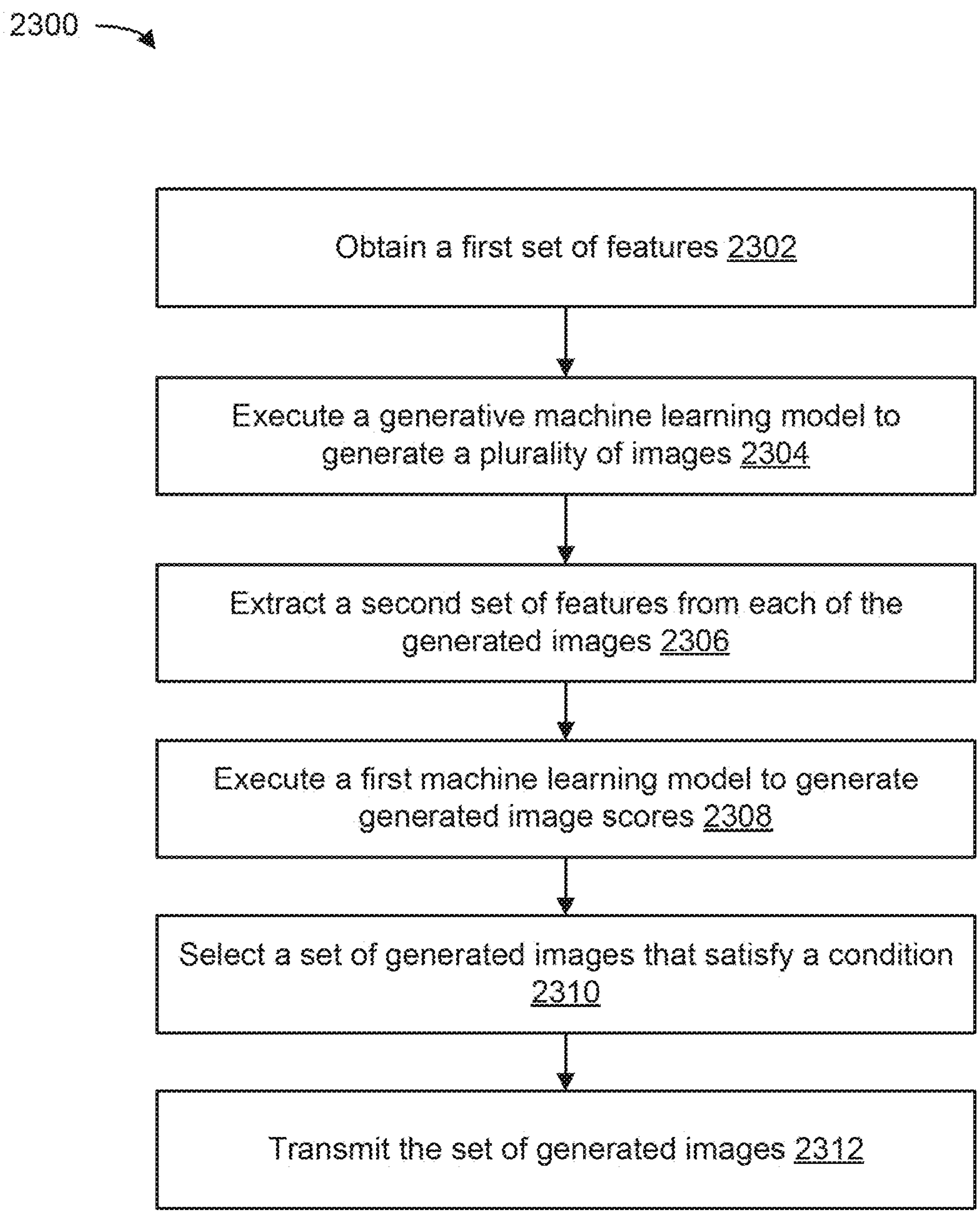
FIG. 23 is a flow diagram illustrating a method for automatic image generation based on image scoring in accordance with an illustrative embodiment.

FIG. 23 is a flow diagram illustrating a method 2300 for automatic image generation based on image scoring in accordance with an illustrative embodiment. In some implementations, the method 2300 can be performed by a data processing system such as any of the components of the system 1000 shown in FIG. 10 or the image adjustment system 2102. The method 2300 may include more or fewer operations and the operations may be performed in any order. Operations of the method 2300 may be similar to or the same as operations of the method 2200. Performance of the method 2300 may enable the data processing system to use a sequence of machine learning models and rules to adjust images that the data processing system receives to improve the performance of the images with users that may view the images on an online medium without filtering out images that are already high scoring.

At operation 2302, the data processing system obtains a first set of features. The first set of features can be features of a first image. The data processing system can receive the first set of features by extracting the first set of features from the first image using a feature extraction machine learning model or by receiving the first set of receiving as input from a user interface or from another computing device.

At operation 2304, the data processing system executes a generative machine learning model. The data processing system can iteratively execute the generative machine learning model to generate one or more generated images. In doing so, the data processing system can use the first set of features or the first image as input, in some cases with other instructions or input. At operation 2306, the data processing system extracts a second set of features from each of the generated images. At operation 2308, the data processing system executes a first machine learning model to generate image performance scores (e.g., generated image performance scores) for the generated images. At operation 2310, the data processing system selects a set of generated images that satisfy a condition. At operation 2312, the data processing system transmits the selected set of generated images to a computing device. The data processing system can perform the operations 2304-2312 in the same or a similar manner to the manner described with respect to the operations 2212-2218. The data processing system can perform the operations 2304-2312 to generate new images based on an original image without first evaluating the first image to determine whether to replace the first image or if the first image has a low image performance score. By doing so, the data processing system can reduce the processing requirements of improving images.

Figure 24:
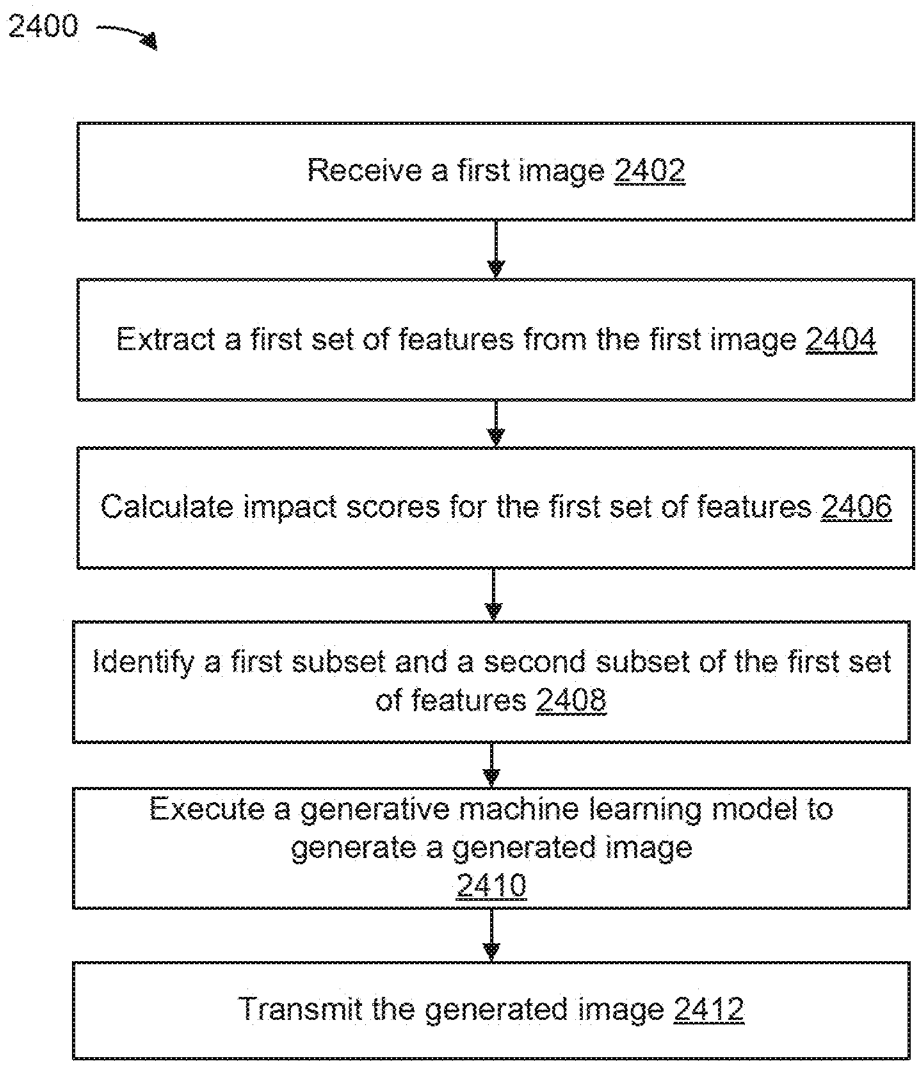
FIG. 24 is a flow diagram illustrating a method for automatic image generation based on image scoring in accordance with an illustrative embodiment.

FIG. 24 is a flow diagram illustrating a method 2400 for automatic image generation based on image scoring in accordance with an illustrative embodiment. In some implementations, the method 2400 can be performed by a data processing system such as any of the components of the system 1000 shown in FIG. 10 or the image adjustment system 2102. The method 2400 may include more or fewer operations and the operations may be performed in any order. Performance of the method 2400 may enable the data processing system to adjust features of an image to improve the image using a series of machine learning models.

At operation 2402, the data processing system receives a first image. At operation 2404, the data processing system extracts a first set of features from the first image. The data processing system can perform the operations 2402 and 2404 in the same or a similar manner to the manner described with respect to the operations 2202 and 2204.

At operation 2406, the data processing system calculates impact scores for the first set of features. Impact scores can indicate an impact a feature has on an image performance score generated for an image. The data processing system can calculate separate impact scores for different individual features of the first set of features.

To calculate the impact scores for the first set of features, the data processing system may execute a machine learning model to generate an image performance score (e.g., a first image performance score) for the first image. The image performance score may indicate a likelihood that a user (e.g., a member of a target audience) will interact with the image. The machine learning model may be a neural network that contains an input layer, a plurality of intermediate layers subsequent to the input layer, and a regression layer or a classification layer subsequent to the plurality of intermediate layers. The data processing system can extract one or more values from one or more signals between an intermediate layer of the plurality of intermediate layers and the regression layer or the classification layer. The neural network may have generated the one or more values during execution to generate the first image performance score for the first image. The data processing system can calculate impact scores for the individual features using back-propagation techniques on the extracted values from the neural network.

At operation 2408, the data processing system identifies a first subset of features and a second subset of features from the first set of features. The first subset of features can be or only include features with high impact scores. The second subset of features can be or only include features with low impact scores. The data processing system can identify or generate the first subset of features by comparing positive impact scores of the first set of features with a threshold (e.g., positive threshold). The data processing system can include any feature in the first subset of features that corresponds with a positive impact score that exceeds the threshold. The data processing system can identify or generate the second subset of features by comparing negative impact scores of the first set of features with a threshold (e.g., negative threshold). The data processing system can include any feature in the second subset of features that corresponds with a negative impact score that is less than the threshold or that has an absolute value that exceeds the threshold. The data processing system can identify a third subset of features as features that correspond with impact scores that do not satisfy either threshold. In some embodiments, the data processing system can identify only the first subset of features or only the second subset of features. In such embodiments, the remaining features may be included in the third subset of features. The data processing system may do so based on a user input indicating which subset to identify.

The thresholds can be any value and can vary between each other. In some cases, the thresholds can vary based on a user input or as received in a request (e.g., the request with the first image). For example, a user may wish to prioritize improving the first image by increasing the prominence of positive features with little change to the low performing features. Accordingly, the user may include a lower threshold (e.g., an absolute value of the threshold) for the first subset of features than for the second subset of features to cause more features to be in the first subset of features. Users can adjust or indicate the thresholds in any way.

At operation 2410, the data processing system executes a generative machine learning model. The data processing system can execute the generative machine learning model using the first set of features as input in a prompt. In the input, the data processing system can indicate features that were identified as being in the first, second, and/or third subsets of features. The data processing system can include instructions in the input to increase the prominence of the first subset of features (if identified) and decrease the prominence of the second subset of features (if identified). The data processing system can indicate not to change any features of the third subset of features. The generative machine learning model can receive the instructions and execute to generate a generated image according to the instructions (e.g., generate a generated image with the first set of features with a prominence of the first subset of features increase and a prominence of the second subset of features decreased). The data processing system can iteratively execute to generate any number of generated images based on the instructions.

At operation 2412, the data processing system transmits the generated image or set of images. The data processing system can transmit the generated image in a similar manner to the manner described with reference to the operation 2312, in some cases after scoring the images and selecting a subset of the generated images to transmit, as described herein.

Figure 25:
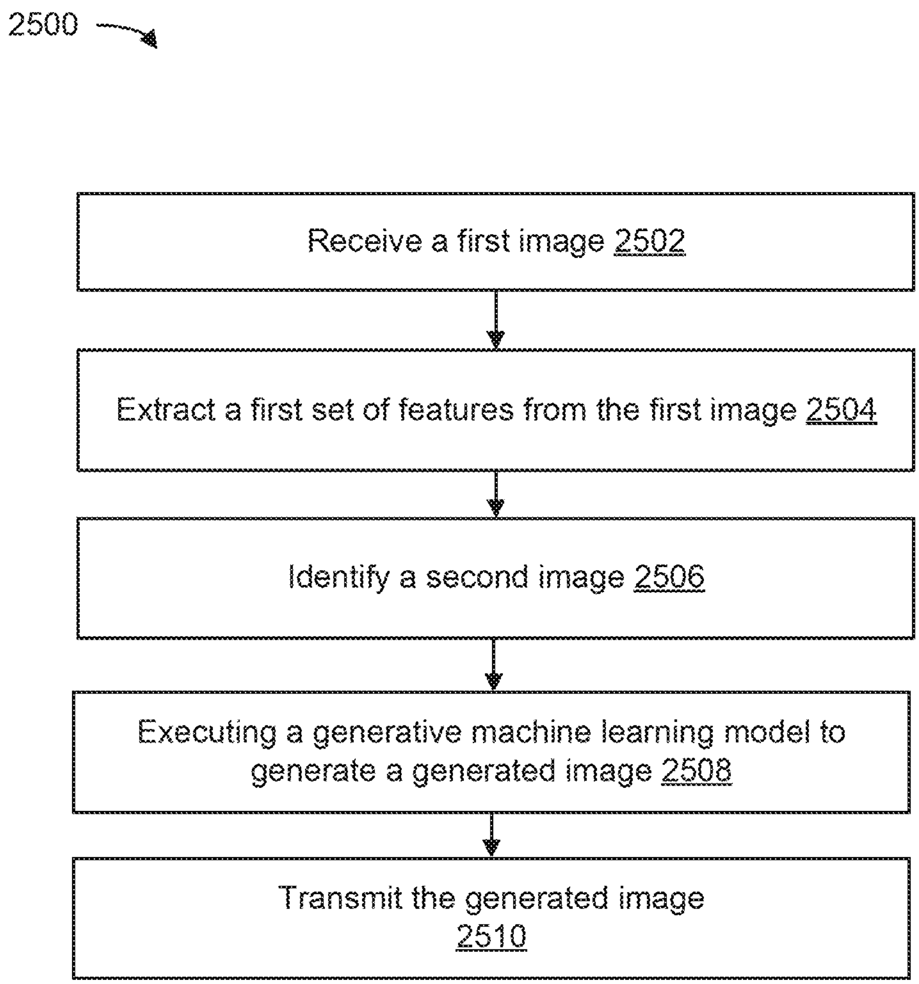
FIG. 25 is a flow diagram illustrating a method for automatic image generation based on image scoring in accordance with an illustrative embodiment.

FIG. 25 is a flow diagram illustrating a method 2500 for automatic image generation based on image scoring in accordance with an illustrative embodiment. In some implementations, the method 2500 can be performed by a data processing system such as any of the components of the system 1000 shown in FIG. 10 or the image adjustment system 2102. The method 2500 may include more or fewer operations and the operations may be performed in any order. Performance of the method 2500 may enable the data processing system to improve images to be similar to model images using a series of machine learning models.

At operation 2502, the data processing system receives a first image. At operation 2504, the data processing system extracts a first set of features from the first image. The data processing system can perform the operations 2502 and 2504 in the same or a similar manner to the manner described with respect to the operations 2202 and 2204.

At operation 2506, the data processing system identifies a second image. The data processing system can identify the second image from memory (e.g., from a database containing multiple images). The data processing system can identify the second image responsive to determining an image performance score of the second image satisfies a criterion. For example, the data processing system can store multiple images in a database. The data processing system can generate image performance scores for the images, such as by executing a machine learning model using the images as input. The data processing system can compare the image performance scores for the stored images with each other. Based on the comparison, the data processing system can identify the highest image performance score and the second image as corresponding to the second image performance score.

In some embodiments, the data processing system can identify the second image as the highest scoring image for a target audience. For example, the data processing system can generate image performance scores for different target audiences for each of the images the data processing has stored in the database. The data processing system can receive an identification of a target audience in a request in which the data processing system receives the first image. The data processing system can identify the second image responsive to determining the second image corresponds to a highest image performance score for the target audience identified in the request.

At operation 2508, the data processing system executes a generative machine learning model. The data processing system can execute the generative machine learning model using the first image and the second image or extracted feature sets of the first image and the second image, as extracted by the data processing system in some cases, as input. The generative machine learning model can generate a generated image that includes the features of the first image but adjusted to be similar to the features of the second image.

In some embodiments, the data processing system can include a change value in the input to the generative machine learning model. The change value can indicate a magnitude to change the first image. The data processing system can receive the change value in the request that includes the first image or retrieve the change value from memory. The data processing system can include the change value in the input with the first image and the second image or the feature sets of the first image and the second image. The generative machine learning model can receive the inputs and generate a generated image comprising the first set of features of the first image adjusted to be similar to the second set of features of the second image according to the change value. The data processing system can include any instructions in the input to the generative machine learning model. Accordingly, the user can control a level of changing the first image to be more like the second image. The data processing system can generate any number of images based on the input by iteratively executing based on the input.

At operation 2510, the data processing system transmits the generated image. The data processing system can transmit the generated image in a similar manner to the manner described with reference to the operation 2312, in some cases after scoring the images and selecting a subset of the generated images to transmit, as described herein.

Figure 26:
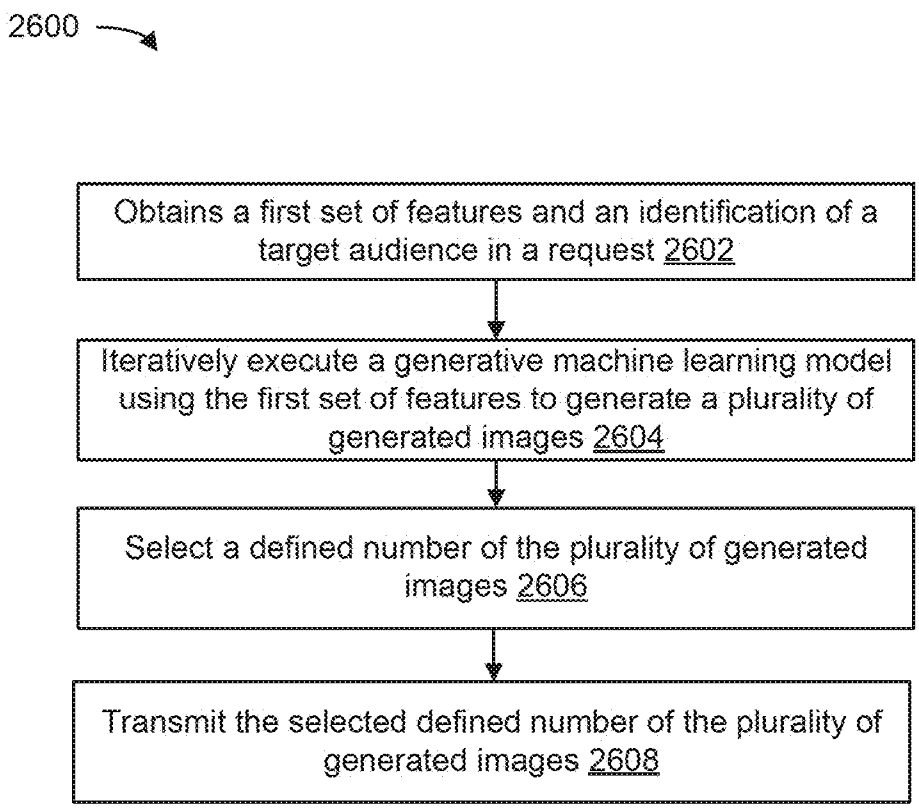
FIG. 26 is a flow diagram illustrating a method for automatic image generation based on image scoring in accordance with an illustrative embodiment.

FIG. 26 is a flow diagram illustrating a method 2600 for automatic image generation based on image scoring in accordance with an illustrative embodiment. In some implementations, the method 2600 can be performed by a data processing system, such as any of the components of the system 1000 shown in FIG. 10 or the image adjustment system 2102. The method 2600 may include more or fewer operations and the operations may be performed in any order. Performance of the method 2600 may enable the data processing system to generate high scoring images that correspond to user requests.

At operation 2602, the data processing system obtains a first set of features. The first set of features can be features (e.g., visual features) to include in a generated image or multiple generated images. The data processing system can receive the first set of features by extracting the first set of features from an image using a feature extraction machine learning model or by receiving the first set of features as input from a user interface or from another computing device (e.g., in a request for a high scoring image from a user). The data processing system can receive the first set of features in a text string (e.g., a prompt) input (e.g., a user input or an input from another computing device) into a computing device.

The data processing system can receive the first set of features in a message originating from another computing device. The message can include the first set of features and/or types of data. For example, the data message can include an identification of a product (e.g., a basketball, a coffee, a golf club, etc.) and visual attributes. In another example, the message can include an identification of a target audience. In another example, the message can include a correlation between the target audience and an image performance score (e.g., an increase or indication of a positive or high performing image or a negative or low performing image). For instance, the data processing system may receive the following text string "make me an image of this Acme Co. toothpaste that appeals highly to millennial men," where Acme Co. toothpaste is a product, "appeals highly" is a correlation to a performance score, and millennial men is a target audience. The data processing system can receive any type of data in the message with the first set of features.

At operation 2604, the data processing system executes a generative machine learning model. The generative machine learning model can be a transformer model, a diffusion model, or another type of machine learning model (e.g., a neural network) that has been trained and/or configured to generate images based on prompt inputs. The data processing system can execute the generative machine learning model using the first set of features and/or other data (e.g., the target audience identifier, the identification of the product included in the message, and/or the correlation in the message) to generate an image based on or otherwise to include the first set of features and/or the other data. The data processing system can iteratively execute the generative machine learning model to generate one or more generated images that each include a different variation of the first set of features. For instance, the data processing system can iteratively execute the generative machine learning model using the first set of features as input to generate a plurality of images that each depict a product and a variation in different visual attributes. The generative machine learning model may generate different images based on the same input because, for example, the generative machine learning model may be configured to have a high temperature or a temperature above a threshold (e.g., a defined threshold). In one example, the data processing system can iteratively execute the generative machine learning model to generate a plurality of images that depict the product in different colors, different locations, and/or different sizes between the images. The data processing system can vary any visual attribute between the generated images.

Each of the plurality of generated images may correspond to a different image performance score. For example, after generating the plurality of images, the data processing system can execute an image scoring machine learning model (e.g., a neural network) that is trained and/or configured to generate image performance scores for individual images. The data processing system can train the image scoring machine learning model as described herein, such as based on interaction data of user interactions with training images on web pages and/or based on image performance scores of training images. For example, the data processing system May train the image scoring machine learning model, such as by using back-propagation techniques to adjust the internal parameters and/or weights of the image scoring machine learning model. In some embodiments, the data processing system can execute the image scoring machine learning model using the plurality of images as input to generate image performance scores for each of the plurality of images. In some embodiments, the data processing system may extract a set of features (e.g., a second set of features) from each of the plurality of images and input the sets of features into the image scoring machine learning model to generate image performance scores for the generated images.

In some embodiments, the data processing system may generate performance scores for a particular target audience. For example, the data processing system can store (e.g., in memory) a plurality of image scoring machine learning models that are each trained and/or configured to generate a performance score for a particular target audience (e.g., to simulate the target audience). Each image scoring machine learning model can have a stored association with an identifier or identification of the target audience for which the data processing system has been trained to generate performance scores. The data processing system can receive an identification of a target audience, such as with the first set of features. The data processing system can identify the identification of the target audience and retrieve an image scoring machine learning model from memory that has a stored association with a matching identification of the target audience. The data processing system can use the retrieved image scoring machine learning model that corresponds to the target audience to generate an image performance score for each of the plurality of generated images.

In some embodiments, the generative machine learning model itself may be trained to generate image performance scores of images that the generative machine learning model generates. For example, the data processing system can train the generative machine learning model to generate performance scores based on interaction data of user interactions with training images on one or more web pages similar to the training of machine learning models as described herein and/or based on training image performance scores of training images. The data processing system can train the generative machine learning model using back-propagation techniques based on differences between generated image performance scores compared with ground truth values indicating expected image performance scores for images and/or by feeding the interaction data for individual training images into the generative machine learning model. The data processing system can execute the generative machine learning model multiple times to generate different images based on the same input (e.g., the first set of features) to generate images with different variations of the first set of features. With each generated image the generative machine learning model may generate an image performance score for the generated image.

In some embodiments, the data processing system may use a generative machine learning model that has been trained to generate image performance scores for a particular target audience to generate the generated images and/or the image performance scores for the generated images. For example, the data processing system can store (e.g., in memory) a plurality of generative machine learning models that have each been trained and/or configured to generate an image performance score for a different target audience. Each generative machine learning model can have a stored association with an identifier or identification of the target audience for which the generative machine learning model has been trained to generate image performance scores. The data processing system can receive an identification of a target audience, such as with the first set of features. The data processing system can identify the identification of the target audience and retrieve a generative machine learning model from memory that has a stored association with a matching identification of the target audience. The data processing system can use the retrieved generative machine learning model to generate the plurality of images and generate an image performance score for each of the plurality of generated images.

In some embodiments, the data processing system may train the generative machine learning model to generate high scoring images. The data processing system can do so using a supervised learning technique. For example, the data processing system can finetune a generative machine learning model (e.g., a generic generative machine learning model), by 1) keeping the loss functions (e.g., generic loss functions) that enforce the generated images to be realistic and relevant to the prompt (e.g., if a prompt exists), and 2) adding an additional loss function which penalizes the model for generating low-scoring images. After generating an image using the generative machine learning model, the data processing system can execute an image scoring machine learning model (e.g., an image scoring machine learning model that corresponds to a specific target audience) to generate an image performance score for the image. The data processing system can use an additional loss function with the image performance score for the generated image such as to penalize or reward the generative machine model depending on and/or proportional to the image performance score generated for the generated image. For example, the loss function can be the difference between the predicted image performance score for the generated image and an ideal image performance score (e.g., a defined or predetermined image performance score). The data processing system can train the generative machine learning model in this way using different generated images over time, in some cases enabling the generative machine learning model to not only generate images that are realistic and correspond to the prompt, but that also correspond to higher image performance scores. The data processing system may train and use different generative machine learning models for specific target audiences to optimize performance for the specific target audiences and/or train the same generative machine learning model to generate high scoring images for different target audiences based on the identifiers of the target audiences in the prompts.

At operation 2606, the data processing system can select a set of generated images. The data processing system can select the set of generated images based on image performance scores that are generated for the generated images. For example, the data processing system can compare the image performance scores for the generated images between each other. The data processing system can identify a defined or predetermined number of the generated images (e.g., based on the number being included in the initial request or based on a configuration of the data processing system). The data processing system can identify the defined or predetermined number of the generated images that correspond with the highest image performance scores of the generated images to select the set of generated images. At operation 2608, the data processing system can transmit the selected defined number of the plurality of generated images to the computing device (e.g., the computing device that initially transmitted the request). In this way, the data processing system can integrate a multi-model machine learning architecture to improve generative artificial intelligence image generation, thus reducing the number of executions by a generative machine learning model that is implemented without using the systems and methods described herein to generate a desirable image.

Figure 27:
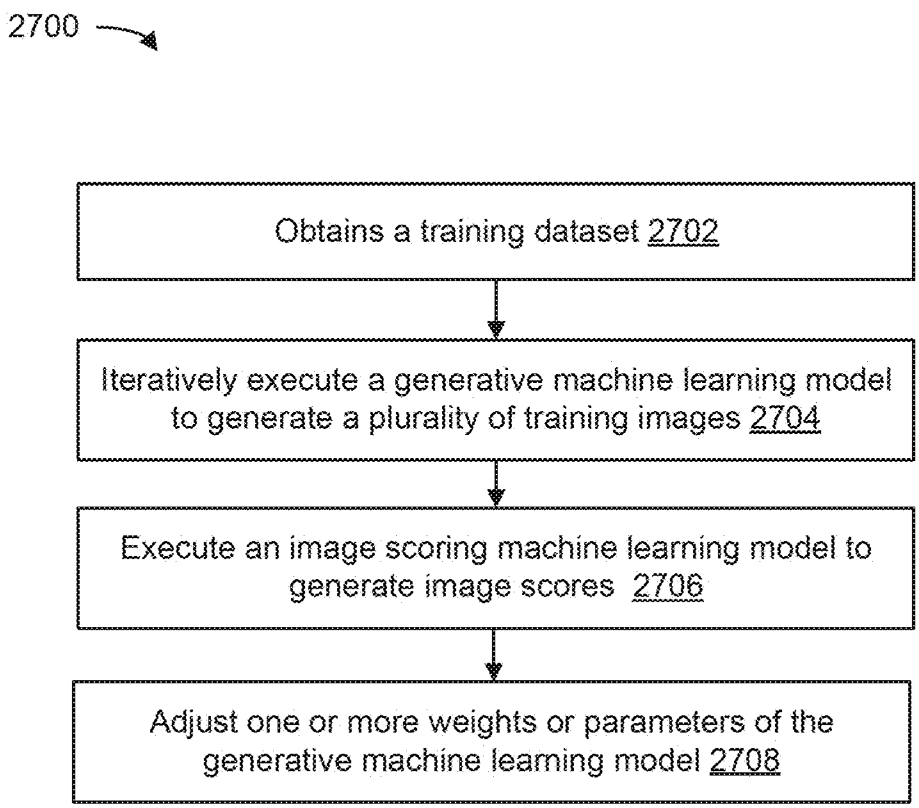
FIG. 27 is a flow diagram illustrating a method for training a generative machine learning model for automatic image generation based on image scoring in accordance with an illustrative embodiment.

FIG. 27 is a flow diagram illustrating a method for training a generative machine learning model for automatic image generation based on image scoring in accordance with an illustrative embodiment. In some implementations, the method 2700 can be performed by a data processing system, such as any of the components of the system 1000 shown in FIG. 10 or the image adjustment system 2102. The method 2700 may include more or fewer operations and the operations may be performed in any order. Performance of the method 2700 may enable the data processing system to train a generative machine learning model to generate high scoring images that correspond to user requests.

At operation 2702, the data processing system obtains a training dataset. The training dataset can include one or more sets of features. Each set of features can be a list of features (e.g., visual features or attributes of an image, such as color, objects to include in an image, scenery, etc., as described herein). The sets of features can each have a format as a string and/or be in list form. The individual sets of features can be features (e.g., visual features) to include in a generated image or multiple generated images. The data processing system can receive the sets of features by extracting the sets of features from different images using a feature extraction machine learning model or by receiving the sets of features as input from a user interface or from another computing device. The data processing system can receive the set of features in text string (e.g., a prompt) inputs (e.g., a user input or an input from another computing device) into a computing device.

At operation 2704, the data processing system executes a generative machine learning model. The generative machine learning model can be a transformer model, a diffusion model, or another type of machine learning model (e.g., a neural network) that has been trained and/or configured to generate images based on prompt inputs. The data processing system can iteratively execute the generative machine learning model using a different set of features of sets of features as input for each execution to generate images (e.g., training images or a plurality of training images) based on or otherwise to include the respective input sets of features. For instance, the data processing system can iteratively execute the generative machine learning model using one set of features as input to generate a first training image and using another set of features as input to generate a second training image.

At operation 2706, the data processing system executes an image scoring machine learning model to generate image scores for the generated training images. For example, after generating the plurality of images, the data processing system can execute an image scoring machine learning model (e.g., a neural network) that is trained and/or configured to generate image scores for individual images. The data processing system can train the image scoring machine learning model as described herein, such as based on interaction data of user interactions with training images on web pages and/or based on image scores of training images. For example, the data processing system may train the image scoring machine learning model, such as by using back-propagation techniques to adjust the internal parameters and/or weights of the image scoring machine learning model. In some embodiments, the data processing system can execute the image scoring machine learning model using the plurality of images as input to generate image scores for each of the plurality of images. In some embodiments, the data processing system may extract a set of features (e.g., a second set of features) from each of the plurality of images and input the sets of features into the image scoring machine learning model to generate image scores for the generated images.

In some embodiments, the data processing system can generate image scores (e.g., image scores) for a particular target audience. For example, the data processing system can store (e.g., in memory) a plurality of image scoring machine learning models that are each trained and/or configured to generate a performance score for a particular target audience (e.g., to simulate the target audience). Each image scoring machine learning model can have a stored association with an identifier or identification of the target audience for which the data processing system has been trained to generate image scores. The data processing system can receive an identification of a target audience, such as with the training dataset. The data processing system can identify the identification of the target audience and retrieve an image scoring machine learning model from memory that has a stored association with a matching identification of the target audience. The data processing system can use the retrieved image scoring machine learning model that corresponds to the target audience to generate an image score for each of the plurality of generated images.

At operation 2708, the data processing system adjusts one or more weights and/or parameters of the generative machine learning model (e.g., the data processing system can train the generative machine learning model). The data processing system can adjust the one or more weights and/or parameters of the generative machine learning model for each of the training images that the generative machine learning model generates based on the training dataset. The data processing system can do so based on the image scores that the image scoring machine learning model generated for the respective images. For example, the data processing system can use the image scores that the data processing system generated for generated images as labels and use back-propagation techniques with the image scores and the respective images to train the generative machine learning model. In doing so, the data processing system can adjust the weights and/or parameters of the generative machine learning model to be more likely to generate high scoring images (e.g., generated training images with image scores exceeding a threshold (e.g., 50)) and/or less likely to generate low scoring images (e.g., generated training images with image scores less than a threshold (e.g., 50)), such as in response to requests for an image or a defined number of images that include a correlation to an image score.

The data processing system can adjust the weights and/or parameters of the generative machine learning model proportional to the image scores for the respective images. For example, the data processing system can change the weights and/or parameters of the generative machine learning model based on an image by a magnitude proportional to a difference between the image score for the image and a threshold (e.g., 50). For instance, the data processing system can make substantial changes to the weights and/or parameters of the generative machine learning model for an extremely low scoring image (e.g., a score between 1 and 5) while making smaller changes for image that scores more in the middle (e.g., around 50). The data processing system can similarly adjust the weights and/or parameters of the generative machine learning model over time to improve the images that the generative machine learning model generates.

In training the generative machine learning model, the data processing system can use two different loss functions. The first loss function can be configured to train the generative machine learning model to generate high scoring images as described above. The second loss function can be configured to train the generative machine learning model to accurately generate images that include input features. For example, instead of or in addition to training the generative machine learning model based on image scores generated for the images, the data processing system can determine a difference between the generated images and the features based on which the generative machine learning model generated the images (e.g., determine a number, percentage, and/or portion of the input features that are included in the respectively generated images). The data processing system can use the second loss function to adjust the weights and/or parameters of the generative machine learning model (e.g., the same and/or different weights and/or parameters that the data processing system adjusts when training the generative machine learning model based on the first loss function). The data processing system can adjust the generative machine learning model in two rounds based on the two loss functions for each training image that the data processing system generates and/or only use one loss function (e.g., one loss function for one subset of training images and a different loss function for another subset of training images, the subsets may be determined by the data processing system as set intervals of training images, in a defined sequence, and/or pseudo-randomly) for individual training images. In doing so, the data processing system can train the generative machine learning model to generate high scoring and accurate images based on input prompts.

In some embodiments, the data processing system can train the generative machine learning model to generate high scoring images for a specific target audience and/or for different target audiences. For example, the data processing system can train the generative machine learning model to only generate images that are high scoring for a specific target audience. To do so, the data processing system can retrieve an image scoring machine learning model that corresponds to the target audience (e.g., based on a target audience identifier that the data processing system receives with the training dataset) and train the generative machine learning model based only on image scores generated by the retrieved image scoring machine learning model. The data processing system can train multiple generative machine learning models in this way for different target audiences such that the data processing system generates or trains individual generative machine learning models that can each generate high scoring images for a different specific target audience. The data processing system can store the generative machine learning models with identifiers of the target audiences to which the generative machine learning models correspond. The data processing system can retrieve one of the generative machine learning models in response to a request for one image, multiple images, or a defined number of images (e.g., as indicated in a message request for an image or high scoring image) that contains a target audience identifier matching the target audience for which the generative machine learning model was trained to generate high scoring images.

In one example, the data processing system can receive a request comprising a string "generate a high scoring image of a t-shirt for people who like sports." The data processing system can identify "people who like sports" as the target audience and identify "t-shirt" as a feature. The data processing system can retrieve a generative machine learning model that corresponds to an identifier for the target audience of "people who like sports" and input "t-shirt" into the retrieved generative machine learning model. The data processing system can execute the retrieved generative machine learning model to cause the retrieved generative machine learning model to generate one or a defined number of images that would be appealing to an audience of people who like sports and that each include a t-shirt in some form (e.g., in some color, some shape, some size, etc.). The data processing system can train and use any number of generative machine learning models in this way.

In another example, the data processing system can train a single generative machine learning model to generate high scoring images for multiple target audiences. For instance, the training dataset can include sets of features and target audience identifiers for the individual sets of features. The data processing system can generate images based on the sets of features and the respective target audiences. The data processing system can generate scores for the generated images for the target audiences corresponding to the identifiers input with the sets of features based on which the data processing system generated the images. The data processing system can generate the scores using image scoring machine learning models that correspond to the respective target audiences. The data processing system can train the generative machine learning models using the generated scores as described herein. Accordingly, when the data processing system receives a request that includes an identifier of a target audience, the data processing system can generate a high scoring image for the target audience.

For instance, in a similar example to the above, the data processing system can receive a request comprising a string "generate a high scoring image of a t-shirt for people who like sports." The data processing system can input the string into a generative machine learning model trained to generate high scoring images for different target audiences. The data processing system can execute the generative machine learning model to cause the generative machine learning model to generate one or a defined number of images that would be appealing to an audience of people who like sports and that include a t-shirt. The data processing system can train and use the generative machine learning model to generate high scoring images for any number of target audiences.

Figure 28:
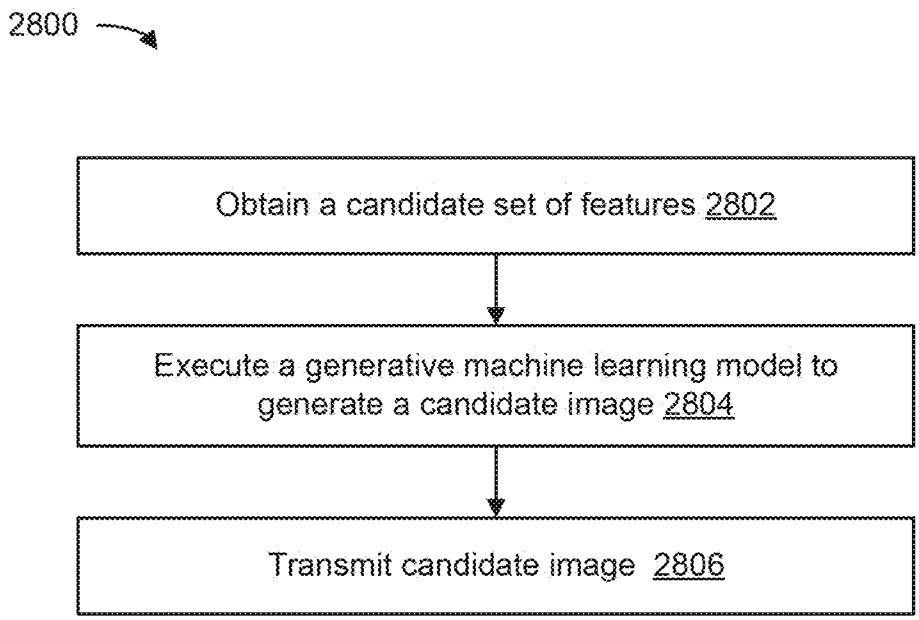
FIG. 28 is a flow diagram illustrating a method for automatic image generation based on image scoring in accordance with an illustrative embodiment.
Figure 29:
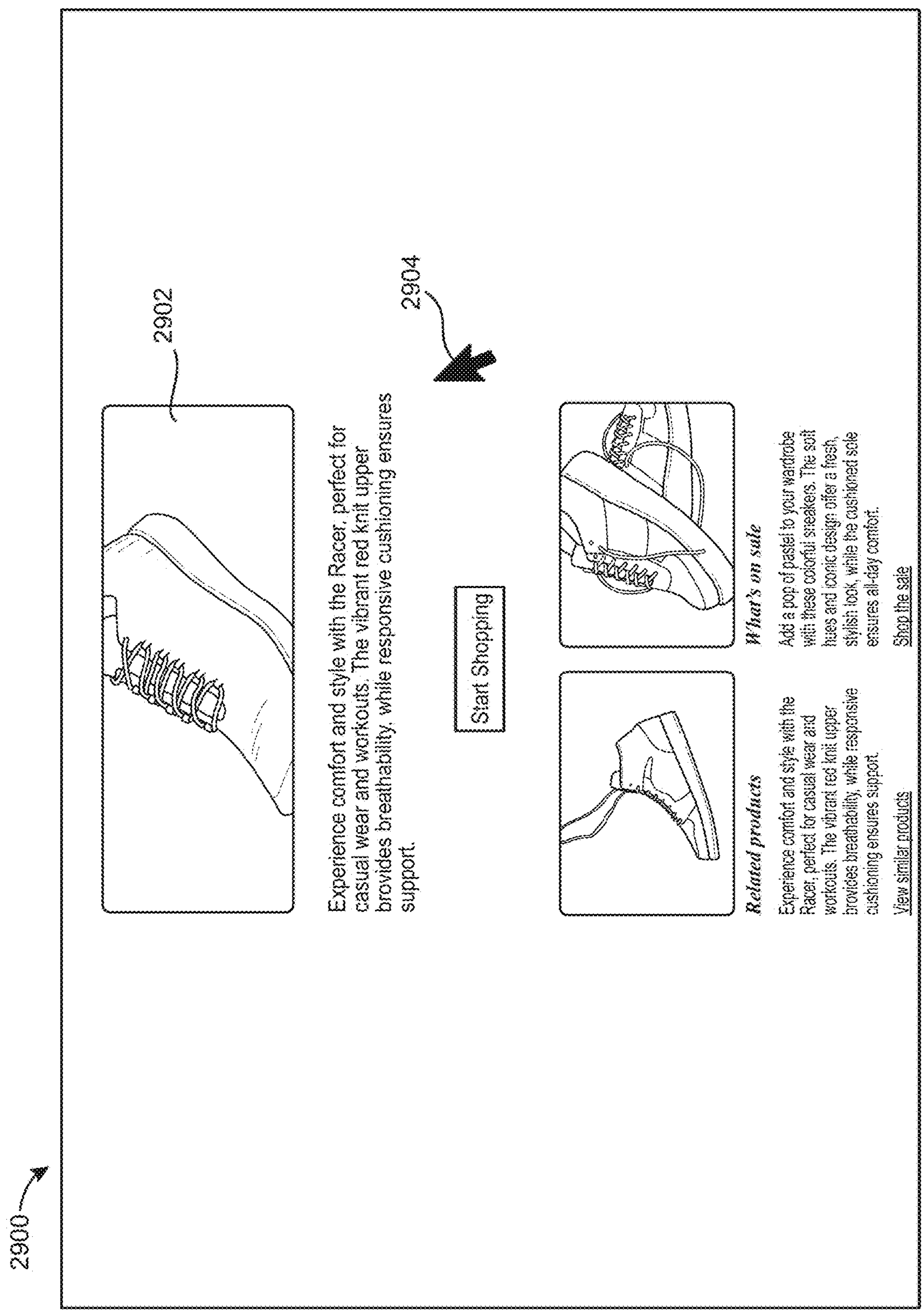
FIG. 29 is an example user interface in accordance with an illustrative embodiment.
Figure 30:
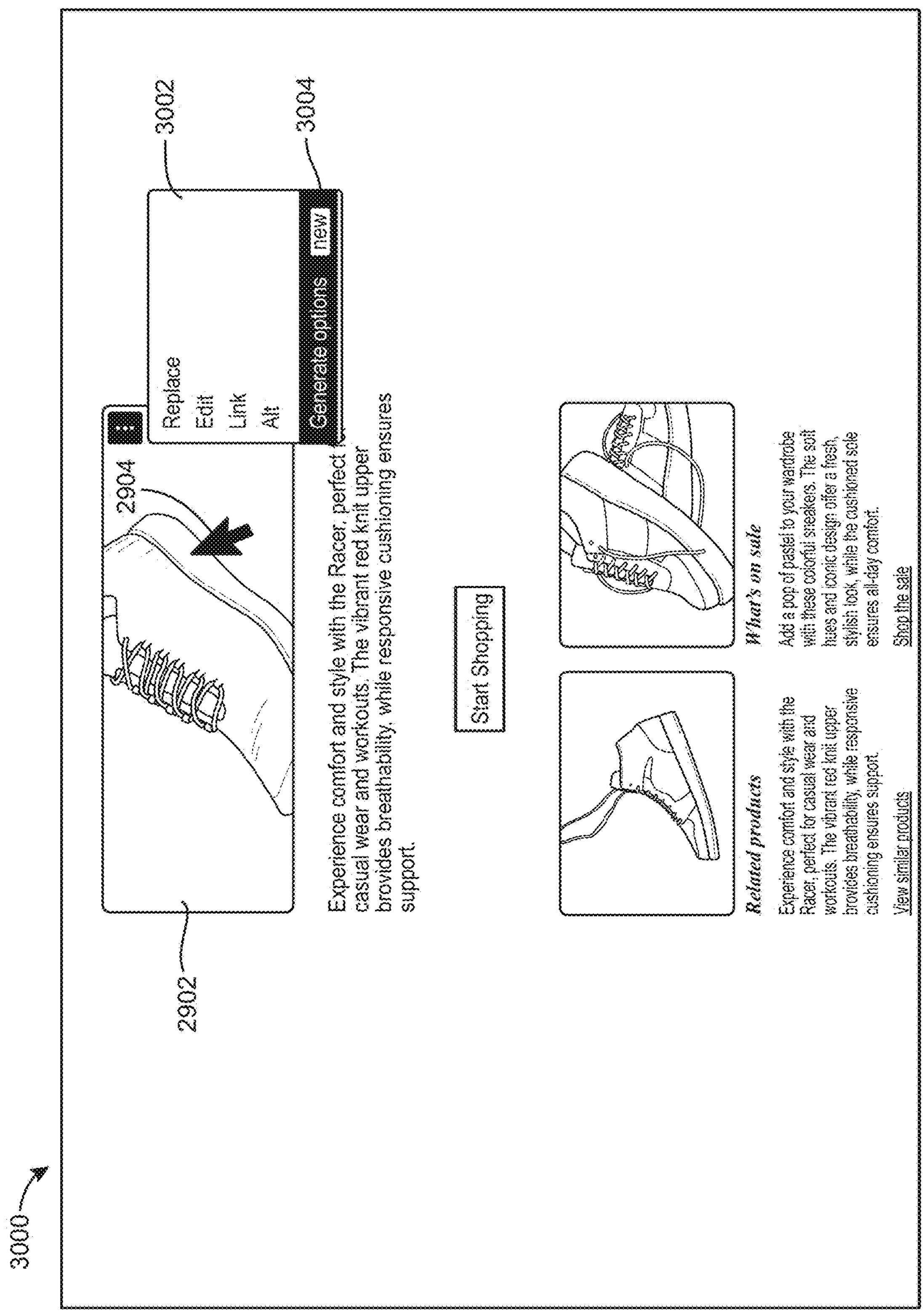
FIG. 30 is an example user interface in accordance with an illustrative embodiment.
Figure 31:
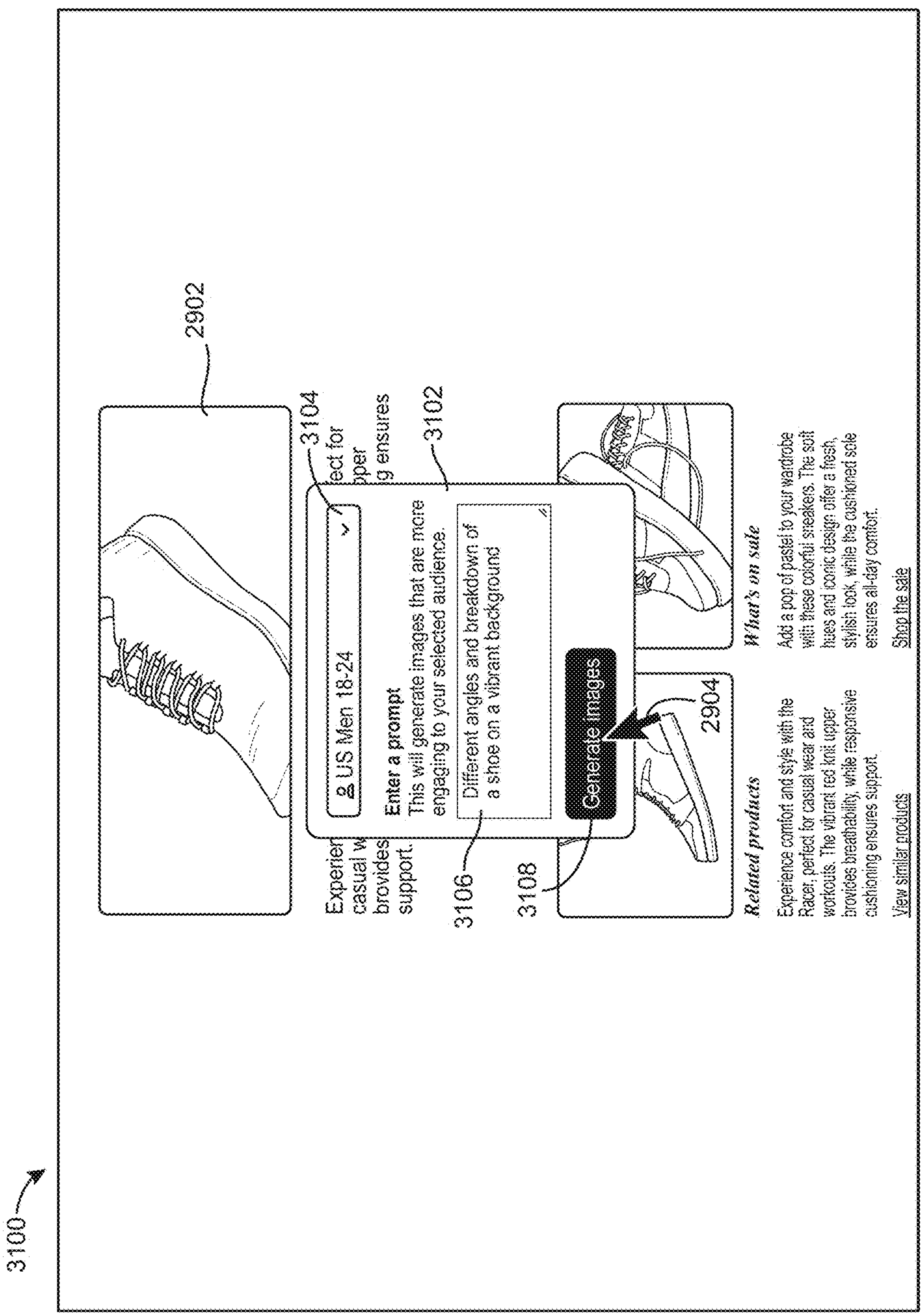
FIG. 31 is an example user interface in accordance with an illustrative embodiment.
Figure 32:
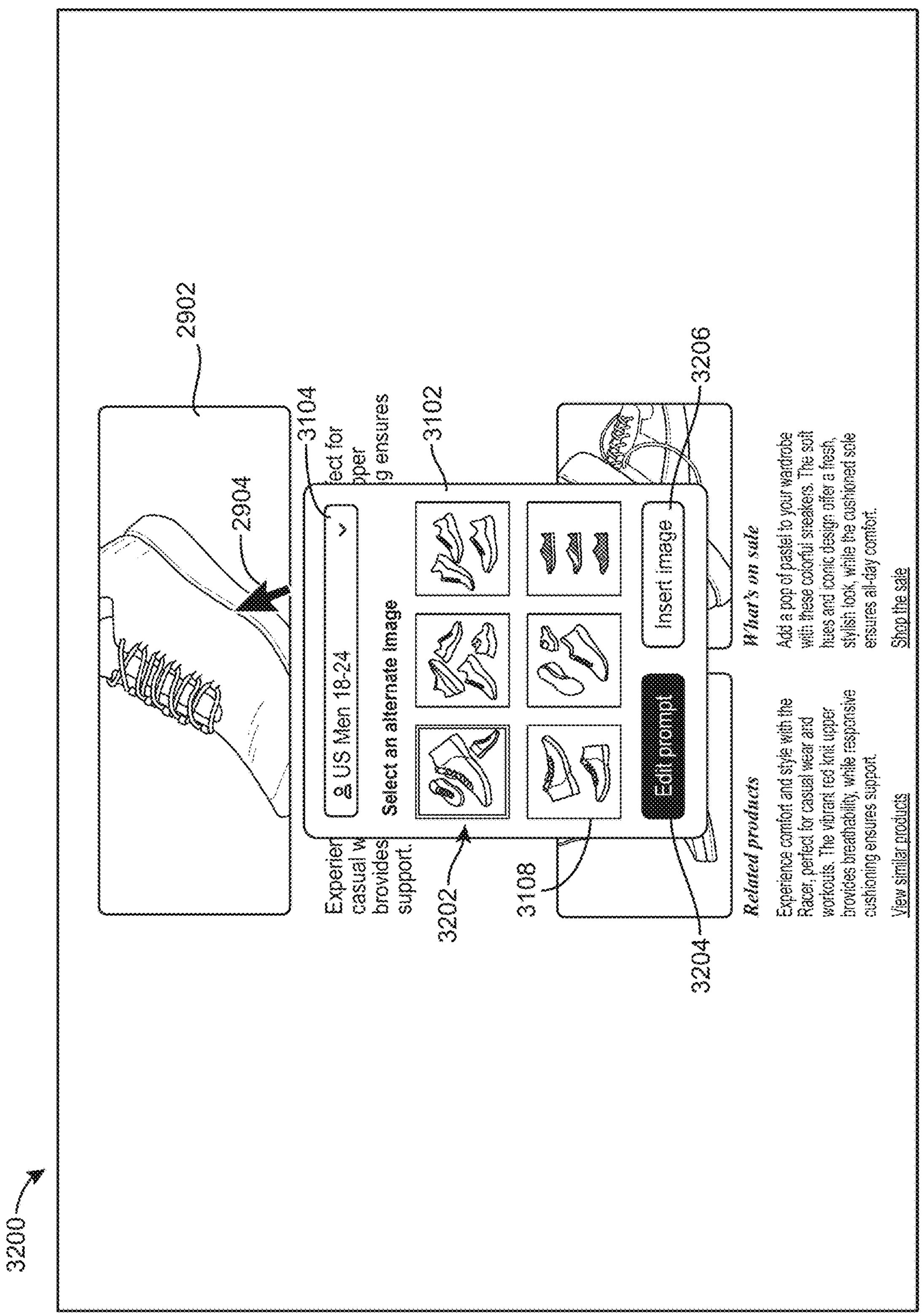
FIG. 32 is an example user interface in accordance with an illustrative embodiment.

FIG. 28 is a flow diagram illustrating a method for automatic image generation based on image scoring in accordance with an illustrative embodiment. In some implementations, the method 2800 can be performed by a data processing system, such as any of the components of the system 1000 shown in FIG. 10 or the image adjustment system 2102. The method 2800 may include more or fewer operations and the operations may be performed in any order. The data processing system can perform the method 2800 after performing the method 2700. Performance of the method 2800 may enable the data processing system to generate high scoring images that correspond to user requests.

At operation 2802, the data processing system can obtain or receive a candidate set of features. The candidate set of features can be a list of features (e.g., visual features or attributes of an image, such as color, objects to include in an image, scenery, etc., as described herein). The candidate set of features can have a format as a string and/or be in list form. The candidate set of features can be features (e.g., visual features) to include in a generated image or multiple generated images. The data processing system can receive the candidate set of features by extracting the sets of features from an image using a feature extraction machine learning model or by receiving the candidate set of features as input from a user interface or from another computing device. The data processing system can receive the set of features in text string (e.g., a prompt) inputs (e.g., a user input or an input from another computing device) into a computing device.

At operation 2804, the data processing system executes a generative machine learning model. The generative machine learning model can be a transformer model, a diffusion model, or another type of machine learning model (e.g., a neural network) that has been trained and/or configured to generate images based on prompt inputs. The generative machine learning model may have been trained as described herein (e.g., using the methods described with reference to FIG. 27). The data processing system can iteratively execute the generative machine learning model using the set of features as input to generate one or more candidate images based on or otherwise to include the respective input set of features. The generative machine learning model may generate different images based on the same input because, for example, the generative machine learning model may be configured to have a high temperature or a temperature above a threshold (e.g., a defined threshold). In one example, the data processing system can iteratively execute the generative machine learning model to generate a plurality of images that depict the product in different colors, different locations, and/or different sizes between the images. The data processing system can vary any visual attribute between the generated images. Because the generative machine learning model may have been trained to generate high scoring images as described with reference to FIG. 27, the candidate images that the generative machine learning model generates may be higher scoring than images generated by any other generative machine learning model.

At operation 2806, the data processing system transmits the candidate image or candidate images. The data processing system can transmit the candidate image or candidate images that the data processing system generated through the generative machine learning model. The data processing system can transmit the candidate image or candidate images to the computing device that transmitted the message containing the candidate set of features based on which the data processing system generated the candidate image or candidate images. The computing device can receive the candidate image or candidate images and present the received candidate image or candidate images on a user interface.

Any operation of the methods 2200-2800 may be performed during or as operations of other operations of the methods 2200-2800.

FIGS. 29-32 include example user interfaces 2900-3200 in accordance with an illustrative embodiment. The user interfaces 2900-3200 illustrate an example flow of using the systems and methods described herein to generate new images or content items or otherwise adjust or improve upon existing images or content items depicted on a user interface or via an application.

For example, the user interface 2900 may be or include a user interface that includes an image 2902 and a cursor 2904. The user interface 2900 can be a user interface of any application, such as an electronic mailing application or browser or a user interface of a webpage or website, for example. A data processing system (e.g., a computing device or computing system, such as any computing device or computing system configured to implement the systems and methods described herein) can present the user interface 2900 on a display of a client computing device or otherwise another computing device. In some cases, the data processing system can be or include software executing on the client computing device. A user can use an input/output device, such as a mouse or a touch screen, to move the cursor 2904 over the image 2902. The user can actuate the input-output device to select the image 2902.

Responsive to receiving the selection of the image 2902, the data processing system can update the user interface 2900 to present the user interface 3000 on the display of the client device. The user interface 3000 can include a list 3002 of options for adjusting the image 2902, such as to replace, edit link, or alter the image. The list 3002 can also include an option 3004 to generate a new image. The user can use the cursor 2904 to select the option 3004 to cause the data processing system to generate one or more new images using the systems and methods described herein. In doing so, the data processing system can generate new images that have the same or similar features to the image 2902 but that correspond higher image performance scores than the image 2902.

Responsive to receiving the selection of the option 3004 to generate a new image, the data processing system can update the user interface 3000 to present the user interface 3100 on the display of the client device. The user interface 3100 can include a pop-up 3102 that overlays the user interface 2900 or 3000. The user can provide input into the pop-up 3102 to configure a prompt that the data processing system can use to generate images that correspond to a higher image performance score than the image 2902. The pop-up 3102 can include a drop-down menu 3104, a prompt 3106, and a generate images button 3108. The drop-down menu 3104 can include a list of different target audiences. The user can select a target audience from the drop-down menu 3104 to indicate a target audience lens to use to generate higher scoring images (e.g., generate images that score higher for the selected target audience). The user can provide input into the prompt 3106 to indicate features to include in the generated images. In some cases, the user can include a number of images to generate in the prompt 3106. In some cases, the data processing system can extract (e.g., using a neural network or another feature extraction machine learning model) features from the image 2902 and include all or a defined portion of the extracted features in the prompt 3106. The user can select the generate images button 3108 to cause the data processing system to generate images according to the input prompt 3106 and/or selected target audience as described herein. In doing so, the data processing system can generate a number of images indicated in the prompt 3106 or a number of images that the data processing system is configured to automatically generate responsive to such a selection.

Responsive to receiving the selection, the generate images button 3108, the data processing system can update the user interface 3100 to present the user interface 3200 on the display of the client device. The user interface 3200 can include a set of images 3202 that the data processing system generated using a generative machine learning model. The images 3202 can be higher scoring images than the image 2902 according to an image scoring machine learning model configured to generate image performance scores for the selected target audience. The user can select an edit prompt button 3204 to edit the prompt 3106 and generate a new set of images to replace the set of images 3202, such as if the user is not happy with any of the presented set of images 3202. The user can select one of the set of images 3202 and select an insert image button 3206 to insert the selected image at the location of the image 2902, such as by replacing the image 2902 with the selected image. Thus, the data processing system may operate to improve images presented to a user using the systems and methods described herein via user interfaces such as the user interfaces 2900-3200.

Figure 33:
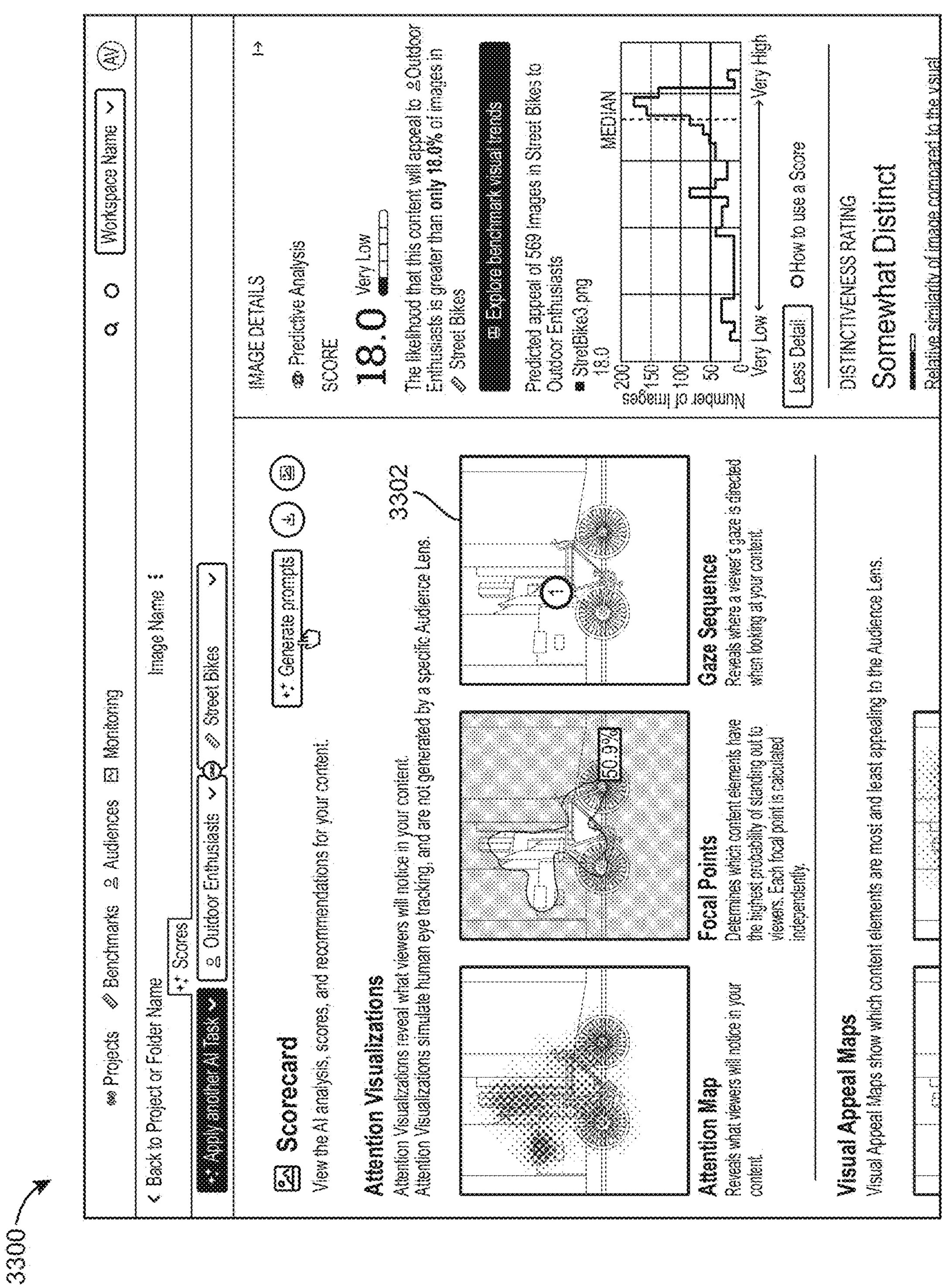
FIG. 33 is an example user interface in accordance with an illustrative embodiment.
Figure 34:
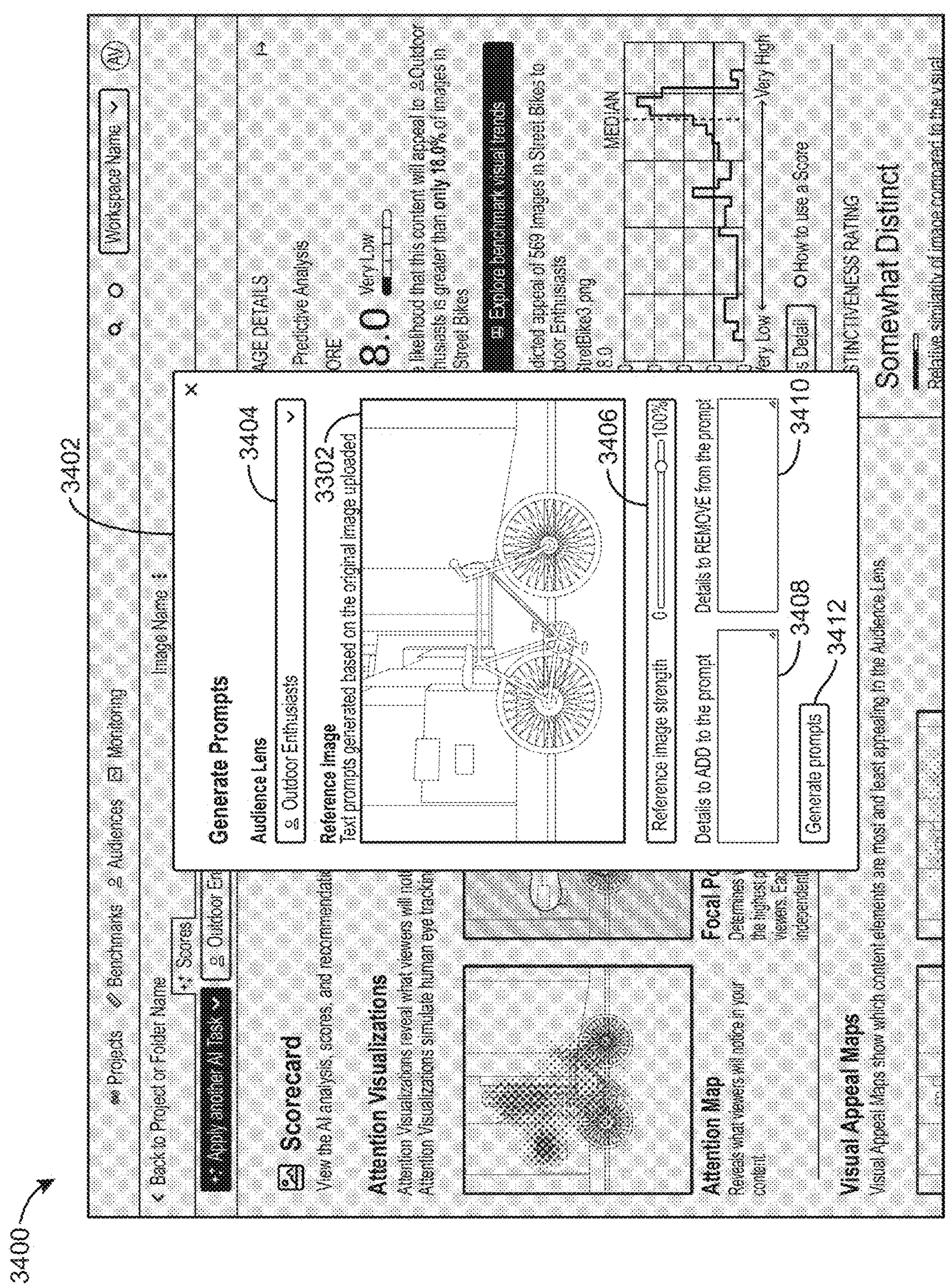
FIG. 34 is an example user interface in accordance with an illustrative embodiment.
Figure 35:
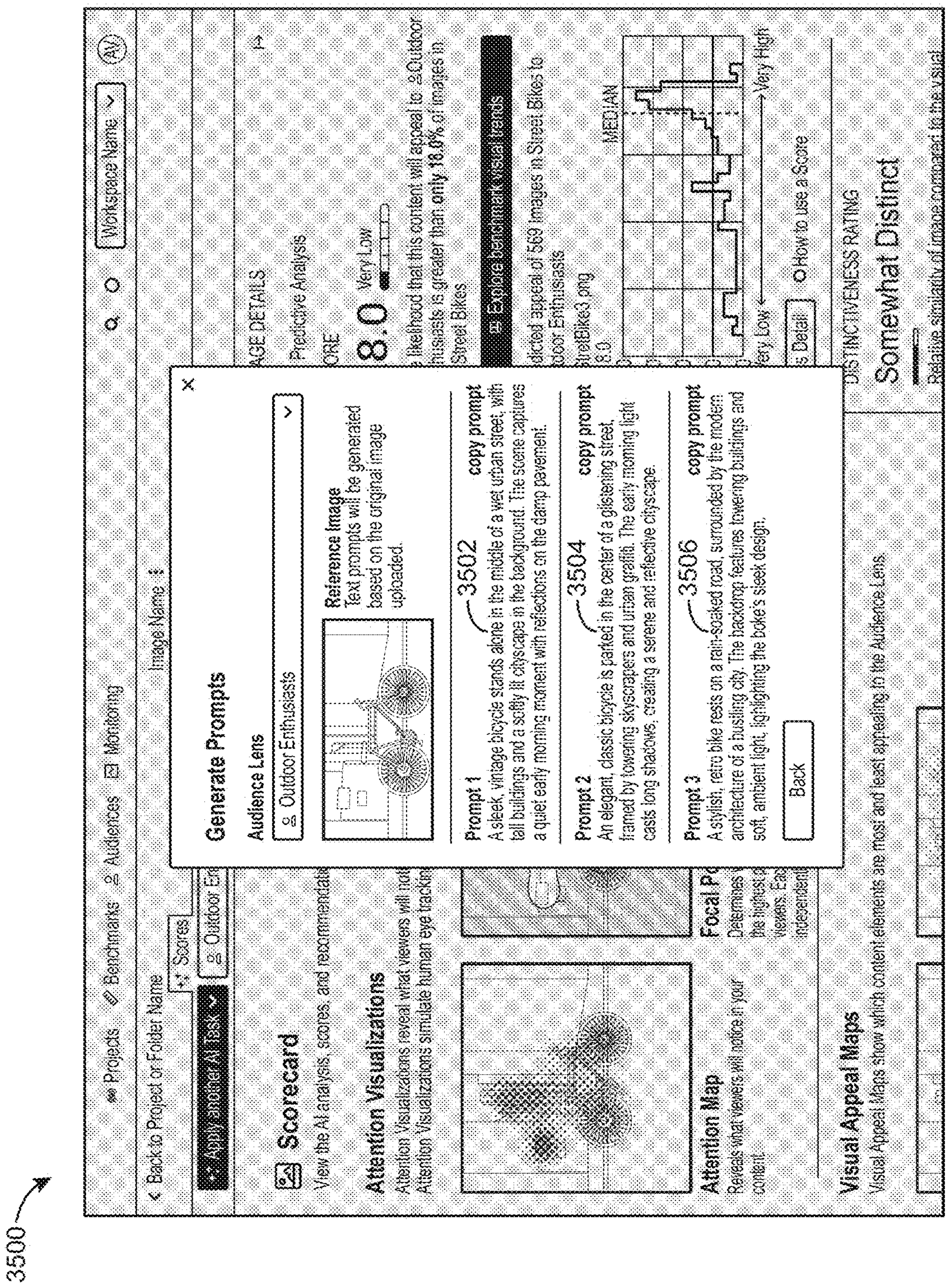
FIG. 35 is an example user interface in accordance with an illustrative embodiment.
Figure 36:
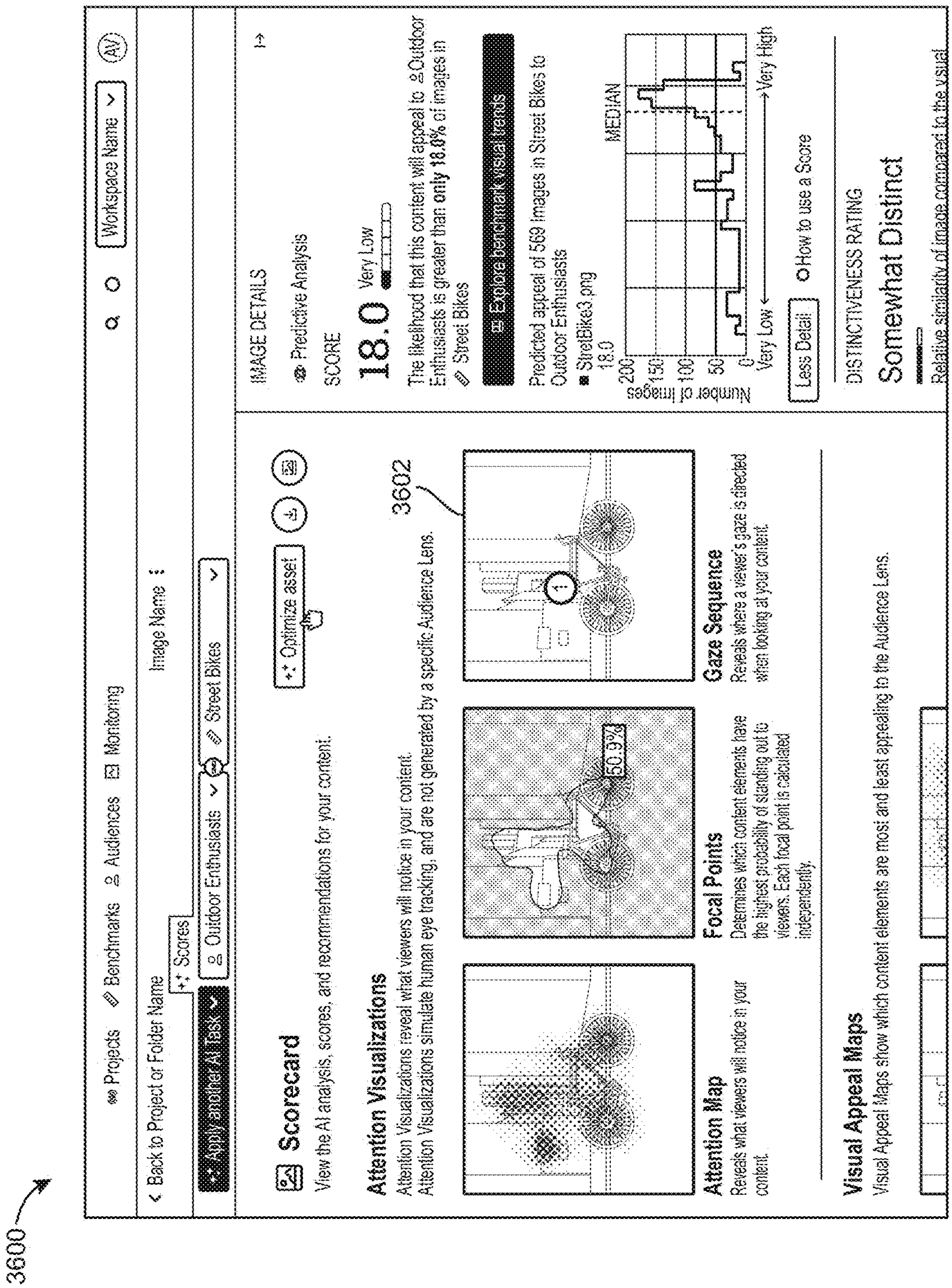
FIG. 36 is an example user interface in accordance with an illustrative embodiment.
Figure 37:
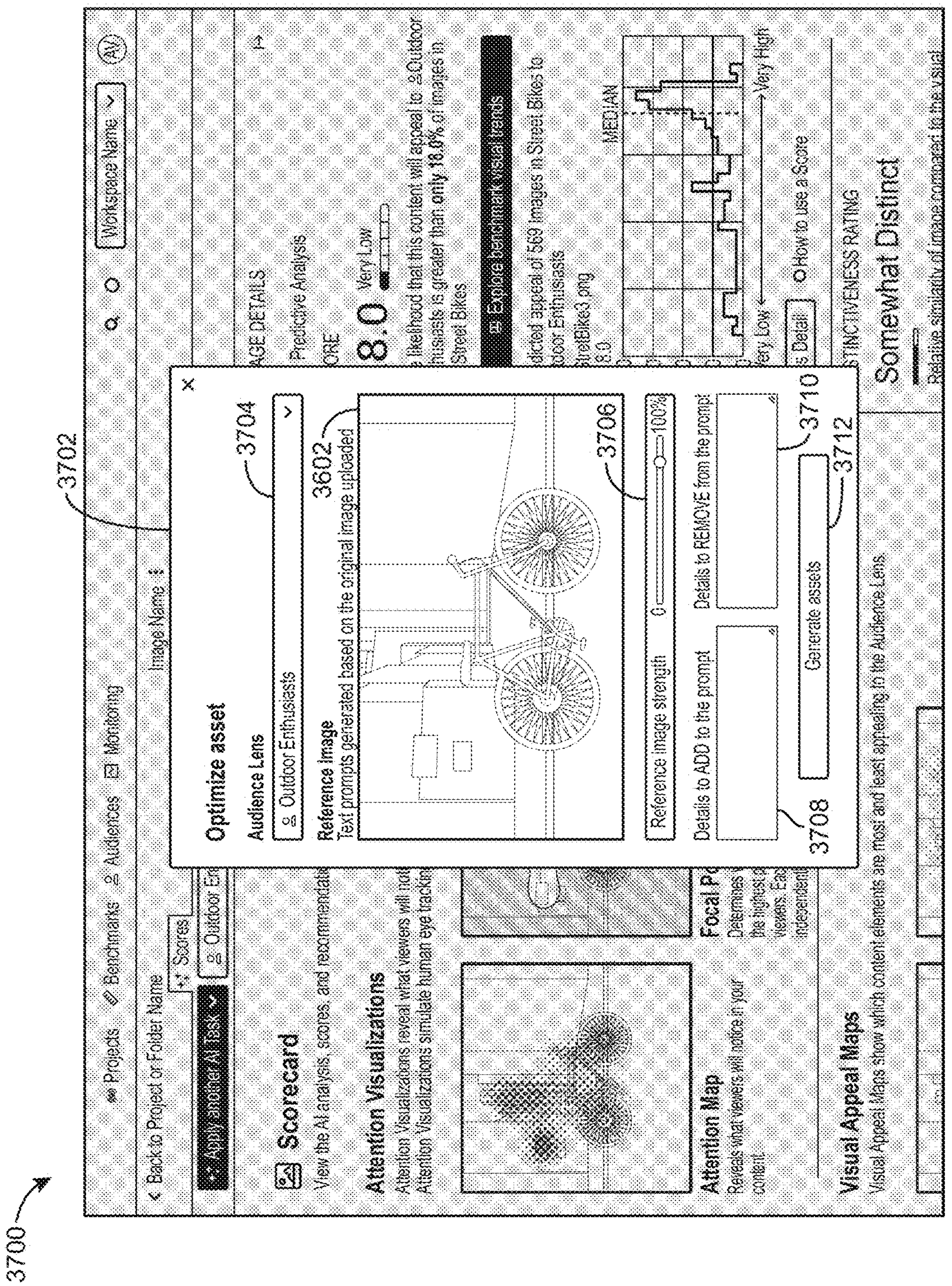
FIG. 37 is an example user interface in accordance with an illustrative embodiment.
Figure 38A:
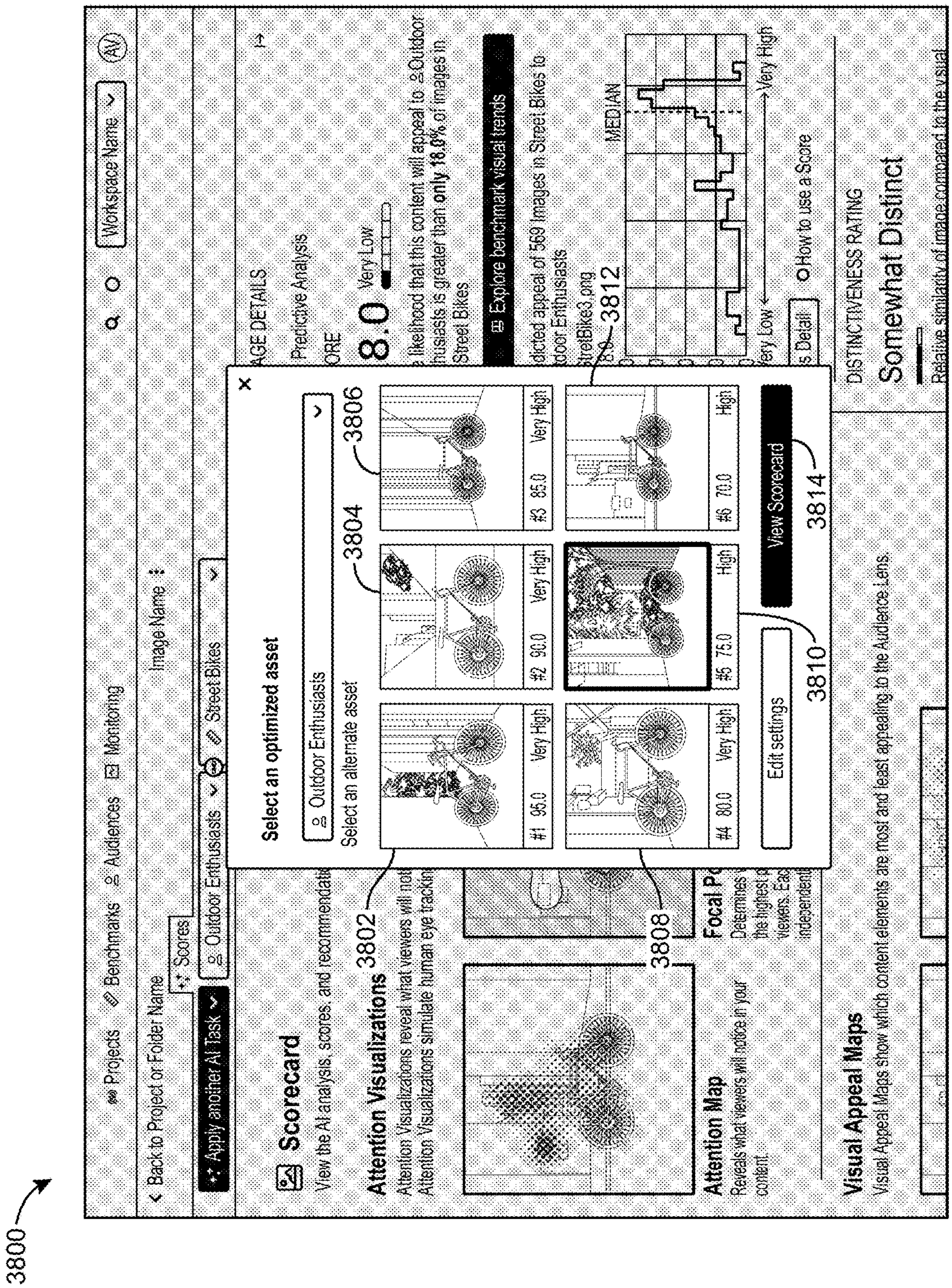
FIG. 38A is an example user interface in accordance with an illustrative embodiment.
Figure 38B:
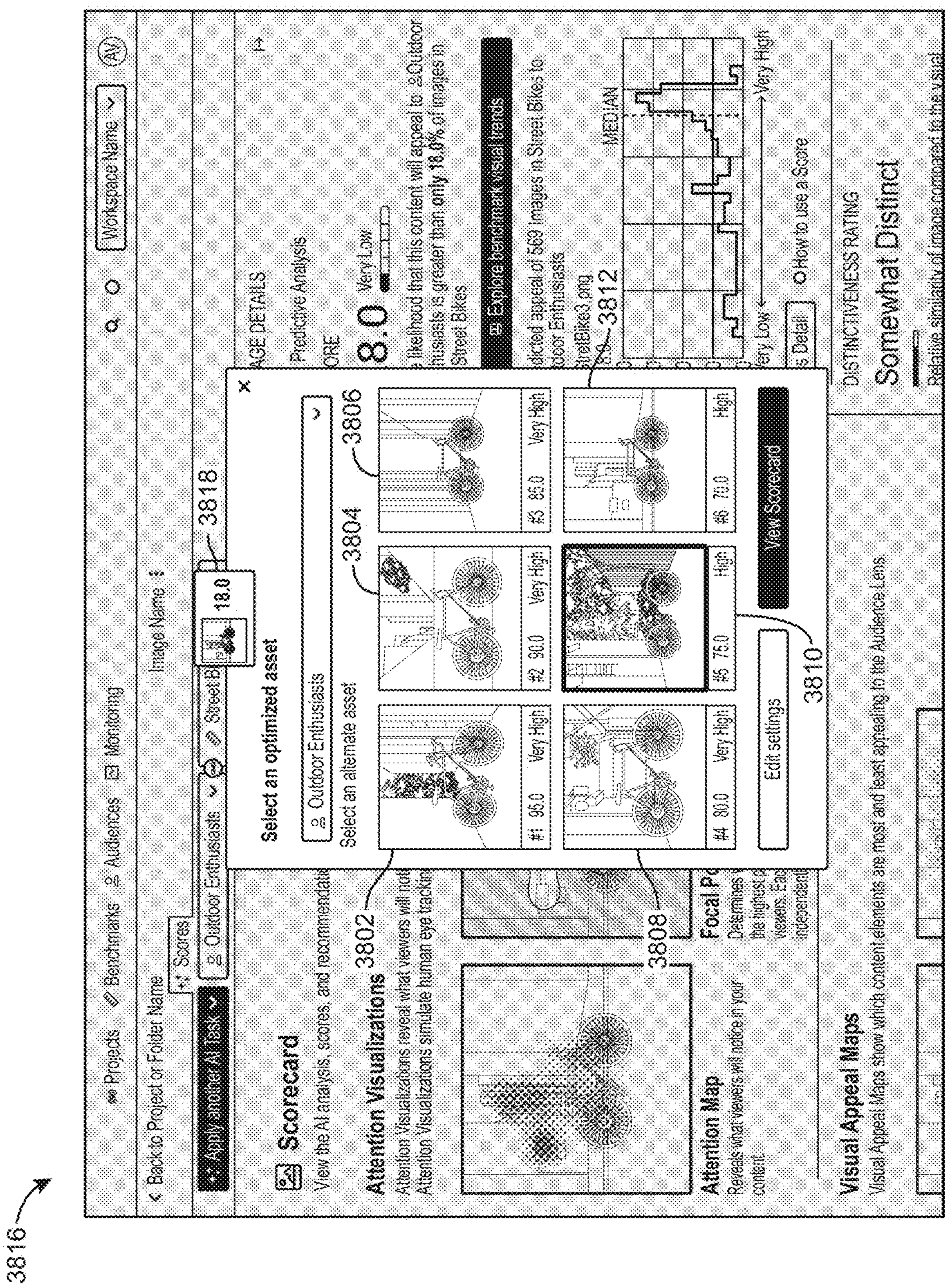
FIG. 38B is an example user interface in accordance with an illustrative embodiment.

FIGS. 33-35 include example user interfaces 3300-3500 in accordance with an illustrative embodiment. The user interfaces 3300-3500 illustrate an example flow of using the systems and methods described herein to generate prompts that can be used to generate new images or content items or otherwise adjust or improve upon existing images or content items depicted on a user interface or via an application.

For example, the user interface 3300 may be or include a user interface that includes an image 3302. The user interface 3300 can be a user interface of any application, such as a user interface of a webpage or website or a user interface of an application (e.g., a software-as-a-service application), for example. A data processing system (e.g., a computing device or computing system, such as any computing device or computing system configured to implement the systems and methods described herein) can present the user interface 3300 on a display of a client computing device or another type of computing device. In some cases, the data processing system can be or include software executing on the client computing device. A user can use an input/output device, such as a mouse or a touch screen, to move a cursor over the image 3302. The user can actuate the input-output device to select the image 3302.

Responsive to receiving the selection of the image 3302, the data processing system can update the user interface 3300 to present the user interface 3400 on the display of the client device. The user interface 3400 can include an overlay 3402 or a pop-up that appears over the user interface 3300. The overlay 3402 can include graphical elements that can be selected to generate (e.g., automatically generate) prompts that can be used as input into a generative machine learning model. For example, the overlay 3402 can include the image 3302 (e.g., as a reference image), a drop-down menu 3404 that lists different target audiences, a reference image strength bar 3406, an add detail form 3408, a remove details form 3410, and a generate prompt button 3412.

A user can provide an input to select the drop-down menu 3404 to view one or more target audiences for which the user wishes to improve the image 3302 using a generative machine learning model. The user can provide an input to select a target audience from the drop-down menu 3404. The overlay can include a reference image strength bar 3406. The user can move an indicator of the reference image strength bar 3406 to indicate a percentage of features of the image 3302 to adhere to or retain in the generated images and/or to indicate in the prompts that the data processing system generates to improve or change the image 3302 to be more successful with the target audience selected through the drop-down menu 3404. The add detail form 3408 can be a portion of the overlay 3402 in which the user can input features to include in the generated image or in the prompt that the data processing system generates. The remove details form 3410 can be a portion of the overlay 3402 in which the user can indicate one or more features of the image 3302 to remove from the generated image or indicate to remove in the prompt that the data processing system generates. The user can provide inputs into each of the graphical elements 3404-3410 and select the generate prompt button 3412 to submit or otherwise cause the client device displaying the graphical user interface 3400 to transmit the selections to the data processing system.

Responsive to receiving the selection of the submit button 3412, the data processing system can update the user interface 3400 to present the user interface 3500 on the display of the client device. The data processing system can do so by receiving the selections and inputting the selections into a large language model or other type of generative machine learning model that is trained or configured to generate prompts that can be used as input into an image generation generative machine learning model. The data processing system can execute the large language model or generative machine learning model to cause the large language model or generative machine learning model to generate one or more prompts based on the selections from the user interface 3400. In one example, the large language model or generative machine learning model may be configured to generate prompts that are configured to generate images that correspond to high performance scores for the selected target audience. The data processing system can execute the large language mode or generative machine learning model using the selection from the user interface 3400 one or more times to generate prompts 3502, 3504, and 3506.

The user can select one of the prompts 3502, 3504, or 3506 (e.g., by copying the prompts or be otherwise providing an input selecting the prompt). The data processing system can use the selected prompt 3502, 3504, or 3506 as input into a generative machine learning model (e.g., a generative machine learning model configured to generate high scoring images, a generative machine learning model configured to generate high scoring images for the selected target audience, or a general purpose generative machine learning model) and execute the generative machine learning model. The execution can cause the generative machine learning model to generate an image according to, or otherwise to include the features of, the prompt. The data processing system can present the generated images on a user interface. In some embodiments, the user can copy or select the prompt and use a third party generative machine learning model hosted by another computing system to generate one or more images according to the prompt.

FIGS. 36-38B include example user interfaces 3600-3816 in accordance with an illustrative embodiment. The user interfaces 3600-3816 illustrate an example flow of using the systems and methods described herein to generate new images or content items or otherwise adjust or improve upon existing images or content items depicted on a user interface or via an application.

For example, the user interface 3600 may be or include a user interface that includes an image 3602. The user interface 3600 can be the same as or be similar to the user interface 3300. The user interface 3600 can be a user interface of any application, such as a user interface of a webpage or website or a user interface of an application (e.g., a software-as-a-service application), for example. A data processing system (e.g., a computing device or computing system, such as any computing device or computing system configured to implement the systems and methods described herein) can present the user interface 3600 on a display of a client computing device or otherwise another computing device. In some cases, the data processing system can be or include software executing on the client computing device. A user can use an input/output device, such as a mouse or a touch screen, to move a cursor over the image 3602. The user can actuate the input-output device to select the image 3602.

Responsive to receiving the selection of the image 3602, the data processing system can update the user interface 3600 to present the user interface 3700 on the display of the client device. The user interface 3700 can be the same as or be similar to the user interface 3400. The user interface 3700 can include an overlay 3702 or a pop-up that appears over the user interface 3600. The overlay 3702 can include graphical elements that can be selected to generate (e.g., automatically generate) images using a generative machine learning model. For example, the overlay 3702 can include the image 3602 (e.g., as a reference image), a drop-down menu 3704 that lists different target audiences, a reference image strength bar 3706, an add detail form 3708, a remove details form 3710, and a generate asset (e.g., generate image) button 3712.

A user can provide an input to select the drop-down menu 3704 to view one or more target audiences for which the user wishes to improve the image 3602 using a generative machine learning model. The user can provide an input to select a target audience from the drop-down menu 3404. The overlay can include a reference image strength bar 3706. The user can move an indicator of the reference image strength bar 3706 to indicate a percentage of features of the image 3602 to adhere to or retain in the generated images and/or to indicate in prompts that the data processing system generates to improve or change the image 3602 to be more successful with the target audience selected through the drop-down menu 3704. The add detail form 3708 can be a portion of the overlay 3402 in which the user can input features to include in the generated image or in the prompt that the data processing system generates. The remove details form 3710 can be a portion of the overlay 3702 in which the user can indicate one or more features of the image 3602 to remove from the generated image or indicate to remove in the prompt that the data processing system generates. The user can provide inputs into each of the graphical elements 3704-3710 and select the generate asset button 3712 to submit or otherwise cause the client device displaying the graphical user interface 3700 to transmit the selections to the data processing system.

Responsive to receiving the selection of the generate asset button 3712, the data processing system can update the user interface 3700 to present the user interface 3800 on the display of the client device. The data processing system can do so by receiving the selections and inputting the selections into a large language model or other type of generative machine learning model that is trained or configured to generate prompts to use as input into an image generation generative machine learning model. The data processing system can execute the large language model or generative machine learning model to cause the large language model or generative machine learning model to generate one or more prompts based on the selections from the user interface 3800. For example, the large language model or generative machine learning model may be configured to generate prompts that are configured to generate images that correspond to high performance scores for the selected target audience. The data processing system can execute the large language mode or generative machine learning model using the selection from the user interface 3800 one or more times to generate one or more prompts.

The data processing system can use the generated prompts to generate images. For example, the data processing system can retrieve (e.g., automatically retrieve) the generated one or more prompts and input the one or more prompts into a generative machine learning model (e.g., a generative machine learning model configured to generate high scoring images, a generative machine learning model configured to generate high scoring images for the selected target audience, or a general purpose generative machine learning model) and execute the generative machine learning model one or more times for each of the prompts and/or one time for each prompt. The execution or executions can cause the generative machine learning model to generate images 3802, 3804, 3806, 3808, 3810, and 3812. The data processing system can present the generated images 3802-3812 on the user interface 3800. The user can select one of the images (e.g., the image 3810) to use to replace the image 3602.

In some embodiments, the user can select a scorecard button 3814. Selection of the scorecard button 3814 can cause the data processing system to execute one or more image scoring machine learning models, in some cases including an image scoring machine learning model corresponding to generating image scores for the selected target audience. The data processing system can execute the image scoring machine learning model using the images 3802-3812 to generate an image performance score for each of the images 3802-3812. The data processing system can present the generated image performance scores for the images 3802-3812 on the user interface 3800 or on an updated version of the user interface 3800.

In some embodiments, instead of generating the user interface 3800 responsive to the selection of the generate asset button 3712, the data processing system can update the user interface 3700 to present the user interface 3816 on the display of the client device. The user interface 3816 may be similar to the user interface 3800, except the data processing system can include image performance scores on the user interface 3816. For example, the data processing system can generate the images 3802-3812 in the same manner as described with reference to the user interface 3800. However, to generate the user interface 3816, before presenting the images 3802-3812 on the user interface 3816, the data processing system can determine an image performance score for each of the images 3802-3812. The data processing system can do so by executing an image scoring machine learning model, for example, such as an image scoring machine learning model configured to generate image performance scores for the selected target audience. The data processing system can also similarly determine and/or include an image performance score 3818 of the image 3602 on the user interface 3816. Thus, a user can view and compare the image performance scores for the different generated images.

Using machine learning techniques to generate scores, such as performance scores, for different types of content items as described herein can incur several technical difficulties. For example, it can be difficult to generate scores that are consistent across different modalities (e.g., types of content) given the differing amounts of training data that may be available to train machine learning models to generates scores for the respective modalities. Additionally, training each model to generate scores for different types of content items can require a large of amount time, training data, and processing resources, particularly when training machine learning models to simulate different target audiences.

A system implementing the systems and methods described herein can overcome the aforementioned difficulties using a multi-modal machine learning architecture. The multi-modal machine learning architecture can be configured to use an embedding space where features from different types of content items can be represented. A machine learning model configured to generate scores for content can use embeddings from the embedding space generate scores for the content items. The common embedding space can enable the model to generate scores that are consistent across different types of content.

For example, a computer implementing the systems and methods described herein can use a feature extraction machine learning model that is configured to extract features from different types of content items (e.g., images and text strings) to generate an embedding for each content item. The feature extraction machine learning model may be configured to generate the embedding for each content item in the same embedding space. The computer can then use a content scoring machine learning model to generate scores for content items based on the embeddings in the embedding space. Because the feature extraction machine learning model may be configured to generate embeddings in the same embedding space for different types of content, the content scoring machine learning model may be trained based on training embeddings from only one type of content items and then used to generate scores for another type of content item that shares the same embedding space. Thus, by using the multi-modal machine learning architecture as described herein, not only can the same content scoring machine learning model be trained to generate scores for different types of content items, but the content scoring machine learning model can generate scores for content items without any, or with minimal, training data for a particular type of content item.

In another example, a computer implementing the systems and methods described herein may use an embedding conversion machine learning model to generate performance scores for different types of content items. For example, the computer can use different feature extraction machine learning models to extract features from different types of content items. The computer can use an embedding conversion machine learning model to convert the embeddings generated from each feature extraction machine learning model to a composite embedding space that is shared between the different types of content items. The computer can then execute a content scoring machine learning model to generate scores for the content items based on the composite embeddings. This architecture can enable the content scoring machine learning to be trained to generate scores for different types of content items without any, or with minimal, training data for a particular type of content item as well as score different types of content items consistently between each other.

Figure 39:
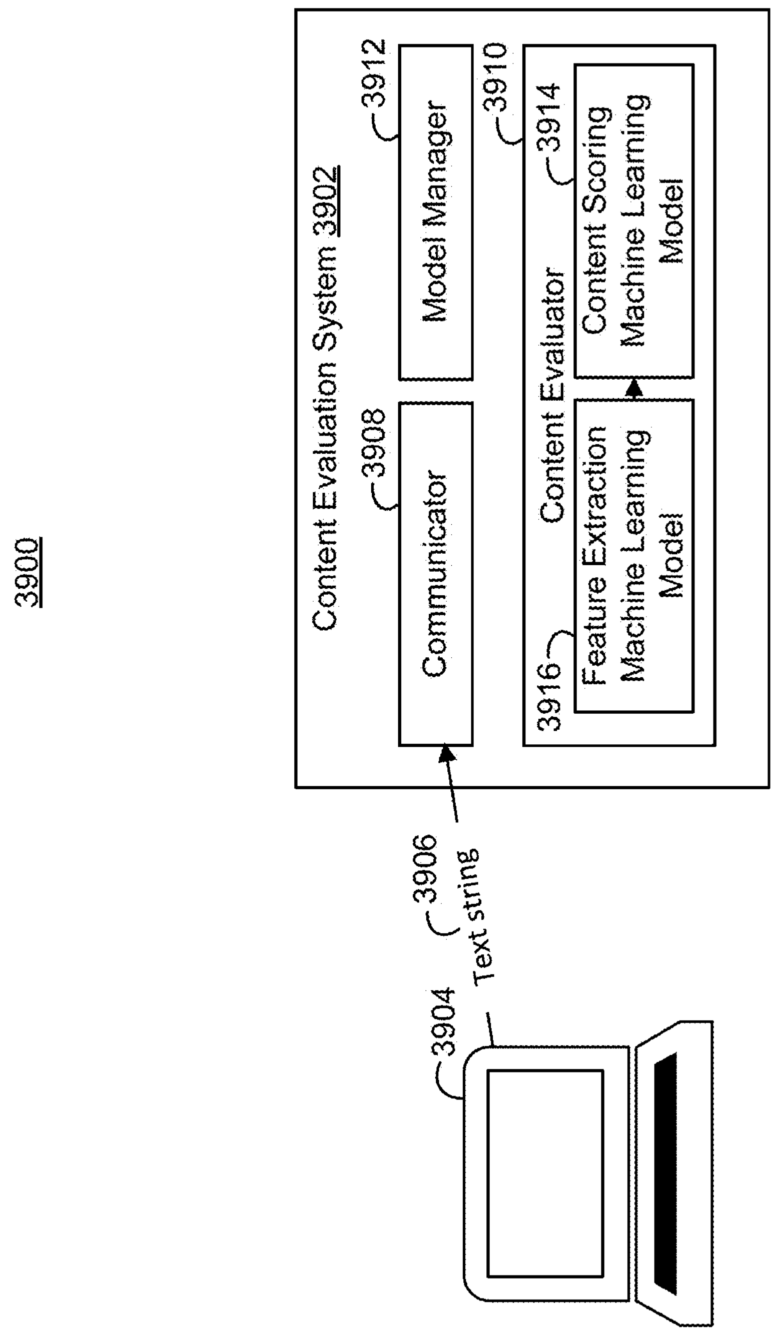
FIG. 39 is a sequence diagram illustrating multi-modal content processing in accordance with an illustrative embodiment.

FIG. 39 is a sequence diagram illustrating multi-modal content processing in accordance with an illustrative embodiment. In brief overview, FIG. 39 illustrates a sequence 3900 in which a content evaluation system 3902 can use different machine learning models and/or techniques to generate scores for different types of content items. To do so, the content evaluation system 3902 can use a feature extraction machine learning model to extract features from training content items. The feature extraction machine learning model can generate embeddings for the training content items in the same embedding space, regardless of the types of the content items from which the feature extraction machine learning model extracted the features. The content evaluation system 3902 can train a content scoring machine learning model using the embeddings in the embedding space such that the content scoring machine learning model can generate consistent scores regardless of the type of the content item. In this way, the content evaluation system 3902 can overcome an inherent technical problem to machine learning models trained to process different types of content that, because the machine learning models typically require differing training data, the machine learning models may generate results (e.g., scores) that are not consistent across different formats or types of content.

The sequence 3900 may involve the content evaluation system 3902 communicating with a computing device 3904. The computing device 3904 can be a server or other type of computing device. The computing device 3904 can be a computing device accessed by a user. The computing device 3904 can store and/or execute an application (e.g., a browser) to access the Internet or another communications network. Through the Internet or another communications network, the computing device 3904 can communicate with the content evaluation system 3902.

For example, in the sequence 3900, the computing device 3904 can execute an application to communicate with the content evaluation system 3902. In doing so, the computing device 3904 can transmit a text string 3906 (e.g., a set of text) to the content evaluation system 3902. In one example, the text string 3906 can be a description of an image and include descriptors of different features of the image. In another example, the text string 3906 can be a prompt for a generative machine learning model (e.g., the image generator 2114) describing an image for the generative machine learning model to generate. The computing device 3904 can transmit the text string 3906 to the content evaluation system 3902 in a request, such as a request to generate a score (e.g., a text performance score for the text string 3906). The content evaluation system 3902 can receive the text string 3906 and perform the systems and methods described herein to generate a score for the text string 3906. The content evaluation system 3902 can generate a record containing the score and/or the text string 3906. The content evaluation system 3902 can store the record in memory and/or transmit the record back to the computing device 3904.

The content evaluation system 3902 may comprise one or more processors that are configured to use a multi-modal machine learning architecture to generate scores for different types of content items. In some embodiments, the content evaluation system 3902 can be or include executable code of the content evaluation system 1005. The content evaluation system 3902 may comprise a network interface, a processor, and/or memory (or the content evaluation system 1005 can include such components). The content evaluation system 3902 may communicate with the computing device 3904 via the network interface, which may be or include an antenna or other network device that enables communication across a network and/or with other devices. The processor may be or include an ASIC, one or more FPGAs, a DSP, circuits containing one or more processing components, circuitry for supporting a microprocessor, a group of processing components, or other suitable electronic processing components. In some embodiments, the processor may execute computer code or modules (e.g., executable code, object code, source code, script code, machine code, etc.) stored in memory to facilitate the activities described herein. The memory may be any volatile or non-volatile computer-readable storage medium capable of storing data or computer code.

The content evaluation system 3902 can include a communicator 3908, a content evaluator 3910, and a model manager 3912. The components 3908-3912 can be stored in the memory of the content evaluation system 3902. The communicator 3908 may comprise programmable instructions that, upon execution, cause the processor of the content evaluation system 3902 to communicate with the computing device 3904 and/or any other computing device. The communicator 3908 may be or include an application programming interface (API) that facilitates communication between the computing device 3904 (e.g., via the network interface of the content evaluation system 3902) and other computing devices. The communicator 3908 may communicate with the computing devices 3904 and/or any other computing device across a network.

The content evaluation system 3902 can establish a connection with the computing device 3904. The communicator 3908 can establish the connection with the computing device 3904 over a network. To do so, the communicator 3908 can communicate with the computing device 3904 across the network. In one example, the communicator 3908 can transmit a syn packet to the computing device 3904 (or vice versa) and establish the connection using a TLS handshaking protocol. The communicator 3908 can use any handshaking protocol to establish a connection with the computing device 3904.

The content evaluator 3910 may comprise programmable instructions that, upon execution, cause the processor of the content evaluation system 3902 to calculate or generate scores (e.g., performance scores) for different types of content. The content evaluator 3910 may use a multi-modal architecture to do so. For example, the content evaluator 3910 can be the same as or similar to the performance measurement module 1065 of the content evaluation system 1005. The content evaluator 3910 may include one or more machine learning models (e.g., neural networks) that are respectively configured to extract features from content items and generate scores for the content items based on the extracted features.

The model manager 3912 may comprise programmable instructions that, upon execution, cause the processor of the content evaluation system 3902 to train and/or operate the different machine learning models of the content evaluator 3910. The model manager 3912 may be configured to train the content scoring machine learning model 3914 to generate scores for different types (e.g., formats or modalities) of content items. For instance, the model manager 3912 can be configured to train the content scoring machine learning model to generate scores for images, videos, text, audio segments, etc.). In doing so, the model manager 3912 can train the content scoring machine learning model 3914 to generate performance scores that indicate a likelihood of interaction or performance of different types of content items when presented in different computing environments (e.g., on a radio, on television, on a website, etc.).

The content evaluator 3910 can be the same as or similar to the image evaluator 2110, shown and described with reference to FIG. 21. The content evaluator 3910 can include the content scoring machine learning model 3914 and a feature extraction machine learning model 3916. The content evaluator 3910 may use the feature extraction machine learning model 3916 to generate embeddings of extracted features from different types of content into a common embedding space and then use the content scoring machine learning model 3914 to generate scores (e.g., performance scores or content performance scores) for the content items based on the embeddings. Because the embeddings share the common embedding space for different types of content items, the content scoring machine learning model 3914 can generate scores that are consistent across the different types of content items.

The feature extraction machine learning model 3916 can be a machine learning model (e.g., a neural network, a support vector machine, a random forest, etc.) that has been configured or trained to extract sets of features from different types of content items and generate an embedding (e.g., a numerical vector), such as a feature embedding, for each respective set of features or content item. In one example, the feature extraction machine learning model 3916 can be a contrastive language-image pre-training (CLIP) machine learning model configured or trained to generate embeddings from both text and images. The feature extraction machine learning model 3916 can be any type of machine learning model that is configured to generate embeddings of features for one or more multiple types of content items.

In one example, the feature extraction machine learning model 3916 may create feature vectors from images by extracting individual features from the images. For example, the feature extraction machine learning model 3916 may be configured to automatically extract features from the image. Such features can be or can include descriptors of the image such as identifications of objects within the image, colors within the image, scenery within the image, shades of colors within the image, etc. In this example, the model manager 3912 can execute the feature extraction machine learning model 3916 with the image and output values for the different features, thus extracting features from the image. The model manager 3912 can format the extracted features into an embedding for the image by setting the values for the extracted features at different index values of the vector or by otherwise concatenating the values of the extracted features together. The embeddings can be in the same embedding space as embeddings the feature extraction machine learning model 3916 generates for other types of content items in addition to images (e.g., the embedding space can include the same values for the same or similar features across different types of content items). The model manager 3912 can similarly execute the feature extraction machine learning model 3916 to extract features and generate embeddings in the embedding space for any type of content item.

The content scoring machine learning model 3914 can be a machine learning model (e.g., a neural network, a support vector machine, a random forest, etc.) that is configured to receive as input embeddings (e.g., numerical vectors) representing features of different types of content items. Embeddings can include numerical values that represent individual features or combinations of features of a content item. The content scoring machine learning model 3914 can generate scores (e.g., performance scores or content performance scores) for the content items based on the respective embeddings in the embedding space of the feature extraction machine learning model 3916. In one example, the scores can be or include a likelihood that a user would interact with the images if they were viewing or listening to the content items on a web page or another type of platform. The content scoring machine learning model 3914 can be configured to generate a score for a content item by applying internal trained or learned weights and/or parameters to the embedding representing features of the content item. The score can be a number within a defined range (e.g., 1-100, 1-10, 0-1, etc.). The content scoring machine learning model 3914 can be the same as or similar to a machine learning model (e.g., a second machine learning model configured to generate performance scores) of the image evaluator 2110, shown and described with reference to FIG. 21.

The model manager 3912 can execute the content scoring machine learning model 3914 to generate scores for different types of content items. For example, the content evaluation system 3902 can receive the text string 3906 from the computing device 3904 through the communicator 3908. The model manager 3912 can execute the feature extraction machine learning model 3916 using the text string 3906 as input to generate an embedding identifying or representing extracted features for the text string 3906. The extracted features can be, for example, key words, descriptors of an image, syntax, objects identifiers, etc. The model manager 3912 can feed the embedding into the content scoring machine learning model 3914 and execute the content scoring machine learning model 3914 to generate a score for the text string 3906. Accordingly, the model manager 3912 can use the machine learning models of the content evaluator 3910 to automatically generate a score for the text string 3906.

In some embodiments, the content evaluator 3910 can include multiple content scoring machine learning models 3914 that are configured to generate scores. Each content scoring machine learning model 3914 may be trained to generate scores for a different target audience. For example, each content scoring machine learning model 3914 may be trained based on training data generated from interaction data generated from users of a specific target audience (e.g., users who have a specific characteristic (e.g., age, age within a range, gender, etc.) and/or who otherwise have specific interests (e.g., sports, movies, books, genres of books, types of sports, jobs, etc.)). The content scoring machine learning model 3914 may be trained (e.g., by the content evaluation system 1005 or another data processing system) by labeling images with interaction data from the specific target audiences and training the machine learning models for the same target audiences with the labeled training data to generate scores for the images. In training the machine learning models in this way, each machine learning model may be trained to simulate a target audience and how a member of the target audience will interact with specific images.

The model manager 3912 can generate scores (e.g., target audience scores) that correspond to different target audiences for the text string 3906. For example, the model manager 3912 can feed the embedding for the text string 3906 into the content scoring machine learning models 3914 that correspond to the different target audiences. The model manager 3912 can execute the content scoring machine learning model 3914 to generate different target audience scores for the text string 3906. The model manager 3912 can similarly generate one or more target audience scores for any type of content item. The model manager 3912 can generate a record (e.g., a file, document, table, listing, message, notification, etc.) containing one or more, or all, of the target audience scores and/or the text string 3906 and store the record in memory.

The model manager 3912 can train the content scoring machine learning model 3914. In some cases, the model manager 3912 can train the content scoring machine learning model 3914 using one type of content item to generate scores for content items of a different type. For example, the model manager 3912 can receive a plurality of training images. The model manager 3912 can receive interaction data (e.g., engagement feedback comprising a set of interactions, such as time viewed, number of clicks, likes, dislikes, comments, ratings, etc.) for each of the training images indicating how individuals interacted with the training images on a website, or any other type of interaction data as described herein. The model manager 3912 can execute the feature extraction machine learning model 3916 using each of the plurality of training images as input to generate a training embedding for each of the plurality of training images. Each training embedding can be in an embedding space that is shared with embeddings of different types of content items, such as a set of text.

The model manager 3912 can feed the training embeddings into the content scoring machine learning model 3914 for training. For example, the model manager 3912 can label each training embedding with engagement feedback corresponding to the training image from which the training embedding was generated. For each training embedding, the model manager 3912 can feed the training embedding into the content scoring machine learning model 3914 and the content scoring machine learning model 3914 can generate a score (e.g., a performance score) for the training image. The model manager 3912 can use a loss function and back-propagation techniques based on the score and the engagement feedback for the training image (e.g., based on a difference between the score and the engagement feedback) to adjust the internal weights and/or parameters of the content scoring machine learning model 3914 to train the content scoring machine learning model 3914. The model manager 3912 can similarly use each training image, or training embedding generated from a training image, to train the content scoring machine learning model 3914.

In some cases, training the content scoring machine learning model 3914 can involve calculating an engagement metric from engagement feedback for a training image. For example, the model manager 3912 can identify the engagement feedback for a training image. The model manager 3912 can calculate or determine an engagement metric as a function (e.g., a sum, average, or median function) of the engagement feedback for the training image. The model manager 3912 can use the engagement metric as a label and use back-propagation techniques to adjust the internal parameters and/or weights of the content scoring machine learning model 3914 based on a difference between the score (e.g., performance score or training performance score) the content scoring machine learning model 3914 generates for the training image and the engagement metric to train the content scoring machine learning model 3914.

Subsequent to training the content scoring machine learning model 3914 (e.g., using the plurality of training images or only the plurality of training images), the model manager 3912 can use the content scoring machine learning model 3914 to generate scores for different modalities, formats, or types of content items. For example, subsequent to training the content scoring machine learning model 3914 using the plurality of training images, the model manager 3912 can receive the text string 3906 (e.g., a set of text) from the computing device 3904. The content scoring machine learning model 3914 can execute the feature extraction machine learning model 3916 using the text string 3906 as input to generate an embedding in the same embedding space as the embedding space of the embeddings of the training images. The embedding can represent one or more features (e.g., words, word patterns, etc.) of the text string 3906. The model manager 3912 can feed the embedding for the text string 3906 into the content scoring machine learning model 3914 and execute the content scoring machine learning model 3914. The execution can cause the content scoring machine learning model 3914 to generate a score (e.g., a text performance score) for the text string 3906. The model manager 3912 can generate a record identifying the score for the text string 3906. The model manager 3912 can store the record in memory and/or transmit the record to the computing device 3904. The computing device 3904 can display the score and/or the text string 3906 on a user interface responsive to receiving the record. The model manager 3912 can similarly train and/or use the content scoring machine learning model 3914 to generate scores for any type of content item. In this way, the model manager 3912 can train the content scoring machine learning model 3914 using one type of content item (e.g., images) and then use the content scoring machine learning model 3914 to generate scores for a different type of content item (e.g., sets of text or text strings).

In some cases, the model manager 3912 can generate recommendations for adjusting or changing the text string 3906 using the content evaluator 3910. For example, the model manager 3912 can compare the score for the text string 3906 to a threshold (e.g., a predetermined threshold). The model manager 3912 may determine the score for the set of text is below the threshold. Responsive to the determination, the model manager 3912 can generate an impact score for each of one or more features of the text string 3906 that indicates the impact the respective features had on the score for the text string 3906. To calculate the impact scores for the features of the text string 3906, the model manager 3912 can extract one or more values from one or more signals between an intermediate layer of the content scoring machine learning model 3914 and a regression layer or a classification layer of the content scoring machine learning model 3914. The content scoring machine learning model 3914 may have generated the one or more values during execution to generate the score for the text string 3906. The model manager 3912 can calculate impact scores for the individual features using back-propagation techniques on the extracted values from the neural network and identify the gradient at the nodes for the individual features that indicate the impact a change in the weights of the signals from the nodes would have on the final score. The model manager 3912 can compare the impact scores of the different features for the text string 3906 to a threshold (e.g., a second predetermined threshold) and generate a recommendation to change or adjust any feature that corresponds with an impact score below the threshold.

In some embodiments, the model manager 3912 can train the content scoring machine learning model 3914 based on other types of content items prior to using the content scoring machine learning model 3914 to generate the score for the text string 3906. For example, the model manager 3912 can receive a plurality of training videos. The model manager 3912 can generate training embeddings for each of the plurality of training videos using the feature extraction machine learning model 3916. The training embeddings can be in the same embedding space as the embeddings of the training images. The model manager 3912 can obtain interaction data for each of the plurality of training videos. The model manager 3912 can train the content scoring machine learning model 3914 using the training embeddings by generating scores (e.g., video performance scores) for the training videos based on the training embeddings. The model manager 3912 can use back-propagation techniques based on differences between the performance scores and interaction data/engagement feedback or engagement metrics to adjust the weights and/or parameters of the content scoring machine learning model 3914. This training can further cause the content scoring machine learning model 3914 to generate a score for the text string 3906 that is consistent with scores generated with both videos and images.

The model manager 3912 can train the content scoring machine learning model 3914 to simulate a specific target audience. The model manager 3912 can do so using embeddings that are labeled with the target audience (e.g., the same target audience). The model manager 3912 may label the embeddings based on the training content items from which the embeddings were generated. For instance, the model manager 3912 can label different training images based on a data source (e.g., a website, platform, computing device, or database) from which the training images originated or were extracted. The different data sources may each correspond to (e.g., have a stored association in a database with) a specific set of one or more target audiences, such as with target audiences that typically visit or access the data sources. The model manager 3912 can label the content items that are extracted from or otherwise originate from (e.g., are received from) the respective data sources with tags or labels of the target audience or target audiences corresponding to the data sources. The model manager 3912 can identify the training content items labeled with the same target audience identifier from memory and generate training embeddings with the training content items. In doing so, the model manager 3912 can tag the training embeddings with a label corresponding to the same target audience. The model manager 3912 can retrieve the training embeddings and the interaction data that corresponds to the respective training embeddings and that correspond to the same target audience and train the content scoring machine learning model 3914 to generate scores (e.g., performance scores) that simulate how the target audience would react to new content items. The model manager 3912 can similarly train different content scoring machine learning models 3914 with training embeddings of training content items that correspond to different target audiences to simulate the different target audiences. The model manager 3912 can store the different content scoring machine learning models 3914 in memory with associations with identifiers of the target audience or target audiences that correspond to the content scoring machine learning models 3914.

The model manager 3912 can use the trained content scoring machine learning models 3914 to generate scores for different target audiences for a content item. For example, the model manager 3912 can receive a request comprising a set of text and an identifier of a target audience from a client device. The model manager 3912 can execute the feature extraction machine learning model 3916 using the set of text to generate an embedding for the set of text in response to the request from the client device. The model manager 3912 can identify a content scoring machine learning model 3914 that corresponds to an identifier of the same target audience as the target audience identified in the request and retrieve the identified content scoring machine learning model 3914 from memory. The model manager 3912 can execute the retrieved content scoring machine learning model 3914 using the embedding for the set of text as input to generate a text performance score (e.g., a target audience score) for the set of text. The model manager 3912 can transmit the set of text and/or the text performance score for the set of text back to the client device in a record. The client device can receive the record and display the contents of the record on a user interface.

Advantageously, the content evaluation system 3902 can generate scores for text prompts that can be used as input into an image generation machine learning model. For example, a user can provide an input prompt into the content evaluation system 3902. The prompt can include features for an image generation machine learning model (e.g., the image generator 2114) to include in one or more images that the image generation machine learning model generates. The content evaluation system 3902 can generate a score for the prompt, in some cases for a particular target audience. In some cases, the content evaluation system 3902 can generate recommendation of features of the prompt to remove or change (e.g., based on impact scores of features of the prompt). The user can repeatedly provide such inputs until the content evaluation system 3902 generates a score for a prompt that is satisfactory to the user. The user can then provide an input to cause the image generation machine learning model to generate one or more images using the prompt. Thus, the content evaluation system 3902 can facilitate the user providing higher performing prompts into the image generation machine learning model to generate higher performing images.

Figure 40:
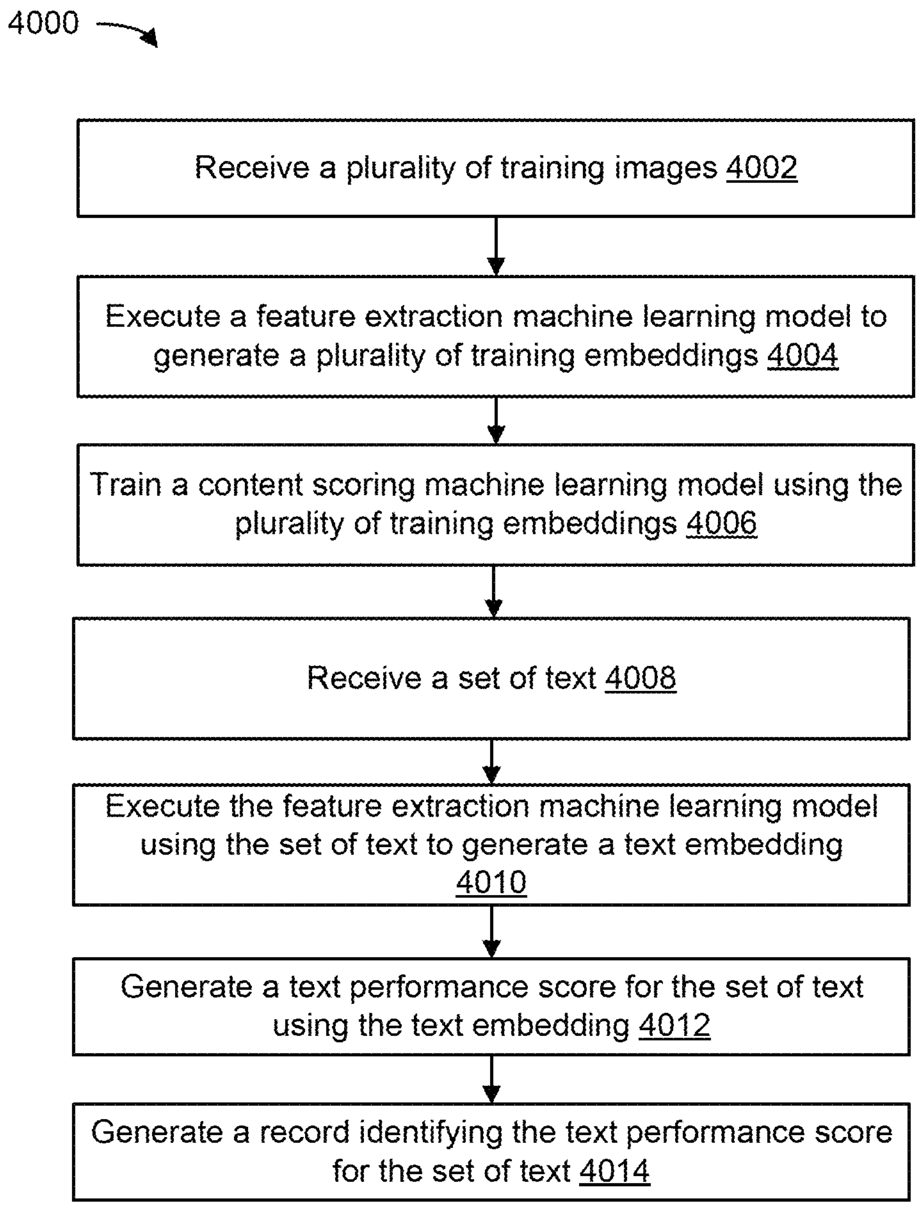
FIG. 40 is a flow diagram illustrating a method for multi-modal content processing in accordance with an illustrative embodiment.

FIG. 40 is a flow diagram illustrating a method 4000 for multi-modal content processing in accordance with an illustrative embodiment. In some implementations, the method 4000 can be performed by a data processing system such as any of the components of the system 1000 shown in FIG. 10 or the content evaluation system 3902. The method 4000 may include more or fewer operations and the operations may be performed in any order. Performance of the method 4000 may enable the data processing system to train a content scoring machine learning model to generate scores for one type of content based on (e.g., based only on) training data including a different type of content item. Although described as image content and text content, the method 4000 can be performed using any type of content.

At operation 4002, the data processing system receives a plurality of training images. The data processing system can receive the plurality of training images from a remote computing device, such as a remote server or a client device.

The server or client device can include the plurality of training images in a request to train a content scoring machine learning model to generate scores for different types of content items.

At operation 4004, the data processing system executes a feature extraction machine learning model. The feature extraction machine learning model can be a first neural network. The data processing system can execute the feature extraction machine learning model to generate a training embedding for each of the plurality of training images. The feature extraction machine learning model may be configured to extract features to generate embeddings for different types of content items (e.g., images, audio segments, videos, segments of videos, etc.) that are each in the same embedding space (e.g., the same or similar features from different types of content items may correspond to the same or similar location in the embedding space). The data processing system can execute the feature extraction machine learning model to generate an embedding representing the features from each of the plurality of training images in the embedding space.

At operation 4006, the data processing system trains a content scoring machine learning model (e.g., a neural network, support vector machine, a random forest, etc.). The content scoring machine learning model can be a second neural network. The data processing system can train the content scoring machine learning model using each of the training embeddings generated from the training images. For example, the data processing system can train the content scoring machine learning model to generate performance scores for different types of content items. To do so, the data processing system can receive interaction data containing engagement feedback for each of the training images. The data processing system can use the engagement feedback as a label for each of the embeddings generated from the corresponding training images. The data processing system can execute the content scoring machine learning model to generate scores for each of the training images. The data processing system can compare the scores to the engagement feedback, or engagement metrics generated from the engagement feedback, to determine differences between the engagement feedback and the generated scores. The data processing system can update or adjust the weights and/or parameters of the content scoring machine learning model based on or proportional to the respective differences.

At operation 4008, the data processing system receives a set of text (e.g., a text string). The data processing system can receive the set of text in a request for a score for the set of text from a client device.

At operation 4010, the data processing system executes the feature extraction machine learning model. The data processing system can execute the feature extraction machine learning model using the set of text as input. The execution can cause the feature extraction machine learning model to generate a text embedding representing features of the set of text. The embedding can be in the same embedding space as the embedding space of the embeddings the feature extraction machine learning model generated for the training images.

At operation 4012, the data processing system generates a text performance score for the set of text. The data processing system can do so using the text embedding generated for the set of text. The data processing system can execute the content scoring machine learning model trained based on the training images and using the text embedding to generate a text performance score for the set of text.

At operation 4014, the data processing system generates a record identifying the text performance score for the set of text. The data processing system can store the record in memory for later retrieval and/or transmit the record to the client device that transmitted the set of text in the request. The client device can receive the record, extract the contents from the record, and present the text performance score and/or the set of text on a user interface.

Figure 41:
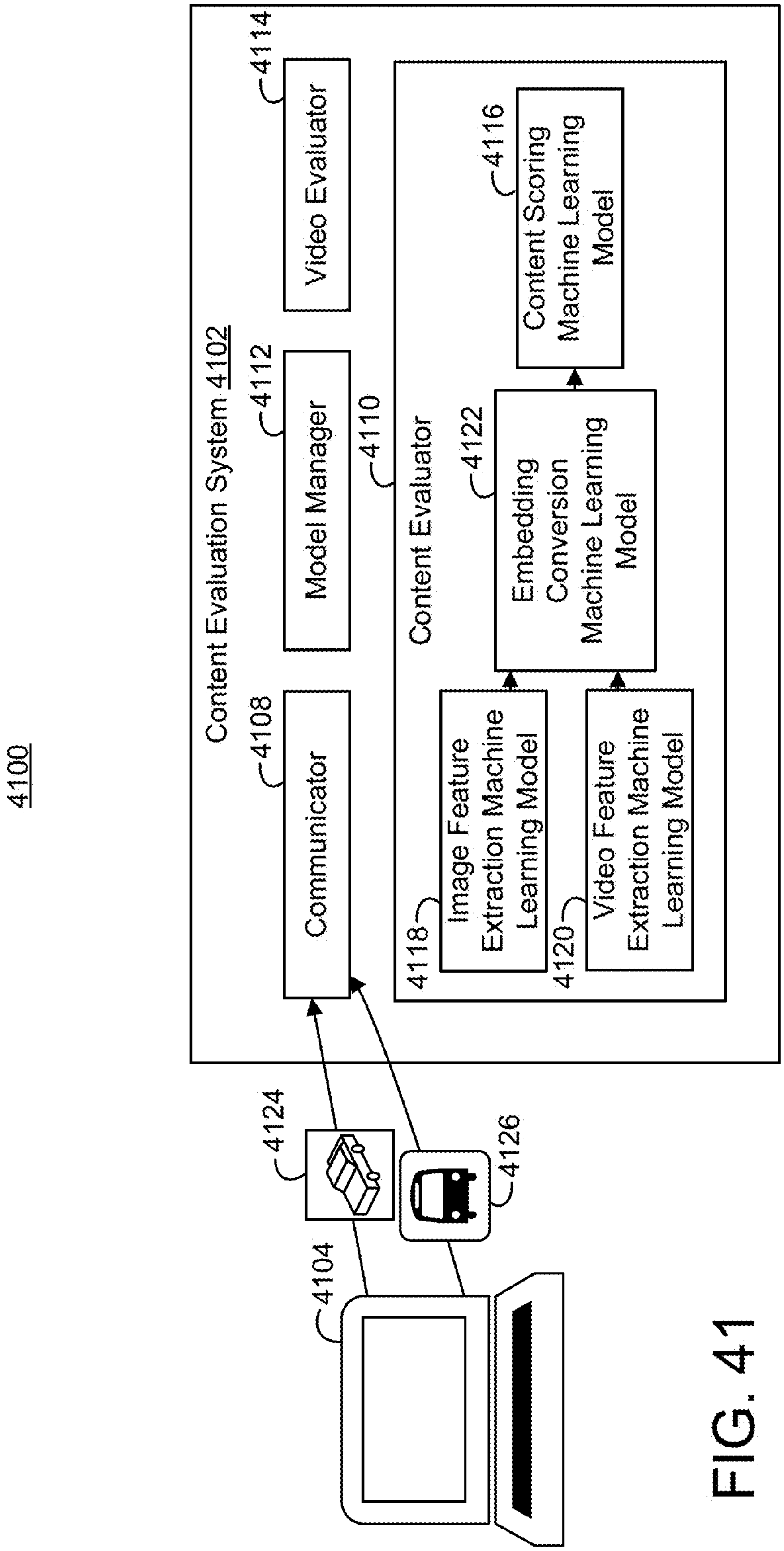
FIG. 41 is a sequence diagram illustrating video processing in accordance with an illustrative embodiment.

FIG. 41 is a sequence diagram illustrating multi-modal content processing in accordance with an illustrative embodiment. In brief overview, FIG. 41 illustrates a sequence 4100 similar to the sequence 3900 of FIG. 39 in which a content evaluation system 4102 can use different machine learning models and/or techniques to generate scores for different types of content items. To do so, the content evaluation system 4102 can use different feature extraction machine learning models to extract features from different types of content items. The feature extraction machine learning models can generate embeddings for the respective types of content items in different embedding spaces specific to the type of content items. The content evaluation system 4102 can feed the embeddings in the different embedding spaces into an embedding conversion machine learning model to convert the embeddings into a composite embedding space that is shared across different types of content items. The content evaluation system 4102 can execute a content scoring machine learning model to generate scores for the different types of content items based on the composite embeddings in the composite embedding space such that the content scoring machine learning model can generate consistent scores regardless of the type of the content item. In this way, the content evaluation system 4102 can overcome an inherent technical problem to machine learning models trained to process different types of content that, because the machine learning models typically require differing training data, the machine learning models may generate results (e.g., scores) that are not consistent across different formats or types of content.

The sequence 4100 may involve the content evaluation system 4102 communicating with a computing device 4104. The computing device 4104 can be a server or other type of computing device. The computing device 4104 can be a computing device accessed by a user. The computing device 4104 can store and/or execute an application (e.g., a browser) to access the Internet or another communications network. Through the Internet or another communications network, the computing device 4104 can communicate with the content evaluation system 4102.

For example, in the sequence 4100, the computing device 4104 can execute an application to communicate with the content evaluation system 4102. In doing so, the computing device 4104 can transmit an image 4124 to the content evaluation system 4102. The image 4124 can be the image of a vehicle, such as a bus, or depict any other object. The computing device 4104 can transmit the image 4124 to the content evaluation system 4102 in a request, such as a request to generate a score (e.g., an image performance score for the image 4124). The content evaluation system 4102 can receive the image 4124 and perform the systems and methods described herein to generate a score for the image 4124. The content evaluation system 4102 can generate a record containing the score and/or the image 4124. The content evaluation system 4102 can store the record in memory and/or transmit the record back to the computing device 4104.

The content evaluation system 4102 may comprise one or more processors that are configured to use a multi-modal machine learning architecture to generate scores for different types of content items. In some embodiments, the content evaluation system 4102 can be or include executable code of the content evaluation system 1005. The content evaluation system 4102 may comprise a network interface, a processor, and/or memory (or the content evaluation system 1005 can include such components). The content evaluation system 4102 may communicate with the computing device 4104 via the network interface, which may be or include an antenna or other network device that enables communication across a network and/or with other devices. The processor may be or include an ASIC, one or more FPGAs, a DSP, circuits containing one or more processing components, circuitry for supporting a microprocessor, a group of processing components, or other suitable electronic processing components. In some embodiments, the processor may execute computer code or modules (e.g., executable code, object code, source code, script code, machine code, etc.) stored in memory to facilitate the activities described herein. The memory may be any volatile or non-volatile computer-readable storage medium capable of storing data or computer code. The content evaluation system 4102 can be the same as or include similar components to the content evaluation system 3902.

The content evaluation system 4102 can include a communicator 4108, a content evaluator 4110, a model manager 4112, and a video evaluator 4114. The components 4108-4114 can be stored in the memory of the content evaluation system 4102. The communicator 4108 may comprise programmable instructions that, upon execution, cause the processor of the content evaluation system 4102 to communicate with the computing device 4104 and/or any other computing device. The communicator 4108 may be or include an application programming interface (API) that facilitates communication between the computing device 4104 (e.g., via the network interface of the content evaluation system 4102) and other computing devices. The communicator 4108 may communicate with the computing devices 4104 and/or any other computing device across a network.

The content evaluation system 4102 can establish a connection with the computing device 4104. The communicator 4108 can establish the connection with the computing device 4104 over a network. To do so, the communicator 4108 can communicate with the computing device 4104 across the network. In one example, the communicator 4108 can transmit a syn packet to the computing device 4104 (or vice versa) and establish the connection using a TLS handshaking protocol. The communicator 4108 can use any handshaking protocol to establish a connection with the computing device 4104.

The content evaluator 4110 may comprise programmable instructions that, upon execution, cause the processor of the content evaluation system 4102 to calculate or generate scores (e.g., performance scores) for different types of content. The content evaluator 4110 may use a multi-modal architecture to do so. For example, the content evaluator 4110 can be the same as or similar to the performance measurement module 1065 of the content evaluation system 1005 and/or the content evaluator 3910 of the content evaluation system 4102. The content evaluator 4110 may include one or more machine learning models (e.g., neural networks) that are respectively configured to extract features from images and generate scores for the content items based on the extracted features.

The model manager 4112 may comprise programmable instructions that, upon execution, cause the processor of the content evaluation system 4102 to train and/or operate the different machine learning models of the content evaluator 4110. The model manager 4112 may be configured to train the content scoring machine learning model 4116 to generate scores for different types (e.g., formats) of content items. For instance, the model manager 4112 can be configured to train the content scoring machine learning model to generate scores for images, videos, text, audio segments, etc. In doing so, the model manager 4112 can train the content scoring machine learning model 4116 to generate performance scores that indicate a likelihood of interaction or performance of different types of content items when presented in different computing environments (e.g., on a radio, on television, on a website, etc.).

The content evaluator 4110 can be the same as or similar to the image evaluator 2110, shown and described with reference to FIG. 21. The content evaluator 4110 can include the content scoring machine learning model 4116, an image feature extraction machine learning model 4118, a video feature extraction machine learning model 4120, and an embedding conversion machine learning model 4122. The content evaluator 4110 can include feature extraction machine learning models for any type of content item. The content evaluator 4110 may use the image feature extraction machine learning model 4118 to generate embeddings of extracted features from images in an image embedding space and the video feature extraction machine learning model 4120 to generate embeddings of extracted features from videos in a video embedding space. The content evaluator 4110 can convert the embeddings in the different embedding spaces into a composite embedding space that is common across different types of content items (e.g., images, videos, sets of text, audio segments, etc.). The content scoring machine learning model 4116 can use the embeddings to generate scores (e.g., performance scores or content performance scores) for the content items based on the embeddings representing extracted features. Because the embeddings share the composite embedding space for different types of content items, the content scoring machine learning model 4116 can generate scores that are consistent across the different types of content items.

The image feature extraction machine learning model 4118 can be a machine learning model (e.g., a neural network, a support vector machine, a random forest, etc.) that has been configured or trained to extract sets of features specifically from images and generate an embedding (e.g., a numerical vector), such as a feature embedding or an image feature embedding, for each respective set of features or image. In one example, the image feature extraction machine learning model 4118 can be a contrastive language-image pre-training (CLIP) machine learning model configured or trained to generate embeddings from both text and images. The image feature extraction machine learning model 4118 can be any type of machine learning model that is configured to generate embeddings of features for one or more multiple types of content items.

In one example, the image feature extraction machine learning model 4118 may create feature vectors from images by extracting individual features from the images. For example, the image feature extraction machine learning model 4118 may be configured to automatically extract features from the image. Such features can be or can include descriptors of the image such as identifications of objects within the image, colors within the image, scenery within the image, shades of colors within the image, etc. In this example, the model manager 4112 can execute the image feature extraction machine learning model 4118 with the image and output values for the different features, thus extracting features from the image. The content evaluator 4110 can format the extracted features into an embedding for the image by setting the values for the extracted features at different index values of the vector or by otherwise concatenating the values of the extracted features together.

The video feature extraction machine learning model 4120 can be a machine learning model (e.g., a neural network, a support vector machine, a random forest, etc.) that has been configured or trained to extract sets of features specifically from videos and generate an embedding (e.g., a numerical vector), such as a feature embedding or a video feature embedding, for each respective set of features or video. In one example, the video feature extraction machine learning model 4120 can be trained to extract features corresponding to different scenes or actions being performed across frames, objects depicted in frames, sentiments of scenes, length of time an object is depicted or depicted in a single location, colors in the frames, etc. The features can be features for individual frames of the video, sequences of frames for the video, or for any other part or group of parts of the video. The video feature extraction machine learning model 4120 can be trained or configured to generate video embeddings in a video embedding space that is specific to embeddings of features of videos (e.g., a separate embedding space from the image embedding space of image embeddings generated by the image feature extraction machine learning model 4118).

The content evaluator 4110 can include feature extraction machine learning models for any number of different types or formats of content. By using different feature extraction machine learning models for different types of content, the content evaluator 4110 can reduce the processing resources and training data that is required to train the respective feature extraction machine learning models.

The embedding conversion machine learning model 4122 can be a machine learning model (e.g., a neural network, a support vector machine, a random forest, etc.) that has been configured or trained to convert embeddings from different embedding spaces into a common or composite embedding space. The embedding conversion machine learning model 4122 can be trained in tandem or in parallel with the content scoring machine learning model 4116 such that the content scoring machine learning model 4116 can be trained or configured to use the embeddings in the composite embedding space to generate performance scores for different types of content. In one example, the embedding conversion machine learning model 4122 can be configured to receive feature embeddings from different embedding spaces (e.g., embedding spaces for different types of content items) and change or adjust the embeddings into composite embeddings in a composite embedding space. In doing so, the embedding conversion machine learning model 4122 can create a shared embedding space for different machine learning models that can then be used by the content scoring machine learning model 4116 to generate scores for content items that are agnostic or consistent across different types of content items.

The content scoring machine learning model 4116 can be a machine learning model (e.g., a neural network, a support vector machine, a random forest, etc.) that is configured to receive as input embeddings (e.g., numerical vectors) from the composite embedding space and representing features of different types of content items. The content scoring machine learning model 4116 can generate scores (e.g., performance scores or content performance scores) for the content items based on the respective embeddings in the composite embedding space. In one example, the scores can be or include a likelihood that a user would interact with the images if they were viewing or listening to the content items on a web page or another type of platform. The content scoring machine learning model 4116 can be configured to generate a score for a content item by applying internal trained or learned weights and/or parameters to the embedding representing features of the content item. The score can be a number within a defined range (e.g., 1-100, 1-10, 0-1, etc.). The content scoring machine learning model 4116 can be the same as or similar to a machine learning model (e.g., a second machine learning model configured to generate performance scores) of the image evaluator 2110, shown and described with reference to FIG. 21, and/or the content scoring machine learning model 3914, shown and described with reference to FIG. 39.

The model manager 4112 can execute the content scoring machine learning model 4116 to generate scores for different types of content items. For example, the content evaluation system 4102 can receive the image 4124 from the computing device 4104 through the communicator 4108. The model manager 4112 can execute the image feature extraction machine learning model 4118 using the image 4124 as input to generate an embedding in the image embedding space identifying or representing extracted features for the image 4124. The model manager 4112 can feed the embedding into the embedding conversion machine learning model 4122 and execute the embedding conversion machine learning model 4122 to generate a composite embedding in the composite embedding space. The model manager 4112 can feed the composite embedding into the content scoring machine learning model 4116 to generate a score for the image 4124. Accordingly, the model manager 4112 can use the machine learning models of the content evaluator 4110 to automatically generate a score for the image 4124.

In some embodiments, the content evaluator 4110 can include multiple content scoring machine learning models 4116 that are configured to generate scores. Each content scoring machine learning model 4116 may be trained to generate scores for a different target audience. For example, each content scoring machine learning model 4116 may be trained based on training data generated from interaction data generated from users of a specific target audience (e.g., users who have a specific characteristic (e.g., age, age within a range, gender, etc.) and/or who otherwise have specific interests (e.g., sports, movies, books, genres of books, types of sports, jobs, etc.)). The content scoring machine learning models 4116 may be trained (e.g., by the content evaluation system 1005 or another data processing system) by labeling images with interaction data from the specific target audiences and training the machine learning models for the same target audiences with the labeled training data to generate scores for the images. In training the machine learning models in this way, each machine learning model may be trained to simulate a target audience and how a member of the target audience will interact with specific images.

The model manager 4112 can generate scores (e.g., target audience scores) that correspond to different target audiences for the image 4124. For example, the model manager 4112 can feed the embedding for the image 4124 into the content scoring machine learning models 4116 that correspond to the different target audiences. The model manager 4112 can execute the content scoring machine learning model 4116 to generate different target audience scores for the image 4124. The model manager 4112 can similarly generate one or more target audience scores for any type of content item. The model manager 4112 can generate a record (e.g., a file, document, table, listing, message, notification, etc.) containing one or more, or all, of the target audience scores and/or the image 4124 and store the record in memory.

The model manager 4112 can similarly generate a score and/or one or more target audience scores for a video 4126 that the content evaluation system 4102 receives from the computing device 4104. For example, the content evaluation system 4102 can receive the video 4126 from the computing device 4104 through the communicator 4108. The model manager 4112 can execute the video feature extraction machine learning model 4120 using the video 4126 as input to generate an embedding in the video embedding space identifying or representing extracted features for the video 4126. The model manager 4112 can feed the embedding into the embedding conversion machine learning model 4122 and execute the embedding conversion machine learning model 4122 to generate a composite embedding in the composite embedding space. The model manager 4112 can feed the composite embedding in the content scoring machine learning model 4116 to generate a score for the video 4126 and/or one or more content scoring machine learning models 4116 trained to simulate different target audiences to generate target audience scores for the video 4126. Accordingly, the model manager 4112 can use the machine learning models of the content evaluator 4110 to automatically generate a score for the video 4126.

The model manager 4112 can train the content scoring machine learning model 4116 and/or the embedding conversion machine learning model 4122. For example, the model manager 4112 can receive a plurality of training images. The model manager 4112 can receive interaction data (e.g., engagement feedback comprising a set of interactions, such as time viewed, number of clicks, likes, dislikes, comments, ratings, etc.) for each of the training images indicating how individuals interacted with the training images on a website, or any other type of interaction data as described herein. The model manager 4112 can execute the image feature extraction machine learning model 4118 using each of the plurality of training images as input to generate a training embedding for each of the plurality of training images. Each training embedding can be in the image embedding space. The model manager 4112 can similarly generate training embeddings for other types of content items, such as videos, text, and/or audio.

The model manager 4112 can feed the training embeddings into the embedding conversion machine learning model 4122. In doing so, the model manager 4112 can execute the embedding conversion machine learning model 4112 to convert the training embeddings into composite embeddings in the composite embedding space.

The model manager 4112 can feed the composite embeddings into the content scoring machine learning model 4116. The model manager 4112 can do so to train the content scoring machine learning model 4116, the image feature extraction machine learning model 4118, and/or the embedding conversion machine learning model 4122. For example, the model manager 4112 can label each training embedding with engagement feedback corresponding to the training image from which the training embedding was generated. For each training embedding, the model manager 4112 can feed the training embedding into the content scoring machine learning model 4116. The content scoring machine learning model 4116 can generate a score (e.g., a performance score) for the training image. The model manager 4112 can use a loss function and back-propagation techniques based on the score and the engagement feedback for the training image (e.g., based on a difference between the score and the engagement feedback). The model manager 4112 can use the back-propagation techniques to adjust the internal weights and/or parameters of the content scoring machine learning model 4116 to train the content scoring machine learning model 4116. In some cases, the model manager 4112 can additionally or instead use back propagation techniques to train the embedding conversion machine learning model 4122 and/or the image feature extraction machine learning model 4118 based on the difference such that each of the models 4116, 4118, and/or 4122 are trained together based on individual training images. The model manager 4112 can similarly use each training image, or training embedding generated from a training image, to train the content scoring machine learning model 4116, the image feature extraction machine learning model, and/or the embedding conversion machine learning model 4122. In some cases, feature extraction machine learning models may not be trained or adjusted based on content items of types of content different from the types of content from which the feature extraction machine learning models are configured to extract features to avoid improperly biasing the feature extraction machine learning models.

In some cases, training the content scoring machine learning model 4116 can involve calculating an engagement metric from engagement feedback for a training image. For example, the model manager 4112 can identify the engagement feedback for a training image. The model manager 4112 can calculate or determine an engagement metric as a function (e.g., a sum, average, or median function) of the engagement feedback for the training image. The model manager 4112 can use the engagement metric as a label and use back-propagation techniques to adjust the internal parameters and/or weights of the content scoring machine learning model 4116, the image feature extraction machine learning model 4118, and/or the embedding conversion machine learning model 4122 based on a difference between the score (e.g., performance score or training performance score) the content scoring machine learning model 4116 generates for the training image and the engagement metric to train the content scoring machine learning model 4116.

In some embodiments, the model manager 4112 can train the content scoring machine learning model 4116, the video feature extraction machine learning model 4120, and/or the embedding conversion machine learning model 4122 based on training videos. For example, the convent evaluation can receive a plurality of training videos (e.g., from a remote computing device). The model manager 4112 can execute the video feature extraction machine learning model 4120 to generate embeddings for the training videos in the video embedding space. The model manager 4112 can execute the embedding conversion machine learning model 4122 to convert the embeddings in the video embedding space into the composite embedding space. The model manager 4112 can obtain interaction data for each of the plurality of training videos. The model manager 4112 can generate performance scores (e.g., video performance scores) for the training videos based on the composite embeddings generated for the training videos training embeddings. The model manager 4112 can use back-propagation techniques based on differences between the performance scores and interaction data/engagement feedback or engagement metrics to adjust the weights and/or parameters of the content scoring machine learning model 4116, the video feature extraction machine learning model 4120, and/or the embedding conversion machine learning model 4122.

The model manager 4112 can similarly train the content scoring machine learning model 4116, the embedding conversion machine learning model 4122, and/or a corresponding feature extraction machine learning model 4120 in the aforementioned way for any number of types of content items. In doing so, the model manager 4112 can expand the scope of the composite embedding space such that the composite embedding space can accurately represent the different types of content items, and the content scoring machine learning model 4116 can use composite embeddings from the composite embedding space to generate scores for the respective types of content items.

Advantageously, the configuration of the machine learning architecture of the models 4116-4122 facilitate training the embedding conversion machine learning model 4122 and the content scoring machine learning model 4116 to process content items of a particular type with fewer samples of the type.

Subsequent to training the content scoring machine learning model 4116 (e.g., using the plurality of training images or only the plurality of training images), the model manager 4112 can use the content scoring machine learning model 4116 to generate scores for different modalities, formats, or types of content items. For example, subsequent to training the content scoring machine learning model 4116, the model manager 4112 can receive the video 4126 from the computing device 4104. The content scoring machine learning model 4116 can execute the video feature extraction machine learning model 4120 as input to generate a video embedding in the video embedding space of the video feature extraction machine learning model. The embedding can represent one or more features of the video 4126. The model manager 4112 can feed the embedding for the video 4126 into the embedding conversion machine learning model 4122 and execute the embedding conversion machine learning model 4122 to generate a composite embedding in the composite embedding space of the embedding conversion machine learning model 4122.

The model manager 4112 can feed the composite embedding for the video 4126 into the content scoring machine learning model 4116 and execute the content scoring machine learning model 4116. The execution can cause the content scoring machine learning model 4116 to generate a score (e.g., a video performance score) for the video 4126.

The model manager 4112 can generate a record identifying the score for the video 4126. The model manager 4112 can store the record in memory and/or transmit the record to the computing device 4104. The computing device 4104 can display the score and/or the video 4126 on a user interface responsive to receiving the record. The model manager 4112 can similarly train and/or use the content scoring machine learning model 4116 to generate scores for any type of content item.

In some embodiments, the composite embedding space can be an embedding space for one of the modalities themselves. For example, instead of having a composite image and text embedding, the embedding conversion machine learning model 4122 may convert embeddings generated from different types of content items into embeddings for a specific type of content item. For example, the composite embedding space can be an embedding space for image embeddings. The embedding conversion machine learning model 4122 can convert embeddings from different types of content items into embeddings in the image embedding space, in some cases without performing any conversion for image embeddings. The content scoring machine learning model 4116 can generate scores for such embeddings, such as because the content scoring machine learning model 4116 may be configured to generate scores specifically for image embeddings. convert the text embedding into the image embedding using the embedding conversion and then use an audience image scoring model to score both image and text.

In some cases, the model manager 4112 can generate recommendations for adjusting or changing the image 4124 using the content evaluator 4110. For example, the model manager 4112 can compare the score for the image 4124 to a threshold (e.g., a predetermined threshold). The model manager 4112 may determine the score for the image 4124 is below the threshold. Responsive to the determination, the model manager 4112 can generate an impact score for each of one or more features of the image 4124 that indicates the impact the respective features had on the score for the image 4124. To calculate the impact scores for the features of the image 4124, the model manager 4112 can extract one or more values from one or more signals between an intermediate layer of the content scoring machine learning model 4116 and a regression layer or a classification layer of the content scoring machine learning model 4116. The content scoring machine learning model 4116 may have generated the one or more values during execution to generate the score for the image 4124. The model manager 4112 can calculate impact scores for the individual features using back-propagation techniques on the extracted values from the neural network and identify the gradient at the nodes for the individual features that indicate the impact a change in the weights of the signals from the nodes would have on the final score. The model manager 4112 can compare the impact scores of the different features for the image 4124 to a threshold (e.g., a second predetermined threshold) and generate a recommendation to change or adjust any feature that corresponds with an impact score below the threshold.

The model manager 4112 can train models 4116-4120 to simulate a specific target audience. The model manager 4112 can do so using images, videos, and/or any other type of content item that are labeled with the target audience (e.g., the same target audience). The model manager 4112 may label the training content items based on a data source (e.g., a website, platform, computing device, or database) from which the training content items originated or were extracted. The different data sources may each correspond to (e.g., have a stored association in a database with) a specific set of one or more target audiences, such as with target audiences that typically visit or access the data sources. The model manager 4112 can label the content items that are extracted from or otherwise originate from (e.g., are received from) the respective data sources with tags or labels of the target audience or target audiences corresponding to the data sources. The model manager 4112 can identify the training content items labeled with the same target audience identifier from memory and generate training embeddings with the training content items using the feature extraction machine learning models configured to extract features from the respective types of machine learning models. The model manager 4112 can feed the training embeddings into the embedding conversion machine learning model 4122 to generate a composite embedding for each training content item. The model manager 4112 can retrieve the composite embeddings and the interaction data that corresponds to the respective composite embeddings and train the content scoring machine learning model 4116 to generate scores (e.g., performance scores) that simulate how the target audience would react to new content items. The model manager 4112 can similarly train different versions of copies of the models 4116-4120 with training content items that correspond to different target audiences to simulate the different target audiences. The model manager 4112 can store the different sets of models 4116-4120 in memory with associations with identifiers of the target audience or target audiences that correspond to the sets of models 4116-4120 (e.g., in different versions of the content evaluator 4110).

The model manager 4112 can use the trained sets of models 4116-4120 to generate scores for different target audiences for a content item. For example, the model manager 4112 can receive a request comprising an image and an identifier of a target audience from a client device. The model manager 4112 can retrieve a set of the models 4116-4120 from memory that corresponds to an identifier of the same target audience as the target audience identified in the request. The model manager 4112 can execute the image feature extraction machine learning model 4118 of the retrieved set of models using the image to generate an image embedding for the image in response to the request from the client device. The model manager 4112 can execute the retrieved embedding conversion machine learning model 4122 using the image embedding to generate a composite embedding for the image. The model manager 4112 can execute the retrieved content scoring machine learning model 4116 using the composite embedding as input to generate an image performance score (e.g., a target audience score) for the image. The model manager 4112 can transmit the image and/or the image performance score for the image back to the client device in a record. The client device can receive the record and display the contents of the record on a user interface.

In some embodiments, the model manager 4112 can train the embedding conversion machine learning model 4122 without using any audience performance data. For example, the model manager 4112 can receive image-video pair samples each including a video and an image. The model manager 4112 can extract features from each the respective videos and images of the samples using the respective image feature extraction machine learning model 4118 and the video feature extraction machine learning model 420 and generate a feature tensor for each of the image and video. The model manager 4112 can determine a distance between the tensors generated for each pair, such as by using a distance function.

Figure 42:
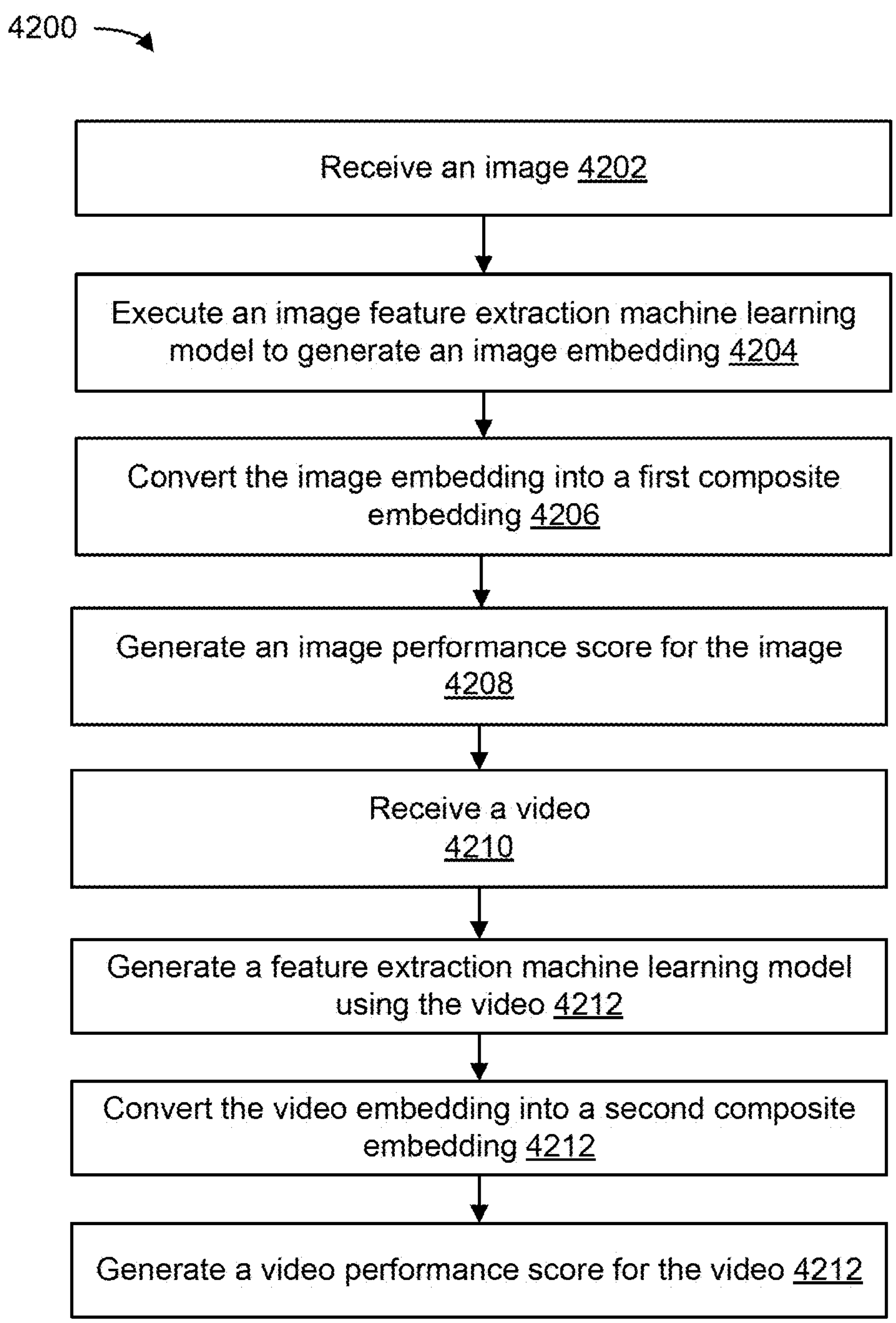
FIG. 42 is a flow diagram illustrating a method for multi-modal content processing in accordance with an illustrative embodiment.

FIG. 42 is a flow diagram illustrating a method 4200 for multi-modal content processing in accordance with an illustrative embodiment. In some implementations, the method 4200 can be performed by a data processing system such as any of the components of the system 1000 shown in FIG. 10 or the content evaluation system 4102. The method 4200 may include more or fewer operations and the operations may be performed in any order. Performance of the method 4200 may enable the data processing system to generate scores for different types of content that are consistent across the different types of content. Although described as image content and video content, the method 4200 can be performed using any type and/or any number of types of content.

At operation 4202, the data processing system receives an image. The data processing system can receive the image from a remote computing device, such as a remote server or a client device. The server or client device can include the image in a request for a score (e.g., a performance score) for the image.

At operation 4204, the data processing system executes an image feature extraction machine learning model. The image feature extraction machine learning model can be a neural network. The data processing system can execute the image feature extraction machine learning model using the image (e.g., as input) to generate an image embedding in an image embedding space specific to the image feature extraction machine learning model. The image embedding can correspond to (e.g., represent) one or more features of the image.

At operation 4206, the data processing system converts the image embedding into a first composite embedding. To do so, the data processing system can execute an embedding conversion machine learning model (e.g., a neural network) using the image embedding as input. Based on the execution, the embedding conversion machine learning model can generate a composite embedding in a composite embedding space (e.g., a shared space between embeddings of images, videos, and/or any other type of content for which the embedding conversion machine learning model is trained to generate composite embeddings) for the image. The composite embedding can be a numerical vector containing numbers that represent different features or combinations of features of an image.

At operation 4208, the data processing system generates a score for the image. The data processing system can generate the score for the image using a content scoring machine learning model (e.g., a neural network). The content scoring machine learning model may be trained to generate such scores based on composite embeddings in the composite embedding space of the embedding conversion machine learning model. The data processing system can execute the content scoring machine learning model using the composite embedding as input to generate a score (e.g., an image performance score) for the image.

The data processing system can generate a record containing the image score and/or the image. The data processing system can store the record in memory and/or transmit the record to the remote computing device that transmitted the request for the score. The remote computing device can receive the record and present the contents of the record on a user interface.

At operation 4210, the data processing system receives a video. The data processing system can receive the video from a remote computing device (e.g., the same remote computing device that transmitted the image to the data processing system or a different remote computing device), such as a remote server or a client device. The server or client device can include the video in a request for a score (e.g., a performance score) for the video.

At operation 4212, the data processing system executes a video feature extraction machine learning model. The video feature extraction machine learning model can be a neural network. The data processing system can execute the video feature extraction machine learning model using the video (e.g., as input) to generate a video embedding in a video embedding space specific to the video feature extraction machine learning model and different from the image embedding space of the image feature extraction machine learning model. The video embedding can correspond to (e.g., represent) one or more features of the video.

At operation 4214, the data processing system converts the video embedding into a second composite embedding. To do so, the data processing system can execute the embedding conversion machine learning model using the video embedding as input. Based on the execution, the embedding conversion machine learning model can generate a composite embedding in the composite embedding space for the video. The composite embedding can be a numerical vector.

At operation 4216, the data processing system generates a video performance score for the video. The data processing system can generate the video performance score for the video using the content scoring machine learning model (e.g., the same content scoring machine learning model that generated the image performance score for the image). The data processing system can execute the content scoring machine learning model using the composite embedding for the video as input to generate a score (e.g., a video performance score) for the video.

The data processing system can generate a record containing the video score and/or the video. The data processing system can store the record in memory and/or transmit the record to the remote computing device that transmitted the request for the score. The remote computing device can receive the record and present the contents of the record on a user interface.

Generating scores for videos in the above-described manner can incur technical drawbacks. For instance, when using machine learning for video content analysis, the use of a single performance score can pose significant challenges in accurately interpreting the reasoning behind the score. Video performance is inherently multifaceted, influenced by diverse factors such as visual quality, audio clarity, narrative coherence, and viewer engagement. A singular score can fail to capture the nuanced interactions between these elements, potentially masking critical insights into specific strengths or weaknesses within the video.

These limitations of developing reasoning for video scores are compounded when using machine learning models. Machine learning models, particularly deep neural networks, operate as black boxes, meaning they internally process vast amounts of data to produce outputs without explicit transparency into the specific features or criteria influencing their decisions. This lack of interpretability complicates efforts to understand how and why a particular score is assigned to a video. Without clear visibility into the underlying factors considered by the model, it can be difficult to pinpoint which aspects of the video content contribute positively or negatively to the performance score. This opacity can obscure actionable insights needed for targeted improvements and strategic decision-making in content creation, distribution, and platform management. Therefore, while machine learning enhances scalability and efficiency in scoring video performance, it can require development of interpretive frameworks or supplementary tools that explain the rationale behind generated scores.

For example, attempts to determine the reasoning behind machine learning model outputs have included using explanatory models (e.g., a game theory-based model, such as a Shapley Additive explanations (SHAP) model or a Kernel SHAP, a perturbation-based model, such as a Local Interpretable Model-Agnostic Explanations (LIME) model, a Deterministic Local Interpretable Model-Agnostic Explanations (D-LIME) model, or saliency techniques (e.g., SmoothGrad, Vanilla Gradients, Guided Back propagation, Integrated Gradients, Grad-CAM)) model that are configured to identify the impact of different features on a particular prediction as explanations for the prediction. However, even these explanatory models have shortcomings. For example, such explanatory models may provide unstable explanations and diverge from their promised theoretical properties. Further, using explanatory models can require a substantial amount of processing power given the large number of model executions the explanatory models may require to generate explanations for performance scores the machine learning model may generate for images.

A system implementing the systems and methods described herein can overcome the aforementioned difficulties. The system can implement a segmenting technique in combination with the multi-modal architecture described above to do so. For instance, a computer can divide or segment a video into fixed-length or variable-length segments. The computer can feed each individual segment into a multi-modal architecture, as described above, to generate a separate score (e.g., video segment score or video segment performance score) for the segment. The computer can execute a function or algorithm on the scores to generate a final or composite score (e.g., video score or video performance score) for the video. In this way, the system can use a time-based system to parse out a reasoning (e.g., which segments are impacting the score and how the segments are impacting the score) for why the machine learning architecture generated the score for the video using less processing power than other explanatory models (e.g., because the iterative backward-looking execution is not required).

For example, referring again to FIG. 41, the content evaluation system 4102 can execute the video evaluator 4114 in tandem with machine learning models of the content evaluator 4110 to generate a score for a video. The video evaluator 4114 may comprise programmable instructions that, upon execution, cause the processor of the content evaluation system 4102 to generate scores for video-type content items. The video evaluator 4114 can segment individual videos into segments. The video evaluator 4114 may segment a video into fixed-length segments or variable-length segments. The video evaluator 4114 can segment the video into segments that are predefined by the system or that are defined by a user. For example, for segments that are predefined by the system and are fixed-length, the video evaluator 4114 can divide the video into segments with a fixed or predefined size. The segments can have no overlap between each other or may have a predefined amount of overlap (e.g., an overlap between pairs of sequential segments) between each other. For example, if the length of the video and segment is 10 and 4 seconds, respectively, and the overlap value is 50%, the video evaluator 4114 can break or divide the video into the following segments of time (e.g., in seconds of the video): [(0-4), (2-6), (4-8), (6-10)]. The values for the segment length or size and overlap can be configured by a user or administrator.

For segments that are defined by the video evaluator 4114 and are of variable length, the video evaluator 4114 can automatically detect edit points within the video. Edit points can each be a beginning and/or end of a respective segment of a video. The video evaluator 4114 can identify the edit points, for example, by using a machine learning model or rule-based model. For instance, the video evaluator 4114 may use or include a machine learning model (e.g., a neural network, a support vector machine, a random forest, etc.) that has been trained or configured to automatically detect edit points in videos. The machine learning model can detect edit points based on transitions within a video, changes in content, ends of sentences by a particular individual, changes in scenery, etc. The rule-based model can similarly detect transitions by using a series of rules that insert edit points at points in a video between frames or sets of frames that satisfy a criterion. The video evaluator 4114 can label or insert markings at the different points in the video that the video evaluator 4114 determined to be edit points. The video evaluator 4114 can segment or divide the video into segments or individual files between the inserted labels or edit points to segment the video.

For segments that are set by a user, a user accessing the content evaluation system 4102 can view the video and manually select points to be the beginning and/or ends of different segments. The user can set such points to set segments of fixed or varying lengths between each other. For example, a user can navigate through a video to find the section of the video that they want to score. In some cases, they can set the start and end of the segment they want to score. The video evaluator 4114 can receive the selection and insert edit points or labels in the selected areas. The video evaluator 4114 can segment the different segments of the video based on the edit points or labels.

For each segment of the video generated by the video evaluator 4114, the model manager 4112 can feed the segment into the video feature extraction machine learning model 4120 to generate a video segment embedding (e.g., a video segment for a segment of a video in the video embedding space of the video feature extraction machine learning model). The model manager 4112 can execute the embedding conversion machine learning model 4122 using the embedding generated for the video segment to generate a segment composite embedding. The model manager 4112 can feed the segment composite embedding into the content scoring machine learning model 4116 and execute the content scoring machine learning model 4116 (e.g., after the content scoring machine learning model 4116 has been trained as described above) to generate a segment score for the video segment. The model manager 4112 can similarly and iteratively propagate the segments of the video through the models of the content evaluator 4110 to the content scoring machine learning model 4116 to generate a segment score for each segment of the video. In some embodiments, the model manager 4112 can generate the segment scores for the segments using the content evaluator 3910, for example.

The video evaluator 4114 can determine a score (e.g., a video performance score) for the video based on the segment scores for the segments of the video. The video evaluator 4114 can do so as a function of the scores. For instance, the video evaluator 4114 can determine the score for the video to be an average, median, mode, aggregation, etc., of the segment scores for the segments of the video. In some cases, the video evaluator 4114 can weight the segments based on different factors, such as a length of a segment (e.g., longer segments may be weighted higher), a time (e.g., distance from the beginning of the video) of the segment in the video (e.g., earlier and/or later times of the beginning and/or end of a segment may correspond to a higher weight) when applying the function to the segment scores. The video evaluator 4114 can execute the function (e.g., with or without the weights for the segments) to generate the score for the video.

The video evaluator 4114 can generate a record based on the score for the video. For example, the video evaluator 4114 can generate a record that includes the score for the video, an identification of the video, and/or the video itself. The video evaluator 4114 can include the segment scores for the video in the record, in some cases, with identifications of the segments (e.g., numerical identifiers of the segments, images of the respective segments, sets of images of the respective segments, time ranges of segments, etc.). The video evaluator 4114 can store the record in memory and/or transmit the record to the computing device 4104.

The segment scores for the segments can be used to edit or change the video. For example, the video evaluator 4114 can rank the segments of the video based on the segment scores for the video. To do so, the video evaluator 4114 can compare the segment scores for the different segments of the video between each other. The video evaluator 4114 can rank or assign rankings to each of the segments according to the segment scores based on the comparison. For instance, the video evaluator 4114 can rank segments with higher segment scores higher than segments with lower segment scores. The video evaluator 4114 can identify or extract one or more images from each of the segments. The video evaluator 4114 can present the images for the respective segments, in some cases concurrently with the scores for the segments, on a user interface at the computing device 4104 in order according to the rankings of the segments. A user accessing the computing device 4104 can view the rankings and/or the order of the segments and determine which segments to remove from the video, segments to add to the video, and/or segments to change or rearrange in the video.

The video evaluator 4114 can extract or identify the images for each of the segments using a machine learning model. For example, the video evaluator 4114 can feed the individual frames of the segments into the content evaluator 4110 (e.g., the image feature extraction machine learning model 4118 of the content evaluator 4110) and cause the content scoring machine learning model 4116 to generate a score for each image. The video evaluator 4114 can compare the scores of the images within individual segments and identify the highest scoring image or set of images (e.g., of a defined size). The video evaluator 4114 can identify the highest scoring image or set of images for a segment, and do so for each segment. The video evaluator 4114 can present the identified image or set of images on the user interface being displayed at the computing device 4104. The video evaluator 4114 can display the images or sets of images on the user interface in order based on the rankings of the segments from which the images or sets of images were identified. The video evaluator 4114 can include the scores for the respective segments adjacent or next to the images or sets of images of the respective segments.

The user accessing the computing device 4104 can view the images or sets of images on the user interface and use an editing application (e.g., a video editing application) executing on or accessed by the computing device 4104 to edit the video. For instance, the user can view the scores for the segments and identify the lowest scoring segments. The user can select options in the editing application to remove the lowest scoring segments. In some cases, the user can edit the lowest scoring segments, such as by adjusting the sound or the coloring of the segments, using the editing application. The user can additionally or instead select options to rearrange the segments or crop or cut the segments using different inputs in the editing application.

Subsequent to editing the segments of the video, the user can select an option to generate a new score for the video. For example, the user can cause the editing application to package or generate a new video including any edits the user input for the segments of the video. After doing so, the user can select an option to transmit the edited video back to the content evaluation system 4102 with a request for a new score for the edited video. The content evaluation system 4102 can receive the request and repeat the process of generating segment scores for segments of the edited video and generate a new score for the video. The content evaluation system 4102 can transmit the scores for the segments, selected images from the segments, the score for the edited video, and/or the edited video itself back to the computing device 4104. The computing device 4104 can present the data received from the content evaluation system 4102 to the user. The user can use the updated scores to further edit the video. The user can repeat this process any number of times to optimize or improve the score of the video.

In some cases, the content evaluation system 4102 can automatically edit videos. For example, after scoring the individual segments of a video, the video evaluator 4114 can compare the scores of the segments of the video with each other. The video evaluator 4114 can identify a defined number of the lowest scoring segments. The video evaluator 4114 can automatically remove the identified lowest scoring segments from the video. The video evaluator 4114 can concatenate the remaining segments of the video together to generate an updated video. The video evaluator 4114 can transmit the updated video back to the computing device 4104. In some cases, the content evaluation system 4102 can do so based on a request for an improved or higher scoring video from the computing device 4104. In some cases, the content evaluation system 4102 can use a content evaluator 4110 that corresponds to a particular target audience, such as a target audience identified in a request, to generate the scores.

In another example, responsive to receiving a request for a higher scoring video (e.g., from the computing device 4104), the video evaluator 4114 can compare scores for segments and identify a defined number of segments associated with the highest scores. The video evaluator 4114 can combine or concatenate the identified segments to generate an updated video or a concatenated video. In some cases, the content evaluation system 4102 can use a content evaluator 4110 that corresponds to a particular target audience, such as a target audience identified in a request, to generate the scores. The video evaluator 4114 can transmit the updated video or concatenated video to the computing device 4104 and/or store the concatenated video in memory.

In some embodiments, the video evaluator 4114 can identify thumbnails for different videos. The thumbnails can be or include images that represent, identify, or depict videos. The video evaluator 4114 can identify the thumbnails using the content evaluator 4110. For instance, the content evaluator 4110 can generate segment scores for different segments of a video and image scores for individual frames of the video. The video evaluator 4114 can compare the segment scores between each other and identify the highest scoring segment based on the comparison. The video evaluator 4114 can then compare the image scores of the frames of the highest scoring segment between each other. Based on the comparison, the video evaluator 4114 can identify the highest scoring image or a defined number of the highest scoring images. The video evaluator 4114 can generate a record identifying or containing the highest scoring image or images. The video evaluator 4114 can store the record in memory or transmit the record to the computing device 4104. The computing device 4104 can present the identified image of defined number of images on a user interface. A user can view the user interface and select an image from the user interface to use as a thumbnail. In some cases, the content evaluation system 4102 can use a content evaluator 4110 that corresponds to a particular target audience, such as a target audience identified in a request, to generate the scores and/or identify the images. Thus, the content evaluation system 4102 can automatically generate recommendations for thumbnails for videos using the machine learning architecture of the content evaluator 4110.

Figure 43:
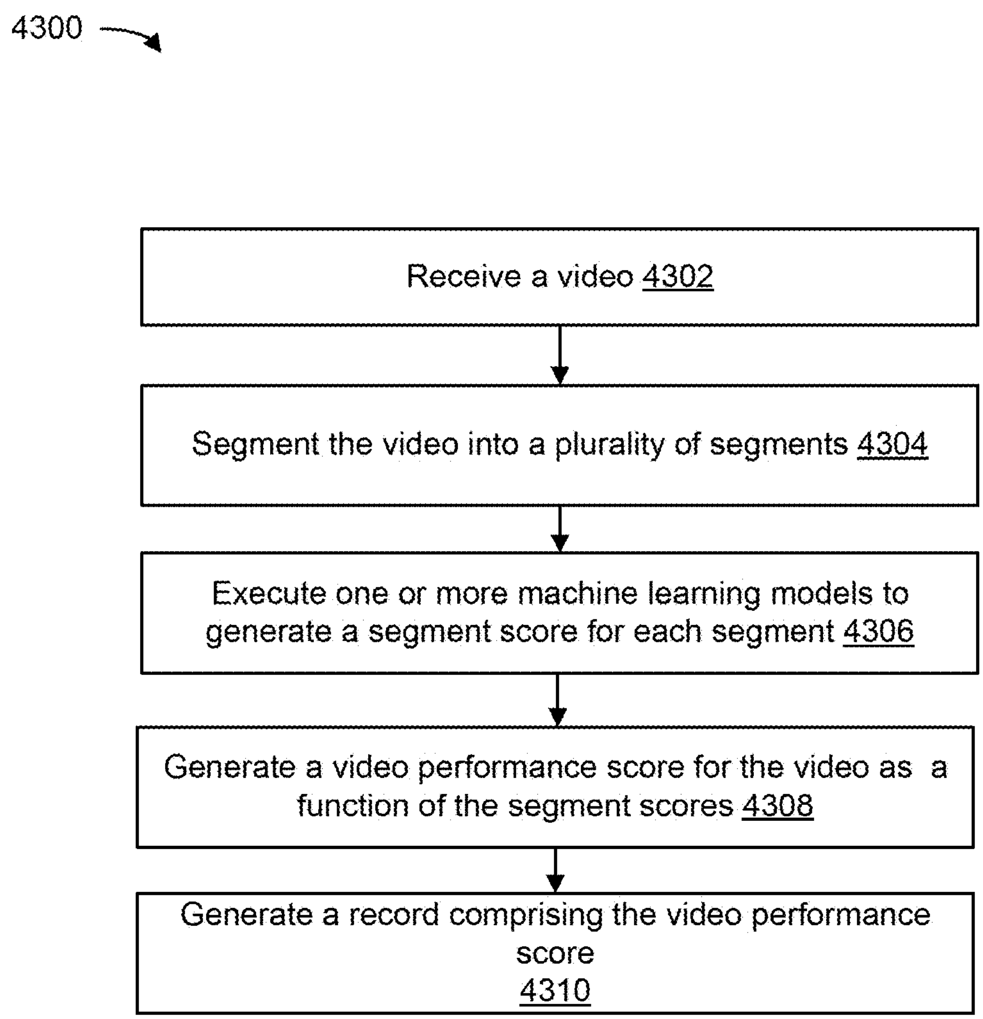
FIG. 43 is a flow diagram illustrating a method for video processing in accordance with an illustrative embodiment.

FIG. 43 is a flow diagram illustrating a method 4300 for video processing in accordance with an illustrative embodiment. In some implementations, the method 4300 can be performed by a data processing system such as any of the components of the system 1000 shown in FIG. 10 or the content evaluation system 4102. The method 4300 may include more or fewer operations and the operations may be performed in any order. Performance of the method 4300 may enable the data processing system to generate scores for videos using a machine learning architecture involving multiple models in a manner in which the scores are explainable despite the black-box nature of machine learning models.

At operation 4302, the data processing system receives a video. The data processing system can receive the video from a remote computing device, such as a remote server or a client device. The server or client device can include the video in a request for a score (e.g., a performance score) for the video.

At operation 4304, the data processing system segments the video into a plurality of segments. The data processing system can segment the video into segments by determining or identifying edit points (e.g., times) in the video. The segments can be distinct from each other and/or have an overlap between sequential pairs of the segments. For example, a user can manually select different points in the video to define the beginning and end of different segments. The data processing system can generate separate segments (e.g., files containing the content of the time intervals of the respective segments) based on the defined edit points of the video. In another example, the data processing system can automatically determine the segments. The data processing system can do so, for example, using a machine learning model trained to identify segments or edit points, such as based on transitions between scenes, transitions in the types of content depicted or contained between sequential segments, etc., or using a rule-based engine that uses rules based on similar instances to automatically determine or identify edit points in videos. The system can place the edit points to have a defined amount of overlap between sequential segments. The data processing system can segment or divide the video into the segments based on the sequential edit points that indicate the beginning and end of each segment.

At operation 4306, the data processing system executes one or more machine learning models. The data processing system can execute the one or more machine learning models to generate a segment score for each segment of the video. For instance, the data processing system can execute a video feature extraction machine learning model to generate a segment embedding for a segment of the video. The segment embedding can be in a video embedding space in which the video feature extraction machine learning model can generate embeddings for videos. The data processing system can execute an embedding conversion machine learning model on the segment embedding to generate a composite embedding for the segment. The composite embedding can be an embedding in a composite embedding space in which the embedding conversion machine learning model can generate composite embeddings based on embeddings of different types of content items in different embedding spaces. The data processing system can execute a content scoring machine learning model to generate a segment score for the segment. The data processing system can repeat this process for each segment of the video to generate a segment score for each segment of the video. The data processing system can use any type of machine learning model, such as those described herein, to generate scores for the segments of the video.

In some cases, the data processing system can generate a score for the segments for a particular target audience. The data processing system can do so based on a request from a computing device. For instance, the request for the score for the video can contain an identifier of a target audience. Based on the identifier, the data processing system can retrieve a video feature extraction machine learning model, an embedding conversion machine learning model, and/or a content scoring machine learning model that each correspond to an identifier of a target audience that matches the target audience identifier included in the request. The data processing system can use the retrieved machine learning models to generate segment scores for the segments of the request.

At operation 4308, the data processing system generates a video performance score for the video. The data processing system can generate the video performance score for the video as a function of the segment scores for the video. For example, the data processing system can determine or calculate an average, median, mode, sum, etc., on the segment scores for the video to generate the video performance score for the video. In some cases, the data processing system can weight segments for the generation, such as based on the length or time of the segments of the video (e.g., a distance of the segments from the beginning of the video). Weights can be determined based on length can be a function of the total size or length of the video (e.g., the length can be based on a percentage of the video of the segment). The data processing system can use the weights to determine the video performance score for the video, such as by determining a weighted average or sum of the segment scores corresponding to the weighted segments.

At operation 4310, the data processing system generates a record. The data processing system can include the video performance score for the video, the segment scores for the video, an identifier of the video, and/or the video itself in the record. The data processing system can store the record in memory for later retrieval and/or transmit the record to the client device that transmitted the video in the request. The client device can receive the record, extract the contents from the record, and present the contents of the record on a user interface.

Figure 44A:
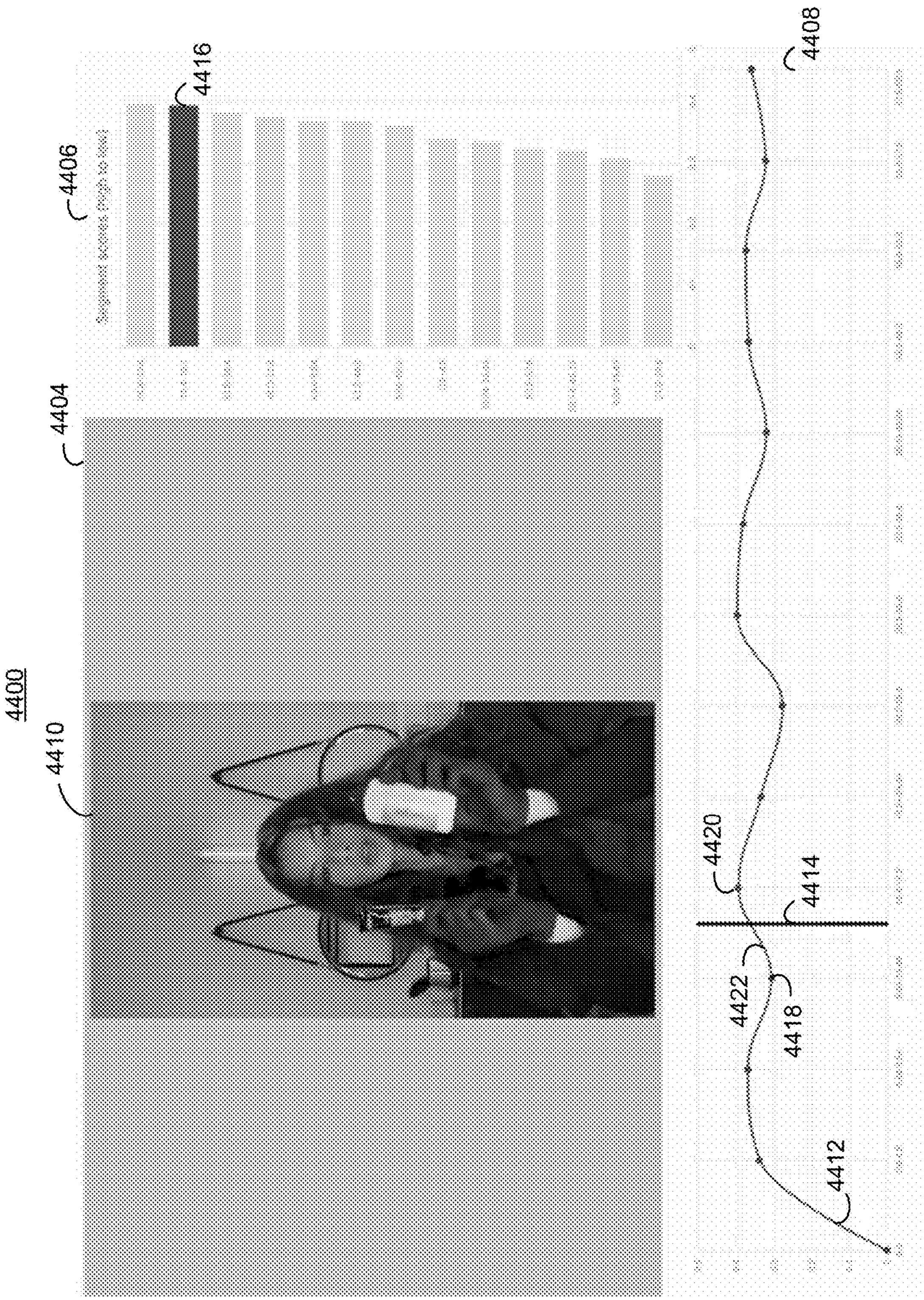
FIG. 44A illustrates an example user interface depicting dynamic video scoring in accordance with an illustrative embodiment.
Figure 44B:
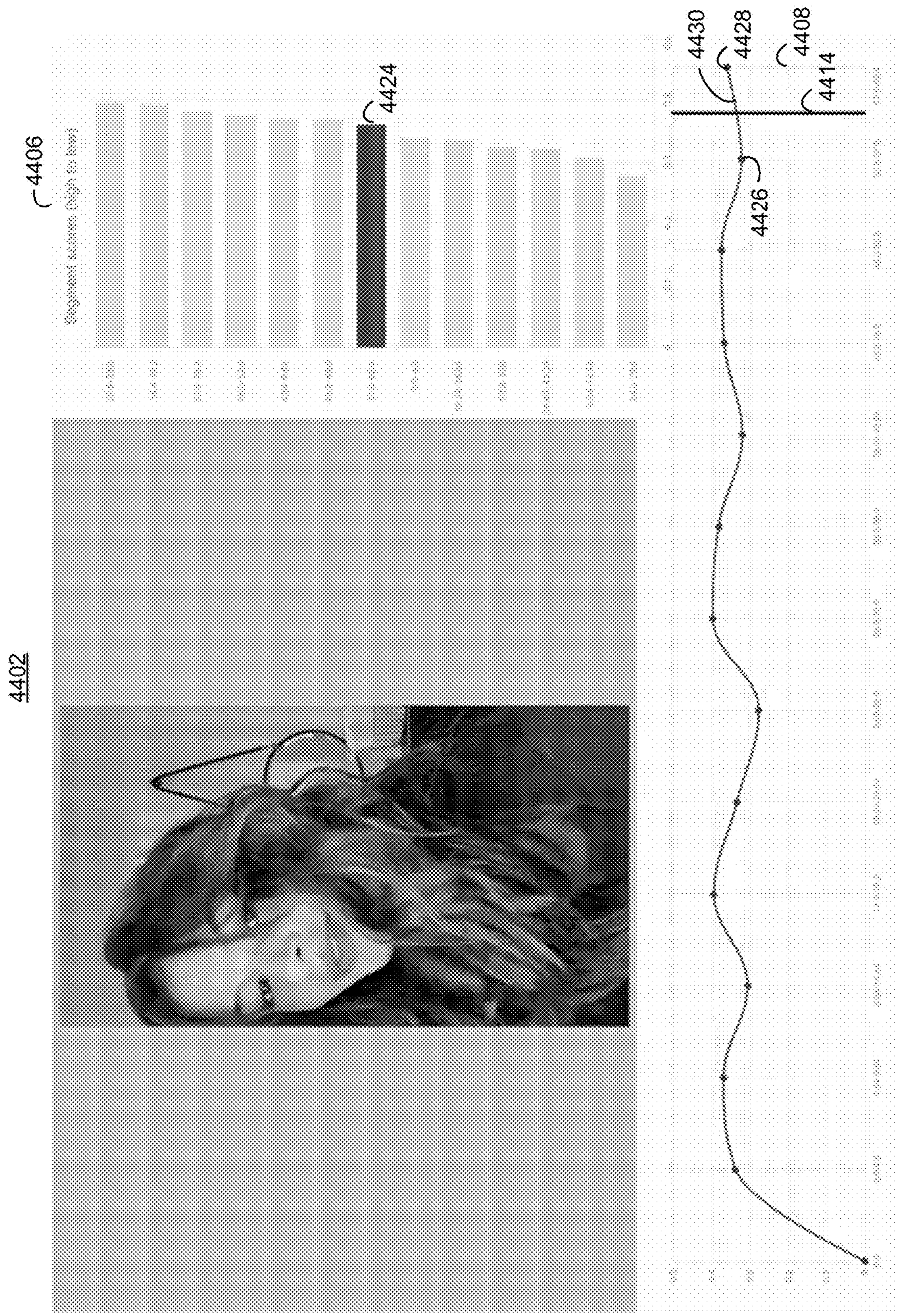
FIG. 44B illustrates an example user interface depicting dynamic video scoring in accordance with an illustrative embodiment.

FIGS. 44A and 44B depict user interfaces that a data processing system (e.g., the content evaluation system 4102) can generate to depict segment scores for a video generated using the systems and methods described herein. For example, after generating segment scores for segments of a video, the data processing system can generate user interfaces 4400 and 4402. The user interfaces 4400 and 4402 can each include a video interface 4404, a segment score graphic 4406, and a segment score graph 4408. The scored video can be displayed in the video interface 4404 in a player window 4410.

The segment score graphic 4406 can include an ordered representation of the scores of the segments of the videos. For instance, the scores for the segments can be displayed in an ordered list in which the highest scoring segments are included in the top of the list. The segment score graphic 4406 can identify the segments with time stamps that indicate the time boundaries of each segment.

The segment score graph 4408 can be another visual representation of the segment scores for the video. The segment score graph 4408 can include points (e.g., edit points) that indicate the boundaries (e.g., beginning and end) of each segment as well as a line 4412 that indicates the segment score for the video at specific points in time of the video. The x-axis of the segment score graph 4408 can indicate a time of the video and the y-axis can indicate a score for the video at a particular time or within a particular segment.

The data processing system can generate the user interfaces 4400 and 4402 to be dynamically updated, or otherwise dynamically update the user interfaces 4400 and 4402. For instance, a user can select a play button to cause the video to be played in the player window 4410 within the video interface 4404. Responsive to the selection, the video can be played. As the video is played, a line 4414 can move or slide across the x-axis of the segment score graph 4408 to indicate the current time of the played video such that a user viewing the user interface 4400 can see a current score of the video at the intersection between the line 4412 and the line 4414.

As the video is played, the segment score graphic 4406 can also be updated. For instance, the data processing system can identify the current segment of the video and highlight a bar in the segment score graphic 4406 that corresponds to the identified current segment. As illustrated in the user interface 4402, the current segment is between times 14.4 and 19.2 seconds and is represented by a highlighted bar 4416. The segment is similarly represented in the segment score graph 4408 between points 4418 and 4420 as the line segment 4422.

The data processing system can update the user interface over time between segments. The user interface 4402 shows an example of a different highlighted segment in which a bar 4424 is highlighted in the segment score graphic 4406 for the current segment between times 57.6 and 62.4 seconds. The segment is similarly represented in the segment score graph 4408 between points 4426 and 4428 as the line segment 4430. The data processing system can depict the segment scores for the video segments in any way.

Generating images is a challenging task for machine learning models, such as generative adversarial networks (GANs) and diffusion models, primarily due to the nuanced understanding required of visual content and the translation of abstract concepts into coherent visual representations. GANs and diffusion models lack innate visual perception and must rely on textual descriptions or prompts to create images, which introduces ambiguity and potential misinterpretation of details, context, or desired artistic style. Additionally, generating high-quality images demands intricate knowledge of spatial relationships, color theory, and artistic composition, aspects that are not inherently encoded in textual data processed by GANs and diffusion models. Despite recent advancements in machine learning, achieving photorealism, capturing intricate details, and maintaining consistency in style and context remain formidable hurdles for GANs and diffusion models in image generation tasks. In one example, a request may be to generate an image with a bus. Based on the request, a GAN or a diffusion model not using the systems and methods described herein may generate an image with a bus flying in the air with birds instead of driving on the road.

Furthermore, generating images using GANs or diffusion models presents several challenges rooted in the complexity of understanding and replicating visual content accurately. GANs and diffusion models operate through a dual-network architecture in which a generator creates images from noise or latent vectors while a discriminator evaluates these images for realism against a dataset. One major difficulty is achieving high fidelity in generated images, as GANs and diffusion models often struggle with producing details at fine scales or maintaining consistency in complex scenes. This challenge is compounded by the need to balance between generating diverse outputs and ensuring they conform to expected visual norms and structures.

Another significant hurdle for GANs and diffusion models is that GANs and diffusion models can require substantial computational resources and careful tuning of hyperparameters to achieve optimal performance, making them resource-intensive and potentially challenging to deploy in real-time applications. Addressing these challenges is crucial for advancing GANs' and/or diffusion models' capabilities in generating high-quality, diverse, and contextually appropriate images across various domains, from artistic creation to practical applications in computer vision and beyond.

A computer implementing the systems and methods described herein can overcome the aforementioned technical deficiencies by training and using a text generation machine learning model (e.g., a large language model (LLM)) to generate text outputs that an image generation machine learning model (e.g., a GAN or a diffusion model) can use to generate accurate and/or contextually relevant images. The computer can train the text generation machine learning model using a content scoring machine learning model that generates scores (e.g., performance scores) for text outputs generated by the text generation machine learning model and/or scores for images generated by the image generation machine learning model based on such text outputs. The computer can train the text generation machine learning model based on such scores using one or more loss functions and/or tune the text generation machine learning model to generate prompts that the image generation machine learning model can use to generate images. Because the text generation machine learning model itself has been trained to cause the image generation machine learning model to generate improved images, the image generation machine learning model can generate images overcoming the aforementioned difficulties relating to automatic image generation inherent to GANs and diffusion models, such as by reducing the computational resources required to generate the images, generating fine details in images, increasing the contextual accuracy of the images (e.g., placing the bus on the road instead of in the sky), and reducing ambiguity and inaccuracies in the generated images relevant to the prompts.

Furthermore, the computer can further overcome the technical difficulties involved in generating images using an image generation machine learning model because the text generation machine learning model may be trained based on outputs from the image generation machine learning model itself, enabling the text generation machine learning model to account for any nuances in the training and/or configuration of the image generation machine learning model. For example, the text generation machine learning model can generate output text identifying one or more features to include in an image. The image generation machine learning model can process the output text to generate one or more images. The computer can score the images using a content scoring machine learning model and then use a loss function to train the text generation machine learning model based on the scores of the images. The computer can repeat this process any number of times to train the text generation machine learning model to generate text outputs that cause the image generation machine learning model to generate high scoring images. Because the text generation machine learning model is trained specifically based on outputs of the image generation machine learning model, the text generation machine learning model may account for the weights and/or training specifically for the image generation machine learning model, meaning the text generation machine learning model may be tuned specifically for the image generation machine learning model such that the text generation machine learning model may generate improved outputs specifically for the image generation machine learning model. In doing so, the text generation model can improve the accuracy and the amount of detail in the images that the image generation machine learning model generates as well as reduce the computational burden on the image generation machine learning model when generating such images (e.g., such as because the tuned outputs by the text generation machine learning model may cause the image generation machine learning model to use fewer resources to determine how to generate images based on such outputs).

Figure 45:
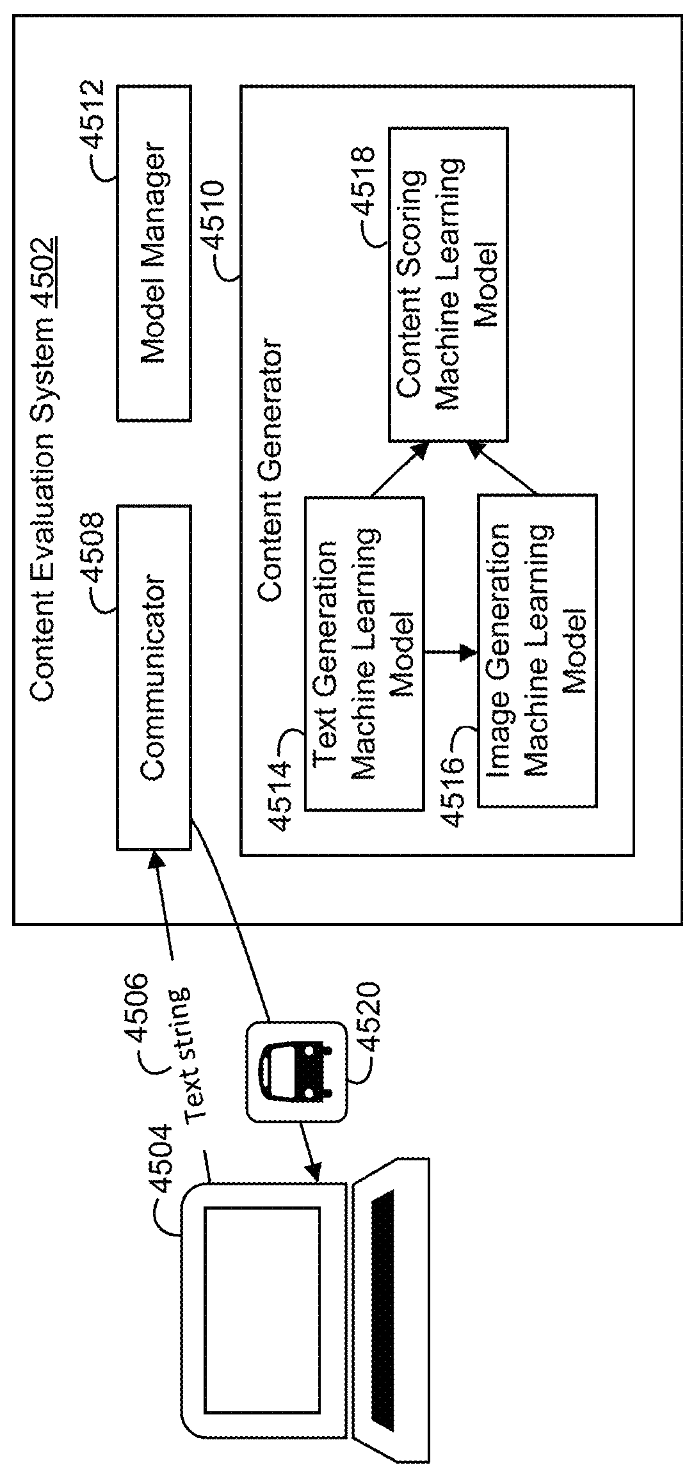
FIG. 45 is a sequence diagram illustrating contextual machine learning prompt generation in accordance with an illustrative embodiment.

FIG. 45 is a sequence diagram illustrating contextual machine learning prompt generation in accordance with an illustrative embodiment. In brief overview, FIG. 45 illustrates a sequence 4500 similar to the sequence 3900 of FIG. 39 in which a content evaluation system 4502 can use different machine learning models to generate improved image generation prompts (e.g., prompts configured to be used as input into an image generation machine learning model) and/or images, such as for different target audiences. To do so, the content evaluation system 4502 can use different training techniques to train a text generation model to generate improved prompts. For instance, the content evaluation system 4502 can train the text generation model using a loss function directly based on text prompts that the text generation model generates and a content scoring model that scores such prompts. In some cases, the content evaluation system 4502 can train the text generation model by executing an image generation machine learning model based on text prompts that the text generation model generates, scoring the images using the content scoring model, and then using a loss function to train the text generation machine learning model based on the scores generated for the images. In some cases, the content evaluation system 4502 can train the text generation machine learning model based on descriptions or features of high scoring images to train the text generation model. After training the text generation machine learning model using one or more of such methods, the content evaluation system 4502 can cause the text generation machine learning model to generate text prompts that can be input into the image generation machine learning model to generate high scoring images. In this way, the content evaluation system 4502 can overcome an inherent technical problem to text generation machine learning models trained to generate text prompts that the text generation machine learning models may only generate the prompts to meet objectives of the user rather than take into account the quality, context, or aesthetics of the images themselves.

The sequence 4500 may involve the content evaluation system 4502 communicating with a computing device 4504. The computing device 4504 can be a server, a client device, or another type of computing device. The computing device 4504 can be a computing device accessed by a user. The computing device 4504 can store and/or execute an application (e.g., a browser) to access the Internet or another communications network. Through the Internet or another communications network, the computing device 4504 can communicate with the content evaluation system 4502.

For example, in the sequence 4500, the computing device 4504 can execute an application to communicate with the content evaluation system 4502. In doing so, the computing device 4504 can transmit a text string 4506 to the content evaluation system 4502. The text string 4506 can be or include a description including one or more features to include in a generated image, such as a vehicle (e.g., a bus) any other object. The computing device 4504 can transmit the text string 4506 to the content evaluation system 4502 in a request, such as a request to generate a generated image that includes the features identified or included in the text string 4506. The content evaluation system 4502 can receive the text string 4506 and perform the systems and methods described herein to generate a new text string with the same or a variation of the features included in the text string 4506. The content evaluation system 4502 can execute an image generation machine learning model with the new text string to cause the image generation machine learning model to generate one or more images including the features of the new text string. The content evaluation system 4502 can generate a score for each of the generated images using a content scoring machine learning model. The content evaluation system 4502 can transmit the generated images and/or the scores for the generated images back to the computing device 4504 in a message 4520. The content evaluation system 4502 can store the images and/or the scores in memory.

The content evaluation system 4502 may comprise one or more processors that are configured to use a multi-modal machine learning architecture to train a text generation machine learning model to generate text outputs that result in improved images or other types of content items. In some embodiments, the content evaluation system 4502 can be or include executable code of the content evaluation system 1005. The content evaluation system 4502 may comprise a network interface, a processor, and/or memory (or the content evaluation system 1005 can include such components). The content evaluation system 4502 may communicate with the computing device 4504 via the network interface, which may be or include an antenna or other network device that enables communication across a network and/or with other devices. The processor may be or include an ASIC, one or more FPGAs, a DSP, circuits containing one or more processing components, circuitry for supporting a microprocessor, a group of processing components, or other suitable electronic processing components. In some embodiments, the processor may execute computer code or modules (e.g., executable code, object code, source code, script code, machine code, etc.) stored in memory to facilitate the activities described herein. The memory may be any volatile or non-volatile computer-readable storage medium capable of storing data or computer code. The content evaluation system 4502 can be the same as or include similar components to the content evaluation system 3902.

The content evaluation system 4502 can include a communicator 4508, a content generator 4510, and a model manager 4512. The components 4508-4112 can be stored in the memory of the content evaluation system 4502. The communicator 4508 may comprise programmable instructions that, upon execution, cause the processor of the content evaluation system 4502 to communicate with the computing device 4504 and/or any other computing device. The communicator 4508 may be or include an application programming interface (API) that facilitates communication between the computing device 4504 (e.g., via the network interface of the content evaluation system 4502) and other computing devices. The communicator 4508 may communicate with the computing devices 4504 and/or any other computing device across a network.

The content evaluation system 4502 can establish a connection with the computing device 4504. The communicator 4508 can establish the connection with the computing device 4504 over a network. To do so, the communicator 4508 can communicate with the computing device 4504 across the network. In one example, the communicator 4508 can transmit a syn packet to the computing device 4504 (or vice versa) and establish the connection using a TLS handshaking protocol. The communicator 4508 can use any handshaking protocol to establish a connection with the computing device 4504.

The content generator 4510 may comprise programmable instructions that, upon execution, cause the processor of the content evaluation system 4502 to generate different types of content (e.g., text, images, videos, audio segments, etc.) and/or scores (e.g., performance scores) for different types of content. The content generator 4510 may use a multi-modal machine learning architecture to do so. For example, the content generator 4510 can include the same or similar components to the performance measurement module 1065 of the content evaluation system 1005, the content evaluator 3910 of the content evaluation system 3902, and/or the content evaluator 4110 of the content evaluation system 4102 to generate scores for different types of content. The content generator 4510 may additionally or instead include generative machine learning models such as text generation machine learning models and/or image generation machine learning models that can respectively generate text and/or images. The content generator 4510 can execute the generative machine learning models to generate content, such as text and/or images, and then generate scores for the content using the content scoring components of the content generator 4510.

The model manager 4512 may comprise programmable instructions that, upon execution, cause the processor of the content evaluation system 4502 to train and/or operate the different machine learning models of the content generator 4510. The model manager 4512 may be configured to train the content generation machine learning models of the content generator 4510 to generate improved content. For instance, the model manager 4512 can be configured to train a text generation machine learning model 4514 to generate improved prompts (e.g., prompts that correspond to higher scores generated by a content scoring machine learning model of the content generator 4510) that can be used as input into an image generation machine learning model to generate improved images. In doing so, the machine learning models of the content generator 4510 to generate prompts that will result in images that correspond to high performance scores that indicate a high likelihood of interaction or performance of different types of content items when presented in different computing environments (e.g., on radio, on television, on a website, etc.).

The content generator 4510 can be the same as or similar to the image evaluator 2110 and/or the image generator 2114, both shown and described with reference to FIG. 21. The content generator 4510 can include a text generation machine learning model 4514, an image generation machine learning model 4516, and/or a content scoring machine learning model 4518. The content generator 4510 can include a content generation machine learning model for any type of content. The content generator 4510 may use the text generation machine learning model 4514 to generate prompts that can be used as input into the image generation machine learning model 4516. The image generation machine learning model 4516 can be executed based on the prompts to generate images. The text generation machine learning model 4514 can be trained and/or tuned to generate prompts that will result in the image generation machine learning model 4516, such as based on scores generated by the content scoring machine learning model 4518 for prompts generated by the text generation machine learning model 4514 and/or images generated by the image generation machine learning model 4516. By operating in this way, the content generator 4510 can improve the quality of the images generated by the image generation machine learning model 4516 using a combination of different types of machine learning models that are respectively configured to generate prompts for the image generation and/or scores for the images and/or such prompts.

The text generation machine learning model 4514 can be a machine learning model (e.g., a neural network, a support vector machine, a random forest, etc.) that has been configured or trained to generate sets of text (e.g., prompts) that are configured to be used as input into the image generation machine learning model 4516 to cause the image generation machine learning model 4516 to generate images. The text generation machine learning model 4514 can be the same as, or be a part of, the prompt generator 2113, shown and described with reference to FIG. 21. In one example, the text generation machine learning model 4514 can be a large language machine learning model, such as a transformer-based model. The text generation machine learning model 4514 can generate texts of string that include identifications of one or more features to include in images generated by the image generation machine learning model 4516.

The text generation machine learning model 4514 can be configured to receive text, images, or a combination of text and images to generate text outputs. For example, if a user wants to know what prompts to use to create a new image, the user can input text into the text generation machine learning model 4514 indicating aspects, characteristics, and/or features that the user wants to include in the generated image. The input can be broad, such as "I want to create an image of . . . ." The text generation machine learning model 4514 can be configured to complete the sentence. In some cases, the input can be more specific, such as "I want to create an image of a toothbrush with a background . . . ." The text generation machine learning model 4514 can generate a recommendation of a background. In another example, the user may input an image and wants to know how to modify the image instead of creating a new image. In this case, the user can input the image and a text string prompt. The text string prompt can again be broad or specific. For instance, a broad prompt can be "recommend a couple of ideas on how I can change my image, make it high performing." The text generation machine learning model 4514 can generate a recommendation based on the input. An example of a specific prompt can be "recommend an adjustment to the content of my cereal bowl in this image." The text generation machine learning model 4514 can generate a recommendation based on the input. Another example prompt can be "recommend a background for my image of a cereal box." The text generation machine learning model 4514 can generate a recommendation based on the input. The text generation machine learning model 4514 can be trained to generate responses and/or recommendations based on any such inputs.

The image generation machine learning model 4516 can be a machine learning model (e.g., a neural network, a support vector machine, a random forest, etc.) that has been configured or trained to generate images based on text descriptions or prompts generated by the text generation machine learning model 4514. The image generation machine learning model 4516 can be the same as, or be a part of, the image generator 2114, shown and described with reference to FIG. 21. In one example, the image generation machine learning model 4516 and/or the text generation machine learning model 4514 can be or include one or more generative adversarial networks (GANs) and/or diffusion models. The image generation machine learning model 4516 can generate images that include features or descriptions identified in text inputs into the image generation machine learning model 4516.

The content scoring machine learning model 4518 can be a machine learning model that is configured or trained to generate scores for different types of content, such as for text and/or images. The content scoring machine learning model 4518 can be the same as or similar to the content scoring machine learning model 3914, shown and described with reference to FIG. 39, or the content scoring machine learning model 4116, shown and described with reference to FIG. 41. In some cases, the content scoring machine learning model 4518 can be the same as or be a component of the image evaluator 2110, shown and described with reference to FIG. 21.

In one example, the content scoring machine learning model 4518 can be a machine learning model (e.g., a neural network, a support vector machine, a random forest, etc.) that is configured to receive as input embeddings (e.g., numerical vectors) representing features of different types of content items. The content scoring machine learning model 4518 can generate scores (e.g., performance scores or content performance scores) for the content items based on the respective embeddings. In one example, the scores can be or include a likelihood that a user would interact with the images if they were viewing or listening to the content items on a web page or another type of platform. The content scoring machine learning model 4518 can be configured to generate a score for a content item by applying internal trained or learned weights and/or parameters to the embedding representing features of the content item. The score can be a number within a defined range (e.g., 1-100, 1-10, 0-1, etc.). The content scoring machine learning model 4518 can be the same as or similar to a machine learning model (e.g., a second machine learning model configured to generate performance scores) of the image evaluator 2110, shown and described with reference to FIG. 21, and/or the content scoring machine learning model 3914, shown and described with reference to FIG. 39.

In some cases, the content generator 4510 can include the various components of the content evaluator 3910 (e.g., the feature extraction machine learning model 3916) and/or the content evaluator 4110 (e.g., the image feature extraction machine learning model 4118, the video feature extraction machine learning model 4120, and the embedding conversion machine learning model 4122) to use to format and/or generate feature vectors indicating or including features of text and/or images to input into the content scoring machine learning model 4518. For instance, to generate a score for a text string generated by the text generation machine learning model 4514, the content generator 4510 can extract features from the text string into a vector of a vector space (e.g., a composite vector space) and then input the vector into the content generator 4510. The content generator 4510 can be trained to generate scores based on vectors in the vector space, so the content generator 4510 can receive the vector and generate a score (e.g., a performance score) for the text string. Similarly, the content generator 4510 can convert images generated by the image generation machine learning model 4516 into vectors of the vector space and input the vectors into the content scoring machine learning model 4518 to generate scores for the images. The content generator 4510 can use any approach described herein to generate scores for such text, images, or other types of content items.

In some embodiments, the content generator 4510 can include multiple content scoring machine learning models 4518 that are configured to generate scores. Each content scoring machine learning model 4518 may be trained to generate scores for a different target audience. For example, each content scoring machine learning model 4518 may be trained based on training data generated from interaction data generated from users of a specific target audience (e.g., users who have a specific characteristic (e.g., age, age within a range, gender, etc.) and/or who otherwise have specific interests (e.g., sports, movies, books, genres of books, types of sports, jobs, etc.)). The content scoring machine learning models 4518 may be trained (e.g., by the content evaluation system 1005 or another data processing system) by labeling images with interaction data from the specific target audiences and training the machine learning models for the same target audiences with the labeled training data to generate scores for the images. In training the machine learning models in this way, each machine learning model may be trained to simulate a target audience and how a member of the target audience will interact with specific images.

The model manager 4512 can train the text generation machine learning model 4514 to generate text outputs that can be input into the image generation machine learning model to generate high scoring images. The model manager 4512 can train the text generation machine learning model 4514 in one or more manners. In one example, the model manager 4512 can train the text generation machine learning model 4514 to generate high scoring text outputs (e.g., prompts that themselves are high scoring). The model manager 4512 can do so using a training dataset including a plurality of training text strings. For instance, the model manager 4512 can receive or identify a training dataset that includes one or more text strings. The text strings can be incomplete text strings such as "I want to create an image of," "I want to create an image of a toothbrush with a background of," "I want to create an image of a horse, but I don't know what color to make it," etc. The training dataset can include any number of training text strings. For each of the training text strings, the model manager 4512 can execute the text generation machine learning model 4514 using the training text string as input. Based on the executions, the text generation machine learning model 4514 can generate a generated text string for each training text string. The generated text string can be, for example, a completion of an incomplete text string (e.g., the input text string may be or include a first part and the completion of the incomplete text string can be a second part), or a recommendation or new text string according to a request in the text string (e.g., a text string of a request can be a first part and the new text string can consist of a second part). In another example, the training dataset can include a text string that includes a set of one or more descriptors (e.g., features or desired features) of an image, and the text generation machine learning model 4514 can generate a generated text string that includes the same text string but replacing a subset of the set of features with new or different features. The model manager 4512 can generate such output text strings for any number of training text strings.

The model manager 4512 can generate scores (e.g., text performance scores) for the generated text strings. For example, the model manager 4512 can input the generated text strings of the training dataset into the content scoring machine learning model 4518. In doing so, for example, the model manager 4512 can generate a vector from each generated text string, such as by performing the systems and methods described herein. The model manager 4512 can execute the content scoring machine learning model 4518 based on the generated text strings and/or the vectors generated from the generated text strings to generate scores for each of the generated text strings. The scores can indicate how the text strings would perform with individuals that view or interact with the text strings or images generated based on such text strings in different mediums, such as on a website, in a commercial, or on a billboard.

The model manager 4512 can train the text generation machine learning model 4514 based on the generated scores. The model manager 4512 can train the text generation machine learning model 4514 using a loss function with the scores generated for generated text strings as labels for the generated text strings. For example, the model manager 4512 can adjust the weights and/or parameters of the text generation machine learning model 4514 for each generated text string. The model manager 4512 can adjust (e.g., increase or decrease, or reward or penalize) the weights and/or parameters proportional to the score generated from the generated text string. In doing so, the model manager 4512 can make large adjustments such that the model manager 4512 is more likely to generate text strings that correspond to higher scores and/or less likely to generate text strings that correspond to lower scores. In some cases, the model manager 4512 can penalize (e.g., adjust the weights and/or parameters to reduce the likelihood that the text generation machine learning model 4514 generate a similar text string in the future) the text generation machine learning model 4514 responsive to a score generated for a generated text string being below a threshold (e.g., a predetermined threshold). The model manager 4512 can penalize the text generation machine learning model 4514 proportional to the distance between the score and the threshold. The model manager 4512 can similarly reward the text generation machine learning model 4514 for scores generated above the threshold or a different threshold. The model manager 4512 can train the text generation machine learning model 4514 in this way for any number of training text strings and/or text strings generated based on such training text strings. In doing so, the model manager 4512 can increase the likelihood that text strings generated based on future candidate text strings correspond to higher scores, thus increasing the likelihood that images generated based on such text strings also correspond to higher scores.

The scores generated by the content scoring machine learning model 4518 can facilitate generating more contextually accurate images because the contextual accuracy of images typically corresponds with how individuals react to or otherwise engage with the images. For example, if a chair is depicted in an image but is not even with the ground or otherwise is displaced such that it does not look like the chair is resting on the ground (e.g., the chair is at an unrealistic angle or in the air), users would be less likely to engage with the images. Thus, a score generated for the image may be lower than if the char was properly or realistically oriented. Accordingly, by using such scores to train the text generation machine learning model 4514 to generate text outputs or prompts that can be used to generate images or other types of content items, the content scoring machine learning model 4518 can cause the machine learning architecture of the text generation machine learning model 4514 and the image generation machine learning model 4516 to generate more contextually accurate images.

In another example, the model manager 4512 can train the text generation machine learning model 4514 based on images generated by the image generation machine learning model 4516. The model manager 4512 can do so using a training dataset of text strings as described above. For example, the model manager 4512 can input such a training dataset into the text generation machine learning model 4514 and execute the text generation machine learning model 4514 to cause the text generation machine learning model 4514 to generate training generated text strings. The training generated text strings can correspond to generating a content item (e.g., an image) and indicate one or more features to include in the content item.

The model manager 4512 can execute the image generation machine learning model 4516 using the training generated text strings. Based on the execution, the image generation machine learning model 4516 can output one or more training generated images. The image generation machine learning model 4516 can output a defined number of training generated images for each training generated text string, such as based on a user input or a configuration of the image generation machine learning model 4516. For each training generated text string, the image generation machine learning model 4516 can generate the training generated images to each include or have the features identified in the training generated text string. Any differences in the images generated for the same training generated images may be the result of a temperature value of the image generation machine learning model 4516, which may be configured by an administrator.

The model manager 4512 can generate scores (e.g., image performance scores) for the training generated images. For example, the model manager 4512 can input the training generated images generated based on the training dataset into the content scoring machine learning model 4518. In doing so, for example, the model manager 4512 can generate a vector from each training generated image, such as by performing the systems and methods described herein. The model manager 4512 can execute the content scoring machine learning model 4518 based on the training generated images and/or the vectors generated from the training generated images to generate scores for each of the training generated images. The scores can indicate how the images would perform with individuals that view or interact with the images in different mediums, such as on a website, in a commercial, or on a billboard.

The model manager 4512 can train the text generation machine learning model 4514 based on the generated scores for the training generated images. The model manager 4512 can train the text generation machine learning model 4514 using a loss function with the scores generated for the training generated images for the respective training generated text strings. For example, the model manager 4512 can adjust the weights and/or parameters of the text generation machine learning model 4514 for each generated text string. The model manager 4512 can adjust the weights and/or parameters proportional to the scores in the same or a similar manner to the manner described above with reference to scores generated directly for generated text strings. In cases in which the image generation machine learning model 4516 generates multiple images for individual text string inputs, the model manager 4512 can separately train the text generation machine learning model 4514 based on scores generated for each image and/or based on a composite score for each text string determined based on the scores generated for the images of the text string using a function (e.g., a median, average, sum, etc.). In doing so, the model manager 4512 can increase the likelihood that text strings generated based on future candidate text strings generate images that correspond to higher scores.

In another example, the model manager 4512 can train the text generation machine learning model 4514 based on features or text strings that have already been scored and/or determined to be high scoring features or text strings. For example, the model manager 4512 can store a set of descriptions in memory of the content evaluation system 4502. The set of descriptions can include one or a plurality of text strings each including a different description of an image or type of content item. Each description can correspond to or describe an image, such as by identifying one or more features of the image. In some cases, the model manager 4512 may store such descriptions in memory responsive to generating scores (e.g., image performance scores) for the images corresponding to the descriptions using or by executing the content scoring machine learning model 4518 and determining the scores exceed or satisfy a threshold (e.g., a predetermined threshold). In some cases, the model manager 4512 can store the descriptions responsive to generating scores (e.g., text performance scores) for the descriptions using the content scoring machine learning model 4518 and determining the scores for the descriptions exceed a threshold (e.g., a predetermined threshold). In some cases, the model manager 4512 can store the descriptions responsive to receiving a user input indicating to store the descriptions, such as based on benchmarks trends or historical content performance data.

The model manager 4512 can train the text generation machine learning model 4514 based on the stored descriptions. For instance, the model manager 4512 can train the text generation machine learning model 4514 using an unsupervised learning technique in which the model manager 4512 feeds the descriptions into the text generation machine learning model 4514, and the text generation machine learning model 4514 can use the descriptions as examples to predict the next word or token. Because the descriptions may have been pre-processed before being used for the unsupervised training, the training may train the text generation machine learning model 4514 to only generate high performing text string outputs (e.g., text prompts).

The model manager 4512 can train and/or finetune text generation machine learning model 4514 using any combination of the aforementioned training techniques and/or other training techniques. For example, the model manager 4512 can train and/or finetune the text generation machine learning model 4514 based on one or more of text performance scores for generated text outputs, image performance scores based on images generated by such text outputs, and/or using unsupervised learning based on high performing text inputs. Such training can further improve the text outputs that the text generation machine learning model 4514 generates as prompts for the image generation machine learning model 4516 to use to generate one or more images (e.g., high performing images).

The model manager 4112 can train the text generation machine learning model 4514 to generate text outputs that are high performing for specific target audiences. The model manager 4112 can do so by training the text generation machine learning model 4514 based on scores generated by one or more content scoring machine learning models 4518 that are specific to the target audiences. For instance, as described above, the content evaluation system 4502 can store content scoring machine learning models 4518 that are each trained to simulate a different target audience (e.g., generate target audience scores for specific target audiences). The model manager 4112 can train the text generation machine learning model 4514 in one or more of the manners described above using target audience scores for specific target audiences with indications of the target audience that correspond to the individual scores. Accordingly, when the model manager 4512 subsequently executes the text generation machine learning model 4514 based on a request for an image for a particular target audience, the model manager 4512 can include the identification of the target audience with the input into the text generation machine learning model 4514 to cause the text generation machine learning model 4514 to generate a text output that corresponds to higher performance for the particular target audience.

In some cases, the content generator 4510 can store or include multiple text generation machine learning models 4514. Each of the text generation machine learning models 4514 can correspond to a different target audience (e.g., be trained to generate text outputs that are high performing for a specific target audience). The model manager 4512 can respectively train each text generation machine learning models 4514 based only on scores (e.g., target audience scores) generated by the content scoring machine learning models 4518 that are specific to the target audience of the text generation machine learning model 4514 and/or based on high performing descriptions that have been labeled with identifications of the respective target audiences. The content generator 4510 can store each text generation machine learning model 4514 with an identification of the target audience for which the text generation machine learning model 4514 is trained to generate text outputs. Accordingly, when the model manager 4512 subsequently receives a request for an image for a particular target audience, the model manager 4512 can identify the text generation machine learning model that corresponds to the target audience using the identification of the target audience in memory and use the identified text generation machine learning model to generate a text output. The model manager 4512 can include the identification of the target audience with the input into the text generation machine learning model 4514 to cause the text generation machine learning model 4514 to generate a text output that corresponds to higher performance for the particular target audience.

Subsequent to training (e.g., training above an accuracy threshold) and/or fine-tuning the text generation machine learning model 4514, the model manager 4512 can use the text generation machine learning model 4514 in combination with the image generation machine learning model 4516 to generate high scoring images (e.g., based on high scoring prompts generated by the text generation machine learning model 4514). For example, the content evaluation system 4502 can receive a text string (e.g., the text string 4506 or a candidate text string) from the client device 4504. The text string can be or include a request to generate an image (e.g., a high scoring image). The model manager 4512 can feed the text string into the text generation machine learning model 4514 and execute the text generation machine learning model 4514 to cause the text generation machine learning model 4514 to generate an output text string (e.g., a candidate generated text string). The output text string can identify one or more features (e.g., features to include in the requested image). The model manager 4512 can execute the image generation machine learning model 4516 using the output text string as input to generate one or more images. The one or more images can each include at least the one or more features identified in the output text string. The image generation machine learning model 4516 can generate a defined number of the one or more images indicated in the request from the client device 4504 or as the image generation machine learning model 4516 is configured to generate. The model manager 4512 can transmit the generated one or more images (e.g., in the message 4520) to the client device 4504.

In some cases, the content evaluation system 4502 can receive the text string with an identification of a target audience, such as in the body or payload of a message. In such cases, depending on the embodiment, the content evaluation system 4502 can select a text generation machine learning model 4514 and/or image generation machine learning model 4516 from memory that corresponds to the target audience (e.g., an identification of the target audience) based on the identification of the target audience in the message. The content evaluation system 4502 can use the selected text generation machine learning model 4514 and/or the image generation machine learning model 4516 to generate one or more images to respond to the request.

The text generation machine learning model 4514 can generate the output text string in one of a few ways, in some cases depending on the contents or context of the input text string. For example, when the text string is an incomplete text string (e.g., a first part of a text string), the text generation machine learning model 4514 can complete the text string (e.g., with a second part of a text string). When the text string is a request for a recommendation (e.g., "I want an image that appeals to women between the ages of 21 and 40"), the text generation machine learning model 4514 can generate a new text string according to the recommendation (e.g., a text string with descriptors of features that appeal to women between the ages of 21 and 40). When the text string is a complete text string with one or more descriptors or features, the text generation machine learning model 4514 can replace at least one of the one or more descriptors with different descriptors or features.

In some cases, the text string can be input with an image or another type of content item and be a request for a modification to the content item (e.g., a modification to a feature of the content item). The request can be generic, such as a request to improve a content item or a request for a modification to a specific aspect or feature (e.g., an object or a background depicted in the content item). In such cases, the text generation machine learning model 4514 can generate an output text string indicating a recommended modification to the requested feature or content item. The image generation machine learning model 4516 can generate a generated image or content item according to the modifications identified in the output text string.

The above-described process can be performed to train the text generation machine learning model 4514 to generate outputs that can be used to generate different types of content (e.g., images, video, text segments, audio, etc.). For example, the model manager 4512 can receive a plurality of training content items (e.g., as images, audio, video, text segments, etc.). The training content items can each be of the same type (e.g., to train the text generation machine learning model 4514 to generate text strings based on content of (e.g., only of) the type) or of varying types (e.g., to train the text generation machine learning model 4514 to generate text strings based on varying types of content). Based on the inputs, the model manager can execute the text generation machine learning model 4514 to generate text strings corresponding to generating a content item (e.g., of the same type or a different type). In some cases, the text strings can identify one or more modifications to the respective training content items based on which the text strings were generated. The model manager 4512 can execute the content scoring machine learning model 4518 based on the text strings to generate scores (e.g., performance scores) for the respective text strings. The model manager 4512 can train the text generation machine learning model 4514 based on the performance scores as described herein. In some cases, instead of scoring the text strings themselves, the model manager 4512 can execute a content generation machine learning model (e.g., a content generation machine learning model configured to generate (e.g., only generate) content of the types based on which the text generation machine learning model 4514 generated the text string) to generate content based on the text strings. The content scoring machine learning model 4518 can train the text generation machine learning model 4514 based on the scores of the generated content, as described herein. Thus, the model manager 4512 can train the text generation machine learning model 4514 to generate text strings for improved content generation.

Figure 46:
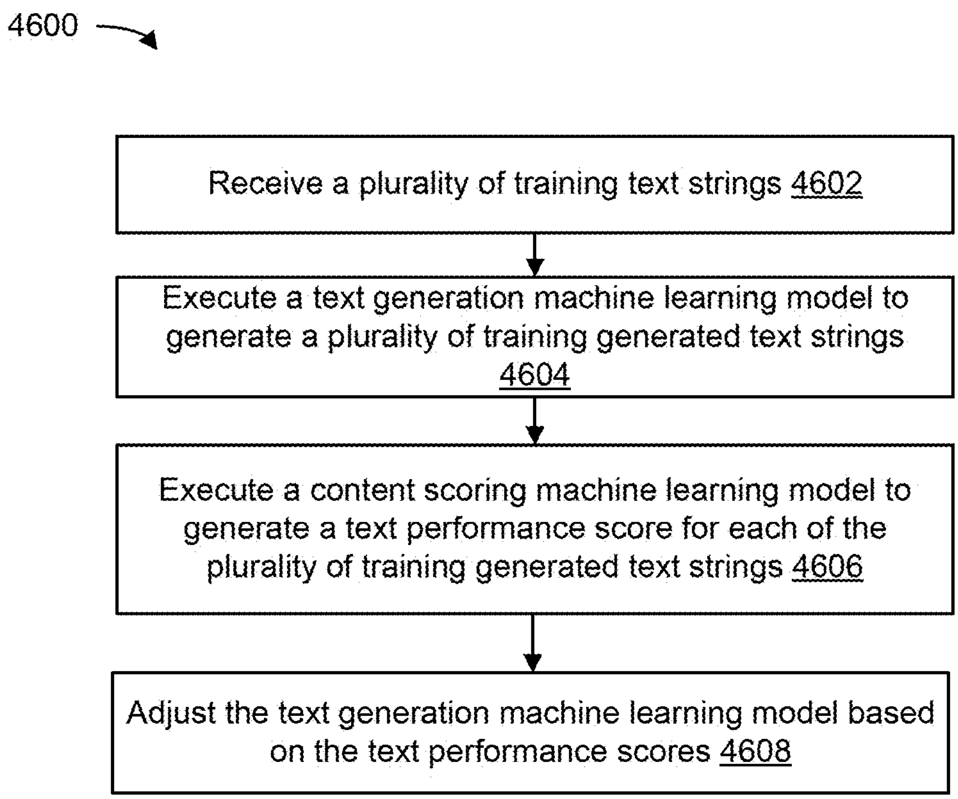
FIG. 46 is a flow diagram illustrating a method for contextual machine learning prompt generation in accordance with an illustrative embodiment.

FIG. 46 is a flow diagram illustrating a method 4600 for contextual machine learning prompt generation in accordance with an illustrative embodiment. In some implementations, the method 4600 can be performed by a data processing system such as any of the components of the system 1000 shown in FIG. 10 or the content evaluation system 4502. The method 4600 may include more or fewer operations and the operations may be performed in any order. Performance of the method 4600 may enable the data processing system to generate prompts or text strings that can cause an image generation machine learning model to generate high performing images, such as for specific target audiences. The method 4600 can be used to generate text strings for generation of high performing content items of any type.

At operation 4602, the data processing system receives a plurality of training text strings. The training text strings can include incomplete text strings, requests to modify a particular content item or image (e.g., which may be included with such training text strings), or text string prompts that can be used as input into an image generation machine learning model or another type of content generation machine learning model. The data processing system can receive the plurality of training text strings from a remote computing device or by retrieving the training text strings from memory.

At operation 4604, the data processing system executes a text generation machine learning model. The data processing system can execute the text generation machine learning model using each of the plurality of training text strings. Based on the execution (e.g., a plurality of executions, one for each training text string), the data processing system can generate a plurality of training generated text strings. The plurality of training generated text strings can each correspond to a different input training text string.

The text generation machine learning model can generate the respective training generated text strings according to the content or contexts of the training text strings from which the training generated text strings were generated. For example, if an input training text string is a request for a modification to a content item or image (which may be input with corresponding content item or image), the text generation machine learning model may generate a text string with language indicating how to modify the content item, in some cases including descriptors for the content item or image itself such that a content generation machine learning model or image generation machine learning model can recreate or generate the image with the recommended modification. In another example, if the training text string is an incomplete text string, the text generation machine learning model can "complete" the text string by adding language to the text string. If the text is a complete text string, the text generation machine learning model can generate a new text string replacing one or more features of the complete text string. The text generation machine learning model can generate the training generated text strings in any manner.

At operation 4606, the data processing system executes a content scoring machine learning model. The content scoring machine learning model may be configured to generate scores for multiple types of content or only for text. The data processing system can execute the content scoring machine learning model using each of the training generated text strings as input. Based on the execution, the content scoring machine learning model can generate scores (e.g., performance scores or text performance scores) for each of the training generated text strings.

At operation 4608, the data processing system adjusts the text generation machine learning model. The data processing system can adjust the text generation machine learning model based on the text performance scores. In doing so, the data processing system can adjust one or more weights or parameters of the text generation machine learning model. The data processing system can adjust the one or more weights or parameters proportional to the text performance scores generated based on the training generated text strings. For instance, the data processing system can adjust the weights or parameters of the text generation machine learning model to make it more likely that the text generation machine learning models generate text strings closer to the high scoring text strings and/or less likely to generate text strings that are closer to the low scoring text strings. Subsequent to training the text generation machine learning model in this way for each of the plurality of training text strings, the data processing system can generate text strings based on candidate text strings that can then be input into an image or content generation machine learning model to generate a high scoring image or content item. In this way, the data processing system can train and use the text generation machine learning model to generate text outputs that can be used by the image generation machine learning model and/or the content generation machine learning model to generate high scoring images and/or content.

In some cases, when doing so, the data processing system can train the text generation machine learning model to generate output text that will result in generated images that are high scoring for a particular target audience. For instance, the data processing system the content scoring machine learning model may be trained to generate target audience scores for a particular target audience. Accordingly, when training the text generation machine learning model using the content scoring machine learning model, the data processing system may train the text generation machine learning model to generate output text specifically for the target audience. The data processing system can similarly train any number of text generation machine learning models to generate output text for any number of target audiences, such as by using content scoring machine learning models for the respective target audiences to do so.

Figure 47:
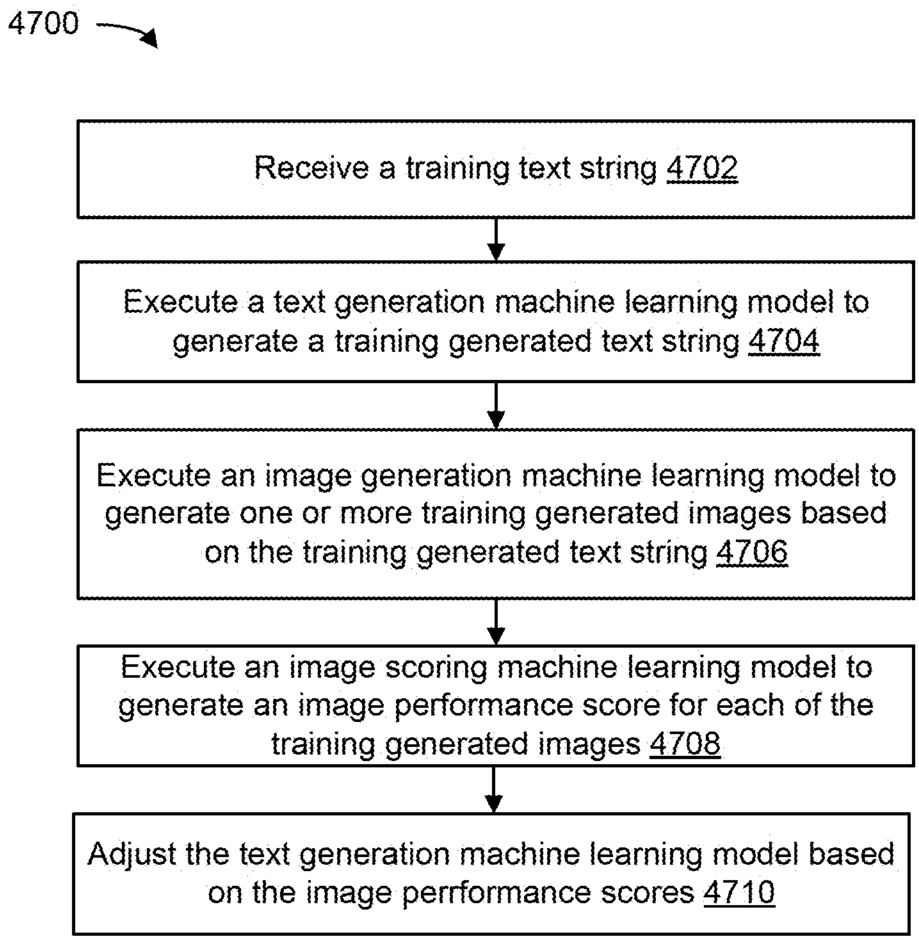
FIG. 47 is a flow diagram illustrating a method for contextual machine learning prompt generation in accordance with an illustrative embodiment.

FIG. 47 is a flow diagram illustrating a method 4700 for contextual machine learning prompt generation in accordance with an illustrative embodiment. In some implementations, the method 4700 can be performed by a data processing system such as any of the components of the system 1000 shown in FIG. 10 or the content evaluation system 4502. The method 4700 may include more or fewer operations and the operations may be performed in any order. Performance of the method 4700 may enable the data processing system to generate prompts or text strings that can cause an image generation machine learning model to generate high performing images, such as for specific target audiences. The method 4700 can be used to generate text strings for generation of high performing content items of any type.

At operation 4702, the data processing system receives a training text string (e.g., in a plurality of training text string).

The data processing system can receive the training text string in the same manner as described with reference to the operation 4602.

At operation 4704, the data processing system executes a text generation machine learning model. The data processing system can execute the text generation machine learning model using the training text string. Based on the execution, the data processing system can generate a training generated text string. The training generated text string can correspond to generating a content item (e.g., image) and indicating one or more features. The data processing system can execute the text generation machine learning model in the same manner as described with reference to the operation 4604.

At operation 4706, the data processing system executes an image generation machine learning model. The data processing system can execute the image generation machine learning model using the training generated text string (e.g., as input). Based on the execution, the image generation machine learning model can generate one or more training generated images. Each of the training generated images can include the features included or identified in the training generated text string. In generating the training generated images, the image generation machine learning model can generate a number of images identified in the training generated text string or original training text, included separately from such text strings, or based on a configuration of the image generation machine learning model. Although the generated images may include the same features identified in the training generated text string, they may differ between each other in other features of the respective images.

At operation 4708, the data processing system executes an image scoring machine learning model. The image scoring machine learning model may be configured to generate scores for multiple types of content or only for images. The data processing system can execute the image scoring machine learning model using each of the training generated images as input. Based on the execution, the content scoring machine learning model can generate scores (e.g., performance scores or images performance scores) for each of the training generated images.

At operation 4710, the data processing system adjusts the text generation machine learning model. The data processing system can adjust the text generation machine learning model based on the image performance scores. In doing so, the data processing system can adjust one or more weights or parameters of the text generation machine learning model. The data processing system can adjust the one or more weights or parameters proportional to the image performance scores generated based on the training generated images. For instance, the data processing system can adjust the weights or parameters of the text generation machine learning model to make it more likely that the text generation machine learning models generate text strings that cause generation of the high scoring images and/or less likely to generate text strings that cause generation of low scoring images. Subsequent to training the text generation machine learning model in this way for each of one or more plurality of training text strings, the data processing system can generate text strings based on candidate text strings that can then be input into an image or content generation machine learning model to generate a high scoring image or content item. In this way, the data processing system can train and use the text generation machine learning model to generate text outputs that can be used by the image generation machine learning model and/or the content generation machine learning model to generate high scoring images and/or content.

In some cases, when doing so, the data processing system can train the text generation machine learning model to generate output text that will result in generated images that are high scoring for a particular target audience. The data processing system can do so using a content scoring machine learning model configured to generate scores specifically for the target audience, for example.

Figure 48:
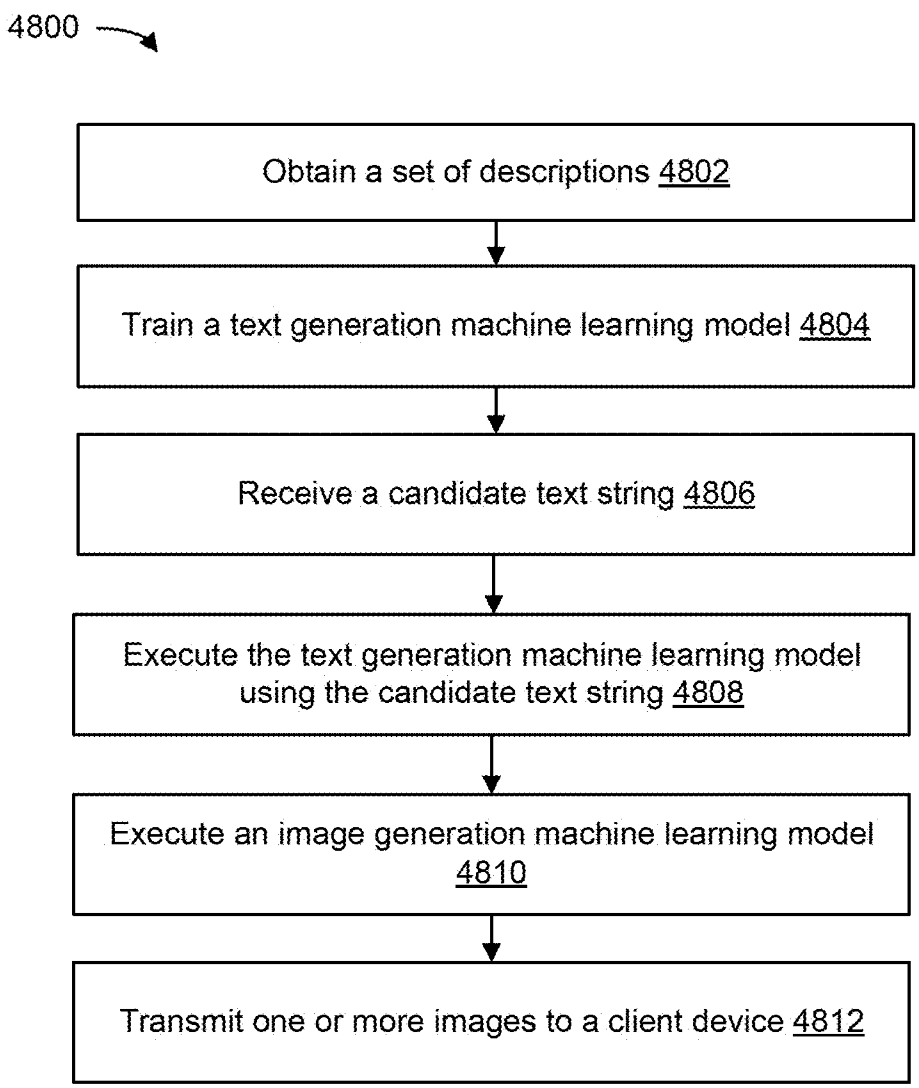
FIG. 48 is a flow diagram illustrating a method for contextual machine learning prompt generation in accordance with an illustrative embodiment.

FIG. 48 is a flow diagram illustrating a method 4800 for contextual machine learning prompt generation in accordance with an illustrative embodiment. In some implementations, the method 4800 can be performed by a data processing system such as any of the components of the system 1000 shown in FIG. 10 or the content evaluation system 4502. The method 4800 may include more or fewer operations and the operations may be performed in any order. Performance of the method 4800 may enable the data processing system to generate prompts or text strings that can cause an image generation machine learning model to generate high performing images, such as for specific target audiences. The method 4800 can be used to generate text strings for generation of high performing content items of any type.

At operation 4802, the data processing system obtains a set of descriptions (e.g., one or more descriptions). The set of descriptions can include a plurality of text string descriptions of images or other types of content items. Each description can include one or more identifications of one or more features to include in the images or content items. The data processing system can obtain the set of descriptions from a remote computing device or by retrieving the set of descriptions from memory.

The set of descriptions may have been selected by a user or automatically by the data processing system. For example, the data processing system can execute a content scoring machine learning model based on a plurality of descriptions to generate a score (e.g., a text performance score) for each of the descriptions. The data processing system can compare the scores to a threshold (e.g., a predetermined threshold). Responsive to scores for descriptions exceeding the threshold, the data processing system can add the descriptions to the set of descriptions. Otherwise, the data processing system can discard or remove the descriptions from memory or label the descriptions to indicate they are not high scoring text strings. In another example, the descriptions can be descriptions of images. The data processing can score the images using a content scoring machine learning model (e.g., the same content scoring machine learning model as above or an image scoring machine learning model). The data processing system can compare the scores for the images to a threshold (e.g., a predetermined threshold). Responsive to scores for the images exceeding the threshold, the data processing system can add the descriptions of such images to the set of descriptions. Otherwise, the data processing system can discard or remove the descriptions and/or images from memory or label the descriptions and/or images to indicate they do not correspond to high scoring images. In another example, a user can input text strings of the set of text strings, such as based on market research or analysis. The set of descriptions can be generated in any way or in any combination of such ways.

At operation 4804, the data processing system trains a text generation machine learning model. The data processing system can train the text generation machine learning model using the set of descriptions. In doing so, the data processing system can train the text generation machine learning model to generate or output text strings that are similar to the set of respective descriptions, such as by using an unsupervised learning technique. Because the set of descriptions determined to correspond to high scoring images or descriptions, training the text generation machine learning model in this way can train the text generation machine learning model to generate text strings that will result in high scoring images.

At operation 4806, the data processing system receives a candidate text string. The data processing system can receive the candidate text string from a client device. The candidate text string can be a request to generate an image.

At operation 4808, the data processing system executes the text generation machine learning model. The data processing system can execute the text generation machine learning model using or based on the candidate text string. Based on the execution, the text generation machine learning model can generate a candidate generated text string identifying one or more features. For example, the text generation machine learning model can generate a candidate generated text string identifying five objects to include in a generated image.

At operation 4810, the data processing system executes an image generation machine learning model. The data processing system can execute the image generation machine learning model using the candidate generated text string as input. Based on the execution, the image generation machine learning model can generate one or more images that include the features identified in the candidate generated text string, such as the five objects from the example above. While each of the generated images may include the features identified in the candidate generated text string, the generated images may differ in other features, such as based on a temperature of the image generation machine learning model. At operation 4812, the data processing system transmits the one or more generated images to the client device that requested the images with the original text string.

In some cases, when doing so, the data processing system can train the text generation machine learning model to generate output text that will result in generated images that are high scoring for a particular target audience. The data processing system can do so using a content scoring machine learning model configured to generate scores specifically for the target audience, for example.

Figure 49:
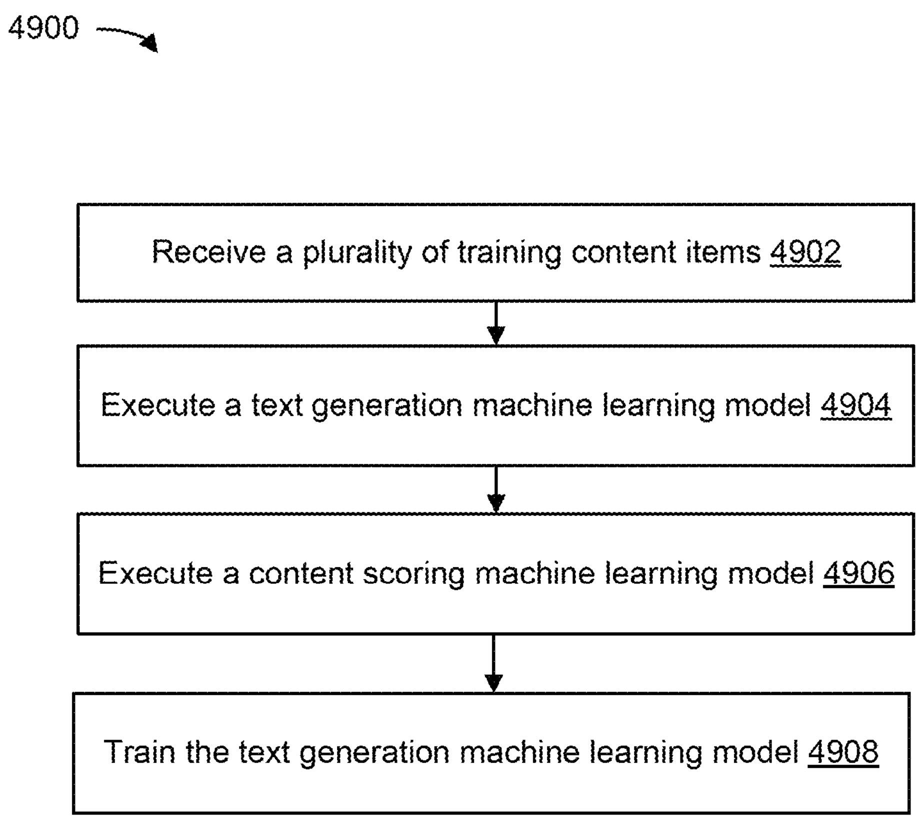
FIG. 49 is a flow diagram illustrating a method for contextual machine learning prompt generation in accordance with an illustrative embodiment.

FIG. 49 is a flow diagram illustrating a method 4900 for contextual machine learning prompt generation in accordance with an illustrative embodiment. In some implementations, the method 4900 can be performed by a data processing system such as any of the components of the system 1000 shown in FIG. 10 or the content evaluation system 4502. The method 4900 may include more or fewer operations and the operations may be performed in any order. Performance of the method 4900 may enable the data processing system to generate prompts or text strings that can cause a content generation machine learning model to generate high performing content items or modify content items to be higher performing, such as for specific target audiences. The method 4900 can be used to generate text strings for generation of high performing content items of any type.

At operation 4902, the data processing system receives a plurality of training content items. The training content items can include content items of the same type (e.g., each content item can be an image, each content item can be a text string, each content item can be an audio signal, each content can be a video, etc.), or the content items can include a variation of such content items. The data processing system can receive the plurality of training content items from a remote computing device or by retrieving the training content items from memory.

At operation 4904, the data processing system executes a text generation machine learning model. The data processing system can execute the text generation machine learning model using each of the plurality of training content items. Based on the execution (e.g., a plurality of executions, one for each training content item), the data processing system can generate a plurality of training generated text strings. The plurality of training generated text strings can each correspond to a different input training content item. In some cases, each of the plurality of training generated text string can include a string indicating to modify the training item based on which the training generated text string was generated, or may include a include a description of the training content item including such a modification. The modifications may be to improve the scoring of the respective content items.

At operation 4906, the data processing system executes a content scoring machine learning model. The content scoring machine learning model may be configured to generate scores for multiple types of content or only for text. The data processing system can execute the content scoring machine learning model using each of the training generated text strings as input. Based on the execution, the content scoring machine learning model can generate scores (e.g., performance scores or text performance scores) for each of the training generated text strings.

At operation 4908, the data processing system adjusts the text generation machine learning model to train the text generation machine learning model. The data processing system can adjust the text generation machine learning model based on the text performance scores. In doing so, the data processing system can adjust one or more weights or parameters of the text generation machine learning model. The data processing system can adjust the one or more weights or parameters proportional to the text performance scores generated based on the training generated text strings. For instance, the data processing system can adjust the weights or parameters of the text generation machine learning model to make it more likely that the text generation machine learning models generate text strings closer to the high scoring text strings and/or less likely to generate text strings that are closer to the low scoring text strings. Subsequent to training the text generation machine learning model in this way for each of the plurality of training text strings, the data processing system can generate text strings based on candidate content items that can then be input into a content generation machine learning model to generate a high scoring content item. In this way, the data processing system can train and use the text generation machine learning model to generate text outputs that can be used by the content generation machine learning model to modify content items to improve the performance of such content items.

In some cases, when doing so, the data processing system can train the text generation machine learning model to generate output text that will result in generated images that are high scoring for a particular target audience. The data processing system can do so using a content scoring machine learning model configured to generate scores specifically for the target audience, for example.

In one aspect, the present disclosure describes a method for training a text generation machine learning model for prompt generation. The method can include receiving, by one or more processors, a plurality of training text strings;

executing, by the one or more processors, a text generation machine learning model using each of the plurality of training text strings to generate a plurality of training generated text strings, each of the plurality of generated text strings corresponding to generating a content item; executing, by the one or more processors, a content scoring machine learning model using each of the plurality of generated text strings to generate a text performance score for each of the plurality of training generated text strings; and for each of the plurality of generated text strings, adjusting, by the one or more processors, one or more weights or parameters of the text generation machine learning model proportional to the text performance score for the generated text string.

In some embodiments, the method further includes receiving, by the one or more processors from a client device, a candidate text string, the candidate text string requesting to generate an image; executing, by the one or more processors, the text generation machine learning model using the candidate text string to generate a candidate generated text string identifying one or more features; executing, by the one or more processors, an image generation machine learning model using the candidate generated text string to generate one or more images each according to the one or more features identified in the candidate generated text string; and transmitting, by the one or more processors, the one or more images to the client device.

In some embodiments, the candidate text string comprises a first part. Executing the text generation machine learning model using the candidate text string can include executing, by the one or more processors, the text generation machine learning model using the candidate text string to generate the candidate generated text string comprising the first part and a generated second part. In some embodiments, the candidate text string comprises a first part. Executing the text generation machine learning model using the candidate text string can include executing, by the one or more processors, the text generation machine learning model using the candidate text string to generate the candidate generated text string consisting of a generated second part.

In some embodiments, the candidate text string comprises a first part comprising a first text feature and a second text feature. Executing the text generation machine learning model using the candidate text string can include executing, by the one or more processors, the text generation machine learning model using the candidate text string to generate the candidate generated text string including the first text feature and a third text feature replacing the second text feature. In some embodiments, the method further includes selecting, by the one or more processors, the text generation machine learning model for execution based on the text generation machine learning model corresponding to a target audience identifier extracted from a message received from the client device.

In some embodiments, the method further includes training, by the one or more processors, the content scoring machine learning model by labeling, by the one or more processors, each of a plurality of training images with a label corresponding to the same target audience based on the training image originating from a data source having a stored association with an identifier of the target audience in a database in memory. In some embodiments, adjusting the one or more weights or parameters of the text generation machine learning model comprises adjusting, by the one or more processors, the one or more weights or parameters of the text generation machine learning model according to a loss function. In some embodiments, adjusting the one or more weights or parameters of the text generation machine learning model comprises penalizing, by the one or more processors, the text generation machine learning model responsive to the text performance score for the generated text string being below a threshold.

In some embodiments, the method further includes executing, by the one or more processors, an image generation machine learning model using a training generated text string to generate an image each according to one or more features identified in the training generated text string; executing, by the one or more processors, the content scoring machine learning model or an image scoring machine learning model to generate an image score for the generated image; and adjusting, by the one or more processors, the one or weights or parameters of the text generation machine learning model based on the image score for the generated image.

In some embodiments, executing the content scoring machine learning model or the image scoring machine learning model comprises executing, by the one or more processors, the image scoring machine learning model to generate the image score for the generated image. In some embodiments, executing the content scoring machine learning model or the image scoring machine learning model comprises executing, by the one or more processors, the content scoring machine learning model to generate the image score for the generated image.

In one aspect, the present disclosure describes a method for training a text generation machine learning model for prompt generation. The method can include receiving, by one or more processors, a training text string; executing, by the one or more processors, a text generation machine learning model using the training text string to generate a training generated text string corresponding to generating a content item and indicating one or more features; executing, by the one or more processors, an image generation machine learning model using the training generated text string to generate one or more training generated images each according to the one or more features indicated in the training generated text string; executing, by the one or more processors, an image scoring machine learning model using the one or more training generated images to generate an image performance score for each of the one or more training generated images; for each of the one or more training generated images, adjusting, by the one or more processors, one or more weights or parameters of the text generation machine learning model proportional to the image performance score for the training generated image.

In some embodiments, the method further includes receiving, by the one or more processors from a client device, a candidate text string, the candidate text string requesting to generate an image; executing, by the one or more processors, the text generation machine learning model using the candidate text string to generate a candidate generated text string identifying one or more candidate features; executing, by the one or more processors, the image generation machine learning model using the candidate generated text string to generate one or more images each according to the one or more candidate features identified in the candidate generated text string; and transmitting, by the one or more processors, the one or more images to the client device.

In some embodiments, the candidate text string includes a first part. Executing the text generation machine learning model using the candidate text string can include executing, by the one or more processors, the text generation machine learning model using the candidate text string to generate the candidate generated text string comprising the first part and a generated second part. In some embodiments, the candidate text string comprises a first part. Executing the text generation machine learning model using the candidate text string can include executing, by the one or more processors, the text generation machine learning model using the candidate text string to generate the candidate generated text string consisting of a generated second part.

In some embodiments, the candidate text string comprises a first part comprising a first text feature and a second text feature. Executing the text generation machine learning model using the candidate text string can include executing, by the one or more processors, the text generation machine learning model using the candidate text string to generate the candidate generated text string including the first text feature and a third text feature replacing the second text feature. In some embodiments, the method further includes selecting, by the one or more processors, the text generation machine learning model for execution based on each of the text generation machine learning model corresponding to a target audience identifier extracted from a message received from the client device.

In one aspect, the present disclosure describes a method for training a text generation machine learning model for prompt generation. The method can include obtaining, by one or more processors, a set of descriptions each identifying one or more features of a different image based on each of the set of descriptions corresponding to an image performance score for the image above a threshold; training, by the one or more processors, a text generation machine learning model using each of the set of descriptions as input; receiving, by the one or more processors from a client device, a candidate text string, the candidate text string requesting to generate an image; executing, by the one or more processors, the text generation machine learning model using the candidate text string to generate a candidate generated text string identifying one or more features; executing, by the one or more processors, an image generation machine learning model using the candidate generated text string to generate one or more images each according to the one or more features identified in the candidate generated text string; and transmitting, by the one or more processors, the one or more images to the client device.

In some embodiments, the candidate text string includes a first part. Executing the text generation machine learning model using the candidate text string can include executing, by the one or more processors, the text generation machine learning model using the candidate text string to generate the candidate generated text string comprising the first part and a generated second part. In some embodiments, the candidate text string includes a first part. Executing the text generation machine learning model using the candidate text string can include executing, by the one or more processors, the text generation machine learning model using the candidate text string to generate the candidate generated text string consisting of a generated second part. In some embodiments, the candidate text string comprises a first part comprising a first text feature and a second text feature. Executing the text generation machine learning model using the candidate text string can include executing, by the one or more processors, the text generation machine learning model using the candidate text string to generate the candidate generated text string including the first text feature and a third text feature replacing the second text feature.

In one aspect, the present disclosure describes a method for training a text generation machine learning model for prompt generation. The method can include receiving, by one or more processors, a plurality of training content items; executing, by the one or more processors, a text generation machine learning model using each of the plurality of training content items to generate a plurality of training generated text strings, each of the plurality of generated text strings corresponding to generating a content item; executing, by the one or more processors, a content scoring machine learning model using each of the plurality of generated text strings to generate a text performance score for each of the plurality of training generated text strings; for each of the plurality of generated text strings, adjusting, by the one or more processors, one or more weights or parameters of the text generation machine learning model proportional to the text performance score for the generated text string.

In some embodiments, the method further comprises receiving, by the one or more processors from a client device, a candidate content item and a text string, the text string requesting a modification of the candidate content item; executing, by the one or more processors, the text generation machine learning model using the candidate content item and the text string to generate a candidate generated text string identifying one or more modifications to the candidate content item; and transmitting, by the one or more processors, the candidate generated text string identifying the one or more modifications to the candidate content item the client device.

In some embodiments, the text string comprises a request for a modification to a feature of the candidate content item. In some embodiments, the text string comprises a request for a modification to an object depicted in the candidate content item. In some embodiments, the text string comprises a request for a modification to a background depicted in the candidate content item.

In some embodiments, the method further comprises executing, by the one or more processors, a content generation machine learning model to generate a generated image according to the one or more modifications identified in the generated text string; executing, by the one or more processors, the content scoring machine learning model or an image scoring machine learning model to generate an image score for the generated image; and training, by the one or more processors, the text generation machine learning model proportional to the image score. In some embodiments, the method further comprises selecting, by the one or more processors, the text generation machine learning model for execution based on the text generation machine learning model corresponding to a target audience identifier extracted from a message received from the client device. In some embodiments, adjusting the one or more weights or parameters of the text generation machine learning model comprises adjusting, by the one or more processors, the one or more weights or parameters of the text generation machine learning model according to a loss function.

In one aspect, the present disclosure describes a method comprising receiving, by one or more processors, a plurality of training images; executing, by the one or more processors, a feature extraction machine learning model using the plurality of training images as input to generate a plurality of training embeddings for the plurality of training images each in an embedding space; training, by the one or more processors, a content scoring machine learning model using the plurality of training embeddings for the plurality of training images to generate performance scores for content items based on embeddings in the embedding space; receiving, by the one or more processors, a set of text; executing, by the one or more processors, the feature extraction machine learning model using the set of text to generate a text embedding in the same embedding space as the training embeddings for the plurality of training images and corresponding to one or more features of the set of text; generating, by the one or more processors using the content scoring machine learning model, a text performance score for the set of text using the text embedding in the embedding space and corresponding to the one or more features of the set of text; and generating, by the one or more processors, a record identifying the text performance score for the set of text.

In some embodiments, training the content scoring machine learning model comprises training, by the one or more processors, the content scoring machine learning model based only on the plurality of training images prior to using the content scoring machine learning model to generate the text performance score for the set of text. In some embodiments, training the content scoring machine learning model based on training embeddings generated from training images comprises, for each training image, obtaining, by the one or more processors, engagement feedback comprising a set of interactions with the training image; executing, by the one or more processors, the image feature extraction machine learning model on the training image to generate a training embedding in the embedding space and corresponding to a set of features of the training image; and training, by the one or more processors, the content scoring machine learning model based on the training embedding and the engagement feedback for the training image.

In some embodiments, the method further comprises, for each training image, executing, by the one or more processors, the content scoring machine learning model using the training image to generate a training performance score; and calculating, by the one or more processors, an engagement metric for the training image based on the engagement feedback comprising the set of interactions with the training image, wherein training the content scoring machine learning model comprises adjusting one or more weights and/or parameters of the content scoring machine learning model based on a difference between the engagement metric and the training performance score. In some embodiments, the method further comprises training, by the one or more processors, the content scoring machine learning model with a plurality of training videos prior to using the content scoring machine learning model to generate the text performance score for the set of text.

In some embodiments, training the content scoring machine learning model comprises training, by the one or more processors, the content scoring machine learning model based on training embeddings each tagged with a label corresponding to the same target audience. In some embodiments, the method further comprises labeling, by the one or more processors, each of the training images with a label corresponding to the target audience based on the training image originating from a data source having a stored association with an identifier of the target audience in a database in memory.

In some embodiments, receiving the set of text comprises receiving, by the one or more processors, a request comprising the set of text and an identifier of a target audience from a client device via a communication interface; wherein executing the feature extraction machine learning model comprises executing, by the one or more processors, the feature extraction machine learning model in response to the request from the client device; and wherein generating the text performance score for the set of text comprises executing, by the one or more processors, the content scoring machine learning model using the set of text and based on the identifier of the target audience to generate the text performance score. The method can further include transmitting, by the one or more processors, the record identifying the text performance score for the set of text to the client device. In some embodiments, executing the feature extraction machine learning model comprises executing, by the one or more processors, a first neural network; and generating the text performance score for the set of text comprises executing, by the content scoring machine learning model, a second neural network.

In some embodiments, the method further comprises determining, by the one or more processors, the text performance score for the set of text is below a predetermined threshold; generating, by the one or more processors, an impact score for each of one or more features of the set of text; and generating, by the one or more processors, a recommendation to adjust at least one feature of the one or more features of the set of text based on the impact scores for the one or more features of the set of text.

In some aspects, a method comprises receiving, by one or more processors, an image; executing, by the one or more processors, an image feature extraction machine learning model using the image as input to generate an image embedding in an image embedding space and corresponding to one or more features of the image; converting, by the one or more processors using an embedding conversion machine learning model, the image embedding into a first composite embedding for the image and in a composite embedding space; generating, by the one or more processors using a content scoring machine learning model, an image performance score for the image using the first composite embedding corresponding to the one or more features of the image, the content scoring machine learning model trained to generate performance scores for content items based on composite embeddings in the composite embedding space for images and videos; receiving, by the one or more processors, a video; executing, by the one or more processors, a video feature extraction machine learning model using the video as input to generate a video embedding in a video embedding space separate from the image embedding space and corresponding to one or more features of the video; converting, by the one or more processors using the embedding conversion machine learning model, the video embedding into a second composite embedding for the video and in the composite embedding space; generating, by the one or more processors using the content scoring machine learning model, a video performance score for the video using the second composite embedding in the composite embedding space and corresponding to the one or more features of the video.

In some embodiments, the method further comprises receiving, by the one or more processors, a plurality of training images; and training, by the one or more processors, the content scoring machine learning model, the embedding conversion machine learning model, and the image feature extraction machine learning model based on each of the plurality of training images, wherein the video feature extraction machine learning model is not trained based on the plurality of training images. In some embodiments, training the content scoring machine learning model, the embedding conversion machine learning model, and the image feature extraction machine learning model based on each of the plurality of training images comprises, for each of the plurality of training images, using back-propagation techniques to train each of the content scoring machine learning model, the embedding conversion machine learning model, and the image feature extraction machine learning model.

In some embodiments, the method further comprises receiving, by the one or more processors, a plurality of training images; obtaining, by the one or more processors, engagement feedback for each of the plurality of training images comprising a set of interactions with the training image; and training, by the one or more processors, the content scoring machine learning model by, for each of the plurality of training images, executing, by the one or more processors, the image feature extraction machine learning model on the training image to generate a training image embedding in the image embedding space and corresponding to a set of features of the training image; executing, by the one or more processors, the embedding conversion machine learning model to convert the training image embedding to a training composite embedding; and training, by the one or more processors, the content scoring machine learning model based on the training composite embedding and the engagement feedback for the training image.

In some embodiments, the method further comprises, for each training image, executing, by the one or more processors, the content scoring machine learning model using the training composite embedding to generate a training performance score for the training image; and calculating, by the one or more processors, an engagement metric for the training image based on the engagement feedback comprising the set of interactions with the training image, wherein training the content scoring machine learning model comprises adjusting one or more weights and/or parameters of the content scoring machine learning model based on a difference between the engagement metric and the training performance score.

In some embodiments, the method further comprises receiving, by the one or more processors, a plurality of training videos; and training, by the one or more processors, the content scoring machine learning model, the embedding conversion machine learning model, and the video feature extraction machine learning model based on each of the plurality of training videos, wherein the image feature extraction machine learning model is not trained based on the plurality of training videos. In some embodiments, training the content scoring machine learning model comprises training, by the one or more processors, the content scoring machine learning model based on training images and training videos each tagged with a label corresponding to the same target audience. In some embodiments, the method further comprises, labeling, by the one or more processors, each of the training images and training videos with a label corresponding to the target audience based on the training image or training video originating from a data source having a stored association with an identifier of the target audience in a database in memory.

In some aspects, a method comprises receiving, by one or more processors, a plurality of training content items of a first type; executing, by the one or more processors, a feature extraction machine learning model using the plurality of training content items of the first type as input to generate a plurality of training embeddings for the plurality of training content items of the first type each in an embedding space; training, by the one or more processors, a content scoring machine learning model using the plurality of training embeddings for the plurality of training content items of the first type to generate performance scores for content items based on embeddings in the embedding space; receiving, by the one or more processors, a candidate content item of a second type; executing, by the one or more processors, the feature extraction machine learning model using the candidate content item of the second type to generate a candidate embedding in the same embedding space as the training embeddings for the plurality of training content items of the first type and corresponding to one or more features of the candidate content item of the second type; generating, by the one or more processors using the content scoring machine learning model, a candidate performance score for the candidate content item of the second type using the candidate embedding in the embedding space and corresponding to the one or more features of the candidate content item of the second type; and generating, by the one or more processors, a record identifying the candidate performance score for the candidate content item of the second type.

In some embodiments, training the content scoring machine learning model comprises training, by the one or more processors, the content scoring machine learning model based only on the plurality of training content items of the first type prior to using the content scoring machine learning model to generate the candidate performance score for the candidate content item of the second type.

In some embodiments, training the content scoring machine learning model based on the training embeddings generated from training content items of the first type comprises, for each training content item obtaining, by the one or more processors, engagement feedback comprising a set of interactions with the training content item; executing, by the one or more processors, the feature extraction machine learning model on the training content item to generate a training embedding in the embedding space and corresponding to a set of features of the training content item; and training, by the one or more processors, the content scoring machine learning model based on the training embedding and the engagement feedback for the training content item.

In some embodiments, the method further comprises, for each training content item executing, by the one or more processors, the content scoring machine learning model using the training content item to generate a training performance score; and calculating, by the one or more processors, an engagement metric for the training content item based on the engagement feedback comprising the set of interactions with the training content item, wherein training the content scoring machine learning model comprises adjusting one or more weights and/or parameters of the content scoring machine learning model based on a difference between the engagement metric and the training performance score. In some embodiments, the method further comprises training, by the one or more processors, the content scoring machine learning model with a plurality of training content items of the second type prior to using the content scoring machine learning model to generate the candidate performance score for the candidate content item of the second type.

In some embodiments, training the content scoring machine learning model comprises training, by the one or more processors, the content scoring machine learning model based on training embeddings each tagged with a label corresponding to the same target audience. In some embodiments, the method further comprises labeling, by the one or more processors, each of the training content items with a label corresponding to the target audience based on the training content item originating from a data source having a stored association with an identifier of the target audience in a database in memory.

In some embodiments, receiving the candidate content item comprises receiving, by the one or more processors, a request comprising the candidate content item and an identifier of a target audience from a client device via a communication interface; wherein executing the feature extraction machine learning model comprises executing, by the one or more processors, the feature extraction machine learning model in response to the request from the client device; and wherein generating the candidate performance score for the candidate content item comprises executing, by the one or more processors, the content scoring machine learning model using the candidate content item and based on the identifier of the target audience to generate the candidate performance score. The method can further include transmitting, by the one or more processors, the record identifying the candidate performance score for the candidate content item to the client device.

In some aspects, a method comprises receiving, by one or more processors, a first content item of a first type; executing, by the one or more processors, a first feature extraction machine learning model using the first content item of the first type as input to generate a first content item embedding in an embedding space for the first type and corresponding to one or more features of the first content item; converting, by the one or more processors using an embedding conversion machine learning model, the first content item embedding into a first composite embedding for the first content item and in a composite embedding space; generating, by the one or more processors using a content scoring machine learning model, a first content item performance score for the first content item using the first composite embedding corresponding to the one or more features of the first content item, the content scoring machine learning model trained to generate performance scores for content items based on composite embeddings in the embedding space; receiving, by the one or more processors, a second content item of a second type; executing, by the one or more processors, a second feature extraction machine learning model using the second content item of the second type as input to generate a second content item embedding in an embedding space for the second type separate from the embedding space for the first type and corresponding to one or more features of the second content item; converting, by the one or more processors using the embedding conversion machine learning model, the second content item embedding into a second composite embedding for the second content item and in the composite embedding space; generating, by the one or more processors using the content scoring machine learning model, a second performance score for the second content item using the second composite embedding in the composite embedding space and corresponding to the one or more features of the second content item.

In some embodiments, the method further comprises receiving, by the one or more processors, a plurality of training content items of the first type; and training, by the one or more processors, the content scoring machine learning model, the embedding conversion machine learning model, and the first feature extraction machine learning model based on each of the plurality of training content items of the first type, wherein the second feature extraction machine learning model is not trained based on the plurality of training content items of the first type. In some embodiments, training the content scoring machine learning model, the embedding conversion machine learning model, and the first feature extraction machine learning model based on each of the plurality of training content items comprises, for each of the plurality of training content items of the first type, using back-propagation techniques to train each of the content scoring machine learning model, the embedding conversion machine learning model, and the first feature extraction machine learning model.

In some embodiments, the method further comprises receiving, by the one or more processors, a plurality of training content items of the first type; obtaining, by the one or more processors, engagement feedback for each of the plurality of training content items of the first type comprising a set of interactions with the training content item; and training, by the one or more processors, the content scoring machine learning model by, for each of the plurality of training content items of the first type, executing, by the one or more processors, the first feature extraction machine learning model on the training content item to generate a training content item embedding in the embedding space for the first type and corresponding to a set of features of the training content item; executing, by the one or more processors, the embedding conversion machine learning model to convert the training content item embedding to a training composite embedding; and training, by the one or more processors, the content scoring machine learning model based on the training composite embedding and the engagement feedback for the training content item.

In some aspects, the present disclosure describes a method. The method can include receiving, by one or more processors, a first image; extracting, by the one or more processors, a first set of features from the first image; executing, by the one or more processors, a first machine learning model using the extracted first set of features as input to generate a first image performance score for the first image; responsive to determining the first image performance score for the first image is lower than a threshold, iteratively executing, by the one or more processors and using the first set of features as input for each execution, a generative machine learning model to generate a plurality of generated images; extracting, by the one or more processors, a second set of features from each of the plurality of generated images; iteratively executing, by the one or more processors, the first machine learning model using a different second set of features as input for each execution to generate a generated image performance score for each of the plurality of generated images; and transmitting, by the one or more processors, a defined number of the plurality of generated images to a computing device, the defined number of generated images determined based on the generated image performance scores.

In some embodiments, receiving the first image comprises receiving, by the one or more processors, a message comprising the first image and a target audience identifier, the method further comprising, retrieving, by the one or more processors, the first machine learning model responsive to the first machine learning model having a stored association in memory with the target audience identifier. In some embodiments, the method further includes selecting, by the one or more processors, the threshold from the memory based on the target audience identifier. In some embodiments, the method further includes comparing, by the one or more processors, the generated image performance scores for the plurality of generated images; and determining, by the one or more processors, the defined number of the plurality of generated images based on the comparison indicating the defined number of generated images correspond to the highest generated image performance scores.

In some embodiments, receiving the first image comprises receiving, by the one or more processors, a message comprising the first image and a value of the defined number, the method further comprising, determining, by the one or more processors, the defined number of the plurality of generated images based on the value of the defined number. In some embodiments, receiving the first image comprises receiving, by the one or more processors, a message comprising the first image and a value of the threshold. In some embodiments, receiving the first image comprises, accessing, by the one or more processors, a web page containing the first image; and retrieving, by the one or more processors, the first image from the web page. In some embodiments, transmitting the defined number of generated images comprises replacing, by the one or more processors, the first image with the defined number of generated images on the web page or in a database previously storing the first image with an identifier of the web page.

In some embodiments, receiving the first image comprises, receiving, by one or more processors, a message containing a second image from a second computing device; extracting, by the one or more processors, a second set of features from the second image; executing, by the one or more processors, the first machine learning model using the extracted second set of features as input to generate a second image performance score for the second image; responsive to determining the second image performance score for the second image exceeds the threshold, transmitting, by the one or more processors to the second computing device, an indication that the second image performance score for the second image exceeds the threshold. In some embodiments, receiving the first image comprises receiving, by the one or more processors, a message comprising the first image and an identification of a number of executions, wherein iteratively executing the generative machine learning model comprises executing, by the one or more processors, the generative machine learning model using the first set of features as input for the number of executions identified in the message.

In some embodiments, iteratively executing the generative machine learning model comprises transmitting, by the one or more processors and for each execution of the generative machine learning model, a request comprising the first set of features to a remote computing device hosting the generative machine learning model. In some embodiments, iteratively executing the generative machine learning model using the first set of features as input comprises using a different subset of the first set of features as input for each execution.

In some embodiments, iteratively executing the generative machine learning model to generate the plurality of generated images comprises executing the generative machine learning model using the first set of features and additional instructions as input to generate the plurality of generated images, wherein the additional instructions indicate a modification to the first image. In some embodiments, receiving the first image comprises receiving, by the one or more processors, a message comprising the first image and a platform identifier or a content format identifier, the method further comprising, retrieving, by the one or more processors, the first machine learning model responsive to the first machine learning model having a stored association in memory with the platform identifier or the content format identifier.

In some aspects, a method comprises receiving, by one or more processors, a video; segmenting, by the one or more processors, the video into a plurality of segments, each of the plurality of segments comprising a plurality of images; executing, by the one or more processors, one or more machine learning models using the plurality of segments to generate a segment score for each of the plurality of segments, the segment score for a segment indicating a likelihood that a user will interact with the segment; generating, by the one or more processors, a video performance score for the video as a function of the segment scores for the plurality of segments; and generating, by the one or more processors, a record comprising the video performance score for the video and an identification of the video.

In some embodiments, segmenting the video into a plurality of segments comprises segmenting, by the one or more processors, the video into the plurality of segments each having a defined length and having a defined overlap between pairs of sequential segments of the plurality of segments. In some embodiments, the method further comprises identifying, by the one or more processors, edit points in the videos; and segmenting, by the one or more processors, the plurality of segments based on the identified edit points.

In some embodiments, executing the one or more machine learning model to generate the segment score for each of the plurality of segments comprises, iteratively executing, by the one or more processors, a feature extraction machine learning model using the plurality of segments to generate a segment embedding for each of the plurality of segments; and iteratively executing, by the one or more processors, a content scoring machine learning model based on the plurality of segments to generate the segment score for each of the plurality of segments.

In some embodiments, generating the video performance score for the video comprises aggregating, by the one or more processors, the segment scores of the plurality of segments to generate the video performance score. In some embodiments, aggregating the segments scores comprises assigning, by the one or more processors, weights to the segment scores according to lengths of the segments corresponding to the segment scores; and aggregating, by the one or more processors, the segment scores according to the assigned weights. In some embodiments, generating the video performance score for the video comprises assigning, by the one or more processors, weights to the segment scores according to distances of the segments corresponding to the segment scores from a beginning of the video; and aggregating, by the one or more processors, the segment scores according to the assigned weights.

In some embodiments, the method further comprises ranking, by the one or more processors, the plurality of segments according to the segment performance scores of the plurality of segments; and presenting, by the one or more processors, images from the plurality of segments on a user interface in order according to the rankings of the plurality of segments from which the images respectively originated. In some embodiments, the method further comprises identifying, by the one or more processors, a defined number of segments with the lowest segment performance scores of the plurality of segments; and removing, by the one or more processors, the defined number of segments with the lowest segment performance scores of the plurality of segments from the video.

In some embodiments, the method further comprises identifying, by the one or more processors, a highest scoring segment of the plurality of segments based on the segments scores for the plurality of segments; extracting, by the one or more processors, one or more images from the highest scoring segment; executing, by the one or more processors, at least one machine learning model to generate an image performance score for each of the one or more images extracted from the highest scoring segment; identifying, by the one or more processors, a highest scoring image of the one or more images based on the generated image performance scores; and generating, by the one or more processors, a record identifying the highest scoring image. In some embodiments, the method further comprises identifying, by the one or more processors, a defined number of segments with the highest segment performance scores of the plurality of segments; concatenating, by the one or more processors, the defined number of segments into a concatenated video; and storing, by the one or more processors, the concatenated video in memory.

In some aspects, a system comprises one or more processors coupled with memory. The one or more processors can be configured to receive a video; segment the video into a plurality of segments, each of the plurality of segments comprising a plurality of images; execute one or more machine learning models using the plurality of segments to generate a segment score for each of the plurality of segments; generate a video performance score for the video as a function of the segment scores for the plurality of segments; and generate a record comprising the video performance score for the video and an identification of the video. In some embodiments, the one or more processors are configured to segment the video into a plurality of segments by segmenting the video into the plurality of segments each having a defined length and having a defined overlap between pairs of sequential segments of the plurality of segments.

In some embodiments, the one or more processors are further configured to determine segment content for each of the plurality of segments; and segment the plurality of segments based on a change in segment content between pairs of sequential segments of the plurality of segments. In some embodiments, the one or more processors are further configured to execute the one or more machine learning model to generate the segment score for each of the plurality of segments by iteratively executing a feature extraction machine learning model using the plurality of segments to generate a segment embedding for each of the plurality of segments; and iteratively executing a content scoring machine learning model using the plurality of segments to generate the segment score for each of the plurality of segments.

In some embodiments, the one or more processors are configured to generate the video performance score for the video by aggregating the segment scores of the plurality of segments to generate the video performance score. In some embodiments, the one or more processors are configured to aggregate the segments scores by assigning weights to the segment scores according to lengths of the segments corresponding to the segment scores; and aggregating the segment scores according to the assigned weights. In some embodiments, the one or more processors are configured to generate the video performance score for the video by assigning weights to the segment scores according to distances of the segments corresponding to the segment scores from a beginning of the video; and aggregating the segment scores according to the assigned weights.

In some aspects, non-transitory computer-readable media comprise instructions that, when executed by one or more processors, cause the one or more processors to receive a video; segment the video into a plurality of segments, each of the plurality of segments comprising a plurality of images; execute one or more machine learning models using the plurality of segments to generate a segment score for each of the plurality of segments; generate a video performance score for the video as a function of the segment scores for the plurality of segments; and generate a record comprising the video performance score for the video and an identification of the video.

In some embodiments, the instructions cause the one or more processor to segment the video into a plurality of segments by segmenting the video into the plurality of segments each having a defined length and having a defined overlap between pairs of sequential segments of the plurality of segments.

In some aspects, the present disclosure describes a system, comprising one or more processors coupled to memory. The one or more processors can be configured to receive a first image; extract a first set of features from the first image; execute a first machine learning model using the extracted first set of features as input to generate a first image performance score for the first image; responsive to determining the first image performance score for the first image is lower than a threshold, iteratively execute, using the first set of features as input for each execution, a generative machine learning model to generate a plurality of generated images; extract a second set of features from each of the plurality of generated images; iteratively execute the first machine learning model using a different second set of features as input for each execution to generate a generated image performance score for each of the plurality of generated images; and transmit a defined number of the plurality of generated images to a computing device, the defined number of generated images determined based on the generated image performance scores.

In some embodiments, the one or more processors are configured to receive the first image by receiving a message comprising the first image and a target audience identifier, and wherein the one or more processors are further configured to: retrieve the first machine learning model responsive to the first machine learning model having a stored association in memory with the target audience identifier.

In some embodiments, the one or more processors are further configured to: select the threshold from the memory based on the target audience identifier. In some embodiments, the one or more processors are further configured to: compare the generated image performance scores for the plurality of generated images; and determine the defined number of the plurality of generated images based on the comparison indicating the defined number of generated images correspond to the highest generated image performance scores.

In some embodiments, the one or more processors are configured to receive the first image by receiving a message comprising the first image and a value of the defined number; and wherein the one or more processors are further configured to: determine the defined number of the plurality of generated images based on the value of the defined number. In some embodiments, the one or more processors are configured to receive the first image by receiving a message comprising the first image and a value of the threshold.

In some aspects, the present disclosure describes a method. The method can include obtaining, by one or more processors, a first set of features; iteratively executing, by the one or more processors and using the first set of features as input for each execution, a generative machine learning model to generate a plurality of generated images; extracting, by the one or more processors, a second set of features from each of the plurality of generated images; iteratively executing, by the one or more processors, the first machine learning model using a different second set of features as input for each execution to generate a generated image performance score for each of the plurality of generated images; and transmitting, by the one or more processors, a defined number of the plurality of generated images to a computing device, the defined number of generated images determined based on the generated image performance scores.

In some embodiments, iteratively executing the generative machine learning model to generate the plurality of generated images comprises: executing the generative machine learning model using the first set of features and additional instructions as input to generate the plurality of generated images, wherein the additional instructions indicate a feature to include in each of the plurality of generated images.

In some aspects, the present disclosure describes a method. The method can include receiving, by one or more processors, a first image from a client device; extracting, by the one or more processors, a first set of features from the first image; for each of the first set of features, calculating, by the one or more processors, an impact score indicating an impact the feature has on a first image performance score of the first image; identifying, by the one or more processors, a first subset of the first set of features that each correspond with an impact score above a first threshold and a second subset of the first set of features that each correspond with an impact score below a second threshold; executing, by the one or more processors and using the first set of features of the first image and an identification of the subset of features as input, a generative machine learning model to generate a generated image comprising the first set of features with a prominence of the first subset of features increased and a prominence of the second subset of features decreased; and transmitting, by the one or more processors, the generated image to the client device.

In some embodiments, the method further includes executing, by the one or more processors, a first machine learning model using the extracted first set of features as input to generate the first image performance score for the first image; and comparing, by the one or more processors, the first image performance score for the first image to a threshold, wherein the one or more processors are configured to calculate the impact score for each of the first set of features responsive to determining the first image performance score is below the threshold.

In some embodiments, calculating the impact score for each of the first set of features comprises: executing, by the one or more processors, a neural network using the first set of features to obtain the first image performance score for the image or video, the neural network comprising an input layer, a plurality of intermediate layers subsequent to the input layer, and a regression layer or a classification layer subsequent to the plurality of intermediate layers; extracting, by the one or more processors, one or more values from one or more signals between an intermediate layer of the plurality of intermediate layers and the regression layer or the classification layer, the one or more values generated responsive to executing the neural network using the extracted first set of features; and for each of the first set of features, calculating, for the one or more processors and based on at least one of the one or more values, an impact score indicating an impact the feature had on the first image performance score.

In some aspects, the present disclosure describes a method. The method can include receiving, by one or more processors, a first image from a client device; extracting, by the one or more processors, a first set of features from the first image; identifying, by the one or more processors, a second image corresponding to an image performance score that satisfies a condition; executing, by the one or more processors and using (i) the first set of features, (ii) a second set of features from the second image, and (iii) a change value indicating a magnitude to change the first image as input, a generative machine learning model to generate a generated image comprising the first set of features adjusted to be similar to the second set of features of the second image according to the change value; and transmitting, by the one or more processors, the generated image to the client device.

In some embodiments, the method can further include receiving, by the one or more processors, the change value in a request containing the first image from the client device. In some embodiments, the method can further include receiving, by the one or more processors, a target audience identifier corresponding to a target audience in a request containing the first image from the client device, wherein identifying the second image comprises identifying, by the one or more processors, the second image corresponding to the image performance score for the target audience that satisfies the condition.

In some embodiments, identifying the second image comprises: comparing, by the one or more processors, image performance scores of a plurality of images with each other, the plurality of images comprising the second image; and identifying, by the one or more processors, the second image responsive to determining the image performance score corresponding to the second image is the highest image performance score of the image performance scores of the plurality of images.

In some aspects, a method includes obtaining, by one or more processors, a first set of features and an identification of a target audience in a request originating from a computing device; iteratively executing, by the one or more processors, a generative machine learning model using the first set of features as input to generate a plurality of generated images, each of the plurality of generated images corresponding to a different image performance score for the target audience; selecting, by the one or more processors, a defined number of the plurality of generated images determined based on the image performance scores for the target audience for the plurality of generated images; and transmitting, by the one or more processors, the selected defined number of the plurality of generated images to a computing device, the selected defined number of generated images determined based on the generated image performance scores.

In some embodiments, the method further includes retrieving, by the one or more processors, the generative machine learning model responsive to the generative machine learning model having a stored association in memory with the identification of a target audience. In some embodiments, the method further includes training, by the one or more processors, the generative machine learning model based on interaction data of user interactions with training images on one or more web pages. In some embodiments, the method further includes training, by the one or more processors, the generative machine learning model based on training image performance scores of training images. In some embodiments, training the generative machine learning model comprises using a first loss function based on the accuracy of a generated training image for a training prompt and a second loss function based on training image performance score for a generated image.

In some embodiments, the method further includes retrieving, by the one or more processors, the image scoring machine learning model responsive to the image scoring machine learning model having a stored association in memory with the identification of the target audience; and iteratively executing, by the one or more processors, an image scoring machine learning model using the first set of features for each execution to generate the different image performance scores for the target audience for the plurality of generated images, the image scoring machine learning model trained based on interaction data of user interactions with training images on one or more web pages.

In some embodiments, obtaining the first set of features and the identification of the target audience in the request comprises receiving, by the one or more processors, the first set of features in a prompt input into the computing device by a user. In some embodiments, obtaining the first set of features and the identification of the target audience in the request comprises receiving an identification of a product. Iteratively executing the generative machine learning model using the first set of features as input to generate the plurality of generated images can include generating, by the one or more processors, the plurality of generated images to include the product in each of the plurality of generated images.

In some embodiments, iteratively executing the generative machine learning model comprises iteratively executing, by the one or more processors, a transformer model. In some embodiments, obtaining the first set of features comprises receiving one or more visual attributes to include in each of the plurality of generated images. In some embodiments, obtaining the first set of features and the identification of the target audience in the request comprises receiving a correlation between the between the target audience and an image performance score.

In an aspect, the present disclosure describes a method. The method includes obtaining, by one or more processors, a training dataset comprising a plurality of sets of features; iteratively executing, by the one or more processors and using a different set of features of the plurality of sets of features for each execution, a generative machine learning model to generate a plurality of training images each corresponding to a different set of features of the plurality of sets of features; executing, by the one or more processors, an image scoring machine learning model using each of the plurality of training images to generate an image score for each of the plurality of training images; and adjusting, by the one or more processors for each of the plurality of training images and corresponding image scores, one or more weights or parameters of the generative machine learning model proportional to the image score.

In some embodiments, adjusting the one or more weights or parameters of the generative machine learning model comprises adjusting, by the one or more for each of the plurality of training images and corresponding image scores, first one or more weights or parameters of the generative machine learning model using a first loss function. The method may further include adjusting, by the one or more processors for each of the plurality of training images, second one or more weights or parameters of the generative machine learning model based on a difference between the training image and the set of features based on which the generative machine learning model generated the training image.

In some embodiments, the method further includes training, by the one or more processors, the image scoring machine learning model to generate the image scores based on interaction data of user interactions with images on one or more web pages. In some embodiments, the method further includes executing, by the one or more processors, the generative machine learning model with the adjusted one or more weights or parameters using a candidate set of features as input to generate a candidate image. In some embodiments, the method further includes receiving, by the one or more processors, a target audience identifier of a target audience with the training dataset; and retrieving, by the one or more processors, the image scoring machine learning model based on the image scoring machine learning model having a stored association with the target audience in memory.

These and other aspects and implementations are discussed in detail herein. The detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the remote computing device, the electronic device 104, or the POS device 106) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method, comprising:

receiving, by one or more processors, a video;

segmenting, by the one or more processors, the video into a plurality of segments, each of the plurality of segments comprising a plurality of images;

executing, by the one or more processors, one or more machine learning models using the plurality of segments to generate a segment score for each of the plurality of segments, the segment score for a segment indicating a likelihood that a user will interact with the segment;

generating, by the one or more processors, a video performance score for the video as a function of the segment scores for the plurality of segments; and generating, by the one or more processors, a record comprising the video performance score for the video and an identification of the video.

2. The method of claim 1, wherein segmenting the video into a plurality of segments comprises segmenting, by the one or more processors, the video into the plurality of segments each having a defined length and having a defined overlap between pairs of sequential segments of the plurality of segments.

3. The method of claim 1, further comprising:

identifying, by the one or more processors, edit points in the videos; and segmenting, by the one or more processors, the plurality of segments based on the identified edit points.

4. The method of claim 1, wherein executing the one or more machine learning model to generate the segment score for each of the plurality of segments comprises:

iteratively executing, by the one or more processors, a feature extraction machine learning model using the plurality of segments to generate a segment embedding for each of the plurality of segments; and iteratively executing, by the one or more processors, a content scoring machine learning model based on the plurality of segments to generate the segment score for each of the plurality of segments.

5. The method of claim 1, wherein generating the video performance score for the video comprises:

aggregating, by the one or more processors, the segment scores of the plurality of segments to generate the video performance score.

6. The method of claim 5, wherein aggregating the segments scores comprises:

assigning, by the one or more processors, weights to the segment scores according to lengths of the segments corresponding to the segment scores; and aggregating, by the one or more processors, the segment scores according to the assigned weights.

7. The method of claim 5, wherein generating the video performance score for the video comprises:

assigning, by the one or more processors, weights to the segment scores according to distances of the segments corresponding to the segment scores from a beginning of the video; and aggregating, by the one or more processors, the segment scores according to the assigned weights.

8. The method of claim 1, further comprising:

ranking, by the one or more processors, the plurality of segments according to the segment performance scores of the plurality of segments; and presenting, by the one or more processors, images from the plurality of segments on a user interface in order according to the rankings of the plurality of segments from which the images respectively originated.

9. The method of claim 1, further comprising:

identifying, by the one or more processors, a defined number of segments with the lowest segment performance scores of the plurality of segments; and removing, by the one or more processors, the defined number of segments with the lowest segment performance scores of the plurality of segments from the video.

10. The method of claim 1, further comprising:

identifying, by the one or more processors, a highest scoring segment of the plurality of segments based on the segments scores for the plurality of segments;

extracting, by the one or more processors, one or more images from the highest scoring segment;

executing, by the one or more processors, at least one machine learning model to generate an image performance score for each of the one or more images extracted from the highest scoring segment;

identifying, by the one or more processors, a highest scoring image of the one or more images based on the generated image performance scores; and generating, by the one or more processors, a record identifying the highest scoring image.

11. The method of claim 1, further comprising:

identifying, by the one or more processors, a defined number of segments with the highest segment performance scores of the plurality of segments;

concatenating, by the one or more processors, the defined number of segments into a concatenated video; and storing, by the one or more processors, the concatenated video in memory.

12. A system, comprising one or more processors coupled with memory and configured to:

receive a video;

segment the video into a plurality of segments, each of the plurality of segments comprising a plurality of images;

execute one or more machine learning models using the plurality of segments to generate a segment score for each of the plurality of segments;

generate a video performance score for the video as a function of the segment scores for the plurality of segments; and generate a record comprising the video performance score for the video and an identification of the video.

13. The system of claim 12, wherein the one or more processors are configured to segment the video into a plurality of segments by segmenting the video into the plurality of segments each having a defined length and having a defined overlap between pairs of sequential segments of the plurality of segments.

14. The system of claim 12, wherein the one or more processors are further configured to:

determine segment content for each of the plurality of segments; and segment the plurality of segments based on a change in segment content between pairs of sequential segments of the plurality of segments.

15. The system of claim 12, wherein the one or more processors are further configured to execute the one or more machine learning model to generate the segment score for each of the plurality of segments by:

iteratively executing a feature extraction machine learning model using the plurality of segments to generate a segment embedding for each of the plurality of segments; and iteratively executing a content scoring machine learning model using the plurality of segments to generate the segment score for each of the plurality of segments.

16. The system of claim 12, wherein the one or more processors are configured to generate the video performance score for the video by:

aggregating the segment scores of the plurality of segments to generate the video performance score.

17. The system of claim 16, wherein the one or more processors are configured to aggregate the segments scores by:

assigning weights to the segment scores according to lengths of the segments corresponding to the segment scores; and aggregating the segment scores according to the assigned weights.

18. The system of claim 16, wherein the one or more processors are configured to generate the video performance score for the video by:

assigning weights to the segment scores according to distances of the segments corresponding to the segment scores from a beginning of the video; and aggregating the segment scores according to the assigned weights.

19. Non-transitory computer-readable media comprising instructions that, when executed by one or more processors, cause the one or more processors to:

receive a video;

segment the video into a plurality of segments, each of the plurality of segments comprising a plurality of images;

execute one or more machine learning models using the plurality of segments to generate a segment score for each of the plurality of segments;

generate a video performance score for the video as a function of the segment scores for the plurality of segments; and generate a record comprising the video performance score for the video and an identification of the video.

20. The non-transitory computer-readable media of claim 19, wherein the instructions cause the one or more processor to segment the video into a plurality of segments by segmenting the video into the plurality of segments each having a defined length and having a defined overlap between pairs of sequential segments of the plurality of segments.

* * * * *